Oct. 28, 1969 J. W. FIGUEROA ET AL 3,475,730
INFORMATION SHIFT APPARATUS IN A COMPUTER SYSTEM
Filed May 27, 1966 207 Sheets-Sheet 1
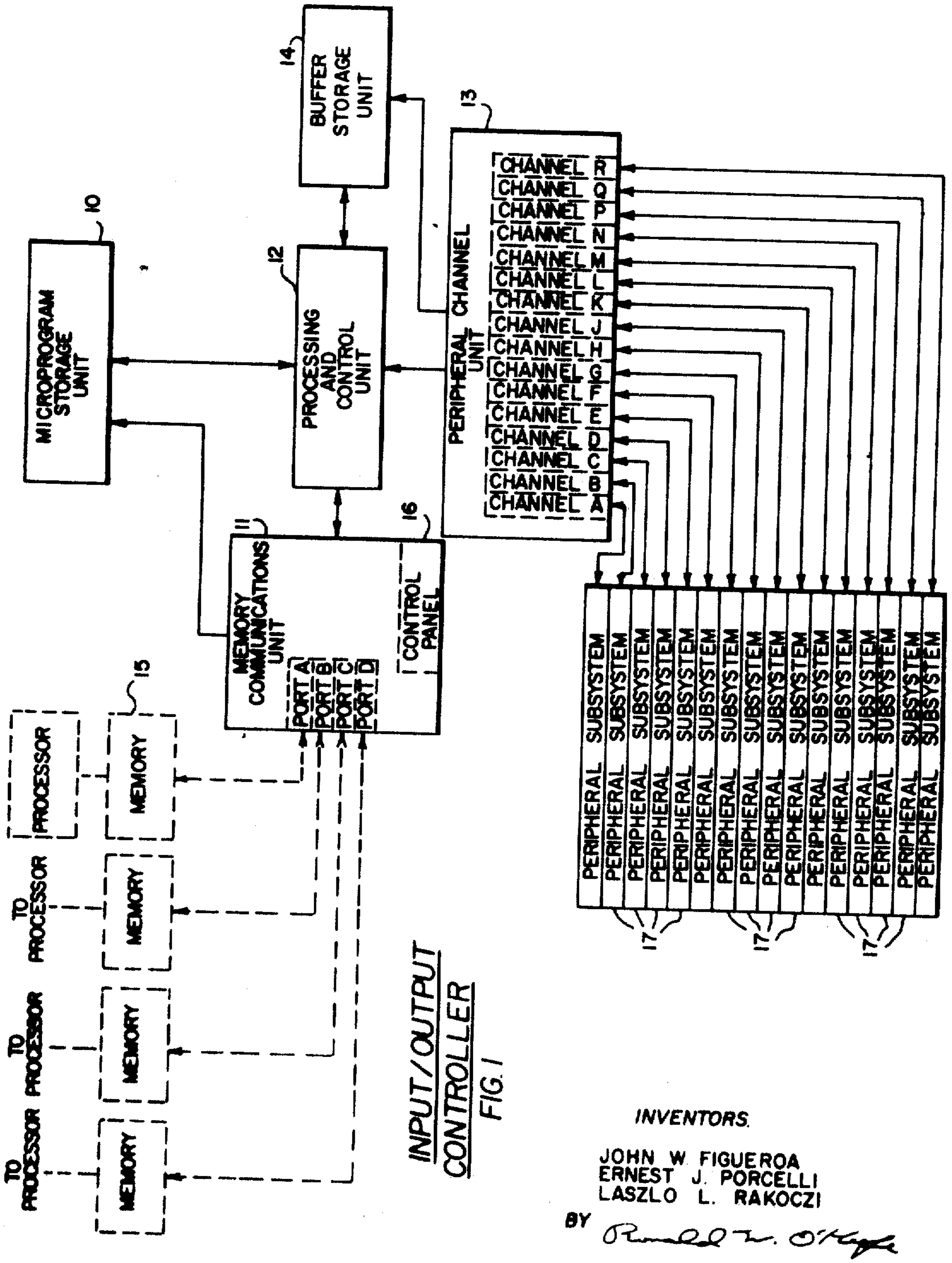
INPUT/OUTPUT CONTROLLER FIG. 1
INVENTORS.
JOHN W. FIGUEROA
ERNEST J. PORCELLI
LASZLO L. RAKOCZI
BY [signature]
ATTORNEY

INFORMATION SHIFT APPARATUS IN A COMPUTER SYSTEM

SECONDARY MAILBOX WORD # 1

SECONDARY MAILBOX WORD # 2

SECONDARY MAILBOX WORD # 3

SECONDARY MAILBOX WORD # 4

INTERRUPT QUEUE COUNTER WORD

INTERRUPT QUEUE TABLE WORD

AND-GATE

OR-GATE

INVERTER

NAND-GATE

NOR-GATE

FLIP-FLOP

ONE-SHOT

LOGICAL BLOCK DIAGRAM

PERIPHERAL SUBSYSTEM-INPUT/OUTPUT CONTROLLER CONNECTION

COMMAND SEQUENCE

READ SEQUENCE

Oct. 28, 1969 J. W. FIGUEROA ET AL 3,475,730

INFORMATION SHIFT APPARATUS IN A COMPUTER SYSTEM

Filed May 27, 1966 207 Sheets-Sheet 12

WRITE SEQUENCE

MEMORY-INPUT/OUTPUT CONTROLLER CONNECTION

Oct. 28, 1969 J. W. FIGUEROA ET AL 3,475,730

INFORMATION SHIFT APPARATUS IN A COMPUTER SYSTEM

Filed May 27, 1966 207 Sheets-Sheet 14

MEMORY

READ/RESTORE COMMAND

CLEAR/WRITE COMMAND

C= COUNTER PARITY INTERRUPT
S= SPECIAL INTERRUPT
I= INITIATION INTERRUPT
T= TERMINATE INTERRUPT

| IOC NO. | MEMORY INTERRUPT REGISTER BITS | | | |
|---|---|---|---|---|
| | C | S | I | T |
| 0 | 26 | 18 | 10 | 2 |
| 1 | 24 | 16 | 8 | 0 |
| 2 | 27 | 19 | 11 | 3 |
| 3 | 25 | 17 | 9 | 1 |

MEMORY INTERRUPT REGISTER

SET EXECUTE INTERRUPT CELLS COMMAND

INPUT/OUTPUT CONTROLLER

REGISTERS-MEMORY COMMUNICATIONS UNIT

CONTROL BLOCK STARTING ADDRESS ASSIGNMENT SWITCHES

PORT ADDRESS ASSIGNMENT SWITCHES

PORT ADDRESS ASSIGNMENT

| SWITCH SETTINGS $2^{35}$ | $2^{34}$ | $2^{33}$ | MEMORY ADDRESS RANGE (DECIMAL) |
|---|---|---|---|
| 0 | 0 | 0 | 0 −32, 767 |
| 0 | 0 | E | 0 −65, 535 |
| 0 | 0 | 1 | 32,768 −65, 535 |
| 0 | 1 | 0 | 65,536 −98, 303 |
| 0 | 1 | E | 65,536 −131, 071 |
| 0 | 1 | 1 | 98,304 −131, 071 |
| 1 | 0 | 0 | 131,072−163, 839 |
| 1 | 0 | E | 131,072−196, 607 |
| 1 | 0 | 1 | 163,840−196, 607 |
| 1 | 1 | 0 | 196,608 −229, 375 |
| 1 | 1 | E | 196,608−262, 143 |
| 1 | 1 | 1 | 229,376−262, 143 |

REGISTERS—MICROPROGRAM STORAGE UNIT

CONTROL MEMORY SELECTION SWITCH AND CONNECT SIGNAL LOGIC

TIMING FOR CONTROL SIGNAL GENERATION

REGISTERS-PERIPHERAL CHANNEL UNIT

Oct. 28, 1969 J. W. FIGUEROA ET AL 3,475,730

INFORMATION SHIFT APPARATUS IN A COMPUTER SYSTEM

Filed May 27, 1966 207 Sheets-Sheet 28

PERIPHERAL CHANNEL SERVICE REQUEST LOGIC

PERIPHERAL CHANNEL SERVICE REQUEST PRIORITY LOGIC

TIMING DIAGRAM-REQUESTS FROM PERIPHERAL CHANNELS A,B,E,G,K,M & Q

ROUTINE REQUEST FLIP-FLOPS OF F-REGISTER

ROUTINE REQUEST GATES

ROUTINE REQUEST PRIORITY APPARATUS

TIMING DIAGRAM-ROUTINE REQUEST PRIORITY APPARATUS

REGISTERS-BUFFER STORAGE UNIT

REGISTERS-BUFFER STORAGE UNIT

SHIFT APPARATUS

REGISTERS-PROCESSING AND CONTROL UNIT

REGISTERS-PROCESSING AND CONTROL UNIT

REGISTERS-PROCESSING AND CONTROL UNIT

REGISTERS PROCESSING AND CONTROL UNIT

INPUT/OUTPUT PROCESSOR

ADDER

Oct. 28, 1969 J. W. FIGUEROA ET AL 3,475,730

INFORMATION SHIFT APPARATUS IN A COMPUTER SYSTEM

Filed May 27, 1966 207 Sheets-Sheet 45

FULL ADDER CIRCUIT

ZONE CONTROL GATING SIGNALS

Port A

| | | |
|---|---|---|
| DPSA DZ00 | = | DAZ0 |
| DPSA DZ01 | = | DAZ1 |
| DPSA DZ02 | = | DAZ2 |
| DPSA DZ03 | = | DAZ3 |
| DPSA DZ04 | = | DAZ4 |
| DPSA DZ05 | = | DAZ5 |

Port B

| | | |
|---|---|---|
| DPSB DZ00 | = | DBZ0 |
| DPSB DZ01 | = | DBZ1 |
| DPSB DZ02 | = | DBZ2 |
| DPSB DZ03 | = | DBZ3 |
| DPSB DZ04 | = | DBZ4 |
| DPSB DZ05 | = | DBZ5 |

Port C

| | | |
|---|---|---|
| DPSC DZ00 | = | DCZ0 |
| DPSC DZ01 | = | DCZ1 |
| DPSC DZ02 | = | DCZ2 |
| DPSC DZ03 | = | DCZ3 |
| DPSC DZ04 | = | DCZ4 |
| DPSC DZ05 | = | DCZ5 |

Port D

| | | |
|---|---|---|
| DPSD DZ00 | = | DDZ0 |
| DPSD DZ01 | = | DDZ1 |
| DPSD DZ02 | = | DDZ2 |
| DPSD DZ03 | = | DDZ3 |
| DPSD DZ04 | = | DDZ4 |
| DPSD DZ05 | = | DDZ5 |

JUMP ADDRESS (JA) BUS INPUT SIGNALS

| | | |
|---|---|---|
| FSP0 JRET | = | DJA0 |
| FSP1 JRET | = | DJA1 |
| FSP2 JRET | = | DJA2 |
| FSP3 JRET | = | DJA3 |
| FSP4 JRET | = | DJA4 |
| FSP5 JRET | = | DJA5 |
| FSP6 JRET | = | DJA6 |
| FSP7 JRET | = | DJA7 |
| FSP8 JRET | = | DJA8 |
| FSP9 JRET | = | DJA9 |

MEMORY COMMUNICATIONS UNIT

FIG. 38.

PORT SELECT SIGNALS

| | | | | | |
|---|---|---|---|---|---|
| SBSA SCSA SASA | = | DPSA | SBSC SCSC SASC | = | DPSC |
| SBSB SCSB SASB | = | DPSB | SBSD SCSD SASD | = | DPSD |

TRANSMITTER INPUT DATA SIGNALS

| | | | | | |
|---|---|---|---|---|---|
| DBT0 + JU00 | = | DU00 | DBT0 + JU18 | = | DU18 |
| DBT1 + JU01 | = | DU01 | DBT1 + JU19 | = | DU19 |
| DBT2 + JU02 | = | DU02 | DBT2 + JU20 | = | DU20 |
| DBT3 + JU03 | = | DU03 | DBT3 + JU21 | = | DU21 |
| DBT4 + JU04 | = | DU04 | DBT4 + JU22 | = | DU22 |
| DBT5 + JU05 | = | DU05 | DBT5 + JU23 | = | DU23 |
| DBT0 + JU06 | = | DU06 | DBT0 + JU24 | = | DU24 |
| DBT1 + JU07 | = | DU07 | DBT1 + JU25 | = | DU25 |
| DBT2 + JU08 | = | DU08 | DBT2 + JU26 | = | DU26 |
| DBT3 + JU09 | = | DU09 | DBT3 + JU27 | = | DU27 |
| DBT4 + JU10 | = | DU10 | DBT4 + JU28 | = | DU28 |
| DBT5 + JU11 | = | DU11 | DBT5 + JU29 | = | DU29 |
| DBT0 + JU12 | = | DU12 | JU30 | = | DU30 |
| DBT1 + JU13 | = | DU13 | JU31 | = | DU31 |
| DBT2 + JU14 | = | DU14 | JU32 | = | DU32 |
| DBT3 + JU15 | = | DU15 | JE33 | = | DU33 |
| DBT4 + JU16 | = | DU16 | JU34 | = | DU34 |
| DBT5 + JU17 | = | DU17 | JU35 | = | DU35 |

MEMORY COMMUNICATIONS UNIT

FIG. 39.

SIGNALS TRANSMITTED FROM IOC TO MEMORY

Output Data Signals

| Port A | | Port B | |
|---|---|---|---|
| DU00 = RA00 | DU18 = RA18 | DU00 = RB00 | DU18 = RB18 |
| DU01 = RA01 | DU19 = RA19 | DU01 = RB01 | DU19 = RB19 |
| DU02 = RA02 | DU20 = RA20 | DU02 = RB02 | DU20 = RB20 |
| DU03 = RA03 | DU21 = RA21 | DU03 = RB03 | DU21 = RB21 |
| DU04 = RA04 | DU22 = RA22 | DU04 = RB04 | DU22 = RB22 |
| DU05 = RA05 | DU23 = RA23 | DU05 = RB05 | DU23 = RB23 |
| DU06 = RA06 | DU24 = RA24 | DU06 = RB06 | DU24 = RB24 |
| DU07 = RA07 | DU25 = RA25 | DU07 = RB07 | DU25 = RB25 |
| DU08 = RA08 | DU26 = RA26 | DU08 = RB08 | DU26 = RB26 |
| DU09 = RA09 | DU27 = RA27 | DU09 = RB09 | DU27 = RB27 |
| DU10 = RA10 | DU28 = RA28 | DU10 = RB10 | DU28 = RB28 |
| DU11 = RA11 | DU29 = RA29 | DU11 = RB11 | DU29 = RB29 |
| DU12 = RA12 | DU30 = RA30 | DU12 = RB12 | DU30 = RB30 |
| DU13 = RA13 | DU31 = RA31 | DU13 = RB13 | DU31 = RB31 |
| DU14 = RA14 | DU32 = RA32 | DU14 = RB14 | DU32 = RB32 |
| DU15 = RA15 | DU33 = RA33 | DU15 = RB15 | DU33 = RB33 |
| DU16 = RA16 | DU34 = RA34 | DU16 = RB16 | DU34 = RB34 |
| DU17 = RA17 | DU35 = RA35 | DU17 = RB17 | DU35 = RB35 |

*MEMORY COMMUNICATIONS UNIT*

*FIG. 40.*

SIGNALS TRANSMITTED FROM IOC TO MEMORY (Cont.)

Output Data Signals (Cont.)

| Port C | | Port D | |
|---|---|---|---|
| DU00 = RC00 | DU18 = RC18 | DU00 = RD00 | DU18 = RD18 |
| DU01 = RC01 | DU19 = RC19 | DU01 = RD01 | DU19 = RD19 |
| DU02 = RC02 | DU20 = RC20 | DU02 = RD02 | DU20 = RD20 |
| DU03 = RC03 | DU21 = RC21 | DU03 = RD03 | DU21 = RD21 |
| DU04 = RC04 | DU22 = RC22 | DU04 = RD04 | DU22 = RD22 |
| DU05 = RC05 | DU23 = RC23 | DU05 = RD05 | DU23 = RD23 |
| DU06 = RC06 | DU24 = RC24 | DU06 = RD06 | DU24 = RD24 |
| DU07 = RC07 | DU25 = RC25 | DU07 = RD07 | DU25 = RD25 |
| DU08 = RC08 | DU26 = RC26 | DU08 = RD08 | DU26 = RD26 |
| DU09 = RC09 | DU27 = RC27 | DU09 = RD09 | DU27 = RD27 |
| DU10 = RC10 | DU28 = RC28 | DU10 = RD10 | DU28 = RD28 |
| DU11 = RC11 | DU29 = RC29 | DU11 = RD11 | DU29 = RD29 |
| DU12 = RC12 | DU30 = RC30 | DU12 = RD12 | DU30 = RD30 |
| DU13 = RC13 | DU31 = RC31 | DU13 = RD13 | DU31 = RD31 |
| DU14 = RC14 | DU32 = RC32 | DU14 = RD14 | DU32 = RD32 |
| DU15 = RC15 | DU33 = RC33 | DU15 = RD15 | DU33 = RD33 |
| DU16 = RC16 | DU34 = RC34 | DU16 = RD16 | DU34 = RD34 |
| DU17 = RC17 | DU35 = RC35 | DU17 = RD17 | DU35 = RD35 |

MEMORY COMMUNICATIONS UNIT
FIG. 41.

SIGNALS TRANSMITTED FROM IOC TO MEMORY (Cont.)

Memory Address Signals

| Port A | Port B | Port C | Port D |
|---|---|---|---|
| DL33 = RALA | DL33 = RBLA | DL33 = RCLA | DL33 = RDLA |
| JL32 = RALB | JL32 = RBLB | JL32 = RCLB | JL32 = RDLB |
| JL31 = RALC | JL31 = RBLC | JL31 = RCLC | JL31 = RDLC |
| JL30 = RALD | JL30 = RBLD | JL30 = RCLD | JL30 = RDLD |
| DL29 = RALE | DL29 = RBLE | DL29 = RCLE | DL29 = RDLE |
| DL28 = RALF | DL28 = RBLF | DL28 = RCLF | DL28 = RDLF |
| DL27 = RALG | DL27 = RBLG | DL27 = RCLG | DL27 = RDLG |
| DL26 = RALH | DL26 = RBLH | DL26 = RCLH | DL26 = RDLH |
| JL25 = RALJ | JL25 = RBLJ | JL25 = RCLJ | JL25 = RDLJ |
| JL24 = RALK | JL24 = RBLK | JL24 = RCLK | JL24 = RDLK |
| JL23 = RALL | JL23 = RBLL | JL23 = RCLL | JL23 = RDLL |
| JL22 = RALM | JL22 = RBLM | JL22 = RCLM | JL22 = RDLM |
| JL21 = RALN | JL21 = RBLN | JL21 = RCLN | JL21 = RDLN |
| JL20 = RALP | JL20 = RBLP | JL20 = RCLP | JL20 = RDLP |
| JL19 = RALQ | JL19 = RBLQ | JL19 = RCLQ | JL19 = RDLQ |
| JL18 = RALR | JL18 = RBLR | JL18 = RCLR | JL18 = RDLR |
| DL34 = RALS | DL34 = RBLS | DL34 = RCLS | DL34 = RDLS |
| DL35 = RALT | DL35 = RBLT | DL35 = RCLT | DL35 = RDLT |

MEMORY COMMUNICATIONS UNIT

FIG. 42.

SIGNALS TRANSMITTED FROM IOC TO MEMORY (Cont.)

Zone Control Signals

| Port A | Port B | Port C | Port D |
|---|---|---|---|
| DZC1 = RAL1 | DZC1 = RBL1 | DZC1 = RCL1 | DZC1 = RDL1 |
| DZC4 = RAL4 | DZC4 = RBL4 | DZC4 = RCL4 | DZC4 = RDL4 |
| DZC0 = RAZ0 | DZC0 = RBZ0 | DZC0 = RCZ0 | DZC0 = RDZ0 |
| DZC1 = RAZ1 | DZC1 = RBZ1 | DZC1 = RCZ1 | DZC1 = RDZ1 |
| DZC2 = RAZ2 | DZC2 = RBZ2 | DZC2 = RCZ2 | DZC2 = RDZ2 |
| DZC3 = RAZ3 | DZC3 = RBZ3 | DZC3 = RCZ3 | DZC3 = RDZ3 |
| DZC4 = RAZ4 | DZC4 = RBZ4 | DZC4 = RCZ4 | DZC4 = RDZ4 |
| DZC5 = RAZ5 | DZC5 = RBZ5 | DZC5 = RCZ5 | DZC5 = RDZ5 |

Memory Command Signals

| Port A | Port B | Port C | Port D |
|---|---|---|---|
| JL12 = RACA | JL12 = RBCA | JL12 = RCCA | JL12 = RDCA |
| JL14 = RACB | JL14 = RBCB | JL14 = RCCB | JL14 = RDCB |
| JL13 = RACC | JL13 = RBCC | JL13 = RCCC | JL13 = RDCC |
| JL11 = RACD | JL11 = RBCD | JL11 = RCCD | JL11 = RDCD |

Memory Protect Signals

| Port A | Port B | Port C | Port D |
|---|---|---|---|
| VP06 = RAPR | VP06 = RBPR | VP06 = RCPR | VP06 = RDPR |

*MEMORY COMMUNICATIONS UNIT*

*FIG. 43.*

SIGNALS TRANSMITTED FROM IOC TO MEMORY (Cont.)

Memory Access Interrupt Request Signals

| Port A | Port B | Port C | Port D |
|---|---|---|---|
| DPSA DL09 = RAL9 | DPSB DL09 = RBL9 | DPSC DL09 = RCL9 | DPSD DL09 = RDL9 |

SIGNALS TRANSMITTED FROM MEMORY TO IOC

Input Data Signals

DAZ5 JA00 + DBZ5 JB00 + DCZ5 JC00 + DDZ5 JD00 + DFLA DL10 = DM00

DAZ5 JA01 + DBZ5 JB01 + DCZ5 JC01 + DDZ5 JD01 + DFLB DL10 = DM01

DAZ5 JA02 + DBZ5 JB02 + DCZ5 JC02 + DDZ5 JD02 + DFLC DL10 = DM02

DAZ5 JA03 + DBZ5 JB03 + DCZ5 JC03 + DDZ5 JD03 + DFLD DL10 = DM03

DAZ5 JA04 + DBZ5 JB04 + DCZ5 JC04 + DDZ5 JD04 + DFLE DL10 = DM04

DAZ5 JA05 + DBZ5 JB05 + DCZ5 JC05 + DDZ5 JD05 + DFLF DL10 = DM05

DAZ4 JA06 + DBZ4 JB06 + DCZ4 JC06 + DDZ4 JD06 = DM06

DAZ4 JA07 + DBZ4 JB07 + DCZ4 JC07 + DDZ4 JD07 = DM07

DAZ4 JA08 + DBZ4 JB08 + DCZ4 JC08 + DDZ4 JD08 = DM08

DAZ4 JA09 + DBZ4 JB09 + DCZ4 JC09 + DDZ4 JD09 = DM09

DAZ4 JA10 + DBZ4 JB10 + DCZ4 JC10 + DDZ4 JD10 = DM10

DAZ4 JA11 + DBZ4 JB11 + DCZ4 JC11 + DDZ4 JD11 = DM11

DAZ3 JA12 + DBZ3 JB12 + DCZ3 JC12 + DDZ3 JD12 = DM12

DAZ3 JA13 + DBZ3 JB13 + DCZ3 JC13 + DDZ3 JD13 = DM13

DAZ3 JA14 + DBZ3 JB14 + DCZ3 JC14 + DDZ3 JD14 = DM14

DAZ3 JA15 + DBZ3 JB15 + DCZ3 JC15 + DDZ3 JD15 = DM15

DAZ3 JA16 + DBZ3 JB16 + DCZ3 JC16 + DDZ3 JD16 = DM16

DAZ3 JA17 + DBZ3 JB17 + DCZ3 JC17 + DDZ3 JD17 = DM17

*MEMORY COMMUNICATIONS UNIT*

*FIG.44.*

SIGNALS TRANSMITTED FROM MEMORY TO IOC (Cont.)

Input Data Signals (Cont.)

| | |
|---|---|
| DAZ2 JA18 + DBZ2 JB18 + DCZ2 JC18 + DDZ2 JD18 | = DM18 |
| DAZ2 JA19 + DBZ2 JB19 + DCZ2 JC19 + DDZ2 JD19 | = DM19 |
| DAZ2 JA20 + DBZ2 JB20 + DCZ2 JC20 + DDZ2 JD20 | = DM20 |
| DAZ2 JA21 + DBZ2 JB21 + DCZ2 JC21 + DDZ2 JD21 | = DM21 |
| DAZ2 JA22 + DBZ2 JB22 + DCZ2 JC22 + DDZ2 JD22 | = DM22 |
| DAZ2 JA23 + DBZ2 JB23 + DCZ2 JC23 + DDZ2 JD23 | = DM23 |
| DAZ1 JA24 + DBZ1 JB24 + DCZ1 JC24 + DDZ1 JD24 | = DM24 |
| DAZ1 JA25 + DBZ1 JB25 + DCZ1 JC25 + DDZ1 JD25 | = DM25 |
| DAZ1 JA26 + DBZ1 JB26 + DCZ1 JC26 + DDZ1 JD26 | = DM26 |
| DAZ1 JA27 + DBZ1 JB27 + DCZ1 JC27 + DDZ1 JD27 | = DM27 |
| DAZ1 JA28 + DBZ1 JB28 + DCZ1 JC28 + DDZ1 JD28 | = DM28 |
| DAZ1 JA29 + DBZ1 JB29 + DCZ1 JC29 + DDZ1 JD29 | = DM29 |
| DAZ0 JA30 + DBZ0 JB30 + DCZ0 JC30 + DDZ0 JD30 | = DM30 |
| DAZ0 JA31 + DBZ0 JB31 + DCZ0 JC31 + DDZ0 JD31 | = DM31 |
| DAZ0 JA32 + DBZ0 JB32 + DCZ0 JC32 + DDZ0 JD32 | = DM32 |
| DAZ0 JA33 + DBZ0 JB33 + DCZ0 JC33 + DDZ0 JD33 | = DM33 |
| DAZ0 JA34 + DBZ0 JB34 + DCZ0 JC34 + DDZ0 JD34 | = DM34 |
| DAZ0 JA35 + DBZ0 JB35 + DCZ0 JC35 + DDZ0 JD35 | = DM35 |

Illegal Action Code Signals

| | |
|---|---|
| JAAC DPSA + JBAC DPSB + JCAC DPSC + JDAC DPSD + JEMT $\overline{\text{FMDN}}$ | = DM37 |
| JAAB DPSA + JBAB DPSB + JCAB DPSC + JDAB DPSD + JEMT $\overline{\text{FMDN}}$ | = DM38 |
| JAAA DPSA + JBAA DPSB + JCAA DPSC + JDAA DPSD + JEMT $\overline{\text{FMDN}}$ | = DM39 |

*MEMORY COMMUNICATIONS UNIT*

*FIG.45.*

SIGNALS TRANSMITTED FROM MEMORY TO IOC (Cont.)

Illegal Action Signals

| Port A | Port B | Port C | Port D |
|---|---|---|---|
| JAAS = RAAS | JBAS = RBAS | JCAS = RCAS | JDAS = RDAS |

Connect Signals

| Port A | Port B | Port C | Port D |
|---|---|---|---|
| JACS = RACS | JBCS = RBCS | JCCS = RCCS | JDCS = RDCS |

Data Available/Stored Signals

| Port A | Port B | Port C | Port D |
|---|---|---|---|
| JADS = RADS | JBDS = RBDS | JCDS = RCDS | JDDS = RDDS |

MISCELLANEOUS LOGICAL COMBINATION SIGNALS

| | |
|---|---|
| JSWM DPET | = DADR |
| TAAS + TBAS | = DAS2 |
| TCAS + TDAS + JSMR | = DAS4 |
| FBA2 $\overline{\text{FBA1}}$ + $\overline{\text{FBA2}}$ FBA1 | = DBA2 |
| FBA3 ($\overline{\text{FBA1}}$ + $\overline{\text{FBA2}}$) + $\overline{\text{FBA3}}$ FBA1 FBA2 | = DBA3 |
| FBA4 ($\overline{\text{FBA1}}$ + $\overline{\text{FBA2}}$ + $\overline{\text{FBA3}}$) + $\overline{\text{FBA4}}$ FBA1 FBA2 FBA3 | = DBA4 |

MEMORY COMMUNICATIONS UNIT

FIG. 46.

MISCELLANEOUS LOGICAL COMBINATION SIGNALS (Cont.)

| | |
|---|---|
| FBA5 $\overline{\text{DBC4}}$ + $\overline{\text{FBA5}}$ DBC4 | = DBA5 |
| FBA6 ($\overline{\text{DBC4}}$ + $\overline{\text{FBA5}}$) + $\overline{\text{FBA6}}$ DBC4 FBA5 | = DBA6 |
| FBA7 ($\overline{\text{DBC4}}$ + $\overline{\text{FBA5}}$ + $\overline{\text{FBA6}}$) + $\overline{\text{FBA7}}$ DBC4 FBA5 FBA6 | = DBA7 |
| FBA8 ($\overline{\text{DBC4}}$ + $\overline{\text{FBA5}}$ + $\overline{\text{FBA6}}$ + $\overline{\text{FBA7}}$) + DBC4 FBA5 FBA6 FBA7 $\overline{\text{FBA8}}$ | = DBA8 |
| FBA9 ($\overline{\text{DBC4}}$ + $\overline{\text{FBA5}}$ + $\overline{\text{FBA6}}$ + $\overline{\text{FBA7}}$ + $\overline{\text{FBA8}}$) + $\overline{\text{FBA9}}$ DBC4 FBA5 FBA6 FBA7 FBA8 | = DBA9 |
| FBA1 FBA2 FBA3 FBA4 | = DBC4 |
| DL10 JU30 | = DBT0 |
| DL10 JU31 | = DBT1 |
| DL10 JU32 | = DBT2 |
| DL10 JU33 | = DBT3 |
| DL10 JU34 | = DBT4 |
| DL10 JU35 | = DBT5 |
| $\overline{\text{FJMP}}$ $\overline{\text{FBA0}}$ FPCO | = DBTP |
| FCNA + FCNB | = DCNT |
| SCSA | = DCSA |
| SCSB | = DCSB |
| SCSC | = DCSC |
| SCSD | = DCSD |
| TADS + TBDS + TCDS | = DDSA |
| TDDS + JSMR | = DDSB |
| DDSA + DDSB | = DDSC |
| DM30 + DM24 + DM18 + DM12 + DM06 | = DFLA |
| DM31 + DM25 + DM19 + DM13 + DM07 | = DFLB |
| DM32 + DM26 + DM20 + DM14 + DM08 | = DFLC |

MEMORY COMMUNICATIONS UNIT

FIG. 47

MISCELLANEOUS LOGICAL COMBINATION SIGNALS (Cont.)

DM33 + DM27 + DM21 + DM15 + DM09 = DFLD

DM34 + DM28 + DM22 + DM16 + DM10 = DFLE

DM35 + DM29 + DM23 + DM17 + DM11 = DFLF

TRAS $\overline{\text{FMDN}}$ = DL09

JL10 = DL10

$\overline{\text{JUSM}}$ JL26 + DUSM SL26 = DL26

$\overline{\text{JUSM}}$ JL27 + DUSM SL27 = DL27

$\overline{\text{JUSM}}$ JL28 + DUSM SL28 = DL28

$\overline{\text{JUSM}}$ JL29 + DUSM SL29 = DL29

JL33 = DL33

JL34 = DL34

JL35 = DL35

JSJA = DLBA

JSJA = DLPC

SMLP + FCLP = DLPP

JSWM $\overline{\text{FPC0}}$ = DMAA

JSWM FPC0 = DMAB

DMLS = DMLT $\overline{\text{SAS9}}$ FPC9 + SAS9 $\overline{\text{FPC9}}$ + $\overline{\text{SAS8}}$ FPC8 + SAS8 $\overline{\text{FPC8}}$ + $\overline{\text{SAS7}}$ FPC7
+ SAS7 $\overline{\text{FPC7}}$ + $\overline{\text{SAS6}}$ FPC6 + SAS6 $\overline{\text{FPC6}}$ + $\overline{\text{SAS5}}$ FPC5 + SAS5 $\overline{\text{FPC5}}$
+ $\overline{\text{SAS4}}$ FPC4 + SAS4 $\overline{\text{FPC4}}$ + $\overline{\text{SAS3}}$ FPC3 + SAS3 $\overline{\text{FPC3}}$ + $\overline{\text{SAS2}}$ FPC2
+ SAS2 $\overline{\text{FPC2}}$ + $\overline{\text{SAS1}}$ FPC1 + SAS1 $\overline{\text{FPC1}}$ + $\overline{\text{SAS0}}$ FPC0 + SAS0 $\overline{\text{FPC0}}$ = $\overline{\text{DPET}}$

FMAN + FML1 + FML2 + FRST = DPRV

DAS2 + DAS4 = DQRE

TRAS = DRAS

SRES = DRES

MEMORY COMMUNICATIONS UNIT

FIG.48.

MISCELLANEOUS LOGICAL COMBINATION SIGNALS (Cont.)

| | |
|---|---|
| DDSC | = DSQR |
| $\overline{\text{FPRN}}$ FRUN | = DSTP |
| $\overline{\text{FREP}}$ JSTM | = DUPD |
| $\overline{\text{JL15}}$ $\overline{\text{JL16}}$ $\overline{\text{JL17}}$ | = DZ00 |
| JL15 $\overline{\text{JL16}}$ $\overline{\text{JL17}}$ | = DZ01 |
| JL16 $\overline{\text{JL15}}$ $\overline{\text{JL17}}$ | = DZ02 |
| JL16 JL15 $\overline{\text{JL17}}$ | = DZ03 |
| JL17 $\overline{\text{JL16}}$ $\overline{\text{JL15}}$ | = DZ04 |
| JL17 JL15 $\overline{\text{JL16}}$ + JL16 JL17 | = DZ05 |
| DL10 + DZ00 | = DZC0 |
| DL10 + DZ01 | = DZC1 |
| DL10 + DZ02 | = DZC2 |
| DL10 + DZ03 | = DZC3 |
| DL10 + DZ04 | = DZC4 |
| DL10 + DZ05 | = DZC5 |

FLIP-FLOP INPUT LOGICAL SCHEMATIC DIAGRAMS

BA-Register

DLBA DJA0 + FPC0 DUPD = $\overline{\text{FBA0}}$

DLBA $\overline{\text{DJA0}}$ + $\overline{\text{FPC0}}$ DUPD = FBA0

DLBA $\overline{\text{DJA1}}$ + $\overline{\text{FPC1}}$ DUPD = $\overline{\text{FBA1}}$

DLBA DJA1 + FPC1 DUPD = FBA1

$\overline{\text{DLBA}}$ $\overline{\text{DJA2}}$ + $\overline{\text{FPC2}}$ DUPD = $\overline{\text{FBA2}}$

DLBA DJA2 + FPC2 DUPD = FBA2

DLBA $\overline{\text{DJA3}}$ + $\overline{\text{FPC3}}$ DUPD = $\overline{\text{FBA3}}$

DLBA DJA3 + FPC3 DUPD = FBA3

DLBA $\overline{\text{DJA4}}$ + $\overline{\text{FPC4}}$ DUPD = $\overline{\text{FBA4}}$

DLBA DJA4 + FPC4 DUPD = FBA4

DLBA $\overline{\text{DJA5}}$ + $\overline{\text{FPC5}}$ DUPD = $\overline{\text{FBA5}}$

DLBA DJA5 + FPC5 DUPD = FBA5

MEMORY COMMUNICATIONS UNIT

FIG. 49.

FLIP-FLOP INPUT LOGICAL SCHEMATIC DIAGRAMS (Cont.)

BA-Register (Cont.)

DLBA $\overline{DJA6}$ + $\overline{FPC6}$ DUPD = $\overline{FBA6}$

DLBA DJA6 + FPC6 DUPD = FBA6

DLBA $\overline{DJA7}$ + $\overline{FPC7}$ DUPD = $\overline{FBA7}$

DLBA DJA7 + FPC7 DUPD = FBA7

DLBA $\overline{DJA8}$ + $\overline{FPC8}$ DUPD = $\overline{FBA8}$

DLBA DJA8 + FPC8 DUPD = FBA8

DLBA $\overline{DJA9}$ + $\overline{FPC9}$ DUPD = $\overline{FBA9}$

DLBA DJA9 + FPC9 DUPD = FBA9

PC-Register

DLPC $\overline{DJA0}$ + DBTP $\overline{DRES}$ = $\overline{FPC0}$

DLPC DJA0 + $\overline{FPC0}$ FBA0 $\overline{FJMP}$ $\overline{DRES}$ = FPC0

DLPC $\overline{DJA1}$ + FBA1 DBTP = $\overline{FPC1}$

DLPC DJA1 + $\overline{FBA1}$ DBTP = FPC1

DLPC $\overline{DJA2}$ + $\overline{DBA2}$ DBTP = $\overline{FPC2}$

DLPC DJA2 + DBA2 DBTP = FPC2

DLPC $\overline{DJA3}$ + $\overline{DBA3}$ DBTP = $\overline{FPC3}$

DLPC DJA3 + DBA3 DBTP = FPC3

DLPC $\overline{DJA4}$ + $\overline{DBA4}$ DBTP = $\overline{FPC4}$

DLPC DJA4 + DBA4 DBTP = FPC4

DLPC $\overline{DJA5}$ + $\overline{DBA5}$ DBTP = $\overline{FPC5}$

DLPC DJA5 + DBA5 DBTP = FPC5

DLPC $\overline{DJA6}$ + $\overline{DBA6}$ DBTP = $\overline{FPC6}$

DLPC DJA6 + DBA6 DBTP = FPC6

DLPC $\overline{DJA7}$ + $\overline{DBA7}$ DBTP = $\overline{FPC7}$

DLPC DJA7 + DBA7 DBTP = FPC7

*MEMORY COMMUNICATIONS UNIT*

*FIG. 50.*

FLIP-FLOP INPUT LOGICAL SCHEMATIC DIAGRAMS (Cont.)

PC-Register (Cont.)

DLPC $\overline{\text{DJA8}}$ + $\overline{\text{DBA8}}$ DBTP = $\overline{\text{FPC8}}$

DLPC DJA8 + DBA8 DBTP = FPC8

DLPC $\overline{\text{DJA9}}$ + $\overline{\text{DBA9}}$ DBTP = $\overline{\text{FPC9}}$

DLPC DJA9 + DBA9 DBTP = FPC9

SP-Register

| | | | |
|---|---|---|---|
| FBA0 JSPC | = $\overline{\text{FSP0}}$ | $\overline{\text{FBA5}}$ JSPC | = $\overline{\text{FSP5}}$ |
| $\overline{\text{FBA0}}$ JSPC | = FSP0 | FBA5 JSPC | = FSP5 |
| $\overline{\text{FBA1}}$ JSPC | = $\overline{\text{FSP1}}$ | $\overline{\text{FBA6}}$ JSPC | = $\overline{\text{FSP6}}$ |
| FBA1 JSPC | = FSP1 | FBA6 JSPC | = FSP6 |
| $\overline{\text{FBA2}}$ JSPC | = $\overline{\text{FSP2}}$ | $\overline{\text{FBA7}}$ JSPC | = $\overline{\text{FSP7}}$ |
| FBA2 JSPC | = FSP2 | FBA7 JSPC | = FSP7 |
| $\overline{\text{FBA3}}$ JSPC | = $\overline{\text{FSP3}}$ | $\overline{\text{FBA8}}$ JSPC | = $\overline{\text{FSP8}}$ |
| FBA3 JSPC | = FSP3 | FBA8 JSPC | = FSP8 |
| $\overline{\text{FBA4}}$ JSPC | = $\overline{\text{FSP4}}$ | $\overline{\text{FBA9}}$ JSPC | = $\overline{\text{FSP9}}$ |
| FBA4 JSPC | = FSP4 | FBA9 JSPC | = FSP9 |

Miscellaneous Control Flip-Flops

SRES + $\overline{\text{DPET}}$ JSWM = $\overline{\text{FCLP}}$

DPET FCYC JSTM = FCLP

SRES + JRCN = $\overline{\text{FCNA}}$

RACS DCSA + DCSB RBCS = FCNA

MEMORY COMMUNICATIONS UNIT

FIG.51.

FLIP-FLOP INPUT LOGICAL SCHEMATIC DIAGRAMS (Cont.)

Miscellaneous Control Flip-Flops (Cont.)

| | | |
|---|---|---|
| SRES + JRCN | = | $\overline{\text{FCNB}}$ |
| RCCS DCSC + DCSD RDCS | = | FCNB |
| JSTM + JSWM | = | $\overline{\text{FJMP}}$ |
| JSJA | = | FJMP |
| JSTR FRUN + (JSWM DPET FASP + DRES) | = | $\overline{\text{FPRN}}$ |
| $\overline{\text{FRUN}}$ $\overline{\text{FSCM}}$ JSTR | = | FPRN |
| $\overline{\text{FRST}}$ + FPC8 FPC7 FPC6 FPC5 FPC4 FPC3 FPC2 DUPD | = | $\overline{\text{FRST}}$ |
| FRST + DRES | = | FRST |
| DSTP + SRES | = | $\overline{\text{FRUN}}$ |
| $\overline{\text{FRUN}}$ FPRN | = | FRUN |

ONE-SHOT INPUT LOGICAL SCHEMATIC DIAGRAMS

| | | | | | |
|---|---|---|---|---|---|
| RAAS | = | TAAS | RCDS | = | TCDS |
| RADS | = | TADS | RDAS | = | TDAS |
| RBAS | = | TBAS | RDDS | = | TDDS |
| RBDS | = | TBDS | JL09 | = | TL09 |
| RCAS | = | TCAS | TL09 | = | TRAS |

MEMORY COMMUNICATIONS UNIT
FIG52.

MICROSTEP ADDRESS SIGNALS

| | | | | | |
|---|---|---|---|---|---|
| DC00 DD00 | = | D000 | | | |
| DE00 DF00 | = | D001 | DE00 DF12 | = | D031 |
| DC00 DD01 | = | D002 | DC00 DD13 | = | D032 |
| DE00 DF01 | = | D003 | DE00 DF13 | = | D033 |
| DC00 DD02 | = | D004 | DC00 DD14 | = | D034 |
| DE00 DF02 | = | D005 | DE00 DF14 | = | D035 |
| DC00 DD03 | = | D006 | DC00 DD15 | = | D036 |
| DE00 DF03 | = | D007 | DE00 DF15 | = | D037 |
| DC00 DD04 | = | D010 | DC01 DD00 | = | D040 |
| DE00 DF04 | = | D011 | DE01 DF00 | = | D041 |
| DC00 DD05 | = | D012 | DC01 DD01 | = | D042 |
| DE00 DF05 | = | D013 | DE01 DF01 | = | D043 |
| DC00 DD06 | = | D014 | DC01 DD02 | = | D044 |
| DE00 DF06 | = | D015 | DE01 DF02 | = | D045 |
| DC00 DD07 | = | D016 | DC01 DD03 | = | D046 |
| DE00 DF07 | = | D017 | DE01 DF03 | = | D047 |
| DC00 DD08 | = | D020 | DC01 DD04 | = | D050 |
| DE00 DF08 | = | D021 | DE01 DF04 | = | D051 |
| DC00 DD09 | = | D022 | DC01 DD05 | = | D052 |
| DE00 DF09 | = | D023 | DE01 DF05 | = | D053 |
| DC00 DD10 | = | D024 | DC01 DD06 | = | D054 |
| DE00 DF10 | = | D025 | DE01 DF06 | = | D055 |
| DC00 DD11 | = | D026 | DC01 DD07 | = | D056 |
| DE00 DF11 | = | D027 | DE01 DF07 | = | D057 |
| DC00 DD12 | = | D030 | DC01 DD08 | = | D060 |

*MICROPROGRAM STORAGE UNIT*

*FIG.53.*

MICROSTEP ADDRESS SIGNALS (Cont.)

| | | | | | |
|---|---|---|---|---|---|
| DE01 DF08 | = | D061 | DE02 DF04 | = | D111 |
| DC01 DD09 | = | D062 | DC02 DD05 | = | D112 |
| DE01 DF09 | = | D063 | DE02 DF05 | = | D113 |
| DC01 DD10 | = | D064 | DC02 DD06 | = | D114 |
| DE01 DF10 | = | D065 | DE02 DF06 | = | D115 |
| DC01 DD11 | = | D066 | DC02 DD07 | = | D116 |
| DE01 DF11 | = | D067 | DE02 DF07 | = | D117 |
| DC01 DD12 | = | D070 | DC02 DD08 | = | D120 |
| DE01 DF12 | = | D071 | DE02 DF08 | = | D121 |
| DC01 DD13 | = | D072 | DC02 DD09 | = | D122 |
| DE01 DF13 | = | D073 | DE02 DF09 | = | D123 |
| DC01 DD14 | = | D074 | DC02 DD10 | = | D124 |
| DE01 DF14 | = | D075 | DE02 DF10 | = | D125 |
| DC01 DD15 | = | D076 | DC02 DD11 | = | D126 |
| DE01 DF15 | = | D077 | DE02 DF11 | = | D127 |
| DC02 DD00 | = | D100 | DC02 DD12 | = | D130 |
| DE02 DF00 | = | D101 | DE02 DF12 | = | D131 |
| DC02 DD01 | = | D102 | DC02 DD13 | = | D132 |
| DE02 DF01 | = | D103 | DE02 DF13 | = | D133 |
| DC02 DD02 | = | D104 | DC02 DD14 | = | D134 |
| DE02 DF02 | = | D105 | DE02 DF14 | = | D135 |
| DC02 DD03 | = | D106 | DC02 DD15 | = | D136 |
| DE02 DF03 | = | D107 | DE02 DF15 | = | D137 |
| DC02 DD04 | = | D110 | DC03 DD00 | = | D140 |

MICROPROGRAM STORAGE UNIT
FIG.54.

MICROSTEP ADDRESS SIGNALS (Cont.)

| | | | | | |
|---|---|---|---|---|---|
| DE03 DF00 | = | D141 | DE03 DF12 | = | D171 |
| DC03 DD01 | = | D142 | DC03 DD13 | = | D172 |
| DE03 DF01 | = | D143 | DE03 DF13 | = | D173 |
| DC03 DD02 | = | D144 | DC03 DD14 | = | D174 |
| DE03 DF02 | = | D145 | DE03 DF14 | = | D175 |
| DC03 DD03 | = | D146 | DC03 DD15 | = | D176 |
| DE03 DF03 | = | D147 | DE03 DF15 | = | D177 |
| DC03 DDC4 | = | D150 | DC04 DD00 | = | D200 |
| DE03 DF04 | = | D151 | DE04 DF00 | = | D201 |
| DC03 DD05 | = | D152 | DC04 DD01 | = | D202 |
| DE03 DF05 | = | D153 | DE04 DF01 | = | D203 |
| DC03 DD06 | = | D154 | DC04 DD02 | = | D204 |
| DE03 DF06 | = | D155 | DE04 DF02 | = | D205 |
| DC03 DD07 | = | D156 | DC04 DD03 | = | D206 |
| DE03 DF07 | = | D157 | DE04 DF03 | = | D207 |
| DC03 DD08 | = | D160 | DC04 DD04 | = | D210 |
| DE03 DF08 | = | D161 | DE04 DF04 | = | D211 |
| DC03 DD09 | = | D162 | DC04 DD05 | = | D212 |
| DE03 DF09 | = | D163 | DE04 DF05 | = | D213 |
| DC03 DD10 | = | D164 | DC04 DD06 | = | D214 |
| DE03 DF10 | = | D165 | DE04 DF06 | = | D215 |
| DC03 DD11 | = | D166 | DC04 DD07 | = | D216 |
| DE03 DF11 | = | D167 | DE04 DF07 | = | D217 |
| DC03 DD12 | = | D170 | DC04 DD08 | = | D220 |

MICROPROGRAM STORAGE UNIT

FIG. 55.

MICROSTEP ADDRESS SIGNALS (Cont.)

| | | | | | |
|---|---|---|---|---|---|
| DE04 DF08 | = | D221 | DE05 DF04 | = | D251 |
| DC04 DD09 | = | D222 | DC05 DD05 | = | D252 |
| DE04 DF09 | = | D223 | DE05 DF05 | = | D253 |
| DC04 DD10 | = | D224 | DC05 DD06 | = | D254 |
| DE04 DF10 | = | D225 | DE05 DF06 | = | D255 |
| DC04 DD11 | = | D226 | DC05 DD07 | = | D256 |
| DE04 DF11 | = | D227 | DE05 DF07 | = | D257 |
| DC04 DD12 | = | D230 | DC05 DD08 | = | D260 |
| DE04 DF12 | = | D231 | DE05 DF08 | = | D261 |
| DC04 DD13 | = | D232 | DC05 DD09 | = | D262 |
| DE04 DF13 | = | D233 | DE05 DF09 | = | D263 |
| DC04 DD14 | = | D234 | DC05 DD10 | = | D264 |
| DE04 DF14 | = | D235 | DE05 DF10 | = | D265 |
| DC04 DD15 | = | D236 | DC05 DD11 | = | D266 |
| DE04 DF15 | = | D237 | DE05 DF11 | = | D267 |
| DC05 DD00 | = | D240 | DC05 DD12 | = | D270 |
| DE05 DF00 | = | D241 | DE05 DF12 | = | D271 |
| DC05 DD01 | = | D242 | DC05 DD13 | = | D272 |
| DE05 DF01 | = | D243 | DE05 DF13 | = | D273 |
| DC05 DD02 | = | D244 | DC05 DD14 | = | D274 |
| DE05 DF02 | = | D245 | DE05 DF14 | = | D275 |
| DC05 DD03 | = | D246 | DC05 DD15 | = | D276 |
| DE05 DF03 | = | D247 | DE05 DF15 | = | D277 |
| DC05 DD04 | = | D250 | DC06 DD00 | = | D300 |

MICROPROGRAM STORAGE UNIT

FIG.56.

MICROSTEP ADDRESS SIGNALS (Cont.)

| | | | | | |
|---|---|---|---|---|---|
| DE06 DF00 | = | D301 | DE06 DF12 | = | D331 |
| DC06 DD01 | = | D302 | DC06 DD13 | = | D332 |
| DE06 DF01 | = | D303 | DE06 DF13 | = | D333 |
| DC06 DD02 | = | D304 | DC06 DD14 | = | D334 |
| DE06 DF02 | = | D305 | DE06 DF14 | = | D335 |
| DC06 DD03 | = | D306 | DC06 DD15 | = | D336 |
| DE06 DF03 | = | D307 | DE06 DF15 | = | D337 |
| DC06 DD04 | = | D310 | DC07 DD00 | = | D340 |
| DE06 DF04 | = | D311 | DE07 DF00 | = | D341 |
| DC06 DD05 | = | D312 | DC07 DD01 | = | D342 |
| DE06 DF05 | = | D313 | DE07 DF01 | = | D343 |
| DC06 DD06 | = | D314 | DC07 DD02 | = | D344 |
| DE06 DF06 | = | D315 | DE07 DF02 | = | D345 |
| DC06 DD07 | = | D316 | DC07 DD03 | = | D346 |
| DE06 DF07 | = | D317 | DE07 DF03 | = | D347 |
| DC06 DD08 | = | D320 | DC07 DD04 | = | D350 |
| DE06 DF08 | = | D321 | DE07 DF04 | = | D351 |
| DC06 DD09 | = | D322 | DC07 DD05 | = | D352 |
| DE06 DF09 | = | D323 | DE07 DF05 | = | D353 |
| DC06 DD10 | = | D324 | DC07 DD06 | = | D354 |
| DE06 DF10 | = | D325 | DE07 DF06 | = | D355 |
| DC06 DD11 | = | D326 | DC07 DD07 | = | D356 |
| DE06 DF11 | = | D327 | DE07 DF07 | = | D357 |
| DC06 DD12 | = | D330 | DC07 DD08 | = | D360 |

MICROPROGRAM STORAGE UNIT
FIG.57.

MICROSTEP ADDRESS SIGNALS (Cont.)

| | | | |
|---|---|---|---|
| DE07 DF08 | = D361 | DE08 DF04 | = D411 |
| DC07 DD09 | = D362 | DC08 DD05 | = D412 |
| DE07 DF09 | = D363 | DE08 DF05 | = D413 |
| DC07 DD10 | = D364 | DC08 DD06 | = D414 |
| DE07 DF10 | = D365 | DE08 DF06 | = D415 |
| DC07 DD11 | = D366 | DC08 DD07 | = D416 |
| DE07 DF11 | = D367 | DE08 DF07 | = D417 |
| DC07 DD12 | = D370 | DC08 DD08 | = D420 |
| DE07 DF12 | = D371 | DE08 DF08 | = D421 |
| DC07 DD13 | = D372 | DC08 DD09 | = D422 |
| DE07 DF13 | = D373 | DE08 DF09 | = D423 |
| DC07 DD14 | = D374 | DC08 DD10 | = D424 |
| DE07 DF14 | = D375 | DE08 DF10 | = D425 |
| DC07 DD15 | = D376 | DC08 DD11 | = D426 |
| DE07 DF15 | = D377 | DE08 DF11 | = D427 |
| DC08 DD00 | = D400 | DC08 DD12 | = D430 |
| DE08 DF00 | = D401 | DE08 DF12 | = D431 |
| DC08 DD01 | = D402 | DC08 DD13 | = D432 |
| DE08 DF01 | = D403 | DE08 DF13 | = D433 |
| DC08 DD02 | = D404 | DC08 DD14 | = D434 |
| DE08 DF02 | = D405 | DE08 DF14 | = D435 |
| DC08 DD03 | = D406 | DC08 DD15 | = D436 |
| DE08 DF03 | = D407 | DE08 DF15 | = D437 |
| DC08 DD04 | = D410 | DC09 DD00 | = D440 |

MICROPROGRAM STORAGE UNIT

FIG.58.

MICROSTEP ADDRESS SIGNALS (Cont.)

| | | | | | |
|---|---|---|---|---|---|
| DE09 DF00 | = | D441 | DE09 DF12 | = | D471 |
| DC09 DD01 | = | D442 | DC09 DD13 | = | D472 |
| DE09 DF01 | = | D443 | DE09 DF13 | = | D473 |
| DC09 DD02 | = | D444 | DC09 DD14 | = | D474 |
| DE09 DF02 | = | D445 | DE09 DF14 | = | D475 |
| DC09 DD03 | = | D446 | DC09 DD15 | = | D476 |
| DE09 DF03 | = | D447 | DE09 DF15 | = | D477 |
| DC09 DD04 | = | D450 | DC10 DD00 | = | D500 |
| DE09 DF04 | = | D451 | DE10 DF00 | = | D501 |
| DC09 DD05 | = | D452 | DC10 DD01 | = | D502 |
| DE09 DF05 | = | D453 | DE10 DF01 | = | D503 |
| DC09 DD06 | = | D454 | DC10 DD02 | = | D504 |
| DE09 DF06 | = | D455 | DE10 DF02 | = | D505 |
| DC09 DD07 | = | D456 | DC10 DD03 | = | D506 |
| DE09 DF07 | = | D457 | DE10 DF03 | = | D507 |
| DC09 DD08 | = | D460 | DC10 DD04 | = | D510 |
| DE09 DF08 | = | D461 | DE10 DF04 | = | D511 |
| DC09 DD09 | = | D462 | DC10 DD05 | = | D512 |
| DE09 DF09 | = | D463 | DE10 DF05 | = | D513 |
| DC09 DD10 | = | D464 | DC10 DD06 | = | D514 |
| DE09 DF10 | = | D465 | DE10 DF06 | = | D515 |
| DC09 DD11 | = | D466 | DC10 DD07 | = | D516 |
| DE09 DF11 | = | D467 | DE10 DF07 | = | D517 |
| DC09 DD12 | = | D470 | DC10 DD08 | = | D520 |

MICROPROGRAM STORAGE UNIT

FIG.59.

MICROSTEP ADDRESS SIGNALS (Cont.)

| | | | | | |
|---|---|---|---|---|---|
| DE10 DF08 | = | D521 | DE11 DF04 | = | D551 |
| DC10 DD09 | = | D522 | DC11 DD05 | = | D552 |
| DE10 DF09 | = | D523 | DE11 DF05 | = | D553 |
| DC10 DD10 | = | D524 | DC11 DD06 | = | D554 |
| DE10 DF10 | = | D525 | DE11 DF06 | = | D555 |
| DC10 DD11 | = | D526 | DC11 DD07 | = | D556 |
| DE10 DF11 | = | D527 | DE11 DF07 | = | D557 |
| DC10 DD12 | = | D530 | DC11 DD08 | = | D560 |
| DE10 DF12 | = | D531 | DE11 DF08 | = | D561 |
| DC10 DD13 | = | D532 | DC11 DD09 | = | D562 |
| DE10 DF13 | = | D533 | DE11 DF09 | = | D563 |
| DC10 DD14 | = | D534 | DC11 DD10 | = | D564 |
| DE10 DF14 | = | D535 | DE11 DF10 | = | D565 |
| DC10 DD15 | = | D536 | DC11 DD11 | = | D566 |
| DE10 DF15 | = | D537 | DE11 DF11 | = | D567 |
| DC11 DD00 | = | D540 | DC11 DD12 | = | D570 |
| DE11 DF00 | = | D541 | DE11 DF12 | = | D571 |
| DC11 DD01 | = | D542 | DC11 DD13 | = | D572 |
| DE11 DF01 | = | D543 | DE11 DF13 | = | D573 |
| DC11 DD02 | = | D544 | DC11 DD14 | = | D574 |
| DE11 DF02 | = | D545 | DE11 DF14 | = | D575 |
| DC11 DD03 | = | D546 | DC11 DD15 | = | D576 |
| DE11 DF03 | = | D547 | DE11 DF15 | = | D577 |
| DC11 DD04 | = | D550 | DC12 DD00 | = | D600 |

MICROPROGRAM STORAGE UNIT

FIG.60.

MICROSTEP ADDRESS SIGNALS (Cont.)

| | | | | | |
|---|---|---|---|---|---|
| DE12 DF00 | = | D601 | DE12 DF12 | = | D631 |
| DC12 DD01 | = | D602 | DC12 DD13 | = | D632 |
| DE12 DF01 | = | D603 | DE12 DF13 | = | D633 |
| DC12 DD02 | = | D604 | DC12 DD14 | = | D634 |
| DE12 DF02 | = | D605 | DE12 DF14 | = | D635 |
| DC12 DD03 | = | D606 | DC12 DD15 | = | D636 |
| DE12 DF03 | = | D607 | DE12 DF15 | = | D637 |
| DC12 DD04 | = | D610 | DC13 DD00 | = | D640 |
| DE12 DF04 | = | D611 | DE13 DF00 | = | D641 |
| DC12 DD05 | = | D612 | DC13 DD01 | = | D642 |
| DE12 DF05 | = | D613 | DE13 DF01 | = | D643 |
| DC12 DD06 | = | D614 | DC13 DD02 | = | D644 |
| DE12 DF06 | = | D615 | DE13 DF02 | = | D645 |
| DC12 DD07 | = | D616 | DC13 DD03 | = | D646 |
| DE12 DF07 | = | D617 | DE13 DF03 | = | D647 |
| DC12 DD08 | = | D620 | DC13 DD04 | = | D650 |
| DE12 DF08 | = | D621 | DE13 DF04 | = | D651 |
| DC12 DD09 | = | D622 | DC13 DD05 | = | D652 |
| DE12 DF09 | = | D623 | DE13 DF05 | = | D653 |
| DC12 DD10 | = | D624 | DC13 DD06 | = | D654 |
| DE12 DF10 | = | D625 | DE13 DF06 | = | D655 |
| DC12 DD11 | = | D626 | DC13 DD07 | = | D656 |
| DE12 DF11 | = | D627 | DE13 DF07 | = | D657 |
| DC12 DD12 | = | D630 | DC13 DD08 | = | D660 |

MICROPROGRAM STORAGE UNIT

FIG.61.

MICROSTEP ADDRESS SIGNALS (Cont.)

| | | | |
|---|---|---|---|
| DE13 DF08 | = D661 | DE14 DF04 | = D711 |
| DC13 DD09 | = D662 | DC14 DD05 | = D712 |
| DE13 DF09 | = D663 | DE14 DF05 | = D713 |
| DC13 DD10 | = D664 | DC14 DD06 | = D714 |
| DE13 DF10 | = D665 | DE14 DF06 | = D715 |
| DC13 DD11 | = D666 | DC14 DD07 | = D716 |
| DE13 DF11 | = D667 | DE14 DF07 | = D717 |
| DC13 DD12 | = D670 | DC14 DD08 | = D720 |
| DE13 DF12 | = D671 | DE14 DF08 | = D721 |
| DC13 DD13 | = D672 | DC14 DD09 | = D722 |
| DE13 DF13 | = D673 | DE14 DF09 | = D723 |
| DC13 DD14 | = D674 | DC14 DD10 | = D724 |
| DE13 DF14 | = D675 | DE14 DF10 | = D725 |
| DC13 DD15 | = D676 | DC14 DD11 | = D726 |
| DE13 DF15 | = D677 | DE14 DF11 | = D727 |
| DC14 DD00 | = D700 | DC14 DD12 | = D730 |
| DE14 DF00 | = D701 | DE14 DF12 | = D731 |
| DC14 DD01 | = D702 | DC14 DD13 | = D732 |
| DE14 DF01 | = D703 | DE14 DF13 | = D733 |
| DC14 DD02 | = D704 | DC14 DD14 | = D734 |
| DE14 DF02 | = D705 | DE14 DF14 | = D735 |
| DC14 DD03 | = D706 | DC14 DD15 | = D736 |
| DE14 DF03 | = D707 | DE14 DF15 | = D737 |
| DC14 DD04 | = D710 | DC15 DD00 | = D740 |

MICROPROGRAM STORAGE UNIT

FIG.62.

MICROSTEP ADDRESS SIGNALS (Cont.)

| | | | | | |
|---|---|---|---|---|---|
| DE15 DF00 | = | D741 | DE15 DF08 | = | D761 |
| DC15 DD01 | = | D742 | DC15 DD09 | = | D762 |
| DE15 DF01 | = | D743 | DE15 DF09 | = | D763 |
| DC15 DD02 | = | D744 | DC15 DD10 | = | D764 |
| DC15 DD03 | = | D746 | DE15 DF10 | = | D765 |
| DE15 DF03 | = | D747 | DC15 DD11 | = | D766 |
| DC15 DD04 | = | D750 | DE15 DF11 | = | D767 |
| DE15 DF04 | = | D751 | DC15 DD12 | = | D770 |
| DC15 DD05 | = | D752 | DE15 DF12 | = | D771 |
| DE15 DF05 | = | D753 | DC15 DD13 | = | D772 |
| DC15 DD06 | = | D754 | DC15 DD14 | = | D774 |
| DC15 DD07 | = | D756 | DE15 DF14 | = | D775 |
| DE15 DF07 | = | D757 | DC15 DD15 | = | D776 |
| DC15 DD08 | = | D760 | DE15 DF15 | = | D777 |

AA-REGISTER (FAA1-4) DECODED OUTPUT SIGNALS

| | | |
|---|---|---|
| $\overline{FAA4}$ $\overline{FAA3}$ $\overline{FAA2}$ $\overline{FAA1}$ $\overline{DPVA}$ | = | DD00 |
| $\overline{FAA4}$ $\overline{FAA3}$ $\overline{FAA2}$ FAA1 $\overline{DPVA}$ | = | DD01 |
| $\overline{FAA4}$ $\overline{FAA3}$ FAA2 $\overline{FAA1}$ $\overline{DPVA}$ | = | DD02 |
| $\overline{FAA4}$ $\overline{FAA3}$ FAA2 FAA1 $\overline{DPVA}$ | = | DD03 |
| $\overline{FAA4}$ FAA3 $\overline{FAA2}$ $\overline{FAA1}$ $\overline{DPVA}$ | = | DD04 |
| $\overline{FAA4}$ FAA3 $\overline{FAA2}$ FAA1 $\overline{DPVA}$ | = | DD05 |
| $\overline{FAA4}$ FAA3 FAA2 $\overline{FAA1}$ $\overline{DPVA}$ | = | DD06 |
| $\overline{FAA4}$ FAA3 FAA2 FAA1 $\overline{DPVA}$ | = | DD07 |

MICROPROGRAM STORAGE UNIT

FIG.63.

AA-REGISTER (FAA1-4) DECODED OUTPUT SIGNALS (Cont.)

FAA4 $\overline{FAA3}$ $\overline{FAA2}$ $\overline{FAA1}$ $\overline{DPVA}$ = DD08

FAA4 $\overline{FAA3}$ $\overline{FAA2}$ FAA1 $\overline{DPVA}$ = DD09

FAA4 $\overline{FAA3}$ FAA2 $\overline{FAA1}$ $\overline{DPVA}$ = DD10

FAA4 $\overline{FAA3}$ FAA2 FAA1 $\overline{DPVA}$ = DD11

FAA4 FAA3 $\overline{FAA2}$ $\overline{FAA1}$ $\overline{DPVA}$ = DD12

FAA4 FAA3 $\overline{FAA2}$ FAA1 $\overline{DPVA}$ = DD13

FAA4 FAA3 FAA2 $\overline{FAA1}$ $\overline{DPVA}$ = DD14

FAA4 FAA3 FAA2 FAA1 $\overline{DPVA}$ = DD15

AA-REGISTER (FAA5-8) DECODED OUTPUT SIGNALS $\overline{FAA8}$ $\overline{FAA7}$ $\overline{FAA6}$ $\overline{FAA5}$ $\overline{DPVA}$ = DC00

$\overline{FAA8}$ $\overline{FAA7}$ $\overline{FAA6}$ FAA5 $\overline{DPVA}$ = DC01

$\overline{FAA8}$ $\overline{FAA7}$ FAA6 $\overline{FAA5}$ $\overline{DPVA}$ = DC02

$\overline{FAA8}$ $\overline{FAA7}$ FAA6 FAA5 $\overline{DPVA}$ = DC03

$\overline{FAA8}$ FAA7 $\overline{FAA6}$ $\overline{FAA5}$ $\overline{DPVA}$ = DC04

$\overline{FAA8}$ FAA7 $\overline{FAA6}$ FAA5 $\overline{DPVA}$ = DC05

$\overline{FAA8}$ FAA7 FAA6 $\overline{FAA5}$ $\overline{DPVA}$ = DC06

$\overline{FAA8}$ FAA7 FAA6 FAA5 $\overline{DPVA}$ = DC07

FAA8 $\overline{FAA7}$ $\overline{FAA6}$ $\overline{FAA5}$ $\overline{DPVA}$ = DC08

FAA8 $\overline{FAA7}$ $\overline{FAA6}$ FAA5 $\overline{DPVA}$ = DC09

FAA8 $\overline{FAA7}$ FAA6 $\overline{FAA5}$ $\overline{DPVA}$ = DC10

FAA8 $\overline{FAA7}$ FAA6 FAA5 $\overline{DPVA}$ = DC11

FAA8 FAA7 $\overline{FAA6}$ $\overline{FAA5}$ $\overline{DPVA}$ = DC12

MICROPROGRAM STORAGE UNIT

FIG.64

AA-REGISTER (FAA5-8) DECODED OUTPUT SIGNALS (Cont.)

FAA8 FAA7 $\overline{\text{FAA6}}$ FAA5 $\overline{\text{DPVA}}$ = DC13

FAA8 FAA7 FAA6 $\overline{\text{FAA5}}$ $\overline{\text{DPVA}}$ = DC14

FAA8 FAA7 FAA6 FAA5 $\overline{\text{DPVA}}$ = DC15

AB-REGISTER (FAB1-4) DECODED OUTPUT SIGNALS $\overline{\text{FAB4}}$ $\overline{\text{FAB3}}$ $\overline{\text{FAB2}}$ $\overline{\text{FAB1}}$ $\overline{\text{DPVB}}$ = DF00

$\overline{\text{FAB4}}$ $\overline{\text{FAB3}}$ $\overline{\text{FAB2}}$ FAB1 $\overline{\text{DPVB}}$ = DF01

$\overline{\text{FAB4}}$ $\overline{\text{FAB3}}$ FAB2 $\overline{\text{FAB1}}$ $\overline{\text{DPVB}}$ = DF02

$\overline{\text{FAB4}}$ $\overline{\text{FAB3}}$ FAB2 FAB1 $\overline{\text{DPVB}}$ = DF03

$\overline{\text{FAB4}}$ FAB3 $\overline{\text{FAB2}}$ $\overline{\text{FAB1}}$ $\overline{\text{DPVB}}$ = DF04

$\overline{\text{FAB4}}$ FAB3 $\overline{\text{FAB2}}$ FAB1 $\overline{\text{DPVB}}$ = DF05

$\overline{\text{FAB4}}$ FAB3 FAB2 $\overline{\text{FAB1}}$ $\overline{\text{DPVB}}$ = DF06

$\overline{\text{FAB4}}$ FAB3 FAB2 FAB1 $\overline{\text{DPVB}}$ = DF07

FAB4 $\overline{\text{FAB3}}$ $\overline{\text{FAB2}}$ $\overline{\text{FAB1}}$ $\overline{\text{DPVB}}$ = DF08

FAB4 $\overline{\text{FAB3}}$ $\overline{\text{FAB2}}$ FAB1 $\overline{\text{DPVB}}$ = DF09

FAB4 $\overline{\text{FAB3}}$ FAB2 $\overline{\text{FAB1}}$ $\overline{\text{DPVB}}$ = DF10

FAB4 $\overline{\text{FAB3}}$ FAB2 FAB1 $\overline{\text{DPVB}}$ = DF11

FAB4 FAB3 $\overline{\text{FAB2}}$ $\overline{\text{FAB1}}$ $\overline{\text{DPVB}}$ = DF12

FAB4 FAB3 $\overline{\text{FAB2}}$ FAB1 $\overline{\text{DPVB}}$ = DF13

FAB4 FAB3 FAB2 $\overline{\text{FAB1}}$ $\overline{\text{DPVB}}$ = DF14

FAB4 FAB3 FAB2 FAB1 $\overline{\text{DPVB}}$ = DF15

MICROPROGRAM STORAGE UNIT

FIG.65.

AB-REGISTER (FAB5-8) DECODED OUTPUT SIGNALS

| | |
|---|---|
| $\overline{FAB8}$ $\overline{FAB7}$ $\overline{FAB6}$ $\overline{FAB5}$ $\overline{DPVB}$ | = DE00 |
| $\overline{FAB8}$ $\overline{FAB7}$ $\overline{FAB6}$ FAB5 $\overline{DPVB}$ | = DE01 |
| $\overline{FAB8}$ $\overline{FAB7}$ FAB6 $\overline{FAB5}$ $\overline{DPVB}$ | = DE02 |
| $\overline{FAB8}$ $\overline{FAB7}$ FAB6 FAB5 $\overline{DPVB}$ | = DE03 |
| $\overline{FAB8}$ FAB7 $\overline{FAB6}$ $\overline{FAB5}$ $\overline{DPVB}$ | = DE04 |
| $\overline{FAB8}$ FAB7 $\overline{FAB6}$ FAB5 $\overline{DPVB}$ | = DE05 |
| $\overline{FAB8}$ FAB7 FAB6 $\overline{FAB5}$ $\overline{DPVB}$ | = DE06 |
| $\overline{FAB8}$ FAB7 FAB6 FAB5 $\overline{DPVB}$ | = DE07 |
| FAB8 $\overline{FAB7}$ $\overline{FAB6}$ $\overline{FAB5}$ $\overline{DPVB}$ | = DE08 |
| FAB8 $\overline{FAB7}$ $\overline{FAB6}$ FAB5 $\overline{DPVB}$ | = DE09 |
| FAB8 $\overline{FAB7}$ FAB6 $\overline{FAB5}$ $\overline{DPVB}$ | = DE10 |
| FAB8 $\overline{FAB7}$ FAB6 FAB5 $\overline{DPVB}$ | = DE11 |
| FAB8 FAB7 $\overline{FAB6}$ $\overline{FAB5}$ $\overline{DPVB}$ | = DE12 |
| FAB8 FAB7 $\overline{FAB6}$ FAB5 $\overline{DPVB}$ | = DE13 |
| FAB8 FAB7 FAB6 $\overline{FAB5}$ $\overline{DPVB}$ | = DE14 |
| FAB8 FAB7 FAB6 FAB5 $\overline{DPVB}$ | = DE15 |

MICROPROGRAM STORAGE UNIT

FIG. 66.

CLASS CONTROL SIGNALS

FSWO (D001 + D003 + D005 + D007 + D025 + D033 + D053 + D067
+ D071 + D077 + D105 + D115 + D131 + D141 + D151 + D153
+ D157 + D165 + D173 + D045) + FSWO (D215 + D051 + D217
+ D233 + D245 + D253 + D275 + D277 + D301 + D321 + D323
+ D327 + D331 + D333 + D353 + D357 + D373 + D401 + D407)
+ FSWO (D423 + D453 + D473 + D477 + D505 + D511 + D515
+ D521 + D533 + D653 + D315 + D551 + D651 + D555 + D563)
+ FSWO (D571 + D601 + D661 + D673 + D701 + D703 + D705
+ D717) + FSWO (D721 + D733 + D735 + D743 + D761 + D777
+ $\overline{\text{FSWO}}$ (D004 + D006 + D010 + D014 + D020 + D026 + D030
+ D034 + D036 + D064 + D052 + D066 + D210 + D076 + D100
+ D102 + D112 + D676 + D124 + D130) + $\overline{\text{FSWO}}$ (D152 + D160
+ D162 + D214 + D222 + D230 + D236 + D246 + D250 + D252
+ D262 + D264 + D306 + D310 + D330 + D334 + D342 + D360
+ D376) + $\overline{\text{FSWO}}$ (D400 + D402 + D414 + D416 + D420 + D430
+ D436 + D450 + D460 + D466 + D502 + D506 + D316 + D516
+ D522 + D526 + D536 + D546 + D550) + $\overline{\text{FSWO}}$ (D554 + D572
+ D576 + D600 + D602 + D606 + D366 + D624 + D636 + D632
+ D634 + D642 + D662 + D666 + D710) + $\overline{\text{FSWO}}$ (D714 + D724
+ D730 + D652 + D750 + D540 + D742 + D644 + D764 + D524
+ D664) = DCL1

FSWO (D013 + D757 + D117 + D223 + D305 + D337 + D345 + D403
+ D433 + D545 + D073) + $\overline{\text{FSWO}}$ (D012 + D276 + D322 + D412
+ D472 + D504 + D556 + D756 + D304) = DCL2

FSWO (D133 + D137 + D205 + D225 + D247 + D261 + D263 + D347
+ D355 + D451) + $\overline{\text{FSWO}}$ (D126 + D142 + D146 + D254 + D300
+ D362 + D470) = DCL3

FSWO (D075 + D043 + D527 + D531 + D667 + D671 + D713 + D727
+ D751) + $\overline{\text{FSWO}}$ (D000 + D106 + D110 + D520 + D646 + D660
+ D700 + D706 + D046 + D746) = DCL4

FSWO (D011 + D031 + D057 + D035 + D307 + D421 + D575 + D607
+ D623 + D725 + D765) + $\overline{\text{FSWO}}$ (D016 + D154 + D166 + D270
+ D274 + D374 + D406 + D476 + D512 + D562 + D570 + D604
+ D674 + D722 + D736 + D240) = DCL5

FSWO DCLA + FSWO DCLB + FSWO DCLC + FSWO DCLD + FSWO DCLE
+ FSWO DCLF + $\overline{\text{FSWO}}$ DCLG + $\overline{\text{FSWO}}$ DCLH + $\overline{\text{FSWO}}$ DCLJ
+ $\overline{\text{FSWO}}$ DCLK + $\overline{\text{FSWO}}$ DCLL + $\overline{\text{FSWO}}$ DCLM = DCL6

*MICROPROGRAM STORAGE UNIT*

*FIG.67*

N-CONTROL SIGNALS

FSW4 (D725 + D765) + $\overline{FSW4}$ (D270 + D570 + D722 + D736) = DN10

$\overline{FSW4}$ (D046 + D674) = DN12

$\overline{FSW4}$ (D046 + D674) = DN13

FSW4 (D031 + D043 + D307 + D421 + D527 + D531 + D607 + D667
+ D671 + D725 + D765) + $\overline{FSW4}$ (D646 + D106 + D110 + D166
+ D270 + D374 + D512 + D046 + D570 + D604 + D674 + D706
+ D722 + D736 + D240) = DN14

FSW4 (D015 + D023 + D027 + D037 + D041 + D047 + D637 + D061
+ D123 + D163 + D171 + D201 + D213 + D235 + D243 + D265
+ D507 + D325 + D343) + FSW4 (D351 + D367 + D375 + D413
+ D431 + D227 + D657 + D513 + D523 + D271 + D543 + D537
+ D565 + D611 + D475 + D273) + FSW4 (D617 + D625 + D627
+ D177 + D641 + D663 + D665 + D715 + D725 + D731)
+ FSW4 (D143 + D765 + D055 + D237 + D125 + D207 + D241
+ D723) + $\overline{FSW4}$ (D022 + D032 + D042 + D060 + D044 + D122
+ D132 + D062 + D074 + D176 + D156 + D164 + D170 + D656
+ D610 + D206 + D050 + D404) + $\overline{FSW4}$ (D370 + D220 + D174
+ D244 + D224 + D270 + D302 + D326 + D332 + D340 + D346
+ D410 + D422 + D432 + D434 + D650 + D734 + D474 + D234)
+ $\overline{FSW4}$ (D530 + D532 + D464 + D544 + D552 + D570 + D622
+ D626 + D670 + D672 + D702 + D614 + D722) + $\overline{FSW4}$ (D720
+ D736 + D766 + D770 + D772) = DN15

FSW4 (D013 + D021 + D061 + D117 + D371 + D133 + D143 + D123
+ D155 + D161 + D205 + D211 + D223 + D225 + D231 + D235
+ D311 + D707 + D263 + D265) + FSW4 (D303 + D741 + D343
+ D351 + D367 + D411 + D415 + D427 + D431 + D227 + D457
+ D657 + D471 + D175 + D611 + D523 + D107 + D541 + D543
+ D565) + FSW4 (D617 + D615 + D633 + D635 + D643 + D763
+ D663 + D665 + D715 + D723 + D725 + D273 + D731 + D757
+ D747 + D645 + D765 + D561 + D655 + D767) + $\overline{FSW4}$ (D024
+ D040 + D042 + D054 + D564 + D044 + D070 + D142 + D074
+ D164 + D172 + D060 + D206 + D216 + D104 + D254 + D150
+ D062 + D276 + D320) + $\overline{FSW4}$ (D332 + D340 + D272 + D354
+ D432 + D434 + D312 + D446 + D670 + D462 + D474 + D500
+ D530 + D542 + D544 + D552 + D510 + D574 + D616 + D620)
+ $\overline{FSW4}$ (D650 + D720 + D722 + D654 + D734 + D736 + D242
+ D744 + D614 + D762 + D610 + D740 + D770 + D304 + D760) = DN16

*MICROPROGRAM STORAGE UNIT*
*FIG. 68*

N-CONTROL SIGNALS (Cont.)

FSW5 (D015 + D021 + D027 + D037 + D041 + D047 + D055 + D123
+ D125 + D747 + D127 + D143 + D163 + D167 + D147 + D251
+ D255 + D265 + D175 + D207) + FSW4 (D337 + D341 + D343
+ D345 + D347 + D351 + D355 + D363 + D365 + D375 + D403
+ D413 + D415 + D417 + D433 + D605 + D437 + D441 + D113
+ D451) + FSW4 (D271 + D461 + D465 + D763 + D107 + D177
+ D543 + D545 + D557 + D561 + D565 + D411 + D573 + D577
+ D603) + FSW4 (D273 + D611 + D237 + D633 + D663 + D467
+ D665 + D715 + D241 + D645 + D647 + D525 + D371 + D657
+ D655 + D675 + D707 + D711 + D741 + D771) + $\overline{FSW5}$ (D032
+ D042 + D060 + D002 + D122 + D132 + D134 + D156 + D174
+ D530 + D206 + D050 + D070 + D244 + D534) + $\overline{FSW4}$ (D270
+ D302 + D320 + D322 + D324 + D332 + D346 + D356 + D362
+ D410 + D412 + D422 + D432 + D434 + D226 + D372 + D454
+ D462 + D350 + D464) + $\overline{FSW4}$ (D470 + D472 + D474 + D504
+ D542 + D552 + D556 + D566 + D570 + D610 + D620 + D702
+ D704 + D314 + D716) + $\overline{FSW4}$ (D670 + D740 + D732 + D772
+ D762 + D766 + D312 + D760) = DN17

*MICROPROGRAM STORAGE UNIT*

*FIG. 68a.*

N-CONTROL SIGNALS (Cont.)

FSW5 (D011 + D015 + D027 + D037 + D041 + D043 + D055 + D057
+ D061 + D637 + D075 + D047 + D111 + D123 + D163 + D271
+ D167 + D201 + D211 + D231) + FSW4 (D241 + D265 + D267
+ D135 + D303 + D341 + D351 + D365 + D367 + D375 + D413
+ D415 + D427 + D655 + D431 + D441 + D113 + D447 + D227
+ D461) + FSW4 (D465 + D467 + D471 + D475 + D523 + D541
+ D543 + D565 + D575 + D763 + D617 + D627 + D633 + D635
+ D641 + D643 + D667 + D671 + D311) + FSW4 (D715 + D725
+ D727 + D731 + D561 + D371 + D751 + D765 + D767 + D723
+ D207 + D237 + D737 + D675 + D711 + D741) + $\overline{FSW5}$ (D140
+ D032 + D054 + D060 + D740 + D106 + D110 + D116 + D120
+ D766 + D122 + D154 + D156 + D164 + D166 + D144 + D050
+ D224 + D174 + D234) + $\overline{FSW4}$ (D770 + D244 + D534 + D270
+ D272 + D302 + D326 + D332 + D340 + D422 + D426 + D432
+ D434 + D446 + D656 + D176 + D474 + D410 + D532 + D542)
+ $\overline{FSW4}$ (D544 + D552 + D562 + D566 + D570 + D574 + D604
+ D614 + D660 + D654 + D672 + D700 + D706 + D722)
+ $\overline{FSW4}$ (D726 + D736 + D242 + D762) = DN18

FSW5 (D015 + D017 + D021 + D023 + D027 + D037 + D043 + D055
+ D057 + D237 + D061 + D123 + D127 + D143 + D147 + D161
+ D163 + D167 + D171 + D201) + FSW5 (D213 + D227 + D243
+ D251 + D255 + D265 + D267 + D175 + D307 + D207 + D343
+ D363 + D367 + D375 + D507 + D415 + D417 + D427 + D431
+ D437) + FSW4 (D113 + D447 + D457 + D513 + D313 + D527
+ D531 + D543 + D537 + D561 + D763 + D425 + D573 + D577
+ D603 + D455 + D525 + D625 + D633 + D663) + FSW5 (D665
+ D667 + D671 + D713 + D241 + D271 + D725 + D727 + D731
+ D615 + D765 + D655 + D657 + D047 + D675 + D711 + D771)
+ $\overline{FSW5}$ (D022 + D032 + D040 + D062 + D312 + D122 + D132
+ D150 + D156 + D772 + D170 + D174 + D070 + D206 + D050
+ D220 + D226 + D440 + D244 + D074) + $\overline{FSW5}$ (D270 + D302
+ D324 + D326 + D332 + D340 + D346 + D350 + D354 + D356
+ D422 + D426 + D446 + D454 + D462 + D464 + D476 + D500
+ D134 + D520) + $\overline{FSW4}$ (D530 + D532 + D314 + D542 + D552
+ D562 + D570 + D410 + D620 + D622 + D660 + D670 + D672
+ D706 + D716) + $\overline{FSW5}$ (D722 + D732 + D736 + D744 + D762
+ D766 + D740 + D760 + D534 + D564 + D372 + D656) = DN19

MICROPROGRAM STORAGE UNIT
FIG. 69.

N-CONTROL SIGNALS (Cont.)

FSW5 (D023 + D055 + D761 + D125 + D127 + D155 + D161 + D167
+ D171 + D175 + D211 + D213 + D147 + D231 + D235 + D043
+ D243 + D251 + D255 + D267) + FSW5 (D303 + D325 + D341
+ D351 + D363 + D365 + D367 + D411 + D417 + D427 + D437
+ D441 + D447 + D457 + D461 + D465 + D471 + D047 + D557
+ D721) + FSW5 (D735 + D737 + D467 + D371 + D645 + D113
+ D061 + D561 + D647 + D655 + D475 + D675 + D711 + D741
+ D747 + D767) + $\overline{FSW5}$ (D002 + D022 + D024 + D054 + D070
+ D116 + D120 + D140 + D044 + D170 + D172 + D060 + D216
+ D220 + D224 + D234 + D272 + D324 + D350 + D354)
+ $\overline{FSW5}$ (D356 + D062 + D446 + D454 + D462 + D464 + D544
+ D574 + D620 + D626 + D670 + D672 + D706 + D724 + D732
+ D760) + $\overline{FSW5}$ (D242 + D750 + D764 + D134 + D176 + D074
+ D226 + D256 + D314 + D424 + D510 + D534 + D564 + D654
+ D720 + D726 + D734 + D372 + D744 + D742) = DN20

FSW5 (D015 + D023 + D027 + D041 + D101 + D657 + D107 + D111
+ D123 + D125 + D127 + D155 + D763 + D161 + D163 + D167
+ D171 + D201 + D213 + D147) + FSW5 (D231 + D251 + D255
+ D341 + D343 + D351 + D363 + D365 + D367 + D375 + D741
+ D417 + D427 + D437 + D441 + D465 + D175) + FSW5 (D507
+ D513 + D523 + D525 + D531 + D541 + D543 + D537 + D557
+ D311 + D573 + D577 + D603 + D617 + D625 + D637)
+ FSW5 (D635 + D641 + D643 + D663 + D665 + D671 + D707
+ D713 + D715 + D723 + D727 + D731 + D207 + D241 + D747)
+ FSW5 (D645 + D237 + D627 + D325 + D271) + $\overline{FSW5}$ (D134
+ D022 + D024 + D032 + D040 + D616 + D104 + D110 + D122
+ D140 + D314 + D156 + D170 + D172 + D410) + $\overline{FSW5}$ (D174
+ D226 + D050 + D216 + D220 + D244 + D302 + D324 + D326
+ D564 + D332 + D340 + D346 + D350 + D354) + $\overline{FSW5}$ (D356
+ D422 + D454 + D772 + D510 + D530 + D532 + D752 + D542
+ D544 + D372 + D552 + D614 + D620 + D656) + $\overline{FSW5}$ (D622
+ D700 + D702 + D704 + D740 + D716) + $\overline{FSW5}$ (D762 + D766
+ D770 + D744 + D760) = DN21

MICROPROGRAM STORAGE UNIT
FIG. 70.

N-CONTROL SIGNALS (Cont.)

FSW5 (D015 + D023 + D027 + D037 + D047 + D101 + D135 + D127
+ D143 + D615 + D147 + D155 + D237 + D163 + D171 + D213
+ D227 + D235 + D243 + D251) + FSW5 (D255 + D265 + D267
+ D175 + D325 + D343 + D345 + D351 + D363 + D367 + D375
+ D507 + D417 + D427 + D437 + D113 + D513 + D523 + D545
+ D537) + FSW5 (D565 + D311 + D573 + D577 + D603 + D271
+ D605 + D625 + D633 + D663 + D665 + D707 + D715 + D731
+ D207) + FSW5 (D241 + D747 + D763 + D645 + D647 + D177
+ D475 + D675 + D711 + D741 + D657 + D371) + $\overline{\text{FSW5}}$ (D002
+ D022 + D024 + D032 + D042 + D122 + D132 + D134 + D144
+ D150 + D372 + D156 + D164 + D170 + D172 + D174 + D534
+ D314 + D206 + D050) + $\overline{\text{FSW5}}$ (D216 + D226 + D244 + D256
+ D302 + D322 + D324 + D326 + D332 + D340 + D346 + D350
+ D354 + D356 + D412 + D422 + D454 + D772 + D760 + D656)
+ $\overline{\text{FSW5}}$ (D500 + D654 + D410 + D566 + D610 + D622 + D626
+ D670 + D672 + D702 + D732 + D744) + $\overline{\text{FSW5}}$ (D762 + D766
+ D770 + D740) = DN22

FSW6 (D013 + D015 + D023 + D027 + D047 + D757 + D101 + D117
+ D313 + D615 + D127 + D133 + D137 + D155 + D163 + D171
+ D205 + D213 + D223 + D225) + FSW0 (D147 + D247 + D251
+ D255 + D261 + D271 + D263 + D337 + D347 + D355 + D363
+ D375 + D403 + D411 + D413 + D415 + D417 + D431 + D433
+ D437) + FSW0 (D113 + D447 + D451 + D763 + D455 + D457
+ D461 + D371 + D467 + D471 + D305 + D647 + D507 + D513
+ D475 + D523 + D525 + D541 + D543 + D537) + FSW0 (D557
+ D565 + D425 + D573 + D577 + D603 + D605 + D617 + D625
+ D627 + D633 + D635 + D641 + D643 + D663 + D665 + D707
+ D715 + D723) + FSW5 (D731 + D207 + D241 + D073 + D747
+ D655 + D645 + D675 + D237 + D637 + D561 + D711 + D741
+ D771) + $\overline{\text{FSW6}}$ (D002 + D012 + D022 + D024 + D032 + D122
+ D404 + D126 + D142 + D146 + D134 + D156 + D170 + D172
+ D174 + D050 + D216 + D244 + D372 + D254) + $\overline{\text{FSW0}}$ (D276
+ D300 + D302 + D320 + D324 + D356 + D362 + D364 + D410
+ D422 + D426 + D432 + D434 + D440 + D446) + $\overline{\text{FSW0}}$ (D454
+ D462 + D464 + D470 + D370 + D424 + D472 + D474 + D500
+ D510 + D530 + D532 + D226 + D542 + D544 + D552)
+ $\overline{\text{FSW0}}$ (D564 + D566 + D610 + D616 + D620 + D740 + D622
+ D626 + D670 + D672 + D702 + D716 + D534 + D654 + D732
+ D614) + $\overline{\text{FSW5}}$ (D744 + D756 + D762 + D766 + D304) = DN23

$\overline{\text{FSW6}}$ (D504 + D556) = DN24

FSW6 (D011 + D031 + D035 + D057 + D307 + D421 + D575 + D607
+ D623 + D725 + D765) + $\overline{\text{FSW6}}$ (D016 + D154 + D166 + D270
+ D274 + D374 + D406 + D476 + D512 + D562 + D570 + D604
+ D722 + D736 + D240) = DN25

*MICROPROGRAM STORAGE UNIT*

*FIG. 71*

INFORMATION SHIFT APPARATUS IN A COMPUTER SYSTEM

Filed May 27, 1966 207 Sheets-Sheet 81

PROCESS CONTROL SIGNALS

FSW3 D213 + $\overline{\text{FSW3}}$ (D022 + D170) = DP01

FSW3 (D023 + D171) = DP02

FSW3 D155 + $\overline{\text{FSW3}}$ (D024 + D172 + D216) = DP03

FSW3 (D017 + D041 + D311 + D161 + D457 + D143)
+ FSW3 (D140 + D206 + D656 + D350 + D426) = DP05

FSW3 D125 + $\overline{\text{FSW3}}$ (D132 + D326 + D354 + D314) = DP06

FSW3 D267 + $\overline{\text{FSW3}}$ D566 = DP07

FSW3 (D001 + D005 + D025 + D053 + D077 + D131 + D141
+ D151 + D153 + D165 + D173 + D045 + D051)
+ FSW1 (D275 + D277 + D323 + D353 + D357 + D327
+ D373 + D401 + D333 + D315 + D521 + D533 + D067
+ D651 + D555) + FSW1 (D563 + D661 + D743 + D673
+ D653 + D703 + D705 + D717 + D733) + $\overline{\text{FSW3}}$ (D004
+ D010 + D014 + D026 + D030 + D034 + D064 + D210
+ D076 + D102 + D112 + D162 + D124 + D130 + D214
+ D230 + D236 + D250) + $\overline{\text{FSW1}}$ (D306 + D310 + D366
+ D506 + D524 + D420 + D460 + D516 + D546 + D550
+ D572 + D576 + D602 + D606) + $\overline{\text{FSW1}}$ (D634 + D710
+ D664 + D644) = DP10

$\overline{\text{FSW3}}$ D006 = DP11

FSW3 D407 + $\overline{\text{FSW3}}$ (D020 + D036 + D502 + D624) = DP12

FSW3 (D105 + D701) + $\overline{\text{FSW3}}$ (D100 + D522 + D662 + D666
+ D714 + D730 + D526) = DP13

FSW3 (D115 + D233 + D301 + D331) + $\overline{\text{FSW3}}$ (D222 + D400
+ D430 + D742) = DP14

$\overline{\text{FSW3}}$ D750 = DP15

FSW3 (D217 + D551 + D601) + $\overline{\text{FSW3}}$ (D160 + D342 + D632 + D642) = DP16

FSW3 (D721 + D735) + $\overline{\text{FSW3}}$ D724 = DP17

FSW3 D321 = DP20

FSW3 (D003 + D571 + D157 + D215) + $\overline{\text{FSW3}}$ D600 = DP21

$\overline{\text{FSW3}}$ (D416 + D436) = DP22

*MICROPROGRAM STORAGE UNIT*

*FIG. 72.*

PROCESS CONTROL SIGNALS (Cont.)

FSW3 D477 = DP23

$\overline{FSW3}$ D764 = DP24

FSW3 D511 + $\overline{FSW3}$ (D536 + D540) = DP25

FSW3 D505 = DP26

FSW3 (D253 + D453) + $\overline{FSW3}$ (D246 + D262 + D264) = DP27

FSW3 D761 + $\overline{FSW3}$ D466 = DP30

FSW3 D473 = DP31

FSW3 D245 + $\overline{FSW3}$ (D252 + D450 + D414) = DP32

$\overline{FSW3}$ D636 = DP33

RECEIVE CONTROL SIGNALS

FSW3 (D001 + D041 + D125 + D143 + D213 + D275 + D453 + D473 + D477 + D551) + $\overline{FSW3}$ (D022 + D132 + D140 + D170 + D206 + D246 + D262 + D326 + D342 + D350 + D354 + D416 + D430 + D436 + D460) + $\overline{FSW1}$ (D466 + D310 + D536 + D632 + D656 + D502) = DR01

FSW1 (D105 + D165 + D253 + D267 + D373 + D511 + D521 + D533 + D545) + FSW1 (D661 + D717 + D673 + D705 + D721 + D735 + D045 + D761 + D733) + $\overline{FSW1}$ (D030 + D076 + D112 + D236 + D264 + D306 + D412 + D420 + D526 + D566 + D602 + D606 + D540 + D634 + D642) + $\overline{FSW1}$ (D666 + D710 + D322 + D724 + D644 + D750 + D764 + D742) = DR02

FSW1 (D017 + D115 + D141 + D155 + D505 + D161 + D233 + D321 + D331 + D407 + D457 + D311 + D563 + D701) + $\overline{FSW1}$ (D036 + D130 + D222 + D250 + D400 + D426 + D546 + D624 + D714 + D730 + D636 + D662) = DR03

FSW1 (D131 + D157 + D245 + D323 + D353 + D703 + D215) + $\overline{FSW1}$ (D102 + D124 + D252 + D414 + D450 + D524 + D550 + D600 + D664) = DR04

FSW1 (D571 + D003) = DR05

MICROPROGRAM STORAGE UNIT
FIG. 73.

RECEIVE CONTROL SIGNALS (Cont.)

$\overline{\text{FSW3}}$ D162 = DR06

$\overline{\text{FSW1}}$ (D014 + D160 + D576) = DR07

FSW1 (D053 + D153 + D555 + D067 + D653)
+ $\overline{\text{FSW1}}$ (D010 + D034 + D516) = DR11

FSW1 (D025 + D173 + D023 + D171 + D743)
+ $\overline{\text{FSW1}}$ (D214 + D100 + D522) = DR12

$\overline{\text{FSW1}}$ (D026 + D366) = DR13

FSW1 D277 = DR14

FSW3 (D217 + D601) = DR16

$\overline{\text{FSW3}}$ (D504 + D556) = DR17

FSW3 D077 + $\overline{\text{FSW3}}$ (D004 + D064 + D572) = DR20

FSW3 (D007 + D033 + D423 + D515) + $\overline{\text{FSW3}}$ (D052 + D152 + D330
+ D334 + D360 + D402 + D376 + D554 + D066 + D316 + D652) = DR21

FSW3 (D071 + D777) + $\overline{\text{FSW3}}$ D676 = DR22

FSW3 (D005 + D651) = DR23

FSW3 D151 + $\overline{\text{FSW3}}$ D230 = DR24

FSW3 (D051 + D301 + D327 + D333 + D315 + D357 + D401)
+ $\overline{\text{FSW3}}$ (D210 + D506) = DR25

TRANSMIT CONTROL SIGNALS

FSW6 (D005 + D151 + D651) + $\overline{\text{FSW6}}$ (D004 + D572) = DT01

$\overline{\text{FSW6}}$ D644 = DT02

*MICROPROGRAM STORAGE UNIT*

*FIG. 74.*

TRANSMIT CONTROL SIGNALS (Cont.)

FSW6 (D015 + D027 + D507 + D101 + D675 + D107 + D111 + D647
+ D127 + D163 + D147 + D251 + D255 + D363 + D375 + D747
+ D417 + D437 + D513) + FSW1 (D523 + D525 + D537 + D561
+ D573 + D271 + D577 + D603 + D605 + D625 + D663 + D665
+ D707 + D715 + D731 + D241 + D645 + D207 + D237)
+ $\overline{FSW6}$ (D044 + D032 + D060 + D702 + D104 + D062 + D156
+ D122 + D050 + D226 + D244 + D762 + D302 + D324 + D356
+ D422) + $\overline{FSW1}$ (D454 + D464 + D134 + D530 + D532 + D174
+ D610 + D622 + D670 + D672 + D740 + D766 + D410 + D564
+ D372) = DT03

FSW6 D321 + $\overline{FSW6}$ (D502 + D546) = DT04

FSW6 (D001 + D017 + D105 + D133 + D155 + D161 + D225 + D247
+ D277 + D355 + D407 + D451 + D477 + D563 + D701)
+ $\overline{FSW6}$ (D014 + D036 + D100 + D126 + D146 + D254 + D362
+ D522 + D526 + D576 + D606 + D624 + D662 + D666 + D714
+ D730) = DT05

FSW6 (D003 + D025 + D115 + D141 + D743 + D173 + D233 + D267
+ D327 + D331 + D357 + D505 + D457 + D315 + D571 + D311)
+ $\overline{FSW6}$ (D006 + D130 + D214 + D222 + D250 + D264 + D300
+ D306 + D400 + D420 + D634 + D426 + D636 + D210 + D540) = DT06

FSW6 (D041 + D125 + D143 + D217 + D253 + D051 + D333 + D373
+ D401 + D453 + D473 + D511 + D551 + D601) + $\overline{FSW6}$ (D020
+ D030 + D314 + D132 + D140 + D160 + D162 + D206 + D236
+ D246 + D326 + D342 + D350 + D354 + D656 + D416 + D430
+ D436 + D460 + D466) + $\overline{FSW1}$ (D536 + D566 + D262 + D506
+ D632 + D642) = DT07

FSW6 D165 + $\overline{FSW6}$ D602 = DT10

FSW6 D077 + $\overline{FSW6}$ D064 = DT11

FSW6 (D053 + D153 + D555 + D067 + D653) + $\overline{FSW6}$ (D010 + D034
+ D516) = DT12

FSW6 (D521 + D661) + $\overline{FSW6}$ D076 = DT13

FSW6 (D073 + D117 + D223 + D337 + D403 + D433 + D757)
+ FSW6 (D276 + D472 + D756) = DT14

$\overline{FSW6}$ D310 = DT15

MICROPROGRAM STORAGE UNIT
FIG.75.

TRANSMIT CONTROL SIGNALS (Cont.)

| | |
|---|---|
| FSW6 (D201 + D211 + D231 + D047 + D265 + D303 + D135 + D343 + D351 + D365 + D273 + D427 + D441 + D455 + D461 + D465 + D467 + D471 + D541 + D557) + FSW1 (D657 + D763 + D611 + D635 + D643 + D723 + D113 + D371 + D637 + D425 + D655 + D475 + D711 + D741) + $\overline{FSW6}$ (D042 + D120 + D144 + D220 + D224 + D234 + D256 + D340 + D346 + D432 + D434 + D474 + D552 + D616 + D620 + D704 + D312 + D720) + $\overline{FSW1}$ (D726 + D732 + D734 + D002 + D074 + D650 + D716 + D242 + D534 + D404 + D744 + D752 + D772 + D760) | = DT16 |
| FSW7 (D721 + D735) + $\overline{FSW7}$ (D724 + D764) | = DT17 |
| $\overline{FSW7}$ D112 | = DT23 |
| FSW7 D533 | = DT24 |
| FSW7 D673 | = DT25 |
| FSW7 D045 + $\overline{FSW7}$ D710 | = DT26 |
| FSW7 (D703 + D705) + $\overline{FSW7}$ D102 | = DT27 |
| FSW7 D717 + $\overline{FSW7}$ D524 | = DT30 |
| FSW7 D733 + $\overline{FSW7}$ D664 | = DT31 |
| FSW7 (D021 + D167 + D243 + D413 + D447 + D177 + D543 + D123) | = DT32 |
| FSW7 D213 + $\overline{FSW7}$ (D022 + D024 + D170 + D172 + D216) | = DT33 |
| FSW7 (D023 + D171) | = DT34 |
| FSW7 (D227 + D431) + $\overline{FSW7}$ (D150 + D332 + D364 + D440 + D462) | = DT35 |
| $\overline{FSW7}$ D026 | = DT36 |
| FSW7 (D037 + D367 + D313 + D615 + D771) + $\overline{FSW7}$ (D320 + D500) | = DT37 |
| FSW7 (D235 + D411) + $\overline{FSW7}$ (D040 + D370 + D510 + D626 + D770) | = DT40 |
| $\overline{FSW7}$ (D054 + D070 + D654) | = DT42 |
| FSW7 D055 | = DT43 |
| FSW7 D061 | = DT44 |
| $\overline{FSW8}$ D176 | = DT50 |

MICROPROGRAM STORAGE UNIT
FIG.76.

TRANSMIT CONTROL SIGNALS (Cont.)

| | |
|---|---|
| $\overline{FSW8}$ D164 | = DT51 |
| FSW8 (D131 + D245 + D323 + D353 + D157 + D215) + $\overline{FSW8}$ (D124 + D252 + D414 + D450 + D550 + D600) | = DT52 |
| FSW8 D275 | = DT55 |
| FSW8 (D325 + D415) + $\overline{FSW8}$ (D446 + D424) | = DT56 |
| $\overline{FSW8}$ D366 | = DT57 |
| $\overline{FSW8}$ (D574 + D614 + D272) | = DT61 |
| $\overline{FSW8}$ D542 | = DT62 |
| FSW8 D565 | = DT63 |
| FSW8 D617 | = DT64 |
| FSW8 D627 | = DT65 |
| FSW8 D641 | = DT66 |
| FSW8 D633 | = DT67 |
| FSW8 D341 + $\overline{FSW8}$ D116 | = DT70 |
| FSW8 (D737 + D767) | = DT71 |
| $\overline{FSW8}$ D544 | = DT72 |
| FSW6 D175 | = DT73 |

MISCELLANEOUS LOGICAL COMBINATION SIGNALS

| | |
|---|---|
| D015 + D017 + D021 + D023 + D027 + D037 + D041 + D047 + D055 + D061 + D101 + D107 + D111 + D123 + D125 + D127 + D143 + D147 + D155 + D763 | = DCLA |
| D161 + D163 + D167 + D171 + D177 + D201 + D211 + D213 + D227 + D231 + D235 + D241 + D243 + D251 + D255 + D135 + D207 + D265 + D267 + D303 | = DCLB |

MICROPROGRAM STORAGE UNIT
FIG. 77

MISCELLANEOUS LOGICAL COMBINATION SIGNALS (Cont.)

| | |
|---|---|
| D325 + D341 + D343 + D351 + D363 + D365 + D367 + D375 + D411 + D413 + D415 + D417 + D427 + D431 + D437 + D113 + D441 + D447 + D455 + D657 | = DCLC |
| D313 + D425 + D645 + D747 + D767 + D475 + D647 + D655 + D675 + D711 + D271 + D273 + D637 + D741 + D771 | = DCLD |
| D457 + D461 + D465 + D467 + D471 + D175 + D507 + D513 + D523 + D525 + D537 + D541 + D543 + D311 + D557 + D561 + D565 + D615 + D371 | = DCLE |
| D573 + D577 + D603 + D605 + D611 + D617 + D625 + D627 + D633 + D635 + D641 + D643 + D663 + D665 + D707 + D237 + D715 + D723 + D731 + D737 | = DCLF |
| D002 + D022 + D024 + D032 + D040 + D042 + D054 + D060 + D104 + D312 + D116 + D120 + D122 + D132 + D134 + D140 + D144 + D150 + D156 + D552 | = DCLG |
| D326 + D332 + D340 + D346 + D350 + D354 + D356 + D364 + D410 + D422 + D426 + D432 + D434 + D440 + D446 + D370 + D454 + D462 + D464 + D474 | = DCLH |
| D164 + D170 + D172 + D174 + D176 + D044 + D050 + D206 + D216 + D220 + D074 + D224 + D226 + D234 + D244 + D256 + D272 + D302 + D320 + D324 | = DCLJ |
| D062 + D500 + D510 + D530 + D532 + D542 + D544 + D564 + D566 + D574 + D610 + D616 + D620 + D622 + D626 | = DCLK |
| D670 + D672 + D702 + D704 + D740 + D716 + D720 + D726 + D732 + D734 | = DCLL |
| D070 + D242 + D744 + D762 + D766 + D314 + D534 + D614 + D650 + D654 + D404 + D424 + D752 + D770 + D772 + D372 + D656 + D760 | = DCLM |
| JPRV | = DPVA |
| JPRV | = DPVB |

MICROPROGRAM STORAGE UNIT

FIG. 78.

FLIP-FLOP INPUT LOGICAL SCHEMATIC DIAGRAMS

AA-Register

JMAA $\overline{JPC1}$ = $\overline{FAA1}$

JMAA JPC1 = FAA1

JMAA $\overline{JPC2}$ = $\overline{FAA2}$

JMAA JPC2 = FAA2

JMAA $\overline{JPC3}$ = $\overline{FAA3}$

JMAA JPC3 = FAA3

JMAA $\overline{JPC4}$ = $\overline{FAA4}$

JMAA JPC4 = FAA4

JMAA $\overline{JPC5}$ = $\overline{FAA5}$

JMAA JPC5 = FAA5

JMAA $\overline{JPC6}$ = $\overline{FAA6}$

JMAA JPC6 = FAA6

JMAA $\overline{JPC7}$ = $\overline{FAA7}$

JMAA JPC7 = FAA7

JMAA $\overline{JPC8}$ = $\overline{FAA8}$

JMAA JPC8 = FAA8

AB-Register

JMAB $\overline{JPC1}$ = $\overline{FAB1}$

JMAB JPC1 = FAB1

JMAB $\overline{JPC2}$ = $\overline{FAB2}$

JMAB JPC2 = FAB2

JMAB $\overline{JPC3}$ = $\overline{FAB3}$

JMAB JPC3 = FAB3

JMAB $\overline{JPC4}$ = $\overline{FAB4}$

JMAB JPC4 = FAB4

JMAB $\overline{JPC5}$ = $\overline{FAB5}$

JMAB JPC5 = FAB5

JMAB $\overline{JPC6}$ = $\overline{FAB6}$

JMAB JPC6 = FAB6

JMAB $\overline{JPC7}$ = $\overline{FAB7}$

JMAB JPC7 = FAB7

JMAB $\overline{JPC8}$ = $\overline{FAB8}$

JMAB JPC8 = FAB8

MICROPROGRAM STORAGE UNIT

FIG. 79.

Oct. 28, 1969 J. W. FIGUEROA ET AL 3,475,730

INFORMATION SHIFT APPARATUS IN A COMPUTER SYSTEM

Filed May 27, 1966 207 Sheets-Sheet 89

FLIP-FLOP INPUT LOGICAL SCHEMATIC DIAGRAMS (Cont.)

Encoder Switch Flip-Flops $JMAB = \overline{FSW0}$ $JMAA = FSW0$ $JMAB = \overline{FSW1}$ $JMAA = FSW1$ $JMAB = \overline{FSW3}$ $JMAA = FSW3$ $JMAB = \overline{FSW4}$ $JMAA = FSW4$ $JMAB = \overline{FSW5}$ $JMAA = FSW5$ $JMAB = \overline{FSW6}$ $JMAA = FSW6$ $JMAB = \overline{FSW7}$ $JMAA = FSW7$ $JMAB = \overline{FSW8}$ $JMAA = FSW8$

MICROPROGRAM STORAGE UNIT

FIG. 80.

COMBINED MAJOR STATUS SIGNALS

D123 + D122 + D121 + D120 = DST6

D133 + D132 + D131 + D130 = DST7

D143 + D142 + D141 + D140 = DST8

D153 + D152 + D151 + D150 = DST9

Peripheral Channels A-D

RAM0 DAST + RBM0 DBST + RCM0 DCST + RDM0 DDST = D120

RAM1 DAST + RBM1 DBST + RCM1 DCST + RDM1 DDST = D130

RAM2 DAST + RBM2 DBST + RCM2 DCST + RDM2 DDST = D140

RAM3 DAST + RBM3 DBST + RCM3 DCST + RDM3 DDST = D150

Peripheral Channels E-H

REM0 DEST + RFM0 DFST + RGM0 DGST + RHM0 DHST = D121

REM1 DEST + RFM1 DFST + RGM1 DGST + RHM1 DHST = D131

REM2 DEST + RFM2 DFST + RGM2 DGST + RHM2 DHST = D141

REM3 DEST + RFM3 DFST + RGM3 DGST + RHM3 DHST = D151

Peripheral Channels J-M

RJM0 DJST + RKM0 DKST + RLM0 DLST + RMM0 DMST = D122

RJM1 DJST + RKM1 DKST + RLM1 DLST + RMM1 DMST = D132

RJM2 DJST + RKM2 DKST + RLM2 DLST + RMM2 DMST = D142

RJM3 DJST + RKM3 DKST + RLM3 DLST + RMM3 DMST = D152

PERIPHERAL CHANNEL UNIT

FIG. 81.

COMBINED MAJOR STATUS SIGNALS (Cont.)

Peripheral Channels N-R

RNM0 DNST + RPM0 DPST + RQM0 DQST + RRM0 DRST = D123

RNM1 DNST + RPM1 DPST + RQM1 DQST + RRM1 DRST = D133

RNM2 DNST + RPM2 DPST + RQM2 DQST + RRM2 DRST = D143

RNM3 DNST + RPM3 DPST + RQM3 DQST + RRM3 DRST = D153

COMBINED BUFFER COUNT SIGNALS

Peripheral Channels A-D

FAA1 FTL0 DPD0 + FBA1 FTL2 DPD0 + FCA1 FTL4 DPD0
+ FDA1 FTL6 DPD0 = DA10

Peripheral Channels E-H

FEA1 FTL0 DPD1 + FFA1 FTL2 DPD1 + FGA1 FTL4 DPD1
+ FHA1 FTL6 DPD1 = DA11

Peripheral Channels J-M

FJA1 FTL0 DPD2 + FKA1 FTL2 DPD2 + FLA1 FTL4 DPD2
+ FMA1 FTL6 DPD2 = DA12

Peripheral Channels N-R

FNA1 FTL0 DPD3 + FPA1 FTL2 DPD3 + FQA1 FTL4 DPD3
+ FRA1 FTL6 DPD3 = DA13

PERIPHERAL CHANNEL UNIT
FIG.82.

RESET DATA SERVICE SIGNALS (PERIPHERAL CHANNELS A-R)

DASS DRDS = DAAD
DBSS DRDS = DBAD
DCSS DRDS = DCAD
DDSS DRDS = DDAD
DESS DRDS = DEAD
DFSS DRDS = DFAD
DGSS DRDS = DGAD
DHSS DRDS = DHAD
DJSS DRDS = DJAD
DKSS DRDS = DKAD
DLSS DRDS = DLAD
DMSS DRDS = DMAD
DNSS DRDS = DNAD
DPSS DRDS = DPAD
DQSS DRDS = DQAD
DRSS DRDS = DRAD

RESET PERIPHERAL CHANNEL RECEIVER SIGNALS (PERIPHERAL CHANNELS A-R)

DAT1 = DARR
DBT1 = DBRR
DCT1 = DCRR
DDT1 = DDRR
DET1 = DERR
DFT1 = DFRR
DGT1 = DGRR
DHT1 = DHRR
DJT1 = DJRR
DKT1 = DKRR
DLT1 = DLRR
DMT1 = DMRR
DNT1 = DNRR
DPT1 = DPRR
DQT1 = DQRR
DRT1 = DRRR

PERIPHERAL CHANNEL UNIT
FIG.83.

SIGNALS REPRESENTING DECODED CONTENTS OF S-REGISTER AND IDENTIFYING ONE OF PERIPHERAL CHANNELS A-R

| | | | | | | | | | | | |
|---|---|---|---|---|---|---|---|---|---|---|---|
| $\overline{FS02}$ | $\overline{FS03}$ | $\overline{FS04}$ | $\overline{FS05}$ | = | DASD | $\overline{FS02}$ | $\overline{FS03}$ | $\overline{FS04}$ | FS05 | = | DJSD |
| FS02 | $\overline{FS03}$ | $\overline{FS04}$ | $\overline{FS05}$ | = | DBSD | FS02 | $\overline{FS03}$ | $\overline{FS04}$ | FS05 | = | DKSD |
| $\overline{FS02}$ | FS03 | $\overline{FS04}$ | $\overline{FS05}$ | = | DCSD | $\overline{FS02}$ | FS03 | $\overline{FS04}$ | FS05 | = | DLSD |
| FS02 | FS03 | $\overline{FS04}$ | $\overline{FS05}$ | = | DDSD | FS02 | FS03 | $\overline{FS04}$ | FS05 | = | DMSD |
| $\overline{FS02}$ | $\overline{FS03}$ | FS04 | $\overline{FS05}$ | = | DESD | $\overline{FS02}$ | $\overline{FS03}$ | FS04 | FS05 | = | DNSD |
| FS02 | $\overline{FS03}$ | FS04 | $\overline{FS05}$ | = | DFSD | FS02 | $\overline{FS03}$ | FS04 | FS05 | = | DPSD |
| $\overline{FS02}$ | FS03 | FS04 | $\overline{FS05}$ | = | DGSD | $\overline{FS02}$ | FS03 | FS04 | FS05 | = | DQSD |
| FS02 | FS03 | FS04 | $\overline{FS05}$ | = | DHSD | FS02 | FS03 | FS04 | FS05 | = | DRSD |

SIGNALS REPRESENTING DECODED CONTENTS OF E-REGISTER AND IDENTIFYING ONE OF PERIPHERAL CHANNELS A-R

| | | | | | | | | | | | |
|---|---|---|---|---|---|---|---|---|---|---|---|
| $\overline{JE02}$ | $\overline{JE03}$ | $\overline{JE04}$ | $\overline{JE05}$ | = | DASS | $\overline{JE02}$ | $\overline{JE03}$ | $\overline{JE04}$ | JE05 | = | DJSS |
| JE02 | $\overline{JE03}$ | $\overline{JE04}$ | $\overline{JE05}$ | = | DBSS | JE02 | $\overline{JE03}$ | $\overline{JE04}$ | JE05 | = | DKSS |
| $\overline{JE02}$ | JE03 | $\overline{JE04}$ | $\overline{JE05}$ | = | DCSS | $\overline{JE02}$ | JE03 | $\overline{JE04}$ | JE05 | = | DLSS |
| JE02 | JE03 | $\overline{JE04}$ | $\overline{JE05}$ | = | DDSS | JE02 | JE03 | $\overline{JE04}$ | JE05 | = | DMSS |
| $\overline{JE02}$ | $\overline{JE03}$ | JE04 | $\overline{JE05}$ | = | DESS | $\overline{JE02}$ | $\overline{JE03}$ | JE04 | JE05 | = | DNSS |
| JE02 | $\overline{JE03}$ | JE04 | $\overline{JE05}$ | = | DFSS | JE02 | $\overline{JE03}$ | JE04 | JE05 | = | DPSS |
| $\overline{JE02}$ | JE03 | JE04 | $\overline{JE05}$ | = | DGSS | $\overline{JE02}$ | JE03 | JE04 | JE05 | = | DQSS |
| JE02 | JE03 | JE04 | $\overline{JE05}$ | = | DHSS | JE02 | JE03 | JE04 | JE05 | = | DRSS |

PERIPHERAL CHANNEL UNIT

FIG. 84

MAJOR STATUS GATING SIGNALS (PERIPHERAL CHANNELS A-R)

| | | | | | |
|---|---|---|---|---|---|
| DSTD DASD | = | DAST | DSTD DJSD | = | DJST |
| DSTD DBSD | = | DBST | DSTD DKSD | = | DKST |
| DSTD DCSD | = | DCST | DSTD DLSD | = | DLST |
| DSTD DDSD | = | DDST | DSTD DMSD | = | DMST |
| DSTD DESD | = | DEST | DSTD DNSD | = | DNST |
| DSTD DFSD | = | DFST | DSTD DPSD | = | DPST |
| DSTD DGSD | = | DGST | DSTD DQSD | = | DQST |
| DSTD DHSD | = | DHST | DSTD DRSD | = | DRST |

INTERNAL DATA SWITCH SIGNALS

Peripheral Channels A-D

| | | |
|---|---|---|
| FTL0 RAE0 + FTL2 RBE0 + FTL4 RCE0 + FTL6 RDE0 | = | DC00 |
| FTL0 RAE1 + FTL2 RBE1 + FTL4 RCE1 + FTL6 RDE1 | = | DC01 |
| FTL0 RAE2 + FTL2 RBE2 + FTL4 RCE2 + FTL6 RDE2 | = | DC02 |
| FTL0 RAE3 + FTL2 RBE3 + FTL4 RCE3 + FTL6 RDE3 | = | DC03 |
| FTL0 RAE4 + FTL2 RBE4 + FTL4 RCE4 + FTL6 RDE4 | = | DC04 |
| FTL0 RAE5 + FTL2 RBE5 + FTL4 RCE5 + FTL6 RDE5 | = | DC05 |
| FTL0 RAE6 + FTL2 RBE6 + FTL4 RCE6 + FTL6 RDE6 | = | DC06 |

Peripheral Channels E-H

| | | |
|---|---|---|
| FTL0 REE0 + FTL2 RFE0 + FTL4 RGE0 + FTL6 RHE0 | = | DC10 |
| FTL0 REE1 + FTL2 RFE1 + FTL4 RGE1 + FTL6 RHE1 | = | DC11 |

PERIPHERAL CHANNEL UNIT

FIG.85.

INTERNAL DATA SWITCH SIGNALS (Cont.)

Peripheral Channels E-H (Cont.)

FTLO REE2 + FTL2 RFE2 + FTL4 RGE2 + FTL6 RHE2 = DC12

FTLO REE3 + FTL2 RFE3 + FTL4 RGE3 + FTL6 RHE3 = DC13

FTLO REE4 + FTL2 RFE4 + FTL4 RGE4 + FTL6 RHE4 = DC14

FTLO REE5 + FTL2 RFE5 + FTL4 RGE5 + FTL6 RHE5 = DC15

FTLO REE6 + FTL2 RFE6 + FTL4 RGE6 + FTL6 RHE6 = DC16

Peripheral Channels J-M

FTLO RJE0 + FTL2 RKE0 + FTL4 RLE0 + FTL6 RME0 = DC20

FTLO RJE1 + FTL2 RKE1 + FTL4 RLE1 + FTL6 RME1 = DC21

FTLO RJE2 + FTL2 RKE2 + FTL4 RLE2 + FTL6 RME2 = DC22

FTLO RJE3 + FTL2 RKE3 + FTL4 RLE3 + FTL6 RME3 = DC23

FTLO RJE4 + FTL2 RKE4 + FTL4 RLE4 + FTL6 RME4 = DC24

FTLO RJE5 + FTL2 RKE5 + FTL4 RLE5 + FTL6 RME5 = DC25

FTLO RJE6 + FTL2 RKE6 + FTL4 RLE6 + FTL6 RME6 = DC26

Peripheral Channels N-R

FTLO RNE0 + FTL2 RPE0 + FTL4 RQE0 + FTL6 RRE0 = DC30

FTLO RNE1 + FTL2 RPE1 + FTL4 RQE1 + FTL6 RRE1 = DC31

FTLO RNE2 + FTL2 RPE2 + FTL4 RQE2 + FTL6 RRE2 = DC32

FTLO RNE3 + FTL2 RPE3 + FTL4 RQE3 + FTL6 RRE3 = DC33

FTLO RNE4 + FTL2 RPE4 + FTL4 RQE4 + FTL6 RRE4 = DC34

PERIPHERAL CHANNEL UNIT

FIG.86.

INTERNAL SWITCH SIGNALS (Cont.)

Peripheral Channels N-R (Cont.)

FTL0 RNE5 + FTL2 RPE5 + FTL4 RQE5 + FTL6 RRE5 = DC35

FTL0 RNE6 + FTL2 RPE6 + FTL4 RQE6 + FTL6 RRE6 = DC36

DATA SWITCH OUTPUT SIGNALS

DPD0 DC00 + DPD1 DC10 + DPD2 DC20 + DPD3 DC30 = DTC0

DPD0 DC01 + DPD1 DC11 + DPD2 DC21 + DPD3 DC31 = DTC1

DPD0 DC02 + DPD1 DC12 + DPD2 DC22 + DPD3 DC32 = DTC2

DPD0 DC03 + DPD1 DC13 + DPD2 DC23 + DPD3 DC33 = DTC3

DPD0 DC04 + DPD1 DC14 + DPD2 DC24 + DPD3 DC34 = DTC4

DPD0 DC05 + DPD1 DC15 + DPD2 DC25 + DPD3 DC35 = DTC5

DPD0 DC06 + DPD1 DC16 + DPD2 DC26 + DPD3 DC36 = DTC6

BUFFER CONTROL SIGNALS $\overline{JCD0}$ FCAP + DTFG + $\overline{JJ00}$ JMLT = $\overline{DTF0}$

JCD0 FCAP + JJ00 JMLT + DTFG = DTF0

$\overline{JCD1}$ FCAP + $\overline{DAD1}$ DTFG + $\overline{JJ01}$ JMLT = $\overline{DTF1}$

JCD1 FCAP + DAD1 DTFG + JJ01 JMLT = DTF1

$\overline{JK02}$ FCAP + $\overline{DT26}$ DTFG + $\overline{JJ02}$ JMLT = $\overline{DTF2}$

JK02 FCAP + DT26 DTFG + JJ02 JMLT = DTF2

$\overline{JK03}$ FCAP + $\overline{DT46}$ DTFG + $\overline{JJ03}$ JMLT = $\overline{DTF3}$

JK03 FCAP + DT46 DTFG + JJ03 JMLT = DTF3

*PERIPHERAL CHANNEL UNIT*

*FIG.87*

BUFFER CONTROL SIGNALS (Cont.)

$\overline{JK04}$ FCAP + $\overline{DAD4}$ DTFG + $\overline{JJ04}$ JMLT = $\overline{DTF4}$

JK04 FCAP + DAD4 DTFG + JJ04 JMLT = DTF4

$\overline{JK05}$ FCAP + $\overline{DAD5}$ DTFG + $\overline{JJ05}$ JMLT = $\overline{DTF5}$

JK05 FCAP + DAD5 DTFG + JJ05 JMLT = DTF5

$\overline{JCD6}$ FCAP + DTFG + $\overline{JJ06}$ JMLT = $\overline{DTF6}$

JN21 FCAP + JJ06 JMLT = DTF6

$\overline{JCD7}$ FCAP + DTFG + $\overline{JJ07}$ JMLT = $\overline{DTRD}$

JN22 FCAP + JJ07 JMLT = DTRD $\overline{JCD9}$ FCAP + $\overline{JJ09}$ JMLT = $\overline{DTSH}$

JN24 FCAP + DTFG + JJ09 JMLT = DTSH $\overline{JCD8}$ FCAP + DTFG + $\overline{JJ08}$ JMLT = $\overline{DTWR}$

JN23 FCAP + JJ08 JMLT = DTWR

TWO-LEVEL PRIORITY ACCESS SIGNALS (PERIPHERAL CHANNELS A-R)

| | | | |
|---|---|---|---|
| FCH0 FTL2 = DACH | FCH1 FTL2 = DECH | FCH2 FTL2 = DJCH | FCH3 FTL2 = DNCH |
| FCH0 FTL4 = DBCH | FCH1 FTL4 = DFCH | FCH2 FTL4 = DKCH | FCH3 FTL4 = DPCH |
| FCH0 FTL6 = DCCH | FCH1 FTL6 = DGCH | FCH2 FTL6 = DLCH | FCH3 FTL6 = DQCH |
| FCH0 FTL0 = DDCH | FCH1 FTL0 = DHCH | FCH2 FTL0 = DMCH | FCH3 FTL0 = DRCH |

| | | | |
|---|---|---|---|
| DACH DTL1 = DAT1 | DECH DTL1 = DET1 | DJCH DTL1 = DJT1 | DNCH DTL1 = DNT1 |
| DBCH DTL1 = DBT1 | DFCH DTL1 = DFT1 | DKCH DTL1 = DKT1 | DPCH DTL1 = DPT1 |
| DCCH DTL1 = DCT1 | DGCH DTL1 = DGT1 | DLCH DTL1 = DLT1 | DQCH DTL1 = DQT1 |
| DDCH DTL1 = DDT1 | DHCH DTL1 = DHT1 | DMCH DTL1 = DMT1 | DRCH DTL1 = DRT1 |

PERIPHERAL CHANNEL UNIT

FIG. 88.

BUFFER STATE SIGNALS (PERIPHERAL CHANNELS A-R)

| | | | | | |
|---|---|---|---|---|---|
| FAD0 + FAD1 | = | DADA | FJD0 + FJD1 | = | DJDA |
| FBD0 + FBD1 | = | DBDA | FKD0 + FKD1 | = | DKDA |
| FCD0 + FCD1 | = | DCDA | FLD0 + FLD1 | = | DLDA |
| FDD0 + FDD1 | = | DDDA | FMD0 + FMD1 | = | DMDA |
| FED0 + FED1 | = | DEDA | FND0 + FND1 | = | DNDA |
| FFD0 + FFD1 | = | DFDA | FPD0 + FPD1 | = | DPDA |
| FGD0 + FGD1 | = | DGDA | FQD0 + FQD1 | = | DQDA |
| FHD0 + FHD1 | = | DHDA | FRD0 + FRD1 | = | DRDA |

INPUT SIGNALS TO ROUTINE REQUEST FLIP-FLOPS

| | | |
|---|---|---|
| DADA DT04 + RAES FTL2 + RAET FTL6 | = | DADM |
| DBDA DT04 + RBES FTL2 + RBET FTL6 | = | DBDM |
| DCDA DT04 + RCES FTL2 + RCET FTL6 | = | DCDM |
| DDDA DT04 + RDES FTL2 + RDET FTL6 | = | DDDM |
| DEDA DT04 + REES FTL2 + REET FTL6 | = | DEDM |
| DFDA DT04 + RFES FTL2 + RFET FTL6 | = | DFDM |
| DGDA DT04 + RGES FTL2 + RGET FTL6 | = | DGDM |
| DHDA DT04 + RHES FTL2 + RHET FTL6 | = | DHDM |
| DJDA DT04 + RJES FTL2 + RJET FTL6 | = | DJDM |
| DKDA DT04 + RKES FTL2 + RKET FTL6 | = | DKDM |
| DLDA DT04 + RLES FTL2 + RLET FTL6 | = | DLDM |
| DMDA DT04 + RMES FTL2 + RMET FTL6 | = | DMDM |
| DNDA DT04 + RNES FTL2 + RNET FTL6 | = | DNDM |
| DPDA DT04 + RPES FTL2 + RPET FTL6 | = | DPDM |

PERIPHERAL CHANNEL UNIT
FIG.89.

Oct. 28, 1969 J. W. FIGUEROA ET AL 3,475,730

INFORMATION SHIFT APPARATUS IN A COMPUTER SYSTEM

Filed May 27, 1966 207 Sheets-Sheet 99

INPUT SIGNALS TO INTERRUPT DEMAND FLIP-FLOPS (Cont.)

DQDA DT04 + RQES FTL2 + RQET FTL6 = DQDM

DRDA DT04 + RRES FTL2 + RRET FTL6 = DRDM

PRIORITY DECISION SIGNALS (SELECT PERIPHERAL CHANNELS A-R)

FADM = DADP

FBDM $\overline{\text{DADP}}$ = DBDP

FCDM $\overline{\text{DADP}}$ $\overline{\text{DBDP}}$ = DCDP

FDDM $\overline{\text{DADP}}$ $\overline{\text{DBDP}}$ $\overline{\text{DCDP}}$ = DDDP FEDM $\overline{\text{DDP0}}$ = DEDP FFDM $\overline{\text{DDP0}}$ $\overline{\text{DEDP}}$ = DFDP FGDM $\overline{\text{DDP0}}$ $\overline{\text{DEDP}}$ $\overline{\text{DFDP}}$ = DGDP FHDM $\overline{\text{DDP0}}$ $\overline{\text{DEDP}}$ $\overline{\text{DFDP}}$ $\overline{\text{DGDP}}$ = DHDP FJDM $\overline{\text{DDP0}}$ $\overline{\text{DDP1}}$ = DJDP FKDM $\overline{\text{DDP0}}$ $\overline{\text{DDP1}}$ $\overline{\text{DJDP}}$ = DKDP FLDM $\overline{\text{DDP0}}$ $\overline{\text{DJDP}}$ $\overline{\text{DKDP}}$ $\overline{\text{DDP1}}$ = DLDP FMDM $\overline{\text{DDP0}}$ $\overline{\text{DJDP}}$ $\overline{\text{DKDP}}$ $\overline{\text{DLDP}}$ $\overline{\text{DDP1}}$ = DMDP FNDM $\overline{\text{DDP0}}$ $\overline{\text{DDP1}}$ $\overline{\text{DDP2}}$ = DNDP FPDM $\overline{\text{DDP0}}$ $\overline{\text{DDP2}}$ $\overline{\text{DNDP}}$ $\overline{\text{DDP1}}$ = DPDP FQDM $\overline{\text{DDP0}}$ $\overline{\text{DDP2}}$ $\overline{\text{DNDP}}$ $\overline{\text{DPDP}}$ $\overline{\text{DDP1}}$ = DQDP FRDM $\overline{\text{DDP2}}$ $\overline{\text{DNDP}}$ $\overline{\text{DPDP}}$ $\overline{\text{DQDP}}$ $\overline{\text{DDP0}}$ $\overline{\text{DDP1}}$ = DRDP

PERIPHERAL CHANNEL UNIT

FIG. 90

PRIORITY REQUEST SIGNALS (PERIPHERAL CHANNELS A-R)

| | | | | | |
|---|---|---|---|---|---|
| DGRQ DASD | = | DART | DGRQ DJSD | = | DJRT |
| DGRQ DBSD | = | DBRT | DGRQ DKSD | = | DKRT |
| DGRQ DCSD | = | DCRT | DGRQ DLSD | = | DLRT |
| DGRQ DDSD | = | DDRT | DGRQ DMSD | = | DMRT |
| DGRQ DESD | = | DERT | DGRQ DNSD | = | DNRT |
| DGRQ DFSD | = | DFRT | DGRQ DPSD | = | DPRT |
| DGRQ DGSD | = | DGRT | DGRQ DQSD | = | DQRT |
| DGRQ DHSD | = | DHRT | DGRQ DRSD | = | DRRT |

IOC-TO-PERIPHERAL CHARACTER GATING SIGNALS
(PERIPHERAL CHANNELS A-R)

| | | | | | |
|---|---|---|---|---|---|
| DSWC DAT1 | = | DASW | DSWC DJT1 | = | DJSW |
| DSWC DBT1 | = | DBSW | DSWC DKT1 | = | DKSW |
| DSWC DCT1 | = | DCSW | DSWC DLT1 | = | DLSW |
| DSWC DDT1 | = | DDSW | DSWC DMT1 | = | DMSW |
| DSWC DET1 | = | DESW | DSWC DNT1 | = | DNSW |
| DSWC DFT1 | = | DFSW | DSWC DPT1 | = | DPSW |
| DSWC DGT1 | = | DGSW | DSWC DQT1 | = | DQSW |
| DSWC DHT1 | = | DHSW | DSWC DRT1 | = | DRSW |

PRIORITY DECISION GROUP SIGNALS

| Group 0 - Peripheral Channels A-D | | | Group 1 - Peripheral Channels E-H | | |
|---|---|---|---|---|---|
| FRQ0 | = | DPD0 | FRQ1 $\overline{\text{FRQ0}}$ | = | DPD1 |

PERIPHERAL CHANNEL UNIT

FIG. 91.

PRIORITY DECISION GROUP SIGNALS (Cont.)

Group 2 - Peripheral Channels J-M $FRQ2\ \overline{FRQ0}\ \overline{FRQ1} = DPD2$ Group 3 - Peripheral Channels N-R $FRQ3\ \overline{FRQ0}\ \overline{FRQ1}\ \overline{FRQ2} = DPD3$

GROUP PRIORITY REQUEST SIGNALS

Group 0 - Peripheral Channels A-D $$\begin{aligned}&FTL6\ (RAER + RAEW + DART)\ (\overline{FAD0} + \overline{FAD1})\\ &+ FTL0\ (RBER + RBEW + DBRT)\ (\overline{FBD0} + \overline{FBD1})\\ &+ FTL2\ (RCER + RCEW + DCRT)\ (\overline{FCD0} + \overline{FCD1})\\ &+ FTL4\ (RDER + RDEW + DDRT)\ (\overline{FDD0} + \overline{FDD1}) = DRQ0\end{aligned}$$

Group 1 - Peripheral Channels E-H $$\begin{aligned}&FTL6\ (REER + REEW + DERT)\ (\overline{FED0} + \overline{FED1})\\ &+ FTL0\ (RFER + RFEW + DFRT)\ (\overline{FFD0} + \overline{FFD1})\\ &+ FTL2\ (RGER + RGEW + DGRT)\ (\overline{FGD0} + \overline{FGD1})\\ &+ FTL4\ (RHER + RHEW + DHRT)\ (\overline{FHD0} + \overline{FHD1}) = DRQ1\end{aligned}$$

Group 2 - Peripheral Channels J-M $$\begin{aligned}&FTL6\ (RJER + RJEW + DJRT)\ (\overline{FJD0} + \overline{FJD1})\\ &+ FTL0\ (RKER + RKEW + DKRT)\ (\overline{FKD0} + \overline{FKD1})\\ &+ FTL2\ (RLER + RLEW + DLRT)\ (\overline{FLD0} + \overline{FLD1})\\ &+ FTL4\ (RMER + RMEW + DMRT)\ (\overline{FMD0} + \overline{FMD1}) = DRQ2\end{aligned}$$

Group 3 - Peripheral Channels N-R $$\begin{aligned}&FTL6\ (RNER + RNEW + DNRT)\ (\overline{FND0} + \overline{FND1})\\ &+ FTL0\ (RPER + RPEW + DPRT)\ (\overline{FPD0} + \overline{FPD1})\\ &+ FTL2\ (RQER + RQEW + DQRT)\ (\overline{FQD0} + \overline{FQD1})\\ &+ FTL4\ (RRER + RREW + DRRT)\ (\overline{FRD0} + \overline{FRD1}) = DRQ3\end{aligned}$$

PERIPHERAL CHANNEL UNIT

FIG. 92.

TIMING CONTROL SIGNALS

| | | | | | |
|---|---|---|---|---|---|
| QPHD $\overline{FCAP}$ | = | QPH1 | QPHP $\overline{FCAP}$ | = | QPHD |
| QPHD | = | QPH2 | QPHP | = | QPHE |
| QPHP FRUN | = | QPHC | QPHC + $\overline{FRUN}$ | = | QPHP |

SIGNALS TRANSMITTED FROM PERIPHERAL SUBSYSTEM TO IOC

Input Data Signals

Peripheral Channel A

| | | | | | |
|---|---|---|---|---|---|
| DARR + JAPO | = | $\overline{RAE0}$ | JAE3 | = | RAE3 |
| JAE0 | = | RAE0 | DARR + JAPO | = | $\overline{RAE4}$ |
| DARR + JAPO | = | $\overline{RAE1}$ | JAE4 | = | RAE4 |
| JAE1 | = | RAE1 | DARR + JAPO | = | $\overline{RAE5}$ |
| DARR + JAPO | = | $\overline{RAE2}$ | JAE5 | = | RAE5 |
| JAE2 | = | RAE2 | DARR + JAPO | = | $\overline{RAE6}$ |
| DARR + JAPO | = | $\overline{RAE3}$ | JAE6 | = | RAE6 |

Peripheral Channel B

| | | | | | |
|---|---|---|---|---|---|
| DBRR + JBPO | = | $\overline{RBE0}$ | JBE3 | = | RBE3 |
| JBE0 | = | RBE0 | DBRR + JBPO | = | $\overline{RBE4}$ |
| DBRR + JBPO | = | $\overline{RBE1}$ | JBE4 | = | RBE4 |
| JBE1 | = | RBE1 | DBRR + JBPO | = | $\overline{RBE5}$ |
| DBRR + JBPO | = | $\overline{RBE2}$ | JBE5 | = | RBE5 |
| JBE2 | = | RBE2 | DBRR + JBPO | = | $\overline{RBE6}$ |
| DBRR + JBPO | = | $\overline{RBE3}$ | JBE6 | = | RBE6 |

PERIPHERAL CHANNEL UNIT
FIG. 93

SIGNALS TRANSMITTED FROM PERIPHERAL SUBSYSTEM TO IOC (Cont.)

Input Data Signals (Cont.)

Peripheral Channel C

| | | | | | |
|---|---|---|---|---|---|
| DCRR + JCP0 | = | $\overline{RCE0}$ | JCE3 | = | RCE3 |
| JCE0 | = | RCE0 | DCRR + JCP0 | = | $\overline{RCE4}$ |
| DCRR + JCP0 | = | $\overline{RCE1}$ | JCE4 | = | RCE4 |
| JCE1 | = | RCE1 | DCRR + JCP0 | = | $\overline{RCE5}$ |
| DCRR + JCP0 | = | $\overline{RCE2}$ | JCE5 | = | RCE5 |
| JCE2 | = | RCE2 | DCRR + JCP0 | = | $\overline{RCE6}$ |
| DCRR + JCP0 | = | $\overline{RCE3}$ | JCE6 | = | RCE6 |

Peripheral Channel D

| | | | | | |
|---|---|---|---|---|---|
| DDRR + JDP0 | = | $\overline{RDE0}$ | JDE3 | = | RDE3 |
| JDE0 | = | RDE0 | DDRR + JDP0 | = | $\overline{RDE4}$ |
| DDRR + JDP0 | = | $\overline{RDE1}$ | JDE4 | = | RDE4 |
| JDE1 | = | RDE1 | DDRR + JDP0 | = | $\overline{RDE5}$ |
| DDRR + JDP0 | = | $\overline{RDE2}$ | JDE5 | = | RDE5 |
| JDE2 | = | RDE2 | DDRR + JDP0 | = | $\overline{RDE6}$ |
| DDRR + JDP0 | = | $\overline{RDE3}$ | JDE6 | = | RDE6 |

PERIPHERAL CHANNEL UNIT

FIG.94

SIGNALS TRANSMITTED FROM PERIPHERAL SUBSYSTEM TO IOC (Cont.)

Input Data Signals (Cont.)

Peripheral Channel E

| | | | | | |
|---|---|---|---|---|---|
| DERR + JEPO | = | $\overline{\text{REE0}}$ | JEE3 | = | REE3 |
| JEE0 | = | REE0 | DERR + JEPO | = | $\overline{\text{REE4}}$ |
| DERR + JEPO | = | $\overline{\text{REE1}}$ | JEE4 | = | REE4 |
| JEE1 | = | REE1 | DERR + JEPO | = | $\overline{\text{REE5}}$ |
| DERR + JEPO | = | $\overline{\text{REE2}}$ | JEE5 | = | REE5 |
| JEE2 | = | REE2 | DERR + JEPO | = | $\overline{\text{REE6}}$ |
| DERR + JEPO | = | $\overline{\text{REE3}}$ | JEE6 | = | REE6 |

Peripheral Channel F

| | | | | | |
|---|---|---|---|---|---|
| DFRR + JFPO | = | $\overline{\text{RFE0}}$ | JFE3 | = | RFE3 |
| JFE0 | = | RFE0 | DFRR + JFPO | = | $\overline{\text{RFE4}}$ |
| DFRR + JFPO | = | $\overline{\text{RFE1}}$ | JFE4 | = | RFE4 |
| JFE1 | = | RFE1 | DFRR + JFPO | = | $\overline{\text{RFE5}}$ |
| DFRR + JFPO | = | $\overline{\text{RFE2}}$ | JFE5 | = | RFE5 |
| JFE2 | = | RFE2 | DFRR + JFPO | = | $\overline{\text{RFE6}}$ |
| DFRR + JFPO | = | $\overline{\text{RFE3}}$ | JFE6 | = | RFE6 |

PERIPHERAL CHANNEL UNIT

FIG. 95.

SIGNALS TRANSMITTED FROM PERIPHERAL SUBSYSTEM TO IOC (Cont.)

Input Data Signals (Cont.)

Peripheral Channel G

DGRR + JGPO = $\overline{\text{RGE0}}$
JGE0 = RGE0
DGRR + JGPO = $\overline{\text{RGE1}}$
JGE1 = RGE1
DGRR + JGPO = $\overline{\text{RGE2}}$
JGE2 = RGE2
DGRR + JGPO = $\overline{\text{RGE3}}$
JGE3 = RGE3
DGRR + JGPO = $\overline{\text{RGE4}}$
JGE4 = RGE4
DGRR + JGPO = $\overline{\text{RGE5}}$
JGE5 = RGE5
DGRR + JGPO = $\overline{\text{RGE6}}$
JGE6 = RGE6

Peripheral Channel H

DHRR + JHPO = $\overline{\text{RHE0}}$
JHE0 = RHE0
DHRR + JHPO = $\overline{\text{RHE1}}$
JHE1 = RHE1
DHRR + JHPO = $\overline{\text{RHE2}}$
JHE2 = RHE2
DHRR + JHPO = $\overline{\text{RHE3}}$
JHE3 = RHE3
DHRR + JHPO = $\overline{\text{RHE4}}$
JHE4 = RHE4
DHRR + JHPO = $\overline{\text{RHE5}}$
JHE5 = RHE5
DHRR + JHPO = $\overline{\text{RHE6}}$
JHE6 = RHE6

PERIPHERAL CHANNEL UNIT
FIG. 96

SIGNALS TRANSMITTED FROM PERIPHERAL SUBSYSTEM TO IOC (Cont.)

Input Data Signals (Cont.)

Peripheral Channel J

| | | | | | |
|---|---|---|---|---|---|
| DJRR + JJP0 | = | $\overline{RJE0}$ | JJE3 | = | RJE3 |
| JJE0 | = | RJE0 | DJRR + JJP0 | = | $\overline{RJE4}$ |
| DJRR + JJP0 | = | $\overline{RJE1}$ | JJE4 | = | RJE4 |
| JJE1 | = | RJE1 | DJRR + JJP0 | = | $\overline{RJE5}$ |
| DJRR + JJP0 | = | $\overline{RJE2}$ | JJE5 | = | RJE5 |
| JJE2 | = | RJE2 | DJRR + JJP0 | = | $\overline{RJE6}$ |
| DJRR + JJP0 | = | $\overline{RJE3}$ | JJE6 | = | RJE6 |

Peripheral Channel K

| | | | | | |
|---|---|---|---|---|---|
| DKRR + JKP0 | = | $\overline{RKE0}$ | JKE3 | = | RKE3 |
| JKE0 | = | RKE0 | DKRR + JKP0 | = | $\overline{RKE4}$ |
| DKRR + JKP0 | = | $\overline{RKE1}$ | JKE4 | = | RKE4 |
| JKE1 | = | RKE1 | DKRR + JKP0 | = | $\overline{RKE5}$ |
| DKRR + JKP0 | = | $\overline{RKE2}$ | JKE5 | = | RKE5 |
| JKE2 | = | RKE2 | DKRR + JKP0 | = | $\overline{RKE6}$ |
| DKRR + JKP0 | = | $\overline{RKE3}$ | JKE6 | = | RKE6 |

PERIPHERAL CHANNEL UNIT
FIG. 97

SIGNALS TRANSMITTED FROM PERIPHERAL SUBSYSTEM TO IOC (Cont.)

Input Data Signals (Cont.)

Peripheral Channel L

DLRR + JLPO = $\overline{\text{RLE0}}$
JLE0 = RLE0
DLRR + JLPO = $\overline{\text{RLE1}}$
JLE1 = RLE1
DLRR + JLPO = $\overline{\text{RLE2}}$
JLE2 = RLE2
DLRR + JLPO = $\overline{\text{RLE3}}$
JLE3 = RLE3
DLRR + JLPO = $\overline{\text{RLE4}}$
JLE4 = RLE4
DLRR + JLPO = $\overline{\text{RLE5}}$
JLE5 = RLE5
DLRR + JLPO = $\overline{\text{RLE6}}$
JLE6 = RLE6

Peripheral Channel M

DMRR + JMPO = $\overline{\text{RME0}}$
JME0 = RME0
DMRR + JMPO = $\overline{\text{RME1}}$
JME1 = RME1
DMRR + JMPO = $\overline{\text{RME2}}$
JME2 = RME2
DMRR + JMPO = $\overline{\text{RME3}}$
JME3 = RME3
DMRR + JMPO = $\overline{\text{RME4}}$
JME4 = RME4
DMRR + JMPO = $\overline{\text{RME5}}$
JME5 = RME5
DMRR + JMPO = $\overline{\text{RME6}}$
JME6 = RME6

PERIPHERAL CHANNEL UNIT
FIG. 98.

SIGNALS TRANSMITTED FROM PERIPHERAL SUBSYSTEM TO IOC (Cont.)

Input Data Signals (Cont.)

Peripheral Channel N

| | | |
|---|---|---|
| DNRR + JNPO | = | $\overline{RNE0}$ |
| JNE0 | = | RNE0 |
| DNRR + JNPO | = | $\overline{RNE1}$ |
| JNE1 | = | RNE1 |
| DNRR + JNPO | = | $\overline{RNE2}$ |
| JNE2 | = | RNE2 |
| DNRR + JNPO | = | $\overline{RNE3}$ |
| JNE3 | = | RNE3 |
| DNRR + JNPO | = | $\overline{RNE4}$ |
| JNE4 | = | RNE4 |
| DNRR + JNPO | = | $\overline{RNE5}$ |
| JNE5 | = | RNE5 |
| DNRR + JNPO | = | $\overline{RNE6}$ |
| JNE6 | = | RNE6 |

Peripheral Channel P

| | | |
|---|---|---|
| DPRR + JPPO | = | $\overline{RPE0}$ |
| JPE0 | = | RPE0 |
| DPRR + JPPO | = | $\overline{RPE1}$ |
| JPE1 | = | RPE1 |
| DPRR + JPPO | = | $\overline{RPE2}$ |
| JPE2 | = | RPE2 |
| DPRR + JPPO | = | $\overline{RPE3}$ |
| JPE3 | = | RPE3 |
| DPRR + JPPO | = | $\overline{RPE4}$ |
| JPE4 | = | RPE4 |
| DPRR + JPPO | = | $\overline{RPE5}$ |
| JPE5 | = | RPE5 |
| DPRR + JPPO | = | $\overline{RPE6}$ |
| JPE6 | = | RPE6 |

PERIPHERAL CHANNEL UNIT
FIG. 99

Oct. 28, 1969 J. W. FIGUEROA ET AL 3,475,730
INFORMATION SHIFT APPARATUS IN A COMPUTER SYSTEM
Filed May 27, 1966 307 Sheets-Sheet 109

SIGNALS TRANSMITTED FROM PERIPHERAL SUBSYSTEM TO IOC (Cont.)

Input Data Signals (Cont.)

Peripheral Channel Q

| | | | | | |
|---|---|---|---|---|---|
| DQRR + JQPO | = | $\overline{\text{RQE0}}$ | JQE3 | = | RQE3 |
| JQE0 | = | RQE0 | DQRR + JQPO | = | $\overline{\text{RQE4}}$ |
| DQRR + JQPO | = | $\overline{\text{RQE1}}$ | JQE4 | = | RQE4 |
| JQE1 | = | RQE1 | DQRR + JQPO | = | $\overline{\text{RQE5}}$ |
| DQRR + JQPO | = | $\overline{\text{RQE2}}$ | JQE5 | = | RQE5 |
| JQE2 | = | RQE2 | DQRR + JQPO | = | $\overline{\text{RQE6}}$ |
| DQRR + JQPO | = | $\overline{\text{RQE3}}$ | JQE6 | = | RQE6 |

Peripheral Channel R

| | | | | | |
|---|---|---|---|---|---|
| DRRR + JRPO | = | $\overline{\text{RRE0}}$ | JRE3 | = | RRE3 |
| JRE0 | = | RRE0 | DRRR + JRPO | = | $\overline{\text{RRE4}}$ |
| DRRR + JRPO | = | $\overline{\text{RRE1}}$ | JRE4 | = | RRE4 |
| JRE1 | = | RRE1 | DRRR + JRPO | = | $\overline{\text{RRE5}}$ |
| DRRR + JRPO | = | $\overline{\text{RRE2}}$ | JRE5 | = | RRE5 |
| JRE2 | = | RRE2 | DRRR + JRPO | = | $\overline{\text{RRE6}}$ |
| DRRR + JRPO | = | $\overline{\text{RRE3}}$ | JRE6 | = | RRE6 |

PERIPHERAL CHANNEL UNIT
FIG. 100.

SIGNALS TRANSMITTED FROM PERIPHERAL SUBSYSTEM TO IOC (Cont.)

Major Status Signals

Peripheral Channel A

| | | |
|---|---|---|
| JAP0 + JAR0 | = | $\overline{RAM0}$ |
| JAM0 | = | RAM0 |
| JAP0 + JAR1 | = | $\overline{RAM1}$ |
| JAM1 | = | RAM1 |
| JAP0 + JAR2 | = | $\overline{RAM2}$ |
| JAM2 | = | RAM2 |
| JAP0 + JAR3 | = | $\overline{RAM3}$ |
| JAM3 | = | RAM3 |

Peripheral Channel B

| | | |
|---|---|---|
| JBP0 + JBR0 | = | $\overline{RBM0}$ |
| JBM0 | = | RBM0 |
| JBP0 + JBR1 | = | $\overline{RBM1}$ |
| JBM1 | = | RBM1 |
| JBP0 + JBR2 | = | $\overline{RBM2}$ |
| JBM2 | = | RBM2 |
| JBP0 + JBR3 | = | $\overline{RBM3}$ |
| JBM3 | = | RBM3 |

Peripheral Channel C

| | | |
|---|---|---|
| JCP0 + JCR0 | = | $\overline{RCM0}$ |
| JCM0 | = | RCM0 |
| JCP0 + JCR1 | = | $\overline{RCM1}$ |
| JCM1 | = | RCM1 |
| JCP0 + JCR2 | = | $\overline{RCM2}$ |
| JCM2 | = | RCM2 |
| JCP0 + JCR3 | = | $\overline{RCM3}$ |
| JCM3 | = | RCM3 |

Peripheral Channel D

| | | |
|---|---|---|
| JDP0 + JDR0 | = | $\overline{RDM0}$ |
| JDM0 | = | RDM0 |
| JDP0 + JDR1 | = | $\overline{RDM1}$ |
| JDM1 | = | RDM1 |
| JDP0 + JDR2 | = | $\overline{RDM2}$ |
| JDM2 | = | RDM2 |
| JDP0 + JDR3 | = | $\overline{RDM3}$ |
| JDM3 | = | RDM3 |

PERIPHERAL CHANNEL UNIT
FIG. 101.

SIGNALS TRANSMITTED FROM PERIPHERAL SUBSYSTEM TO IOC (Cont.)

Major Status Signals (Cont.)

Peripheral Channel E

| | | |
|---|---|---|
| JEPO + JERO | = | $\overline{REMO}$ |
| JEMO | = | REMO |
| JEPO + JER1 | = | $\overline{REM1}$ |
| JEM1 | = | REM1 |
| JEPO + JER2 | = | $\overline{REM2}$ |
| JEM2 | = | REM2 |
| JEPO + JER3 | = | $\overline{REM3}$ |
| JEM3 | = | REM3 |

Peripheral Channel F

| | | |
|---|---|---|
| JFPO + JFRO | = | $\overline{RFMO}$ |
| JFMO | = | RFMO |
| JFPO + JFR1 | = | $\overline{RFM1}$ |
| JFM1 | = | RFM1 |
| JFPO + JFR2 | = | $\overline{RFM2}$ |
| JFM2 | = | RFM2 |
| JFPO + JFR3 | = | $\overline{RFM3}$ |
| JFM3 | = | RFM3 |

Peripheral Channel G

| | | |
|---|---|---|
| JGPO + JGRO | = | $\overline{RGMO}$ |
| JGMO | = | RGMO |
| JGPO + JGR1 | = | $\overline{RGM1}$ |
| JGM1 | = | RGM1 |
| JGPO + JGR2 | = | $\overline{RGM2}$ |
| JGM2 | = | RGM2 |
| JGPO + JGR3 | = | $\overline{RGM3}$ |
| JGM3 | = | RGM3 |

Peripheral Channel H

| | | |
|---|---|---|
| JHPO + JHRO | = | $\overline{RHMO}$ |
| JHMO | = | RHMO |
| JHPO + JHR1 | = | $\overline{RHM1}$ |
| JHM1 | = | RHM1 |
| JHPO + JHR2 | = | $\overline{RHM2}$ |
| JHM2 | = | RHM2 |
| JHPO + JHR3 | = | $\overline{RHM3}$ |
| JHM3 | = | RHM3 |

PERIPHERAL CHANNEL UNIT
FIG.102.

SIGNALS TRANSMITTED FROM PERIPHERAL SUBSYSTEM TO IOC (Cont.)

Major Status Signals (Cont.)

Peripheral Channel J

| | | |
|---|---|---|
| JJP0 + JJR0 | = | $\overline{RJM0}$ |
| JJM0 | = | RJM0 |
| JJP0 + JJR1 | = | $\overline{RJM1}$ |
| JJM1 | = | RJM1 |
| JJP0 + JJR2 | = | $\overline{RJM2}$ |
| JJM2 | = | RJM2 |
| JJP0 + JJR3 | = | $\overline{RJM3}$ |
| JJM3 | = | RJM3 |

Peripheral Channel K

| | | |
|---|---|---|
| JKP0 + JKR0 | = | $\overline{RKM0}$ |
| JKM0 | = | RKM0 |
| JKP0 + JKR1 | = | $\overline{RKM1}$ |
| JKM1 | = | RKM1 |
| JKP0 + JKR2 | = | $\overline{RKM2}$ |
| JKM2 | = | RKM2 |
| JKP0 + JKR3 | = | $\overline{RKM3}$ |
| JKM3 | = | RKM3 |

Peripheral Channel L

| | | |
|---|---|---|
| JLP0 + JLR0 | = | $\overline{RLM0}$ |
| JLM0 | = | RLM0 |
| JLP0 + JLR1 | = | $\overline{RLM1}$ |
| JLM1 | = | RLM1 |
| JLP0 + JLR2 | = | $\overline{RLM2}$ |
| JLM2 | = | RLM2 |
| JLP0 + JLR3 | = | $\overline{RLM3}$ |
| JLM3 | = | RLM3 |

Peripheral Channel M

| | | |
|---|---|---|
| JMP0 + JMR0 | = | $\overline{RMM0}$ |
| JMM0 | = | RMM0 |
| JMP0 + JMR1 | = | $\overline{RMM1}$ |
| JMM1 | = | RMM1 |
| JMP0 + JMR2 | = | $\overline{RMM2}$ |
| JMM2 | = | RMM2 |
| JMP0 + JMR3 | = | $\overline{RMM3}$ |
| JMM3 | = | RMM3 |

PERIPHERAL CHANNEL UNIT
FIG. 103.

SIGNALS TRANSMITTED FROM PERIPHERAL SUBSYSTEM TO IOC (Cont.)

Major Status Signals (Cont.)

Peripheral Channel N

| | | |
|---|---|---|
| JNPO + JNRO | = | $\overline{RNM0}$ |
| JNM0 | = | RNM0 |
| JNPO + JNR1 | = | $\overline{RNM1}$ |
| JNM1 | = | RNM1 |
| JNPO + JNR2 | = | $\overline{RNM2}$ |
| JNM2 | = | RNM2 |
| JNPO + JNR3 | = | $\overline{RNM3}$ |
| JNM3 | = | RNM3 |

Peripheral Channel P

| | | |
|---|---|---|
| JPPO + JPRO | = | $\overline{RPM0}$ |
| JPM0 | = | RPM0 |
| JPPO + JPR1 | = | $\overline{RPM1}$ |
| JPM1 | = | RPM1 |
| JPPO + JPR2 | = | $\overline{RPM2}$ |
| JPM2 | = | RPM2 |
| JPPO + JPR3 | = | $\overline{RPM3}$ |
| JPM3 | = | RPM3 |

Peripheral Channel Q

| | | |
|---|---|---|
| JQPO + JQRO | = | $\overline{RQM0}$ |
| JQM0 | = | RQM0 |
| JQPO + JQR1 | = | $\overline{RQM1}$ |
| JQM1 | = | RQM1 |
| JQPO + JQR2 | = | $\overline{RQM2}$ |
| JQM2 | = | RQM2 |
| JQPO + JQR3 | = | $\overline{RQM3}$ |
| JQM3 | = | RQM3 |

Peripheral Channel R

| | | |
|---|---|---|
| JRPO + JRRO | = | $\overline{RRM0}$ |
| JRM0 | = | RRM0 |
| JRPO + JRR1 | = | $\overline{RRM1}$ |
| JRM1 | = | RRM1 |
| JRPO + JRR2 | = | $\overline{RRM2}$ |
| JRM2 | = | RRM2 |
| JRPO + JRR3 | = | $\overline{RRM3}$ |
| JRM3 | = | RRM3 |

PERIPHERAL CHANNEL UNIT

FIG. 104.

SIGNALS TRANSMITTED FROM PERIPHERAL SUBSYSTEM TO IOC (Cont.)

Read Clock Signals (Peripheral Channels A-R)

DARR + JAPO = $\overline{RAER}$
JAER = RAER
DBRR + JBPO = $\overline{RBER}$
JBER = RBER
DCRR + JCPO = $\overline{RCER}$
JCER = RCER
DDRR + JDPO = $\overline{RDER}$
JDER = RDER
DERR + JEPO = $\overline{REER}$
JEER = REER
DFRR + JFPO = $\overline{RFER}$
JFER = RFER
DGRR + JGPO = $\overline{RGER}$
JGER = RGER
DHRR + JHPO = $\overline{RHER}$
JHER = RHER
DJRR + JJPO = $\overline{RJER}$
JJER = RJER
DKRR + JKPO = $\overline{RKER}$
JKER = RKER
DLRR + JLPO = $\overline{RLER}$
JLER = RLER
DMRR + JMPO = $\overline{RMER}$
JMER = RMER
DNRR + JNPO = $\overline{RNER}$
JNER = RNER
DPRR + JPPO = $\overline{RPER}$
JPER = RPER
DQRR + JQPO = $\overline{RQER}$
JQER = RQER
DRRR + JRPO = $\overline{RRER}$
JRER = RRER

PERIPHERAL CHANNEL UNIT
FIG. 105.

Oct. 28, 1969 J. W. FIGUEROA ET AL 3,475,730

INFORMATION SHIFT APPARATUS IN A COMPUTER SYSTEM

Filed May 27, 1966 207 Sheets-Sheet 115

SIGNALS TRANSMITTED FROM PERIPHERAL SUBSYSTEM TO IOC (Cont.)

Special Interrupt Signals (Peripheral Channels A-R)

| | | | | | |
|---|---|---|---|---|---|
| DRSN DASS + JAPO | = | $\overline{RAES}$ | DRSN DJSS + JJPO | = | $\overline{RJES}$ |
| JASE | = | RAES | JJSE | = | RJES |
| DRSN DBSS + JBPO | = | $\overline{RBES}$ | DRSN DKSS + JKPO | = | $\overline{RKES}$ |
| JBSE | = | RBES | JKSE | = | RKES |
| DRSN DCSS + JCPO | = | $\overline{RCES}$ | DRSN DLSS + JLPO | = | $\overline{RLES}$ |
| JCSE | = | RCES | JLSE | = | RLES |
| DRSN DDSS + JDPO | = | $\overline{RDES}$ | DRSN DMSS + JMPO | = | $\overline{RMES}$ |
| JDSE | = | RDES | JMSE | = | RMES |
| DRSN DESS + JEPO | = | $\overline{REES}$ | DRSN DNSS + JNPO | = | $\overline{RNES}$ |
| JESE | = | REES | JNSE | = | RNES |
| DRSN DFSS + JFPO | = | $\overline{RFES}$ | DRSN DPSS + JPPO | = | $\overline{RPES}$ |
| JFSE | = | RFES | JPSE | = | RPES |
| DRSN DGSS + JGPO | = | $\overline{RGES}$ | DRSN DQSS + JQPO | = | $\overline{RQES}$ |
| JGSE | = | RGES | JQSE | = | RQES |
| DRSN DHSS + JHPO | = | $\overline{RHES}$ | DRSN DRSS + JRPO | = | $\overline{RRES}$ |
| JHSE | = | RHES | JRSE | = | RRES |

PERIPHERAL CHANNEL UNIT

FIG. 106.

Oct. 28, 1969 J. W. FIGUEROA ET AL 3,475,730
INFORMATION SHIFT APPARATUS IN A COMPUTER SYSTEM
Filed May 27, 1966 207 Sheets-Sheet 116

SIGNALS TRANSMITTED FROM PERIPHERAL SUBSYSTEM TO IOC (Cont.)

Terminate Signals (Peripheral Channels A-R)

| | | |
|---|---|---|
| DRTM DASS + JAPO | = | $\overline{RAET}$ |
| JAET | = | RAET |
| DRTM DBSS + JBPO | = | $\overline{RBET}$ |
| JBET | = | RBET |
| DRTM DCSS + JCPO | = | $\overline{RCET}$ |
| JCET | = | RCET |
| DRTM DDSS + JDPO | = | $\overline{RDET}$ |
| JDET | = | RDET |
| DRTM DESS + JEPO | = | $\overline{REET}$ |
| JEET | = | REET |
| DRTM DFSS + JFPO | = | $\overline{RFET}$ |
| JFET | = | RFET |
| DRTM DGSS + JGPO | = | $\overline{RGET}$ |
| JGET | = | RGET |
| DRTM DHSS + JHPO | = | $\overline{RHET}$ |
| JHET | = | RHET |
| DRTM DJSS + JJPO | = | $\overline{RJET}$ |
| JJET | = | RJET |
| DRTM DKSS + JKPO | = | $\overline{RKET}$ |
| JKET | = | RKET |
| DRTM DLSS + JLPO | = | $\overline{RLET}$ |
| JLET | = | RLET |
| DRTM DMSS + JMPO | = | $\overline{RMET}$ |
| JMET | = | RMET |
| DRTM DNSS + JNPO | = | $\overline{RNET}$ |
| JNET | = | RNET |
| DRTM DPSS + JPPO | = | $\overline{RPET}$ |
| JPET | = | RPET |
| DRTM DQSS + JQPO | = | $\overline{RQET}$ |
| JQET | = | RQET |
| DRTM DRSS + JRPO | = | $\overline{RRET}$ |
| JRET | = | RRET |

PERIPHERAL CHANNEL UNIT
FIG. 107

Oct. 28, 1969 J. W. FIGUEROA ET AL 3,475,730

INFORMATION SHIFT APPARATUS IN A COMPUTER SYSTEM

Filed May 27, 1966

SIGNALS TRANSMITTED FROM PERIPHERAL SUBSYSTEM TO IOC (Cont.)

Write Clock Signals (Peripheral Channels A-R)

| | | | | | |
|---|---|---|---|---|---|
| DARR + JAPO | = | $\overline{RAEW}$ | DJRR + JJPO | = | $\overline{RJEW}$ |
| JAEW | = | RAEW | JJEW | = | RJEW |
| DBRR + JBPO | = | $\overline{RBEW}$ | DKRR + JKPO | = | $\overline{RKEW}$ |
| JBEW | = | RBEW | JKEW | = | RKEW |
| DCRR + JCPO | = | $\overline{RCEW}$ | DLRR + JLPO | = | $\overline{RLEW}$ |
| JCEW | = | RCEW | JLEW | = | RLEW |
| DDRR + JDPO | = | $\overline{RDEW}$ | DMRR + JMPO | = | $\overline{RMEW}$ |
| JDEW | = | RDEW | JMEW | = | RMEW |
| DERR + JEPO | = | $\overline{REEW}$ | DNRR + JNPO | = | $\overline{RNEW}$ |
| JEEW | = | REEW | JNEW | = | RNEW |
| DFRR + JFPO | = | $\overline{RFEW}$ | DPRR + JPPO | = | $\overline{RPEW}$ |
| JFEW | = | RFEW | JPEW | = | RPEW |
| DGRR + JGPO | = | $\overline{RGEW}$ | DQRR + JQPO | = | $\overline{RQEW}$ |
| JGEW | = | RGEW | JQEW | = | RQEW |
| DHRR + JHPO | = | $\overline{RHEW}$ | DRRR + JRPO | = | $\overline{RREW}$ |
| JHEW | = | RHEW | JREW | = | RREW |

PERIPHERAL CHANNEL UNIT

FIG. 108.

SIGNALS TRANSMITTED FROM IOC TO PERIPHERAL SUBSYSTEM

Output Data Signals

Peripheral Channel A

| | | |
|---|---|---|
| FT00 DASW | = | RAC0 |
| FT01 DASW | = | RAC1 |
| FT02 DASW | = | RAC2 |
| FT03 DASW | = | RAC3 |
| FT04 DASW | = | RAC4 |
| FT05 DASW | = | RAC5 |
| FT06 DASW | = | RAC6 |

Peripheral Channel B

| | | |
|---|---|---|
| FT00 DBSW | = | RBC0 |
| FT01 DBSW | = | RBC1 |
| FT02 DBSW | = | RBC2 |
| FT03 DBSW | = | RBC3 |
| FT04 DBSW | = | RBC4 |
| FT05 DBSW | = | RBC5 |
| FT06 DBSW | = | RBC6 |

Peripheral Channel C

| | | |
|---|---|---|
| FT00 DCSW | = | RCC0 |
| FT01 DCSW | = | RCC1 |
| FT02 DCSW | = | RCC2 |
| FT03 DCSW | = | RCC3 |
| FT04 DCSW | = | RCC4 |
| FT05 DCSW | = | RCC5 |
| FT06 DCSW | = | RCC6 |

Peripheral Channel D

| | | |
|---|---|---|
| FT00 DDSW | = | RDC0 |
| FT01 DDSW | = | RDC1 |
| FT02 DDSW | = | RDC2 |
| FT03 DDSW | = | RDC3 |
| FT04 DDSW | = | RDC4 |
| FT05 DDSW | = | RDC5 |
| FT06 DDSW | = | RDC6 |

PERIPHERAL CHANNEL UNIT

FIG. 109.

SIGNALS TRANSMITTED FROM IOC TO PERIPHERAL SUBSYSTEM (Cont.)

Output Data Signals (Cont.)

Peripheral Channel E

| | | |
|---|---|---|
| FT00 DESW | = | REC0 |
| FT01 DESW | = | REC1 |
| FT02 DESW | = | REC2 |
| FT03 DESW | = | REC3 |
| FT04 DESW | = | REC4 |
| FT05 DESW | = | REC5 |
| FT06 DESW | = | REC6 |

Peripheral Channel F

| | | |
|---|---|---|
| FT00 DFSW | = | RFC0 |
| FT01 DFSW | = | RFC1 |
| FT02 DFSW | = | RFC2 |
| FT03 DFSW | = | RFC3 |
| FT04 DFSW | = | RFC4 |
| FT05 DFSW | = | RFC5 |
| FT06 DFSW | = | RFC6 |

Peripheral Channel G

| | | |
|---|---|---|
| FT00 DGSW | = | RGC0 |
| FT01 DGSW | = | RGC1 |
| FT02 DGSW | = | RGC2 |
| FT03 DGSW | = | RGC3 |
| FT04 DGSW | = | RGC4 |
| FT05 DGSW | = | RGC5 |
| FT06 DGSW | = | RGC6 |

Peripheral Channel H

| | | |
|---|---|---|
| FT00 DHSW | = | RHC0 |
| FT01 DHSW | = | RHC1 |
| FT02 DHSW | = | RHC2 |
| FT03 DHSW | = | RHC3 |
| FT04 DHSW | = | RHC4 |
| FT05 DHSW | = | RHC5 |
| FT06 DHSW | = | RHC6 |

PERIPHERAL CHANNEL UNIT

FIG. 110.

SIGNALS TRANSMITTED FROM IOC TO PERIPHERAL SUBSYSTEM (Cont.)

Output Data Signals (Cont.)

Peripheral Channel J

| | | |
|---|---|---|
| FT00 DJSW | = | RJC0 |
| FT01 DJSW | = | RJC1 |
| FT02 DJSW | = | RJC2 |
| FT03 DJSW | = | RJC3 |
| FT04 DJSW | = | RJC4 |
| FT05 DJSW | = | RJC5 |
| FT06 DJSW | = | RJC6 |

Peripheral Channel K

| | | |
|---|---|---|
| FT00 DKSW | = | RKC0 |
| FT01 DKSW | = | RKC1 |
| FT02 DKSW | = | RKC2 |
| FT03 DKSW | = | RKC3 |
| FT04 DKSW | = | RKC4 |
| FT05 DKSW | = | RKC5 |
| FT06 DKSW | = | RKC6 |

Peripheral Channel L

| | | |
|---|---|---|
| FT00 DLSW | = | RLC0 |
| FT01 DLSW | = | RLC1 |
| FT02 DLSW | = | RLC2 |
| FT03 DLSW | = | RLC3 |
| FT04 DLSW | = | RLC4 |
| FT05 DLSW | = | RLC5 |
| FT06 DLSW | = | RLC6 |

Peripheral Channel M

| | | |
|---|---|---|
| FT00 DMSW | = | RMC0 |
| FT01 DMSW | = | RMC1 |
| FT02 DMSW | = | RMC2 |
| FT03 DMSW | = | RMC3 |
| FT04 DMSW | = | RMC4 |
| FT05 DMSW | = | RMC5 |
| FT06 DMSW | = | RMC6 |

PERIPHERAL CHANNEL UNIT
FIG. 111.

SIGNALS TRANSMITTED FROM IOC TO PERIPHERAL SUBSYSTEM (Cont.)

Output Data Signals (Cont.)

Peripheral Channel N

| | | |
|---|---|---|
| FT00 DNSW | = | RNC0 |
| FT01 DNSW | = | RNC1 |
| FT02 DNSW | = | RNC2 |
| FT03 DNSW | = | RNC3 |
| FT04 DNSW | = | RNC4 |
| FT05 DNSW | = | RNC5 |
| FT06 DNSW | = | RNC6 |

Peripheral Channel P

| | | |
|---|---|---|
| FT00 DPSW | = | RPC0 |
| FT01 DPSW | = | RPC1 |
| FT02 DPSW | = | RPC2 |
| FT03 DPSW | = | RPC3 |
| FT04 DPSW | = | RPC4 |
| FT05 DPSW | = | RPC5 |
| FT06 DPSW | = | RPC6 |

Peripheral Channel Q

| | | |
|---|---|---|
| FT00 DQSW | = | RQC0 |
| FT01 DQSW | = | RQC1 |
| FT02 DQSW | = | RQC2 |
| FT03 DQSW | = | RQC3 |
| FT04 DQSW | = | RQC4 |
| FT05 DQSW | = | RQC5 |
| FT06 DQSW | = | RQC6 |

Peripheral Channel R

| | | |
|---|---|---|
| FT00 DRSW | = | RRC0 |
| FT01 DRSW | = | RRC1 |
| FT02 DRSW | = | RRC2 |
| FT03 DRSW | = | RRC3 |
| FT04 DRSW | = | RRC4 |
| FT05 DRSW | = | RRC5 |
| FT06 DRSW | = | RRC6 |

PERIPHERAL CHANNEL UNIT

FIG. 112.

SIGNALS TRANSMITTED FROM IOC TO PERIPHERAL SUBSYSTEM (Cont.)

Input/Output Signals (Peripheral Channels A-R)

| | | | |
|---|---|---|---|
| DAAL | = RAAL | DJAL | = RJAL |
| FS06 DASD | = DAAL | FS06 DJSD | = DJAL |
| DBAL | = RBAL | DKAL | = RKAL |
| FS06 DBSD | = DBAL | FS06 DKSD | = DKAL |
| DCAL | = RCAL | DLAL | = RLAL |
| FS06 DCSD | = DCAL | FS06 DLSD | = DLAL |
| DDAL | = RDAL | DMAL | = RMAL |
| FS06 DDSD | = DDAL | FS06 DMSD | = DMAL |
| DEAL | = REAL | DNAL | = RNAL |
| FS06 DESD | = DEAL | FS06 DNSD | = DNAL |
| DFAL | = RFAL | DPAL | = RPAL |
| FS06 DFSD | = DFAL | FS06 DPSD | = DPAL |
| DGAL | = RGAL | DQAL | = RQAL |
| FS06 DGSD | = DGAL | FS06 DQSD | = DQAL |
| DHAL | = RHAL | DRAL | = RRAL |
| FS06 DHSD | = DHAL | FS06 DRSD | = DRAL |

Read Clock Signals (Peripheral Channels A-R)

| | | | |
|---|---|---|---|
| DSRP DAT1 | = RASB | DSRP DJT1 | = RJSB |
| DSRP DBT1 | = RBSB | DSRP DKT1 | = RKSB |
| DSRP DCT1 | = RCSB | DSRP DLT1 | = RLSB |
| DSRP DDT1 | = RDSB | DSRP DMT1 | = RMSB |
| DSRP DET1 | = RESB | DSRP DNT1 | = RNSB |
| DSRP DFT1 | = RFSB | DSRP DPT1 | = RPSB |
| DSRP DGT1 | = RGSB | DSRP DQT1 | = RQSB |
| DSRP DHT1 | = RHSB | DSRP DRT1 | = RRSB |

PERIPHERAL CHANNEL UNIT
FIG.113.

SIGNALS TRANSMITTED FROM IOC TO PERIPHERAL SUBSYSTEM (Cont.)

Write Clock Signals (Peripheral Channels A-R)

| | | | | | |
|---|---|---|---|---|---|
| DSWP DAT1 | = | RAPW | DSWP DJT1 | = | RJPW |
| DSWP DBT1 | = | RBPW | DSWP DKT1 | = | RKPW |
| DSWP DCT1 | = | RCPW | DSWP DLT1 | = | RLPW |
| DSWP DDT1 | = | RDPW | DSWP DMT1 | = | RMPW |
| DSWP DET1 | = | REPW | DSWP DNT1 | = | RNPW |
| DSWP DFT1 | = | RFPW | DSWP DPT1 | = | RPPW |
| DSWP DGT1 | = | RGPW | DSWP DQT1 | = | RQPW |
| DSWP DHT1 | = | RHPW | DSWP DRT1 | = | RRPW |

End Data Transfer Signals (Peripheral Channels A-R)

| | | | | | |
|---|---|---|---|---|---|
| FT09 DAT1 | = | RAED | FT09 DJT1 | = | RJED |
| FT09 DBT1 | = | RBED | FT09 DKT1 | = | RKED |
| FT09 DCT1 | = | RCED | FT09 DLT1 | = | RLED |
| FT09 DDT1 | = | RDED | FT09 DMT1 | = | RMED |
| FT09 DET1 | = | REED | FT09 DNT1 | = | RNED |
| FT09 DFT1 | = | RFED | FT09 DPT1 | = | RPED |
| FT09 DGT1 | = | RGED | FT09 DQT1 | = | RQED |
| FT09 DHT1 | = | RHED | FT09 DRT1 | = | RRED |

PERIPHERAL CHANNEL UNIT

FIG. 114

Oct. 28, 1969 J. W. FIGUEROA ET AL 3,475,730

INFORMATION SHIFT APPARATUS IN A COMPUTER SYSTEM

Filed May 27, 1966 207 Sheets-Sheet 124

MISCELLANEOUS LOGICAL COMBINATION SIGNALS

| | | |
|---|---|---|
| FAM1 FT07 $\overline{\text{FUNF}}$ $\overline{\text{FT09}}$ | = | DAC0 |
| $\overline{\text{FAM1}}$ FT07 $\overline{\text{FUNF}}$ $\overline{\text{FT09}}$ | = | DAC1 |
| DA13 + DA12 + DA11 + DA10 | = | DAD1 |
| DPD3 + DPD1 | = | DAD4 |
| DPD3 + DPD2 | = | DAD5 |
| DAW1 + FS07 + FS08 + DAW0 + DAW2 + DAW3 | = | DALW |
| DAC0 TTL3 | = | $\overline{\text{DAM1}}$ |
| DAC1 TTL3 | = | DAM1 |
| DDP2 + DNDP + DPDP + DQDP + DRDP + DDP0 + DDP1 | = | DANY |
| RAEW DAAL + RBEW DBAL + RCEW DCAL + RDEW DDAL | = | DAW0 |
| REEW DEAL + RFEW DFAL + RGEW DGAL + RHEW DHAL | = | DAW1 |
| RJEW DJAL + RKEW DKAL + RLEW DLAL + RMEW DMAL | = | DAW2 |
| RNEW DNAL + RPEW DPAL + RQEW DQAL + RREW DRAL | = | DAW3 |
| DADP FAB1 + DBDP FBB1 + DCDP FCB1 + DDDP FDB1 | = | DB10 |
| DEDP FEB1 + DFDP FFB1 + DGDP FGB1 + DHDP FHB1 | = | DB11 |
| DJDP FJB1 + DKDP FKB1 + DLDP FLB1 + DMDP FMB1 | = | DB12 |
| DNDP FNB1 + DPDP FPB1 + DQDP FQB1 + DRDP FRB1 | = | DB13 |
| FCAP $\overline{\text{JMLT}}$ | = | DCAP |
| DANY DT26 JF11 + DANY FTL4 $\overline{\text{JF10}}$ JF11 + DANY FTL0 $\overline{\text{JF10}}$ $\overline{\text{JF09}}$ JF11 | = | DCHP |
| DADP + DBDP + DCDP + DDDP | = | DDP0 |
| DEDP + DFDP + DGDP + DHDP | = | DDP1 |
| DJDP + DKDP + DLDP + DMDP | = | DDP2 |
| DS78 DRHS | = | DGRH |
| DS78 | = | DGRQ |

PERIPHERAL CHANNEL UNIT

FIG. 115.

MISCELLANEOUS LOGICAL COMBINATION SIGNALS (Cont.)

| | |
|---|---|
| JAPO DAAL + JBPO DBAL + JCPO DCAL + JDPO DDAL | = DPF0 |
| JEPO DEAL + JFPO DFAL + JGPO DGAL + JHPO DHAL | = DPF1 |
| JJPO DJAL + JKPO DKAL + JLPO DLAL + JMPO DMAL | = DPF2 |
| JNPO DNAL + JPPO DPAL + JQPO DQAL + JRPO DRAL | = DPF3 |
| DPF3 + DPF2 + DPF1 + DPF0 | = DPFF |
| DB10 + DB11 + DB12 + DB13 | = DPR1 |
| DBDP + DDDP + DFDP + DHDP + DKDP + DMDP + DPDP + DRDP | = DPR2 |
| DCDP + DDDP + DGDP + DHDP + DLDP + DMDP + DQDP + DRDP | = DPR3 |
| DEDP + DFDP + DGDP + DHDP + DNDP + DPDP + DQDP + DRDP | = DPR4 |
| DJDP + DKDP + DLDP + DMDP + DNDP + DPDP + DQDP + DRDP | = DPR5 |
| DT26 | = DPRD |
| FTL4 | = DPRS |
| RAER DPD0 FTL0 + RBER DPD0 FTL2 + RCER DPD0 FTL4 + RDER DPD0 FTL6 | = DRD0 |
| REER DPD1 FTL0 + RFER DPD1 FTL2 + RGER DPD1 FTL4 + RHER DPD1 FTL6 | = DRD1 |
| RJER DPD2 FTL0 + RKER DPD2 FTL2 + RLER DPD2 FTL4 + RMER DPD2 FTL6 | = DRD2 |
| RNER DPD3 FTL0 + RPER DPD3 FTL2 + RQER DPD3 FTL4 + RRER DPD3 FTL6 | = DRD3 |
| DRD3 + DRD2 + DRD1 + DRD0 | = DRDC |
| JE10 TRPC | = DRDS |
| DS78 DSEQ | = DREL |
| $\overline{DPD0}\ \overline{FS05}\ \overline{FS04} + \overline{DPD1}\ \overline{FS05}\ FS04 + \overline{DPD2}\ FS05\ \overline{FS04} + \overline{DPD3}\ FS05\ FS04 + \overline{FTL0}\ \overline{FS03}\ \overline{FS02} + \overline{FTL2}\ \overline{FS03}\ FS02 + \overline{FTL4}\ FS03\ \overline{FS02} + \overline{FTL6}\ FS03\ FS02$ | = $\overline{DRHS}$ |
| FPBS DTL1 | = DRRD |

PERIPHERAL CHANNEL UNIT
FIG. 116.

MISCELLANEOUS LOGICAL COMBINATION SIGNALS (Cont.)

| | |
|---|---|
| JE09 TRPC | = DRSN |
| TRTF | = DRTF |
| JE08 TRPC | = DRTM |
| FS07 + FS08 | = DS78 |
| DRHS DALW | = DSEQ |
| TSPW | = DSPW |
| FRED $\overline{FT09}$ DSPW | = DSRP |
| TRPC $\overline{JE10}$ | = DSST |
| $\overline{JE10}$ TRMK | = DSSU |
| DSEQ FPST + DRHS DS78 | = DSTD |
| JSTP | = DSTP |
| $\overline{FT09}$ $\overline{FRED}$ $\overline{FPBS}$ | = DSWC |
| DSWC DSPW | = DSWP |
| FTL0 + FTL4 | = DT04 |
| FTL6 + FTL2 | = DT26 |
| FTL6 + FTL4 | = DT46 |
| $\overline{DSEQ}$ $\overline{FCAP}$ $\overline{DGRH}$ DTRQ | = DTFG |
| FTL0 | = DTL0 |
| TTL1 | = DTL1 |
| $\overline{FCAP}$ $\overline{DTRQ}$ + DALW DRHS $\overline{FCAP}$ | = DTMG |
| TSMQ DTMC | = DTMS |
| FRQ3 + FRQ2 + FRQ1 + FRQ0 | = DTRQ |

PERIPHERAL CHANNEL UNIT

FIG. 117

FLIP-FLOP INPUT LOGICAL SCHEMATIC DIAGRAMS

Buffer Count Bit 1 Flip-Flops (Peripheral Channels A-R)

$\overline{DAM1}$ DAT1 + DAAL = $\overline{FAA1}$

DAM1 DAT1 = FAA1

$\overline{DAM1}$ DBT1 + DBAL = $\overline{FBA1}$

DAM1 DBT1 = FBA1

$\overline{DAM1}$ DCT1 + DCAL = $\overline{FCA1}$

DAM1 DCT1 = FCA1

$\overline{DAM1}$ DDT1 + DDAL = $\overline{FDA1}$

DAM1 DDT1 = FDA1

$\overline{DAM1}$ DET1 + DEAL = $\overline{FEA1}$

DAM1 DET1 = FEA1

$\overline{DAM1}$ DFT1 + DFAL = $\overline{FFA1}$

DAM1 DFT1 = FFA1

$\overline{DAM1}$ DGT1 + DGAL = $\overline{FGA1}$

DAM1 DGT1 = FGA1

$\overline{DAM1}$ DHT1 + DHAL = $\overline{FHA1}$

DAM1 DHT1 = FHA1

$\overline{DAM1}$ DJT1 + DJAL = $\overline{FJA1}$

DAM1 DJT1 = FJA1

$\overline{DAM1}$ DKT1 + DKAL = $\overline{FKA1}$

DAM1 DKT1 = FKA1

$\overline{DAM1}$ DLT1 + DLAL = $\overline{FLA1}$

DAM1 DLT1 = FLA1

$\overline{DAM1}$ DMT1 + DMAL = $\overline{FMA1}$

DAM1 DMT1 = FMA1

$\overline{DAM1}$ DNT1 + DNAL = $\overline{FNA1}$

DAM1 DNT1 = FNA1

$\overline{DAM1}$ DPT1 + DPAL = $\overline{FPA1}$

DAM1 DPT1 = FPA1

$\overline{DAM1}$ DQT1 + DQAL = $\overline{FQA1}$

DAM1 DQT1 = FQA1

$\overline{DAM1}$ DRT1 + DRAL = $\overline{FRA1}$

DAM1 DRT1 = FRA1

PERIPHERAL CHANNEL UNIT
FIG. 118.

FLIP-FLOP INPUT LOGICAL SCHEMATIC DIAGRAMS (Cont.)

E-Register Bit 1 Echo Flip-Flops (Peripheral Channels A-R)

| | | |
|---|---|---|
| JE01 DAAD + DAAL | = | $\overline{\text{FAB1}}$ |
| $\overline{\text{JE01}}$ DAAD | = | FAB1 |
| JE01 DBAD + DBAL | = | $\overline{\text{FBB1}}$ |
| $\overline{\text{JE01}}$ DBAD | = | FBB1 |
| JE01 DCAD + DCAL | = | $\overline{\text{FCB1}}$ |
| $\overline{\text{JE01}}$ DCAD | = | FCB1 |
| JE01 DDAD + DDAL | = | $\overline{\text{FDB1}}$ |
| $\overline{\text{JE01}}$ DDAD | = | FDB1 |
| JE01 DEAD + DEAL | = | $\overline{\text{FEB1}}$ |
| $\overline{\text{JE01}}$ DEAD | = | FEB1 |
| JE01 DFAD + DFAL | = | $\overline{\text{FFB1}}$ |
| $\overline{\text{JE01}}$ DFAD | = | FFB1 |
| JE01 DGAD + DGAL | = | $\overline{\text{FGB1}}$ |
| $\overline{\text{JE01}}$ DGAD | = | FGB1 |
| JE01 DHAD + DHAL | = | $\overline{\text{FHB1}}$ |
| $\overline{\text{JE01}}$ DHAD | = | FHB1 |
| JE01 DJAD + DJAL | = | $\overline{\text{FJB1}}$ |
| $\overline{\text{JE01}}$ DJAD | = | FJB1 |
| JE01 DKAD + DKAL | = | $\overline{\text{FKB1}}$ |
| $\overline{\text{JE01}}$ DKAD | = | FKB1 |
| JE01 DLAD + DLAL | = | $\overline{\text{FLB1}}$ |
| $\overline{\text{JE01}}$ DLAD | = | FLB1 |
| JE01 DMAD + DMAL | = | $\overline{\text{FMB1}}$ |
| $\overline{\text{JE01}}$ DMAD | = | FMB1 |
| JE01 DNAD + DNAL | = | $\overline{\text{FNB1}}$ |
| $\overline{\text{JE01}}$ DNAD | = | FNB1 |
| JE01 DPAD + DPAL | = | $\overline{\text{FPB1}}$ |
| $\overline{\text{JE01}}$ DPAD | = | FPB1 |
| JE01 DQAD + DQAL | = | $\overline{\text{FQB1}}$ |
| $\overline{\text{JE01}}$ DQAD | = | FQB1 |
| JE01 DRAD + DRAL | = | $\overline{\text{FRB1}}$ |
| $\overline{\text{JE01}}$ DRAD | = | FRB1 |

PERIPHERAL CHANNEL UNIT

FIG. 119.

FLIP-FLOP INPUT LOGICAL SCHEMATIC DIAGRAMS (Cont.)

Even Buffer Full Echo Flip-Flops (Peripheral Channels A-R)

| | | | | | |
|---|---|---|---|---|---|
| $\overline{\text{JE01}}$ DAAD | = | $\overline{\text{FAD0}}$ | $\overline{\text{JE01}}$ DJAD | = | $\overline{\text{FJD0}}$ |
| DAM1 DAT1 | = | FAD0 | DAM1 DJT1 | = | FJD0 |
| $\overline{\text{JE01}}$ DBAD | = | $\overline{\text{FBD0}}$ | $\overline{\text{JE01}}$ DKAD | = | $\overline{\text{FKD0}}$ |
| DAM1 DBT1 | = | FBD0 | DAM1 DKT1 | = | FKD0 |
| $\overline{\text{JE01}}$ DCAD | = | $\overline{\text{FCD0}}$ | $\overline{\text{JE01}}$ DLAD | = | $\overline{\text{FLD0}}$ |
| DAM1 DCT1 | = | FCD0 | DAM1 DLT1 | = | FLD0 |
| $\overline{\text{JE01}}$ DDAD | = | $\overline{\text{FDD0}}$ | $\overline{\text{JE01}}$ DMAD | = | $\overline{\text{FMD0}}$ |
| DAM1 DDT1 | = | FDD0 | DMA1 DMT1 | = | FMD0 |
| $\overline{\text{JE01}}$ DEAD | = | $\overline{\text{FED0}}$ | $\overline{\text{JE01}}$ DNAD | = | $\overline{\text{FND0}}$ |
| DAM1 DET1 | = | FED0 | DAM1 DNT1 | = | FND0 |
| $\overline{\text{JE01}}$ DFAD | = | $\overline{\text{FFD0}}$ | $\overline{\text{JE01}}$ DPAD | = | $\overline{\text{FPD0}}$ |
| DAM1 DFT1 | = | FFD0 | DAM1 DPT1 | = | FPD0 |
| $\overline{\text{JE01}}$ DGAD | = | $\overline{\text{FGD0}}$ | $\overline{\text{JE01}}$ DQAD | = | $\overline{\text{FQD0}}$ |
| DAM1 DGT1 | = | FGD0 | DAM1 DQT1 | = | FQD0 |
| $\overline{\text{JE01}}$ DHAD | = | $\overline{\text{FHD0}}$ | $\overline{\text{JE01}}$ DRAD | = | $\overline{\text{FRD0}}$ |
| DAM1 DHT1 | = | FHD0 | DAM1 DRT1 | = | FRD0 |

PERIPHERAL CHANNEL UNIT

FIG. 120.

FLIP-FLOP INPUT LOGICAL SCHEMATIC DIAGRAMS (Cont.)

Odd Buffer Full Echo Flip-Flops (Peripheral Channels A-R)

| | | | | | |
|---|---|---|---|---|---|
| JE01 DAAD | = | $\overline{\text{FAD1}}$ | JE01 DJAD | = | $\overline{\text{FJD1}}$ |
| $\overline{\text{DAM1}}$ DAT1 | = | FAD1 | $\overline{\text{DAM1}}$ DJT1 | = | FJD1 |
| JE01 DBAD | = | $\overline{\text{FBD1}}$ | JE01 DKAD | = | $\overline{\text{FKD1}}$ |
| $\overline{\text{DAM1}}$ DBT1 | = | FBD1 | $\overline{\text{DAM1}}$ DKT1 | = | FKD1 |
| JE01 DCAD | = | $\overline{\text{FCD1}}$ | JE01 DLAD | = | $\overline{\text{FLD1}}$ |
| $\overline{\text{DAM1}}$ DCT1 | = | FCD1 | $\overline{\text{DAM1}}$ DLT1 | = | FLD1 |
| JE01 DDAD | = | $\overline{\text{FDD1}}$ | JE01 DMAD | = | $\overline{\text{FMD1}}$ |
| $\overline{\text{DAM1}}$ DDT1 | = | FDD1 | $\overline{\text{DAM1}}$ DMT1 | = | FMD1 |
| JE01 DEAD | = | $\overline{\text{FED1}}$ | JE01 DNAD | = | $\overline{\text{FND1}}$ |
| $\overline{\text{DAM1}}$ DET1 | = | FED1 | $\overline{\text{DAM1}}$ DNT1 | = | FND1 |
| JE01 DFAD | = | $\overline{\text{FFD1}}$ | JE01 DPAD | = | $\overline{\text{FPD1}}$ |
| $\overline{\text{DAM1}}$ DFT1 | = | FFD1 | $\overline{\text{DAM1}}$ DPT1 | = | FPD1 |
| JE01 DGAD | = | $\overline{\text{FGD1}}$ | JE01 DQAD | = | $\overline{\text{FQD1}}$ |
| $\overline{\text{DAM1}}$ DGT1 | = | FGD1 | $\overline{\text{DAM1}}$ DQT1 | = | FQD1 |
| JE01 DHAD | = | $\overline{\text{FHD1}}$ | JE01 DRAD | = | $\overline{\text{FRD1}}$ |
| $\overline{\text{DAM1}}$ DHT1 | = | FHD1 | $\overline{\text{DAM1}}$ DRT1 | = | FRD1 |

PERIPHERAL CHANNEL UNIT

FIG. 121.

FLIP-FLOP INPUT LOGICAL SCHEMATIC DIAGRAMS (Cont.)

Routine Request Flip-Flops (Peripheral Channels A-R)

$\overline{\text{DADM}}$ QPH1 = $\overline{\text{FADM}}$

DADM QPH1 = FADM $\overline{\text{DBDM}}$ QPH1 = $\overline{\text{FBDM}}$

DBDM QPH1 = FBDM $\overline{\text{DCDM}}$ QPH1 = $\overline{\text{FCDM}}$

DCDM QPH1 = FCDM $\overline{\text{DDDM}}$ QPH1 = $\overline{\text{FDDM}}$

DDDM QPH1 = FDDM $\overline{\text{DEDM}}$ QPH1 = $\overline{\text{FEDM}}$

DEDM QPH1 = FEDM $\overline{\text{DFDM}}$ QPH1 = $\overline{\text{FFDM}}$

DFDM QPH1 = FFDM $\overline{\text{DGDM}}$ QPH1 = $\overline{\text{FGDM}}$

DGDM QPH1 = FGDM $\overline{\text{DHDM}}$ QPH1 = $\overline{\text{FHDM}}$

DHDM QPH1 = FHDM $\overline{\text{DJDM}}$ QPH1 = $\overline{\text{FJDM}}$

DJDM QPH1 = FJDM $\overline{\text{DKDM}}$ QPH1 = $\overline{\text{FKDM}}$

DKDM QPH1 = FKDM $\overline{\text{DLDM}}$ QPH1 = $\overline{\text{FLDM}}$

DLDM QPH1 = FLDM $\overline{\text{DMDM}}$ QPH1 = $\overline{\text{FMDM}}$

DMDM QPH1 = FMDM $\overline{\text{DNDM}}$ QPH1 = $\overline{\text{FNDM}}$

DNDM QPH1 = FNDM $\overline{\text{DPDM}}$ QPH1 = $\overline{\text{FPDM}}$

DPDM QPH1 = FPDM $\overline{\text{DQDM}}$ QPH1 = $\overline{\text{FQDM}}$

DQDM QPH1 = FQDM $\overline{\text{DRDM}}$ QPH1 = $\overline{\text{FRDM}}$

DRDM QPH1 = FRDM

PERIPHERAL CHANNEL UNIT

FIG. 122.

FLIP-FLOP INPUT LOGICAL SCHEMATIC DIAGRAMS (Cont.)

Priority Request Flip-Flops (First Level)

$\overline{DRQ0}$ QPH1 = $\overline{FRQ0}$

DRQ0 QPH1 = FRQ0

$\overline{DRQ1}$ QPH1 = $\overline{FRQ1}$

DRQ1 QPH1 = FRQ1

$\overline{DRQ2}$ QPH1 = $\overline{FRQ2}$

DRQ2 QPH1 = FRQ2

$\overline{DRQ3}$ QPH1 = $\overline{FRQ3}$

DRQ3 QPH1 = FRQ3

Priority Request Flip-Flops (Second Level)

$\overline{DPD0}$ QPH1 + FCAP QPH2 = $\overline{FCH0}$

DPD0 QPH1 = FCH0

$\overline{DPD1}$ QPH1 + FCAP QPH2 = $\overline{FCH1}$

DPD1 QPH1 = FCH1

$\overline{DPD2}$ QPH1 + FCAP QPH2 = $\overline{FCH2}$

DPD2 QPH1 = FCH2

$\overline{DPD3}$ QPH1 + FCAP QPH2 = $\overline{FCH3}$

DPD3 QPH1 = FCH3

S-Register $\overline{JE02}$ DSST = $\overline{FS02}$

JE02 DSST = FS02

$\overline{JE03}$ DSST = $\overline{FS03}$

JE03 DSST = FS03

$\overline{JE04}$ DSST = $\overline{FS04}$

JE04 DSST = FS04

$\overline{JE05}$ DSST = $\overline{FS05}$

JE05 DSST = FS05

PERIPHERAL CHANNEL UNIT

FIG. 123.

FLIP-FLOP INPUT LOGICAL SCHEMATIC DIAGRAMS (Cont.)

S-Register (Cont.)

QPH1 (DRES + FUNF FS07) + DRES = $\overline{\text{FS06}}$

DSSU JE06 = FS06

FUNF QPH1 = $\overline{\text{FS07}}$

DSSU JE07 = FS07

(DRRD + DRES) = $\overline{\text{FS08}}$

JE08 DSSU = FS08

T-Register $\overline{\text{JD30}}$ DRTF + $\overline{\text{JKC0}}$ QPH1 = $\overline{\text{FT00}}$

JD30 DRTF + JKC0 QPH1 = FT00

$\overline{\text{JD31}}$ DRTF + $\overline{\text{JKC1}}$ QPH1 = $\overline{\text{FT01}}$

JD31 DRTF + JKC1 QPH1 = FT01

$\overline{\text{JD32}}$ DRTF + $\overline{\text{JKC2}}$ QPH1 = $\overline{\text{FT02}}$

JD32 DRTF + JKC2 QPH1 = FT02

$\overline{\text{JD33}}$ DRTF + $\overline{\text{JKC3}}$ QPH1 = $\overline{\text{FT03}}$

JD33 DRTF + JKC3 QPH1 = FT03

$\overline{\text{JD34}}$ DRTF + $\overline{\text{JKC4}}$ QPH1 = $\overline{\text{FT04}}$

JD34 DRTF + JKC4 QPH1 = FT04

$\overline{\text{JD35}}$ DRTF + $\overline{\text{JKC5}}$ QPH1 = $\overline{\text{FT05}}$

JD35 DRTF + JKC5 QPH1 = FT05

$\overline{\text{JD41}}$ DRTF + $\overline{\text{JKC6}}$ QPH1 = $\overline{\text{FT06}}$

JD41 DRTF + JKC6 QPH1 = FT06

$\overline{\text{JD46}}$ DRTF + $\overline{\text{JKC7}}$ QPH1 = $\overline{\text{FT07}}$

JD46 DRTF + JKC7 QPH1 = FT07

$\overline{\text{JD48}}$ DRTF = $\overline{\text{FT08}}$

JD48 DRTF = FT08

$\overline{\text{JD47}}$ DRTF = $\overline{\text{FT09}}$

JD47 DRTF = FT09

PERIPHERAL CHANNEL UNIT

FIG. 124.

FLIP-FLOP INPUT LOGICAL SCHEMATIC DIAGRAMS (Cont.)

TL-Counter

| | | | | | |
|---|---|---|---|---|---|
| QPH1 $\overline{FTL6}$ | = | $\overline{FTL0}$ | QPH1 $\overline{FTL2}$ + DRES | = | $\overline{FTL4}$ |
| QPH1 FTL6 + DRES | = | FTL0 | QPH1 FTL2 | = | FTL4 |
| QPH1 $\overline{FTL0}$ + DRES | = | $\overline{FTL2}$ | QPH1 $\overline{FTL4}$ + DRES | = | $\overline{FTL6}$ |
| QPH1 FTL0 | = | FTL2 | QPH1 FTL4 | = | FTL6 |

Miscellaneous Control Flip-Flops

| | | | | | |
|---|---|---|---|---|---|
| $\overline{DAD1}$ QPH1 | = | $\overline{FAM1}$ | DSTD QPH1 + DRES | = | $\overline{FPST}$ |
| DAD1 QPH1 | = | FAM1 | FUNF QPH1 FT07 $\overline{FPBS}$ | = | FPST |
| $\overline{DBUF}$ QPH2 + DRES | = | $\overline{FCAP}$ | QPH1 $\overline{DRDC}$ | = | $\overline{FRED}$ |
| JBUF QPH2 | = | FCAP | QPH1 DRDC | = | FRED |
| $\overline{DSTD}$ QPH1 | = | $\overline{FPBS}$ | (DSTP + DRES) | = | $\overline{FRUN}$ |
| DSTD QPH1 $\overline{FS07}$ | = | FPBS | JSTR | = | FRUN |
| TALF $\overline{DCHP}$ | = | $\overline{FPFG}$ | $\overline{DSEQ}$ QPH1 | = | $\overline{FUNF}$ |
| TALF DCHP | = | FPFG | DSEQ QPH1 | = | FUNF |

ONE-SHOT INPUT LOGICAL SCHEMATIC DIAGRAMS

| | | | | | |
|---|---|---|---|---|---|
| QPH2 | = | TALF | QPH2 | = | TSMQ |
| JE11 | = | TRMK | QPH2 | = | TSPW |
| JE11 | = | TRPC | QPH2 | = | TTL1 |
| QPH2 DTFG | = | TRTF | TTL1 | = | TTL3 |

PERIPHERAL CHANNEL UNIT

FIG. 125.

BUFFER ADDRESS SIGNALS $\overline{FTF1}\ \overline{FTF2}\ \overline{FTF3}\ \overline{FTF4}\ \overline{FTF5} = DA00$ $FTF1\ \overline{FTF2}\ \overline{FTF3}\ \overline{FTF4}\ \overline{FTF5} = DA01$ $\overline{FTF1}\ FTF2\ \overline{FTF3}\ \overline{FTF4}\ \overline{FTF5} = DA02$ $FTF1\ FTF2\ \overline{FTF3}\ \overline{FTF4}\ \overline{FTF5} = DA03$ $\overline{FTF1}\ \overline{FTF2}\ FTF3\ \overline{FTF4}\ \overline{FTF5} = DA04$ $FTF1\ \overline{FTF2}\ FTF3\ \overline{FTF4}\ \overline{FTF5} = DA05$ $\overline{FTF1}\ FTF2\ FTF3\ \overline{FTF4}\ \overline{FTF5} = DA06$ $FTF1\ FTF2\ FTF3\ \overline{FTF4}\ \overline{FTF5} = DA07$ $\overline{FTF1}\ \overline{FTF2}\ \overline{FTF3}\ FTF4\ \overline{FTF5} = DA10$ $FTF1\ \overline{FTF2}\ \overline{FTF3}\ FTF4\ \overline{FTF5} = DA11$ $\overline{FTF1}\ FTF2\ \overline{FTF3}\ FTF4\ \overline{FTF5} = DA12$ $FTF1\ FTF2\ \overline{FTF3}\ FTF4\ \overline{FTF5} = DA13$ $\overline{FTF1}\ \overline{FTF2}\ FTF3\ FTF4\ \overline{FTF5} = DA14$ $FTF1\ \overline{FTF2}\ FTF3\ FTF4\ \overline{FTF5} = DA15$ $\overline{FTF1}\ FTF2\ FTF3\ FTF4\ \overline{FTF5} = DA16$ $FTF1\ FTF2\ FTF3\ FTF4\ \overline{FTF5} = DA17$ $\overline{FTF1}\ \overline{FTF2}\ \overline{FTF3}\ \overline{FTF4}\ FTF5 = DA20$ $FTF1\ \overline{FTF2}\ \overline{FTF3}\ \overline{FTF4}\ FTF5 = DA21$ $\overline{FTF1}\ FTF2\ \overline{FTF3}\ \overline{FTF4}\ FTF5 = DA22$ $FTF1\ FTF2\ \overline{FTF3}\ \overline{FTF4}\ FTF5 = DA23$ $\overline{FTF1}\ \overline{FTF2}\ FTF3\ \overline{FTF4}\ FTF5 = DA24$ $FTF1\ \overline{FTF2}\ FTF3\ \overline{FTF4}\ FTF5 = DA25$ $\overline{FTF1}\ FTF2\ FTF3\ \overline{FTF4}\ FTF5 = DA26$ $FTF1\ FTF2\ FTF3\ \overline{FTF4}\ FTF5 = DA27$

BUFFER STORAGE UNIT

FIG. 126.

BUFFER ADDRESS SIGNALS (Cont.)

| | | |
|---|---|---|
| $\overline{FTF1}$ $\overline{FTF2}$ $\overline{FTF3}$ FTF4 FTF5 | = | DA30 |
| FTF1 $\overline{FTF2}$ $\overline{FTF3}$ FTF4 FTF5 | = | DA31 |
| $\overline{FTF1}$ FTF2 $\overline{FTF3}$ FTF4 FTF5 | = | DA32 |
| FTF1 FTF2 $\overline{FTF3}$ FTF4 FTF5 | = | DA33 |
| $\overline{FTF1}$ $\overline{FTF2}$ FTF3 FTF4 FTF5 | = | DA34 |
| FTF1 $\overline{FTF2}$ FTF3 FTF4 FTF5 | = | DA35 |
| $\overline{FTF1}$ FTF2 FTF3 FTF4 FTF5 | = | DA36 |
| FTF1 FTF2 FTF3 FTF4 FTF5 | = | DA37 |

WORD BUFFER INPUT DATA SIGNALS

| | | |
|---|---|---|
| $\overline{DE00}$ | = | $\overline{DK00}$ |
| DE00 $\overline{FTRD}$ | = | DK00 |
| $\overline{DE01}$ | = | $\overline{DK01}$ |
| DE01 $\overline{FTRD}$ | = | DK01 |
| $\overline{DE02}$ | = | $\overline{DK02}$ |
| DE02 $\overline{FTRD}$ | = | DK02 |
| $\overline{DE03}$ | = | $\overline{DK03}$ |
| DE03 $\overline{FTRD}$ | = | DK03 |
| $\overline{DE04}$ | = | $\overline{DK04}$ |
| DE04 $\overline{FTRD}$ | = | DK04 |
| $\overline{DE05}$ | = | $\overline{DK05}$ |
| DE05 $\overline{FTRD}$ | = | DK05 |
| $\overline{DE06}$ | = | $\overline{DK06}$ |
| DE06 $\overline{FTRD}$ | = | DK06 |
| $\overline{DE07}$ | = | $\overline{DK07}$ |
| DE07 $\overline{FTRD}$ | = | DK07 |
| $\overline{DE08}$ | = | $\overline{DK08}$ |
| DE08 $\overline{FTRD}$ | = | DK08 |
| $\overline{DE09}$ | = | $\overline{DK09}$ |
| DE09 $\overline{FTRD}$ | = | DK09 |
| $\overline{DE10}$ | = | $\overline{DK10}$ |
| DE10 $\overline{FTRD}$ | = | DK10 |
| $\overline{DE11}$ | = | $\overline{DK11}$ |
| DE11 $\overline{FTRD}$ | = | DK11 |
| $\overline{DE12}$ | = | $\overline{DK12}$ |
| DE12 $\overline{FTRD}$ | = | DK12 |
| $\overline{DE13}$ | = | $\overline{DK13}$ |
| DE13 $\overline{FTRD}$ | = | DK13 |

BUFFER STORAGE UNIT

FIG. 127

WORD BUFFER INPUT DATA SIGNALS (Cont.)

| | | |
|---|---|---|
| $\overline{DE14}$ | = | $\overline{DK14}$ |
| $DE14\ \overline{FTRD}$ | = | DK14 |
| $\overline{DE15}$ | = | $\overline{DK15}$ |
| $DE15\ \overline{FTRD}$ | = | DK15 |
| $\overline{DE16}$ | = | $\overline{DK16}$ |
| $DE16\ \overline{FTRD}$ | = | DK16 |
| $\overline{DE17}$ | = | $\overline{DK17}$ |
| $DE17\ \overline{FTRD}$ | = | DK17 |
| $\overline{DE18}$ | = | $\overline{DK18}$ |
| $DE18\ \overline{FTRD}$ | = | DK18 |
| $\overline{DE19}$ | = | $\overline{DK19}$ |
| $DE19\ \overline{FTRD}$ | = | DK19 |
| $\overline{DE20}$ | = | $\overline{DK20}$ |
| $DE20\ \overline{FTRD}$ | = | DK20 |
| $\overline{DE21}$ | = | $\overline{DK21}$ |
| $DE21\ \overline{FTRD}$ | = | DK21 |
| $\overline{DE22}$ | = | $\overline{DK22}$ |
| $DE22\ \overline{FTRD}$ | = | DK22 |
| $\overline{DE23}$ | = | $\overline{DK23}$ |
| $DE23\ \overline{FTRD}$ | = | DK23 |
| $\overline{DE24}$ | = | $\overline{DK24}$ |
| $DE24\ \overline{FTRD}$ | = | DK24 |
| $\overline{DE25}$ | = | $\overline{DK25}$ |
| $DE25\ \overline{FTRD}$ | = | DK25 |
| $\overline{DE26}$ | = | $\overline{DK26}$ |
| $DE26\ \overline{FTRD}$ | = | DK26 |
| $\overline{DE27}$ | = | $\overline{DK27}$ |
| $DE27\ \overline{FTRD}$ | = | DK27 |
| $\overline{DE28}$ | = | $\overline{DK28}$ |
| $DE28\ \overline{FTRD}$ | = | DK28 |
| $\overline{DE29}$ | = | $\overline{DK29}$ |
| $DE29\ \overline{FTRD}$ | = | DK29 |
| $\overline{DE30}$ | = | $\overline{DK30}$ |
| $DE30\ \overline{FTRD}$ | = | DK30 |
| $\overline{DE31}$ | = | $\overline{DK31}$ |
| $DE31\ \overline{FTRD}$ | = | DK31 |
| $\overline{DE32}$ | = | $\overline{DK32}$ |
| $DE32\ \overline{FTRD}$ | = | DK32 |
| $\overline{DE33}$ | = | $\overline{DK33}$ |
| $DE33\ \overline{FTRD}$ | = | DK33 |
| $\overline{DE34}$ | = | $\overline{DK34}$ |
| $DE34\ \overline{FTRD}$ | = | DK34 |
| $\overline{DE35}$ | = | $\overline{DK35}$ |
| $DE35\ \overline{FTRD}$ | = | DK35 |
| $\overline{DE36}$ | = | $\overline{DK36}$ |
| $DE36\ \overline{FTRD}$ | = | DK36 |
| $\overline{DE37}$ | = | $\overline{DK37}$ |
| $DE37\ \overline{FTRD}$ | = | DK37 |
| $\overline{DE38}$ | = | $\overline{DK38}$ |
| $DE38\ \overline{FTRD}$ | = | DK38 |

BUFFER STORAGE UNIT
FIG. 128.

Oct. 28, 1969 J. W. FIGUEROA ET AL 3,475,730

INFORMATION SHIFT APPARATUS IN A COMPUTER SYSTEM

Filed May 27, 1966 207 Sheets-Sheet 138

WORD BUFFER INPUT DATA SIGNALS (Cont.)

| | | | | | |
|---|---|---|---|---|---|
| $\overline{DE39}$ | = | $\overline{DK39}$ | DE43 $\overline{FTRD}$ | = | DK43 |
| DE39 $\overline{FTRD}$ | = | DK39 | $\overline{DE44}$ | = | $\overline{DK44}$ |
| $\overline{DE40}$ | = | $\overline{DK40}$ | DE44 $\overline{FTRD}$ | = | DK44 |
| DE40 $\overline{FTRD}$ | = | DK40 | $\overline{DE45}$ | = | $\overline{DK45}$ |
| $\overline{DE41}$ | = | $\overline{DK41}$ | DE45 $\overline{FTRD}$ | = | DK45 |
| DE41 $\overline{FTRD}$ | = | DK41 | $\overline{DE46}$ | = | $\overline{DK46}$ |
| $\overline{DE42}$ | = | $\overline{DK42}$ | DE46 $\overline{FTRD}$ | = | DK46 |
| DE42 $\overline{FTRD}$ | = | DK42 | $\overline{DE47}$ | = | $\overline{DK47}$ |
| $\overline{DE43}$ | = | $\overline{DK43}$ | DE47 $\overline{FTRD}$ | = | DK47 |

WORD BUFFER INPUT GATING SIGNALS

| | | | | | |
|---|---|---|---|---|---|
| DA00 DMEP | = | DM00 | DA06 DMEP | = | DM06 |
| DA01 DMEP | = | DM01 | DA07 DMEP | = | DM07 |
| DA02 DMEP | = | DM02 | DA10 DMEP | = | DM10 |
| DA03 DMEP | = | DM03 | DA11 DMEP | = | DM11 |
| DA04 DMEP | = | DM04 | DA12 DMEP | = | DM12 |
| DA05 DMEP | = | DM05 | DA13 DMEP | = | DM13 |

WORD BUFFER OUTPUT GATING SIGNALS

| | | | | | |
|---|---|---|---|---|---|
| DA00 DRD0 | = | DR00 | DA04 DRD0 | = | DR04 |
| DA01 DRD0 | = | DR01 | DA05 DRD0 | = | DR05 |
| DA02 DRD0 | = | DR02 | DA06 DRD0 | = | DR06 |
| DA03 DRD0 | = | DR03 | DA07 DRD0 | = | DR07 |

BUFFER STORAGE UNIT

FIG. 129.

WORD BUFFER OUTPUT GATING SIGNALS (Cont.)

| | | | | | |
|---|---|---|---|---|---|
| DA10 DRDO | = | DR10 | DA12 DRDO | = | DR12 |
| DA11 DRDO | = | DR11 | DA13 DRDO | = | DR13 |

CHARACTER BUFFER INPUT DATA SIGNALS

| | | | | | |
|---|---|---|---|---|---|
| $\overline{DE00}$ | = | $\overline{DL00}$ | $\overline{DE04}$ | = | $\overline{DL04}$ |
| DE00 $\overline{FTRD}$ | = | DL00 | DE04 $\overline{FTRD}$ | = | DL04 |
| $\overline{DE01}$ | = | $\overline{DL01}$ | $\overline{DE05}$ | = | $\overline{DL05}$ |
| DE01 $\overline{FTRD}$ | = | DL01 | DE05 $\overline{FTRD}$ | = | DL05 |
| $\overline{DE02}$ | = | $\overline{DL02}$ | $\overline{DE36}$ | = | $\overline{DL06}$ |
| DE02 $\overline{FTRD}$ | = | DL02 | DE36 $\overline{FTRD}$ | = | DL06 |
| $\overline{DE03}$ | = | $\overline{DL03}$ | $\overline{DE47}$ | = | $\overline{DL07}$ |
| DE03 $\overline{FTRD}$ | = | DL03 | DE47 $\overline{FTRD}$ | = | DL07 |

CHARACTER BUFFER INPUT GATING SIGNALS

| | | | | | |
|---|---|---|---|---|---|
| DA14 DMEP | = | DM14 | DA25 DMEP | = | DM25 |
| DA15 DMEP | = | DM15 | DA26 DMEP | = | DM26 |
| DA16 DMEP | = | DM16 | DA27 DMEP | = | DM27 |
| DA17 DMEP | = | DM17 | DA30 DMEP | = | DM30 |
| DA20 DMEP | = | DM20 | DA31 DMEP | = | DM31 |
| DA21 DMEP | = | DM21 | DA32 DMEP | = | DM32 |
| DA22 DMEP | = | DM22 | DA33 DMEP | = | DM33 |
| DA23 DMEP | = | DM23 | DA34 DMEP | = | DM34 |
| DA24 DMEP | = | DM24 | DA35 DMEP | = | DM35 |

BUFFER STORAGE UNIT

FIG. 130.

CHARACTER BUFFER INPUT GATING SIGNALS (Cont.)

| | | | | | |
|---|---|---|---|---|---|
| DA36 DMEP | = | DM36 | DA37 DMEP | = | DM37 |

CHARACTER BUFFER OUTPUT GATING SIGNALS

| | | | | | |
|---|---|---|---|---|---|
| DA14 DRDO | = | DR14 | DA26 DRDO | = | DR26 |
| DA15 DRDO | = | DR15 | DA27 DRDO | = | DR27 |
| DA16 DRDO | = | DR16 | DA30 DRDO | = | DR30 |
| DA17 DRDO | = | DR17 | DA31 DRDO | = | DR31 |
| DA20 DRDO | = | DR20 | DA32 DRDO | = | DR32 |
| DA21 DRDO | = | DR21 | DA33 DRDO | = | DR33 |
| DA22 DRDO | = | DR22 | DA34 DRDO | = | DR34 |
| DA23 DRDO | = | DR23 | DA35 DRDO | = | DR35 |
| DA24 DRDO | = | DR24 | DA36 DRDO | = | DR36 |
| DA25 DRDO | = | DR25 | DA37 DRDO | = | DR37 |

CONTROL WORD BUFFER INPUT GATING SIGNALS

| | | | | | |
|---|---|---|---|---|---|
| JKD0 JR25 | = | DM40 | JKD2 JR25 | = | DM52 |
| JKD1 JR25 | = | DM41 | JKD3 JR25 | = | DM53 |
| JKD2 JR25 | = | DM42 | JKD4 JR25 | = | DM54 |
| JKD3 JR25 | = | DM43 | JKD5 JR25 | = | DM55 |
| JKD4 JR25 | = | DM44 | JKD0 JR25 | = | DM60 |
| JKD5 JR25 | = | DM45 | JKD1 JR25 | = | DM61 |
| JKD0 JR25 | = | DM50 | JKD2 JR25 | = | DM62 |
| JKD1 JR25 | = | DM51 | JKD3 JR25 | = | DM63 |

BUFFER STORAGE UNIT

FIG. 131.

CONTROL WORD BUFFER INPUT GATING SIGNALS (Cont.)

| | | | | | |
|---|---|---|---|---|---|
| JKD4 JR25 | = | DM64 | JKD5 JR25 | = | DM65 |

CONTROL WORD BUFFER OUTPUT GATING SIGNALS

| | | | | | |
|---|---|---|---|---|---|
| JKD0 JT04 | = | DR40 | JKD0 JT04 | = | DR50 |
| JKD1 JT04 | = | DR41 | JKD1 JT04 | = | DR51 |
| JKD2 JT04 | = | DR42 | JKD2 JT04 | = | DR52 |
| JKD3 JT04 | = | DR43 | JKD3 JT04 | = | DR53 |
| JKD4 JT04 | = | DR44 | JKD4 JT04 | = | DR54 |
| JKD5 JT04 | = | DR45 | JKD5 JT04 | = | DR55 |

MISCELLANEOUS LOGICAL COMBINATION SIGNALS

| | | | | | | | | |
|---|---|---|---|---|---|---|---|---|
| FD00 | = | DD00 | FD12 | = | DD12 | FD24 | = | DD24 |
| FD01 | = | DD01 | FD13 | = | DD13 | FD25 | = | DD25 |
| FD02 | = | DD02 | FD14 | = | DD14 | FD26 | = | DD26 |
| FD03 | = | DD03 | FD15 | = | DD15 | FD27 | = | DD27 |
| FD04 | = | DD04 | FD16 | = | DD16 | FD28 | = | DD28 |
| FD05 | = | DD05 | FD17 | = | DD17 | FD29 | = | DD29 |
| FD06 | = | DD06 | FD18 | = | DD18 | FD30 | = | DD30 |
| FD07 | = | DD07 | FD19 | = | DD19 | FD31 | = | DD31 |
| FD08 | = | DD08 | FD20 | = | DD20 | FD32 | = | DD32 |
| FD09 | = | DD09 | FD21 | = | DD21 | FD33 | = | DD33 |
| FD10 | = | DD10 | FD22 | = | DD22 | FD34 | = | DD34 |
| FD11 | = | DD11 | FD23 | = | DD23 | FD35 | = | DD35 |

BUFFER STORAGE UNIT

FIG. 132.

Oct. 28, 1969 J. W. FIGUEROA ET AL 3,475,730

INFORMATION SHIFT APPARATUS IN A COMPUTER SYSTEM

Filed May 27, 1966

207 Sheets-Sheet 142

MISCELLANEOUS LOGICAL COMBINATION SIGNALS (Cont.)

FD36 = DD36
FD37 = DD37
FD38 = DD38
FD39 = DD39

FD40 = DD40
FD41 = DD41
FD42 = DD42
FD43 = DD43

FD44 = DD44
FD45 = DD45
FD46 = DD46
FD47 = DD47

TDY1 = DDY1

FTC0 DSH0 + FD00 $\overline{\text{DSH0}}$ = DE00
FTC1 DSH0 + FD01 $\overline{\text{DSH0}}$ = DE01
FTC2 DSH0 + FD02 $\overline{\text{DSH0}}$ = DE02
FTC3 DSH0 + FD03 $\overline{\text{DSH0}}$ = DE03
FTC4 DSH0 + FD04 $\overline{\text{DSH0}}$ = DE04
FTC5 DSH0 + FD05 $\overline{\text{DSH0}}$ = DE05
FD00 DSH0 + FD06 $\overline{\text{DSH0}}$ = DE06
FD01 DSH0 + FD07 $\overline{\text{DSH0}}$ = DE07
FD02 DSH0 + FD08 $\overline{\text{DSH0}}$ = DE08
FD03 DSH0 + FD09 $\overline{\text{DSH0}}$ = DE09
FD04 DSH0 + FD10 $\overline{\text{DSH0}}$ = DE10
FD05 DSH0 + FD11 $\overline{\text{DSH0}}$ = DE11
FD06 DSH1 + FD12 $\overline{\text{DSH1}}$ = DE12
FD07 DSH1 + FD13 $\overline{\text{DSH1}}$ = DE13
FD08 DSH1 + FD14 $\overline{\text{DSH1}}$ = DE14
FD09 DSH1 + FD15 $\overline{\text{DSH1}}$ = DE15
FD10 DSH1 + FD16 $\overline{\text{DSH1}}$ = DE16
FD11 DSH1 + FD17 $\overline{\text{DSH1}}$ = DE17
FD12 DSH1 + FD18 $\overline{\text{DSH1}}$ = DE18

FD13 DSH1 + FD19 $\overline{\text{DSH1}}$ = DE19
FD14 DSH1 + FD20 $\overline{\text{DSH1}}$ = DE20
FD15 DSH1 + FD21 $\overline{\text{DSH1}}$ = DE21
FD16 DSH1 + FD22 $\overline{\text{DSH1}}$ = DE22
FD17 DSH1 + FD23 $\overline{\text{DSH1}}$ = DE23
FD18 DSH2 + FD24 $\overline{\text{DSH2}}$ = DE24
FD19 DSH2 + FD25 $\overline{\text{DSH2}}$ = DE25
FD20 DSH2 + FD26 $\overline{\text{DSH2}}$ = DE26
FD21 DSH2 + FD27 $\overline{\text{DSH2}}$ = DE27
FD22 DSH2 + FD28 $\overline{\text{DSH2}}$ = DE28
FD23 DSH2 + FD29 $\overline{\text{DSH2}}$ = DE29
FD24 DSH2 + FD30 $\overline{\text{DSH2}}$ = DE30
FD25 DSH2 + FD31 $\overline{\text{DSH2}}$ = DE31
FD26 DSH2 + FD32 $\overline{\text{DSH2}}$ = DE32
FD27 DSH2 + FD33 $\overline{\text{DSH2}}$ = DE33
FD28 DSH2 + FD34 $\overline{\text{DSH2}}$ = DE34
FD29 DSH2 + FD35 $\overline{\text{DSH2}}$ = DE35
FTC6 DSH3 + FD36 $\overline{\text{DSH3}}$ = DE36
FD36 DSH3 + FD37 $\overline{\text{DSH3}}$ = DE37

BUFFER STORAGE UNIT

FIG. 133.

MISCELLANDOUS LOGICAL COMBINATION SIGNALS (Cont.)

$FD37\ DSH3 + FD38\ \overline{DSH3} = DE38$ $FD38\ DSH3 + FD39\ \overline{DSH3} = DE39$ $FD39\ DSH3 + FD40\ \overline{DSH3} = DE40$ $FD40\ DSH3 + FD41\ \overline{DSH3} = DE41$ $FTC7\ DSH3 + FD42\ \overline{DSH3} = DE42$ $FD42\ DSH3 + FD43\ \overline{DSH3} = DE43$ $FD43\ DSH3 + FD44\ \overline{DSH3} = DE44$ $FD44\ DSH3 + FD45\ \overline{DSH3} = DE45$ $FD45\ DSH3 + FD46\ \overline{DSH3} = DE46$ $FD47\ DSH3 + FD47\ \overline{DSH3} = DE47$ $TDY4 = DMEP$ $JMLT = DMLT$ $\overline{FTWR}\ TDY3 = DRDO$ $JTMS\ \overline{DDY1} = DRRS$ $DMLT\ \overline{FMTC} = DRTC$ $\overline{FTSH}\ \overline{FTRD} = \overline{DSH0}$ $FTSH\ \overline{FTRD} = DSH0$ $\overline{FTSH}\ \overline{FTRD} = \overline{DSH1}$ $FTSH\ \overline{FTRD} = DSH1$ $\overline{FTSH}\ \overline{FTRD} = \overline{DSH2}$ $FTSH\ \overline{FTRD} = DSH2$ $\overline{FTSH}\ \overline{FTRD} = \overline{DSH3}$ $FTSH\ \overline{FTRD} = DSH3$ $DTMS\ \overline{JMLT} = DSTC$ $JTC0 = DTC0$ $JTC1 = DTC1$ $JTC2 = DTC2$ $JTC3 = DTC3$ $JTC4 = DTC4$ $JTC5 = DTC5$ $JTC6 = DTC6$ $VP06 = DTC7$ $JTMS = DTMS$ $FTWR\ TDY3 = DWRO$

FLIP-FLOP INPUT LOGICAL SCHEMATIC DIAGRAMS

TC-Register $DSTC\ \overline{DTC0} + DRTC = \overline{FTC0}$ $DSTC\ JTC0 + DMLT\ JY00 = FTC0$ $DSTC\ \overline{DTC1} + DRTC = \overline{FTC1}$ $DSTC\ JTC1 + DMLT\ JY01 = FTC1$

*BUFFER STORAGE UNIT*

*FIG. 134*

FLIP-FLOP INPUT LOGICAL SCHEMATIC DIAGRAMS (Cont.)

TC-Register (Cont.)

$DSTC\ \overline{DTC2} + DRTC = \overline{FTC2}$ $DSTC\ \overline{DTC5} + DRTC = \overline{FTC5}$ $DSTC\ JTC2 + DMLT\ JY02 = FTC2$ $DSTC\ JTC5 + DMLT\ JY05 = FTC5$ $DSTC\ \overline{DTC3} + DRTC = \overline{FTC3}$ $DSTC\ \overline{DTC6} + DRTC = \overline{FTC6}$ $DSTC\ JTC3 + DMLT\ JY03 = FTC3$ $DSTC\ JTC6 + DMLT\ JY06 = FTC6$ $DSTC\ \overline{DTC4} + DRTC = \overline{FTC4}$ $DSTC\ \overline{DTC7} + DRTC = \overline{FTC7}$ $DSTC\ JTC4 + DMLT\ JY04 = FTC4$ $DSTC\ JTC7 + DMLT\ JY07 = FTC7$

TF-Register $\overline{JTF1}\ JTMS = \overline{FTF1}$ $JTF3\ JTMS = FTF3$ $JTF1\ JTMS = FTF1$ $\overline{JTF4}\ JTMS = \overline{FTF4}$ $\overline{JTF2}\ JTMS = \overline{FTF2}$ $JTF4\ JTMS = FTF4$ $JTF2\ JTMS = FTF2$ $\overline{JTF5}\ JTMS = \overline{FTF5}$ $\overline{JTF3}\ JTMS = \overline{FTF3}$ $JTF5\ JTMS = FTF5$ $\overline{JTRD}\ JTMS = \overline{FTRD}$ $JTSH\ JTMS = FTSH$ $JTRD\ JTMS = FTRD$ $\overline{JTWR}\ JTMS = \overline{FTWR}$ $\overline{JTSH}\ JTMS = \overline{FTSH}$ $JTWR\ JTMS = FTWR$

Miscellaneous Control Flip-Flops $TDY5\ DTMS = \overline{FMTC}$ $DMLT\ DTMS = FMTC$

BUFFER STORAGE UNIT

FIG. 135.

ONE-SHOT INPUT LOGICAL SCHEMATIC DIAGRAMS

| | | |
|---|---|---|
| DTMS | = | TDY1 |
| DTMS | = | TDY3 |
| TDY1 | = | TDY4 |
| TDY4 | = | TDY5 |
| DTMS | = | TQDR |

BUFFER STORAGE UNIT
FIG. 136.

INPUT GATING SIGNALS

INPUT DATA SIGNALS

| | DM00 | DM01 | DM02 | DM03 | DM04 | DM05 | DM06 | DM07 | DM10 | DM11 | DM12 | DM13 |
|---|---|---|---|---|---|---|---|---|---|---|---|---|
| DK00 | FP00 | FQ00 | FP00 | FQ00 | FP00 | FQ00 | FP00 | FQ00 | FP00 | FQ00 | FP00 | FQ00 |
| DK01 | FP01 | FQ01 | FP01 | FQ01 | FP01 | FQ01 | FP01 | FQ01 | FP01 | FQ01 | FP01 | FQ01 |
| DK02 | FP02 | FQ02 | FP02 | FQ02 | FP02 | FQ02 | FP02 | FQ02 | FP02 | FQ02 | FP02 | FQ02 |
| DK03 | FP03 | FQ03 | FP03 | FQ03 | FP03 | FQ03 | FP03 | FQ03 | FP03 | FQ03 | FP03 | FQ03 |
| DK04 | FP04 | FQ04 | FP04 | FQ04 | FP04 | FQ04 | FP04 | FQ04 | FP04 | FQ04 | FP04 | FQ04 |
| DK05 | FP05 | FQ05 | FP05 | FQ05 | FP05 | FQ05 | FP05 | FQ05 | FP05 | FQ05 | FP05 | FQ05 |
| DK06 | FP06 | FQ06 | FP06 | FQ06 | FP06 | FQ06 | FP06 | FQ06 | FP06 | FQ06 | FP06 | FQ06 |
| DK07 | FP07 | FQ07 | FP07 | FQ07 | FP07 | FQ07 | FP07 | FQ07 | FP07 | FQ07 | FP07 | FQ07 |
| DK08 | FP08 | FQ08 | FP08 | FQ08 | FP08 | FQ08 | FP08 | FQ08 | FP08 | FQ08 | FP08 | FQ08 |
| DK09 | FP09 | FQ09 | FP09 | FQ09 | FP09 | FQ09 | FP09 | FQ09 | FP09 | FQ09 | FP09 | FQ09 |
| DK10 | FP10 | FQ10 | FP10 | FQ10 | FP10 | FQ10 | FP10 | FQ10 | FP10 | FQ10 | FP10 | FQ10 |
| DK11 | FP11 | FQ11 | FP11 | FQ11 | FP11 | FQ11 | FP11 | FQ11 | FP11 | FQ11 | FP11 | FQ11 |
| DK12 | FP12 | FQ12 | FP12 | FQ12 | FP12 | FQ12 | FP12 | FQ12 | FP12 | FQ12 | FP12 | FQ12 |
| DK13 | FP13 | FQ13 | FP13 | FQ13 | FP13 | FQ13 | FP13 | FQ13 | FP13 | FQ13 | FP13 | FQ13 |
| DK14 | FP14 | FQ14 | FP14 | FQ14 | FP14 | FQ14 | FP14 | FQ14 | FP14 | FQ14 | FP14 | FQ14 |
| DK15 | FP15 | FQ15 | FP15 | FQ15 | FP15 | FQ15 | FP15 | FQ15 | FP15 | FQ15 | FP15 | FQ15 |
| DK16 | FP16 | FQ16 | FP16 | FQ16 | FP16 | FQ16 | FP16 | FQ16 | FP16 | FQ16 | FP16 | FQ16 |
| DK17 | FP17 | FQ17 | FP17 | FQ17 | FP17 | FQ17 | FP17 | FQ17 | FP17 | FQ17 | FP17 | FQ17 |
| DK18 | FP18 | FQ18 | FP18 | FQ18 | FP18 | FQ18 | FP18 | FQ18 | FP18 | FQ18 | FP18 | FQ18 |
| DK19 | FP19 | FQ19 | FP19 | FQ19 | FP19 | FQ19 | FP19 | FQ19 | FP19 | FQ19 | FP19 | FQ19 |
| DK20 | FP20 | FQ20 | FP20 | FQ20 | FP20 | FQ20 | FP20 | FQ20 | FP20 | FQ20 | FP20 | FQ20 |
| DK21 | FP21 | FQ21 | FP21 | FQ21 | FP21 | FQ21 | FP21 | FQ21 | FP21 | FQ21 | FP21 | FQ21 |
| DK22 | FP22 | FQ22 | FP22 | FQ22 | FP22 | FQ22 | FP22 | FQ22 | FP22 | FQ22 | FP22 | FQ22 |
| DK23 | FP23 | FQ23 | FP23 | FQ23 | FP23 | FQ23 | FP23 | FQ23 | FP23 | FQ23 | FP23 | FQ23 |
| DK24 | FP24 | FQ24 | FP24 | FQ24 | FP24 | FQ24 | FP24 | FQ24 | FP24 | FQ24 | FP24 | FQ24 |
| DK25 | FP25 | FQ25 | FP25 | FQ25 | FP25 | FQ25 | FP25 | FQ25 | FP25 | FQ25 | FP25 | FQ25 |
| DK26 | FP26 | FQ26 | FP26 | FQ26 | FP26 | FQ26 | FP26 | FQ26 | FP26 | FQ26 | FP26 | FQ26 |
| DK27 | FP27 | FQ27 | FP27 | FQ27 | FP27 | FQ27 | FP27 | FQ27 | FP27 | FQ27 | FP27 | FQ27 |
| DK28 | FP28 | FQ28 | FP28 | FQ28 | FP28 | FQ28 | FP28 | FQ28 | FP28 | FQ28 | FP28 | FQ28 |
| DK29 | FP29 | FQ29 | FP29 | FQ29 | FP29 | FQ29 | FP29 | FQ29 | FP29 | FQ29 | FP29 | FQ29 |
| DK30 | FP30 | FQ30 | FP30 | FQ30 | FP30 | FQ30 | FP30 | FQ30 | FP30 | FQ30 | FP30 | FQ30 |
| DK31 | FP31 | FQ31 | FP31 | FQ31 | FP31 | FQ31 | FP31 | FQ31 | FP31 | FQ31 | FP31 | FQ31 |
| DK32 | FP32 | FQ32 | FP32 | FQ32 | FP32 | FQ32 | FP32 | FQ32 | FP32 | FQ32 | FP32 | FQ32 |
| DK33 | FP33 | FQ33 | FP33 | FQ33 | FP33 | FQ33 | FP33 | FQ33 | FP33 | FQ33 | FP33 | FQ33 |
| DK34 | FP34 | FQ34 | FP34 | FQ34 | FP34 | FQ34 | FP34 | FQ34 | FP34 | FQ34 | FP34 | FQ34 |
| DK35 | FP35 | FQ35 | FP35 | FQ35 | FP35 | FQ35 | FP35 | FQ35 | FP35 | FQ35 | FP35 | FQ35 |
| DK36 | FP36 | FQ36 | FP36 | FQ36 | FP36 | FQ36 | FP36 | FQ36 | FP36 | FQ36 | FP36 | FQ36 |
| DK37 | FP37 | FQ37 | FP37 | FQ37 | FP37 | FQ37 | FP37 | FQ37 | FP37 | FQ37 | FP37 | FQ37 |
| DK38 | FP38 | FQ38 | FP38 | FQ38 | FP38 | FQ38 | FP38 | FQ38 | FP38 | FQ38 | FP38 | FQ38 |
| DK39 | FP39 | FQ39 | FP39 | FQ39 | FP39 | FQ39 | FP39 | FQ39 | FP39 | FQ39 | FP39 | FQ39 |
| DK40 | FP40 | FQ40 | FP40 | FQ40 | FP40 | FQ40 | FP40 | FQ40 | FP40 | FQ40 | FP40 | FQ40 |
| DK41 | FP41 | FQ41 | FP41 | FQ41 | FP41 | FQ41 | FP41 | FQ41 | FP41 | FQ41 | FP41 | FQ41 |
| DK42 | FP42 | FQ42 | FP42 | FQ42 | FP42 | FQ42 | FP42 | FQ42 | FP42 | FQ42 | FP42 | FQ42 |
| DK43 | FP43 | FQ43 | FP43 | FQ43 | FP43 | FQ43 | FP43 | FQ43 | FP43 | FQ43 | FP43 | FQ43 |
| DK44 | FP44 | FQ44 | FP44 | FQ44 | FP44 | FQ44 | FP44 | FQ44 | FP44 | FQ44 | FP44 | FQ44 |
| DK45 | FP45 | FQ45 | FP45 | FQ45 | FP45 | FQ45 | FP45 | FQ45 | FP45 | FQ45 | FP45 | FQ45 |
| DK46 | FP46 | FQ46 | FP46 | FQ46 | FP46 | FQ46 | FP46 | FQ46 | FP46 | FQ46 | FP46 | FQ46 |
| DK47 | FP47 | FQ47 | FP47 | FQ47 | FP47 | FQ47 | FP47 | FQ47 | FP47 | FQ47 | FP47 | FQ47 |
| | Peripheral Channel A | | Peripheral Channel B | | Peripheral Channel C | | Peripheral Channel D | | Peripheral Channel E | | Peripheral Channel F | |

BUFFER STORAGE UNIT

FIG. 137.

INPUT GATING SIGNALS

| INPUT DATA SIGNALS | DM14 | DM15 | DM16 | DM17 | DM20 | DM21 | DM22 | DM23 | DM24 | DM25 | DM26 | DM27 | DM30 | DM31 | DM32 | DM33 | DM34 | DM35 | DM36 | DM37 |
|---|---|---|---|---|---|---|---|---|---|---|---|---|---|---|---|---|---|---|---|---|
| DL00 | FG30 | FH30 | FG30 | FH30 | FG30 | FH30 | FG30 | FH30 | FG30 | FH30 | FG30 | FH30 | FG30 | FH30 | FG30 | FH30 | FG30 | FH30 | FG30 | FH30 |
| DL01 | FG31 | FH31 | FG31 | FH31 | FG31 | FH31 | FG31 | FH31 | FG31 | FH31 | FG31 | FH31 | FG31 | FH31 | FG31 | FH31 | FG31 | FH31 | FG31 | FH31 |
| DL02 | FG32 | FH32 | FG32 | FH32 | FG32 | FH32 | FG32 | FH32 | FG32 | FH32 | FG32 | FH32 | FG32 | FH32 | FG32 | FH32 | FG32 | FH32 | FG32 | FH32 |
| DL03 | FG33 | FH33 | FG33 | FH33 | FG33 | FH33 | FG33 | FH33 | FG33 | FH33 | FG33 | FH33 | FG33 | FH33 | FG33 | FH33 | FG33 | FH33 | FG33 | FH33 |
| DL04 | FG34 | FH34 | FG34 | FH34 | FG34 | FH34 | FG34 | FH34 | FG34 | FH34 | FG34 | FH34 | FG34 | FH34 | FG34 | FH34 | FG34 | FH34 | FG34 | FH34 |
| DL05 | FG35 | FH35 | FG35 | FH35 | FG35 | FH35 | FG35 | FH35 | FG35 | FH35 | FG35 | FH35 | FG35 | FH35 | FG35 | FH35 | FG35 | FH35 | FG35 | FH35 |
| DL06 | FG41 | FH41 | FG41 | FH41 | FG41 | FH41 | FG41 | FH41 | FG41 | FH41 | FG41 | FH41 | FG41 | FH41 | FG41 | FH41 | FG41 | FH41 | FG41 | FH41 |
| DL07 | FG47 | FH47 | FG47 | FH47 | FG47 | FH47 | FG47 | FH47 | FG47 | FH47 | FG47 | FH47 | FG47 | FH47 | FG47 | FH47 | FG47 | FH47 | FG47 | FH47 |
| | Peripheral Channel G | | Peripheral Channel H | | Peripheral Channel J | | Peripheral Channel K | | Peripheral Channel L | | Peripheral Channel M | | Peripheral Channel N | | Peripheral Channel P | | Peripheral Channel Q | | Peripheral Channel R | |

BUFFER STORAGE UNIT

FIG. 138.

INPUT GATING SIGNALS

| INPUT DATA SIGNALS | DM40 | DM50 | DM60 | DM41 | DM51 | DM61 | DM42 | DM52 | DM62 | DM43 | DM53 | DM63 | DM44 | DM54 | DM64 | DM45 | DM55 | DM65 |
|---|---|---|---|---|---|---|---|---|---|---|---|---|---|---|---|---|---|---|
| JY00 | FW00 | | | FW00 | | | FW00 | | | FW00 | | | FW00 | | | FW00 | | |
| JY01 | FW01 | | | FW01 | | | FW01 | | | FW01 | | | FW01 | | | FW01 | | |
| JY02 | FW02 | | | FW02 | | | FW02 | | | FW02 | | | FW02 | | | FW02 | | |
| JY03 | FW03 | | | FW03 | | | FW03 | | | FW03 | | | FW03 | | | FW03 | | |
| JY04 | FW04 | | | FW04 | | | FW04 | | | FW04 | | | FW04 | | | FW04 | | |
| JY05 | FW05 | | | FW05 | | | FW05 | | | FW05 | | | FW05 | | | FW05 | | |
| JY06 | FW06 | | | FW06 | | | FW06 | | | FW06 | | | FW06 | | | FW06 | | |
| JY07 | FW07 | | | FW07 | | | FW07 | | | FW07 | | | FW07 | | | FW07 | | |
| JY08 | FW08 | | | FW08 | | | FW08 | | | FW08 | | | FW08 | | | FW08 | | |
| JY09 | FW09 | | | FW09 | | | FW09 | | | FW09 | | | FW09 | | | FW09 | | |
| JY10 | FW10 | | | FW10 | | | FW10 | | | FW10 | | | FW10 | | | FW10 | | |
| JY11 | FW11 | | | FW11 | | | FW11 | | | FW11 | | | FW11 | | | FW11 | | |
| JY12 | | FW12 | | | FW12 | | | FW12 | | | FW12 | | | FW12 | | | FW12 | |
| JY13 | | FW13 | | | FW13 | | | FW13 | | | FW13 | | | FW13 | | | FW13 | |
| JY14 | | FW14 | | | FW14 | | | FW14 | | | FW14 | | | FW14 | | | FW14 | |
| JY15 | | FW15 | | | FW15 | | | FW15 | | | FW15 | | | FW15 | | | FW15 | |
| JY16 | | FW16 | | | FW16 | | | FW16 | | | FW16 | | | FW16 | | | FW16 | |
| JY17 | | FW17 | | | FW17 | | | FW17 | | | FW17 | | | FW17 | | | FW17 | |
| JY18 | | FW18 | | | FW18 | | | FW18 | | | FW18 | | | FW18 | | | FW18 | |
| JY19 | | FW19 | | | FW19 | | | FW19 | | | FW19 | | | FW19 | | | FW19 | |
| JY20 | | FW20 | | | FW20 | | | FW20 | | | FW20 | | | FW20 | | | FW20 | |
| JY21 | | FW21 | | | FW21 | | | FW21 | | | FW21 | | | FW21 | | | FW21 | |
| JY22 | | FW22 | | | FW22 | | | FW22 | | | FW22 | | | FW22 | | | FW22 | |
| JY23 | | FW23 | | | FW23 | | | FW23 | | | FW23 | | | FW23 | | | FW23 | |
| JY24 | | | FW24 | | | FW24 | | | FW24 | | | FW24 | | | FW24 | | | FW24 |
| JY25 | | | FW25 | | | FW25 | | | FW25 | | | FW25 | | | FW25 | | | FW25 |
| JY26 | | | FW26 | | | FW26 | | | FW26 | | | FW26 | | | FW26 | | | FW26 |
| JY27 | | | FW27 | | | FW27 | | | FW27 | | | FW27 | | | FW27 | | | FW27 |
| JY28 | | | FW28 | | | FW28 | | | FW28 | | | FW28 | | | FW28 | | | FW28 |
| JY29 | | | FW29 | | | FW29 | | | FW29 | | | FW29 | | | FW29 | | | FW29 |
| JY30 | | | FW30 | | | FW30 | | | FW30 | | | FW30 | | | FW30 | | | FW30 |
| JY31 | | | FW31 | | | FW31 | | | FW31 | | | FW31 | | | FW31 | | | FW31 |
| JY32 | | | FW32 | | | FW32 | | | FW32 | | | FW32 | | | FW32 | | | FW32 |
| JY33 | | | FW33 | | | FW33 | | | FW33 | | | FW33 | | | FW33 | | | FW33 |
| JY34 | | | FW34 | | | FW34 | | | FW34 | | | FW34 | | | FW34 | | | FW34 |
| JY35 | | | FW35 | | | FW35 | | | FW35 | | | FW35 | | | FW35 | | | FW35 |
| | Per. Channel A | | | Per. Channel B | | | Per. Channel C | | | Per. Channel D | | | Per. Channel E | | | Per. Channel F | | |

FIG. 139. BUFFER STORAGE UNIT

GATING AND DATA INPUT SIGNALS

D-REGISTER OUTPUT SIGNALS

| | DR00 | DR01 | DR02 | DR03 | DR04 | DR05 | DR06 | DR07 | DR10 | DR11 | DR12 | DR13 |
|---|---|---|---|---|---|---|---|---|---|---|---|---|
| FD00 | FP00 | FQ00 | FP00 | FQ00 | FP00 | FQ00 | FP00 | FQ00 | FP00 | FQ00 | FP00 | FQ00 |
| FD01 | FP01 | FQ01 | FP01 | FQ01 | FP01 | FQ01 | FP01 | FQ01 | FP01 | FQ01 | FP01 | FQ01 |
| FD02 | FP02 | FQ02 | FP02 | FQ02 | FP02 | FQ02 | FP02 | FQ02 | FP02 | FQ02 | FP02 | FQ02 |
| FD03 | FP03 | FQ03 | FP03 | FQ03 | FP03 | FQ03 | FP03 | FQ03 | FP03 | FQ03 | FP03 | FQ03 |
| FD04 | FP04 | FQ04 | FP04 | FQ04 | FP04 | FQ04 | FP04 | FQ04 | FP04 | FQ04 | FP04 | FQ04 |
| FD05 | FP05 | FQ05 | FP05 | FQ05 | FP05 | FQ05 | FP05 | FQ05 | FP05 | FQ05 | FP05 | FQ05 |
| FD06 | FP06 | FQ06 | FP06 | FQ06 | FP06 | FQ06 | FP06 | FQ06 | FP06 | FQ06 | FP06 | FQ06 |
| FD07 | FP07 | FQ07 | FP07 | FQ07 | FP07 | FQ07 | FP07 | FQ07 | FP07 | FQ07 | FP07 | FQ07 |
| FD08 | FP08 | FQ08 | FP08 | FQ08 | FP08 | FQ08 | FP08 | FQ08 | FP08 | FQ08 | FP08 | FQ08 |
| FD09 | FP09 | FQ09 | FP09 | FQ09 | FP09 | FQ09 | FP09 | FQ09 | FP09 | FQ09 | FP09 | FQ09 |
| FD10 | FP10 | FQ10 | FP10 | FQ10 | FP10 | FQ10 | FP10 | FQ10 | FP10 | FQ10 | FP10 | FQ10 |
| FD11 | FP11 | FQ11 | FP11 | FQ11 | FP11 | FQ11 | FP11 | FQ11 | FP11 | FQ11 | FP11 | FQ11 |
| FD12 | FP12 | FQ12 | FP12 | FQ12 | FP12 | FQ12 | FP12 | FQ12 | FP12 | FQ12 | FP12 | FQ12 |
| FD13 | FP13 | FQ13 | FP13 | FQ13 | FP13 | FQ13 | FP13 | FQ13 | FP13 | FQ13 | FP13 | FQ13 |
| FD14 | FP14 | FQ14 | FP14 | FQ14 | FP14 | FQ14 | FP14 | FQ14 | FP14 | FQ14 | FP14 | FQ14 |
| FD15 | FP15 | FQ15 | FP15 | FQ15 | FP15 | FQ15 | FP15 | FQ15 | FP15 | FQ15 | FP15 | FQ15 |
| FD16 | FP16 | FQ16 | FP16 | FQ16 | FP16 | FQ16 | FP16 | FQ16 | FP16 | FQ16 | FP16 | FQ16 |
| FD17 | FP17 | FQ17 | FP17 | FQ17 | FP17 | FQ17 | FP17 | FQ17 | FP17 | FQ17 | FP17 | FQ17 |
| FD18 | FP18 | FQ18 | FP18 | FQ18 | FP18 | FQ18 | FP18 | FQ18 | FP18 | FQ18 | FP18 | FQ18 |
| FD19 | FP19 | FQ19 | FP19 | FQ19 | FP19 | FQ19 | FP19 | FQ19 | FP19 | FQ19 | FP19 | FQ19 |
| FD20 | FP20 | FQ20 | FP20 | FQ20 | FP20 | FQ20 | FP20 | FQ20 | FP20 | FQ20 | FP20 | FQ20 |
| FD21 | FP21 | FQ21 | FP21 | FQ21 | FP21 | FQ21 | FP21 | FQ21 | FP21 | FQ21 | FP21 | FQ21 |
| FD22 | FP22 | FQ22 | FP22 | FQ22 | FP22 | FQ22 | FP22 | FQ22 | FP22 | FQ22 | FP22 | FQ22 |
| FD23 | FP23 | FQ23 | FP23 | FQ23 | FP23 | FQ23 | FP23 | FQ23 | FP23 | FQ23 | FP23 | FQ23 |
| FD24 | FP24 | FQ24 | FP24 | FQ24 | FP24 | FQ24 | FP24 | FQ24 | FP24 | FQ24 | FP24 | FQ24 |
| FD25 | FP25 | FQ25 | FP25 | FQ25 | FP25 | FQ25 | FP25 | FQ25 | FP25 | FQ25 | FP25 | FQ25 |
| FD26 | FP26 | FQ26 | FP26 | FQ26 | FP26 | FQ26 | FP26 | FQ26 | FP26 | FQ26 | FP26 | FQ26 |
| FD27 | FP27 | FQ27 | FP27 | FQ27 | FP27 | FQ27 | FP27 | FQ27 | FP27 | FQ27 | FP27 | FQ27 |
| FD28 | FP28 | FQ28 | FP28 | FQ28 | FP28 | FQ28 | FP28 | FQ28 | FP28 | FQ28 | FP28 | FQ28 |
| FD29 | FP29 | FQ29 | FP29 | FQ29 | FP29 | FQ29 | FP29 | FQ29 | FP29 | FQ29 | FP29 | FQ29 |
| FD30 | FP30 | FQ30 | FP30 | FQ30 | FP30 | FQ30 | FP30 | FQ30 | FP30 | FQ30 | FP30 | FQ30 |
| FD31 | FP31 | FQ31 | FP31 | FQ31 | FP31 | FQ31 | FP31 | FQ31 | FP31 | FQ31 | FP31 | FQ31 |
| FD32 | FP32 | FQ32 | FP32 | FQ32 | FP32 | FQ32 | FP32 | FQ32 | FP32 | FQ32 | FP32 | FQ32 |
| FD33 | FP33 | FQ33 | FP33 | FQ33 | FP33 | FQ33 | FP33 | FQ33 | FP33 | FQ33 | FP33 | FQ33 |
| FD34 | FP34 | FQ34 | FP34 | FQ34 | FP34 | FQ34 | FP34 | FQ34 | FP34 | FQ34 | FP34 | FQ34 |
| FD35 | FP35 | FQ35 | FP35 | FQ35 | FP35 | FQ35 | FP35 | FQ35 | FP35 | FQ35 | FP35 | FQ35 |
| FD36 | FP36 | FQ36 | FP36 | FQ36 | FP36 | FQ36 | FP36 | FQ36 | FP36 | FQ36 | FP36 | FQ36 |
| FD37 | FP37 | FQ37 | FP37 | FQ37 | FP37 | FQ37 | FP37 | FQ37 | FP37 | FQ37 | FP37 | FQ37 |
| FD38 | FP38 | FQ38 | FP38 | FQ38 | FP38 | FQ38 | FP38 | FQ38 | FP38 | FQ38 | FP38 | FQ38 |
| FD39 | FP39 | FQ39 | FP39 | FQ39 | FP39 | FQ39 | FP39 | FQ39 | FP39 | FQ39 | FP39 | FQ39 |
| FD40 | FP40 | FQ40 | FP40 | FQ40 | FP40 | FQ40 | FP40 | FQ40 | FP40 | FQ40 | FP40 | FQ40 |
| FD41 | FP41 | FQ41 | FP41 | FQ41 | FP41 | FQ41 | FP41 | FQ41 | FP41 | FQ41 | FP41 | FQ41 |
| FD42 | FP42 | FQ42 | FP42 | FQ42 | FP42 | FQ42 | FP42 | FQ42 | FP42 | FQ42 | FP42 | FQ42 |
| FD43 | FP43 | FQ43 | FP43 | FQ43 | FP43 | FQ43 | FP43 | FQ43 | FP43 | FQ43 | FP43 | FQ43 |
| FD44 | FP44 | FQ44 | FP44 | FQ44 | FP44 | FQ44 | FP44 | FQ44 | FP44 | FQ44 | FP44 | FQ44 |
| FD45 | FP45 | FQ45 | FP45 | FQ45 | FP45 | FQ45 | FP45 | FQ45 | FP45 | FQ45 | FP45 | FQ45 |
| FD46 | FP46 | FQ46 | FP46 | FQ46 | FP46 | FQ46 | FP46 | FQ46 | FP46 | FQ46 | FP46 | FQ46 |
| FD47 | FP47 | FQ47 | FP47 | FQ47 | FP47 | FQ47 | FP47 | FQ47 | FP47 | FQ47 | FP47 | FQ47 |
| | Peripheral Channel A | | Peripheral Channel B | | Peripheral Channel C | | Peripheral Channel D | | Peripheral Channel E | | Peripheral Channel F | |

BUFFER STORAGE UNIT

FIG. 140.

GATING AND DATA INPUT SIGNALS

D-REGISTER OUTPUT SIGNALS

| | DR14 | DR15 | DR16 | DR17 | DR20 | DR21 | DR22 | DR23 | DR24 | DR25 | DR26 | DR27 | DR30 | DR31 | DR32 | DR33 | DR34 | DR35 | DR36 | DR37 |
|---|---|---|---|---|---|---|---|---|---|---|---|---|---|---|---|---|---|---|---|---|
| FD30 | FG30 | FH30 | FG30 | FH30 | FG30 | FH30 | FG30 | FH30 | FG30 | FH30 | FG30 | FH30 | FG30 | FH30 | FG30 | FH30 | FG30 | FH30 | FG30 | FH30 |
| FD31 | FG31 | FH31 | FG31 | FH31 | FG31 | FH31 | FG31 | FH31 | FG31 | FH31 | FG31 | FH31 | FG31 | FH31 | FG31 | FH31 | FG31 | FH31 | FG31 | FH31 |
| FD32 | FG32 | FH32 | FG32 | FH32 | FG32 | FH32 | FG32 | FH32 | FG32 | FH32 | FG32 | FH32 | FG32 | FH32 | FG32 | FH32 | FG32 | FH32 | FG32 | FH32 |
| FD33 | FG33 | FH33 | FG33 | FH33 | FG33 | FH33 | FG33 | FH33 | FG33 | FH33 | FG33 | FH33 | FG33 | FH33 | FG33 | FH33 | FG33 | FH33 | FG33 | FH33 |
| FD34 | FG34 | FH34 | FG34 | FH34 | FG34 | FH34 | FG34 | FH34 | FG34 | FH34 | FG34 | FH34 | FG34 | FH34 | FG34 | FH34 | FG34 | FH34 | FG34 | FH34 |
| FD35 | FG35 | FH35 | FG35 | FH35 | FG35 | FH35 | FG35 | FH35 | FG35 | FH35 | FG35 | FH35 | FG35 | FH35 | FG35 | FH35 | FG35 | FH35 | FG35 | FH35 |
| FD41 | FG41 | FH41 | FG41 | FH41 | FG41 | FH41 | FG41 | FH41 | FG41 | FH41 | FG41 | FH41 | FG41 | FH41 | FG41 | FH41 | FG41 | FH41 | FG41 | FH41 |
| FD47 | FG47 | FH47 | FG47 | FH47 | FG47 | FH47 | FG47 | FH47 | FG47 | FH47 | FG47 | FH47 | FG47 | FH47 | FG47 | FH47 | FG47 | FH47 | FG47 | FH47 |
| | Peripheral Channel G | | Peripheral Channel H | | Peripheral Channel J | | Peripheral Channel K | | Peripheral Channel L | | Peripheral Channel M | | Peripheral Channel N | | Peripheral Channel P | | Peripheral Channel Q | | Peripheral Channel R | |

FIG. 141. BUFFER STORAGE UNIT

GATING AND DATA INPUT SIGNALS

D-REGISTER OUTPUT SIGNALS

| | DWR0 |
|---|---|
| FD00 | DY00 |
| FD01 | DY01 |
| FD02 | DY02 |
| FD03 | DY03 |
| FD04 | DY04 |
| FD05 | DY05 |
| FD06 | DY06 |
| FD07 | DY07 |
| FD08 | DY08 |
| FD09 | DY09 |
| FD10 | DY10 |
| FD11 | DY11 |
| FD12 | DY12 |
| FD13 | DY13 |
| FD14 | DY14 |
| FD15 | DY15 |
| FD16 | DY16 |
| FD17 | DY17 |
| FD18 | DY18 |
| FD19 | DY19 |
| FD20 | DY20 |
| FD21 | DY21 |
| FD22 | DY22 |
| FD23 | DY23 |
| FD24 | DY24 |
| FD25 | DY25 |
| FD26 | DY26 |
| FD27 | DY27 |
| FD28 | DY28 |
| FD29 | DY29 |
| FD30 | DY30 |
| FD31 | DY31 |
| FD32 | DY32 |
| FD33 | DY33 |
| FD34 | DY34 |
| FD35 | DY35 |
| FD36 | DY36 |
| FD37 | DY37 |
| FD38 | DY38 |
| FD39 | DY39 |
| FD40 | DY40 |
| FD41 | DY41 |
| FD42 | DY42 |
| FD43 | DY43 |
| FD44 | DY44 |
| FD45 | DY45 |
| FD46 | DY46 |
| FD47 | DY47 |

FIG. 142. BUFFER STORAGE UNIT

JUMP ADDRESS (JA) BUS INPUT SIGNALS

DCL6 JN15 + DCL1 (JP27 + DDS3 + DDS2 + DDS0 + DDTS + JP23 + DTMJ + DDS1 + DCM1) = DJA0

DCL6 JN16 + DCL1 (JP27 + JP22 + DDS3 + DDS2 + DDS1 + DCM1) = DJA1

DCL6 JN17 + DCL1 (DDTS + JP27 + DTMJ + DCM8 + DCM1 + JP22 + DDS0 + DDS1 + DCM4) = DJA2

DCL6 JN18 + DCL1 (DDTS + JP27 + DDS2 + DCM4 + DTMJ) = DJA3

DCL6 JN19 + DCL1 (DDTS + DTMJ + DDSJ + JP23 + JP22 + DCM1 + DCM4 + DSNJ) = DJA4

DCL6 JN20 + DCL1 (DDTS + DTMJ + DSNJ + DCM4 + JP27 + DDS2 + DDS0 + JP23 + DDS1 + DCM1) = DJA5

DCL6 JN21 + DCL1 (DDSJ + DDTS + JP23 + DDS2 + DDS0 + DDS1 + DCM8) = DJA6

DCL6 JN22 + DCL1 (DDTS + DSNJ + DCM8 + DCM4 + DDS2 + DDS0 + DDSJ + DDS1 + DCM1) = DJA7

DCL6 JN23 + DCL1 (DDTS + DSNJ + JP27 + JP22 + DDS3 + DTMJ + JP23) = DJA8

DCL6 JN24 = DJA9

CONTROL WORD BUFFER ADDRESS SIGNALS $\overline{FK05}$ $\overline{FK04}$ $\overline{FK03}$ $\overline{FK02}$ = DKD0

$\overline{FK05}$ $\overline{FK04}$ $\overline{FK03}$ FK02 = DKD1

$\overline{FK05}$ $\overline{FK04}$ FK03 $\overline{FK02}$ = DKD2

$\overline{FK05}$ $\overline{FK04}$ FK03 FK02 = DKD3

$\overline{FK05}$ FK04 $\overline{FK03}$ $\overline{FK02}$ = DKD4

$\overline{FK05}$ FK04 $\overline{FK03}$ FK02 = DKD5

JUMP DECISION LOGIC SIGNALS

JT16 DTS0 + JT32 FA40 FA39 DTS0 + JT35 $\overline{FA40}$ $\overline{FA39}$ DTS0 + JT37 (FK05 + FK04 FK03) DTS0 + JT40 $\overline{FA41}$ DTS0 + JT42 $\overline{FSTA}$ DTS0 + JT43 $\overline{FK33}$ DTS0 + JT44 $\overline{JPRE}$ (FQ16 + FQ15 + FQ14 + FQ13 + FQ12 + FQ17) DTS0 + JT50 $\overline{FK15}$ DTS0 + JT51 FA40 $\overline{FA39}$ DTS0 + JT56 FA44 FA43 DTS0 = DSJ0

PROCESSING AND CONTROL UNIT

FIG. 143.

JUMP DECISION LOGIC SIGNALS (Cont.)

JT60 FA43 FA42 FA41 FA40 DTSO + JT61 (FA43 + FA42 + FA41
+ FA40) DTSO + JT62 FA46 FA45 FA44 FA43 FA42 DTSO
+ JT63 (FK33 + FK32 + FK31 + FK30 + FK34) DTSO
+ JT64 (FK33 + FK32 + FK31 + FK30 + FK34) DTSO
+ JT65 DZNO DTSO + JT66 DBNE DTSO + JT67 (DZNO
+ FA44 FA42) DTSO + JT70 (FA40 + FA39) DTSO
+ JT71 FDSP DTSO + JT72 (FA46 + FA45 + FA44 + FA43
+ FA42) DTSO + JT73 FDSP DTSO = DSJ1

JT03 JPRE (FQ39 + FQ38 + FQ37) TTBO + (JP01 + JP02)
·JPRE MAC7 DTSJ + DP03 DHGL DTSJ + (JP05 + JP06)
·DRN1 DTSJ + DP07 DRNO DTSJ + (DCM1 + DCM4 + DCM8)
·DTSJ + (DDS0 + DDS1 + DDS2 + DDS3) DTSJ
+ DP22 DX17 DW16 DW15 DTSJ + DP23 DW16 DW15 DW14
·DX13 DTSJ + DP23 DW16 DW15 DX14 DW13 DTSJ
+ DP27 DX17 DW16 DX15 DTSJ + JLPP TTSM + JCLP DTSO = DSJ2

TIMING CONTROL SIGNALS

DSSO FJMT JP03 JP11 JP20 JCL2 JCL3 JMLT JRUN
+ DSBF JRUN TTBO + DP03 DHGO DHG1 DHG2 JRUN DSSO
+ DP11 DCM1 DCM4 DCM8 JRUN DSSO + DP20 DDS0 DDS1
·DDS2 DDS3 DSSO JRUN + JRUN DCL6 DT03 FJMT JP01
·JP02 JP03 JP05 JP06 JP07 DTS1 + JCL1 JCL2 JCL3
·JCL4 JCL5 DTS1 JCL6 JRUN + DSTR JRUN + TFT1 DRET
·FDSP JRUN + JRUN TJST = DSTM

DSTM + DREJ = DSWM

FPTM + DMTE + JTLO = DTCC

FPTM JMDN = DTMC

FPTM JMDN = DTMS

TTSO = DTSO

TTS1 = DTS1

JPFG JPHD = QPFG

JPHD = QPH2

JSTD JPHD = QSTC

DTCC JPHD = QTCC

PROCESSING AND CONTROL UNIT
FIG. 144.

W-BUS INPUT SIGNALS

FH00 DTH0 + FC00 DTCL + FG00 DTG0 + FQ00 DTQ0
+ FW00(A) DR40 + FW00(B) DR41 + FW00(C) DR42
+ FW00(D) DR43 + FW00(E) DR44 + FW00(F) DR45 = DW00

FH01 DTH0 + FC01 DTCL + FG01 DTG0 + FQ01 DTQ0
+ FF01 DMTF + FK01 DTK0 + FW01(A) DR40
+ FW01(B) DR41 + FW01(C) DR42 + FW01(D) DR43
+ FW01(E) DR44 + FW01(F) DR45 = DW01

FH02 DTH0 + FC02 DTCL + FG02 DTG0 + FQ02 DTQ0
+ FE02 DMTE + FF02 DMTF + FPN2 DTPN + FK02 DTK0
+ FW02(A) DR40 + FW02(B) DR41 + FW02(C) DR42
+ FW02(D) DR43 + FW02(E) DR44 + FW02(F) DR45 = DW02

FH03 DTH0 + FC03 DTCL + FG03 DTG0 + FQ03 DTQ0
+ FE03 DMTE + FF03 DMTF + FPN3 DTPN + FK03 DTK0
+ FW03(A) DR40 + FW03(B) DR41 + FW03(C) DR42
+ FW03(D) DR43 + FW03(E) DR44 + FW03(F) DR45 = DW03

FH04 DTH0 + FC04 DTCL + FG04 DTG0 + FQ04 DTQ0
+ FE04 DMTE + FF04 DMTF + FPN4 DTPN + FK04 DTK0
+ FW04(A) DR40 + FW04(B) DR41 + FW04(C) DR42
+ FW04(D) DR43 + FW04(E) DR44 + FW04(F) DR45 = DW04

FH05 DTH0 + FC05 DTCL + FG05 DTG0 + FQ05 DTQ0
+ FQ05 DTQ0 + FE05 DMTE + FF05 DMTF + FPN5 DTPN
+ FK05 DTK0 + FW05(A) DR40 + FW05(B) DR41
+ FW05(C) DR42 + FW05(D) DR43 + FW05(E) DR44
+ FW05(F) DR45 = DW05

FH06 DTH0 + FC06 DTCL + FG06 DTG0 + FQ06 DTQ0
+ FE06 DMTE + FF06 DMTF + FW06(A) DR40 + FW06(B) DR41
+ FW06(C) DR42 + FW06(D) DR43 + FW06(E) DR44
+ FW06(F) DR45 = DW06

FH07 DTH0 + FC07 DTCL + FG07 DTG0 + FQ07 DTQ0
+ FE07 DMTE + FF07 DMFT + FW07(A) DR40
+ FW07(B) DR41 + FW07(C) DR42 + FW07(D) DR43
+ FW07(E) DR44 + FW07(F) DR45 = DW07

FH08 DTH0 + FC08 DTCL + FG08 DTG0 + FQ08 DTQ0
+ FE08 DMTE + FF08 DMTF + FW08(A) DR40
+ FW08(B) DR41 + FW08(C) DR42 + FW08(D) DR43
+ FW08(E) DR44 + FW08(F) DR45 = DW08

PROCESSING AND CONTROL UNIT

FIG.145.

W-BUS INPUT SIGNALS (Cont.)

FH09 DTH0 + FC09 DTCL + FG09 DTG0 + FQ09 DTQ0
+ FE09 DMTE + FF09 DMTF + FW09(A) DR40
+ FW09(B) DR41 + FW09(C) DR42 + FW09(D) DR43
+ FW09(E) DR44 + FW09(F) DR45 = DW09

FH10 DTH0 + FC10 DTCL + FG10 DTG0 + FQ10 DTQ0
+ FE10 DMTE + FF10 DMTF + FW10(A) DR40
+ FW10(B) DR41 + FW10(C) DR42 + FW10(D) DR43
+ FW10(E) DR44 + FW10(F) DR45 = DW10

FH11 DTH0 + FC11 DTCL + FG11 DTG0 + FQ11 DTQ0
+ FE11 DMTE + FF11 DMTF + FW11(A) DR40
+ FW11(B) DR41 + FW11(C) DR42 + FW11(D) DR43
+ FW11(E) DR44 + FW11(F) DR45 = DW11

FH12 DTH0 + FC12 DTCL + FG12 DTG2 + FQ12 DTQ0
+ FQ37 DTQH + FW12(A) DR40 + FW12(B) DR41
+ FW12(C) DR42 + FW12(D) DR43 + FW12(E) DR44
+ FW12(F) DR45 = DW12

FH13 DTH0 + FC13 DTCL + FG13 DTG2 + FQ13 DTQ0
+ FQ38 DTQH + FW13(A) DR40 + FW13(B) DR41
+ FW13(C) DR42 + FW13(D) DR43 + FW13(E) DR44
+ FW13(F) DR45 = DW13

FH14 DTH0 + FC14 DTCL + FG14 DTG3 + FQ14 DTQ0
+ FQ39 DTQH + FA41 DTA1 + FK14 DTK1
+ FW14(A) DR40 + FW14(B) DR41 + FW14(C) DR42
+ FW14(D) DR43 + FW14(E) DR44 + FR14(F) DR45 = DW14

FH15 DTH0 + FC15 DTCL + FG15 DTG3 + FQ15 DTQ0
+ FW15(A) DR40 + FW15(B) DR41 + FW15(C) DR42
+ FW15(D) DR43 + FW15(E) DR44 + FW15(F) DR45 = DW15

FH16 DTH0 + FC16 DTCL + FG16 DTG3 + FQ16 DTQ0
+ FW16(A) DR40 + FW16(B) DR41 + FW16(C) DR42
+ FW16(D) DR43 + FW16(E) DR44 + FW16(F) DR45 = DW16

FH17 DTH0 + FC17 DTCL + FG17 DTG3 + FQ17 DTQ0
+ FW17(A) DR40 + FW17(B) DR41 + FW17(C) DR42
+ FW17(D) DR43 + FW17(E) DR44 + FW17(F) DR45 = DW17

FH18 DTH1 + FC18 DTCH + FG18 DTG4 + FQ18 DTQ1 + FK18 DTK2
+ FW18(A) DR50 + FW18(B) DR51 + FW18(C) DR52
+ FW18(D) DR53 + FW18(E) DR54 + FW18(F) DR55 = DW18

PROCESSING AND CONTROL UNIT

FIG. 146.

W-BUS INPUT SIGNALS (Cont.)

FH19 DTH1 + FC19 DTCH + FG19 DTG4 + FQ19 DTQ1 + FK19 DTK2
+ FW19(A) DR50 + FW19(B) DR51 + FW19(C) DR52
+ FW19(D) DR53 + FW19(E) DR54 + FW19(F) DR55 = DW19

FH20 DTH1 + FC20 DTCH + FG20 DTG4 + FQ20 DTQ1 + FK20 DTK2
+ FW20(A) DR50 + FW20(B) DR51 + FW20(C) DR52
+ FW20(D) DR53 + FW20(E) DR54 + FW20(F) DR55 = DW20

FH21 DTH1 + FC21 DTCH + FG21 DTG4 + FQ21 DTQ1 + FK21 DTK2
+ FW21(A) DR50 + FW21(B) DR51 + FW21(C) DR52
+ FW21(D) DR53 + FW21(E) DR54 + FW21(F) DR55 = DW21

FH22 DTH1 + FC22 DTCH + FG22 DTG5 + FQ22 DTQ1 + FK22 DTK2
+ FW22(A) DR50 + FW22(B) DR51 + FW22(C) DR52
+ FW22(D) DR53 + FW22(E) DR54 + FW22(F) DR55 = DW22

FH23 DTH1 + FC23 DTCH + FG23 DTG5 + FQ23 DTQ1 + FK23 DTK2
+ FW23(A) DR50 + FW23(B) DR51 + FW23(C) DR52
+ FW23(D) DR53 + FW23(E) DR54 + FW22(F) DR55 = DW23

FH24 DTH1 + FC24 DTCH + FG24 DTG5 + FQ24 DTQ1 + FK24 DTK2
+ FW24(A) DR50 + FW24(B) DR51 + FW24(C) DR52
+ FW24(D) DR53 + FW24(E) DR54 + FW24(F) DR55 = DW24

FH25 DTH1 + FC25 DTCH + FC25 DTG5 + FQ25 DTQ1 + FK25 DTK2
+ FW25(A) DR50 + FW25(B) DR51 + FW25(C) DR52
+ FW25(D) DR53 + FW25(E) DR54 + FW25(F) DR55 = DW25

FH26 DTH1 + FC26 DTCH + FG26 DTG5 + FQ26 DTQ1 + FK26 DTK2
+ FW26(A) DR50 + FW26(B) DR51 + FW26(C) DR52
+ FW26(D) DR53 + FW26(E) DR54 + FW26(F) DR55 = DW26

FH27 DTH1 + FC27 DTCH + FG27 DTG5 + FQ27 DTQ1 + FK27 DTK2
+ FW27(A) DR50 + FW27(B) DR51 + FW27(C) DR52
+ FW27(D) DR53 + FW27(E) DR54 + FW27(F) DR55 = DW27

FH28 DTH1 + FC28 DTCH + FG28 DTG5 + FQ28 DTQ1 + FK28 DTK2
+ FW28(A) DR50 + FW28(B) DR51 + FW28(C) DR52
+ FW28(D) DR53 + FW28(E) DR54 + FW28(F) DR55 = DW28

FH29 DTH1 + FC29 DTCH + FG29 DTG5 + FQ29 DTQ1 + FK29 DTK2
+ FW29(A) DR50 + FW29(B) DR51 + FW29(C) DR52
+ FW29(D) DR53 + FW29(E) DR54 + FW29(F) DR55 = DW29

FH30 DTH1 + FC30 DTCH + FG30 DTG5 + FQ30 DTQ1 + FK30 DTK2
+ FW30(A) DR50 + FW30(B) DR51 + FW30(C) DR52
+ FW30(D) DR53 + FW30(E) DR54 + FW30(F) DR55 = DW30

*PROCESSING AND CONTROL UNIT*

*FIG. 147.*

Oct. 28, 1969 J. W. FIGUEROA ET AL 3,475,730

INFORMATION SHIFT APPARATUS IN A COMPUTER SYSTEM

Filed May 27, 1966 207 Sheets-Sheet 156

W-BUS INPUT SIGNALS (Cont.)

FH31 DTH1 + FC31 DTCH + FG31 DTG5 + FQ31 DTQ1 + FK31 DTK2
+ FW31(A) DR50 + FW31(B) DR51 + FW31(C) DR52
+ FW31(D) DR53 + FW31(E) DR54 + FW31(F) DR55 = DW31

FH32 DTH1 + FC32 DTCH + FG32 DTG5 + FQ32 DTQ1 + FK32 DTK2
+ FW32(A) DR50 + FW32(B) DR51 + FW32(C) DR52
+ FW32(D) DR53 + FW32(E) DR54 + FW32(F) DR55 = DW32

FH33 DTH1 + FC33 DTCH + FG33 DTG5 + FQ33 DTQ1 + FK33 DTK2
+ FW33(A) DR50 + FW33(B) DR51 + FW33(C) DR52
+ FW33(D) DR53 + FW33(E) DR54 + FW33(F) DR55 = DW33

FH34 DTH1 + FC34 DTCH + FG34 DTG5 + FQ34 DTQ1 + FK34 DTK2
+ FW34(A) DR50 + FW34(B) DR51 + FW34(C) DR52
+ FW34(D) DR53 + FW34(E) DR54 + FW34(F) DR55 = DW34

FH35 DTH1 + FC35 DTCH + FG35 DTG5 + FQ35 DTQ1
+ FW35(A) DR50 + FW35(B) DR51 + FW35(C) DR52
+ FW35(D) DR53 + FW35(E) DR54 + FW35(F) DR55 = DW35

FA42 DTA0 = DW42

FA43 DTA0 = DW43

FC44 DTCL + FA44 DTA0 = DW44

FC45 DTCL + FA45 DTA0 = DW45

FC46 DTCL + FA46 DTA0 = DW46

X-BUS INPUT SIGNALS $\overline{\text{JT24}}$ + JT23 + DW00 = DX00

DW01 = DX01

DW02 = DX02

DW03 = DX03

DW04 = DX04

DW05 = DX05

JT01 + DW06 = DX06

DW07 + JT11 = DX07

DW08 = DX08

DW09 = DX09

JP32 + DW10 = DX10

DW11 + JT01 + JT11 = DX11

DW12 = DX12

DW13 = DX13

PROCESSING AND CONTROL UNIT

FIG. 148.

X-BUS INPUT SIGNALS (Cont.)

| | | |
|---|---|---|
| DW14 + JT27 + JT30 + JT31 | = | DX14 |
| DW15 + JP24 + JP15 + JP14 | = | DX15 |
| JP17 + JP14 + JT30 + DW16 | = | DX16 |
| JP14 + DW17 + JP24 + JP30 | = | DX17 |
| JT02 + DW18 | = | DX18 |
| DW19 + JT15 | = | DX19 |
| DW20 + JES0 + JET0 | = | DX20 |
| DW21 + JES1 + JET1 + JT15 | = | DX21 |
| JT31 + JT27 + JT15 + JES2 + JET2 + DW22 | = | DX22 |
| JT31 + JT30 + JT15 + JES3 + JET3 + DW23 | = | DX23 |
| DW24 | = | DX24 |
| DW25 | = | DX25 |
| DW26 | = | DX26 |
| DW27 | = | DX27 |
| DW28 + JEA0 + JEF0 | = | DX28 |
| DW29 + JEA1 + JEF1 | = | DX29 |
| DW30 + JEA2 + JEF2 | = | DX30 |
| DW31 + JEA3 + JEF3 | = | DX31 |
| DW32 | = | DX32 |
| DW33 | = | DX33 |
| DW34 | = | DX34 |
| DW35 + JT13 + JP15 | = | DX35 |
| JT55 + DW42 | = | DX42 |
| JT55 + DW43 | = | DX43 |
| JT55 + DW44 | = | DX44 |

PROCESSING AND CONTROL UNIT

FIG. 149.

X-BUS INPUT SIGNALS (Cont.)

| | | |
|---|---|---|
| JT55 + DW45 | = | DX45 |
| JT55 + DW46 | = | DX46 |
| JT14 | = | DX47 |

Y-BUS INPUT SIGNALS

| | | | | | |
|---|---|---|---|---|---|
| DZ00 | = | DY00 | DZ19 | = | DY19 |
| DZ01 | = | DY01 | DSS0 | = | DY20 |
| DZ02 | = | DY02 | DSS0 | = | DY21 |
| DZ03 | = | DY03 | DSS0 | = | DY22 |
| DZ04 | = | DY04 | DZ23 | = | DY23 |
| DZ05 | = | DY05 | DZ24 | = | DY24 |
| DZ06 | = | DY06 | DZ25 | = | DY25 |
| DZ07 | = | DY07 | DZ26 | = | DY26 |
| DZ08 | = | DY08 | DZ27 | = | DY27 |
| DZ09 | = | DY09 | DZ28 | = | DY28 |
| DZ10 | = | DY10 | DZ29 | = | DY29 |
| DZ11 | = | DY11 | DZ30 | = | DY30 |
| DZ12 | = | DY12 | DZ31 | = | DY31 |
| DZ13 | = | DY13 | DZ32 | = | DY32 |
| DZ14 | = | DY14 | DZ33 | = | DY33 |
| DZ15 | = | DY15 | DZ34 | = | DY34 |
| DZ16 | = | DY16 | DZ35 | = | DY35 |
| DZ17 | = | DY17 | DZ42 | = | DY42 |
| DZ18 | = | DY18 | DZ43 | = | DY43 |

PROCESSING AND CONTROL UNIT

FIG. 150.

Y-BUS INPUT SIGNALS (Cont.)

| | | | | | |
|---|---|---|---|---|---|
| DZ44 | = | DY44 | DZ46 | = | DY46 |
| DZ45 | = | DY45 | DZ47 | = | DY47 |

Z-BUS INPUT SIGNALS $$\mathrm{DNC0\ \overline{DW00} + DDE0\ \overline{DW00} + JD00\ DSDR + JS00\ DML1 + DX00\ DZP0 = DZ00}$$

$$\begin{aligned}&\mathrm{DNC0\ DX01\ \overline{DW00} + DNC0\ \overline{DW01}\ DX00 + DDE0\ DX01\ DX00}\\&\quad\mathrm{+ DDE0\ \overline{DW01}\ \overline{DW00} + JD01\ DSDR + JS01\ DML1 + DX01\ \overline{DZP0}} = \mathrm{DZ01}\end{aligned}$$

$$\begin{aligned}&\mathrm{DNC0\ (\overline{DX01} + \overline{DX00})\ DX02 + DNC0\ \overline{DW02}\ DX01\ DX00}\\&\quad\mathrm{+ DDE0\ (DW01 + DW00)\ DX02 + DDE0\ \overline{DW02}\ \overline{DW01}\ \overline{DW00}}\\&\quad\mathrm{+ JD02\ DSDR + JS02\ DML1 + DX20\ DP21 + DX02\ DZP0} = \mathrm{DZ02}\end{aligned}$$

$$\begin{aligned}&\mathrm{DNC0\ (\overline{DX02} + \overline{DX01} + \overline{DX00})\ DX03 + DNC0\ \overline{DW03}\ DX02\ DX01\ DX00}\\&\quad\mathrm{+ (DW02 + DW01 + DW00)\ DX03\ DDE0 + \overline{DW03}\ \overline{DW02}\ \overline{DW01}\ \overline{DW00}\ DDE0}\\&\quad\mathrm{+ JD03\ DSDR + JS03\ DML1 + DX21\ DP21 + DX03\ DZP0} = \mathrm{DZ03}\end{aligned}$$

$$\begin{aligned}&\mathrm{DNC0\ (\overline{DX03} + \overline{DX02} + \overline{DX01} + \overline{DX00})\ DX04 + DNC0\ \overline{DW04}\ DX03}\\&\quad\mathrm{\cdot DX02\ DX01\ DX00 + (DW03 + DW02 + DW01 + DW00)\ DX04\ DDE0}\\&\quad\mathrm{+ \overline{DW04}\ \overline{DW03}\ \overline{DW02}\ \overline{DW01}\ \overline{DW00}\ DDE0 + JD04\ DSDR + JS04\ DML1}\\&\quad\mathrm{+ DX22\ DP21 + DX04\ DZP0} = \mathrm{DZ04}\end{aligned}$$

$$\begin{aligned}&\mathrm{DNC0\ (\overline{DX00} + \overline{DX04} + \overline{DX03} + \overline{DX02} + \overline{DX01})\ DX05}\\&\quad\mathrm{+ DNC0\ \overline{DW05}\ DX04\ DX03\ DX02\ DX01\ DX00 + (DW01 + DW04}\\&\quad\mathrm{+ DW03 + DW02 + DW00)\ DX05\ DDE0 + \overline{DW05}\ \overline{DW04}\ \overline{DW03}\ \overline{DW02}}\\&\quad\mathrm{\cdot \overline{DW01}\ \overline{DW00}\ DDE0 + JD05\ DSDR + JS05\ DML1 + DX23\ DP21}\\&\quad\mathrm{+ DX05\ DZP0} = \mathrm{DZ05}\end{aligned}$$

$$\begin{aligned}&\mathrm{\overline{DFC0}\ DX06\ DNC0 + DFC0\ \overline{DW06}\ DNC0 + \overline{DRN0}\ DX06\ DDE1}\\&\quad\mathrm{+ \overline{DW06}\ DRN0\ DDE1 + JD06\ DSDR + JS06\ DML1 + DX06\ DZP0} = \mathrm{DZ06}\end{aligned}$$

$$\begin{aligned}&\mathrm{DNC0\ (\overline{DX06} + \overline{DFC0})\ DX07 + DNC0\ \overline{DW07}\ DX06\ DFC0 + JD07\ DSDR}\\&\quad\mathrm{+ JS07\ DML1 + DX07\ DZP0 + (DW06 + \overline{DRN0})\ DX07\ DDE1}\\&\quad\mathrm{+ DDE1\ \overline{DW07}\ \overline{DW06}\ DRN0} = \mathrm{DZ07}\end{aligned}$$

$$\begin{aligned}&\mathrm{DNC0\ (\overline{DW07} + \overline{DW06} + \overline{DFC0})\ DX08 + DNC0\ \overline{DW08}\ DX07\ DX06\ DFC0}\\&\quad\mathrm{+ JD08\ DSDR + JS08\ DML1 + DX08\ DZP0 + (DW07 + DW06}\\&\quad\mathrm{+ \overline{DRN0})\ DX08\ DDE1 + \overline{DW08}\ \overline{DW07}\ \overline{DW06}\ DRN0\ DDE1} = \mathrm{DZ08}\end{aligned}$$

$$\begin{aligned}&\mathrm{DNC0\ (\overline{DX08} + \overline{DX07} + \overline{DX06} + \overline{DFC0})\ DX09}\\&\quad\mathrm{+ \overline{DW09}\ DX08\ DX07\ DX06\ DFC0\ DNC0 + JD09\ DSDR + JS09\ DML1}\\&\quad\mathrm{+ \overline{DX09}\ DZP0 + DX09\ (DW08 + DW07 + DW06 + \overline{DRN0})\ DDE1}\\&\quad\mathrm{+ \overline{DW09}\ \overline{DW08}\ \overline{DW07}\ \overline{DW06}\ DRN0\ DDE1} = \mathrm{DZ09}\end{aligned}$$

*PROCESSING AND CONTROL UNIT*

*FIG. 151.*

Z-BUS INPUT SIGNALS (Cont.)

DNC0 ($\overline{DX09}$ + $\overline{DX08}$ + $\overline{DX07}$ + $\overline{DFC0}$ + $\overline{DX06}$) DX10
+ DNC0 $\overline{DW10}$ DX09 DX08 DX07 DX06 DFC0 + JN10 DCLR
+ JD10 DSDR + JS10 DML1 + DX10 DZP0 + (DW09 + DW08
+ DW07 + DRN0 + DW06) DX10 DDE1 + DDE1 $\overline{DW10}$ $\overline{DW09}$ $\overline{DW08}$
·$\overline{DW07}$ $\overline{DW06}$ $\overline{DRN0}$ = DZ10

DNC0 ($\overline{DX10}$ + $\overline{DX09}$ + $\overline{DX08}$ + $\overline{DX07}$ + $\overline{DFC0}$ + $\overline{DX06}$) DX11
+ DNC0 $\overline{DW11}$ DX10 DX09 DX08 DX07 DX06 DFC0 + JD11 DSDR
+ JS11 DML1 + DX11 DZP0 + (DW10 + DW09 + DW08 + DW07
+ DRN0 + DW06) DX11 DDE1 + DDE1 $\overline{DW11}$ $\overline{DW10}$ $\overline{DW09}$ $\overline{DW08}$
·$\overline{DW07}$ $\overline{DW06}$ $\overline{DRN0}$ = DZ11

JN12 DCLR + JD12 DSDR + JS12 DML1 + DX12 DZP1 = DZ12

JN13 DCLR + JD13 DSDR + JS13 DML1 + DX13 DZP1 = DZ13

JN14 DCLR + JD14 DSDR + JS14 DML1 + DX14 DZP1 = DZ14

DNC1 $\overline{DW15}$ + DPA6 (FA46 + DCT3 + DCT1) + JN15 DCLR
+ JD15 DSDR + JS15 DML1 + DX15 DZP2 = DZ15

DX16 DNC1 $\overline{DW15}$ + $\overline{DW16}$ $\overline{DZE5}$ DNC1 DX15 + DPA6 (DCT3 + DCT2)
+ JN16 DCLR + JD16 DSDR + JS16 DML1 + DX16 DZP2 $\overline{JP33}$ = DZ16

DNC1 $\overline{DZE5}$ ($\overline{DX16}$ + $\overline{DX15}$) DX17 + DNC1 $\overline{DW17}$ DX16 DX15
+ DPA6 (FA46 + DCT4) + JN17 DCLR + JD17 DSDR + JS17 DML1
+ DX17 DZP2 = DZ17

DNC2 $\overline{DFC2}$ DX18 + DNC2 $\overline{DW18}$ DFC2 + JN18 DCLR + JD18 DSDR
+ JS18 DML1 + DX18 DZP3 = DZ18

DX19 ($\overline{DX18}$ + $\overline{DFC2}$) DNC2 + $\overline{DW19}$ DX18 DFC2 DNC2
+ JN19 DCLR + JD19 DSDR + DX19 DZP3 = DZ19

DNC2 ($\overline{DFC2}$ + $\overline{DX18}$ + $\overline{DX19}$) DX20 + DNC2 $\overline{DW20}$ DX19 DX18 DFC2
+ DCL4 JN20 + DZP3 DX20 + DCL5 FK02 = DZ20

DNC2 ($\overline{DFC2}$ + $\overline{DX18}$ + $\overline{DX19}$ + $\overline{DX20}$) DX21
+ DNC2 $\overline{DW21}$ DX18 DX19 DX20 DFC2 + JN21 DCL4 + DX21 DZP3
+ FK03 DCL5 = DZ21

DNC3 DFC3 $\overline{DW22}$ + DX22 $\overline{DFC3}$ DNC3 + JN22 DCL4
+ DX22 DZP4 + FK04 DCL5 = DZ22

($\overline{DX22}$ + $\overline{DFC3}$) DX23 DNC3 + $\overline{DW23}$ DX22 DFC3 DNC3
+ JN23 DCL4 + JS23 DML1 + DX23 DZP4 + FK05 DCL5 = DZ23

DNC3 ($\overline{DFC3}$ + $\overline{DX22}$ + $\overline{DX23}$) DX24 + DNC3 $\overline{DW24}$ DX22 DX23 DFC3
+ JN24 DCLR + JD24 DSDR + JS24 DML1 + DX24 DZP4 = DZ24

PROCESSING AND CONTROL UNIT

FIG. 152.

Z-BUS INPUT SIGNALS (Cont.)

DNC3 ($\overline{DFC3}$ + $\overline{DX22}$ + $\overline{DX23}$ + $\overline{DX24}$) DX25
+ DNC3 $\overline{DW25}$ DX22 DX23 DX24 DFC3 + JN25 DCLR
+ JD25 DSDR + JS25 DML1 + DX25 DZP4 = DZ25

DNC3 ($\overline{DFC3}$ + $\overline{DX22}$ + $\overline{DX23}$ + $\overline{DX24}$ + $\overline{DX25}$) DX26
+ DNC3 $\overline{DW26}$ DX25 DX24 DX23 DX22 DFC3
+ JD26 DSDR + JS26 DML1 + DX26 DZP4 = DZ26

DNC3 ($\overline{DFC3}$ + $\overline{DX22}$ + $\overline{DX23}$ + $\overline{DX24}$ + $\overline{DX25}$ + $\overline{DX26}$) DX27
+ DNC3 $\overline{DW27}$ DX26 DX25 DX24 DX23 DX22 DFC3
+ JD27 DSDR + JS27 DML1 + DX27 DZP4 = DZ27

DADD MSM0 + JD28 DSDR + JS28 DML1 + DX28 DZP5 = DZ28

DADD MSM1 + JD29 DSDR + JS29 DML1 + DX29 DZP5 = DZ29

DADD MSM2 + JD30 DSDR + JS30 DML1 + DX30 DZP5 = DZ30

DADD MSM3 + JD31 DSDR + JS31 DML1 + DX31 DZP5 = DZ31

DADD MSM4 + JD32 DSDR + JS32 DML1 + DX32 DZP5 = DZ32

DADD MSM5 + JD33 DSDR + JS33 DML1 + DX33 DZP5 = DZ33

DADD MSM6 + JD34 DSDR + JS34 DML1 + DX34 DZP5 = DZ34

DADD MSM7 + JD35 DSDR + JS35 DML1 + DX35 DZP5 = DZ35

JD42 DSDR + JS42 DML1 + DX42 DZP7 = DZ42

JD43 DSDR + JS43 DML1 + DX43 DZP7 = DZ43

JD44 DSDR + JS44 DML1 + DX44 DZP7 = DZ44

JD45 DSDR + JS45 DML1 + DX45 DZP7 = DZ45

JD46 DSDR + JS46 DML1 + DX46 DZP7 = DZ46

JD47 DSDR + JS47 DML1 + DX47 DZP7 = DZ47

MISCELLANEOUS LOGICAL COMBINATION SIGNALS

DWAD DX10 = D010

DWAD DX11 = D011

DWAD DX12 = D012

DWAD DX13 = D013

PROCESSING AND CONTROL UNIT

FIG. 153.

MISCELLANEOUS LOGICAL COMBINATION SIGNALS (Cont.)

| | |
|---|---|
| DWAD DX14 | = DO14 |
| DWAD DX15 | = DO15 |
| DWAD DX16 | = DO16 |
| DWAD DX17 | = DO17 |
| JP02 + JP06 + JP16 + JP22 + JP27 + JP01 | = DADD |
| DANR $\overline{FF08}$ $\overline{FF09}$ FF07 | = DALJ |
| DRCL $\overline{FF10}$ $\overline{FF06}$ | = DANR |
| FA44 $\overline{FA43}$ + $\overline{FA44}$ FA43 FA42 | = DBNE |
| FBUF $\overline{FTMR}$ | = DBUF |
| $\overline{DN17}$ JN16 + JN17 FK01 | = DCD1 |
| JN21 | = DCD6 |
| JN22 | = DCD7 |
| JN23 | = DCD8 |
| JN24 | = DCD9 |
| JCL5 + JCL4 | = DCLR |
| $\overline{DW14}$ DX13 $\overline{DW15}$ DP11 $\overline{DW16}$ + DX14 DP11 | = DCM1 |
| $\overline{DW16}$ DX15 $\overline{DW14}$ $\overline{DW13}$ DP11 | = DCM4 |
| DX16 $\overline{DW15}$ $\overline{DW14}$ $\overline{DW13}$ DP11 | = DCM8 |
| $\overline{DW19}$ $\overline{DW01}$ | = DCP0 |
| $\overline{DW20}$ $\overline{DW02}$ | = DCP1 |
| $\overline{DW21}$ $\overline{DW03}$ | = DCP2 |
| $\overline{DW22}$ $\overline{DW04}$ | = DCP3 |
| $\overline{DW23}$ $\overline{DW05}$ | = DCP4 |
| $\overline{DW24}$ $\overline{DW06}$ | = DCP5 |
| $\overline{DW25}$ $\overline{DW07}$ | = DCP6 |

PROCESSING AND CONTROL UNIT
FIG. 154.

MISCELLANEOUS LOGICAL COMBINATION SIGNALS (Cont.)

| | |
|---|---|
| $\overline{DW26}$ $\overline{DW08}$ | = DCP7 |
| $\overline{DW27}$ $\overline{DW09}$ | = DCP8 |
| $\overline{FA43}$ FA42 | = DCT1 |
| $\overline{FA44}$ FA43 | = DCT2 |
| $\overline{FA45}$ FA44 | = DCT3 |
| $\overline{FA46}$ FA45 | = DCT4 |
| DCTB + DCTC | = DCTA |
| DGNC DP02 | = DCTB |
| (JP06 + JP16 + JP22 + JP27) DX18 DX19 DX20 DX21 DX22 ·DX23 DX24 DX25 DX26 DX27 DFC2 | = DCTC |
| JP05 + JP06 + JP07 | = DDE0 |
| JP05 + JP06 | = DDE1 |
| DX14 DX13 DX12 DP20 | = DDS0 |
| $\overline{DW14}$ DX13 DX12 DP20 $\overline{DLTB}$ | = DDS1 |
| $\overline{DW14}$ $\overline{DMSK}$ $\overline{DLTB}$ DP20 | = DDS2 |
| $\overline{DMSK}$ DX17 DX16 DX15 $\overline{DW14}$ DP20 | = DDS3 |
| DRCL FF10 | = DDSJ |
| DANR $\overline{FF08}$ $\overline{FF09}$ $\overline{FF07}$ | = DDTS |
| FTM0 FTM1 $\overline{FTM2}$ $\overline{FTM3}$ $\overline{JDTM}$ | = DEMT |
| DX05 DX04 DX03 DX02 DX01 DX00 | = DFC0 |
| DZE5 + $\overline{DNC1}$ | = DFC2 |
| DX21 DX20 DX19 DX18 DFC2 | = DFC3 |
| $\overline{DCP6}$ $\overline{DCP5}$ $\overline{DCP4}$ $\overline{DCP3}$ $\overline{DCP2}$ DX20 DX02 $\overline{DCP8}$ $\overline{DCP7}$ + $\overline{DCP6}$ $\overline{DCP5}$ $\overline{DCP4}$ $\overline{DCP3}$ $\overline{DCP2}$ $\overline{DCP1}$ $\overline{DX19}$ DX01 $\overline{DCP8}$ $\overline{DCP7}$ + $\overline{DCP6}$ $\overline{DCP5}$ $\overline{DCP4}$ $\overline{DCP3}$ $\overline{DCP2}$ $\overline{DCP1}$ $\overline{DCP0}$ DX18 DX00 $\overline{DCP8}$ $\overline{DCP7}$ | = DGC0 |
| $\overline{DCP6}$ $\overline{DCP5}$ DX23 DX05 $\overline{DCP8}$ $\overline{DCP7}$ + $\overline{DCP5}$ $\overline{DCP4}$ DX22 DX04 $\overline{DCP8}$ ·$\overline{DCP7}$ $\overline{DCP6}$ + $\overline{DCP5}$ $\overline{DCP4}$ $\overline{DCP3}$ DX21 DX03 $\overline{DCP8}$ $\overline{DCP7}$ $\overline{DCP6}$ | = DGC1 |

PROCESSING AND CONTROL UNIT

FIG. 155.

MISCELLANEOUS LOGICAL COMBINATION SIGNALS (Cont.)

| | | |
|---|---|---|
| $DX27\ DX09 + \overline{DCP8}\ DX26\ DX08 + \overline{DCP8}\ \overline{DCP7}\ DX25\ DX07 + \overline{DCP6}\ DX24\ DX06\ \overline{DCP8}\ \overline{DCP7}$ | = | DGC2 |
| FQ39 + FQ38 + FQ37 | = | DGER |
| DGC2 + DGC1 + DGC0 | = | DGNC |
| $\overline{DLG4}\ \overline{DLG3}\ \overline{DLG2}\ DX29\ \overline{DW02}\ \overline{DLG7}\ \overline{DLG6}\ \overline{DLG5} + DX28\ \overline{DW01}\ \overline{DLG5}\ \overline{DLG4}\ \overline{DLG3}\ \overline{DLG2}\ \overline{DLG1}\ \overline{DLG7}\ \overline{DLG6}$ | = | DHG0 |
| $DX32\ \overline{DW05}\ \overline{DLG7}\ \overline{DLG6}\ \overline{DLG5} + \overline{DLG4}\ DX31\ \overline{DW04}\ \overline{DLG7}\ \overline{DLG6}\ \overline{DLG5} + \overline{DLG4}\ DLG3\ DX30\ \overline{DW03}\ \overline{DLG7}\ \overline{DLG6}\ \overline{DLG5}$ | = | DHG1 |
| $DX35\ \overline{DW08} + \overline{DLG7}\ DX34\ \overline{DW07} + \overline{DLG7}\ \overline{DLG6}\ DX33\ \overline{DW06}$ | = | DHG2 |
| DHG2 + DHG1 + DHG0 | = | DHGL |
| $\overline{FK32}\ \overline{DREL}$ | = | $\overline{DK32}$ |
| $FK32\ \overline{DREL}$ | = | DK32 |
| $DSEQ\ (\overline{DK32}\ \overline{FK18} + DK32\ \overline{FK24} + JREL)$ | = | $\overline{DKC0}$ |
| $DSEQ\ (\overline{DK32}\ FK18 + DK32\ FK24)$ | = | DKC0 |
| $DSEQ\ (\overline{DK32}\ \overline{FK19} + DK32\ \overline{FK25} + JREL)$ | = | $\overline{DKC1}$ |
| $DSEQ\ (\overline{DK32}\ FK19 + DK32\ FK25)$ | = | DKC1 |
| $DSEQ\ (\overline{DK32}\ \overline{FK20} + DK32\ \overline{FK26} + JREL)$ | = | $\overline{DKC2}$ |
| $DSEQ\ (\overline{DK32}\ FK20 + DK32\ FK26)$ | = | DKC2 |
| $DSEQ\ (\overline{DK32}\ \overline{FK21} + DK32\ \overline{FK27} + JREL)$ | = | $\overline{DKC3}$ |
| $DSEQ\ (\overline{DK32}\ FK21 + DK32\ FK27)$ | = | DKC3 |
| $DSEQ\ (\overline{DK32}\ \overline{FK22} + DK32\ \overline{FK28} + JREL)$ | = | $\overline{DKC4}$ |
| $DSEQ\ (\overline{DK32}\ FK22 + DK32\ FK28)$ | = | DKC4 |
| $DSEQ\ (\overline{DK32}\ \overline{FK23} + DK32\ \overline{FK29} + JREL)$ | = | $\overline{DKC5}$ |
| $DSEQ\ (\overline{DK32}\ FK23 + DK32\ FK29)$ | = | DKC5 |
| $DSEQ\ (\overline{DK32}\ \overline{FK30} + DK32\ \overline{FK31})$ | = | $\overline{DKC6}$ |
| $DSEQ\ (\overline{DK32}\ FK30 + DK32\ FK31 + JREL)$ | = | DKC6 |

PROCESSING AND CONTROL UNIT

FIG. 156.

MISCELLANEOUS LOGICAL COMBINATION SIGNALS (Cont.)

| | | |
|---|---|---|
| DSEQ $\overline{\text{FK32}}$ | = | $\overline{\text{DKC7}}$ |
| DSEQ FK32 | = | DKC7 |
| $\overline{\text{DW29}}$ DX02 | = | DLG1 |
| $\overline{\text{DW30}}$ DX03 | = | DLG2 |
| $\overline{\text{DW31}}$ DX04 | = | DLG3 |
| $\overline{\text{DW32}}$ DX05 | = | DLG4 |
| $\overline{\text{DW33}}$ DX06 | = | DLG5 |
| $\overline{\text{DW34}}$ DX07 | = | DLG6 |
| $\overline{\text{DW35}}$ DX08 | = | DLG7 |
| JMLL + JR04 + JCL4 ÷ JCL5 | = | DLLR |
| DX17 DX16 DX15 | = | DLTB |
| JML1 | = | DML1 |
| (JMLE + JR20) DSS0 | = | DMLE |
| DX13 DX12 | = | DMSK |
| JCL2 + JMTD | = | DMT2 |
| JP25 | = | DNC0 |
| JP22 + JP27 + JP31 | = | DNC1 |
| JP06 + JP13 + JP16 + JP22 + JP27 | = | DNC2 |
| JP06 + JP16 + JP22 + JP27 | = | DNC3 |
| DN22 + DN24 + JMTD | = | DNMT |
| (JP23 + JP20 + JP12 + JP11 + JMLA) DSS0 | = | DPA0 |
| JP26 $\overline{\text{FA41}}$ | = | DPA6 |
| JP06 + JP16 | = | DPG0 |
| JP01 + JP02 + JP05 + JP06 + JP07 + JP16 + JP22 + JP23 + JP27 | = | DPG1 |

PROCESSING AND CONTROL UNIT

FIG.157

MISCELLANEOUS LOGICAL COMBINATION SIGNALS (Cont.)

| | | |
|---|---|---|
| JP07 + JP10 + JP11 + JP12 + JP14 + JP15 + JP17 + JP23 + JP24 + JP26 + JP30 + JP32 + JP33 | = | DPG2 |
| JP11 + JP13 + JP16 + JP20 + JP31 + JP03 + JP05 + JP06 | = | DPG3 |
| JP20 + JP21 + JP22 + JP25 + JP27 + JP01 + JP02 | = | DPG4 |
| JP03 + JP05 + JP11 | = | DPG5 |
| JP02 + JP22 + JP27 | = | DPG6 |
| JP07 + JP23 | = | DPG7 |
| JP22 + JP27 | = | DPG8 |
| JP03 + JP13 + JP20 + JP31 | = | DPG9 |
| JP21 + JP25 | = | DPGA |
| (JR23 + JMLN) DSS0 | = | DPN0 |
| JR17 DSS0 | = | DRA0 |
| DR06 DSS0 | = | DRA1 |
| DRES + JRAS | = | DRAS |
| DRCR DSS0 | = | DRC0 |
| DRCR DSS0 | = | DRC1 |
| DRCR DSS0 | = | DRC2 |
| DRCR DSS0 | = | DRC3 |
| DRCH DSS0 | = | DRC5 |
| DR25 DSS0 | = | DRCB |
| JMLC + JR01 | = | DRCH |
| JR21 + JR22 | = | DRCL |
| DALJ TFT2 | = | DRCN |
| JMLC + JR01 + JR14 | = | DRCR |
| TREJ | = | DREJ |

PROCESSING AND CONTROL UNIT
FIG. 158.

MISCELLANEOUS LOGICAL COMBINATION SIGNALS (Cont.)

| | | |
|---|---|---|
| JN20 DRU4 | = | DRER |
| DRCL FF06 $\overline{FF10}$ | = | DRET |
| TREJ DRCL | = | DRFR |
| DRGL DSS0 | = | DRG0 |
| DRGL DSS0 | = | DRG1 |
| (JMLG + JR03 + JR13) DSS0 | = | DRG2 |
| DRGH DSS0 | = | DRG4 |
| DRGH DSS0 | = | DRG5 |
| JMLG + JR03 + JR12 | = | DRGH |
| JMLG + JR03 | = | DRGL |
| DRHL DSS0 | = | DRH0 |
| DRHL DSS0 | = | DRH1 |
| DRHH DSS0 | = | DRH2 |
| DRHH DSS0 | = | DRH3 |
| JMLH + JR07 + JR16 | = | DRHH |
| JMLH + JR07 | = | DRHL |
| (JMLK + JR05 + JR11) DSS0 | = | DRK0 |
| (JMLK + JR24) DSS0 | = | DRK1 |
| DRKH DSS0 | = | DRK2 |
| DRKH DSS0 | = | DRK3 |
| DRKH DSS0 | = | DRK4 |
| JMLK + JR05 | = | DRKH |
| DLLR DSS0 | = | DRL0 |
| DLLR DSS0 | = | DRL1 |
| DLLR DSS0 | = | DRL2 |

PROCESSING AND CONTROL UNIT

FIG. 159

MISCELLANEOUS LOGICAL COMBINATION SIGNALS (Cont.)

| | |
|---|---|
| JRMK | = DRMK |
| $\overline{DW05}$ $\overline{DW04}$ $\overline{DW03}$ $\overline{DW02}$ $\overline{DW01}$ $\overline{DW00}$ | = DRN0 |
| $\overline{DW09}$ $\overline{DW08}$ $\overline{DW07}$ $\overline{DW06}$ DRN0 $\overline{DW11}$ $\overline{DW10}$ | = DRN1 |
| FMRF | = DRQR |
| DRMK + DRES | = DRSE |
| DRFR + DRES | = DRSF |
| DSAB JRMK | = DRSK |
| DRUR DSS0 | = DRU0 |
| DRUR DSS0 | = DRU1 |
| (JR02 + JMLU + JR26) DSS0 | = DRU2 |
| DRUR DSS0 | = DRU3 |
| DRUR DSS0 | = DRU4 |
| JR02 JMLU $\overline{JMDN}$ | = DRUR |
| FE06 + FE07 + FE08 | = DSAB |
| ($\overline{JCL2}$ + $\overline{JCL3}$) (FBUF + DT05) | = DSBF |
| DNMT DMT2 | = DSDR |
| TFT1 DTEK | = DSEH |
| FF10 FF06 $\overline{FDSP}$ TFT2 + DSJF TFT1 | = DSEJ |
| TFT1 DTEK | = DSEL |
| DSJ0 + DSJ1 + DSJ2 + DSEJ | = DSJA |
| FDSP + $\overline{FF06}$ | = DSJF |
| $\overline{JCL1}$ $\overline{JCL2}$ $\overline{JCL3}$ $\overline{JCL4}$ $\overline{JCL5}$ $\overline{JCL6}$ | = DSKP |
| DSNJ + DTMJ + DALJ | = DSMF |
| DANR FF09 | = DSNJ |
| $\overline{FDSP}$ FF06 FF10 TFT1 | = DSPC |

*PROCESSING AND CONTROL UNIT*

*FIG.160.*

MISCELLANEOUS LOGICAL COMBINATION SIGNALS (Cont.)

| | |
|---|---|
| JSRQ $\overline{\text{FL14}}$ | = DSRQ |
| TSSD + TTS3 DPG9 + TTS2 $\overline{\text{JP07}}$ $\overline{\text{JP23}}$ + DTS1 DCLR + TTS4 DPGA + TTB1 + DYTB JN23 + DYTB JMLT + TTSM JML1 + TTBO DSBF | = DSSO |
| FK34 + FK35 | = DSTA |
| TFT1 DTEK | = DSTK |
| (JPST + JSTS) TTSM | = DSTR |
| JMTA | = DTA0 |
| JT57 | = DTA1 |
| JMTC + JT06 + JT34 | = DTCH |
| JMTC + JT06 | = DTCL |
| DSNJ + DTMJ + DDSJ | = DTEK |
| JT34 + JT07 + JMTG | = DTG0 |
| JT07 + JMTG | = DTG2 |
| JT07 + JT52 + JMTG | = DTG3 |
| JT33 + JT52 + JT27 + JT30 + JT31 + JMTG + JT07 | = DTG4 |
| JT07 + JT33 + JT52 + JMTG | = DTG5 |
| JMTH + JT10 + JT32 | = DTH0 |
| JMTH + JT10 | = DTH1 |
| JT13 + JT01 + JT11 + JCL5 + JMTK | = DTK0 |
| JT36 + JMTK | = DTK1 |
| DTKR $\overline{\text{FK34}}$ | = DTK2 |
| JT13 + JMTK | = DTKR |
| DANR $\overline{\text{FF09}}$ FF08 | = DTMJ |
| JT05 + DT03 | = DTMR |
| JT12 + JMTN | = DTPN |
| DTQA | = DTQ0 |

PROCESSING AND CONTROL UNIT

FIG. 161.

MISCELLANEOUS LOGICAL COMBINATION SIGNALS (Cont.)

| | |
|---|---|
| DTQA | = DTQ1 |
| JT05 + JMTQ | = DTQA |
| JT17 | = DTQH |
| DPG7 TTS2 + DPG5 TTS3 + $\overline{\text{DCTB}}$ $\overline{\text{DCTC}}$ DPG0 TTS3 + DP20 TTS4 + DPG8 $\overline{\text{DCTB}}$ $\overline{\text{DCTC}}$ TTS4 + TTS5 + TTS6 + TTB0 | = DTSJ |
| JT03 FQ40 FTMR + DT05 FQ36 FTMR + FBFA JQDR | = DTTB |
| JCL4 + JCL5 + JT27 + JT30 + JT31 | = DUSM |
| JP01 + JP02 | = DWAD |
| DCAP + FBFA + FBUF | = DYTB |
| DX17 $\overline{\text{JP31}}$ DX15 | = DZE5 |
| FA44 + FA43 + FA42 | = DZN0 |
| $\overline{\text{JP05}}$ $\overline{\text{JP06}}$ $\overline{\text{JP07}}$ $\overline{\text{JP21}}$ $\overline{\text{JP25}}$ $\overline{\text{JCL5}}$ $\overline{\text{JCL4}}$ | = DZP0 |
| $\overline{\text{JP07}}$ $\overline{\text{JP21}}$ $\overline{\text{JCL5}}$ $\overline{\text{JCL4}}$ | = DZP1 |
| $\overline{\text{JP07}}$ $\overline{\text{JP21}}$ $\overline{\text{JP22}}$ $\overline{\text{JP26}}$ $\overline{\text{JP27}}$ $\overline{\text{JP31}}$ $\overline{\text{JCL5}}$ $\overline{\text{JCL4}}$ | = DZP2 |
| $\overline{\text{JP13}}$ $\overline{\text{JP16}}$ $\overline{\text{JP27}}$ $\overline{\text{JP06}}$ $\overline{\text{JP07}}$ $\overline{\text{JP22}}$ $\overline{\text{JCL5}}$ $\overline{\text{JCL4}}$ | = DZP3 |
| $\overline{\text{JP16}}$ $\overline{\text{JP22}}$ $\overline{\text{JP27}}$ $\overline{\text{JP06}}$ $\overline{\text{JP07}}$ $\overline{\text{JCL5}}$ $\overline{\text{JCL4}}$ | = DZP4 |
| $\overline{\text{JP16}}$ $\overline{\text{JP27}}$ $\overline{\text{JP07}}$ $\overline{\text{JP06}}$ $\overline{\text{JP22}}$ $\overline{\text{JP01}}$ $\overline{\text{JP02}}$ $\overline{\text{JCL5}}$ $\overline{\text{JCL4}}$ | = DZP5 |
| JP10 + JCL2 + JCL3 | = DZP7 |

PROCESSING AND CONTROL UNIT
FIG. 162.

FLIP-FLOP INPUT LOGICAL SCHEMATIC DIAGRAMS

A-Register $DPA0\ \overline{DY12} + DR06\ \overline{DY12} = \overline{FA39}$ $DY12\ DPA0 + DR06\ DY12 = FA39$ $DPA0\ \overline{DY13} + DR06\ \overline{DY13} = \overline{FA40}$ $DY13\ DPA0 + DR06\ DY13 = FA40$ $DRA0\ \overline{DY47} + DPA0\ \overline{DY14} = \overline{FA41}$ $DY47\ DRA0 + DY14\ DPA0 = FA41$ $DRA0\ \overline{DY42} + DPA0\ \overline{DY15} = \overline{FA42}$ $DY42\ DRA0 + DY15\ DPA0 = FA42$ $DRA0\ \overline{DY43} + DPA0\ \overline{DY16} = \overline{FA43}$ $DY43\ DRA0 + DY16\ DPA0 = FA43$ $DRA0\ \overline{DY44} + DPA0\ \overline{DY17} = \overline{FA44}$ $DY44\ DRA0 + DPA0\ DY17 = FA44$ $DRA0\ \overline{DY45} = \overline{FA45}$ $DY45\ DRA0 = FA45$ $DRA0\ \overline{DY46} = \overline{FA46}$ $DY46\ DRA0 = FA46$

C-Register $\overline{DY00}\ DRC0 = \overline{FC00}$ $DY00\ DRC0 = FC00$ $\overline{DY01}\ DRC0 = \overline{FC01}$ $DY01\ DRC0 = FC01$ $\overline{DY02}\ DRC0 = \overline{FC02}$ $DY02\ DRC0 = FC02$ $\overline{DY03}\ DRC0 = \overline{FC03}$ $DY03\ DRC0 = FC03$ $\overline{DY04}\ DRC0 = \overline{FC04}$ $DY04\ DRC0 = FC04$ $\overline{DY05}\ DRC0 = \overline{FC05}$ $DY05\ DRC0 = FC05$ $\overline{DY06}\ DRC0 = \overline{FC06}$ $DY06\ DRC0 = FC06$ $\overline{DY07}\ DRC0 = \overline{FC07}$ $DY07\ DRC0 = FC07$ $\overline{DY08}\ DRC0 = \overline{FC08}$ $DY08\ DRC0 = FC08$ $\overline{DY09}\ DRC1 = \overline{FC09}$ $DY09\ DRC1 = FC09$ $\overline{DY10}\ DRC1 = \overline{FC10}$ $DY10\ DRC1 = FC10$ $\overline{DY11}\ DRC1 = \overline{FC11}$ $DY11\ DRC1 = FC11$

PROCESSING AND CONTROL UNIT

FIG. 163.

FLIP-FLOP INPUT LOGICAL SCHEMATIC DIAGRAMS (Cont.)

C-Register (Cont.)

$\overline{DY12}$ DRC1 = $\overline{FC12}$
DY12 DRC1 = FC12
$\overline{DY13}$ DRC1 = $\overline{FC13}$
DY13 DRC1 = FC13
$\overline{DY14}$ DRC1 = $\overline{FC14}$
DY14 DRC1 = FC14
$\overline{DY15}$ DRC1 = $\overline{FC15}$
DY15 DRC1 = FC15
$\overline{DY16}$ DRC1 = $\overline{FC16}$
DY16 DRC1 = FC16
$\overline{DY17}$ DRC1 = $\overline{FC17}$
DY17 DRC1 = FC17
$\overline{DY18}$ DRC2 = $\overline{FC18}$
DY18 DRC2 = FC18
$\overline{DY19}$ DRC2 = $\overline{FC19}$
DY19 DRC2 = FC19
$\overline{DY20}$ DRC2 = $\overline{FC20}$
DY20 DRC2 = FC20
$\overline{DY21}$ DRC2 = $\overline{FC21}$
DY21 DRC2 = FC21
$\overline{DY22}$ DRC2 = $\overline{FC22}$
DY22 DRC2 = FC22
$\overline{DY23}$ DRC2 = $\overline{FC23}$
DY23 DRC2 = FC23

$\overline{DY24}$ DRC2 = $\overline{FC24}$
DY24 DRC2 = FC24
$\overline{DY25}$ DRC2 = $\overline{FC25}$
DY25 DRC2 = FC25
$\overline{DY26}$ DRC2 = $\overline{FC26}$
DY26 DRC2 = FC26
$\overline{DY27}$ DRC3 = $\overline{FC27}$
DY27 DRC3 = FC27
$\overline{DY28}$ DRC3 = $\overline{FC28}$
DY28 DRC3 = FC28
$\overline{DY29}$ DRC3 = $\overline{FC29}$
DY29 DRC3 = FC29
$\overline{DY30}$ DRC3 = $\overline{FC30}$
DY30 DRC3 = FC30
$\overline{DY31}$ DRC3 = $\overline{FC31}$
DY31 DRC3 = FC31
$\overline{DY32}$ DRC3 = $\overline{FC32}$
DY32 DRC3 = FC32
$\overline{DY33}$ DRC3 = $\overline{FC33}$
DY33 DRC3 = FC33
$\overline{DY34}$ DRC3 = $\overline{FC34}$
DY34 DRC3 = FC34
$\overline{DY35}$ DRC3 = $\overline{FC35}$
DY35 DRC3 = FC35

PROCESSING AND CONTROL UNIT
FIG. 164.

FLIP-FLOP INPUT LOGICAL SCHEMATIC DIAGRAMS (Cont.)

C-Register (Cont.)

| | | |
|---|---|---|
| $\overline{DY44}$ DRC5 | = | $\overline{FC44}$ |
| DY44 DRC5 | = | FC44 |
| $\overline{DY45}$ DRC5 | = | $\overline{FC45}$ |
| DY45 DRC5 | = | FC45 |
| $\overline{DY46}$ DRC5 | = | $\overline{FC46}$ |
| DY46 DRC5 | = | FC46 |

E-Register

| | | |
|---|---|---|
| $\overline{FF01}$ DSEL | = | $\overline{FE01}$ |
| FF01 DSEL | = | FE01 |
| $\overline{FF02}$ DSEL + $\overline{DY02}$ DMLE | = | $\overline{FE02}$ |
| FF02 DSEL + DY02 DMLE | = | FE02 |
| $\overline{FF03}$ DSEL + $\overline{DY03}$ DMLE | = | $\overline{FE03}$ |
| FF03 DSEL + DY03 DMLE | = | FE03 |
| $\overline{FF04}$ DSEL + $\overline{DY04}$ DMLE | = | $\overline{FE04}$ |
| FF04 DSEL + DY04 DMLE | = | FE04 |
| $\overline{FF05}$ DSEL + $\overline{DY05}$ DMLE | = | $\overline{FE05}$ |
| FF05 DSEL + DY05 DMLE | = | FE05 |
| DSEL + $\overline{DY06}$ DMLE | = | $\overline{FE06}$ |
| DY06 DMLE | = | FE06 |
| DSEH + $\overline{DY07}$ DMLE | = | $\overline{FE07}$ |
| DY07 DMLE | = | FE07 |
| DSEH $\overline{FF08}$ + $\overline{DY08}$ DMLE | = | $\overline{FE08}$ |
| FF08 DSEH + DY08 DMLE | = | FE08 |
| DSEH $\overline{FF09}$ + $\overline{DY09}$ DMLE | = | $\overline{FE09}$ |
| FF09 DSEH + DY09 DMLE | = | FE09 |
| DSEH $\overline{FF10}$ + $\overline{DY10}$ DMLE | = | $\overline{FE10}$ |
| FF10 DSEH + DY10 DMLE | = | FE10 |
| DRSE + $\overline{DY11}$ DMLE | = | $\overline{FE11}$ |
| DY11 DMLE + ($\overline{FF10}$ DSEH + JCAP FDSP $\overline{FE11}$) | = | FE11 |

ER-Register

| | | |
|---|---|---|
| $\overline{FQ37}$ DGER + JRES | = | $\overline{FER0}$ |
| FQ37 DGER | = | FER0 |
| $\overline{FQ38}$ DGER + JRES | = | $\overline{FER1}$ |
| FQ38 DGER | = | FER1 |
| $\overline{FQ39}$ DGER + JRES | = | $\overline{FER2}$ |
| FQ39 DGER | = | FER2 |

PROCESSING AND CONTROL UNIT

FIG. 165.

Oct. 28, 1969 J. W. FIGUEROA ET AL 3,475,730
INFORMATION SHIFT APPARATUS IN A COMPUTER SYSTEM
Filed May 27, 1966 207 Sheets-Sheet 174

FLIP-FLOP INPUT LOGICAL SCHEMATIC DIAGRAMS (Cont.)

ER-Register (Cont.)

$\overline{\text{DY15}}$ DRER + JRES = $\overline{\text{FER3}}$

DY15 DRER = FER3

$\overline{\text{DY16}}$ DRER + JRES = $\overline{\text{FER4}}$

DY16 DRER = FER4

$\overline{\text{DY17}}$ DRER + JRES = $\overline{\text{FER5}}$

DY17 DRER = FER5

F-Register $\overline{\text{DPR1}}$ QPFG = $\overline{\text{FF01}}$

JPR1 QPFG = FF01

$\overline{\text{DPR2}}$ QPFG = $\overline{\text{FF02}}$

JPR2 QPFG = FF02

$\overline{\text{DPR3}}$ QPFG = $\overline{\text{FF03}}$

JPR3 QPFG = FF03

$\overline{\text{DPR4}}$ QPFG = $\overline{\text{FF04}}$

JPR4 QPFG = FF04

$\overline{\text{DPR5}}$ QPFG = $\overline{\text{FF05}}$

JPR5 QPFG = FF05

DR22 DTS1 $\overline{\text{DSKP}}$ = $\overline{\text{FF06}}$

DSTR + TFT3 FSMF = FF06

DRSF = $\overline{\text{FF07}}$

JCNT DTS0 = FF07

QPFG $\overline{\text{JTL0}}$ + DRSF = $\overline{\text{FF08}}$

QPFG JTL0 = FF08

QPFG $\overline{\text{JPRS}}$ + DRSF = $\overline{\text{FF09}}$

QPFG JPRS = FF09

QPFG $\overline{\text{JPRD}}$ + DRSF = $\overline{\text{FF10}}$

QPFG JPRD = FF10

DRCL DTS0 $\overline{\text{DSKP}}$ = $\overline{\text{FF11}}$

DSTR + FRLF QPH2 = FF11

G-Register $\overline{\text{DY00}}$ DRG0 = $\overline{\text{FG00}}$

DY00 DRG0 = FG00

$\overline{\text{DY01}}$ DRG0 = $\overline{\text{FG01}}$

DY01 DRG0 = FG01

$\overline{\text{DY02}}$ DRG0 = $\overline{\text{FG02}}$

DY02 DRG0 = FG02

$\overline{\text{DY03}}$ DRG0 = $\overline{\text{FG03}}$

DY03 DRG0 = FG03

PROCESSING AND CONTROL UNIT

FIG. 166

FLIP-FLOP INPUT LOGICAL SCHEMATIC DIAGRAMS (Cont.)

G-Register (Cont.)

| | | | | | |
|---|---|---|---|---|---|
| $\overline{\text{DY04}}$ DRG0 | = | $\overline{\text{FG04}}$ | $\overline{\text{DY16}}$ DRG1 | = | $\overline{\text{FG16}}$ |
| DY04 DRG0 | = | FG04 | DY16 DRG1 | = | FG16 |
| $\overline{\text{DY05}}$ DRG0 | = | $\overline{\text{FG05}}$ | $\overline{\text{DY17}}$ DRG1 | = | $\overline{\text{FG17}}$ |
| DY05 DRG0 | = | FG05 | DY17 DRG1 | = | FG17 |
| $\overline{\text{DY06}}$ DRG0 | = | $\overline{\text{FG06}}$ | $\overline{\text{DY18}}$ DRG4 | = | $\overline{\text{FG18}}$ |
| DY06 DRG0 | = | FG06 | DY18 DRG4 | = | FG18 |
| $\overline{\text{DY07}}$ DRG0 | = | $\overline{\text{FG07}}$ | $\overline{\text{DY19}}$ DRG4 | = | $\overline{\text{FG19}}$ |
| DY07 DRG0 | = | FG07 | DY19 DRG4 | = | FG19 |
| $\overline{\text{DY08}}$ DRG0 | = | $\overline{\text{FG08}}$ | $\overline{\text{DY20}}$ DRG4 | = | $\overline{\text{FG20}}$ |
| DY08 DRG0 | = | FG08 | DY20 DRG4 | = | FG20 |
| $\overline{\text{DY09}}$ DRG0 | = | $\overline{\text{FG09}}$ | $\overline{\text{DY21}}$ DRG4 | = | $\overline{\text{FG21}}$ |
| DY09 DRG0 | = | FG09 | DY21 DRG4 | = | FG21 |
| $\overline{\text{DY10}}$ DRG0 | = | $\overline{\text{FG10}}$ | $\overline{\text{DY22}}$ DRG4 | = | $\overline{\text{FG22}}$ |
| DY10 DRG0 | = | FG10 | DY22 DRG4 | = | FG22 |
| $\overline{\text{DY11}}$ DRG0 | = | $\overline{\text{FG11}}$ | $\overline{\text{DY23}}$ DRG4 | = | $\overline{\text{FG23}}$ |
| DY11 DRG0 | = | FG11 | DY23 DRG4 | = | FG23 |
| $\overline{\text{DY12}}$ DRG1 | = | $\overline{\text{FG12}}$ | $\overline{\text{DY24}}$ DRG4 | = | $\overline{\text{FG24}}$ |
| DY12 DRG1 | = | FG12 | DY24 DRG4 | = | FG24 |
| $\overline{\text{DY13}}$ DRG1 | = | $\overline{\text{FG13}}$ | $\overline{\text{DY25}}$ DRG4 | = | $\overline{\text{FG25}}$ |
| DY13 DRG1 | = | FG13 | DY25 DRG4 | = | FG25 |
| $\overline{\text{DY14}}$ DRG2 | = | $\overline{\text{FG14}}$ | $\overline{\text{DY26}}$ DRG4 | = | $\overline{\text{FG26}}$ |
| DY14 DRG2 | = | FG14 | DY26 DRG4 | = | FG26 |
| $\overline{\text{DY15}}$ DRG1 | = | $\overline{\text{FG15}}$ | $\overline{\text{DY27}}$ DRG5 | = | $\overline{\text{FG27}}$ |
| DY15 DRG1 | = | FG15 | DY27 DRG5 | = | FG27 |

PROCESSING AND CONTROL UNIT

FIG. 167

FLIP-FLOP INPUT LOGICAL SCHEMATIC DIAGRAMS (Cont.)

G-Register (Cont.)

| | | | | | |
|---|---|---|---|---|---|
| $\overline{DY28}$ DRG5 | = | $\overline{FG28}$ | $\overline{DY32}$ DRG5 | = | $\overline{FG32}$ |
| DY28 DRG5 | = | FG28 | DY32 DRG5 | = | FG32 |
| $\overline{DY29}$ DRG5 | = | $\overline{FG29}$ | $\overline{DY33}$ DRG5 | = | $\overline{FG33}$ |
| DY29 DRG5 | = | FG29 | DY33 DRG5 | = | FG33 |
| $\overline{DY30}$ DRG5 | = | $\overline{FG30}$ | $\overline{DY34}$ DRG5 | = | $\overline{FG34}$ |
| DY30 DRG5 | = | FG30 | DY34 DRG5 | = | FG34 |
| $\overline{DY31}$ DRG5 | = | $\overline{FG31}$ | $\overline{DY35}$ DRG5 | = | $\overline{FG35}$ |
| DY31 DRG5 | = | FG31 | DY35 DRG5 | = | FG35 |

H-Register

| | | | | | |
|---|---|---|---|---|---|
| $\overline{DY00}$ DRH0 | = | $\overline{FH00}$ | $\overline{DY06}$ DRH0 | = | $\overline{FH06}$ |
| DY00 DRH0 | = | FH00 | DY06 DRH0 | = | FH06 |
| $\overline{DY01}$ DRH0 | = | $\overline{FH01}$ | $\overline{DY07}$ DRH0 | = | $\overline{FH07}$ |
| DY01 DRH0 | = | FH01 | DY07 DRH0 | = | FH07 |
| $\overline{DY02}$ DRH0 | = | $\overline{FH02}$ | $\overline{DY08}$ DRH0 | = | $\overline{FH08}$ |
| DY02 DRH0 | = | FH02 | DY08 DRH0 | = | FH08 |
| $\overline{DY03}$ DRH0 | = | $\overline{FH03}$ | $\overline{DY09}$ DRH1 | = | $\overline{FH09}$ |
| DY03 DRH0 | = | FH03 | DY09 DRH1 | = | FH09 |
| $\overline{DY04}$ DRH0 | = | $\overline{FH04}$ | $\overline{DY10}$ DRH1 | = | $\overline{FH10}$ |
| DY04 DRH0 | = | FH04 | DY10 DRH1 | = | FH10 |
| $\overline{DY05}$ DRH0 | = | $\overline{FH05}$ | $\overline{DY11}$ DRH1 | = | $\overline{FH11}$ |
| DY05 DRH0 | = | FH05 | DY11 DRH1 | = | FH11 |

PROCESSING AND CONTROL UNIT
FIG. 168.

FLIP FLOP INPUT LOGICAL SCHEMATIC DIAGRAMS (Cont.)

H-Register (Cont.)

$\overline{\text{DY12}}$ DRH1 = $\overline{\text{FH12}}$
DY12 DRH1 = FH12
$\overline{\text{DY13}}$ DRH1 = $\overline{\text{FH13}}$
DY13 DRH1 = FH13
$\overline{\text{DY14}}$ DRH1 = $\overline{\text{FH14}}$
DY14 DRH1 = FH14
$\overline{\text{DY15}}$ DRH1 = $\overline{\text{FH15}}$
DY15 DRH1 = FH15
$\overline{\text{DY16}}$ DRH1 = $\overline{\text{FH16}}$
DY16 DRH1 = FH16
$\overline{\text{DY17}}$ DRH1 = $\overline{\text{FH17}}$
DY17 DRH1 = FH17
$\overline{\text{DY18}}$ DRH2 = $\overline{\text{FH18}}$
DY18 DRH2 = FH18
$\overline{\text{DY19}}$ DRH2 = $\overline{\text{FH19}}$
DY19 DRH2 = FH19
$\overline{\text{DY20}}$ DRH2 = $\overline{\text{FH20}}$
DY20 DRH2 = FH20
$\overline{\text{DY21}}$ DRH2 = $\overline{\text{FH21}}$
DY21 DRH2 = FH21
$\overline{\text{DY22}}$ DRH2 = $\overline{\text{FH22}}$
DY22 DRH2 = FH22
$\overline{\text{DY23}}$ DRH2 = $\overline{\text{FH23}}$
DY23 DRH2 = FH23

$\overline{\text{DY24}}$ DRH2 = $\overline{\text{FH24}}$
DY24 DRH2 = FH24
$\overline{\text{DY25}}$ DRH2 = $\overline{\text{FH25}}$
DY25 DRH2 = FH25
$\overline{\text{DY26}}$ DRH2 = $\overline{\text{FH26}}$
DY26 DRH2 = FH26
$\overline{\text{DY27}}$ DRH3 = $\overline{\text{FH27}}$
DY27 DRH3 = FH27
$\overline{\text{DY28}}$ DRH3 = $\overline{\text{FH28}}$
DY28 DRH3 = FH28
$\overline{\text{DY29}}$ DRH3 = $\overline{\text{FH29}}$
DY29 DRH3 = FH29
$\overline{\text{DY30}}$ DRH3 = $\overline{\text{FH30}}$
DY30 DRH3 = FH30
$\overline{\text{DY31}}$ DRH3 = $\overline{\text{FH31}}$
DY31 DRH3 = FH31
$\overline{\text{DY32}}$ DRH3 = $\overline{\text{FH32}}$
DY32 DRH3 = FH32
$\overline{\text{DY33}}$ DRH3 = $\overline{\text{FH33}}$
DY33 DRH3 = FH33
$\overline{\text{DY34}}$ DRH3 = $\overline{\text{FH34}}$
DY34 DRH3 = FH34
$\overline{\text{DY35}}$ DRH3 = $\overline{\text{FH35}}$
DY35 DRH3 = FH35

PROCESSING AND CONTROL UNIT
FIG. 169

FLIP-FLOP INPUT LOGICAL SCHEMATIC DIAGRAMS (Cont.)

K-Register

| | | |
|---|---|---|
| $\overline{DY01}$ DRK0 + $\overline{FF01}$ DSTK | = | $\overline{FK01}$ |
| DRK0 DY01 + FF01 DSTK | = | FK01 |
| $\overline{DY02}$ DRK0 + $\overline{FF02}$ DSTK | = | $\overline{FK02}$ |
| DRK0 DY02 + FF02 DSTK | = | FK02 |
| $\overline{DY03}$ DRK0 + $\overline{FF03}$ DSTK | = | $\overline{FK03}$ |
| DRK0 DY03 + FF03 DSTK | = | FK03 |
| $\overline{DY04}$ DRK0 + $\overline{FF04}$ DSTK | = | $\overline{FK04}$ |
| DRK0 DY04 + FF04 DSTK | = | FK04 |
| $\overline{DY05}$ DRK0 + $\overline{FF05}$ DSTK | = | $\overline{FK05}$ |
| DRK0 DY05 + FF05 DSTK | = | FK05 |
| DY33 DRK2 | = | $\overline{FK14}$ |
| DRK2 $\overline{DY33}$ | = | FK14 |
| $\overline{DY11}$ DRK1 | = | $\overline{FK15}$ |
| DY11 DRK1 | = | FK15 |
| $\overline{DY24}$ DRK2 + QSTC | = | $\overline{FK18}$ |
| DY24 DRK2 | = | FK18 |
| $\overline{DY25}$ DRK2 + QSTC | = | $\overline{FK19}$ |
| DRK2 DY25 | = | FK19 |
| $\overline{DY26}$ DRK2 + QSTC | = | $\overline{FK20}$ |
| DRK2 DY26 | = | FK20 |
| $\overline{DY27}$ DRK2 + QSTC | = | $\overline{FK21}$ |
| DRK2 DY27 | = | FK21 |
| $\overline{DY28}$ DRK2 + QSTC | = | $\overline{FK22}$ |
| DRK2 DY28 | = | FK22 |

PROCESSING AND CONTROL UNIT

FIG. 170.

FLIP-FLOP INPUT LOGICAL SCHEMATIC DIAGRAMS (Cont.)

K-Register (Cont.)

| | | |
|---|---|---|
| $\overline{\mathrm{DY29}}$ DRK3 + QSTC | = | $\overline{\mathrm{FK23}}$ |
| DRK3 DY29 | = | FK23 |
| $\overline{\mathrm{DY30}}$ DRK3 + $\overline{\mathrm{DTC0}}$ QSTC | = | $\overline{\mathrm{FK24}}$ |
| DRK3 DY30 + JTC0 QSTC | = | FK24 |
| $\overline{\mathrm{DY31}}$ DRK3 + $\overline{\mathrm{DTC1}}$ QSTC | = | $\overline{\mathrm{FK25}}$ |
| DRK3 DY31 + JTC1 QSTC | = | FK25 |
| $\overline{\mathrm{DY32}}$ DRK3 + $\overline{\mathrm{DTC2}}$ QSTC | = | $\overline{\mathrm{FK26}}$ |
| DRK3 DY32 + JTC2 QSTC | = | FK26 |
| $\overline{\mathrm{DY33}}$ DRK3 + $\overline{\mathrm{DTC3}}$ QSTC | = | $\overline{\mathrm{FK27}}$ |
| DRK3 DY33 + JTC3 QSTC | = | FK27 |
| $\overline{\mathrm{DY34}}$ DRK3 + $\overline{\mathrm{DTC4}}$ QSTC | = | $\overline{\mathrm{FK28}}$ |
| DRK3 DY34 + JTC4 QSTC | = | FK28 |
| $\overline{\mathrm{DY35}}$ DRK4 + $\overline{\mathrm{DTC5}}$ QSTC | = | $\overline{\mathrm{FK29}}$ |
| DY35 DRK4 + JTC5 QSTC | = | FK29 |
| $\overline{\mathrm{DY40}}$ DRK4 + $\overline{\mathrm{DST6}}$ QSTC | = | $\overline{\mathrm{FK30}}$ |
| DRK4 DY40 + JST6 QSTC | = | FK30 |
| $\overline{\mathrm{DY41}}$ DRK4 + $\overline{\mathrm{DST7}}$ QSTC | = | $\overline{\mathrm{FK31}}$ |
| DRK4 DY41 + JST7 QSTC | = | FK31 |
| DRSK + $\overline{\mathrm{DST8}}$ QSTC | = | $\overline{\mathrm{FK32}}$ |
| $\overline{\mathrm{FE07}}$ JSEQ QPH2 $\overline{\mathrm{DSTD}}$ + JST8 QSTC | = | FK32 |
| $\overline{\mathrm{DY43}}$ DRK4 + $\overline{\mathrm{DST9}}$ QSTC | = | $\overline{\mathrm{FK33}}$ |
| DRK4 DY43 + JST9 QSTC | = | FK33 |
| $\overline{\mathrm{DY44}}$ DRK4 + DRSK | = | $\overline{\mathrm{FK34}}$ |
| DRK4 DY44 + JPFF | = | FK34 |

PROCESSING AND CONTROL UNIT

FIG. 171.

FLIP-FLOP INPUT LOGICAL SCHEMATIC DIAGRAMS (Cont.)

K-Register (Cont.)

| | | |
|---|---|---|
| DRSK | = | $\overline{FK35}$ |
| QSTC | = | FK35 |

L-Register

| | | | | | |
|---|---|---|---|---|---|
| DRAS | = | $\overline{FL09}$ | $\overline{DY18}$ DRL1 | = | $\overline{FL18}$ |
| DSSO DLLR | = | FL09 | DY18 DRL1 | = | FL18 |
| $\overline{DY10}$ DRLO | = | $\overline{FL10}$ | $\overline{DY19}$ DRL1 | = | $\overline{FL19}$ |
| DY10 DRLO | = | FL10 | DY19 DRL1 | = | FL19 |
| $\overline{DY11}$ DRLO | = | $\overline{FL11}$ | $\overline{DY20}$ DRL1 | = | $\overline{FL20}$ |
| DY11 DRLO | = | FL11 | DY20 DRL1 | = | FL20 |
| $\overline{DY12}$ DRLO | = | $\overline{FL12}$ | $\overline{DY21}$ DRL1 | = | $\overline{FL21}$ |
| DY12 DRLO | = | FL12 | DY21 DRL1 | = | FL21 |
| $\overline{DY13}$ DRLO | = | $\overline{FL13}$ | $\overline{DY22}$ DRL1 | = | $\overline{FL22}$ |
| DY13 DRLO | = | FL13 | DY22 DRL1 | = | FL22 |
| $\overline{DY14}$ DRLO | = | $\overline{FL14}$ | $\overline{DY23}$ DRL1 | = | $\overline{FL23}$ |
| DY14 DRLO | = | FL14 | DY23 DRL1 | = | FL23 |
| $\overline{DY15}$ DRLO | = | $\overline{FL15}$ | $\overline{DY24}$ DRL1 | = | $\overline{FL24}$ |
| DY15 DRLO | = | FL15 | DY24 DRL1 | = | FL24 |
| $\overline{DY16}$ DRLO | = | $\overline{FL16}$ | $\overline{DY25}$ DRL1 | = | $\overline{FL25}$ |
| DY16 DRLO | = | FL16 | DY25 DRL1 | = | FL25 |
| $\overline{DY17}$ DRLO | = | $\overline{FL17}$ | $\overline{DY26}$ DRL1 | = | $\overline{FL26}$ |
| DY17 DRLO | = | FL17 | DY26 DRL1 | = | FL26 |

PROCESSING AND CONTROL UNIT

FIG. 172.

FLIP-FLOP INPUT LOGICAL SCHEMATIC DIAGRAMS (Cont.)

L-Register (Cont.)

$\overline{DY27}$ DRL2 = $\overline{FL27}$

DY27 DRL2 = FL27

$\overline{DY28}$ DRL2 = $\overline{FL28}$

DY28 DRL2 = FL28

$\overline{DY29}$ DRL2 = $\overline{FL29}$

DY29 DRL2 = FL29

$\overline{DY30}$ DRL2 = $\overline{FL30}$

DY30 DRL2 = FL30

$\overline{DY31}$ DRL2 = $\overline{FL31}$

DY31 DRL2 = FL31

$\overline{DY32}$ DRL2 = $\overline{FL32}$

DY32 DRL2 = FL32

$\overline{DY33}$ DRL2 + JRES = $\overline{FL33}$

DY33 DRL2 = FL33

$\overline{DY34}$ DRL2 + JRES = $\overline{FL34}$

DY34 DRL2 = FL34

$\overline{DY35}$ DRL2 + JRES = $\overline{FL35}$

DY35 DRL2 = FL35

PN-Register

DPNO $\overline{DY02}$ = $\overline{FPN2}$

DY02 DPNO = FPN2

DPNO $\overline{DY03}$ = $\overline{FPN3}$

DY03 DPNO = FPN3

DPNO $\overline{DY04}$ = $\overline{FPN4}$

DY04 DPNO = FPN4

DPNO $\overline{DY05}$ = $\overline{FPN5}$

DY05 DPNO = FPN5

Q-Register

DRQR = $\overline{FQ00}$

JM00 DSRQ = FQ00

DRQR = $\overline{FQ01}$

JM01 DSRQ = FQ01

DRQR = $\overline{FQ02}$

JM02 DSRQ = FQ02

DRQR = $\overline{FQ03}$

JM03 DSRQ = FQ03

PROCESSING AND CONTROL UNIT

FIG. 173.

FLIP-FLOP INPUT LOGICAL SCHEMATIC DIAGRAMS (Cont.)

Q-Register (Cont.)

DRQR = $\overline{FQ04}$
JM04 DSRQ = FQ04
DRQR = $\overline{FQ05}$
JM05 DSRQ = FQ05
DRQR = $\overline{FQ06}$
JM06 DSRQ = FQ06
DRQR = $\overline{FQ07}$
JM07 DSRQ = FQ07
DRQR = $\overline{FQ08}$
JM08 DSRQ = FQ08
DRQR = $\overline{FQ09}$
JM09 DSRQ = FQ09
DRQR = $\overline{FQ10}$
JM10 DSRQ = FQ10
DRQR = $\overline{FQ11}$
JM11 DSRQ = FQ11
DRQR = $\overline{FQ12}$
JM12 DSRQ = FQ12
DRQR = $\overline{FQ13}$
JM13 DSRQ = FQ13
DRQR = $\overline{FQ14}$
JM14 DSRQ = FQ14
DRQR = $\overline{FQ15}$
JM15 DSRQ = FQ15

DRQR = $\overline{FQ16}$
JM16 DSRQ = FQ16
DRQR = $\overline{FQ17}$
JM17 DSRQ = FQ17
DRQR = $\overline{FQ18}$
JM18 DSRQ = FQ18
DRQR = $\overline{FQ19}$
JM19 DSRQ = FQ19
DRQR = $\overline{FQ20}$
JM20 DSRQ = FQ20
DRQR = $\overline{FQ21}$
JM21 DSRQ = FQ21
DRQR = $\overline{FQ22}$
JM22 DSRQ = FQ22
DRQR = $\overline{FQ23}$
JM23 DSRQ = FQ23
DRQR = $\overline{FQ24}$
JM24 DSRQ = FQ24
DRQR = $\overline{FQ25}$
JM25 DSRQ = FQ25
DRQR = $\overline{FQ26}$
JM26 DSRQ = FQ26
DRQR = $\overline{FQ27}$
JM27 DSRQ = FQ27

PROCESSING AND CONTROL UNIT

FIG. 174.

FLIP-FLOP INPUT LOGICAL SCHEMATIC DIAGRAMS (Cont.)

Q-Register (Cont.)

DRQR = $\overline{\mathrm{FQ28}}$

JM28 DSRQ = FQ28

DRQR = $\overline{\mathrm{FQ29}}$

JM29 DSRQ = FQ29

$\overline{\mathrm{DRQR}}$ = $\overline{\mathrm{FQ30}}$

JM30 DSRQ = FQ30

DRQR = $\overline{\mathrm{FQ31}}$

JM31 DSRQ = FQ31

DRQR = $\overline{\mathrm{FQ32}}$

JM32 DSRQ = FQ32

DRQR = $\overline{\mathrm{FQ33}}$

JM33 DSRQ = FQ33

DRQR = $\overline{\mathrm{FQ34}}$

JM34 DSRQ = FQ34

DRQR = $\overline{\mathrm{FQ35}}$

JM35 DSRQ = FQ35

DRQR + JRES = $\overline{\mathrm{FQ36}}$

DSRQ = FQ36

$\overline{\mathrm{DM37}}$ DQRE + JRES = $\overline{\mathrm{FQ37}}$

JM37 DQRE = FQ37

$\overline{\mathrm{DM38}}$ DQRE + JRES = $\overline{\mathrm{FQ38}}$

JM38 DQRE = FQ38

$\overline{\mathrm{DM39}}$ DQRE + JRES = $\overline{\mathrm{FQ39}}$

JM39 DQRE = FQ39

FL09 = $\overline{\mathrm{FQ40}}$

DQRE + JRES = FQ40

U-Register $\overline{\mathrm{DY00}}$ DRU0 = $\overline{\mathrm{FU00}}$

DY00 DRU0 = FU00

$\overline{\mathrm{DY01}}$ DRU0 = $\overline{\mathrm{FU01}}$

DY01 DRU0 = FU01

$\overline{\mathrm{DY02}}$ DRU0 = $\overline{\mathrm{FU02}}$

DY02 DRU0 = FU02

DRU0 $\overline{\mathrm{DY03}}$ = $\overline{\mathrm{FU03}}$

DY03 DRU0 = FU03

DRU0 $\overline{\mathrm{DY04}}$ = $\overline{\mathrm{FU04}}$

DY04 DRU0 = FU04

DRU0 $\overline{\mathrm{DY05}}$ = $\overline{\mathrm{FU05}}$

DY05 DRU0 = FU05

DRU0 $\overline{\mathrm{DY06}}$ = $\overline{\mathrm{FU06}}$

DY06 DRU0 = FU06

PROCESSING AND CONTROL UNIT

FIG. 175.

FLIP-FLOP INPUT LOGICAL SCHEMATIC DIAGRAMS (Cont.)

U-Register (Cont.)

DRU0 $\overline{DY07}$ = $\overline{FU07}$
DY07 DRU0 = FU07
DRU1 $\overline{DY08}$ = $\overline{FU08}$
DY08 DRU1 = FU08
DRU1 $\overline{DY09}$ = $\overline{FU09}$
DY09 DRU1 = FU09
DRU1 $\overline{DY10}$ = $\overline{FU10}$
DY10 DRU1 = FU10
DRU1 $\overline{DY11}$ = $\overline{FU11}$
DY11 DRU1 = FU11
$\overline{DY12}$ DRU1 = $\overline{FU12}$
DY12 DRU1 = FU12
$\overline{DY13}$ DRU1 = $\overline{FU13}$
DY13 DRU1 = FU13
$\overline{DY14}$ DRU1 = $\overline{FU14}$
DY14 DRU1 = FU14
$\overline{DY15}$ DRU2 = $\overline{FU15}$
DY15 DRU2 = FU15
$\overline{DY16}$ DRU2 = $\overline{FU16}$
DY16 DRU2 = FU16
$\overline{DY17}$ DRU2 = $\overline{FU17}$
DY17 DRU2 = FU17
$\overline{DY18}$ DRU1 = $\overline{FU18}$
DY18 DRU1 = FU18

$\overline{DY19}$ DRU1 = $\overline{FU19}$
DY19 DRU1 = FU19
$\overline{DY20}$ DRU3 = $\overline{FU20}$
DY20 DRU3 = FU20
$\overline{DY21}$ DRU3 = $\overline{FU21}$
DY21 DRU3 = FU21
$\overline{DY22}$ DRU3 = $\overline{FU22}$
DY22 DRU3 = FU22
$\overline{DY23}$ DRU3 = $\overline{FU23}$
DY23 DRU3 = FU23
$\overline{DY24}$ DRU3 = $\overline{FU24}$
DY24 DRU3 = FU24
$\overline{DY25}$ DRU3 = $\overline{FU25}$
DY25 DRU3 = FU25
$\overline{DY26}$ DRU3 = $\overline{FU26}$
DY26 DRU3 = FU26
$\overline{DY27}$ DRU3 = $\overline{FU27}$
DY27 DRU3 = FU27
$\overline{DY28}$ DRU4 = $\overline{FU28}$
DY28 DRU4 = FU28
$\overline{DY29}$ DRU4 = $\overline{FU29}$
DY29 DRU4 = FU29
$\overline{DY30}$ DRU4 = $\overline{FU30}$
DY30 DRU4 = FU30

PROCESSING AND CONTROL UNIT

FIG. 176.

FLIP-FLOP INPUT LOGICAL SCHEMATIC DIAGRAMS (Cont.)

U-Register (Cont.)

$\overline{DY31}$ DRU4 = $\overline{FU31}$

DY31 DRU4 = FU31

$\overline{DY32}$ DRU4 = $\overline{FU32}$

DY32 DRU4 = FU32

$\overline{DY33}$ DRU4 = $\overline{FU33}$

DY33 DRU4 = FU33

$\overline{DY34}$ DRU4 = $\overline{FU34}$

DY34 DRU4 = FU34

$\overline{DY35}$ DRU4 = $\overline{FU35}$

DY35 DRU4 = FU35

Memory Timer Counter $\overline{FTM1}$ QTCC = $\overline{FTM0}$

FTM1 QTCC + $\overline{FPTM}$ QPH2 = FTM0

$\overline{FTM2}$ QTCC + DTMC QPH2 = $\overline{FTM1}$

FTM2 QTCC + DTMS QPH2 = FTM1

$\overline{FTM3}$ QTCC + $\overline{FPTM}$ QPH2 = $\overline{FTM2}$

FTM3 QTCC = FTM2

$\overline{MTCF}$ QTCC + $\overline{FPTM}$ QPH2 = $\overline{FTM3}$

MTCF QTCC = FTM3

Miscellaneous Control Flip-Flops

TTBO + JRES = $\overline{FBFA}$

JCAP = FBFA

JCAP + JRES = $\overline{FBUF}$

DTSO DSBF + JMLT TTSM = FBUF

PROCESSING AND CONTROL UNIT

FIG. 177

FLIP-FLOP INPUT LOGICAL SCHEMATIC DIAGRAMS (Cont.)

Miscellaneous Control Flip-Flops (Cont.)

$\overline{\text{FF10}}$ TFT3 = $\overline{\text{FDSP}}$

FF10 TFT3 = FDSP

DSTM + JRES = $\overline{\text{FJMT}}$

DSJA = FJMT

DY14 DRLO + JRES + DRAS = $\overline{\text{FMRF}}$ $\overline{\text{DY14}}$ DRLO = FMRF FF11 QPH2 = $\overline{\text{FRLF}}$ $\overline{\text{FF11}}$ DRMK + $\overline{\text{FF11}}$ ($\overline{\text{DSNJ}}$ + $\overline{\text{DDSJ}}$ + $\overline{\text{DTMJ}}$ + TFT2) = FRLF DR22 DTS1 $\overline{\text{DSKP}}$ = $\overline{\text{FSMF}}$

DSMF TFT2 = FSMF $\overline{\text{FK34}}$ $\overline{\text{FK35}}$ DSTM + JRES = $\overline{\text{FSTA}}$

DSTA DSTM = FSTA

TTBO DTMR + JRES = $\overline{\text{FTMR}}$

DTSO DTMR = FTMR

JSQR + JRES = $\overline{\text{FUSM}}$

DUSM DTSO = FUSM

FQ40 QPH2 = $\overline{\text{FPTM}}$ $\overline{\text{FQ40}}$ QPH2 = FPTM

PROCESSING AND CONTROL UNIT

FIG. 178.

ONE-SHOT INPUT LOGICAL SCHEMATIC DIAGRAMS $\overline{\text{FF11}}$ = TFT0

TFT0 = TFT1

TFT0 = TFT2

TFT2 = TFT3

TREJ = TJST

DSJA = TREJ

DEMT FTMR QPH2 = TSMR

DTSJ DPG1 = TSSD

DTTB = TTB0

TTB0 $\overline{\text{JCL2}}$ $\overline{\text{JCL3}}$ $\overline{\text{DPG1}}$ = TTB1

TTSA = TTS0

TTSA $\overline{\text{JCLP}}$ = TTS1

DTS0 DPG2 $\overline{\text{JT05}}$ $\overline{\text{JCLP}}$ = TTS2

DTS0 DPG3 $\overline{\text{JT05}}$ $\overline{\text{JCLP}}$ = TTS3

DTS0 DPG4 $\overline{\text{JT05}}$ $\overline{\text{JCLP}}$ = TTS4

TTS4 DP01 + TTS4 $\overline{\text{DCTB}}$ $\overline{\text{DCTC}}$ DP02 = TTS5

DCTA (TTS4 DPG6 + TTS3 DPG0) = TTS6

TTSB = TTSA

DSTM = TTSB

JSTS + JPST + JML1 + JML2 = TTSM

PROCESSING AND CONTROL UNIT
FIG. 179.

INPUT / OUTPUT CONTROLLER OPERATION

IDLE LOOP

CONNECT ROUTINE

CONNECT ROUTINE

CONNECT ROUTINE

CONNECT ROUTINE

CONNECT ROUTINE

CONNECT ROUTINE

CONNECT ROUTINE

CONNECT ROUTINE

CONNECT ROUTINE

LINK SUBROUTINE

DATA SERVICE ROUTINE

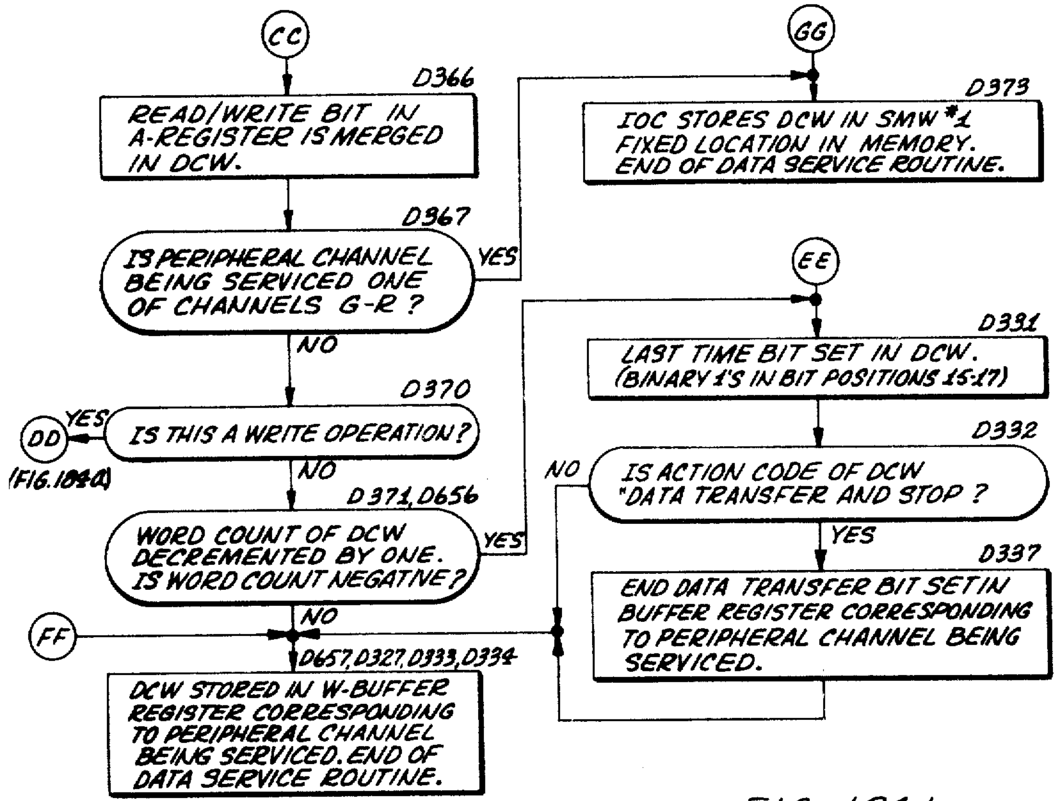
DATA SERVICE ROUTINE FIG. 184b
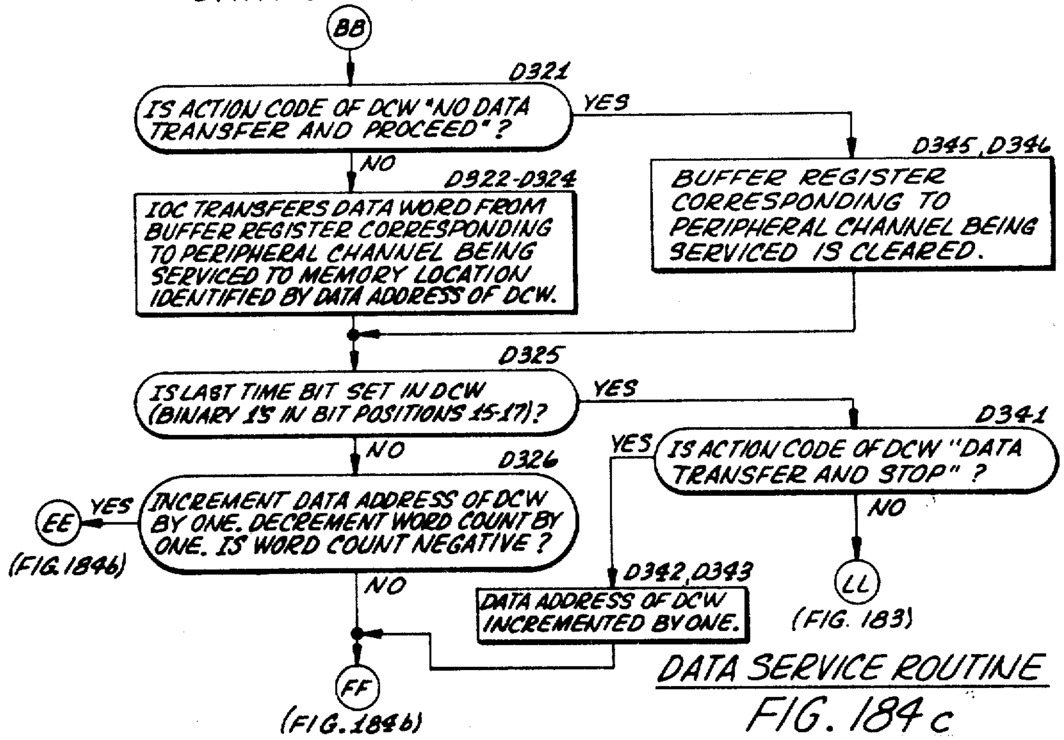
DATA SERVICE ROUTINE
FIG. 184c

DATA SERVICE ROUTINE

DATA SERVICE ROUTINE

TERMINATE INTERRUPT ROUTINE

TERMINATE INTERRUPT ROUTINE

TERMINATE INTERRUPT ROUTINE

TERMINATE INTERRUPT ROUTINE

SPECIAL INTERRUPT ROUTINE

INITIATION INTERRUPT ROUTINE

ERROR SUBROUTINE

United States Patent Office 3,475,730
Patented Oct. 28, 1969

3,475,730

INFORMATION SHIFT APPARATUS IN A COMPUTER SYSTEM

John W. Figueroa, Ernest J. Porcelli, and Laszlo L. Rakoczi, Phoenix, Ariz., assignors to General Electric Company, a corporation of New York

Filed May 27, 1966, Ser. No. 553,340
Int. Cl. G06f *1/00, 7/00, 15/00*
U.S. Cl. 340—172.5 12 Claims

ABSTRACT OF THE DISCLOSURE

Apparatus is provided for shifting and selectively merging characters in a storage location of a data storage unit. A data register is provided to temporarily store information transferred from a storage location of a data storage unit. Shift logic is interposed between the output terminals of the data register and input gates of the data storage unit. The shift logic does not provide static storage of information but comprises gating circuitry for selectively shifting the contents of the data register through a predetermined number of bit positions while information is being transferred through the shift logic from the data register to the input gates of the data storage unit. The shift logic, in addition to receiving the output signals of the data register, may also receive information from an auxiliary data source. The information from the auxiliary data source is applied to the shift logic so that information transmitted from the auxiliary data source to the shift logic is merged with data from the data register being shifted in the shift logic. The shift or the shift/merge operation is performed in substantially the time required for a read/write operation involving a storage location of the data storage unit.

TABLE OF CONTENTS

| | Column |
|---|---|
| General Description | 1 |
| Description of Drawings | 5 |
| Input/Output Controller—General | 7 |
| Information Representation | 8 |
| Data Words | 8 |
| Mailbox Words | 9 |
| Primary Mailbox Word | 9 |
| Secondary Mailbox Word #1 | 11 |
| Secondary Mailbox Word #2 | 12 |
| Secondary Mailbox Word #3 | 12 |
| Secondary Mailbox Word #4 | 12 |
| Interrupt Queue Words | 13 |
| Interrupt Queue Counter Words | 13 |
| Interrupt Queue Table Words | 13 |
| Input/Output Controller Circuit Elements | 14 |
| AND-Gate | 14 |
| OR-Gate | 15 |
| Inverter | 16 |
| NAND-Gate | 16 |
| NOR-Gate | 17 |
| Flip-Flop | 17 |
| Register | 18 |
| One-Shot | 18 |
| Logical Schematic Diagram | 19 |
| Glossary and Index of Signals | 21 |
| Buffer Storage Unit | 21 |
| Processing and Control Unit | 23 |
| Memory Communications Unit | 31 |
| Microprogram Storage Unit | 37 |
| Peripheral Channel Unit | 38 |
| Peripheral Subsystems | 44 |
| Input/Output Controller—Peripheral Subsystem Communication | 44 |
| Signal Transfer—Peripheral Subsystem to Peripheral Channel | 45 |
| Signal Transfer—Peripheral Channel to Peripheral Subsystem | 46 |
| Peripheral Subsystem—Details | 46 |
| Command Sequence | 47 |
| Read Sequence | 48 |
| Write Sequence | 49 |
| Peripheral Major Status | 49 |

| | Column |
|---|---|
| Memory | 51 |
| Input/Output Controller—Memory Communications | 52 |
| Signal Transfer—Memory to Memory Communications Unit | 52 |
| Signal Transfer—Memory Communications Unit to Memory | 53 |
| Memory—Details | 54 |
| Memory Operation | 55 |
| Read/Restore Command | 55 |
| Clear/Write Command | 56 |
| Set Execute Interrupt Cells Command | 56 |
| Input/Output Controller—Function | 56 |
| Input/Output Controller—Details | 57 |
| Memory Communications Unit | 58 |
| Control Panel | 62 |
| Control Block Starting Address Assignment Switches | 62 |
| Port Address Assignment Switches | 62 |
| Control Memory Selection Switch | 63 |
| Microprogram Storage Unit | 64 |
| Microstep Execution and Control Signal Generation | 66 |
| Peripheral Channel Unit | 67 |
| Peripheral Channel Service Request Priority Apparatus | 72 |
| Routine Request Priority Apparatus | 76 |
| Buffer Storage Unit | 81 |
| Shift/Merge Apparatus | 86 |
| Processing and Control Unit | 89 |
| Input/Output Processor | 94 |
| Input/Output Controller—Operation | 97 |
| Idle Loop | 98 |
| Connect Routine | 99 |
| Link Subroutine | 101 |
| Data Service Routine | 101 |
| Terminate Interrupt Routine | 102 |
| Special Interrupt Routine | 103 |
| Initiation Interrupt Routine | 104 |
| Error Subroutine | 104 |

This invention relates to computer systems and, in particular, to apparatus for shifting and manipulating information in a computer system.

A computer system normally comprises at least one data processor, at least one data storage unit or memory, and at least one input/output controller associated with a plurality of peripheral input and output devices or subsystems. Each data processor in the computer system processes data by executing a program. Each data storage unit of the computer system stores data to be processed, data which is the result of processing, and programs for controlling the processing operations of a data processor. The peripheral input devices supply to a data storage unit, through the input/output controller, programs and data to be processed. The peripheral output devices receive processed data from a data storage unit through the input/output controller and utilize or store such processed data. In the described computer system, the input/output controller provides common control and a communications path for transfer of programs and data to be processed from the peripheral input devices to a data storage unit. The input/output controller also provides common control and a communications path for transfer of processed data from a data storage unit to the peripheral output devices.

A data processor of the computer system executes one or more programs. A program comprises a set of instructions, each instruction specifying a discrete type of processing operation in the computer system. A data processor executes a program by sequentially responding to each of the instructions of the program to perform the corresponding operations. The processing operations specified by the instructions of a program normally require interaction of a data storage unit with the data processor executing the program and often require a similar interaction with the input/output controller. The entire computer system is thus responsive to the program being executed by a data processor of the computer system.

An input/output controller of the computer system performs control and information transmission operations for its respective set of peripheral input and output devices. An input/output controller controls the storage of information items provided by each of its associated peripheral input devices or subsystems in a respective set of storage locations of a data storage unit. Similarly, information items for transmission to each of its associated peripheral output devices are obtained by the input/output controller from a respective set of storage locations of a data storage unit. An input/output controller may include a data storage unit for providing temporary storage of information being transferred between the system data storage unit and the associated peripheral input and output subsystems.

During the processing and handling of information in a computer system, it is often necessary to alter the position of a binary digit or a group of binary digits within an information unit or within a storage element. This process of changing the relative position of one or more binary digits is called shifting. Shifting the contents of a storage location in a data storage unit of a computer system is often required during performance of an operation in a computer system. For example, during transfer of information characters to or from a storage location capable of storing a plurality of characters, shifting of characters within the storage location is necessary when the transfer occurs a character at a time and the character transfer is to or from a particular character position of the storage location.

In order to shift the contents of a storage location of a data storage unit, the contents of the storage location must normally be read or transferred from the storage location into a register. If the register is a shift register, the shift is performed in the register and the positionally modified contents of the register are written or transferred back to the storage location. If the register into which the contents of the storage location are transferred does not have shift capabilities, the contents of the storage location are transferred to a second register to perform the shift prior to transferring the positionally modified information back into the storage location. The shift may be performed by means of a shift matrix located between the first and second registers. The performance of the shift operation in a register or other element of the computer system requires expenditure of significant quantities of time, thereby detracting from the total processing capabilities of the computer system. Accordingly, to provide more efficient operation of a computer system, it is desirable to provide apparatus to enable the contents of a storage location of a data storage unit to be shifted without expenditure of excess time to perform the shift function.

It is therefore an object of this invention to provide an improved shifting arrangement for increasing the efficiency of operation of a computer system.

It is another object of this invention to provide in a computer system an improved arrangement for more rapidly shifting information in a storage location of a data storage unit.

It is another object of this invention to provide an improved arrangement in a computer system for shifting information in a storage location of a data storage unit and for simultaneously transferring new information to the storage location.

During an operation in a computer system involving the contents of a storage location of a data storage unit, it is often desirable to provide an information transfer along with a shift of the contents of the storage location. For example, in transferring single characters to a predetermined character position of a storage location, shifting of the contents of the storage location to clear the predetermined character position is necessary prior to transfer of a new character to the storage location. The above-described operation, in present computer equipment, delays processing for the period of time required to perform the shift as well as the time required to transfer a new character to the register, preparatory to writing the register contents back into the storage location. Accordingly, it is desirable to minimize the time required to shift the contents of a storage location of a data storage unit and to merge new information into the storage location in order to improve processing efficiency.

It is therefore another object of this invention to provide an improved arrangement in a computer system for shifting and merging information in a storage location of a data storage unit.

It is a further object of this invention to provide apparatus associated with a data storage unit of a computer system which permits a read/shift/write operation to be performed in substantially the same time required for a read/write operation.

It is a further object of the invention to provide apparatus associated with a data storage unit of a computer system which permits a read/shift/merge/write operation to be performed in substantially the same time required for a read/write operation involving the data storage unit.

The foregoing objects are achieved, in accordance with the illustrated embodiment of the invention, by providing, in addition to a conventional data register which stores information which has been read from a storage location of a data storage unit and also information which is to be written into a storage location of the data storage unit, shift logic which is interposed between the data register and the input gates to the data storage unit. The data storage unit in the present embodiment comprises the twelve, word buffer registers in the buffer storage unit of the input/output controller. Each buffer register includes six character positions for storing six information characters of six binary digits each. The shift logic does not provide static storage of information but comprises gating circuitry for selectively shifting the contents of the register through one character position while information is being transferred from the data register to the input gates of the data storage unit. Upon application of a control signal to the shift logic, the information applied to the shift logic is shifted through one character position, from the lowest-order characetr position in the direction of the highest-order character position, as it passes through the shift logic and is applied to the input gates of the addressed storage location in the data storage unit. The time required to effect a shift of information in a storage location of the data storage unit is essentially the time required to perform a read operation, transferring the contents of the storage location to the data register, and a write operation, restoring the contents of the data register to the storage location.

The shift logic, in addition to receiving the output signals of the data register, may also receive information from a second source. The information from the second source is applied through the shift logic to the input gates of the data storage unit corresponding to the lowest-order character position of the storage location. Merging of a character with the contents of a storage location may thus be effected by reading the contents of the storage location into the data register and immediately applying the output of the data register to the shift logic, simultaneous with the transfer of a character from the second source to the shift logic. The shifted contents of the storage location and the merged character are then written into the addressed storage location. The shift is thus performed simultaneous with the merge in essentially the time required for a read/write operation involving a storage location of the data storage unit.

For a complete description of the input/output controller of FIGURE 1 and of the instant invention which is embodied in such input/output controller, reference is made to United States Patent No. 3,409,880, issued to Gerald Galler, Ernst J. Porcelli, and Laszlo L. Rakoczi, and assigned to the assignee of the present invention. More particularly, FIGURES 2–188 of the drawing; column 5, lines 69–75; columns 6–103; and column 104, lines 1–48 of United States Patents 3,409,880 are incorporated herein by reference and made a part of the instant patent application.

DESCRIPTION OF DRAWINGS

The subject matter of the invention is particularly pointed out and distinctly claimed in the concluding portion of the specification. The invention, however, both as to organization and method of operation, may best be understood by reference to the following description taken in connection with the accompanying drawings, in which:

FIGURE 1 is a block diagram of the input/output controller of a data processing system to which the instant invention is applicable;

FIGURES 38–52 illustrate the logical combination signal diagrams, the flip-flop input logical schematic diagrams and the one-shot input logical schematic diagrams of the memory communications unit of FIGURE 16*a*;

FIGURES 53–68, 68*a*, 69–80 illustrate the logical combination signal diagrams, the flip-flop input logical schematic diagrams and the one-shot input logical schematic diagrams of the microprogram storage unit of FIGURE 16*b*;

FIGURES 81–125 illustrate the logical combination signal diagrams, the flip-flop input logical schematic diagrams and the one-shot input logical schematic diagrams of the peripheral channel unit of FIGURE 16*c*;

FIGURES 126–142 illustrate the logical combination signal diagrams, the flip-flop input logical schematic diagrams and the one-shot input logical schematic diagrams of the peripheral storage unit of 16*d*;

FIGURES 143–179 illustrate the logical combination signal diagrams, the flip-flop input logical schematic diagrams and the one-shot input logical schematic diagrams of the processing and control unit of FIGURE 16*e*;

FIGURES 184*a*–184*e* comprise a flow diagram illustrating the operations performed by the input/output controller during the data service routine;

INPUT/OUTPUT CONTROLLER—GENERAL

Figure 2A:
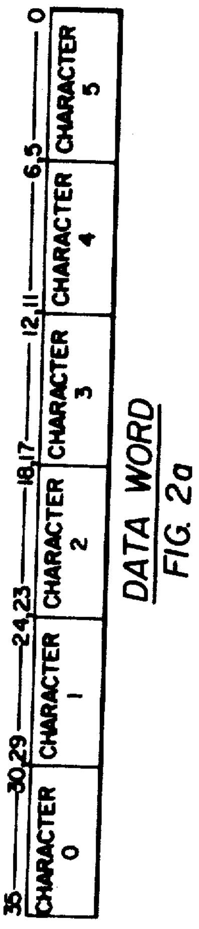
FIGURES 2*a*–2*h* are symbolic diagrams illustrating the organization of the various types of words employed in the input/output controller of FIGURE 1.

With reference to FIGURE 1, the illustrated input/output controller comprises microprogram storage unit 10, memory comunications unit 11, processing and control unit 12, peripheral channel unit 13 and buffer storage unit 14. Microprogram storage unit 10 provides storage for the program which directs operations within the input/output controller and, in response to successive addresses transmitted from memory communications unit 11, furnishes control signals to processing and control unit 12. Memory communications unit 11 serves as a communications path for data and control information flowing between memory 15 and the input/output controller. Memory communications unit 11 includes four memory ports, identified in FIGURE 1 as port A, port B, port C and port D. Up to four memories may be connected to the input/output controller, each memory being connected to one of the memory ports. In FIGURE 1, memory 15 is shown connected to port A of memory communications unit 11. Additional memories may be connected to ports B, C and D, as illustrated. Each memory is, in turn, connected to a processor. When the input/output controller is associated, through memory communications unit 11, with more than one memory, control panel 16 provides apparatus for supervising transmission of information between the input/output controller and the memories. Memory communications unit 11 transmits successive program microstep addresses to microprogram storage unit 10.

Processing and control unit 12 executes program operations in the input/output controller in response to control signals furnished by microprogram storage unit 10. Peripheral channel unit 13 includes sixteen peripheral channels, each of the channels being connected to a peripheral subsystem 17 and providing a communication path for data and control information transferred between the peripheral subsystem and the input/output controller. Each of peripheral subsystems 17 may be one of a plurality of commonly known peripheral devices, such as magnetic drum subsystems, magnetic tape subsystems, disc storage subsystems, printers, card readers, card punches, perforated tape systems or document handlers. Buffer storage unit 14 provides temporary storage for data being transferred through the input/output controller between the one or more memories and the peripheral subsystems 17. The lines interconnecting the various units illustrated in FIGURE 1 symbolically represent paths of data and control information.

The input/output controller and a processor in the data processing system do not communicate directly but only through a memory which serves as a coordinating system component. When the input/output controller has completed an assigned task or requires service, this information is transmitted by the input-output controller to a memory. Similarly, when it is necessary to initiate an action in the input/output controller, this information is transmitted by a memory to the input/output controller.

The input/output controller illustrated in FIGURE 1 is an independent data processing unit in the data processing system and is capable of executing micro-instructions in performing its function of communicating information between one or more memories and the peripheral subsystems of the data processing system. The micro-instructions, termed IOC commands, are stored in a memory, along with other control information, and are retrieved from the memory by the input/output controller. The input/output controller, in executing a micro-instruction, proceeds independently until execution of the instruction is completed. The input/output controller can receive IOC commands and other control information from only one memory, termed the control memory. If more than one memory is connected to the input/output controller, the control memory is specified by control panel 16.

INFORMATION REPRESENTATION

The input/output controller of FIGURE 1 processes information represented by the binary code. In the binary code, each element of information is represented by a binary digit, sometimes termed a "bit," each binary digit being either a 1 or a 0. In the input/output controller here described, a binary 1 is represented by a positive electrical signal in the order of +3.8 volts and a binary 0 is represented by an electrical signal in the order of +0.2 volt.

The fundamental unit of information employed in processing and communication in the input/output controller is a word. A word comprises thirty-six binary digits. The first binary digit of the data word is termed the most-significant digit (MSD) and the last binary digit is termed the least-significant digit (LSD) of the word. The binary digits between the MSD and the LSD are accorded successively decreasing orders of significance.

Three general categories of words are employed in the input/output controller of FIGURE 1: (1) data words, (2) mailbox words, and (3) interrupt queue words.

Data words

A data word in the input/output controller of FIGURE 1 is a word which is transferred by the input/output controller between a memory and a peripheral subsystem. As illustrated in FIGURE 2*a*, the data word comprises six characters or bytes, each character comprising six binary digits. The six characters of a data word are designated characters 0–5 from left to right, as shown. Character 0 is accorded the most significance and character 5 the least significance. Characters 1–4 are accorded successively decreasing orders of significance in accordance with their positions within the data word.

Mailbox words

Data processing and data transfer operations in the input/output controller are performed under the control of mailbox words which are stored in fixed or predetermined storage locations in the control memory. The locations of the mailbox words in the control memory are described in the section entitled "MEMORY." Mailbox words are identified as primary mailbox words and secondary mailbox words. A single primary mailbox word is provided in fixed storage locations of the control memory for the input/output controller. Sixty-four secondary mailbox words are stored in fixed storage locations of the control memory, four secondary mailbox words, identified as secondary mailbox words #1, #2, #3 and #4, being provided for each peripheral channel of the peripheral channel unit.

*Primary mailbox word.*—The primary mailbox word contains the information that is required by the input/output controller to initiate an operation in a peripheral subsystem or to request status of a peripheral subsystem. The information contained in the primary mailbox word is inserted in the predetermined storage location of the control memory by a processor.

Figure 2B:
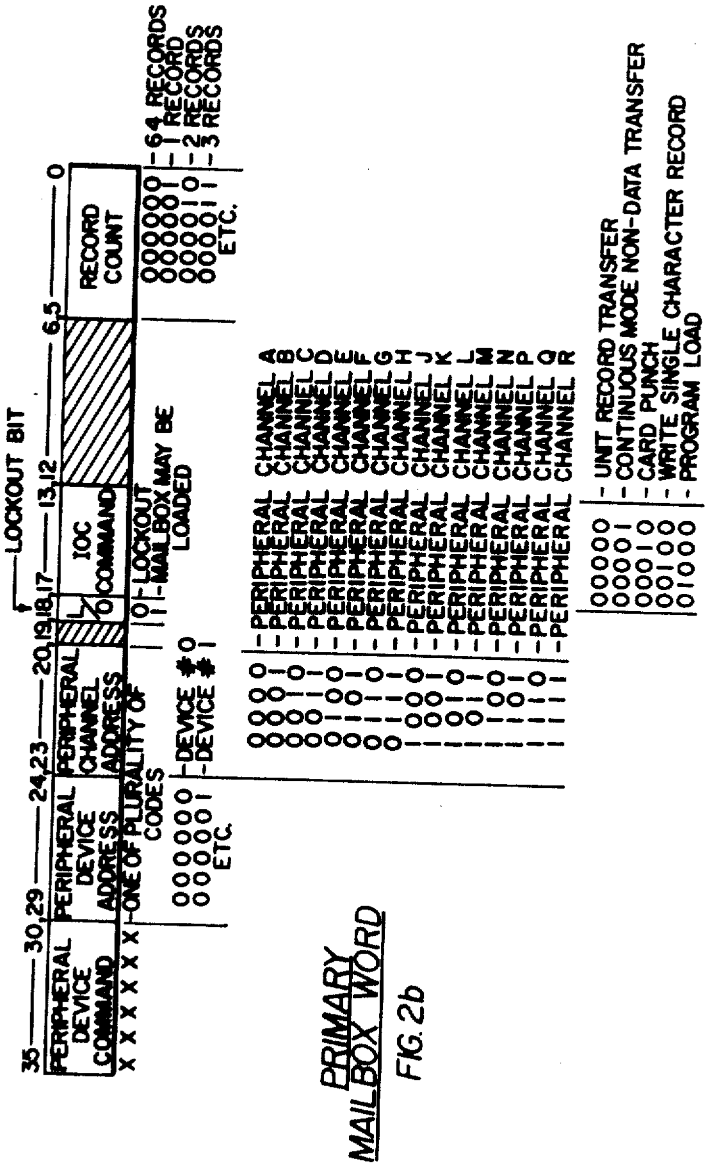

FIGURE 2*b* illustrates the organization of the primary mailbox word. Bit positions 30–35 of the primary mailbox word contain the peripheral device command which designates the function to be performed by a particular peripheral subsystem or by a device of a multi-device peripheral subsystem. The following table indicates the device command codes employed (represented by octal equivalent) and the corresponding functions for each device or peripheral subsystem.

| Peripheral Subsystem | Peripheral Device Command (Octal) | Function |
|---|---|---|
| All Peripheral Subsystems | 40 | Request status. |
| Do | 00 | Reset status. |
| Card Reader | 01 | Read card binary. |
| Do | 02 | Read card decimal. |
| Do | 03 | Read card mixed. |
| Card Punch | 11 | Write card binary. |
| Do | 12 | Write card decimal. |
| Do | 13 | Write card decimal edited. |
| Printer | 10 | Write printer. |
| Do | 30 | Write printer edited. |
| Magnetic Tape Subsystem | 05 | Read tape binary. |
| Do | 04 | Do. |
| Do | 15 | Write tape binary. |
| Do | 14 | Write tape decimal. |
| Do | 14 | Write end of file. |
| Do | 15 | Write file mark. |
| Do | 54 | Erase. |
| Do | 46 | Backspace record(s). |
| Do | 47 | Backspace file. |
| Do | 44 | Forward-space record(s). |
| Do | 45 | Forward-space file. |
| Do | 70 | Rewind. |
| Do | 72 | Rewind and standby. |
| Do | 61 | Set low density. |
| Do | 60 | Set high density. |
| Drum Storage Subsystem | 34 | Select drum address. |
| Do | 25 | Read drum. |
| Do | 31 | Write drum. |
| Do | 33 | Write drum and verify. |
| Do | 11 | Drum compare and verify. |
| Disc Storage Subsystem | 34 | Seek disc address. |
| Do | 25 | Read disc continuous. |
| Do | 31 | Write disc continuous. |
| Do | 33 | Write disc continuous and verify. |
| Perforated Tape Subsystem | 02 | Read perforated tape. |
| Do | 11 | Write perforated tape. |
| Do | 31 | Write perforated tape edited. |
| Do | 16 | Write perforated tape, single character. |
| Do | 13 | Write perforated tape. double character. |
| Console Typewriter | 03 | Read typewriter. |
| Do | 13 | Write typewriter. |

Bit positions 24–29 of the primary mailbox word contain a peripheral device address which designates the particular device within a multi-device peripheral subsystem for which the peripheral device command is intended. This peripheral device address field is employed only if the particular peripheral subsystem comprises a plurality of devices, for example a magnetic tape subsystem. The peripheral device address field is ignored if the particular peripheral subsystem consists of only a single peripheral device.

Bit positions 20–23 of the primary mailbox word contain the peripheral channel address, i.e. the identification of the peripheral channel in the peripheral channel unit of input/output controller to which the particular peripheral subsystem is connected. This peripheral channel address field specifies one of the peripheral channels A–R, as indicated in FIGURE 2*b*.

Bit position 18 of the primary mailbox word contains a lockout bit. This lockout bit is set to binary 0 by the program when a primary mailbox word is initially stored by a processor in the predetermined memory location. The presence of a binary 0 in this bit position indicates to a processor that a new primary mailbox word may not yet be stored in the predetermined storage location of the control memory containing the primary mailbox word. This lockout bit is set to a binary 1 by the input/output controller when the input/output controller causes the primary mailbox word to be read from the predetermined memory location for use by the input/output controller. The presence of a binary 1 in this bit position indicates to a processor that a new primary mailbox word may be stored in the primary mailbox fixed memory location.

Bit position 19 of the primary mailbox word is ignored by the input/output controller. Bit positions 13–17 of the primary mailbox word contain an IOC (input/output controller) command which specifies the type of operation to be performed by the input/output controller. The IOC commands facilitate multi-record operations and increase the rate of data transfer with peripheral subsystems in the data processing system. The IOC commands control the internal operation of the input/output controller and have no direct effect on the operation of the peripheral subsystems. The following IOC commands may be contained in the primary mailbox word, as illustrated in FIGURE 2*b*:

(1) Unit Record Transfer (octal 00). This IOC command is employed to transfer data between a memory and a peripheral subsystem under control of data control words (DCW) specified in the secondary mailbox fixed memory locations.

(2) Continuous Mode Non-data Transfer (octal 01). This command is used for backspacing or forward-spacing records or files on magnetic tape and for all other non-data transfer operations specified by the peripheral device command field.

(3) Card Punch (octal 02). This command is used whenever the peripheral device command field contains a command specifying a card punch operation. This IOC command controls the transfer of data from a memory to a card punch subsystem.

(4) Write Single Character Record (octal 04). This IOC command is used to transfer a file marker to a magnetic tape. The character to be transferred to the magnetic tape as the file marker is provided in secondary mailbox word #1.

(5) Program Load (octal 10). This IOC command is employed for initial start-up of the data processing system to transfer the program to be executed from a peripheral subsystem to a memory.

Bit positions 0–5 of the primary mailbox word contain a record count. If the IOC command is "continuous mode non-data transfer," the record count specifies the number of records to be backspaced or forward-spaced on magnetic tape. For all other non-data transfer operations, as specified by the peripheral device command field, the record count must be one. If the IOC command is "card punch," the record count must be twelve. For all other IOC commands, the record count field is ignored.

*Secondary mailbox word #1.*—At the beginning of a data transfer operation in the input/output controller, secondary mailbox word #1 contains the first data control word (DCW) to be used by the input/output controller in controlling the transfer of data between a memory and a peripheral subsystem during the data transfer operation. Secondary mailbox word #1 is stored in its fixed location in the control memory by the program. If more than one data control word is required to complete the transfer of data for the input/output data transfer operation, the input/output controller causes a new secondary mailbox word #1 to be stored in the fixed memory location for use by the input/output controller.

Bit positions 18–35 of secondary mailbox word #1 contain a data address field. This data address field may contain four items of information, as follows:

(1) When the secondary mailbox word #1 fixed location is initially loaded by the program, the data address field contains the address of the first word of the data block to be transferred between a memory and a peripheral subsystem. This address is not absolute but is relative to the starting address of the program initiating the data address field absolute. This addition of a base will add a base address to the data address field to make the data address field absolute. This additios of a base address is done each time a new data control word is obtained during the course of a data transfer operation.

(2) If the action code of primary mailbox word #1 is "DCW Branch," the data address field specifies the address of the memory location containing the next data control word to be employed in the course of the data transfer operation.

(3) Upon termination of a data transfer, the data address field contains the absolute address of word N+1, where word N was the last word transferred.

(4) If the IOC command contained in the primary mailbox word is "write single character record," bit positions 30–35 contain the character to be written on magnetic tape as a file marker.

Bit positions 15–17 of secondary mailbox word #1 contain zone control bits which identify the position within a word of the information unit or character being transferred between a memory and a peripheral subsystem. The zone control field is used as a character counter by the input/output controller. During a read operation in a peripheral channel, if the data transfer terminates with an incomplete word in the input/output controller, the zone control field indicates the number of data characters contained in the incomplete word. During a data transfer in a peripheral channel when the data transfer terminates with an incomplete word in the input/output controller, the zone control field indicates the position within a word of the next character to be transferred between the input/output controller and a memory.

Bit position 14 of secondary mailbox word #1, termed the read or write bit, indicates whether the data transfer comprises a read or a write operation. If the data transfer is from a memory to a peripheral subsystem, bit position 14 contains a binary 0, indicating a write operation. If data transfer is from a peripheral subsystem to memory, bit position 14 contains a binary 1, indicating a read operation. For any peripheral device command contained in the primary mailbox word which involves data transfer between the input/output controller and a peripheral subsystem, bit position 14 contains the complement of bit 33 in the peripheral device command field of the primary mailbox word.

Figure 2C:
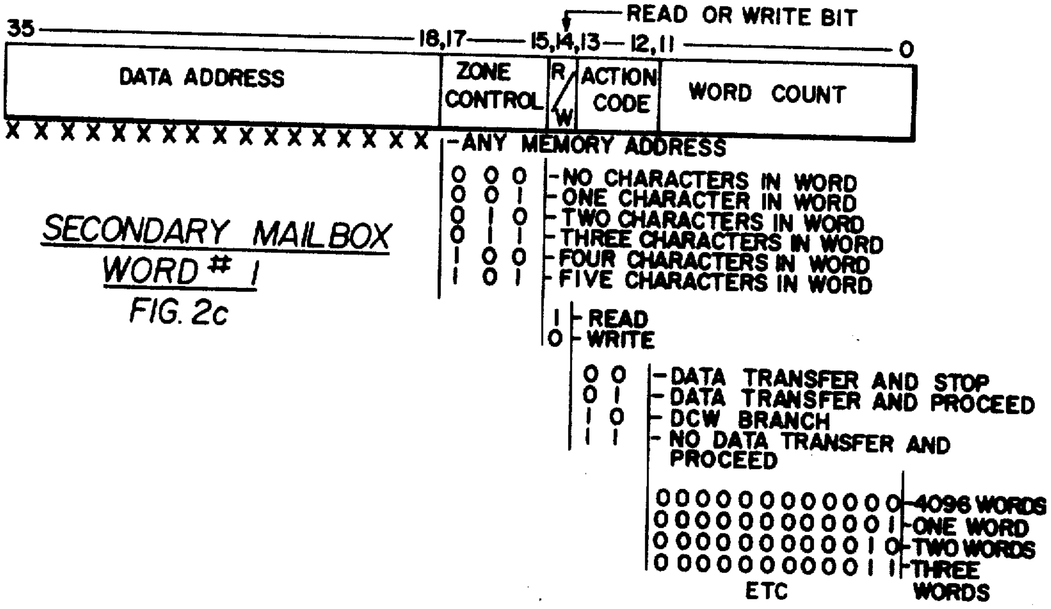
Figure 2D:
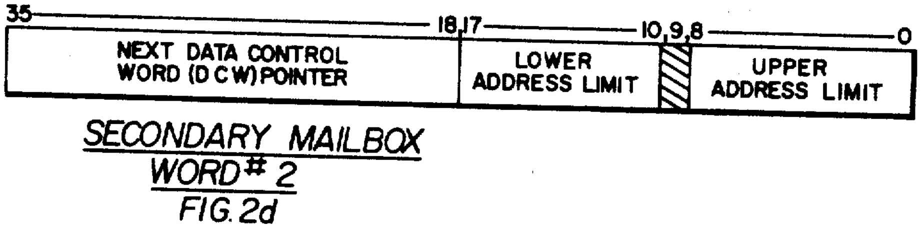

Bit positions 12 and 13 of secondary mailbox word #1 contain an action code which modifies and further defines the operations specified by certain of the IOC commands. The following action codes are employed in secondary mailbox word #1, as illustrated in FIGURE 2*c*:

(1) Data Transfer and Stop (00). This action code causes the input/output controller to transfer data between a peripheral subsystem and memory under the control of secondary mailbox word #1 until the word count field of secondary mailbox word #1 is reduced to zero. The input/output controller will then terminate the data transfer.

(2) Data Transfer and Proceed (01). This action code causes the input/output controller to obtain and employ another data control word when the word count field of the current data control word is reduced to zero. The new data control word controls further data transfers between a peripheral subsystem and a memory.

(3) DCW Branch (10). This action code causes the input/output controller to use the data address field of the data control word in secondary mailbox word #1 as the next DCW pointer, i.e. the address of the next data control word that is to be employed to control subsequent data transfers. Consecutive data control words containing this action code may be used.

(4) No Data Transfer and Proceed (11). This action code causes the input/output controller to generate a number of zero characters corresponding to the contents of the word count field and transmits these zero characters to a peripheral subsystem during a write operation. If a read operation is being performed, this action code causes a number of data words, as specified by the contents of the word count field, being transferred from the peripheral subsystem to memory to be masked. During both read and write operations, the word count field is decremented in a normal manner and upon reduction of the word count field to zero, the input/output controller obtains the next data control word.

Bit positions 0–11 of secondary mailbox word #1 contain a word count field which specifies the number of words to be transferred between a memory and a peripheral subsystem under control of the corresponding data control words. If data transfer is terminated before the word count field is reduced to zero, the word count field indicates the number of words remaining to be transferred.

*Secondary mailbox word #2.*—Secondary mailbox word #2 is used to obtain and check additional data control words employed during data transfer operations in the input/output controller. Bit positions 18–35 of secondary mailbox word #2 contain the next DCW pointer, i.e. the address of the next data control word to be used by the input/output controller after the word count field of the current data control word has been reduced to zero. The address contained in the next DCW pointer field is an absolute address. If only one data control word is required in a data transfer operation, secondary mailbox word #2 is not used. However, if more than one data control word is required, the next DCW pointer field is employed to obtain subsequent data control words. The input/output controller increments this field by one each time a new data control word is obtained from memory to form the address of the next data control word.

Bit positions 10–17 of secondary mailbox word #2 contain the lower address limit field which specifies the address of a 1024 word block in memory containing the starting address of the program. The lowest possible absolute address within the program is defined by the eight binary digits of the lower address limit field followed by ten binary 0's.

Bit positions 0–8 of secondary mailbox word #2 contain the upper address limit field which specifies the address in memory of a 1024 word block which contains the highest permissible absolute word address within the program. The upper address limit field followed by ten binary 1's defines the highest permissible absolute address within the program.

Figure 2E:
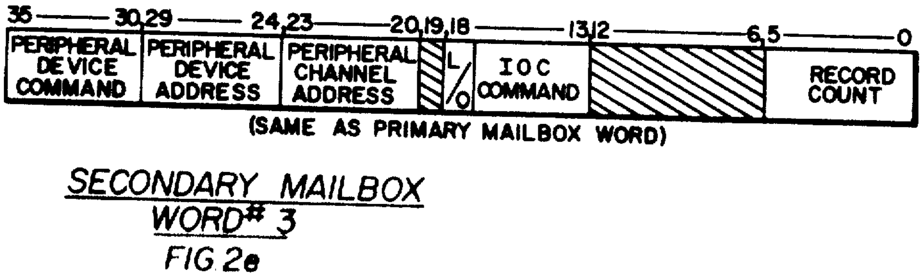

*Secondary mailbox word #3.*—The organization of secondary mailbox word #3 is illustrated in FIGURE 2*e*. This word is an exact image of the primary mailbox word and is employed at certain times during the operation of the input/output controller after the primary mailbox word has been destroyed.

*Secondary mailbox word #4.*—Secondary mailbox word #4 is employed by the input/output controller to store status information and to store address and count information for use with particular IOC commands. Bit positions 18–35 of secondary mailbox word #4 contain the first data control word pointer, i.e. the absolute address of the first data control word employed in a data transfer operation. This information is required by the input/output controller during execution of the "card punch" IOC command.

Figure 2F:
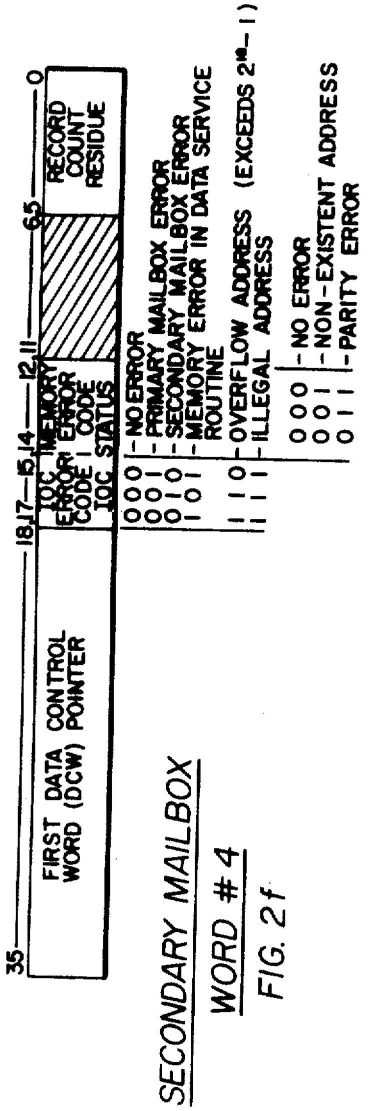

Bit positions 12–17 of secondary mailbox word #4 contain IOC status information. In particular, bit positions 15–17 contain an internal or IOC (input/output controller) error code while bit positions 12–14 contain an external or memory error code. The binary representation of the possible IOC and memory error codes is illustrated in FIGURE 2*f*.

Bit positions 2–11 of secondary mailbox word #4 are ignored by the input/output controller. Bit positions 0–5 contain the record count residue which indicates the number of records still to be processed in the event data transfer with a peripheral subsystem is terminated.

*Interrupt queue words*

Two types of interrupt queue words are employed in the input/output controller, viz. interrupt queue counter words and interrupt queue table words. These interrupt queue words, like the mailbox words, are stored in predetermined locations of the control memory. The locations of the interrupt queue words in the control memory are described in the section entitled "MEMORY." Three interrupt queue counter words and forty-eight interrupt queue table words are provided in the control memory. A set of one interrupt queue counter word and sixteen interupt queue table words are assigned to each of the three types of program interrupts which may be initiated by the input/output controller, viz. initiation interrupts, terminate interrupts and special interrupts. The interrupt counter words are identified as the initiation interrupt counter word, the terminate interrupt counter word and the special interrupt counter word. Duplicates of the three interrupt queue counter words are also provided in the control memory. The interrupt queue table words are identified as initiation interrupt queue table words, terminate interrupt queue table words and special interrupt queue table words. The interrupt queue words are employed by the input/output controller to furnish certain information through the control memory to a processor. The interrupt queue counter words are employed to identify the word of the corresponding queue table in which the last entry was made by the input/output controller.

Figure 2G:
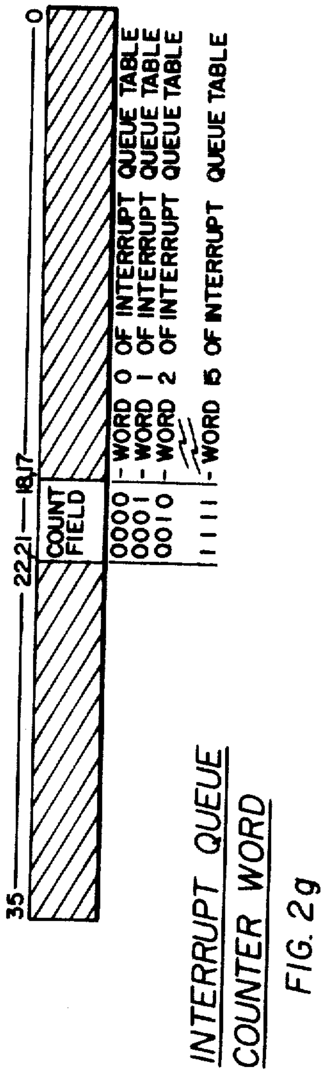

*Interrupt queue counter words.*—The organization of the interrupt queue counter words is illustrated in FIGURE 2*g*. Bit positions 22–35 and 0–17 of the interrupt queue counter words are ignored by the input/output controller. Bit positions 18–21 contain the count field which specifies the location within the corresponding sixteen word interrupt queue table of the last entry made by the input/output controller. The format of the initiation, terminate and special interrupt queue counter words is identical. The count field of the interrupt queue counter word is incremented each time the input/output controller stores information in the interrupt queue table of the corresponding type. The count field functions as a modulo-16 counter and is automatically reset to 0000 after sixteen incrementations.

Figure 2H:
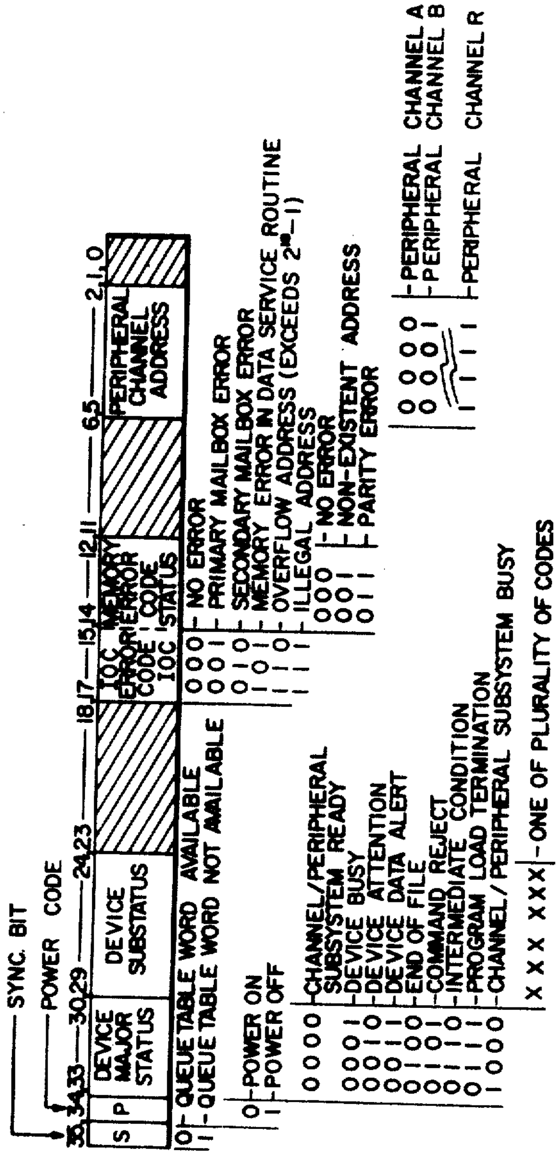

*Interrupt queue table words.*— Interrupt queue table words are employed by the input/output controller to communicate status and other required control information to a processor through the control memory. The organization of the interrupt queue table words is illustrated in FIGURE 2*h*. Bit position 35 of the interrupt queue table word contains the synchronization bit which indicates the status of the interrupt queue table word. A binary 0 in the synchronization bit position indicates that the interrupt queue table word has been processed and that a new interrupt queue table word can be stored in that fixed memory location. A binary 1 in the synchronization bit position indicates that the interrupt queue table word has not yet been processed and, therefore, a new interrupt queue table word cannot yet be stored in that location of control memory.

Bit position 34 of the interrupt queue table word contains a power code, a binary 0 indicating that electrical power is being applied to a particular peripheral subsystem, while a binary 1 indicates a power-off condition.

Bit positions 30–33 of the interrupt queue table word contain device major status information indicating the status of a particular peripheral device or subsystem. The possible binary digit combinations in the device major status field and the status information conveyed by each combination are illustrated in FIGURE 2*h*. Bit positions 24–29 contain device substatus information to further define, in greater detail than is possible in the device major status field, the status of a peripheral subsystem.

Bit positions 12–17 contain IOC status information comprising an IOC error code and a memory error code identical to that discussed in conjunction with secondary mailbox word #4. Bit positions 2–5 of the interrupt queue table word contain the identification or address of the peripheral channel connected to the peripheral subsystem whose status is reflected in the interrupt queue table word. Bit positions 18–23, 6–11, 0 and 1 of the interrupt queue table word are ignored by the input/output controller.

If the input/output controller detects a parity error while reading the interrupt queue counter word for an interrupt queue table, the duplicate counter word is read. If this also results in the detection of a parity error, the input/output controller stores the information intended for the interrupt queue table in a counter-parity interrupt data word, occupying a predetermined location in the control memory. The organization of the counter-parity interrupt data word is identical to that of the interrupt queue table word illustrated in FIGURE 2*h*.

INPUT/OUTPUT CONTROLLER CIRCUIT ELEMENTS

The functions of circuits useful as elements of the input/output controller of FIGURE 1 will now be described. Circuits for performing these functions are well known in the art. For some functions, specific circuits are suggested herein and are particularly well suited. However, the input/output controller will function with these circuits or with other similar circuits well known in the art. The invention, therefore, is not to be considered as limited to the employment of the specific circuits described.

The following circuits find general employment in the input/output controller: AND-gates, OR-gates, inverters, NAND-gates, NOR-gates, flip-flops and one-shots. The symbols illustrated in FIGURE 3 are employed throughout the drawings to represent the corresponding circuits.

AND-gate

Figure 3A:
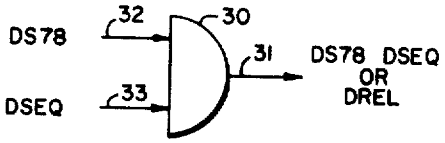
FIGURES 3*a*–3*g* illustrate symbols employed to represent circuit elements in the input/output controller of FIGURE 1.

An AND-gate provides the logical operation of conjunction for binary 1 signals applied thereto. Since a binary 1 is represented by a positive potential in the input/output controller, the AND-gate provides a positive output signal representing a binary 1 when, and only when, all of the input signals applied thereto are positive and represent binary 1's. The symbol identified by reference numeral 30 in FIGURE 3*a* represents a two input AND-gate. Such an AND-gate delivers a binary 1 output signal on output line 31 only when each of the two input signals applied on respective input lines 32 and 33 represents a binary 1.

The two input signals applied to AND-gate 30 of FIGURE 3*a* are designated DS78 and DSEQ. The output signal of AND-gate 30 is represented by "DS78 DSEQ," a conjunctive logic expression. This form of expression is used in logic equations, which are also termed Boolean equations, and which will be employed in this description to represent the structure of the input/output controller. The conjunctive operation on two signals, such as the DS78 and DSEQ signals, is indicated by writing the two signal designation terms adjacent each other with no operator notation between them, as written above, or with the operator notation (·) between the terms, as follows: DS78·DSEQ. This conjunctive expression is read as "DS78 and DSEQ."

Alternatively, the output of AND-gate 30 may be identified by another signal designation, such as signal designation DREL in FIGURE 3*a*. Output signal DREL of AND-gate 30 is a binary 1, therefore, only when both input signals DS78 and DSEQ are binary 1's. This relationship between the output signal of AND-gate 30, the input signals to AND-gate 30 and the logical operation of conjunction performed by AND-gate 30 may be expressed in the form of a logic equation, viz.:

$$\text{DS78 DSEQ}=\text{DREL}$$

This logic equation fully represents the conditions necessary to the generation of output signal DREL and may be employed to structurally represent the relationship between signal DREL and signals DS78 and DSEQ.

The logical operation of conjunction is not limited to AND-gates having only two input signals, but instead is applicable to AND-gates having any number of input signals. In each such instance, the output signal of the corresponding AND-gate represents a binary 1 when, and only when, all of the input signals applied to the gate represent binary 1's.

OR-gate

Figure 3B:
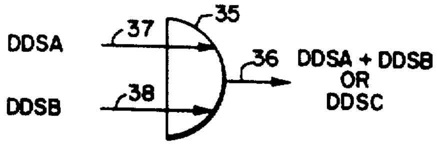

The OR-gate provides the logical operation of inclusive-or for binary 1 input signals applied thereto. In the input/output controller, since a binary 1 is represented by a positive signal, the OR-gate provides a positive output signal representing a binary 1 when any one or more of the input signals applied thereto are positive and represent binary 1's. The symbol identified by reference numeral 35 in FIGURE 3*b* represents a two input OR-gate. Such an OR-gate delivers a binary 1 output signal on output line 36 when either or both input signals applied to input lines 37 and 38 represent binary 1's.

The two input signals applied to OR-gate 35 of FIGURE 3*b* are designated DDSA and DDSB. The output signal may be represented by "DDSA+DDSB," an inclusive-or disjunctive logic expression. This form of expression is used in logic equations employed to represent the structure of the input/output controller. The inclusive-or operation on any two signals, such as the DDSA and DDSB signals, is indicated by writing the two signal designation terms adjacent each other with the operator notation (+) between the terms, as written above. This inclusive-or expression is read as "DDSA or DDSB."

Alternatively, the output of OR-gate 35 may be identified by another signal designation, such as signal designation DDSC in FIGURE 3*b*. Output signal DDSC of OR-gate 35 is a binary 1, therefore, when either or both of input signals DDSA and DDSB are binary 1's. This relationship between the output signal of OR-gate 35, the input signals to OR-gate 35 and the logical operation of inclusive-or performed by OR-gate 35 may be expressed in the form of a logic equation as follows:

$$\text{DDSA}+\text{DDSB}=\text{DDSC}$$

This logic equation fully represents the conditions necessary to the generation of output signal DDSC and may be employed to structurally represent the relationship between signal DDSC and signals DDSA and DDSB.

The logical operation of inclusive-or is not limited to OR-gates having only two input signals, but instead is applicable to OR-gates having any number of input signals. In each such instance, the output signal of the corresponding OR-gate represents a binary 1 when any one or more of the input signals applied to the gate are positive and represent binary 1's.

Inverter

The inverter provides a logical operation of inversion, or NOT, for an input signal applied thereto. The inverter provides a relatively positive output signal, representing a binary 1, when the input signal applied to the inverter is relatively negative, representing a binary 0. Conversely, the inverter provides an output signal representing a binary 0 when the input signal represents a binary 1.

Figure 3C:
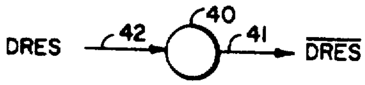

The symbol identified by reference numeral 40 in FIGURE 3*c* represents an inverter. Inverter 40 delivers a binary 1 output signal on output line 41 when the input signal applied on input line 42 represents a binary 0, and provides a binary 0 output signal on output line 41 when the input signal on line 42 is a binary 1.

The output signal delivered by the inverter is designated as having the inverse binary logical significance of the input signal. The input signal applied to the inverter of FIGURE 3*c* is designated as signal DRES. The output signal of this inverter is therefore designated as signal $\overline{\text{DRES}}$, which signifies that the output signal has inverse logical significance compared to the input signal.

This designation for a signal having inverse binary logical significance with respect to another signal is employed generally in the description of the input/output controller. Thus, a signal designation, such as $\overline{\text{DNDP}}$, indicates that when the DNDP signal is relatively positive, representing a binary 1, the $\overline{\text{DNDP}}$ signal is relatively negative, representing a binary 0, and vice versa. It is to be understood herein that whenever a particular signal is generated, its logical inverse may be generated by applying the original signal to an inverter.

NAND-gate

Figure 3D:
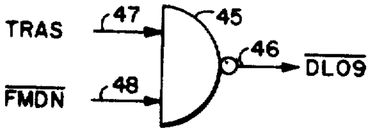

The NAND-gate provides the logical operation of conjunction and inversion for binary 1 signals applied thereto. In the input/output controller, since a binary 1 is represented by a positive signal, the NAND-gate provides a relatively negative output signal representing a binary 0 when, and only when, all of the input signals applied to the NAND-gate are positive, representing binary 1's. The symbol identified by numeral 45 in FIGURE 3*d* represents a two input NAND-gate. Such a NAND-gate delivers a binary 0 output signal on output lead 46 only when each of the two input signals applied to input leads 47 and 48 represents a binary 1. The two input signals applied to NAND-gate 45 are designated TRAS and $\overline{\text{FMDN}}$. The output signal of NAND-gate 45 is designated $\overline{\text{DL09}}$. The logical relation between the output and input signals of NAND-gate 45 may be expressed by the logic equation:

$$\overline{\text{TRAS }\overline{\text{FMDN}}}=\overline{\text{DL09}}$$

This logical relation may also be expressed as:

$$\overline{\text{TRAS}}+\text{FMDN}=\overline{\text{DL09}}$$

These equations indicate that output signal $\overline{\text{DL09}}$ is a binary 0 when both input signals TRAS and $\overline{\text{FMDN}}$ are binary 1's. Under all other conditions, output signal $\overline{\text{DL09}}$ is a binary 1. The logical relation between the output and input signals of NAND-gate 45 may also be expressed in terms of signal DL09 which has inverse logical significance with respect to signal $\overline{\text{DL09}}$, as follows:

$$\text{TRAS }\overline{\text{FMDN}}=\text{DL09}$$

This equation indicates that output signal DL09 is a binary 1 when both input signals TRAS and $\overline{\text{FMDN}}$ are binary 1's; this is equivalent to saying that output signal $\overline{\text{DL09}}$ is a binary 0 when both input signals TRAS and $\overline{\text{FMDN}}$ are binary 1's, as previously discussed.

The logical operation of conjunction and inversion is not limited to NAND-gates having only two input signals, but is applicable to NAND-gates having any number of input signals. In each such instance, the output signal of the corresponding NAND-gate represents a binary 0 when, and only when, all of the input signals applied to the NAND-gate represent binary 1's.

NOR-gate

Figure 3E:
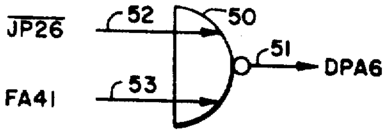

A NOR-gate provides the logical operation of inclusive-or and inversion for binary 1 input signals applied thereto. In the input/output controller, since a binary 1 is represented by a positive signal, a NOR-gate provides a relatively negative output signal representing a binary 0 when any one or more of the input signals applied thereto are positive and represent binary 1's. The symbol identified by reference numeral 50 in FIGURE 3*e* represents a two input NOR-gate. Such a NOR-gate delivers a binary 0 output signal on output lead 51 when any one or both of the input signals applied to input leads 52 and 53 represent binary 1's.

The two input signals applied to NOR-gate 50 are designated $\overline{JP26}$ and FA41. The output signal is designated DPA6. The logical relationship between the input and output signals of NOR-gate 50 may be represented by the following equation:

$$\overline{\overline{JP26}+FA41}=DPA6$$

This equation indicates that output signal DPA6 is a binary 0 when either of input signals $\overline{JP26}$ or FA41 are binary 1's. The equation may also be written as:

$$JP26\ \overline{FA41}=DPA6$$

This equation indicates that DPA6 is a binary 1 when both input signals JP26 and $\overline{FM41}$ are binary 1's, i.e. when both input signals $\overline{JP26}$ and FA41 are binary 0's.

The logical operation of inclusive-or and inversion is not limited to NOR-gates having only two input signals, but instead is applicable to NOR-gates having any number of input signals. In each such instance, the output signal of the corresponding NOR-gate represents a binary 0 when any one or more of the input signals applied to the NOR-gate represent binary 1's.

Flip-flop

The flip-flop provides temporary storage of a binary digit of data or control information. A pair of output signals is delivered by the flip-flop to denote the type of binary digit that is currently being stored.

The flip-flop, or bistable multivibrator, is a circuit adapted to operate in either one of two stable states and to transfer from the stable state in which it is operating to the other stable state upon application of a trigger signal thereto. In one of its stable states (1-state), the flip-flop represents a binary 1 and in the other stable state (0-state), the flip-flop represents a binary 0. When the flip-flop is transferred to the 1-state, it is said to be "set." When the flip-flop is transferred to the 0-state, it is said to be "reset."

Figure 3F:
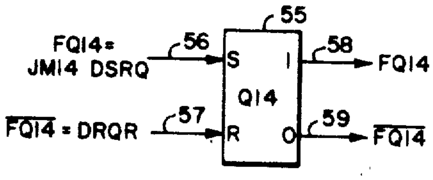

A flip-flop is generally identified mnemonically in accordance with the function it performs. For example, a typical flip-flop employed in the input/output controller for control is designated the JMP flip-flop. The JMP designation stands for "Jump" and the JMP flip-flop, when in the 1-state, indicates a jump between routines or subroutines in the microprogram storage unit of the input/output controller. A typical flip-flop employed in the input/output controller for temporary storage of data is the Q14 flip-flop. The symbol identified by reference numeral 55 in FIGURE 3*f* is employed to represent a flip-flop Symbol 55, in this instance, represents the Q14 flip-flop.

The Q14 flip-flop is employed to temporarily store the fifteenth bit in the Q-register. The two lines 56 and 57 entering the left-hand side of the flip-flop symbol are input lines and provide the two required trigger signals. Line 56, the one input line, provides a one input (or "set") signal and line 57, the zero input line, provides a zero input (or "reset") signal. When the one input signal increases positively, the flip-flop is transferred to its 1-state (or "set" state), if it is not already in the 1-state. When the zero input signal increases positively, the flip-flop is transferred to its 0-state (or "reset" state), if it is not already in the 0-state. The notation $$FQ14=JM14\ DSRQ$$

indicates the logical gate structure employed to generate the "set" trigger signal. Similarly, the notation $$\overline{FQ14}=DRQR$$

indicates the logical gate structure employed to generate the "reset" trigger signal for the Q14 flip-flop.

The two lines 58 and 59 extending from the right-hand side of symbol 55 are output lines that deliver the two output signals, viz. FQ14 identifying the 1-output signal and $\overline{FQ14}$ identifying the 0-output signal. When the Q14 flip-flop is in the 1-state, a relatively positive signal is delivered on the 1-output line while a relatively negative signal is delivered on the 0-output line. Conversely, when the Q14 flip-flop is in the 0-state, a relatively negative signal is delivered on the 1-output line and a relatively positive signal is delivered on the 0-output line. Flip-flop circuits are well known in the art and will not here be described in detail.

Register

A register is a set of flip-flops providing temporary storage for a group of related binary digits of data or control information. The size of a register is dependent on the number of binary digits of information to be stored. For example, the U-register in the processing and control unit of the input/output controller is employed to temporarily store an information word and therefore comprises thirty-six flip-flops.

The flip-flops of a register are identified according to the register designation and the numerical significance of the information bits stored therein. Thus, a particular flip-flop of a register may be designated as the "O*i*" flip-flop where "O" identfies the register and "*i*" identifies the order of significance of a bit stored in the flip-flop. For example, flip-flop U35 stores the thirty-sixth or the most-significant bit stored in the U-register. Data movement between the registers of the input/output controller is by parallel transfer of the bits stored in the flip-flops of one register to predetermined flip-flops of the receiving register.

One-shot

A one-shot provides temporary storage of a control binary digit for a predetermined duration following the occurrence of a particular event. An output signal is delivered by a one-shot to denote the type of binary digit that is currently being stored. The one-shot, or monostable multivibrator, circuit is normally operative in a stable state, but adapted to operate in an unstable state for a predetermined duration following application of a trigger signal thereto. In the stable state of operation (0-state), the one-shot represents a binary 0 and in the unstable state (1-state) represents a binary 1.

Figure 3G:
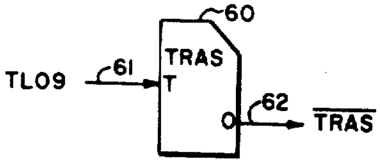

A one-shot is generally identified mnemonically in accordance with the function it performs. For example, the one-shot designated as the TRAS one-shot generates a reset address signal. The TRAS one-shot transfers to the 1-state when the flip-flop L09 of the L-register is set to the 1-state to request a memory access interrupt. The symbol identified by reference numeral 60 in FIGURE 3*g* represents a one-shot. The line 61 entering the left-hand side of the one-shot symbol is an input line and provides the required trigger signal. When the trigger signal goes relatively positive, the one-shot is transferred to its 1-state (or unstable state), and remains in the 1-state for a predetermined duration before returning to the 0-state. The line 62 leaving the right-hand side of the symbol is an output line and delivers the output signal, which is the 0-output signal.

The input signal applied to the one-shot of FIGURE 3*g* is designated TL09. The 0-output signal delivered by the TRAS one-shot is identified as the $\overline{\text{TRAS}}$ signal. When the TRAS one-shot is in the stable 0-state, a relatively positive signal is delivered on output line 62. Conversely, when the one-shot is in the unstable 1-state, a relatively negative signal is delivered on output line 62. One-shot circuits are well known in the art and will not here be described.

LOGICAL SCHEMATIC DIAGRAM

Generally, two or more output signals from flip-flops, one-shots, inverters, clock signal sources and the signals provided by certain switches are combined logically by AND-gates, OR-gates, NAND-gates and NOR-gates to provide input signals to other flip-flops, one-shots and inverters. Thus, the two trigger input signals to a flip-flop are usually the output signals of respective logical chains of AND-, OR-, NAND- and NOR-gates which, in turn, receive output signals provided by other flip-flops and by one-shots, inverters and certain switches. These logical chains may be described and illustrated by logical expressions which are actually logical schematic diagrams representing the logical and structural interconnection of a logical chain. Thus, the circuits providing the trigger input signals to a flip-flop may be illustrated by a set of logical schematic diagrams for each flip-flop, as shown in FIGURE 135. These logical schematic diagrams are termed herein "flip-flop input" diagrams.

The one-shot also usually receives an input signal from a logical chain. Therefore, the logical chain delivering the input signal to a one-shot may also be illustrated by a logical schematic diagram, such as shown in FIGURE 179. These logical schematic diagrams are termed herein "one-shot input" diagrams. In a similar manner, the logical circuits providing input signals to inverters may be illustrated by logical schematic diagrams.

The two types of logical schematic diagrams, discussed above, viz. "flip-flop input" diagrams and "one-shot input" diagrams, are employed in FIGURES 38–179 to illustrate the internal circuit structure of the components and the interconnecting circuit configurations between the components of the input/output controller.

In addition to the two types of logical schematic diagrams described above, a third type of logical schematic diagram, termed the "logical combination signal" diagram, is employed. Certain signals generated within logical chains are identified by signals designations. Such signals are the output signals of a first logical chain and are employed as input signals to one or more additional logical chains. A logical combination signal diagram is a representation of such a first type logical chain. For example, signal DCDP (FIGURE 90) represents a response to a routine priority request from peripheral channel C of the peripheral channel unit. The DCDP signal is the output signal of a logical chain which receives the 1-output signal of the CDM flip-flop and output signals of the $\overline{\text{DADP}}$ and $\overline{\text{DBDP}}$ logical chains. The DCDP signal is applied as an input signal to a plurality of logical chains whose output signals, in turn, are received by other circuit elements of the peripheral channel unit (FIGURE 116).

In the logical circuits illustrated by the following types of logical schematic diagrams, the logical functions of conjunction are implemented by AND-gates, the logical functions of inclusive-or are implemented by OR-gates, and the logical functions of conjunction and inversion and of inclusive-or and inversion are implemented by NAND- or NOR-gates respectively: (a) flip-flop input diagrams, (b) one-shot input diagrams and (c) logical combination signal diagrams.

The following example demonstrates the significance of the logical schematic diagram and its employment to illustrate the interconnection of flip-flops, one-shots, inverters and switches by AND-, OR-, NAND- and NOR-gates. It particularly illustrates that this notation, couched in terms of signal designations in associative and combinatorial arrangements, completely defines the block and schematic circuit element arrangements, once the building blocks have been determined, as has been done in the preceding description and in FIGURES 3*a*–3*g*.

Figure 4:
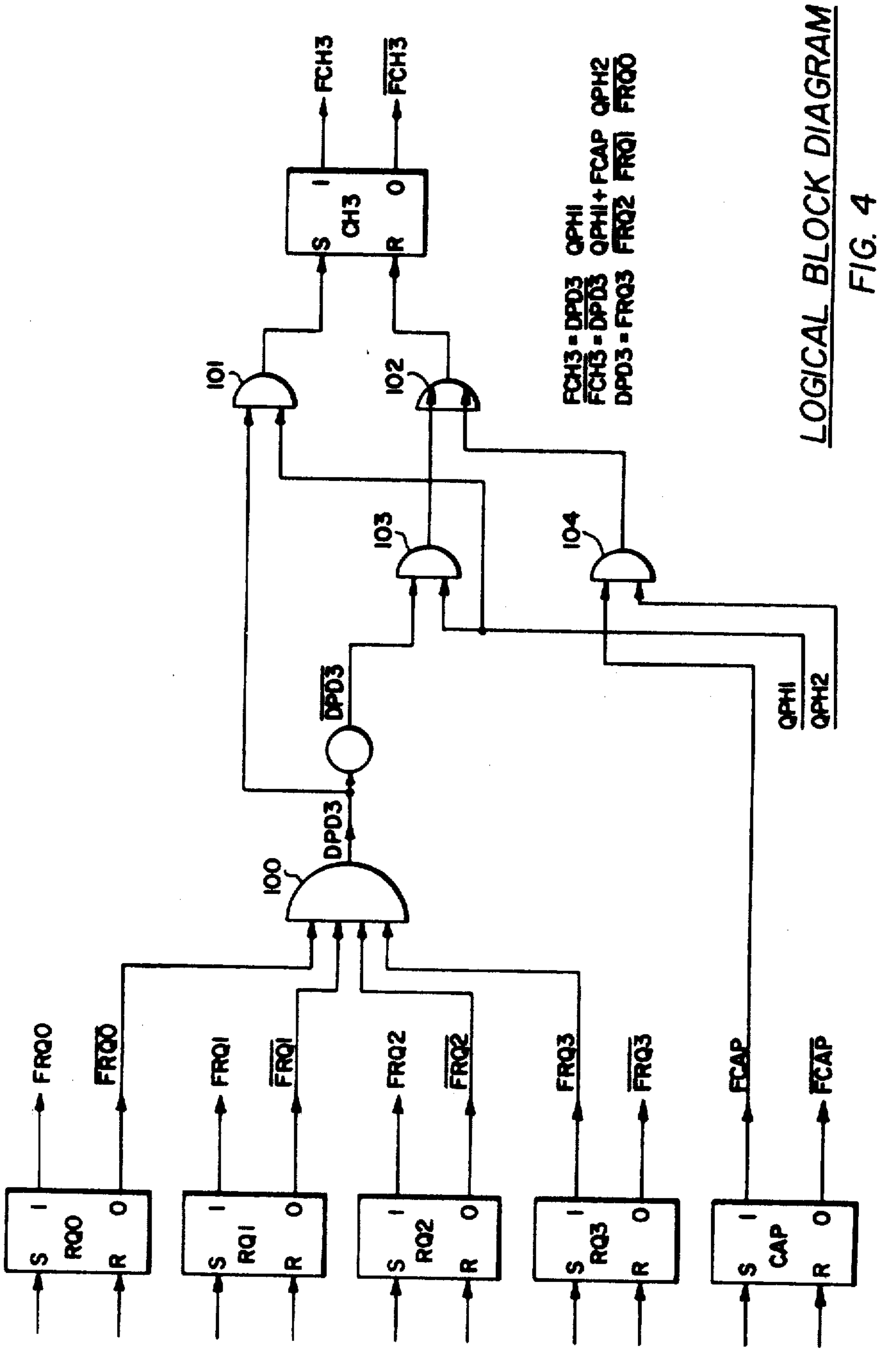
FIGURE 4 is a logical block diagram of the circuits providing the input signals to a flip-flop of the input/output controller.

FIGURE 4 is a block diagram of the circuits providing the two trigger signals to the CH3 flip-flop. This figure is the block diagram equivalent of the logical schematic diagrams of FIGURE 123 which defines the FCH3 and $\overline{\text{FCH3}}$ trigger signals and the logical schematic diagrams of FIGURE 92 which define the DPD3 logical combination signal.

The DPD3 signal is the output signal of AND-gate 100. AND-gate 100 receives the $\overline{\text{FRQ0}}$ output signal of the RQ0 flip-flop, the $\overline{\text{FRQ1}}$ output signal of the RQ1 flip-flop; the $\overline{\text{FRQ2}}$ output signal of the RQ2 flip-flop and the FRQ3 output signal of the RQ3 flip-flop. The output signal of AND-gate 100 is represented by:

$$\text{FRQ3}\ \overline{\text{FRQ2}}\ \overline{\text{FRQ1}}\ \overline{\text{FRQ0}}=\text{DPD3}$$

where FRQ3 $\overline{\text{FRQ2}}$ $\overline{\text{FRQ1}}$ $\overline{\text{FRQ0}}$ represents the logical operation of conjunction on the four input signals applied to AND-gate 100 and is also a direct representation of the circuit which generates the DPD3 signal. Therefore, the logical schematic diagram $$\text{FRQ3}\ \overline{\text{FRQ2}}\ \overline{\text{FRQ1}}\ \overline{\text{FRQ0}}=\text{DPD3}$$

may also be employed to illustrate the logical circuits which generate the DPD3 signal.

The 1-input trigger signal for setting the CH3 flip-flop is the output signal of AND-gate 101. AND-gate 101 receives the DPD3 logical combination signal and the QPH1 signal which is provided by another logical chain (FIGURE 93). The relationship between the output signal of AND-gate 101 and the response in flip-flop CH3 is represented by:

$$\text{DPD3 QPH1}=\text{FCH3}$$

This logical schematic diagram represents the logical operation of conjunction between the two input signals applied to AND-gate 101 and also represents the application of the output signal of AND-gate 101 to flip-flop CH3 to transfer flip-flop CH3 to its 1-state.

The 0-input trigger signal for resetting the CH3 flip-flop to its 0-state is generated by the logical circuit comprising OR-gate 102 and AND-gates 103 and 104. OR-gate 102 receives as inputs the output signals of AND-gates 103 and 104. AND-gate 103 receives the $\overline{\text{DPD3}}$ signal, which is the logical inverse of the output of AND-gate 100. AND-gate 103 also receives signal QPH1 which is the output of another logical chain.

AND-gate 104 receives the 1-output signal FCAP of the CAP flip-flop and also the QPH2 signal which is the output of another logical chain (FIGURE 93). The relationship between the output of OR-gate 102 and the response in flip-flop CHE is represented by:

$$\overline{\text{DPD3}}\ \text{QPH1}+\text{FCAP QPH2}=\overline{\text{FCH3}}$$

This logical schematic diagram illustrates the logical circuit which resets the CH3 flip-flop to its 0-state.

The preceding example demonstrates how the logical schematic diagrams of FIGURES 38–179 provide simple, compact and readily analyzed and related illustrations of the circuit structures of the components and of the circuit configurations interconnecting the components. This has been done by using signal designations in associations and combinations serving not only to identify the signal relationships, but also to define the circuit elements and their circuit relationships.

GLOSSARY AND INDEX OF SIGNALS

The signals provided by the system circuit elements are tabulated below. The nature of the signal as well as the major element of the input/output controller in which the signal originates is indicated. The portion of the description which describes and illustrates the respective source circuit elements for each of these signals is also identified.

For example, the notation DTCH: Log, IOP; FIGURE 161 indicates that the DTCH signal is a logical combination signal of the processing and control unit or IOP section of the input/output controller, and that its source logical schematic diagram is illustrated in FIGURE 161.

The notation FAA1–FAA8: Reg, MIC; FIGURE 79 identifies eight signals originating in the eight flip-flops of the AA-register in the MIC section of the input-output controller and indicates that the input logical schematic diagrams of the AA-register flip-flops are provided in FIGURE 79.

The notation FPFG: FF, PUB; FIGURE 125 indicates that the FPFG signal is the 1-output signal of the PFG flip-flop of the PUB section. The PFG flip-flop input logical schematic diagram is provided in FIGURE 125.

The notation DJA0–DJA9: Log, MEM; FIGURE 38 identifies ten logical combination signals originating in the MEM section, the logical comibnation signal diagrams being illustrated in FIGURE 38.

The glossary and index of signals employ the following abbreviations and notations:

Add: Adder
FF: Flip-flop
OS: One-shot
Log: Logical elements for generating a logical combination signal
Sw: Switch
Reg: Register
MEM: Memory communications unit or MEM section
MEM (port *i*): Memory port *i* of the MEM section (where *i*=A, B, C or D)
MIC: Microprogram storage unit or MIC section
PUB: Peripheral channel unit or PUB section
PUB (channel *j*): Peripheral channel *j* of the PUB section (where *j*=A, B, C . . . R)
BUF: Buffer storage unit or BUF section
IOP: Processing and control unit or IOP section
CP: Control panel.

Buffer Storage Unit

Figure 36:
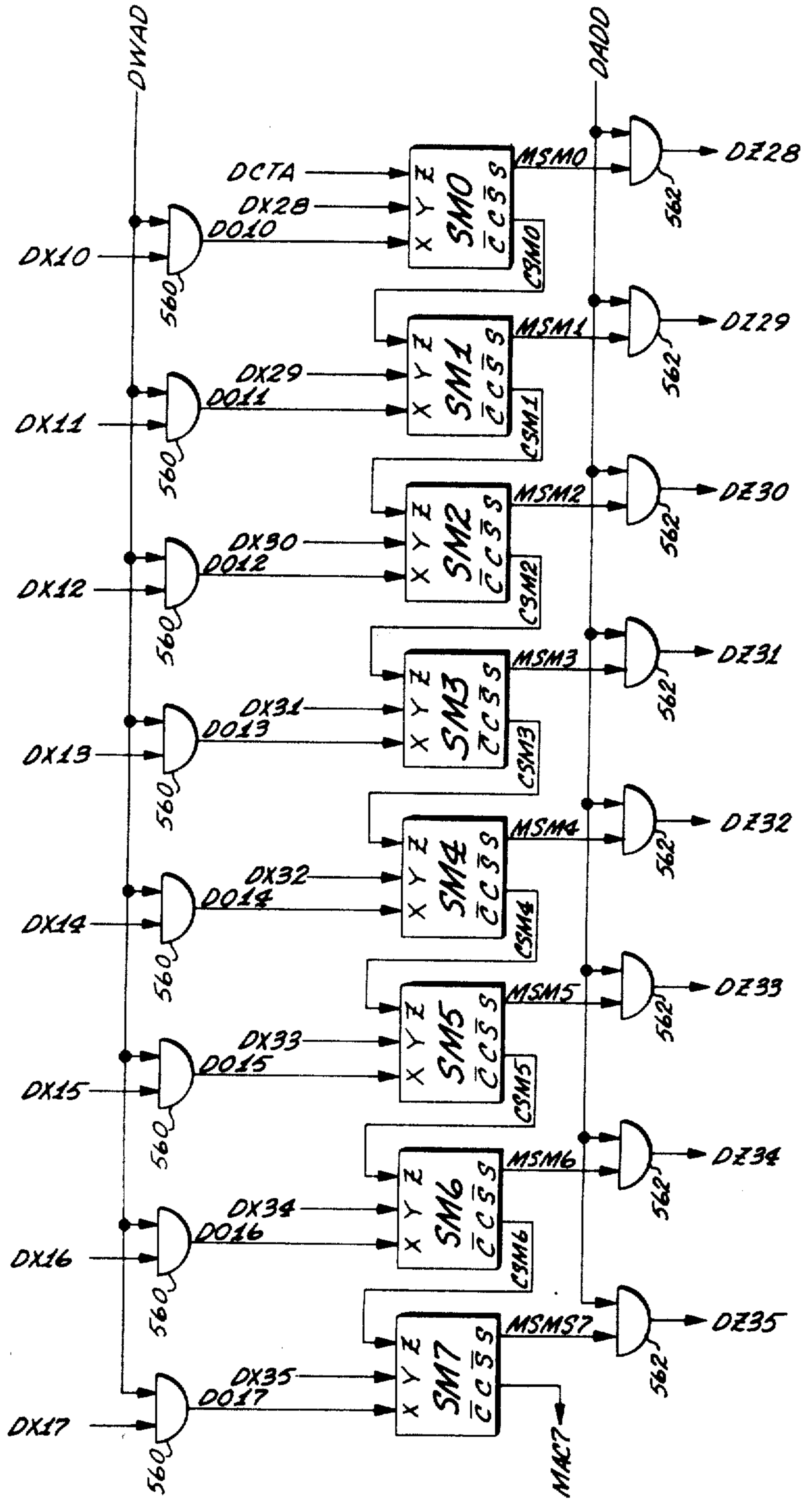
FIGURE 36 is a circuit diagram of the adder in the input/output processor of FIGURE 35.

CSM0–CSM6: Add, IOP; FIGURE 36. The carry output signals of the full adder circuits SM0–SM6 of the input/output processor adder.

DA00–DA07, DA10–DA17, DA20–DA27, DA30–DA37: Log, BUF; FIGURES 126 and 127. Internal signals generated in the buffer address decoder of the BUF section which control the generation of input and output gating signals for the twelve word buffer registers and the twenty character buffer registers of the buffer storage unit.

DD00–DD47: Log, BUF; FIGURES 132 and 133. Signals which issue when the corresponding flip-flops D00–D47 of the D-register are set to the 1-state; these signals are applied to signal gates of the processing and control unit for transmission to the Z-bus.

DDY1: Log, BUF; FIGURE 133. A signal which controls the issuance of signal DRRS.

DE00–DE47: Log, BUF; FIGURES 133 and 134. Signals which issue in the shift logic and which represent information from the TC-register or the D-register.

DK00–DK47: Log, BUF; FIGURES 127–129. Output signals of the shift logic which represent information to be stored in a predetermined one of the word buffer registers.

DL00–DL07: Log, BUF; FIGURE 130. Input data signals to the character buffer registers which represent information to be stored in a predetermined one of the character buffer registers.

DM00–DM07, DM10–DM17, DM20–DM27, DM30–DM37, DM40–DM45, DM50–DM55, DM60–DM65: Log, BUF; FIGURES 129–132. Input gating signals for gating information into the word and character buffer registers and into the control word buffer registers of the buffer storage unit.

DMEP: Log, BUF; FIGURE 134. A signal which gates the buffer register address signals to the buffer register input and output gates.

DMLT: Log, BUF; FIGURE 134. A signal which issues to gate information from the Y-bus to the TC-register.

DR00–DR07, DR10–DR17, DR20–DR27, DR30–DR37, DR40–DR45, DR50–DR55: Log, BUF; FIGURES 129–132. Gating signals which gate the information in the word and character buffer registers to the D-register and which gate the information in the control word buffer registers to the Y-bus.

DRDO: Log, BUF; FIGURE 134. A signal which issues to indicate transfer of information out of a word or character buffer register.

DRRS: Log, BUF; FIGURE 134. A signal which issues to reset the flip-flops of the D-register to the 0-state.

DRTC: Log, BUF; FIGURE 134. A signal which resets the flip-flops of the TC-register to the 0-state.

DSH0–DSH3: Log, BUF; FIGURE 134. Output signals of the buffer command decoder in the buffer storage unit which control the shift operation in the shift logic.

DSTC: Log, BUF; FIGURE 134. A signal which gates information into the TC-register of the buffer storage unit.

DTC0–DTC7: Log, BUF; FIGURE 134. Data signals generated by the data switch of the peripheral channel unit for application to the TC-register of the buffer storage unit.

DTMS: Log, BUF; FIGURE 134. A timing signal which controls timing of operations in the buffer storage unit.

DWRO: Log, BUF; FIGURE 134. A signal which issues to indicate transfer of information into a word or character buffer register.

FD00–FD47: Reg, BUF; FIGURES 140–142. The 1-output signals of the forty-eight flip-flops comprising the D-register of the buffer storage unit. This register stores information from the Y-bus of the processing and control unit and information transferred from the word and character buffer registers.

FG30–FG35, FG41, FG47: Reg, BUF; FIGURE 138. The 1-output signals of the eight flip-flops of the G-buffer register of each pair of character buffer registers. The G-buffer register associated with each of peripheral channels G–R stores information being transferred between the corresponding peripheral subsystem and a memory.

FH30–FH35, FH41, FH47: Reg, BUF; FIGURE 138. The 1-output signals of the eight flip-flops comprising the H-buffer register of each pair of character buffer registers. The H-buffer register associated with each of peripheral channels G–R stores information being transferred between the corresponding peripheral subsystem and a memory.

FMTC: FF, BUF; FIGURE 135. The 1-output signal of a control flip-flop which, when set to the 1-state, inhibits the resetting of the TC-register flip-flops to the 0-state.

FP00–FP47: Reg, BUF; FIGURE 137. The 1-output signals of the forty-eight flip-flops comprising the P-buffer register of each pair of word buffer registers. The P-buffer register associated with each of the peripheral channels A–F stores information being transferred between the corresponding peripheral subsystem and a memory.

FQ00–FQ47: Reg, BUF; FIGURE 137. The 1-output signals of the forty-eight flip-flops comprising the Q-buffer register of each pair of word buffer registers. The Q-buffer register associated with each of peripheral channels A–F stores information being transferred between the corresponding peripheral subsystem and a memory.

FTC0–FTC7: Reg. BUF; FIGURES 134 and 135. The 1-output signals of the eight flip-flops comprising the TC-register of the buffer storage unit. The TC-register stores a data character which is to be transferred to a word or character buffer register.

FTF1–FTF5, FTRD, FTSH, FTWR: Reg. BUF; FIGURE 135. The 1-output signals of the eight flip-flops comprising the TF-register of the buffer storage unit. This register stores command and address information.

FW00–FW35: Reg. BUF; FIGURE 139. The 1-output signals of the thirty-six flip-flops comprising each of the six control word or W-buffer registers. The W-buffer register associated with each of peripheral channels A–F stores a mailbox word during predetermined operations of the input/output controller.

TDY1: OS, BUF; FIGURE 136. The 1-output signal of a control one-shot in the buffer storage unit. This one-shot, when in the 1-state, causes signal DRD0 to issue, inhibiting the generation of signal DRRS which resets the flip-flops of the D-register to the 0-state.

TDY3: OS, BUF; FIGURE 136. The 1-output signal of a control one-shot in the buffer storage unit. This one-shot, when in the 1-state, causes signal DRD0 to issue, indicating a read operation in the buffer storage unit.

TDY4: OS, BUF; FIGURE 136. The 1-output signal of a control one-shot in the buffer storage unit. This one-shot, when in the 1-state, causes signal DMEP to issue.

TDY5: OS, BUF; FIGURE 136. The 1-output signal of a control one-shot in the buffer storage unit. This one-shot, when in the 1-state, causes flip-flop MTC to be set to the 1-state.

TQDR: OS, BUF; FIGURE 136. The 1-output signal of a control one-shot in the buffer storage unit.

Processing and control unit

DO10–DO17: Log, IOP; FIGURES 153 and 154. Signals which represent the X-inputs to full adder circuits SM0–SM7 of the adder in the input/output processor of the processing and control unit.

DADD: Log, IOP; FIGURE 154. A signal which issues to gate the output of the adder in the input/output processor of the processing and control unit to the Z-bus.

DALJ: Log, IOP; FIGURE 154. A signal which issues when flip-flop FO7 of the F-register is set to the 1-state to cause a predetermined jump address to be generated, permitting the input/output controller to enter a connect routine.

DANR: Log, IOP; FIGURE 154. A signal which issues to indicate the absence of routine requests in the F-register.

DBNE: Log, IOP; FIGURE 154. A signal which issues when predetermined zone control information is present in the A-register of the processing and control unit.

DBUF: Log, IOP; FIGURE 154. A signal which issues to indicate a request for a data transfer between the processing and control unit and the buffer storage unit.

DCD1, DCD6–DCD9: Log, IOP; FIGURE 154. Signals which issue in response to the operation of predetermined N-control signals by the microprogram storage unit.

DCLR: Log, IOP, FIGURE 154. A signal which issues when either class control signal 5 or class control signal 4 is a binary 1.

DCM1: Log, IOP; FIGURE 154. A signal which issues when the IOC command in the primary mailbox word is 'continuous mode non-data transfer."

DCM4: Log, IOP; FIGURE 154. A signal which issues when the IOC command in the primary mailbox word is "write single character record."

DCM8: Log, IOP; FIGURE 154. A signal which issues when the IOC command in the primary mailbox word is "program load."

DCP0–DCP8: Log, IOP; FIGURES 154 and 155. Signals which issue in the magnitude comparator of the input/output processor in the processing and control unit to indicate predetermined relationships between input signals.

DCT1–DCT4: Log, IOP; FIGURE 155. Signals which represent the character count in the A-register of the processing and control unit.

DCTA: Log, IOP; FIGURE 155. A signal representing a carry which is applied to the Z-input of full adder circuit SMO in the adder of the input/output processor.

DCTB: Log, IOP; FIGURE 155. A signal representing a carry from the carry predictor of the input/output processor which is applied to the adder.

DCTC: Log, IOP; FIGURE 155. A signal representing a carry from the field containing bit positions 18–27 which is applied to the adder of the input/output processor.

DDE0: Log, IOP; FIGURE 155. A signal which issues during predetermined operations in the input/output controller to gate the output signals of the 0–5 decremeter to the Z-bus.

DDE1: Log, IOP; FIGURE 155. A signal which issues during a predetermined operation in the input/output controller to gate the output signals of the 6–11 decremeter to the Z-bus.

DDS0: Log, IOP; FIGURE 155. A signal which issues during a predetermined operation in the input/output controller to cause the input/output controller to jump to microstep 345.

DDS1: Log, IOP; FIGURE 155. A signal which issues during a predetermined operation in the input/output controller to cause the input/output controller to jump to microstep 347.

DDS2: Log, IOP; FIGURE 155. A signal which issues during a predetermined operation in the input/output controller to cause the input/output controller to jump to microstep 353.

DDS3: Log, IOP; FIGURE 155. A signal which issues during a predetermined operation in the input/output controller to cause the input/output controller to jump to microstep 403.

DDSJ: Log, IOP; FIGURE 155. A signal which issues when flip-flop F10 of the F-register is set to the 1-state in response to a data service routine request to cause a predetermined jump address to be generated in the input/output controller.

DDTS: Log, IOP; FIGURE 155. A signal which issues when flip-flops F06–F10 of the F-register are all reset to the 0-state, indicating that no routine requests have been received by the F-register.

DEMT: Log, IOP; FIGURE 155. A signal which issues in response to predetermined states of the memory timer flip-flops TM0–TM3.

DFC0: Log, IOP; FIGURE 155. A signal which issues in the 0–11 incrementer of the input/output processor to indicate that each of signals DX00–DX05 is a binary 1.

DFC2: Log, IOP; FIGURE 155. A signal which issues in a predetermined time in the 15–27 incrementer to indicate a count of five in a predetermined field.

DFC3: Log, IOP; FIGURE 155. A signal which issues in the 15–27 incrementer of the input/output processor to indicate that each of signals 15–21 is a binary 1.

DGC0–DGC2: Log, IOP; FIGURES 155 and 156. Signals which issue in the carry predictor of the input/output processor to predict a carry.

DGER: Log, IOP; FIGURE 156. A signal which issues in the processing and control unit to a gate an illegal action code from the Q-register to the ER-register.

DGNC: Log, IOP; FIGURE 156. The output signal of the carry predictor which indicates that a carry would be produced upon addition of the fields represented by signals DW01–DW09 and DW19–DW27.

DHG0–DHG2: Log, IOP; FIGURE 156. Signals which issue in the magnitude comparator of the input/output processor to indicate that the field represented by signals DW28–DW35 is greater than the field represented by signals DW01–DW08.

DHGL: Log, IOP; FIGURE 156. An output signal of the magnitude comparator which indicates that the field represented by signals DW28–DW35 is greater than the field represented by signals DW01–DW08.

DJA0–DJA9: Log, IOP; FIGURE 143. The output signals of the jump address encoder of the processing and control unit which represent the address of the microstep to which the input/output controller is to jump. This jump address is transmitted to the PC-register of the memory communications unit to effect generation of appropriate control signals in the microprogram storage unit.

DK32: Log, IOP; FIGURE 156. A signal representing the state of flip-flop K32 of the K-register.

DKC0–DKC7: Log, IOP; FIGURES 156 and 157. Signals representing the device address and the device command of flip-flops K18–K32 of the K-register. These signals are applied to the T-register of the peripheral channel unit for transmission to the appropriate peripheral channel.

DKD0–DKD5: Log, IOP; FIGURE 143. Internal signals generated in the control word buffer address decoder representing the peripheral channel number in flip-flops K02–K05 of the K-register.

DLG1–DLG7: Log, IOP; FIGURE 157. Signals representing particular combinations of signal inputs to the magnitude comparator of the input/output processor.

DLLR: Log, IOP; FIGURE 157. A signal which issues during predetermined operations in the input/output controller to cause information to be transferred to the flip-flops of the L-register.

DLTB: Log, IOP; FIGURE 157. A signal which issues when the word count of a data control word is reduced to zero.

DML1: Log, IOP; FIGURE 157. A signal employed to manually load data into predetermined registers.

DMLE: Log, IOP; FIGURE 157. A signal which issues at predetermined times to cause information to be transferred from the Y-bus to the flip-flops of the E-register.

DMSK: Log, IOP; FIGURE 157. A signal which issues when the action code of the secondary mailbox word #1 corresponding to a given channel is "no data transfer and proceed."

DMT2: Log, IOP; FIGURE 157. A signal which causes signal DSDR to issue, gating the contents of the D-register to the Z-bus.

DNC0–DNC3: Log, IOP; FIGURE 157. Signals which issue at predetermined times in the input/output controller to gate information to the C-bus.

DNMT: Log, IOP; FIGURE 157. A signal which causes signal DSDR to issue, gating the contents of the D-register to the Z-bus.

DPAO: Log, IOP, FIGURE 157. A signal which issues to gate information to the A-register.

DPA6: Log, IOP; FIGURE 157. A signal which issues during predetermined microsteps when A-register flip-flop A41 is reset to the 0-state.

DPG0–DPG9: Log, IOP; FIGURES 157 and 158. Signals which issue in response to predetermined process control signals.

DPGA: Log, IOP, FIGURE 158. A signal which issues in response to predetermined process control signals.

DPNO: Log, IOP; FIGURE 158. A signal which issues to gate the peripheral channel number from the Y-bus into the PN-register of the processing and control unit.

DRA0: Log, IOP; FIGURE 158. A signal which issues to gate the end data transfer bit and the character count from the Y-bus into the A-register.

DRA1: Log, IOP; FIGURE 158. A signal which issues in response to a predetermined receive control signal generated in the microprogram storage unit.

DRAS: Log, IOP; FIGURE 158. A signal which issues to reset L-register flip-flop L09 in the processing and control unit.

DRC0–DRC5: Log, IOP; FIGURE 158. Signals which issue to gate information from the Y-bus into the C-register of the processing and control unit.

DRCB: Log, IOP; FIGURE 158. A signal which issues in response to a predetermined receive control signal generated in the microprogram storage unit.

DRCH: Log, IOP; FIGURE 158. A signal which issues in response to a predetermined receive control signal generated by the microprogram storage unit, causing signal DRC5 to issue, gating information into the C-register.

DRCL: Log, IOP; FIGURE 158. A signal which issues in response to predetermined receive control signals generated by the microprogram storage unit.

DRCN: Log, IOP; FIGURE 158. A signal which resets flip-flops CNA and CNB in the memory communications unit to the 0-state.

DRCR: Log, IOP; FIGURE 158. A signal which issues in response to predetermined receive control signals generated in the microprogram storage unit to cause signals DRC0–DRC3 to issue, gating information into the C-register.

DREJ: Log, IOP; FIGURE 158. A signal which issues when one-shot REJ is in its unstable or 1-state.

DRER: Log, IOP; FIGURE 159. A signal which gates information from the Y-bus to flip-flops ER3–ER5 of the ER-register.

DRET: Log, IOP; FIGURE 159. A signal which issues when flip-flop F06 of the F-register is set to the 1-state, indicating that an interrupt or a connect routine request is set into one of flip-flops F07–F09, and flip-flop F10 is reset to the 0-state, indicating that a data service routine request has not been stored in the F-register.

DRFR: Log, IOP; FIGURE 159. A signal which issues at predetermined times to cause certain flip-flops of the F-register of the processing and control unit to be reset to the 0-state.

DRG0–DRG5: Log, IOP; FIGURE 159. Signals which issue at predetermined times to cause information to be gated from the Y-bus into the flip-flops of the G-register.

DRGH: Log, IOP; FIGURE 159. A signal which issues at predetermined times to cause signals DRG4 and DRG5 to issue, gating information from the Y-bus to flip-flops G18–G35 of the G-register.

DRGL: Log, IOP; FIGURE 159. A signal which issues at predetermined times to cause signals DRG0 and DRG1 to issue, gating information from the Y-bus to flip-flops G00–G13 of the G-register.

DRH0–DRH3: Log, IOP; FIGURE 159. Signals which issue at preedtermined times to cause information to be gated from the Y-bus and to the flip-flops of the H-register.

DRHH: Log, IOP; FIGURE 159. A signal which issues at predetermined times to cause signals DRH2 and DRH3 to issue, gating information from the Y-bus into flip-flops H18–H35 of the H-register.

DRHL: Log, IOP; FIGURE 159. A signal which issues at predetermined times to cause signals DRH0 and DRH1 to issue, gating information from the Y-bus into flip-flops H00–H17 of the H-register.

DRK0–DRK4: Log, IOP; FIGURE 159. Signals which issue at predetermined times to cause information to be gated from the Y-bus to the flip-flops of the K-register.

DRKH: Log, IOP; FIGURE 159. A signal which issues at predetermined times to cause signals DRK2–DRK4 to issue, gating information from the Y-bus into flip-flops K14–K34 of the K-register.

DRL0–DRL2: Log, IOP; FIGURE 159. Signals which issue at predetermined times to gate information from the Y-bus into the flip-flops of the L-register.

DRMK: Log, IOP; FIGURE 160. A signal which issues to cause flip-flop E11 of the E-register to be reset to the 0-state.

DRN0–DRN1: Log, IOP; FIGURE 160. Signals which indicate that the input signals to the 0–5 and 6–11 decrementers are binary 0's.

DRQR: Log, IOP; FIGURE 160. A signal which issues to reset the flip-flops of the Q-register to the 0-state.

DRSE: Log, IOP; FIGURE 160. A signal which issues to reset flip-flop E11 of the E-register to the 0-state.

DRSF: Log, IOP; FIGURE 160. A signal which issues to reset flip-flops F07–F10 of the F-register to the 0-state.

DRSK: Log, IOP; FIGURE 160. A signal which issues to reset flip-flops K32, K34 and K35 of the K-register to the 0-state.

DRU0–DRU4: Log, IOP; FIGURE 160. Signals which issue to gate information from the Y-bus into the flip-flops of the U-register.

DRUR: Log, IOP; FIGURE 160. A signal which causes signals DRU0, DRU1, DRU3 and DRU4 to issue, to gate information from the Y-bus to predetermined flip-flops of the U-register.

DSAB: Log, IOP; FIGURE 160. A signal which issues when one of flip-flops E06–E08 of the E-register is set to the 1-state.

DSBF: Log, IOP; FIGURE 160. A signal which issues to set flip-flop BUF to the 1-state.

DSDR: Log, IOP; FIGURE 160. A signal which gates information from the D-register of the buffer storage unit to the Z-bus of the processing and control unit.

DSEH: Log, IOP; FIGURE 160. A signal which gates information from the F-register to flip-flops E07–E11 of the E-register.

DSEJ: Log, IOP; FIGURE 160. A signal which issues in response to a peripheral channel service request to cause a program jump.

DSEL: Log, IOP; FIGURE 160. A signal which gates information from the F-register to flip-flops E01–E06 of the E-register.

DSJ0–DSJ2: Log, IOP; FIGURE 160. Signals which issue in response to predetermined conditions in the input/output controller to indicate that a program jump is required.

DSJA: Log, IOP; FIGURE 160. A signal which issues to cause a jump address to be gated into the PC- and BA-registers of the memory communications unit.

DSJF: Log, IOP; FIGURE 160. A signal which issues in response to a data service routine request or when mode flip-flop F06 is reset to the 0-state to cause a program jump.

DSKP: Log, IOP; FIGURE 160. A signal which issues when all class control signals are binary 0's to cause the input/output controller to perform a skip microstep.

DSMF: Log, IOP; FIGURE 160. A signal which issues when F-register flip-flop F07 is set to the 1-state in response to a connect signal or when flip-flops F08 or F09 are set to the 1-state in response to terminate or special interrupt routine requests respectively, to cause mode flip-flop F06 to be set to the 1-state.

DSNJ: Log, IOP; FIGURE 160. A signal which issues when flip-flop F09 of the F-register is set in response to a special interrupt routine request, when no data service routine request is present to cause the program to jump to the appropriate routine to service the special interrupt request.

DSPC: Log, IOP; FIGURE 160. A signal which issues in response to a data service routine request which causes the program count in the BA-register of the memory communications unit to be stored in the SP-register.

DSRQ: Log, IOP; FIGURE 161. A signal which gates information from the memory communications unit into the flip-flops of the Q-register.

DSSO: Log, IOP; FIGURE 161. A signal which causes information to be gated from the Y-bus to registers connected to the Y-bus.

DSTA: Log, IOP; FIGURE 161. A signal indicating that peripheral subsystem status is available in the K-register causing flip-flop STA to be set to the 1-state.

DSTK: Log, IOP; FIGURE 161. A signal which gates the peripheral channel number from the F-register to flip-flops K01–K05 of the K-register.

DSTM: Log, IOP; FIGURE 144. A signal which issues at predetermined times in response to predetermined conditions in the input/output controller to initiate performance of a microstep.

DSTR: Log, IOP; FIGURE 161. A signal which causes flip-flop PRN to change state.

DSWM: Log, IOP; FIGURE 144. A signal which causes a new address to be transferred to either the AA- or AB-register of the microprogram storage unit.

DTA1: Log, IOP; FIGURE 161. A signal which issues in response to transmit control signal DT57.

DTCC: Log, IOP; FIGURE 144. A signal which initiates operation of memory timer.

DTCH: Log, IOP; FIGURE 161. A signal which gates information from flip-flops C18–C35 of the C-register to the W-bus in the processing and control unit.

DTCL: Log, IOP; FIGURE 161. A signal which gates the output signals of flip-flops C00–C17 and C44–C46 of the C-register to the W-bus of the processing and control unit.

DTEK: Log, IOP; FIGURE 161. A signal which issues in response to a terminate interrupt routine request, a special interrupt routine request or a data service routine request to cause information to be transferred from the F-register to the E- and K-registers.

DTG0, DTG2–DTG5: Log, IOP; FIGURE 161. Signals which gate information from the G-register flip-flops to the W-bus of the processing and control unit.

DTH0, DTH1: Log, IOP; FIGURE 161. Signals which gate information from the H-register flip-flops to the W-bus of the processing and control unit.

DTK0–DTK2: Log, IOP; FIGURE 161. Signals which gate information from the K-register flip-flops to the W-bus of the processing and control unit.

DTKR: Log, IOP; FIGURE 161. A signal which gates bit 34 from the K-register to the W-bus if bit 34 is a binary 1 and which causes signal DTK2 to issue, gating bits 18–33 from the K-register to the W-bus, if bit 34 is a binary 0.

DTMC: Log, IOP; FIGURE 144. A signal which resets flip-flop TM1 of the memory timer counter to the 0-state.

DTMJ: Log, IOP; FIGURE 161. A signal which issues in response to entry of a terminate interrupt routine request in the F-register.

DTMR: Log, IOP; FIGURE 161. A signal which gates trigger signals to the input terminals of flip-flop TMR.

DTMS: Log, IOP; FIGURE 144. A signal which sets flip-flop TM1 of the memory timer counter to the 1-state.

DTPN: Log, IOP; FIGURE 161. A signal which gates information from the PN-register to the W-bus of the processing and control unit.

DTQ0, DTQ1: Log, IOP; FIGURES 161 and 162. Signals which gate information from flip-flops Q00–Q35 of the Q-register to the W-bus.

DTQA: Log, IOP; FIGURE 162. A signal which causes signals DTQ0 and DTQ1 to issue, gating information from the Q-register to the W-bus of the processing and control unit.

DTQH: Log, IOP; FIGURE 162. A signal which gates information from Q-register flip-flops Q37–Q39 to the W-bus of the processing and control unit.

DTS0: Log, IOP; FIGURE 144. A timing and control signal which issues when one-shot TS0 is in the 1-state.

DTS1: Log, IOP; FIGURE 144. A timing and control signal which issues when one-shot TS1 is in the 1-state.

DTSJ: Log, IOP; FIGURE 162. A signal which issues under predetermined conditions and at predetermined times to cause signal DSJ2 to issue, initiating a program jump.

DTTB: Log, IOP; FIGURE 162. A signal which issues in response to the transfer of information between the buffer storage unit and the processing and control unit.

DUSM: Log, IOP; FIGURE 162. A signal which issues in response to predetermined class and transmit control signals to cause bit positions 26–29 of an address transmitted to memory to be determined by the control block starting address assignment switches.

DW00–DW35, DW42–DW46: Log, IOP; FIGURES 145–148. Signals representing information on the W-bus of the processing and control unit.

DWAD: Log, IOP; FIGURE 162. A signal which gates signals DX10–DX17 to the X-inputs of full adder circuits SM0–SM7 of the adder.

DX00–DX35, DX42–DX47: Log, IOP; FIGURES 148–150. Signals representing information on the X-bus of the processing and control unit.

DY00–DY35, DY42–DY47: Log, IOP; FIGURES 150 and 151. Signals representing information on the Y-bus of the processing and control unit.

DYTB: Log, IOP; FIGURE 162. A signal which causes information to be transferred from the D-register of the buffer storage unit to the Z-bus of the processing and control unit.

DZ00–DZ35, DZ42–DZ47: Log, IOP; FIGURES 151–153. Signals representing information on the Z-bus of the processing and control unit.

DZE5: Log, IOP; FIGURE 162. A signal which issues when the character count represented by bits 15–17 on the X-bus is five.

DZN0: Log, IOP; FIGURE 162. A signal which issues when the zone control information represented in flip-flops A42–A44 of the A-register is not equal to zero.

DZP0–DZP5, DZP7: Log, IOP; FIGURE 162. Signals which gate information from the X-bus to the Z-bus of the processing and control unit.

FA39–FA46: Reg, IOP; FIGURE 163. The 1-output signals of the eight flip-flops comprising the A-register of the processing and control unit. This register stores, during various operations in the input/output controller, zone, read/write and action code information from secondary mailbox word #1, the IOC command from the primary mailbox word and character count and end data transfer information.

FBFA: FF, IOP; FIGURE 177. The 1-output signal of a control flip-flop which, when set to the 1-state, indicates that a data transfer between the processing and control unit and the buffer storage unit is in progress.

FBUF: FF, IOP, FIGURE 177. The 1-output signal of a control flip-flop which, when set to the 1-state, informs the buffer storage unit that the processing and control unit is ready for a data transfer.

FC00–FC35, FC44–FC46: Reg, IOP; FIGURES 163–165. The 1-output signals of the thirty-nine flip-flops comprising the C-register of the processing and control unit. This register serves as a working register, providing temporary storage for information in the processing and control unit.

FDSP: FF, IOP; FIGURE 178. The 1-output signal of a control flip-flop which is set to the 1-state when flip-flop F10 of the F-register is set, indicating receipt of a data service routine request.

FE01–FE11: Reg, IOP; FIGURE 165. The 1-output signals of the eleven flip-flops comprising the E-register of the processing and control unit. This register stores command information for transmission from the processing and control unit to the peripheral channel unit of the input/output controller.

FER0–FER5: Reg, IOP; FIGURES 165 and 166. The 1-output signals of the six-flip-flops comprising the ER-register of the processing and control unit. This register stores the IOC and memory error codes in the processing and control unit.

FF01–FF11: Reg, IOP; FIGURE 166. The 1-output signals of the eleven flip-flops comprising the F-register of the processing and control unit. This register serves as the central control and interrupt register of the processing and control unit and stores interrupt and peripheral channel service requests as well as the connect signal from memory.

FG00–FG35: Reg, IOP; FIGURES 166–168. The 1-output signals of the thirty-six flip-flops comprising the G-register of the processing and control unit. This register is a working register which temporarily stores information in the processing and control unit.

FH00–FH35: Reg, IOP; FIGURES 168 and 169. The 1-output signals of the thirty-six flip-flops comprising the H-register of the processing and control unit. This register is a working register providing temporary storage for information in the processing and control unit.

FJMT: FF, IOP; FIGURE 178. The 1-output signal of a control flip-flop which is set to the 1-state when a program address jump is required in the PC-register of the memory communications unit.

FK01–FK05, FK14, FK15, FK18–FK35: Reg, IOP; FIGURES 170–172. The 1-output signals of the flip-flops comprising the K-register of the processing and control unit. This register stores control information for controlling the operation of the input/output controller.

FL09–FL35: Reg, IOP; FIGURES 172 and 173. The 1-output signals of the flip-flops comprising the L-register of the processing and control unit. This register stores address and command information for memory.

FMRF: FF, IOP; FIGURE 178. The 1-output signal of a control flip-flop which, when set to the 1-state, causes the Q-register to be cleared.

FPN2–FPN5: Reg, IOP; FIGURE 173. The 1-output signals of the four flip-flops comprising the PN-register of the processing and control unit. This register stores the peripheral channel number during operations in the input/output controller.

FPTM: FF, IOP; FIGURE 178. The 1-output signal of a control flip-flop which, when reset to the 0-state, causes the memory timer counter flip-flops to be reset.

FQ00–FQ40: Reg, IOP; FIGURES 173–175. The 1-output signals of the forty-one flip-flops comprising the Q-register of the processing and control unit. This register serves as the input register for receiving information transferred from memory to the input/output controller.

FRLF: FF, IOP; FIGURE 178. The 1-output signal of a control flip-flop which is reset to the 0-state when lockout flip-flop F11 of the F-register is set to the 1-state.

FSMF: FF, IOP; FIGURE 178. The 1-output signal of a control flip-flop which, when set to the 1-state, causes mode flip-flop F06 of the F-register to be set to the 1-state.

FSTA: FF, IOP; FIGURE 178. The 1-output signal of a control flip-flop which, when set to the 1-state, indicates that status information relating to a peripheral subsystem is available to the input/output controller.

FTM0–FTM3: Reg, IOP; FIGURE 177. The 1-output signals of the flip-flops comprising the memory timer counter of the processing and control unit.

FTMR: FF, IOP, FIGURE 178. The 1-output signal of a control flip-flop which allows restoring of microstep execution after an information transfer between a memory and the input/output controller.

FU00–FU35: Reg, IOP; FIGURES 175–177. The 1-output signals of the thirty-six flip-flops comprising the U-register of the processing and control unit. This register serves as the output register for information to be transferred from the input/output controller to memory.

FUSM: FF, IOP; FIGURE 178. The 1-output signal of a control flip-flop which is set to the 1-state when bit positions 26–29 of an address being transmitted to memory are to be controlled by the control block starting address assignment switches of the memory communications unit.

MSM0–MSM7: Add, IOP; FIGURE 36. The sum output signals of the full adder circuits SM0–SM7 respectively.

MAC7: Add, IOP; FIGURE 36. The carry output signal of full adder circuit SM7 of the input/output processor adder.

QPFG: Log, IOP; FIGURE 144. A clock signal which is employed to transfer routine requests into the F-register.

QPH2: Log, IOP; FIGURE 144. A clock signal which is used to control the memory counter in the processing and control unit.

QSTC: Log, IOP; FIGURE 144. A clock signal which is used to transfer information from the peripheral channel unit to the K-register.

QTCC: Log, IOP; FIGURE 144. A clock signal which is used to control the memory time-out counter.

TFT0: OS, IOP; FIGURE 178. The 1-output signal of a control one-shot in the processing and control unit. This one-shot assumes the 1-state when reset lockout flip-flop F11 of the F-register is reset to the 0-state.

TFT1: OS, IOP; FIGURE 178. The 1-output signal of a control one-shot in the processing and control unit. This one-shot assumes the 1-state in response to signal TFT0.

TFT2: OS, IOP; FIGURE 178. The 1-output signal of a control one-shot in the processing and control unit. This one-shot assumes the 1-state in response to signal TFT0.

TFT3: OS, IOP; FIGURE 178. The 1-output signal of a control one-shot of the processing and control unit which assumes the 1-state in response to signal TFT2.

TJST: OS, IOP; FIGURE 178. The 1-output signal of a control one-shot of the processing and control unit which restores the execution of microsteps after a jump operation.

TREJ: OS, IOP; FIGURE 178. The 1-output signal of a control one-shot of the processing and control unit which, when set to the 1-state, causes one-shot JST to be set to the 1-state.

TSMR: OS, IOP; FIGURE 179. The 1-output signal of a control one-shot of the processing and control unit which issues when the memory counter has indicated an over-count.

TSSD: OS, IOP; FIGURE 179. The 1-output signal of a control one-shot in the processing and control unit which issues in response to predetermined process control signals.

TTB0, TTB1: OS, IOP; FIGURE 179. The 1-output signals of control one-shots in the processing and control unit which are used to restart execution of microsteps when a memory or buffer cycle is completed.

TTS0–TTS6: OS, IOP; FIGURE 179. The 1-output signals of control one-shots of the processing and control unit which restart the microflow after each microstep.

TTSA: OS, IOP; FIGURE 179. The 1-output signal of a control one-shot of the processing and control unit.

TTSB: OS, IOP; FIGURE 179. The 1-output signal of a control one-shot of the processing and control unit which updates the program counter.

TTSM: OS, IOP; FIGURE 179. The 1-output signal of a control one-shot of the processing and control unit which is employed to step the microflow.

Memory communications unit

DADR: Log, MEM; FIGURE 46. A synchronizing signal used for system testing.

DAS2: Log, MEM; FIGURE 46. A signal which issues when an illegal action code available signal is transmitted by the memories connected to either memory port A or memory port B of the memory communications unit.

DAS4: Log, MEM; FIGURE 46. A signal which issues when an illegal action code available signal is transmitted by the memories connected to either memory port C or memory port D of the memory communications unit.

DAZ0–DAZ5: Log, MEM; FIGURE 38. Signals provided by logic gates in the memory communications unit to control the transfer of a single character of an information word provided by memory through the information signal receivers and logic of memory port A of the memory communications unit.

DBA2–DBA9: Log, MEM; FIGURES 46 and 47. Signals which issue in response to predetermined information in the BA-register of the memory communications unit. These signals are employed to update the program count in the PC-register of the memory communications unit.

DBC4: Log, MEM; FIGURE 47. A signal which issues when flip-flops BA1–BA4 of the BA-register are set to the 1-state.

DBT0–DBT5: Log, MEM: FIGURE 47. Signals which issued during transfer of a single character from the input/output controller to memory to place the single character in each character position of the transmitted word represented by signals RΔ00–RΔ35, where Δ equals A, B, C, or D.

DBTP: Log, MEM; FIGURE 47. A signal which gates information from the BA-register to the PC-register of the memory communications unit.

DBZ0–DBZ5: Log, MEM; FIGURE 38. Signals provided by logic gates in the memory communications unit to control transfer of a single character of an information word provided by memory through the information signal receivers and logic of memory port B of the memory communications unit.

DCNT: Log, MEM; FIGURE 47. A signal which issues when either of flip-flops CNA or CNB are set to the 1-state in response to a connect signal from memory.

DCSA, DCSB, DCSC, DCSD: Sw, MEM; FIGURE 47. Signals generated by the control memory selection switch of the memory communications unit, one of which issues to specify the control memory.

DCZ0–DCZ5: Log, MEM; FIGURE 38. Signals provided by logic gates in the memory communications unit to control the transfer of a single character of an information word provided by memory through the information signal receivers and logic of memory port C of the memory communications unit.

DDSA: Log, MEM; FIGURE 47. A signal which issues in response to receipt of the data available/stored signal by one of memory ports A, B or C of the memory communications unit.

DDSB: Log, MEM; FIGURE 47. A signal which issues in response to receipt of the data available/stored signal by memory port D of the memory communications unit.

DDSC: Log, MEM; FIGURE 47. A signal which issues in response to either signal DDSA or DDSB to cause flip-flop Q36 of the Q-register in the processing and control unit to be set to the 1-state.

DDZ0–DDZ5: Log, MEM; FIGURE 38. Signals provided by logic gates in the memory communications unit to control the transfer of a single character of an information word provided by memory through the information signal receivers and logic of memory port D of the memory communications unit.

DFLA–DFLF: Log, MEM; FIGURES 47 and 48. Signals representing the six bits of a single character transferred from memory to the input/output controller. These signals are employed to place the character in flip-flops Q00–Q05 of the Q-register.

DJA0–DJA9: Log, MEM; FIGURE 38. Signals representing information on the JA-bus of the memory communications unit.

DL09: Log, MEM; FIGURE 48. A signal which issues when flip-flop L09 of the L-register is set to the 1-state to cause a memory access interrupt request signal to be transmitted to memory through one of the memory ports.

DL26–DL29: Log, MEM; FIGURE 48. Signals representing bit positions 26–29 of an address transmitted to memory. These signals represent either the contents of flip-flops L26–L29 of the L-register or, during certain operations in the input/output controller, the settings of the control block starting address assignment switches.

DL33–DL35: Log, MEM; FIGURE 48. Signals representing the contents of flip-flops L33–L35 of the L-register.

DLBA: Log, MEM; FIGURE 48. A signal which gates information from the JA-bus to the BA-register of the memory communications unit.

DLPC: Log, MEM; FIGURE 48. A signal which gates information from the JA-bus to the PC-register of the memory communications unit.

DLPP: Log, MEM; FIGURE 48. A signal which permits the employment of address switches on the control panel to load the JA-bus.

DM00–DM35, DM37–DM39: Log, MEM; FIGURES 44 and 45. Signals representing information and illegal action code signals received through each of the four memory ports. The signals are transmitted to the Q-register of the processing and control unit.

DMAA: Log, MEM; FIGURE 48. A signal which gates an even microstep address from the PC-register to the AA-register of the microprogram storage unit and causes switch flip-flops SW1–SW8 to be set to the 1-state, gating the control signals corresponding to the odd address in the AB-register to the control signal bus.

DMAB: Log, MEM; FIGURE 48. A signal which gates an odd microstep address from the PC-register to the AB-register of the microprogram storage unit and causes switch flip-flops SW1–SW8 to be reset to the 0-state, gating the control signals corresponding to the even address in the AA-register to the control signal bus.

DMLT: Log, MEM; FIGURE 48. A signal originating in the control panel which enables transfer of information from control panel switches to the T-register.

DPET: Log, MEM; FIGURE 48. A signal which indicates that the address in the program counter is not equal to the address set in switches on the control panel.

DPRV: Log, MEM; FIGURE 48. A signal which prevents decoding of an address in the PC-register.

DPSA: Log, MEM; FIGURE 39. A signal generated by the port address assignment switches when the memory address in the L-register falls within the range of memory addresses contained in the memory connected to memory port A. This signal permits the illegal action code to be received from and the memory access interrupt request signal to be transmitted to the memory connected to memory port A, and also causes appropriate zone control information to be generated for application to the information signal receivers and logic of memory port A.

DPSB: Log, MEM; FIGURE 39. A signal generated by the port address assignment switches when the memory address in the L-register falls within the range of memory addresses in the memory connected to memory port B. The functions of this signal with regard to memory port B are the same as those described for signal DPSA relating to memory port A.

DPSC: Log, MEM; FIGURE 39. A signal generated by the port address assignment switches when the memory address in the L-register falls within the range of memory addresses in the memory connected to memory port C. The functions of this signal with respect to memory port C are the same as those described for signal DPSA relating to memory port A.

DPSD: Log, MEM; FIGURE 39. A signal generated by the port address assignment switches when the memory address in the L-register falls within the range of memory addresses in the memory connected to memory port D. The function of this signal with respect to memory port D is the same as those described for signal DPSA relating to memory port A.

DQRE: Log, MEM; FIGURE 48. A signal which issues in response to the receipt of an illegal action code available action signal in one of the memory ports to cause flip-flop Q40 of the Q-register to be set to the 1-state.

DRAS: Log, MEM; FIGURE 48. A signal which issues when a memory access interrupt request is transmitted to a memory.

DRES: Log, MEM; FIGURE 48. A general reset signal which originates in the control panel.

DSQR: Log, MEM; FIGURE 49. A signal which issues in response to receipt of a data available/stored signal by one of the memory ports to set flip-flop Q36 of the Q-register to the 1-state.

DSTP: Log, MEM, FIGURE 49. A signal which resets flip-flop RUN to the 0-state.

DU00–DU35: Log, MEM; FIGURE 39. Signals representing an information word or one information character being transmitted from the U-register to the information signal transmitters of the memory ports.

DUPD: Log, MEM; FIGURE 49. A signal which causes the program count in the PC-register to be updated in the BA-register.

DZ00–DZ05: Log, MEM; FIGURE 49. Signals which issue in response to zone information in flip-flops L15–L17 of the L-register to control transfer of a character between the input/output controller and memory.

DZC0–DZC5: Log, MEM; FIGURE 49. Zone control signals which are applied to zone control signal transmitters of each memory port to provide zone signals to the respective memories.

FBA0–FBA9: Reg, MEM; FIGURES 49 and 50. The 1-output signals of the flip-flops comprising the BA-register of the memory communications unit. This register serves to update the program count in the PC-register.

FCLP: FF, MEM; FIGURE 51. The 1-output signal of a control flip-flop which is set to the 1-state when the address in the PC-register equals the address in switches on the control panel.

FCNA: FF, MEM; FIGURE 51. The 1-output signal of control flip-flop of the memory communications unit which is set to the 1-state in response to receipt of a connect signal by memory port A or memory port B.

FCNB: FF, MEM; FIGURE 52. The 1-output signal of a control flip-flop of the memory communications unit which is set to the 1-state in response to receipt of a connect signal by memory port C or memory port D.

FJMP: FF, MEM; FIGURE 52. The 1-output signal of a control flip-flop of the memory communications unit which is set to the 1-state when a program jump in the microprogram storage unit is to be effected.

FPC0–FPC9: Reg, MEM; FIGURES 50 and 51. The 1-output signals of the flip-flops comprising the PC-register of the memory communications unit. This register provides microstep addresses employed by the microprogram storage unit to generate control signals.

FPRN: FF, MEM; FIGURE 52. The 1-output signal of a control flip-flop which, when set to the 1-state, causes run flip-flop RUN to be set.

FRST: FF, MEM; FIGURE 52. The 1-output signal of a control flip-flop which, when set to the 1-state, prevents decode of program counter address while the counter is being updated.

FRUN: FF, MEM; FIGURE 52. The 1-output signal of a control flip-flop which is set to the 1-state to place the input/output controller in "run" status.

FSP0–FSP9: Reg, MEM; FIGURE 51. The 1-output signals of the flip-flops comprising the SP-register of the memory communications unit. This register stores the next microstep address during a program jump.

RA00–RA35: Log, MEM (Port A); FIGURE 40. Information signals transmitted from port A of the memory communications unit to the associated memory.

RAAS: Log, MEM (Port A); FIGURE 46. The signal generated by the illegal action signal receiver of port A in response to receipt of an illegal action code available signal from the associated memory.

RACA–RACD: Log, MEM (Port A); FIGURE 43. The command signals transmitted from port A to the associated memory.

RACS: Log, MEM (Port A); FIGURE 46. A signal generated by the connect signal receiver of port A in response to receipt of a connect signal from its associated memory.

RADS: Log, MEM (Port A); FIGURE 46. A signal generated by the data available/stored signal receiver of port A in response to receipt of the data available/stored signal from the associated memory.

RAL1: Log, MEM (Port A); FIGURE 43. One of the eight zone signals transmitted from the zone control signal transmitters of port A to the associated memory.

RAL4: Log, MEM (Port A); FIGURE 43. One of the eight zone signals transmitted from the zone control signal transmitters of port A to the associated memory.

RAL9: Log, MEM (Port A); FIGURE 44. The memory access interrupt request signal transmitted from the memory access interrupt request signal transmitter and logic of port A of the memory communications unit to the associated memory.

RALA–RALT: Log, MEM (Port A); FIGURE 42. Address signals transmitted from the address signal transmitters of port A to the associated memory.

RAPR: Log, MEM (Port A); FIGURE 43. The protect signal transmitted from the protect signal transmitter of port A to the associated memory. This signal is always a binary 1.

RAZ0–RAZ5: Log, MEM (Port A); FIGURE 43. Six of the eight zone signals transmitted from the zone control signal transmitters of port A to the associated memory.

RB00–RB35: Log, MEM (Port B); FIGURE 40. Information signals transmitted from port B of the memory communications unit to the associated memory.

RBAS: Log, MEM (Port B); FIGURE 46. The signal generated by the illegal action signal receiver of port B in response to receipt of an illegal action code available signal from the associated memory.

RBCA–RBCD: Log, MEM (Port B); FIGURE 43. The command signals transmitted from port B to the associated memory.

RBCS: Log, MEM (Port B); FIGURE 46. A signal generated by the connect signal receiver of port B in response to receipt of a connect signal from its associated memory.

RBDS: Log, MEM (Port B); FIGURE 46. A signal generated by the data available/stored signal receiver of port A in response to receipt of the data available/stored signal from the associated memory.

RBL1: Log, MEM (Port B); FIGURE 43. One of the eight zone signals transmitted from the zone control signal transmitters of port B to the associated memory.

RBL4: Log, MEM (Port B); FIGURE 43. One of the eight zone signals transmitted from the zone control signal transmitters of port B to the associated memory.

RBL9: Log, MEM (Port B); FIGURE 44. The memory access interrupt request signal transmitted from the memory access interrupt request signal transmitter and logic of port B of the memory communications unit to the associated memory.

RBLA–RBLT: Log, MEM (Port B); FIGURE 42. Address signals transmitted from the address signal transmitters of port B to the associated memory.

RBPR: Log, MEM (Port B); FIGURE 43. The protect signal transmitted from the protect signal transmitter of port B to the associated memory. This signal is always a binary 1.

RBZ0–RBZ5: Log, MEM (Port B); FIGURE 43. Six of the eight zone signals is transmitted from the zone control signal transmitters of port B to the associated memory.

RC00–RC35: Log, MEM (Port C); FIGURE 41. Information signals transmitted from port C of the memory communications unit to the associated memory.

RCAS: Log, MEM (Port C); FIGURE 46. The signal generated by the illegal action signal receiver of port C in response to receipt of an illegal action code available signal from the associated memory.

RCCA–RCCD: Log, MEM (Port C); FIGURE 43. The command signals transmitted from port C to the associated memory.

RCCS: Log, MEM (Port C): FIGURE 46. A signal generated by the connect signal receiver of port C in response to receipt of a connect signal from its associated memory.

RCDS: Log, MEM (Port C); FIGURE 46. A signal generated by the data available/stored signal receiver of port C in response to receipt of the data available/stored signal from the associated memory.

RCL1: Log MEM (Port C); FIGURE 43. One of the eight zone signals transmitted from the zone control signal transmitters of port C to the associated memory.

RCL4: Log, MEM (Port C); FIGURE 43. One of the eight zone signals transmitted from the zone control signal transmitters of port C to the associated memory.

RCL9: Log, MEM (Port C); FIGURE 44. The memory access interrupt request signal transmitted from the memory access interrupt request signal transmitter and logic of port C of the memory communications unit to the associated memory.

RCLA–RCLT: Log, MEM (Port C); FIGURE 42. Address signals transmitted from the address signal transmitters of port C to the associated memory.

RCPR: Log, MEM (Port C); FIGURE 43. The protect signal transmitted from the protect signal transmitter of port C to the associated memory. This signal is always a binary 1.

RCZ0–RCZ5: Log, MEM (Port C); FIGURE 43. Six of the eight zone signals transmitted from the zone control signal transmitters of port C to the associated memory.

RD00–RD35: Log, MEM (Port D); FIGURE 41. Information signals transmitted from port D of the memory communications unit to the associated memory.

RDAS: Log, MEM (Port D); FIGURE 46. The signal generated by the illegal action signal receiver of port D in response to receipt of an illegal action code available signal from the associated memory.

RDCA–RDCD: Log, MEM (Port D); FIGURE 43. The command signals transmitted from port D to the associated memory.

RDCS: Log, MEM (Port D); FIGURE 46. A signal generated by the connect signal receiver of port D in response to receipt of a connect signal from its associated memory.

RDDS: Log, MEM (Port D); FIGURE 46. A signal generated by the data available/stored signal receiver of port D in response to receipt of the data available/stored signal from the associated memory.

RDL 1: Log, MEM (Port D); FIGURE 43. One of the eight zone signals transmitted from the zone control signal transmitters of port D to the associated memory.

RDL4: Log, MEM (Port D); FIGURE 43. One of the eight zone signals transmitted from the zone control signal transmitters of port D to the associated memory.

RDL9: Log, MEM (Port D); FIGURE 44. The memory access interrupt request signal transmitted from the memory access interrupt request signal transmitter and logic of port D of the memory communications unit to the associated memory.

RDLA–RDLT: Log, MEM (Port D); FIGURE 42. Address signals transmitted from the address signal transmitters of port D to the associated memory.

RDPR: Log, MEM (Port D); FIGURE 43. The protect signal transmitted from the protect signal transmitter of port D to the associated memory. This signal is always a binary 1.

RDZ0–RDZ5: Log, MEM (Port D); FIGURE 43. Six of the eight zone signals transmitted from the zone control signal transmitters of port A to the associated memory.

TAAS: OS, MEM (Port A); FIGURE 52. The 1-output signal of a control one-shot in the memory communications unit which, when in the 1-state, indicates receipt of an illegal action code available signal from the memory connected to port A.

TADS: OS, MEM (Port A); FIGURE 52. The 1-output signal of a control one-shot in the memory communications unit which, when set to the 1-state, indicates receipt of the data available/stored signal from the memory connected to port A.

TBAS: OS, MEM (Port B); FIGURE 52. The 1-output signal of a control one-shot in the memory communications unit which, when in the 1-state, indicates receipt of the illegal action code available signal from the memory connected to port B.

TBDS: OS, MEM (Port B): FIGURE 52. The 1-output signal of a control one-shot in the memory communications unit which, when in the 1-state, indicates receipt of the data available/stored signal from the memory connected to port B.

TCAS: OS, MEM (Port C); FIGURE 52. The 1-output signal of a control one-shot in the memory communications unit which, when in the 1-state, indicates receipt of the illegal action code available signal from the memory connected to port C.

TCDS: OS, MEM (Port C); FIGURE 52. The 1-output signal of a control one-shot in the memory communications unit which, when in the 1-state, indicates receipt of the data available/stored signal from the memory connected to port C.

TDAS: OS, MEM (Port D); FIGURE 52. The 1-output signal of a control one-shot in the memory communications unit which, when in the 1-state, indicates receipt of the illegal action code available signal from the memory connected to port D.

Figure 22:
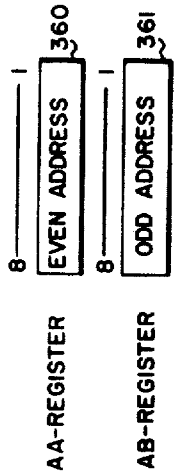
FIGURE 22 is a symbolic diagram illustrating the contents of the registers in the microprogram storage unit of FIGURE 16*b*.

TDDS: OS, MEM (Port D); FIGURE 22. The 1-output signal of a control one-shot which, when in the 1-state, indicates receipt of the data available/stored signal from the memory connected to port D.

TL09: OS, MEM; FIGURE 52. The 1-output signal of a control one-shot which indicates that flip-flop L09 of the L-register is set to the 1-state. This signal causes the memory access interrupt request signal to be transmitted from one of the memory ports to its associated memory.

TRAS: OS, MEM; FIGURE 52. The 1-output signal of a control one-shot which assumes the 1-state in response to signal TL09.

Microprogram storage unit

D000–D777: Log, MIC; FIGURES 53–63. Signals representing the decoded addresses in the AA- and AB-registers. Each of these signals identifies a microstep performed by the input/output controller in response to a predetermined address in either the AA-register or the AB-register.

DC00–DC15: Log, MIC; FIGURES 64 and 65. Output signals of an intermediate decoder representing the contents of flip-flops AA5–AA8 of the AA-register. These signals are employed to generate predetermined ones of the microstep signals D000–D777.

DCL1–DCL6: Log, MIC; FIGURE 67. Class control signals which cause predetermined operations to be performed in the input/output controller. These signals are generated in response to certain of the microstep signals D000–D777.

DCLA–DCLM: Log, MIC; FIGURES 77 and 78. Signals which issue in response to predetermined microstep identification signals which cause clas control signal DCL6 to issue.

DD00–DD15: Log, MIC; FIGURES 63 and 64. Signals generated by an intermediate decoder representing the contents of flip-flops AA1–AA4 of the AA-register. These signals are employed to generate predetermined ones of the microstep identification signals D000–D777.

DE00–DE15: Log, MIC; FIGURE 66. Signals generated by an intermediate decoder which represent the contents of flip-flops AB5–AB8 of the AB-register. These signals are employed to generate predetermined ones of the microstep identification signals D000–D777.

DF00–DF15: Log, MIC; FIGURE 65. Signals generated by an intermediate decoder which represent the contents of flip-flops AB1–AB4 of the AB-register. These signals are employed to generate predetermined ones of the microstep identification signals D000–D777.

DN10, DN12–DN25: Log, MIC; FIGURES 68–71. N-control signals generated in response to predetermined microstep identification signals which control predetermined operations in the input/output controller.

DP01–DP03, DP05–DP07, DP10–DP17, DP20–DP27, DP30–DP33: Log, MIC; FIGURES 72 and 73. Process control signals generated in response to predetermined microstep identification signals. These signals cause predetermined operations to occur in the input/output controller.

DPVA: Log, MIC; FIGURE 78. A signal which inhibits decoding of the contents of the AA-register.

DPVB: Log, MIC; FIGURE 78. A signal which inhibits decoding of the contents of the AB-register.

DR01–DR07, DR11–DR14, DR16, DR17, DR20–DR25: Log, MIC; FIGURES 73 and 74. Receive control signals which cause predetermined operations to occur in the input/output controller. These signals are generated in response to certain of the microstep identification signals D000–D777.

DT01–DT07, DT10–DT17, DT23–DT27, DT30–DT37, DT40, DT42–DT44, DT50–DT52, DT55–DT57, DT61–DT67, DT70–DT73: Log, MIC; FIGURES 74–77. Transmit control signals which cause predetermined operations to occur in the input/output controller. These signals are generated in response to certain of the microstep identification signals D000–D777.

FAA1–FAA8: Reg, MIC; FIGURE 79. The 1-output signals of the flip-flops comprising the AA-register of the microprogram storage unit. This register stores even address transmitted from the PC-register for decoding and encoding in the microprogram storage unit.

FAB1–FAB8: Reg, MIC; FIGURE 79. The 1-output signals ofthe flip-flops comprising the AB-register of the microprogram storage unit. This register stores odd addresses transmitted from the PC-register for decoding and encoding in the microprogram storage unit.

FSW0–FSW8: FF, MIC, FIGURE 80. The 1-output signals of the switch flip-flops which, when in the 1-state, gate the control signals corresponding to the odd address in the AB-register to the control signal bus and, when in the 0-state, gate the control signals corresponding to the even address in the AA-register to the control signal bus.

Peripheral channel unit

D120–D123, D130–D133, D140–D143, D150–D153: Log, PUB; FIGURES 81 and 82. Signals representing major status information from peripheral subsystems A–R.

DA10–DA13: Log, PUB; FIGURE 82. Signals representing the buffer count information contained in flip-flops AA1–RA1.

DAAD–DRAD: Log, PUB (Channels A–R); FIGURE 83. Signals which cause flip-flops AD0, AD1–RD0, RD1 respectively to be reset to the 0-state.

DAAL–DRAL: Log, PUB (Channels A–R); FIGURE 113. Signals which cause the I/O signal to be transmitted from peripheral channels A–R respectively to their associated peripheral subsystems.

DAC0, DAC1: Log, PUB; FIGURE 115. Signals which represent the contents of buffer address flip-flop AM1.

DACH–DRCH: Log, PUB (Channels A–R); FIGURE 88. Signals, one of which issues in response to a peripheral channel service request from its corresponding channel to indicate that the channel has been granted priority.

DAD1: Log, PUB; FIGURE 115. A signal which indicates which of the pair of buffer registers associated with a peripheral channel is being used.

DAD4, DAD5: Log, PUB; FIGURE 115. Buffer register address information bits transmitted from the peripheral channel unit to the buffer storage unit.

DADA–DRDA: Log, PUB (Channels A–R); FIGURE 89. Signals which issue when either of the word buffer registers in the buffer storage unit associated with each of channels A–R respectively have a character stored in each character position of the buffer register.

DADM–DRDM: Log, PUB (Channels A–R); FIGURES 89 and 90. Signals which issue in response to terminate or special interrupt routine requests from the peripheral subsystems associated with channels A–R respectively or in response to a full condition in either of the pair of buffer registers associated with each of channels A–R respectively to cause the corresponding one of sequence request flip-flops ADM–RDM to be set to the 1-state.

DADP–DRDP: Log, PUB (Channels A–R); FIGURE 90. Signals generated by the routine priority selection gates to grant routine priority to the corresponding one of peripheral channels A–R.

DALW: Log, PUB; FIGURE 115. A signal which issues in response to a write clock signal from any peripheral subsystem or in response to "reset I/O" or "reset terminate" information in the F-register.

DAM1: Log, PUB; FIGURE 115. A signal representing buffer count information.

DANY: Log, PUB; FIGURE 115. A signal which indicates that a routine request corresponding to at least one of the peripheral channels has been received and that the routine request of one of the peripheral channels has been granted priority.

DARR–DRRR: Log, PUB (Channels A–R); FIGURE 83. Signals which reset the information signal receivers, the read clock signal receivers and the write clock signal receivers of peripheral channels A–R respectively.

DART–DRRT: Log, PUB (Channels A–R); FIGURE 91. Signals which issue during certain operations in the input/output controller to cause peripheral channel service requests to be generated for peripheral channels A–R respectively.

DASD–DRSD: Log, PUB (Channels A–R); FIGURE 84. Signals which issue when the peripheral channel number in the S-register is that of the corresponding one of peripheral channels A–R.

DASS–DRSS: Log, PUB (Channels A–R); FIGURE 84. Signals which issue when the peripheral channel number in the E-register is that of the corresponding one of peripheral channels A–R.

DAST–DRST: Log, PUB (Channels A–R); FIGURE 85. Signals which issue to gate major status information from the corresponding one of peripheral channels A–R to the K-register.

DASW–DRSW: Log, PUB (Channels A–R); FIGURE 91. Signals which enable the information transmitters of channels A–R respectively to gate a data character from the input/output controller to the associated peripheral subsystem.

DAT1–DRT1: Log, PUB (Channels A–R); FIGURE 88. Peripheral channel service priority signals corresponding to peripheral channels A–R respectively. One of these signals issues to indicate that peripheral channel service priority has been granted to the corresponding one of peripheral channels A–R and which cause either the write clock signal, the read clock signal or the end data transfer signal to be transferred from the corresponding one of peripheral channels A–R to its associated peripheral subsystem.

DAW0–DAW3: Log, PUB; FIGURE 115. Signals which issue to indicate receipt of write clock signals from one or more of the peripheral subsystems.

DB10–DB13: Log, PUB; FIGURE 115. Signals representing count information transmitted to the processing and control unit.

DC00–DC06, DC10–DC16, DC20–DC26, DC30–DC36: Log, PUB; FIGURES 85–87. Internal data switch signals representing characters being transmitted from the peripheral subsystems to the buffer storage unit.

DCAP: Log, PUB; FIGURE 115. A signal which issues when flip-flop CAP is set to the 1-state to indicate a data transfer between a peripheral subsystem and the buffer storage unit.

DCHP: Log, PUB; FIGURE 115. A signal which indicates that priority for a routine request has been granted to one of the peripheral channels.

DDP0–DDP2: Log, PUB; FIGURE 115. Signals which indicate that routine priority has been granted one of the groups of peripheral channels A–D, E–H or J–M respectively.

DGRH: Log, PUB; FIGURE 115. A signal which issues to indicate that a routine request from one of the peripheral channels has been granted.

DGRQ: Log, PUB; FIGURE 115. A signal which causes a peripheral channel service request to be generated by one of the peripheral channels during certain operations in the input/output controller.

DPD0–DPD3: Log, PUB; FIGURES 91 and 92. Signals which issue to indicate that a peripheral channel service request received from one of the four groups of peripheral channels comprising channels A–D, E–H, J–M and N–R respectively has the highest priority.

DPF0–DPF3: Log, PUB; FIGURE 116. Signals which indicate that a peripheral reset signal has been transmitted to one of the peripheral subsystems connected to one of the groups of peripheral channels A–D, E–H, J–M or N–R respectively.

DPFF: Log, PUB; FIGURE 116. A signal which indicates "power off" status in the input/output controller.

DPR1: Log, PUB; FIGURE 116. A signal representing a count bit which is transferred to F-register flip-flop F01 in the processing and control unit.

DPR2–DPR5: Log, PUB; FIGURE 116. Signals, transmitted to F-register flip-flops F02–F05, representing the peripheral channel number granted routine priority.

DPRD: Log, PUB; FIGURE 116. A signal which issues when the output of the TL-counter is either FTL2 or FTL6.

DRRS: Log, PUB; FIGURE 116. A signal which issues when the output of the TL-counter is FTL4.

DRD0–DRB3: Log, PUB; FIGURE 116. Signals which issue when read clock signals are received from one of the peripheral channels of the retspective groups of respective channels A–D, E–H, J–M and N–R, when that group of peripheral channels has been granted peripheral channel service priority.

DRDC: Log, PUB; FIGURE 116. A signal which indicates when one of signals DRD0–DRD3 has issued.

DRDS: Log, PUB; FIGURE 116. A signal which indicates the end of a data service routine.

DREL: Log, PUB; FIGURE 116. A signal which causes each of signals DKC0–DKC6 to be a binary 0, in the course of an information transfer between the K-register and the T-register.

DRHS: Log, PUB; FIGURE 116. The peripheral channel address in the S-register is equal to the peripheral channel address generated by the peripheral channel service logic.

DRQ0–DRQ3: Log, PUB; FIGURE 92. Signals which issue upon receipt of peripheral channel service requests from one of the peripheral channels of the corresponding groups of peripheral channels A–D, E–H, J–M and N–R respectively.

DRRD: Log, PUB; FIGURE 116. A signal which resets flip-flop S08 of the S-register.

DRSN: Log, PUB; FIGURE 117. A signal which resets the special interrupt signal receiver of each of the peripheral channels.

DRTF: Log, PUB; FIGURE 117. A signal which gates information from flip-flops D30–D35, D41 and D46–D48 of the D-register to the T-register.

DRTM: Log, PUB; FIGURE 117. A signal which resets the terminate signal receiver of each of the peripheral channels.

DS78: Log, PUB; FIGURE 117. A signal which issues when the F-register contains either "reset I/O" or "reset terminate" information.

DSEQ: Log, PUB; FIGURE 117. A signal which issues when information is to be transferred to a buffer register and when signal DRHS is present.

DSPW: Log, PUB; FIGURE 117. A signal which issues in response to one-shot output signal TSPW.

DSRP: Log, PUB; FIGURE 117. A signal which gates the read clock signal from the read clock signal transmitter and logic of each of the peripheral channels to the corresponding peripheral subsystem.

DSST: Log, PUB; FIGURE 117. A signal which gates the peripheral channel number contained in flip-flops E02–E05 of the E-register to the corresponding flip-flops of the S-register.

DSSU: Log, PUB; FIGURE 117. A signal which gates information from flip-flops E06–E08 of the E-register to the corresponding flip-flops of the S-register.

DST6–DST9: Log, PUB; FIGURE 81. Signals representing major status information transmitted from the peripheral channel unit to flip-flops K30–K33 of the K-register.

DSTD: Log. PUB; FIGURE 117. A signal which causes major status and sub-status information to be gated from the peripheral channel unit into flip-flops K24–K33 of the K-register.

DSTP: Log, PUB; FIGURE 117. A signal which issues in the peripheral channel unit in response to a corresponding signal from the memory communications unit.

DSWC: Log, PUB; FIGURE 117. A signal which gates an information character through the information signal transmitters and logic of each of the peripheral channels to the associated peripheral subsystem.

DSWP: Log, PUB; FIGURE 117. A signal which gates the write clock signal from the write clock signal transmitter of each of the peripheral channels to the associated peripheral subsystem.

DT04, DT26, DT46: Log, PUB; FIGURE 117. Signals which indicate particular states of the flip-flops of the TL-counter.

DTC0–DTC6: Log, PUB; FIGURE 87. Signals representing a data character provided at the output of the data switch of the peripheral channel unit. These signals are transmitted to the TC-register of the buffer storage unit to effect transfer of a character from a peripheral subsystem to a buffer register of the buffer storage unit. These signals are also transmitted to the K-register flip-flops K24–K29 in the processing and control unit to effect transfer of peripheral subsystem sub-status information to the processing and control unit.

DTF0–DTF6: Log, PUB; FIGURE 87 and 88. Output signals of the buffer control decode logic which represent an address of one of the buffer registers of the buffer storage unit. These signals are transmitted to the TF-register of the buffer storage unit.

DTFG: Log, PUB; FIGURE 117. A signal which issues in response to a peripheral channel service request from one of the peripheral channels. The signal gates information through the buffer control decode logic to the TF-register of the buffer storage unit.

DTL0: Log, PUB; FIGURE 117. A signal which issues when flip-flop TL0 of the TL-counter is set to the 1-state.

DTL1: Log, PUB; FIGURE 117. A signal which issues in response to one-shot output signal TTL1.

DTMG: Log, PUB; FIGURE 117. A signal which causes signal DTMS to issue.

DTMS: Log, PUB; FIGURE 117. A signal which causes information to be transferred from the Q-register to the buffer storage unit.

DTRD: Log, PUB; FIGURE 88. A signal generated by the buffer control decode logic which sets flip-flop TRD of the TF-register of the buffer storage unit to the 1-state. This signal indicates that a read operation is to be performed in the buffer storage unit.

DTRQ: Log, PUB; FIGURE 117. A signal which issues in response to a peripheral channel service request in one of the peripheral channels A–R.

DTSH: Log, PUB; FIGURE 88. A signal generated by the buffer control decode logic which sets flip-flop TSH of the TF-register of the buffer storage unit to the 1-state. This signal indicates a shift operation is to be performed in the shift logic of the buffer storage unit.

DTWR: Log, PUB; FIGURE 88. A signal generated by the buffer control decode logic which sets flip-flop TWR of the TF-register in the buffer storage unit to the 1-state. This signal indicates a write operation is to be performed in the buffer storage unit.

FAA1–FRA1: FF, PUB (Channels A–R); FIGURE 118. The 1-output signals of buffer count flip-flops AA1–RA1. Each of these flip-flops correspond to one of the peripheral channels A–R and stores buffer count information.

FAB1–FRB1: FF, PUB; FIGURE 119. The 1-output signals of flip-flops AB1–RB1 of the peripheral channel unit. The states of these flip-flops indicate the presence or absence of command information in the E-register.

FAD0–FRD0: FF, PUB (Channels A–R); FIGURE 120. The 1-output signals of the buffer state flip-flops corresponding to peripheral channels A–R. Each of these flip-flops, when in the 1-state, indicates that the even buffer register corresponding to the respective peripheral channel is full, during a read operation, or is empty, during a write operation.

FAD1–FRD1: FF, PUB (Channels A–R); FIGURE 121. The 1-output signals of the buffer state flip-flops corresponding to peripheral channels A–R. Each of these flip-flops, when in the 1-state, indicates that the odd buffer register corresponding to the respective peripheral channel is full, during a read operation, or is empty, during a write operation.

FADM–FRDM: FF, PUB (Channels A–R); FIGURE 122. The 1-output signals of the routine request flip-flops corresponding to peripheral channels A–R.

FAM1: FF, PUB; FIGURE 125. The 1-output signal of a control flip-flop of the peripheral channel unit.

FCAP: FF, PUB; FIGURE 125. A signal which controls the timing of information transfers between the processing and control unit and the buffer storage unit.

FCH0–FCH3; FF, PUB; FIGURE 123. The 1-output signals of control flip-flops of the second level peripheral channel service priority selection logic of the peripheral channel unit. Each of these flip-flops, when set to the 1-state, indicates that a peripheral channel service request of a peripheral channel of the corresponding group of peripheral channels has been granted priority.

FPBS: FF, PUB; FIGURE 125. A signal which indicates that peripheral status information has been transferred to the K-register.

FPFG: FF, PUB; FIGURE 125. The 1-output signal of a control flip-flop which, when set to the 1-state, causes terminate interrupt, special interrupt and data service routine requests to be gated into flips-flops F08, F09 and F10 respectively of the F-register.

FPST: FF, PUB; FIGURE 125. A signal which causes peripheral status information to be transferred to the K-register.

FRED: FF, PUB; FIGURE 125. The 1-output signal of a control flip-flop which is set to the 1-state in response to a read clock signal transmitted from one of the peripheral subsystems to its corresponding peripheral channel.

FRQ0–FRQ3: FF, PUB; FIGURE 123. The 1-output signals of first level peripheral channel service priority selection logic in the peripheral channel unit. Each of these flip-flops is set to the 1-state in response to a peripheral channel service request from one of the peripheral channels of the group associated with the flip-flop.

FRUN: FF, PUB; FIGURE 125. The 1-output signal of a flip-flop which is set to the 1-state when the input/output controller is in normal operation.

FS02–FS08: Reg, PUB; FIGURES 123 and 124. The 1-output signals of the flip-flops comprising the S-register. This register stores the peripheral channel number and other control information during operation of the input/output controller.

FT00–FT09: Reg, PUB; FIGURE 124. The 1-output signals of the flip-flops comprising the T-register. This register temporarily stores information such as device command, device address and data characters, for transfer from the buffer storage unit to a peripheral subsystem.

FTL0, FTL2, FTL4, FTL6: FF, PUB; FIGURE 125. The 1-output signals of the flip-flops comprising the TL-counter. This counter provides timing control signals to control operations in the peripheral channel unit and in the processing and control unit.

FUNF: FF, PUB; FIGURE 125. A signal which issues during a connect routine when initiating an operation in a peripheral subsystem.

QPH1: Log, PUB; FIGURE 93. A timing control signal generated in the clock and timing control of the peripheral channel unit.

QPH2: Log, PUB; FIGURE 93. A timing control signal generated in the clock and timing control of the peripheral channel unit.

QPHC: Log, PUB; FIGURE 93. A timing control signal generated in the clock and timing control of the peripheral channel unit.

QPHD: Log, PUB; FIGURE 93. A timing control signal generated in the clock and timing control of the peripheral channel unit.

QPHE: Log, PUB; FIGURE 93. A timing control signal generated in the clock and timing control of the peripheral channel unit.

QPHP: Log, PUB; FIGURE 93. A timing control signal generated in the clock and timing control of the peripheral channel unit.

RAAL–RRAL: Log, PUB (Channels A–R); FIGURE 113. I/O signals transmitted from the respective peripheral channels A–R to the associated peripheral subsystems.

RAC0–RAC6 through RRC0–RRC6: Log. PUB (Channels A–R) FIGURES 109–112. Information signals transmitted from the respective peripheral channels A–R to the respective peripheral subsystems.

RAE0–RAE6 through RRE0–RRE6: Log, PUB (Channels A–R) FIGURES 93–100. Signals representing information characters and parity information transmitted from the peripheral subsystems to the corresponding peripheral channels A–R.

RAED–RRED: Log, PUB (Channels A–R); FIGURE 114. End data transfer signals transmitted form the corresponding peripheral channels A–R to the associated peripheral subsystems.

RAER–RRER: Log, PUB (Channels A–R); FIGURE 105. Signals which issue in response to read clock signals transmitted from the peripheral subsystems to the corresponding peripheral channels A–R.

RAES–RRES: Log, (Channels A–R); FIGURE 106. Signals which issue in response to special interrupt signals JASE–JRSE transmitted from the peripheral subsystems to the corresponding peripheral channels A–R.

RAET–RRET: Log, PUB (Channels A–R); FIGURE 107. Signals which issue in response to terminate signals JAET–JRET transmitted from the peripheral subsystem to the corresponding peripheral channels A–R.

RAEW–RREW: Log, PUB (Channels A–R); FIGURE 108. Signals which issue in response to write clock signals JAEW–JREW transmitted from the peripheral subsystems to the corresponding peripheral channels A–R.

RAM0–RAM3 through RRM0–RRM3: Log, PUB (Channels A–R); FIGURES 101–104. Signals which issue in response to major status signals JAM0–JAM3 through JRM0–JRM0 respectively transmitted from the peripheral subsystems to the corresponding peripheral channels A–R.

RAPW–RRPW: Log, PUB (Channels A–R); FIGURE 114. Write clock signals transmitted from corresponding peripheral channels A–R to the respective peripheral subsystems.

RASB–RRSB: Log, PUB (Channels A–R); FIGURE 113. Read clock signals transmitted from the corresponding peripheral channels A–R to the respective peripheral subsystems.

TALF: OS, PUB; FIGURE 125. The 1-output signal of a control one-shot which is employed to delay timing control signal QPH2.

TRMK: OS, PUB; FIGURE 125. The 1-output signal of a control one-shot which is employed to delay signal JE11, indicating the existence of command information in the E-register.

TRPC: OS, PUB; FIGURE 125. The 1-output signal of a control one-shot which is employed to delay signal JE11, indicating the presence of command information in the E-register.

TRTF: OS, PUB; FIGURE 125. The 1-output signal of a control one-shot which causes information to be transferred from flip-flops D30–D35, D41 and D46–D48 of the D-register to the T-register.

TSMQ: OS, PUB; FIGURE 125. The 1-output signal of a control one-shot which causes issuance of the timing signals which control data transfer between the buffer storage unit and a memory.

TSPW: OS, PUB; FIGURE 125. The 1-output signal of a control one-shot which represents a delayed clock signal.

TTL1: OS, PUB; FIGURE 125. The 1-output signal of a control one-shot which represents a delayed clock signal.

TTL3: OS, PUB; FIGURE 125. The 1-output signal of a control one-shot which represents a delayed clock signal.

PERIPHERAL SUBSYSTEMS

The input/output controller of FIGURE 1 supervises and handles all communications in the data processing system between the memory and the peripheral subsystems. The input/output controller is provided with a peripheral channel unit comprising sixteen channels. Each channel is adapted to be connected to one of a plurality of peripheral subsystems. The peripheral channels serve as the communication paths between the input/output controller and the respective peripheral subsystems. The sixteen peripheral channels are identified as peripheral channels A–H, J–N and P–R.

Input/output controller—Peripheral subsystem communication

Communication between a peripheral channel of the input/output controller and its respective peripheral subsystem is effected by means of a group of lines carrying predetermined signals. These signals comprise input signals transmitted from the peripheral subsystem to the peripheral channel and output signals transmitted from the peripheral channel to the peripheral subsystem. The signals passing between a peripheral channel and an associated peripheral subsystem are the same regardless of the type of peripheral subsystem, each of the peripheral subsystems receiving and transmitting the same number and type of signals during operation. Thus, any peripheral subsystem may be connected to any peripheral channel. In practice, because the peripheral channels are assigned relative priorities, the peripheral subsystem connected to a particular peripheral channel will be determined by the relative data transfer rate of the peripheral subsystem.

Figure 5:
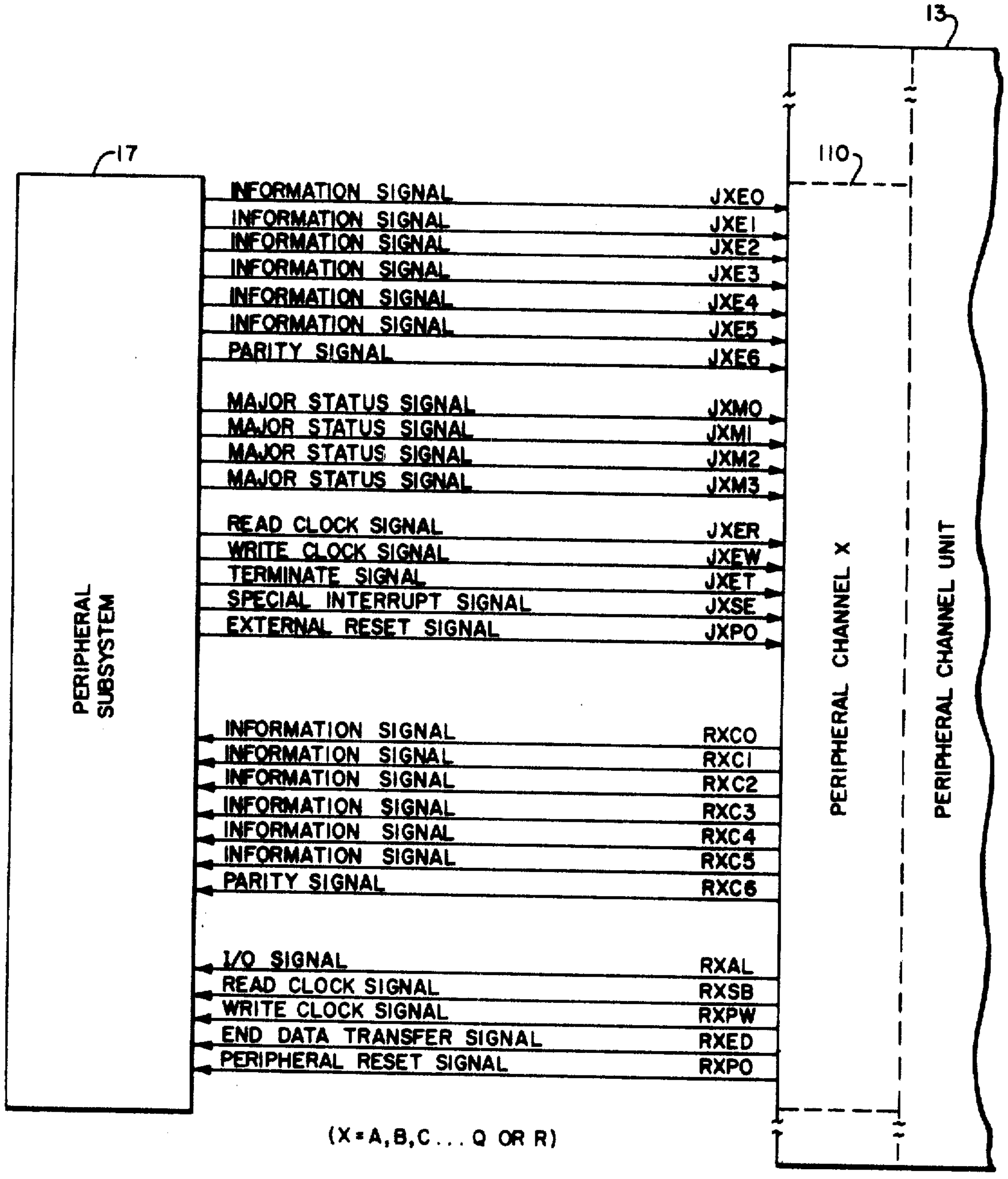
FIGURE 5 is a symbolic diagram illustrating the interconnection of the input/output controller and a peripheral subsystem.

FIGURE 5 illustrates the group of signals interconnecting a peripheral channel 110 of peripheral channel unit 13 with a peripheral subsystem 17 and illustrates the signals on these lines. Peripheral channel 110 is designated peripheral channel X, where X is one of the alphanumeric characters A–H, J–N and P–R corresponding to one of the peripheral channels of the peripheral channel unit.

*Signal transfer—peripheral subsystem to peripheral channel.*—The input signals transmitted from the peripheral subsystem to the peripheral channel include six signals representing a character of information being transferred from peripheral subsystem 17 to peripheral channel 110 of peripheral channel unit 13. A signal is also provided for transmitting a parity bit from the peripheral subsystem to the peripheral channel unit. The information bits and the parity bit are identified as signals JXE0–JXE6, as illustrated in FIGURE 5. The letter X in the signal designations represents one of the alphanumeric characters A–H, J–N and P–R, each of these alphanumeric characters identifying one of the sixteen peripheral channels of the peripheral channel unit. For example, signals JAE0–JAE6 identify the information and parity bits being transmitted to peripheral channel A from its corresponding peripheral subsystem. Similarly, signals JQE0–JQE6 identify the information and parity bits being transmitted to peripheral channel Q from its corresponding peripheral subsystem.

Four bits of major status information, represented by signals JXM0–JXM3, are also transmitted from peripheral subsystem 17 to peripheral channel X. Additionally, a read clock signal JXER, a write clock signal JXEW, a terminate signal JXET, a special interrupt signal JXSE and an external reset signal JXPO are transmitted from peripheral subsystem 17 to peripheral channel 110.

The six information signals JXE0–JXE5 serve to transfer both status information and data characters from the peripheral subsystem to the corresponding peripheral channel of the input/output controller. The major status signals JXM0–JXM3 indicate to the input/output controller the status of the corresponding peripheral subsystem. The codes employed to represent status are illustrated in FIGURE 2*h*. Major status information is continuously displayed by the peripheral subsystem to the input/output controller by means of signals JXM0–JXM3.

Read clock signal JXER is employed during the transfer of data from peripheral subsystem 17 to peripheral channel 110. Signal JXER indicates to peripheral channel 110 that a character of data has been transmitted by the peripheral subsystem and is available to the input/output controller on the information lines. Write clock signal JXEW is employed during the transfer of data from the input/output controller to the peripheral subsystem, and also during the transmission of command address information from the input/output controller to the peripheral subsystem. When used during the transmission of data, the JXEW signal represents a request by the peripheral subsystem for a data character. When used during the transmission of command and address information to the peripheral subsystem, the signal JXEW represents a request by the peripheral subsystem either for the address or for the command information.

Terminate signal JXET is transmitted by the peripheral subsystem to the peripheral channel when a data transfer has been ended, for example, when the peripheral subsystem detects a physical end-of-record. Special interrupt signal JXSE is employed by the peripheral subsystem to indicate that a unique situation has occurred within the peripheral subsystem. For example, special interrupt signal JXSE may indicate the completion of an off-line operation by a device of the peripheral subsystem, such as completion of a rewinding operation by a tape handler. External reset signal JXPO is employed to suppress transient signals from a peripheral subsystem and is also used to indicate when a peripheral subsystem is present and capable of communication with the peripheral channel.

*Signal transfer—Peripheral channel to peripheral subsystem.*—The output signals transmitted from peripheral channel 110 in FIGURE 5 to peripheral subsystem 17 include six information signals RXC0–RXC5 and a parity bit represented by signal RXC6. I/O signal RXAL, read clock signal RXSB, write clock signal RXPW, end data transfer signal RXED and peripheral reset signal RXPO are also transmitted from peripheral channel 110 to peripheral subsystem 17.

Information signals RXC0–RXC5 serve to transfer command and device address information as well as data characters from peripheral channel 110 to peripheral subsystem 17. I/O signal RXAL is used by peripheral channel 110 to inform peripheral subsystem 17 that device address and command information is to be transmitted by peripheral channel 110 and received by peripheral subsystem 17.

Read clock signal RXSB is used during the transfer of data from peripheral subsystem 17 to peripheral channel 110. Read clock signal RXSB indicates to peripheral subsystem 17 that the last character transmitted on the information lines has been received by peripheral channel 110 and peripheral channel 110 is ready to accept the next character. Write clock signal RXPW is used during the transfer of data from peripheral channel 110 to peripheral subsystem 17 and also during the transmission of device address and command information to peripheral subsystem 17. During the transmission of data to peripheral subsystem 17, signal RXPW indicates that a character of data has been transmitted by peripheral channel 110 and is available to peripheral subsystem 17 on the information lines. During the transmission of device address and command information to peripheral subsystem 17, write clock signal RXPW indicates to peripheral subsystem 17 that either device address or command information has been transmitted by peripheral channel 110 and is available to peripheral subsystem 17 on the information lines.

End data transfer signal RXED is transmitted by peripheral channel 110 to inform peripheral subsystem 17 that data transfer is to cease. In response to this signal, peripheral subsystem 17 discontinues the data transfer operation. Peripheral reset signal RXPO is transmitted to peripheral subsystem 17 to initialize the peripheral subsystem so that it is capable of accepting a new I/O signal RXAL.

Peripheral subsystem—Details

Figure 6:
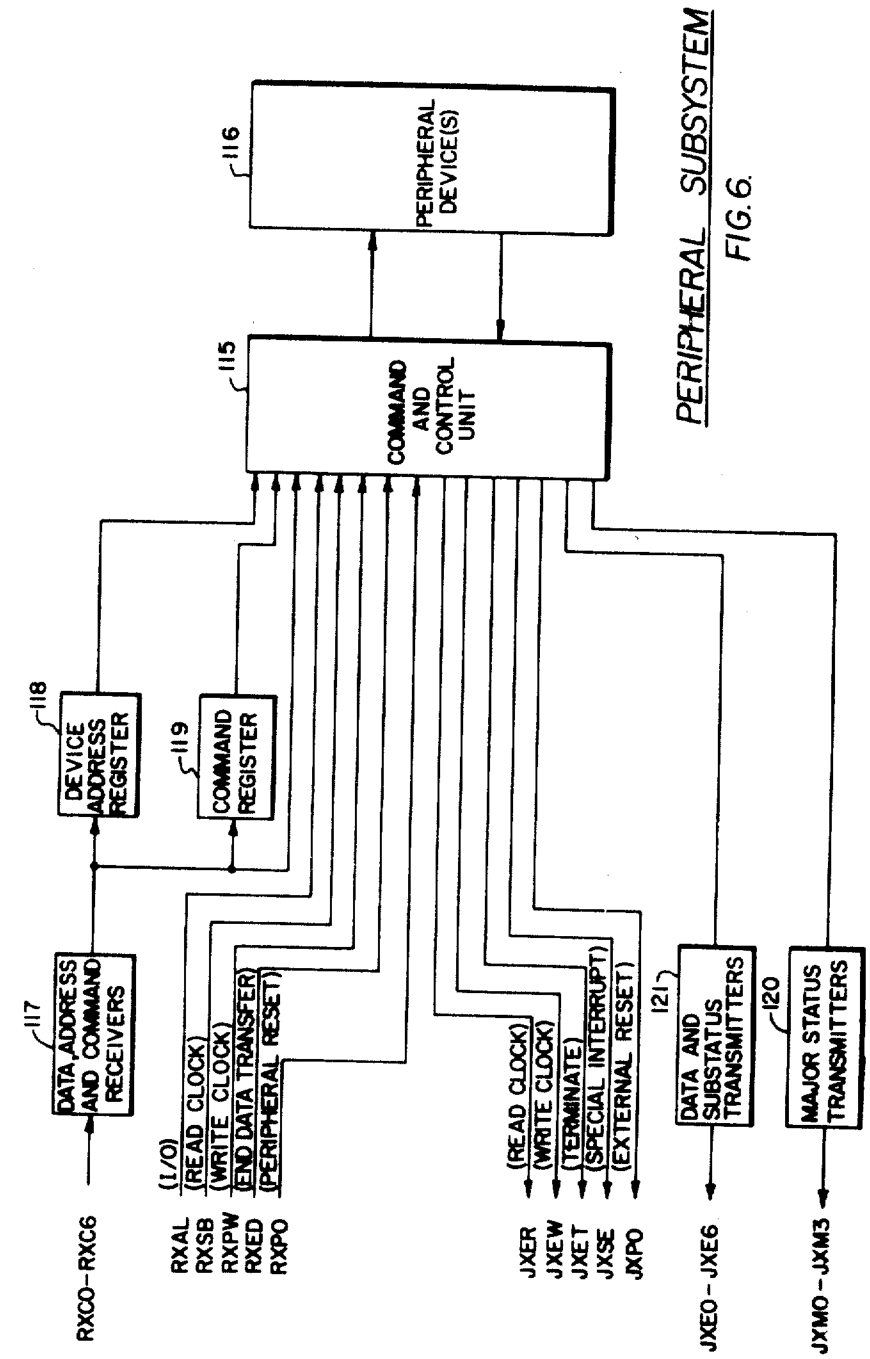
FIGURE 6 is a block diagram of a typical peripheral subsystem employed with the input/output controller of FIGURE 1.

FIGURE 6 is a block diagram of a typical peripheral subsystem and indicates the general organization of the peripheral subsystem and the structure employed to receive and transmit signals passing between the peripheral subsystem and the corresponding peripheral channel. Referring to FIGURE 6, coordination and control of the operations within the peripheral subsystem are effected by command and control unit 115 which receives all signals transmitted from the peripheral channel to the peripheral subsystem and which initiates all signals transmitted from the peripheral subsystem to the peripheral channel. Peripheral device 116 communicates directly with command and control nuit 115. In certain peripheral subsystems, for example magnetic tape subsystems, a plurality of magnetic tape units may be connected to command and control unit 115.

As illustrated in FIGURE 6, information signals RXC0–RXC6 are applied to data, address and command receivers 117. If information signals RXC0–RXC6 comprise data, this data is transmitted directly from receivers 117 to command and control unit 115. If signals RXC0–RXC6 comprise device address information, the output of receivers 117 is transmitted to device address register 118 which stores the identification of the one of peripheral devices 116 to which a command is directed. If signals RXC0–RXC6 comprise command information, this command information is transmitted from receivers 117 to command register 119 for application to command and control unit 115.

Major status information to be transmitted from the peripheral subsystem to the input/output controller originates in command and control unit 115 and is applied to major status transmitters 120 which generate major status signals JXM0–JXM3. Similarly, data and substatus information are applied to data and substatus transmitters 121 by command and control unit 115. Transmitters 121 provide information signals JXE0–JXE6 to the peripheral channel. The remaining signals transmitted from the peripheral subsystem to the peripheral channel are provided by command and control unit 115, as illustrated in FIGURE 6.

Initiation of an operation in a peripheral subsystem is effected by the transmission of a device address and a device command from the input/output controller to the selected peripheral subsystem. The peripheral subsystem to which the command and address information is transmitted is determined by the peripheral channel address in bit positions 20–23 of the primary mailbox word, illustrated in FIGURE 2*b*. The peripheral device address is transmitted from the input/output controller to the peripheral subsystem to define the particular device of a multi-device peripheral subsystem for which the device command is intended. If the peripheral subsystem consists of only one device, the device address is ignored. If employed, the peripheral device address information transmitted to the peripheral subsystem by the input/output controller is obtained from the peripheral device address field in bit positions 24–29 of the primary mailbox word. The peripheral device command is transmitted by the input/output controller to define the exact function which the peripheral subsystem is to perform. The peripheral device command is also obtained by the input/output controller from the primary mailbox word, shown in FIGURE 2*b*.

Command sequence

Transmission of device address information, if needed, and command information from the input/output controller to a peripheral subsystem is accomplished by a specific sequence of signals between the input/output controller and the peripheral subsystem. This sequence, termed a command sequence, is illustrated in FIGURE 7.

Figure 7:
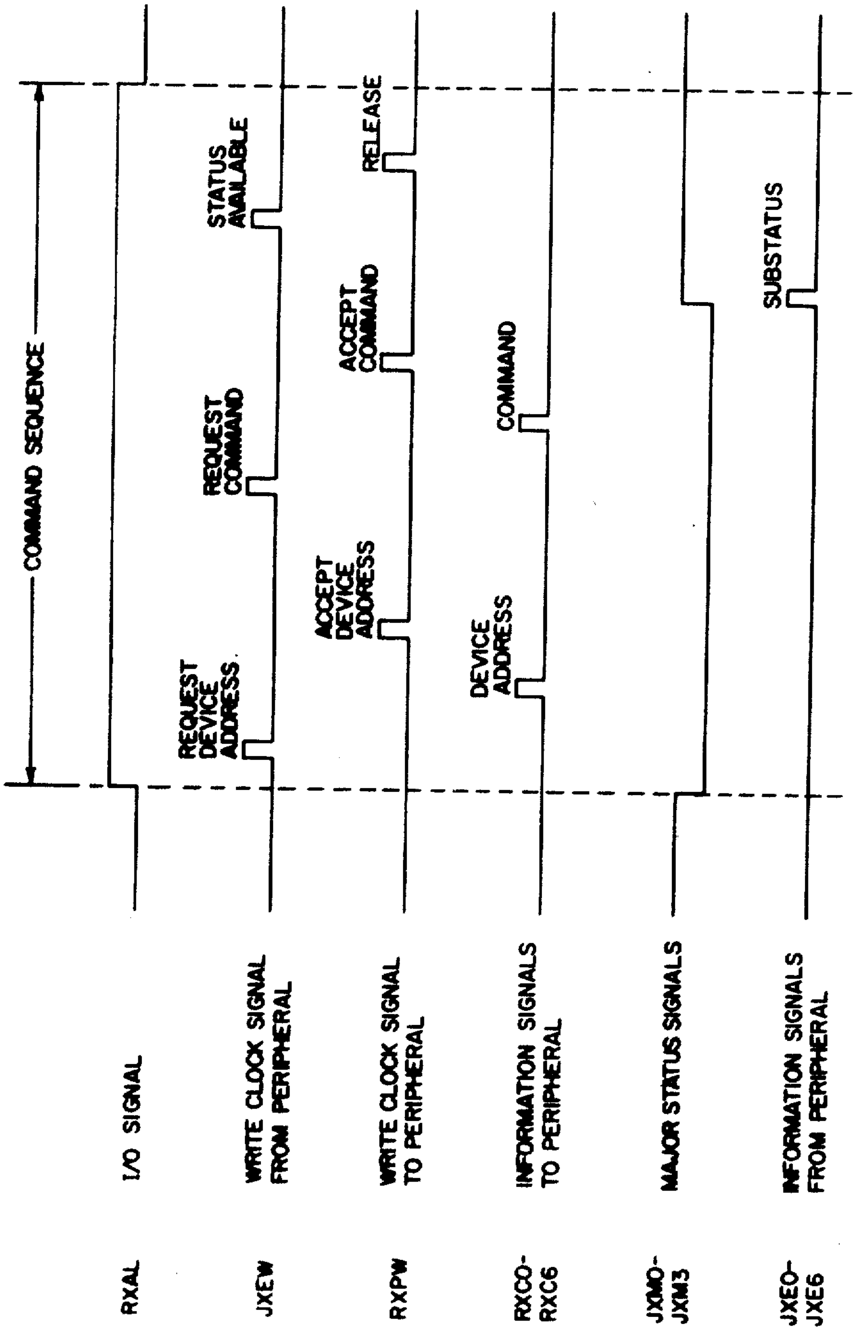
FIGURE 7 is a timing diagram illustrating a command sequence during which address and command information are transferred between the input/output controller and a peripheral subsystem.

With reference to FIGURE 7, the command sequence is commenced when the input/output controller transmits the I/O signal RXAL through the peripheral channel to the peripheral subsystem. In response to I/O signal RXAL, the peripheral channel resets the major status signal receivers to the 0-state and major status of the peripheral subsystem is not shown. In addition, I/O signal RXAL causes the peripheral subsystem to transmit write clock signal JXEW. This signal represents a request for the device address. In response to this request, the input/output controller places device address information, represented by signals RXC0–RXC5, on the information lines and transmits write clock signal RXPW to indicate to the peripheral subsystem that the device address is available on the information lines.

Upon receipt of write clock signal RXPW, the periphreal subsystem transfers the device address information represented by signals RXC0–RXC5 to the device address register. If the peripheral subsystem is not a multi-device peripheral subsystem, the device address information is ignored. The peripheral subsystem next transmits write clock signal JXEW to the input/output controller, this signal representing a request for command information. In response to this request, the input/output controller places the command information, represented by signals RXC0–RXC5, on the information lines, also transmitting write clock signal RXPW to indicate to the peripheral subsystem that command information is available on the information lines.

Upon receiving the command information from the input/output controller, the peripheral subsystem transmits major status information to the input/output controller by means of major status signals JXM0–JXM3. If it is desirable to also transmit substatus information to the input/output controller, information signals JXE0–JXE5 are employed to transmit a six bit substatus character to the input/output controller. Subsequently, the peripheral subsystem transmits another write clock signal JXEW to the input/output controller to indicate that status information is available on the major status lines and, if substatus is also being transmitted, on the information lines. Following this "status available" signal, the input/output controller transmits another write clock signal RXPW, termed the "release" signal, to the input/output controller to indicate the end of the command signal sequence.

As a result of the command sequence, the peripheral subsystem connected to the peripheral channel addressed by the primary mailbox word receives address information, if a multi-device peripheral subsystem, identifying the peripheral device affected, and command information indicating the operation which the peripheral subsystem is to perform. If the peripheral device command requires transfer of data between the peripheral subsystem and the input/output controller, such data transfer is effected in either a read sequence or a write sequence.

Read sequence

Figure 8:
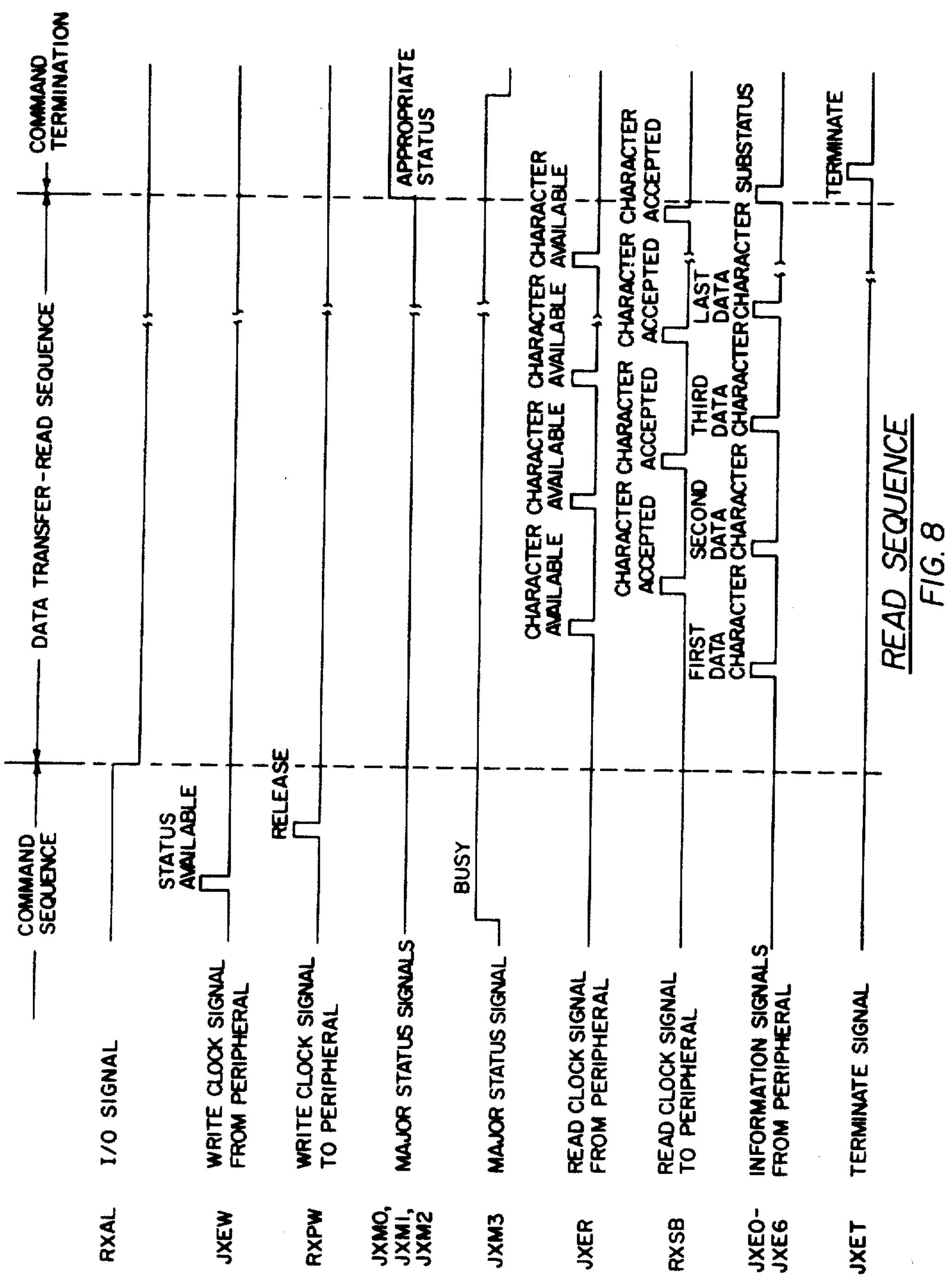
FIGURE 8 is a timing diagram illustrating a read sequence during which information is transferred from a peripheral subsystem to the input/output controller.

During a read operation in the input/output controller, a read sequence is performed to transfer data from a peripheral subsystem to the input-output controller. FIGURE 8, which illustrates the read sequence, shows the read sequence following the command sequence which initiated the read operation.

Referring to FIGURE 8, if the command is accepted by the peripheral subsystem, the major status signals JXM0–JXM3 reflect the binary combination 0001 indicating a major status of busy. Following receipt of the "release" write clock signal RXPW from the input/output controller, the peripheral subsystem transmits the first data character, represented by information signals JXE0–JXE6. The peripheral subsystem also transmits read clock signal JXER to indicate to the input/output controller that the first character is available on the information lines. Upon acceptance of the first character by the input/output controller, read clock signal RXSB is transmitted by the peripheral channel to the peripheral subsystem, indicating that the second character may be sent.

This signal sequence is repeated until data transfer from the peripheral subsystem to the input/output controller is terminated. Such termination may be caused by:

(a) Transmission of an end data transfer signal RXED (not shown in FIGURE 8) from the input/output controller to the peripheral subsystem, (b) Detection of an error or malfunction condition by the peripheral subsystem which requires termination of the read opertaion, or (c) Determination by the peripheral subsystem that all data required for execution of the command has been transmitted and the last data character has been accepted by the input/output controller.

When, for one of the three reasons listed above, the peripheral subsystem determines that the data transfer is to be terminated, major status is indicated by major status signals JXM0–JXM3. If desirable, information signals JXE0–JXE5 are employed to transmit a six bit substatus character from the peripheral subsystem to the input/output controller. The peripheral subsystem then transmits terminate signal JXET to the input/output controller.

Write sequence

Figure 9:
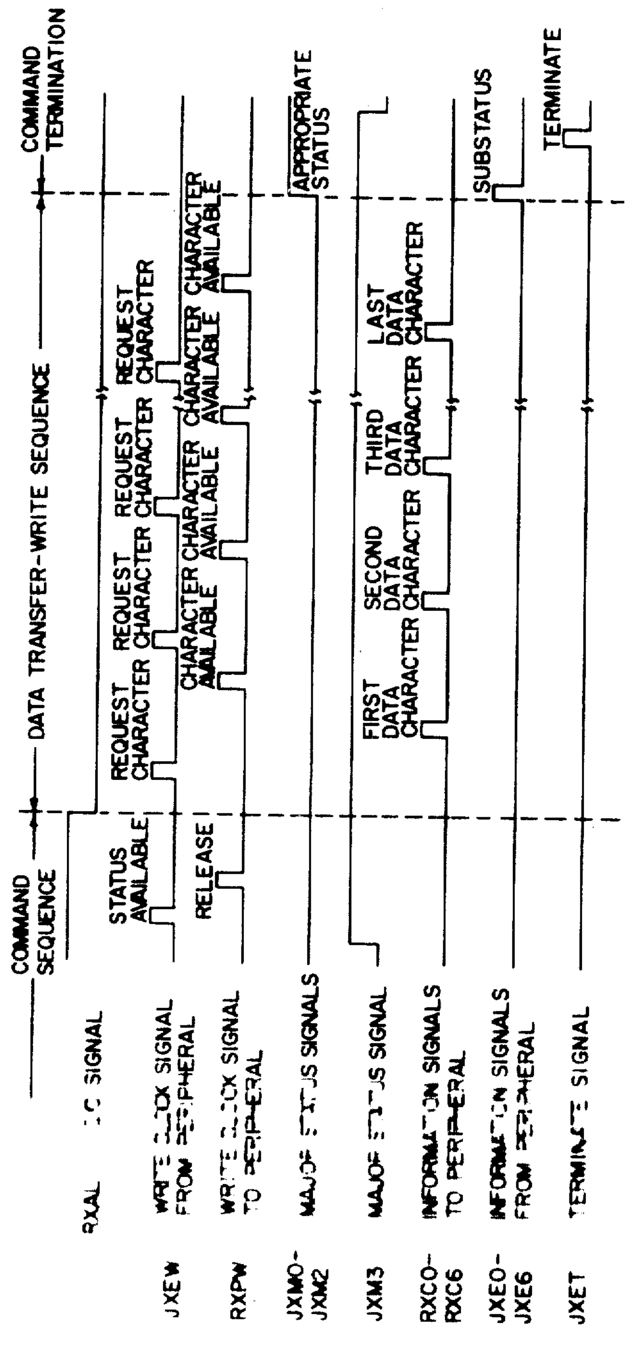
FIGURE 9 is a timing diagram illustrating a write sequence during which information is transferred from the input/output controller to a peripheral subsystem.

If the command transmitted from the input/output controller to a peripheral subsystem requires a write operation, i.e. data transfer from the input/output controller to the peripheral subsystem, a write sequence is performed. FIGURE 9 illustrates the write sequence following the command sequence which initiated the write operation.

Referring to FIGURE 9, the peripheral subsystem indicates a major status of "busy" upon acceptance of the command by the peripheral subsystem, just as in the read sequence. The peripheral subsystem then transmits write clock signal JXEW to the peripheral channel of the input/output controller to request a character. In response to the request, the input/output controller places a data character, represented by signals RXC0–RXC6, on the information lines and then transmits write clock signal RXPW to the peripheral subsystem to indicate that the first data character is available on the information lines.

Following receipt of the "character available" signal, the peripheral subsystem accepts the data character and transmits write clock signal JXEW to request the next character. This sequence of signals continues until the peripheral subsystem determines that the last character necessary to complete execution of the command has been received from the input/output controller. This termination may be caused by any of the three events described for the read sequence. The peripheral subsystem then indicates its major status by means of signals JXM0–JXM3 and, if necessary, transmits substatus information to the peripheral channel by means of information signals JXE0–JXE6. The peripheral subsystem then transmits terminate signal JXET to the input/output controller.

Peripheral major status

As described in the sections entitled "Read Sequence" and "Write Sequence," major status signals JXM0–JXM3 are used to indicate the major status of a peripheral subsystem to the input/output controller. These status signals are also employed to enable a peripheral subsystem to respond to "request status" and "reset status" peripheral device commands transmitted from the input/output controller. These status signals continuously reflect status of the peripheral subsystem. The nine status conditions and the bit configurations corresponding to these conditions which may be transmitted to the input/output controller are as follows:

| JXM3 | JXM2 | JXM1 | JXM0 | Status Condition |
|---|---|---|---|---|
| 0 | 0 | 0 | 0 | Channel/Peripheral Subsystem Ready. |
| 0 | 0 | 0 | 1 | Device Busy. |
| 0 | 0 | 1 | 0 | Device Attention. |
| 0 | 0 | 1 | 1 | Device Data Alert. |
| 0 | 1 | 0 | 0 | End of File. |
| 0 | 1 | 0 | 1 | Command Reject. |
| 0 | 1 | 1 | 0 | Intermediate Condition. |
| 0 | 1 | 1 | 1 | Program Load Termination. |
| 1 | 0 | 0 | 0 | Channel/Peripheral Subsystem Busy. |

Each of the status conditions is described below. If a peripheral subsystem contains only one device, device status is therefore also subsystem status.

(a) Channel/Peripheral Subsystem Ready—In response to a command other than a "request status" command, a "reset status" command or a command requiring a status of "Channel/Peripheral Subsystem Busy," this status indicates that the command has been accepted. In response to a "request status" or a "reset status" command, this status indicates that the addressed device is ready and able to accept the command. Upon termination of execution of a command, this status indicates that the execution of the command was error free and the device in which the command was executed is ready and able to execute another command.

(b) Device "Busy"—The status occurs only in a multi-device peripheral subsystem and is used only during a command sequence, never at the termination of execution of a command. This status indicates that the command may not be accepted because the addressed device is in the process of executing an operation which does not require the entire peripheral subsystem to be in the busy state.

(c) Device Attention—In response to a command, this status indicates that the command may not be executed by the addressed device until operator intervention at the peripheral subsystem to correct an existing inoperable condition. At the termination of execution of the command, this status indicates that an attention condition was detected during execution of the command which prohibits the execution of further commands by the device until oeprator intervention to correct the condition occurs.

(d) Data Device Alert—The status is used only in response to a "request status" command. It indicates that some type of data error or alert condition was detected during execution of the last command.

(e) End of File—This status is used only in response to a "request status" command and indicates that the logical end of file was detected during the execution of the last command.

(f) Command Reject—This status is used only during a command sequence to indicate that the command is being rejected for one of the following reasons: command not recognizable, command received with incorrect parity, device address not recognizable, device address received with incorrect parity or command inconsistent with current state of device. The status does not prevent subsequent acceptance of a command by the peripheral subsystem.

(g) Intermediate Condition—This status is used in response to a "request status" or a "reset status" command to indicate that the addressed device, while not currently in the busy state, will either revert to the busy state because of a previously received command or anticipates reception of a command which will cause it to revert to the busy state. Upon completion of execution of a command, this status indicates that the command was executed without detection of an error condition and that the device will revert to the busy state.

(h) Program Load Termination—This status is used only in response to a "request status" command and indicates that the last operation executed by the peripheral subsystem was a program load operation, and was executed successfully.

(i) Channel/Peripheral Subsystem Busy—In response to a command, this status indicates that the command has been accepted and will be executed upon completion of the command sequence. In addition, this status indicates that the execution of the command requires the entire peripheral subsystem to revert to the busy state, precluding any further command reception by the peripheral subsystem until execution of the current command is terminated.

A "reset status" command causes all resettable status within the peripheral subsystem to be reset. The only status conditions which may be used in response to this command are: Channel/Peripheral Subsystem Ready, Device Busy, Device Attention, and Intermediate Condition.

In response to a "request status" peripheral device command, a peripheral subsystem indicates the status of the addressed device upon the appropriate status lines. The following status conditions may be transmitted to the input/output controller in response to a "request status" command: Channel/Peripheral Subsystem Ready, Device Busy, Device Attention, Device Data Alert, End of File, Intermediate Condition, and Program Load Termination. The status condition of "command reject" may not be used in response to a "request status" command.

MEMORY

The input/output controller is provided with four memory ports identified as ports A, B, C and D, each memory port adapted to be connected to one memory. Thus, the input/output controller may be connected to up to four memories. Each of the memory ports serves as the communication path between the input/output controller and a memory.

The input/output controller of FIGURE 1 shares each memory to which it is connected with at least one processor. Input/output controller operation is directly controlled by memory by means of IOC commands stored in the memory. Operation of the input/output controller is indirectly controlled by a processor which stores the IOC commands in memory.

Memory 15, illustrated diagrammatically in FIGURE 1, stores words which are to be processed, data words which have resulted from processing, and mailbox and interrupt queue words for controlling the input/output controller. Memory 15 of the data processing system is adapted to store up to 262,144 words of thirty-six bits each. If the input/output controller is connected to more than one memory, the total word capacity of the memories connected to the memory ports cannot exceed 262,144 words. Of the memory locations provided for storage of information, the following are reserved in the control memory for special purposes, as indicated in the following table:

RESERVED MEMORY LOCATIONS

| Basic memory locations (octal): | Contents |
|---|---|
| **000** | Primary mailbox word. |
| **001** | Initiation interrupt queue counter word. |
| **002** | Terminator interrupt queue counter word. |
| **003** | Special interrupt queue counter word. |
| **007** | Counter parity interrupt data cell. |
| **011** | Duplicate initiation interrupt queue counter word. |
| **012** | Duplicate terminate interrupt queue counter word. |
| **013** | Duplicate special interrupt queue counter word. |
| **020–037** | Initiation interrupt queue table. |
| **040–057** | Terminate interrupt queue table. |
| **060–077** | Special interrupt queue table. |
| **200–277** | Secondary mailbox words. |

The locations of the secondary mailbox words associated with each of the peripheral channels are shown in the following table:

SECONDARY MAILBOX WORD LOCATIONS

| Peripheral channel: | Basic location of secondary mailbox words (octal) |
|---|---|
| A | 200–203 |
| B | 204–207 |
| C | 210–213 |
| D | 214–217 |
| E | 220–223 |
| F | 224–227 |
| G | 230–233 |
| H | 234–237 |
| J | 240–243 |
| K | 244–247 |
| L | 250–253 |
| M | 254–257 |
| N | 260–263 |
| P | 264–267 |
| Q | 270–273 |
| R | 274–277 |

The actual reserved memory locations may be the basic memory locations listed above or may be other locations as specified by the control block starting address assignment switches of the input/output controller.

Each memory includes eight channels for connection to either processors or input/output control units. The eight memory channels have predetermined positional priority. Simultaneous memory access interrupt requests received by two or more channels from the processors or input/output controllers connected to those channels are serviced in the established order of priority.

Each memory also contains a memory interrupt register comprising a plurality of interrupt cells arranged in accordance with a predetermined priority. Program interrupt requests generated by a processor or an input/output controller connected to the memory cause corresponding interrupt cells of the memory interrupt register to be set. If more than one program interrupt request has been transmitted to memory, as evidenced by the states of the interrupt cells, the order in which the program interrupt requests are serviced is determined by the relative priorities of the interrupt cells. In response to each program interrupt request stored in the memory interrupt register, a processor executes an appropriate subroutine to service the interrupt.

Input/output controller—Memory communications

Communication between a memory port of the input/output controller and the memory connected to that memory port is effected by a group of lines carrying specific signals. These signals comprise input signals transmitted from memory to the memory port of the input/output controller and output signals transmitted from the memory port to memory. The designation of the signals passing between a memory port of the input/output controller and the memory connected to that port is basically the same for each memory-memory port connection.

Figure 10:
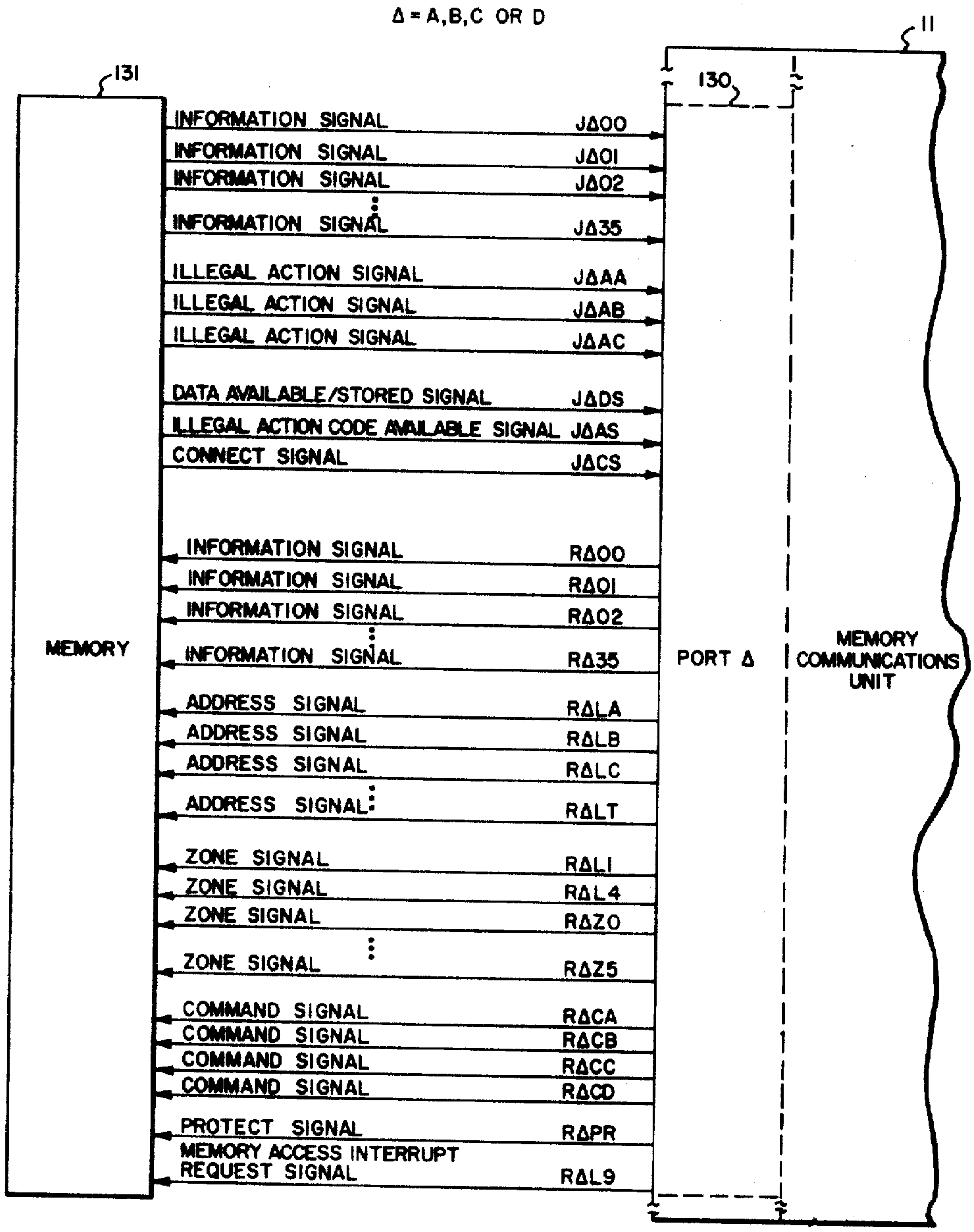
FIGURE 10 is a symbolic diagram illustrating the interconnection of the input/output controller and a memory.

FIG. 10 illustrates the group of lines interconnecting memory port 130 of memory communications unit 11 with memory 131 and the signals on these lines. Memory port 130 is designated port Δ where Δ is one of the alphanumeric characters A, B, C or D corresponding to one of the memory ports of the input/output controller.

*Signal transfer—Memory to memory communications unit.*—Referring to FIGURE 10, the input signals transmitted from memory 131 to memory port 130 include thirty-six information signals JΔ00–JΔ35 for transmitting information from memory 131 to memory port 130. The symbol Δ in the signal designations represents one of memory ports A–D with which the signals are associated. For example, signals JA00–JA35 identify the information bits being transmitted to memory port A from its corresponding memory. Similarly, signals JC00–JC35 identify the information bits being transmitted to memory port C from its corresponding memory. In addition to the information signals JΔ00–JΔ35, illegal action signals JΔAA–JΔAC, data available/stored signal JΔDS, illegal action code available signal JΔAS and connect signal JΔCS are transmitted from memory 131 to memory port 130.

The thirty-six information signals JΔ00–JΔ35 serve to transfer both mailbox words and data words from memory 131 to the corresponding memory port 130 of the memory communications unit. Illegal action code signals JΔAA, JΔAB and JΔAC indicate to the input/output controller whether or not an error was detected by memory 131 during its operation and the type of error detected, if any. The illegal action indications which may be transmitted by memory to the input/output controller are as follows:

(a) Non-existent address (001)—this illegal action code indicates that the input/output controller has transmitted to memory an address which exceeds the actual storage capability of memory.

(b) Parity error (011)—this illegal action code indicates that a parity error has occurred during execution of a read/restore command.

(c) No illegal action (000)—this code indicates that no illegal action has occurred in memory.

When more than one illegal action occurs simultaneously, only the code corresponding to the error of highest priority is transmitted. The order of priority of the illegal action codes, ranging from highest priority to lowest priority, is that presented above. The illegal action codes listed are employed in the memory error code fields of secondary mailbox word #4 (see FIGURE 2*f*) and the interrupt queue table words (see FIGURE 2*h*).

Data available/stored signal JΔDS is furnished by memory 131 to indicate to the input/output controller that one of the following events has occurred:

(a) Information has been placed on the information lines and is available to memory port 130 of the input/output controller in the form of information signals JΔ00–JΔ35; or (b) Information transmitted from memory port 130 of the input/output controller to memory 131 has been stored in the addressed storage location of memory and the storage cycle is completed.

Illegal action code available signal JΔAS is furnished by memory 131 to indicate to the input/output controller that the memory cycle requested by the input/output controller has been completed and that the illegal action code signals JΔAA–JΔAC are available on the illegal action lines. The illegal action information represented by the illegal action signals JΔAA, JΔAB and JΔAC is valid only at the time that the illegal action code available signal JΔAS occurs.

Connect signal JΔCS is transmitted from memory 131 to the input/output controller through memory port 130 to cause the input/out controller to initiate an input/output operation. In response to connect signal JΔCS, the input/output controller obtains mailbox words from memory 131, these mailbox words containing information required by the input/output controller to accomplish the input/output operation.

*Signal transfer—Memory communications unit to memory.*—The output signals transmitted from memory port 130 in FIGURE 10 to memory 131 include thirty-six information signals RΔ00–RΔ35, eighteen address signals RΔLA–RΔLT, eight zone signals RΔL1, RΔL4 and RΔZ0–RΔZ5, four command signals RΔCA–RΔCD, protect signal RΔPR and memory access interrupt request signal RΔL9. Information signals RΔ00–RΔ35 are used to transfer data words and program interrupt information, in addition to control information, from the input/output controller to memory 131. Address signals RΔLA–RΔLT specify the storage location in memory 131 from which information is to be transferred to the input/output controller or to which data is to be transferred from the input/output controller. The eighteen address signals RΔLA–RΔLT permit only one of up to 262,144 memory storage locations to be addressed. Zone signals RΔL1, RΔL2 and RΔZ0–RΔZ5 are employed during transefer of a single data character from memory 131 to the input/output controller to specify the character position in the word of the character to be transferred. The relationship between the zone signals and the character positions specified by the zone signals is illustrated as follows:

| Zone Signals | | | | | | | | Character or Bite, Position |
|---|---|---|---|---|---|---|---|---|
| RΔZ0 | RΔZ1 | RΔL1 | RΔZ2 | RΔZ3 | RΔZ4 | RΔL4 | RΔZ5 | (Figure 2a) |
| 0 | 0 | 0 | 0 | 0 | 0 | 0 | 1 | 5 |
| 0 | 0 | 0 | 0 | 0 | 1 | 1 | 0 | 4 |
| 0 | 0 | 0 | 0 | 1 | 0 | 0 | 0 | 3 |
| 0 | 0 | 0 | 1 | 0 | 0 | 0 | 0 | 2 |
| 0 | 1 | 1 | 0 | 0 | 0 | 0 | 0 | 1 |
| 1 | 0 | 0 | 0 | 0 | 0 | 0 | 0 | 0 |
| 1 | 1 | 1 | 1 | 1 | 1 | 1 | 1 | (1) |

[1] Entire word transferred.

As illustrated above, during the transfer of a word between the input/output controller and memory 131, zone control is not employed and each of zone signals RΔL1, RΔL4 and RΔZ0–RΔZ5 is a binary 1.

Command signals RΔCA–RΔCD are provided by the input/output controller to specify the operation to be performed by memory 131 when a memory access interrupt request is granted by memory 131. The following command signal codes and the commands corresponding to these codes are as follows:

| Command Signals | | | | |
|---|---|---|---|---|
| RΔCA | RΔCB | RΔCC | RΔCD | Command |
| 0 | 0 | 0 | 0 | Read/Restore: In response to this command, memory 131 places the contents of the storage location specified by address signals RΔLA–RΔLT, as represented by signals JΔ00–JΔ35, on the information lines to memory port 130 accompanied by data available/stored signal JΔDS. |
| 0 | 1 | 0 | 0 | Clear/Write: In response to this command, memory receives from the input/output controller the information represented by information signals RΔ00–RΔ35 and stores this information in the storage location specified by address signals RΔLA–RΔLT. The zone signals RΔL1, RΔL2 and RΔZ0–RΔZ5 determine, during transfer of a single character, the location of the character within a word. |
| 1 | 1 | 1 | 0 | Set Execute Interrupt Cells: In response to this command, memory 131 receives the program interrupt information represented by signals RΔ00–RΔ35 and stores this information in the interrupt cells which comprise the memory interrupt register of memory 131. |

Protect signal RΔPR is always a binary 1 and indicates to memory 131 that the input/output controller is permitted unrestricted access to all storage locations of memory. Memory access interrupt request signal RΔL9 is employed by the input/output controller to request access to memory 131, in order to transfer information or to transfer a program interrupt request between the input/output controller and memory 131.

Memory—Details

Figure 11:
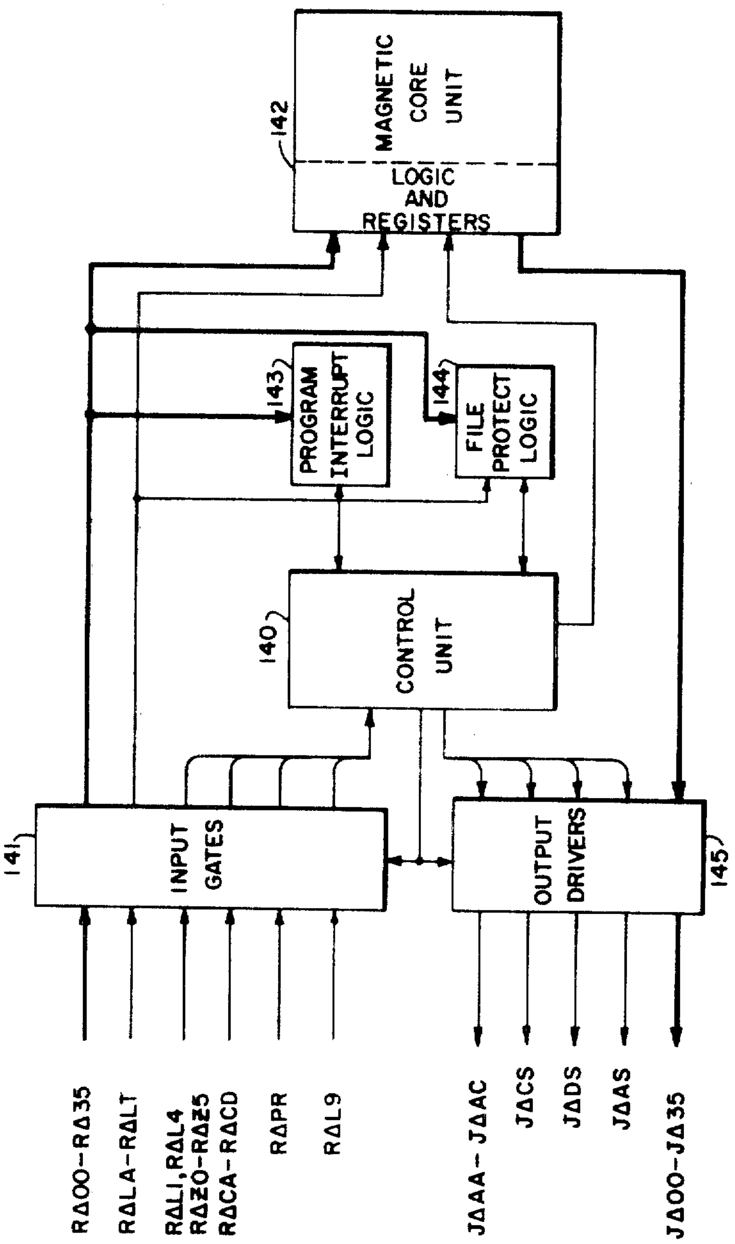
FIGURE 11 is a block diagram of a typical memory employed with the input/output controller of FIGURE 1.

FIGURE 11 is a block diagram of memory 131 indicating the general organization of the memory and the structure employed to receive and transmit signals transferred between memory 131 and memory port 130 of the input/output controller. Coordination and control of the operations within memory 131 are effected by control unit 140. Control unit 140 receives the zone, command, protect and memory access interrupt request signals transmitted by the input/output controller through input gates 141. Input gates 141 also direct the information signals to magnetic core unit 142, program interrupt logic 143 and file protect logic 144.

Program interrupt logic 143 includes the interrupt cells of the memory interrupt register. File protect logic 144 prohibits access to certain memory blocks if protect signal RΔPR is a binary 0. However, protect signal RΔPR the input/output controller is always a binary 1, permitting the input/output controller to have unlimited access to memory storage locations. Program interrupt logic 143 and file protect logic 144 communicate with control unit 140. Control unit 140, in response to signals provided by input gates 141, transmits control information to the logic and registers of magnetic core unit 142, as illustrated in FIGURE 11. The address signals transmitted by the input/output controller are directed by input gates 141 to file protect logic 144 and to magnetic core unit 142.

Information signals originating in magnetic core unit 142 during a read/restore operation are transmitted to the input/output controller through output drivers 145. Output drivers 145 also furnish, in response to signals from control unit 140, the illegal action, data available/stored, illegal action code available and connect signals to the input/output controller. Enabling and disabling signals for input gates 141 and output gates 145 are provided by control unit 140.

Memory operation

Command signals RΔCA–RΔCD, transmitted to memory 131 from the input/output controller, define the basic operations performed by memory 131 for the input/output controller. One of these basic operations is executed by memory 131 to serve the input/output controller upon acknowledgement by memory 131 of a memory access interrupt request signal RΔL9 from the input/output controller. If the input/output controller is connected to more than one memory, the memory to which a particular command is directed is controlled by the port address assignment switches. The commands which may be transmitted from the input/output controller to memory are "read/restore," "clear/write" and "set execute interrupt cells."

Figure 12:
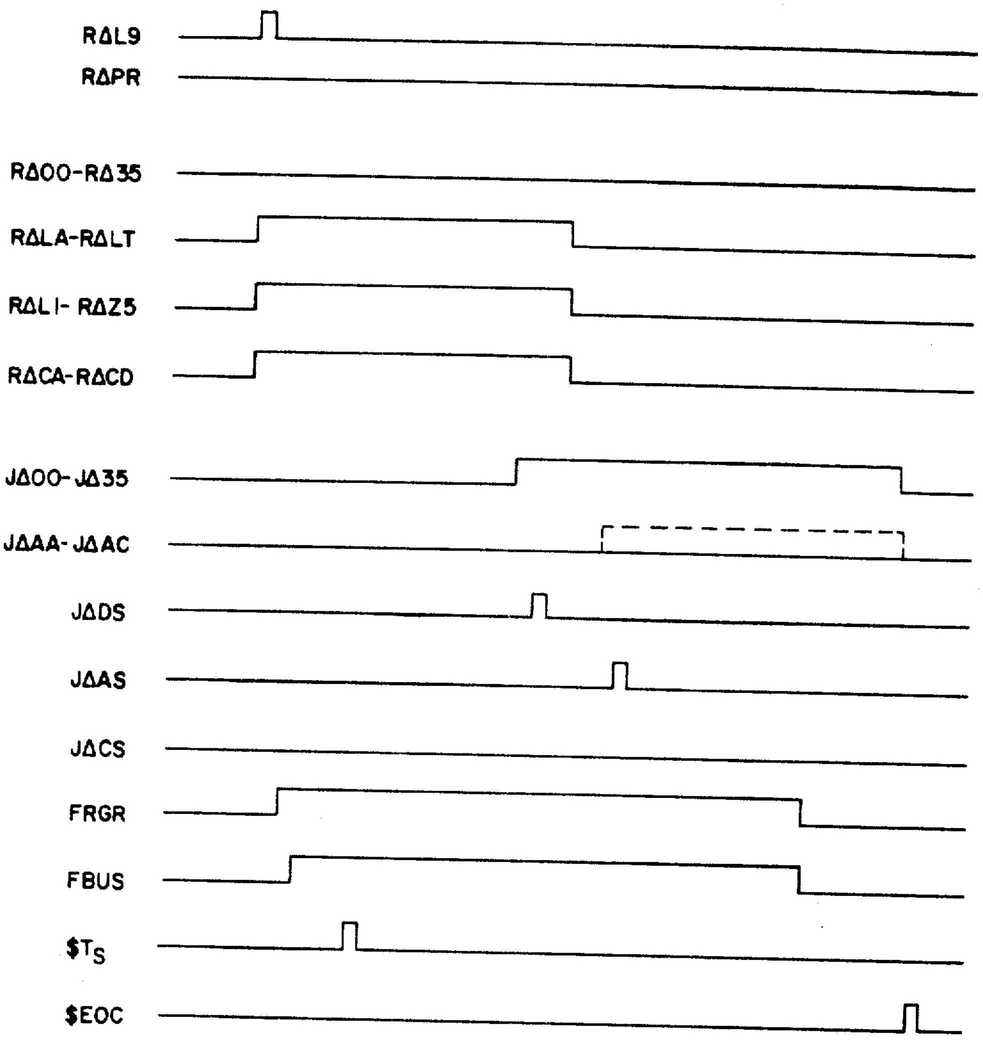
FIGURE 12 is a timing diagram illustrating the timing of signals which occur in response to transmission of a "read/restore" command from the input/output controller to a memory.

*Read/restore command.*—Transfer of information between memory 131 and the input/output controller is accomplished by a specific sequence of signals transmitted between memory 131 and the input/output controller. The sequence of signals which occurs during a read/restore command is illustrated in FIGURE 12. With reference to FIGURE 12, the sequence is initiated by the input/output controller which transmits the memory access interrupt request signal RΔL9 to memory 131, accompanied by address signals RΔLA–RΔLT, zone signals RΔL1, RΔL4 and RΔZ0–RΔZ5, command signals RΔCA–RΔCD and protect signal RΔPR. Command signals RΔCA–RΔCD specify the read-restore command. In response to a request signal RΔL9, flip-flop RGR in control unit 140 of memory 131 is set to the 1-state to provide signal FRGR, indicating that the request for a memory access interrupt has been given priority and granted. Subsequently, busy flip-flop BUS in memory control unit 140 is set to the 1-state to provide signal FBUS which blocks out all other memory access interrupt requests. Memory control unit 140 then generates signal $\$T_S$ to initiate and read/restore cycle in memory 131. During this read/restore cycle, memory 131 employs protect signal RΔPR and the address and zone information furnished by the input/output controller to read the desired information from the addressed memory location and place it on the information lines as signals JΔ00–JΔ35. At this time, memory 131 transmits the data available/stored signal JΔDS to the input/output controller to indicate that the information is present on the information lines. The zone signals are not used by memory 131 during a read/restore operation.

If an error has been detected by memory 131 during execution of the read/restore command, the nature of this error is indicated by the illegal action signals JΔAA–JΔAC and the availability of the illegal action signals is indicated to the input/output controller by illegal action code available signal JΔAS. The RGR and BUS flip-flops of memory control unit 140 are then reset to the 0-state and memory control unit 140 issues internal signal $EOC to indicate termination of command execution.

Figure 13:
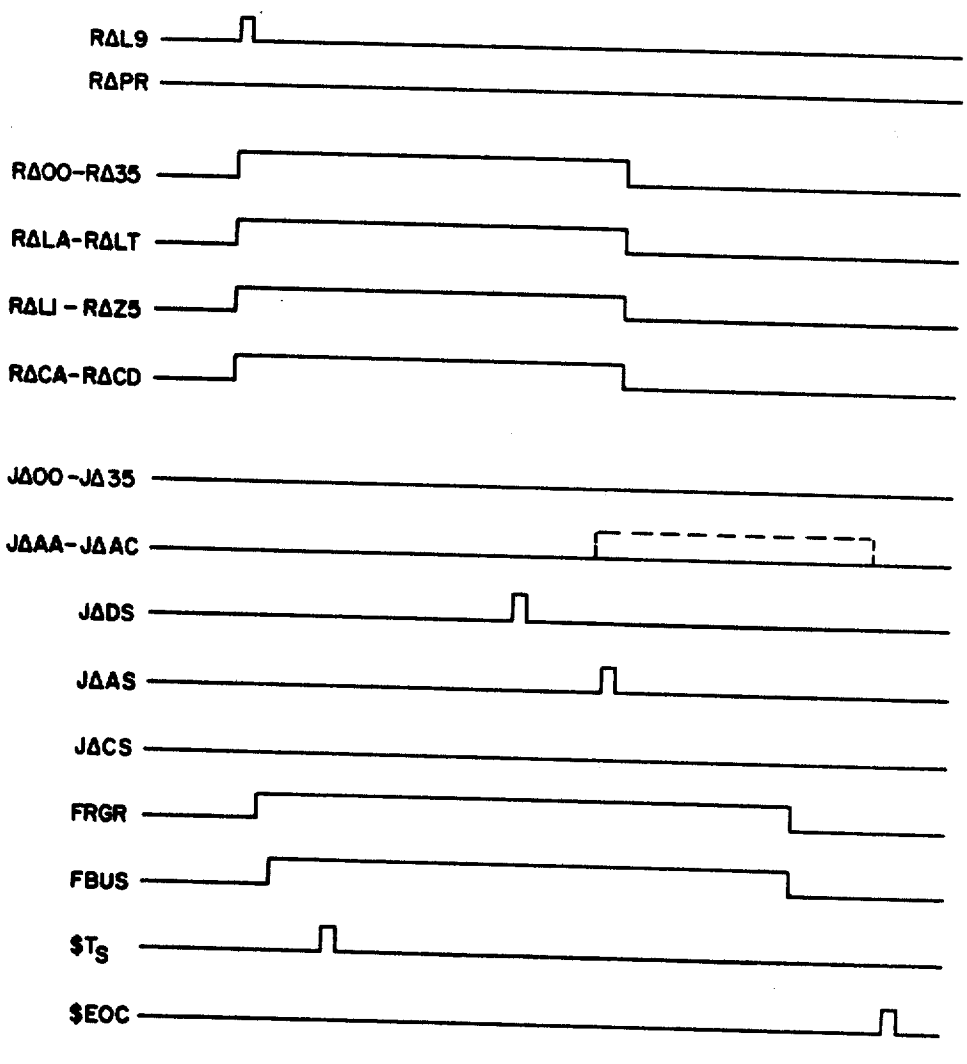
FIGURE 13 is a timing diagram illustrating the timing of the signals which occur in response to transmission of a "clear/write" command from the input/output controller to a memory.

*Clear/write command.*—During performance of a clear/write operation in response to a clear/write command from the input/output controller, memory 131 stores the information represented by information signals JΔ00–JΔ35 from the input/output controller in the memory location specified by address signals RΔLA–RΔLT. The signal sequence for the clear/write command, illustrated in FIGURE 13, is similar to that of the read/restore command. During the clear/write sequence, memory 131 clears the addressed memory location and then stores the information provided by the input/output controller in that location. Information signals JΔ00–JΔ35 are not employed to transfer information from memory 131 to the input/output controller, as shown in FIGURE 13. Memory 131 employs the zone signals during the clear/write command sequence.

Figure 14:
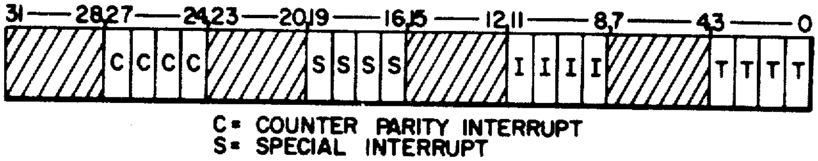
FIGURE 14 is a symbolic diagram illustrating the memory interrupt register of a memory employed with the input/output controller of FIGURE 1 and the contents of this register.

*Set execute interrupt cells command.*—During execution of the "set execute interrupt cells command," program interrupt request information is transmitted from the input/output controller to memory 131. This program interrupt request information is stored in the interrupt cells of the memory controller interrupt register contained in the memory program interrupt logic 143. The memory controller interrupt register, the organization of which is illustrated in FIGURE 14, comprises thirty-two execute interrupt cells connected in a priority sequence. FIGURE 14 also illustrates the cell corresponding to each type of interrupt request from each memory port. The program interrupt request transmitted by the input/output controller sets a predetermined one of the interrupt cells. The processor, which is also connected to memory, periodically checks the memory interrupt register for the presence of program interrupt requests set in the interrupt cells. Upon detection of a program interrupt request, the processor causes an appropriate subroutine to be executed to service the interrupt request.

Figure 15:
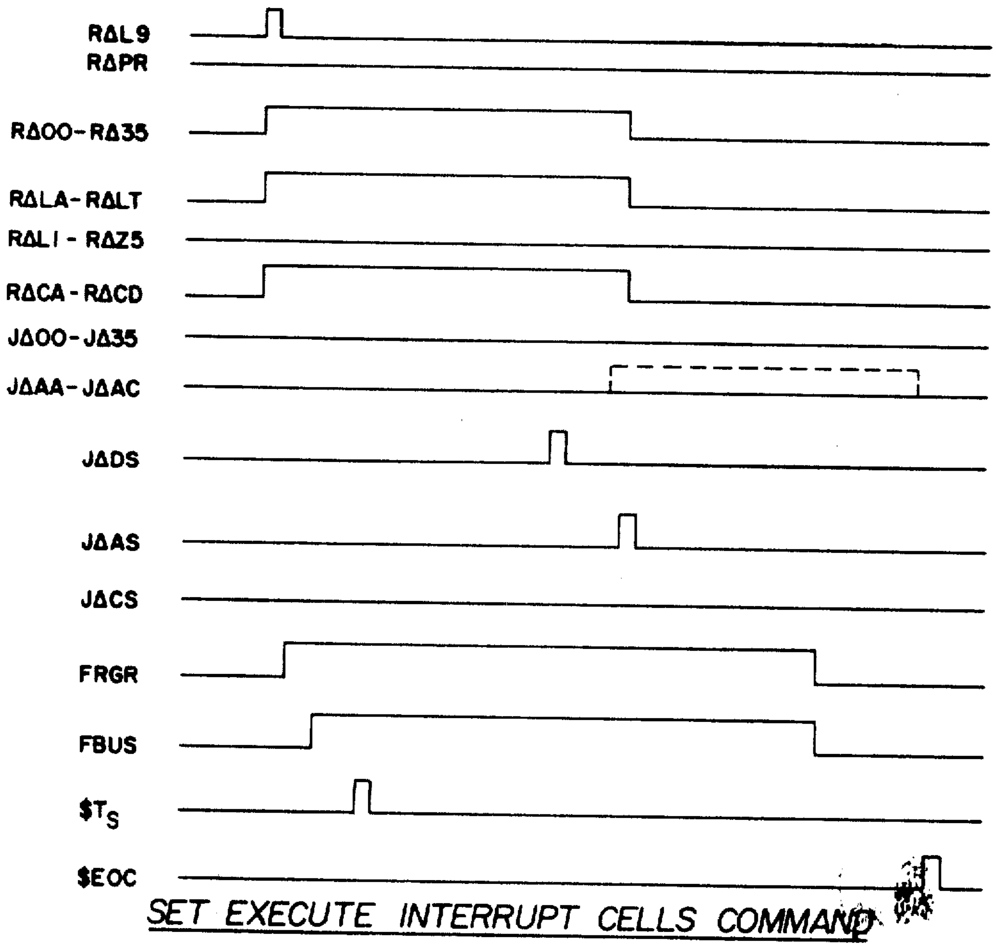
FIGURE 15 is a timing diagram illustrating the timing of signals which occur in response to transmission of a "set execute interrupt cells" command from the input/output controller to a memory.

The sequence of signals which occurs when the input/output controller stores program interrupt request information in the execute interrupt cells of the memory interrupt register is illustrated in FIGURE 15. As in the signal sequence of the clear/write command, the sequence is initiated by transmission of memory access interrupt request signal RΔL9 to memory 131, along with protect signal RΔPR, information signals RΔ00–RΔ35, address signals RΔLA–RΔLT and command signals RΔCA–RΔCD. The command signals define the "set execute interrupt cells" command. The information signals define which of the interrupt cells of the memory interrupt register are to be set during execution of the command by memory 131. Zone information is not transmitted to memory during execution of this command. As illustrated in FIGURE 14, the sequence of signals is similar to that of the clear/write command. The data available/stored signal JΔDS indicates to the input/output controller that the appropriate interrupt cells in the memory program interrupt logic have been set.

INPUT/OUTPUT CONTROLLER—FUNCTION

The input/output controller here described performs the function of harmonizing the asynchronous, data transfer patterns of the many peripheral subsystems with the operation of other elements of the data processing system. The input/output controller performs this function with minimum interference to the operation of the processors of the system, requiring only a connect signal provided by a processor through a memory to initiate operation of the input/output controller. In response to a connect signal, the input/output controller performs all required operations and informs the processor through a memory that the operations are completed. The input/output controller is able to service sixteen peripheral subsystems, each of which may be simultaneously performing a different operation. The data transfer operations performed by the input/output controller in servicing the peripheral subsystems are under its internal control.

Functionally, the input/output controller comprises three elements, a first element which communicates with the remainder of the data processing system (this element comprises the memory communications unit), a second element which controls the operation of the input/output controller (this element comprises the microprogram storage unit and the processing and control unit) and a third element which communicates with the peripheral subsystems (this element comprises the peripheral channel unit and the buffer storage unit). The second element of the input/output controller serves to provide a communications path at predetermined times between the first and third elements of the input/output controller, so that data and information may flow between a peripheral subsystem and a memory. Since a given peripheral subsystem requires the communications path provided by the second element between the first and third elements for only short time periods (the length of time required to transfer a word of information), each of the peripheral subsystems shares the second element of the input/output controller.

The second element of the input/output controller includes wired programs or routines which guide its operations. In response to a connect signal from a memory, the input/output controller utilizes the contents of the mailbox words and its own wired programs to perform and complete the required operations.

INPUT/OUTPUT CONTROLLER—DETAILS

The input/output controller coordinates and exercises operational control over all information transfers occurring between the plurality of peripheral subsystems and the plurality of memories in the data processing system. The input/output controller operates as a stored-program unit controlled by and sharing memory with a processor of the data processing system. Data transfers between the peripheral devices and the one or more memories are accomplished by the input/output controller, under the direction of mailbox words stored in the control memory, while the processor executes a program.

The input/output controller comprises the memory communications unit 11 (MEM section), the microprogram storage unit 10 (MIC section), the peripheral channel unit 13 (PUB section), the buffer storage unit 14 (BUF section) and the processing and control unit 12 (IOP section), as illustrated in FIGURE 1. Each of the sections comprises registers for temporarily storing information, logic circuits for transferring information between registers and flip-flops and one-shots employed as control signal sources. The PUB and IOP sections further include timing and control units for controlling the timing of operations in the input/output controller.

A description of the input/output controller operation is provided in a succeeding section entitled "Input/Output Controller—Operation" and in the sections following this section. The elements of the input/output controller and the structure interconnecting these elements comprise assemblages of the AND-gates, OR-gates, inverters, NAND-gates, NOR-gates, flip-flops, registers and one-shots discussed in the section entitled "Input/Output Controller Circuit Elements." Details of the structure of the input/output controller are provided in FIGURES 16–22, 24–26, 28–30 and 32–179.

The input/output controller will now be described with reference to FIGURE 16. FIGURE 16 illustrates diagrammatically the elements of the input/output controller which store information, the paths of information transfer between these elements, and certain logic circuits and control elements of the input/output controller.

Memory communications unit

Figure 16A:
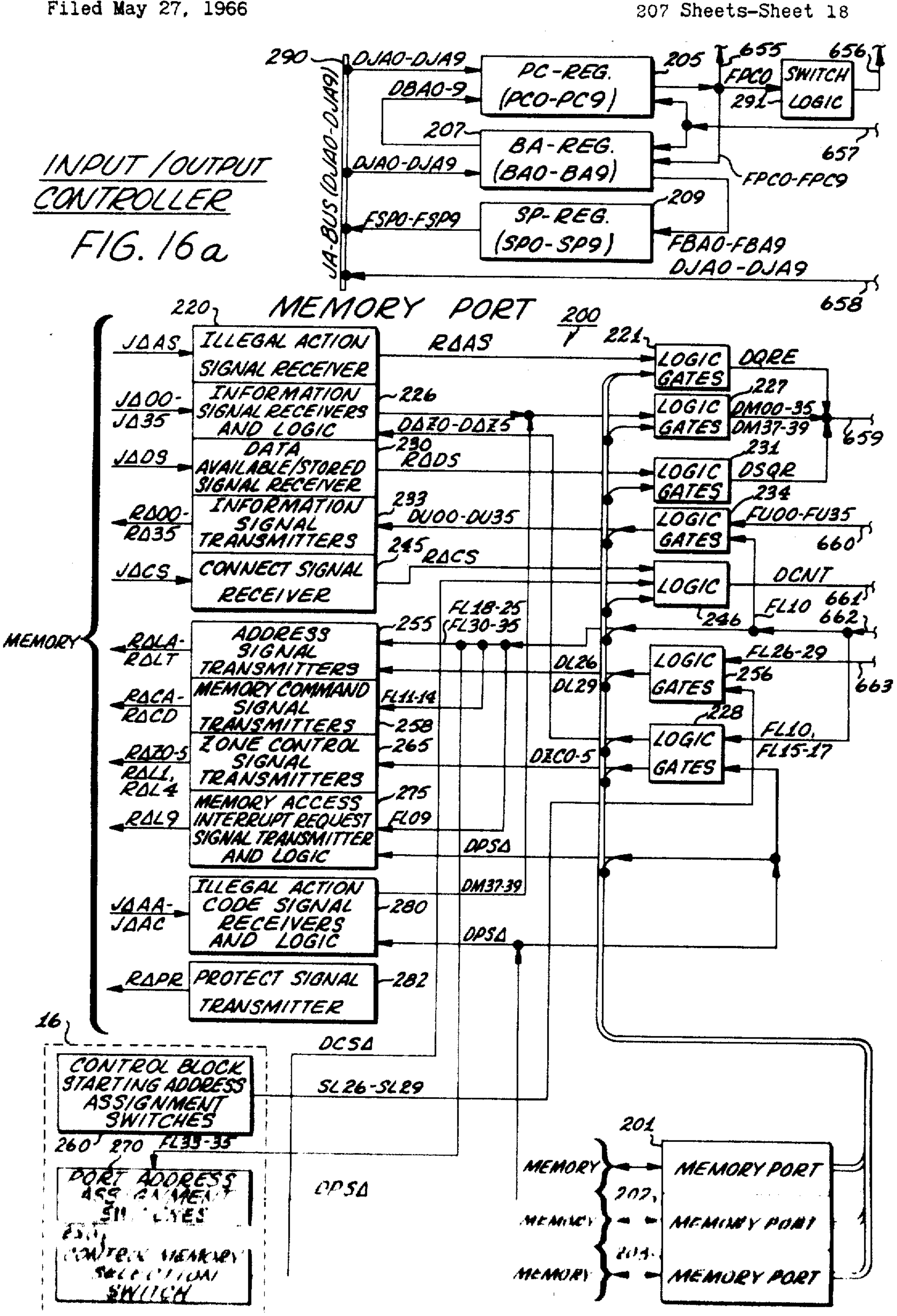
FIGURES 16*a*–16*f* comprise a block diagram of the input/output controller of FIGURE 1 illustrating the information storage elements, the information transfer paths between these elements, and the major control elements of the input/output controller, FIGURE 16*a* illustrating the memory communications unit of the input/output controller, FIGURE 16*b* illustrating the microprogram storage unit of the input/output controller, FIGURE 16*c* illustrating the peripheral channel unit of the input/output controller, FIGURE 16*d* illustrating the buffer storage unit of the input/output controller, and FIGURE 16*e* illustrating the processing and control unit of the input/output controller.
Figure 18:
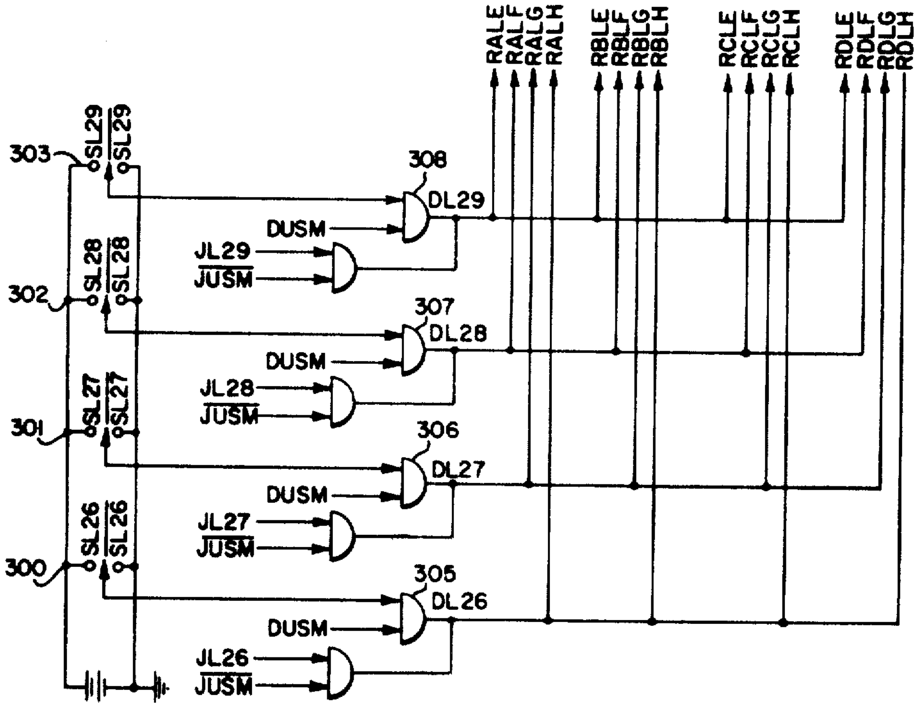
FIGURE 18 is a circuit diagram of the control block starting address assignment switches of the memory communications unit of FIGURE 16*a*.
Figures 19, 20:
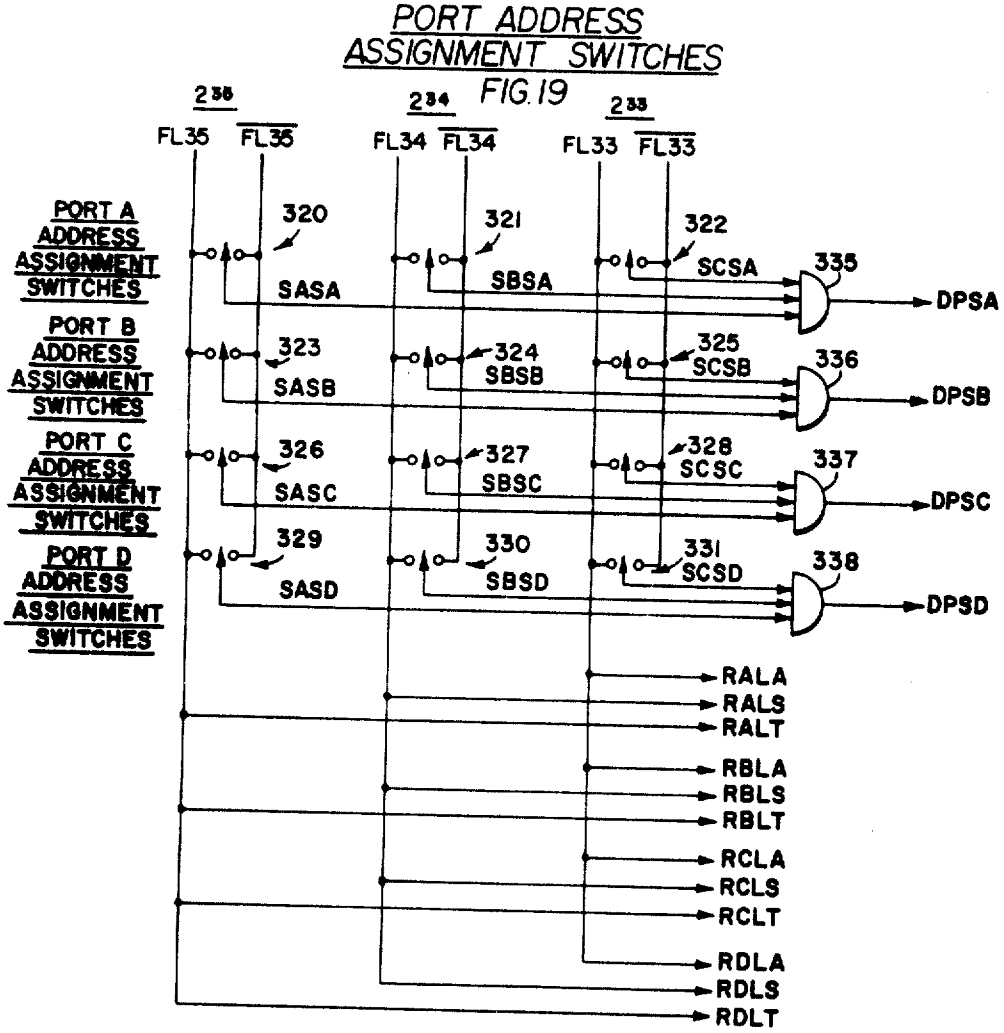
FIGURE 19 is a circuit diagram of the port address assignment switches of the memory communications unit of FIGURE 16*a*.
FIGURE 20 illustrates the relationship between the settings of the port address assignment switches of FIGURE 19 and the memory address range assigned to the corresponding memory.
Figure 21:
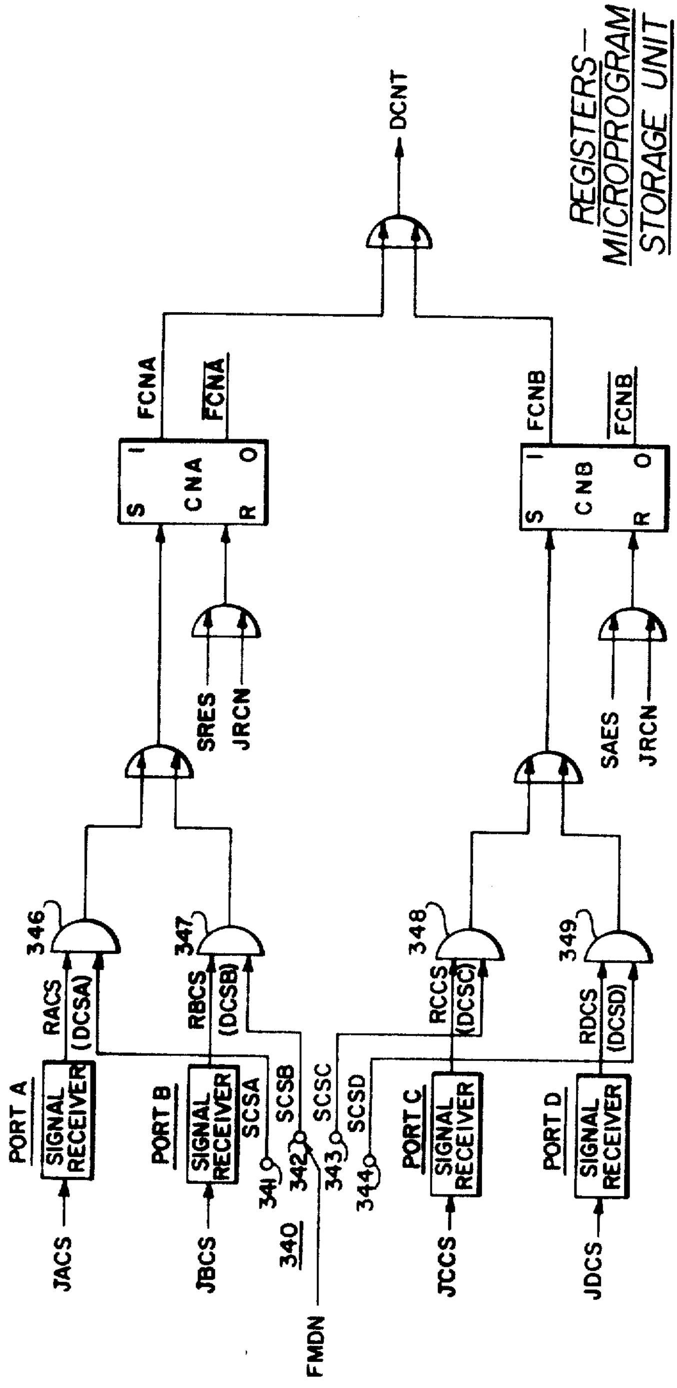
FIGURE 21 is a circuit diagram of the control memory selection switch in the memory communications unit of FIGURE 16*a* and the connect signal logic in the processing and control unit of FIGURE 16*e*.

The memory communications unit or MEM section of the input/output controller comprises memory ports 200, 201, 202 and 203, PC-register 205, BA-register 207, SP-register 209, switch logic 291 and control panel 16, as illustrated in FIGURE 16*a*. Each of the memory ports 200–203 comprises a plurality of signal receivers for receiving signals transmitted from the associated memory to the input/output controller and also a plurality of signal transmitters for transmitting signals from the input/output controller to the memory connected to the particular memory port. These signals providing communication between the input/output controller and from one to four memories are described in the section entitled "Input/Output Controller—Memory Communications." The details of the structure of the memory communications unit are provided in FIGURE 17, which illustrates the contents of the memory communications unit registers; FIGURE 18, which illustrates the control block starting address assignment switches; FIGURE 19, which illustrates the port address assignment switches; FIGURE 20, which illustrates port address assignment; FIGURE 21, which illustrates the control memory selection switch and connect signal logic; FIGURES 38–48, which are logical combination signal diagrams; FIGURES 49–51, which are flip-flop input logical schematic diagrams of the memory communications unit flip-flops employed in registers and counters and as control signal sources; and FIGURE 52, which illustrates one-shot input logical schematic diagrams.

The signal transmitters and receivers of port 200 and the signals being transmitted between memory and memory communications unit 11 are illustrated in FIGURE 16*a*. Illegal action signal receiver 220 receives illegal action signal JΔAS from memory and provides signal RΔAS to logic gates 221. The logical schematic diagrams illustrating the structure of the illegal action signal receivers of the four memory ports are provided in FIGURE 46. The symbol Δ may be any one of the alphanumeric characters A, B, C or D, identifying memory port A, memory port B, memory port C or memory port D respectively. Logic gates 221 also receive the illegal action signals from memory ports 201–203 to generate signal DQRE which sets flip-flop Q40 of Q-register 225 in the processing and control unit. Signal DQRE also gates illegal action information into Q-register flip-flops Q37–Q39. The structure of logic gates 221 is illustrated by the logical schematic diagrams in FIGURES 46, 48 and 52 of the logic chain generating signal DQRE.

Information signal receivers and logic 226 receive information signals JΔ00–JΔ35 from the memory connected to memory port 200 and provide corresponding output information signals for application to logic gates 227. Information signal receivers and logic 226 also receive as an input zone control gating signals DΔZ0–DΔZ5 from logic gates 228, in the event that a single character is being transmitted from memory to the input/output controller. The logical schematic diagrams of the portion of gates 228 providing the signals DΔZ0–DΔZ5 are illustrated in FIGURE 38. Logic gates 227 also receive corresponding inputs from memory ports 201–203 and generate signals DM00–DM35 which are applied to the corresponding flip-flops of Q-register 225. The logical schematic diagrams illustrating the structure of the information signal receivers and logic of the four memory ports and logic gates 227 are provided in FIGURES 44 and 45.

Data available/stored signal receiver 230 receives signal JΔDS from memory and provides signal RΔDS to logic gates 231. The logical schematic diagrams illustrating the structure of the data available/stored signal receiver of each of the four memory ports are provided in FIGURE 46. Logic gates 231 receive similar inputs from memory ports 201–203 to generate signal DSQR which is transmitted to Q-register 225 of the processing and control unit to set Q-register flip-flop Q36 and to cause information, represented by signals DM00–DM35 from logic gates 227, to be gated into flip-flops Q00–Q35 of Q-register 225.

Information signal transmitters 233 receive signals DU00–DU35 from logic gates 234 and provide information signals RΔ00–RΔ35 to the memory associated with memory port 200. The logical schematic diagrams illustrating the structure of the information signal transmitters of each of the memory ports are provided in FIGURES 40 and 41. Logic gates 234 receive the output signals FU00–FU35 of U-register 240 of the processing and control unit and also the output of flip-flop L10 of L-register 241 of the processing and control unit to generate signals DU00–DU35 for application to information signal transmitters 233. If a single character is being transmitted from the input/output controller to memory, this character is represented by signals FU30–FU35 from U-register 240. Logic gates 234, in response to signal FL10, place this character in each of the five remaining character positions represented by signals DU00–DU29. As a result, a word comprising six identical characters, represented by signals DU00–DU35, is supplied to information signal transmitters 233 for transfer to memory. Logic gates 234 provide identical output signals to memory ports 201–203. The logical schematic diagrams of logic gates 234 are provided in FIGURE 39.

Connect signal receiver 245 receives connect signal JΔCS from memory and provides signal RΔCS for application to logic 246. The logical schematic diagrams illustrating the structure of the connect signal receivers of each of the memory ports are provided in FIGURE 46. Logic 246 receives similar inputs from memory ports 201–203 and also receives signal DCSΔ from control memory selection switch 250 on control panel 16. Signal DCSΔ specifies the memory port through which the input/output controller may receive a connect signal to initiate an input/output operation. Control memory selection switch 250 on control panel 16 thus enables the system operator to specify the memory which is to exercise operational control over the input/output controller. This memory is called the control memory and contains the mailbox and interrupt queue words. A connect signal received from any other memory through its corresponding memory port is ignored by the input/output controller. Logic 246, in response to a signal from a connect signal receiver of one of memory ports 200–203 and in response to a corresponding signal from control memory selection switch 250, generates signal DCNT for application to flip-flop F07 of F-register 252 of the processing and control unit. The logical schematic diagrams of the logical chain which generates signal DCNT illustrates the structure of logic 246.

Address signal transmitters 225 receive address signals FL18–25 and FL30–35 from L-register 241 in the processing and control unit and address signals DL26–DL29 from logic gates 256. The logical schematic diagrams of the address signal transmitters of each of the memory ports are provided in FIGURE 42. Logic gates 256 receive address signals FL26–FL29 from L-register 241 and also signals SL26–SL29 from control block starting address assignment switches 260 on control panel 16. Logic gates 256 employ switch output signals SL26–SL29 to generate address signals DL26–DL29 when the input/output controller is transferring information to or from fixed memory locations in the control memory, for example during retrieval of primary or secondary mailbox words, or storage of information in the interrupt queue counters or the interrupt queue tables. At all other times, logic gates 256 employ signals FL26–FL29 to develop address signals DL26–DL29. Control block starting address assignment switches 260 are employed to specify the section of control memory in which the fixed memory locations are located. Address signal transmitters 225 provide address signals RΔLA–RΔLT to the memory connected to memory port 200. Memory ports 201–203 receive similar address signals from L-register 241 and logic gates 256. The logical schematic diagrams illustrating the structure of logic gates 256 are provided in FIGURE 48.

Memory command signal transmitters 258 receive signals FL11–FL14 from L-register 241 of the processing and control unit and provide memory command signals RΔCA–RΔCD to the memory connected to memory port 200. Memory ports 201–203 also receive the command signals represented by L-register output signals FL11–FL14. The logical schematic diagrams of the memory command signal transmitters of each of the four memory ports are provided in FIGURE 43.

Zone control signal transmitters 265 receive signals DZC0–DZC5 from logic gates 228 and provide zone control signals RΔZ0–RΔZ5, RΔL1 and RΔL4 to the memory connected to memory port 200. Memory ports 201–203 also receive the output signals of logic gates 228. The logical schematic diagrams of the zone control signal transmitters of the four memory ports are provided in FIGURE 43. Logic gates 228 receive the output signals of the L10 and L15–L17 flip-flops of L-register 241 and also receive output signal DPSΔ from port address assignment switches 270. Logic gates 228 employ signals FL10 and FL15–FL17 to develop signals DZC0–DZC5 for application to zone control signal transmitters 265 and employ signals FL10, FL15–FL17 and DPSΔ to develop signals DΔZ0–DΔZ5 for application to information signal receivers and logic 226. The logical schematic diagrams of logic gates 228 are provided in FIGURES 38 and 49.

Memory access interrupt request signal transmitter and logic 275 receives signal FL09 from L-register 241 and signal DPSΔ from port address assignment switches 270 to provide memory access interrupt request signal RΔL9 to the memory connected to memory port 200. Signals FL09 and DPSΔ are also transmitted to memory ports 201–203. The logical schematic diagrams of the request signal transmitters and logic of each of the memory ports are provided in FIGURE 44. Since signal DPSΔ identifies only one memory port, only the identified memory port will transmit a memory access interrupt request signal to its associated memory in response to signal FL09.

Illegal action code signal receivers and logic 280 receive illegal action code signals JΔAA–JΔAC from the memory connected to memory port 200. Illegal action code signal receivers and logic 280 also receive signal DPSΔ from port address assignment switches 270 and provide signals DM37–DM39 to logic gates 227 for transmission to Q-register 225 of the processing and control unit. Logic gates 227 receive illegal action code signals from only one of memory ports 200–203, as specified by signal DPSΔ. The logical schematic diagrams of the illegal action code signal receivers and logic of the memory ports are provided in FIGURE 45.

Protect signal transmitter 282 is connected to a source of positive potential and continuously provides protect signal RΔPR to the memory connected to memory port 200. The logical schematic diagrams of the protect signal transmitters of the four memory ports are provided in FIGURE 43. The signal designation VP06 in the logical schematic diagrams identifies a constant potential representing a binary 1. This protect signal permits the input/output controller to have access to all areas of memory.

Control panel 16 of the memory communications unit 11 comprises control block starting address assignment switches 260, port address assignment switches 270 and control memory election switch 250. Control block starting address assignment switches 260 provide signals SL26–SL29 which are applied to logic gates 256 to specify, in conjunction with signals FL18–FL25 and FL30–FL35, the section of the control memory which contains the mailbox words and the interrupt queue words. Signals SL26–SL29 are employed by logic gates 256 only during transfer of information to or from these fixed memory locations.

Port address assignment switches 270 receive high-order address signals FL33–FL35 from L-register 241 of the processing and control unit. Port address assignment switches 270 include three switches for each memory port, the settings of the three switches determining the range of addresses to be employed with the memory connected to that port. Address signals FL33–FL35 are effectively compared with the settings of the switches associated with each port to determine the port connected to the memory having a range of addresses including the particular address. Port select output signal DPSΔ of port address assignment switches 270 is generated to specify that port. Signal DPSΔ controls the transmission of a memory access interrupt request signal to the port connected to the memory having the range of addresses including the given address and also controls the receipt of illegal action code signals from that memory and the transmission of zone control information to the information signal receivers of the port connected to that memory. The logical schematic diagrams of port address assignment switches 270 are provided in FIGURE 39.

Control memory selection switch 250 provides signal DCSΔ to identify the memory port connected to the memory which is to be considered the control memory. Signal DCSΔ is applied to logic 246, permitting a connect signal to be received only through the port connected to that control memory.

The signal transmitters illustrated for memory port 200 are duplicated in each of memory ports 201–203. These signal transmitters 233, 255, 258, 265, 275 and 282 amplify the signals being transmitted to the corresponding memory, control the pulse width if the information is being transmitted in the form of pulses, provide impedance matching with the cable employed to carry the signals to memory and, in some cases, perform a logic function. Signal receivers 220, 226, 230, 245 and 280 are also duplicated in each of memory ports 201–203. These signal receivers provide impedance matching for the signal transmission lines carrying the signals from memory to the memory port, amplify the received signals and, in some instances, perform a logic function on the received signals.

Memory communications unit 11 of the input/output controller also includes JA-bus 290 which serves as a transfer path for address information in the memory communications unit. The logical schematic diagrams illustrating the circuits providing inputs to JA-bus 290 are shown in FIGURES 38 and 143. PC-register 205 is a nine bit binary counter which provides a program or microstep address to microprogram storage unit 10. The logical schematic diagrams of PC-register 205 are provided in FIGURES 50 and 51. The output of PC-register 205 is applied to switch logic 291 of the memory communications unit and is also transmitted to gates 292 of the microprogram storage unit. Switch logic 291 receives signal FPC0, the lowest-order bit in the output of PC-register 205, to generate either signal DMAA or DMAB.

BA-register 207 of the memory communications unit also receives the outputs of PC-register 205, the logic associated with BA-register 207 serving to increment the count in PC-register 205 by one. The logical schematic diagrams of BA-register 207 are provided in FIGURES 49 and 50. The output of BA-register 207 is applied to PC-register 205. SP-register 209 receives as its input the output of BA-register 207. The logical schematic diagrams of SP-register 209 are provided in FIGURE 51. SP-register 209 serves to store the program count when a jump address is applied to BA-register 207 and PC-register 205 on JA-bus 290. Such jump addresses, which cause the input-output controller to discontinue one routine and to enter another, are provided by jump address encoder 298 of processing and control unit 12. The contents of registers 205, 207 and 209 are illustrated diagrammatically in FIGURE 17.

Control panel

Control panel 16 of the memory communications unit enables the operator to manually control, to a certain extent, operations within the input/output controller. Control panel 16 includes control block starting address assignment switches 260, port address assignment switches 270 and control memory selection switch 250.

*Control block starting address assignment switches.*—The control block starting address assignment switches and the logic associated with these switches are illustrated in FIGURE 18. Potentials representing a binary 1 and a binary 0 are applied to respective pairs of contacts of single-pole, double-throw switches 300, 301, 302 and 303, as illustrated. The movable contact of each of the switches 300–303 may be moved to form an electrical connection with either of the remaining two contacts of the switch, the resulting signal on the movable contact being transmitted to respective AND-gates 305, 306, 307 and 308. The output signal of switch 300 is identified as signal SL26 if a binary 1 or $\overline{\text{SL26}}$ if a binary 0. The output signals of switches 301, 302 and 303 are identified as signals SL27, SL28 and SL29 respectively, if a binary 1, or the corresponding logically inverse signals, if a binary 0. If logical combination signal DUSM is applied to AND-gates 305–308, indicating that an operation requiring access to a fixed memory location of the control memory is being performed, signals DL26–DL29 at the outputs of AND-gates 305–308 respectively represent the signals generated by switches 300–303. Signals DL26–DL29 form the ninth through twelfth bits of the eighteen bit address applied to memory. Signals DL26–DL29 therefore determine which section of the control memory contains the memory locations storing a mailbox and interrupt queue words. The basic fixed memory locations are described in the section entitled "Memory." These basic locations are used if the output signals of switches 300–303 are binary 0's. If the output signal of switch 300 is a binary 1, 400 (octal) is added to the basic addresses to define the reserved memory locations. If the output of switch 301 is a binary 1, 1000 (octal) is added to the basic address. Similarly, if the outputs of switches 302 and 303 are binary 1's, 2000 and 4000 respectively are added to the listed basic addresses to define the actual memory locations.

If signal DUSM is a binary 0, the ninth through twelfth bits of the eighteen bit address transmitted to each of the memory ports is determined by address signals FL26–FL29 which represent the states of L-register flip-flops L26–L29 respectively.

*Port address assignment switches.*—FIGURE 19 illustrates the port address assignment switches and accompanying logic which generate signals DPSA, DPSB, DPSC and DPSD. One of these signals issues in response to each address stored in L-register 241 of the processing and control unit to identify the port to which the memory, having an address range including the address in L-register 241, is connected. Referring to FIGURE 19, the three highest-order address signals FL33–FL35 from L-register 241 and the logically inverse forms of the signals are applied to respective pairs of contacts of port A address assignment switches 320, 321 and 322, port B address assignment switches 323, 324 and 325, port C address assignment switches 326, 327 and 328 and port D address assignment switches 329, 330 and 331. The movable contact of each of single-pole, double-throw switches 320–331 may be moved to make an electrical connection with either of the two fixed contacts of the switch or may be left in the neutral position out of contact with either of the fixed contacts. In the neutral position, the output signal from the switch is floating.

The output signals from each of the switches associated with one of the ports, for example port A, are applied to an AND-gate. The output signals of port A address assignment switches 320–322 are applied to AND-gate 335, the output signals of port B address assignment switches 323–325 are applied to AND-gate 336, the output signals of port C address assignment switches 326–328 are applied to AND-gate 337 and the output signals of port D address assignment switches 329–331 are applied to AND-gate 338. The output signals of AND-gates 335–338 are designated DPSA–DPSD respectively.

The positions of the movable contact of the address assignment switches 320–331 and the state of the input signals to the address assignment switches determine which of AND-gates 335–338 will be enabled to generate its corresponding output signal, selecting one of the four memory ports. FIGURE 20 illustrates the possible combinations of switch settings when the low-order switch is moved between the binary 1, the binary 0 and the neutral position while the two higher-order switches assume either the binary 1 or binary 0 positions. This pattern of switch settings is employed when the memory connected to each memory port has a maximum storage capacity of 65,536 words. Thus, if port A is connected to a memory having a storage capacity of 65,536 words and if port A address assignment switch 320 is connected to the binary 0 fixed contact, port A address assignment switch 321 is connected to the binary 1 fixed contact, and port A address assignment switch 322 is in the neutral position, any address in the range of 65,536–131,071 will cause signal DPSA to issue. Signal DPSA will cause a memory access interrupt request to be transmitted to the memory connected to port A and will permit illegal action signals to be received from the memory connected to port A.

*Control memory selection switch.*— FIGURE 21 illustrates the control memory selection switch of control panel 16 and the associated logic for controlling the port through which a connect signal will be accepted. Referring to FIGURE 21, the movable contact of the control memory selection switch 340 is energized by signal FMDN and is movable to form an electrical contact with any one of four fixed contacts 341–344, each fixed contact being associated with one of the four memory ports. Fixed contact 341 is associated with port A while fixed contacts 342, 343 and 344 are associated with memory ports B, C and D respectively. If the movable contact is positioned to form an electrical connection with fixed contact 341, signal SCSA issues to provide signal DCSA to AND-gate 346. If the movable contact is positioned to form an electrical connection with fixed contact 342, signal SCSB issues to provide signal DCSB to AND-gate 347. Similarly, if the movable contact of control memory selection switch 340 is positioned to form an electrical contact with either of fixed contacts 343 or 344, signals SCSC or SCSD issue to provide signals DCSC or DCSD respectively to AND-gates 348 and 349. Signals DCSA, DCSB, DCSC and DCSD are enabling signals which permit a connect signal received from the memory connected to the corresponding port to be accepted in the input/output controller. A connect signal accepted from either port A or port B sets flip-flop CNA to the 1-state, causing signal DCNT to issue. Similarly, if a connect signal is accepted from either port C or port D, flip-flop CNB is set to the 1-state, causing signal DCNT to issue. Thus, control memory selection switch 340 permits the input/output controller to accept a connect signal only from the memory connected to the port corresponding to the position of the control memory selection switch. The control memory selection switch therefore designates the control memory by determining the one memory from which the input/output controller may receive a connect signal.

Microprogram storage unit

The IOC command contained in the primary mailbox word may be any one of five, as described in the section entitled "Primary Mailbox Word." This IOC command determines the operation to be performed by the input/output controller. The IOC command of the primary mailbox word is supplemented by information contained in the secondary mailbox words corresponding to the peripheral channel addressed by the primary mailbox word. Thus, the total command information received by the input/output controller is provided by the primary and secondary mailbox words. The input/output controller may receive additional commands before completing execution of a prior command since storage is provided for the command information.

In executing the operation required by the command information contained in the primary mailbox word and the appropriate secondary mailbox words, the input/output controller performs one or more routines stored in the microprogram storage unit. The routine performed by the input/output controller at a given time is determined by the contents of F-register 252 of the processing and control unit. Each routine comprises a plurality of microsteps. The sequence of microsteps in a given routine is controlled by PC-register 205 of the memory communications unit which serves as a program counter. The count or microstep address in PC-register 205 may be altered, in response to conditions occurring in the input/output controller, to transfer from one subroutine to another subroutine within each routine or to change from one routine to another routine. The routines stored in the microprogram storage unit are the data service routine, the terminate interrupt routine, the special interrupt routine and the connect routine. Each of these routines comprises a variety of subroutines. The latter three routines may be interrupted by the data service routine on reset lockout microsteps. However, none of the latter three routines may interrupt the data service routine or each other.

Each count or microstep address furnished by PC-register 205 to the microprogram storage unit identifies one microstep of a routine. In response to each address, the microprogram storage unit generates a plurality of control signals which are transmitted to the processing and control unit of the input/output controller. These control signals control the execution of the corresponding microstep in the input/output controller.

Figures 16B, 16F:
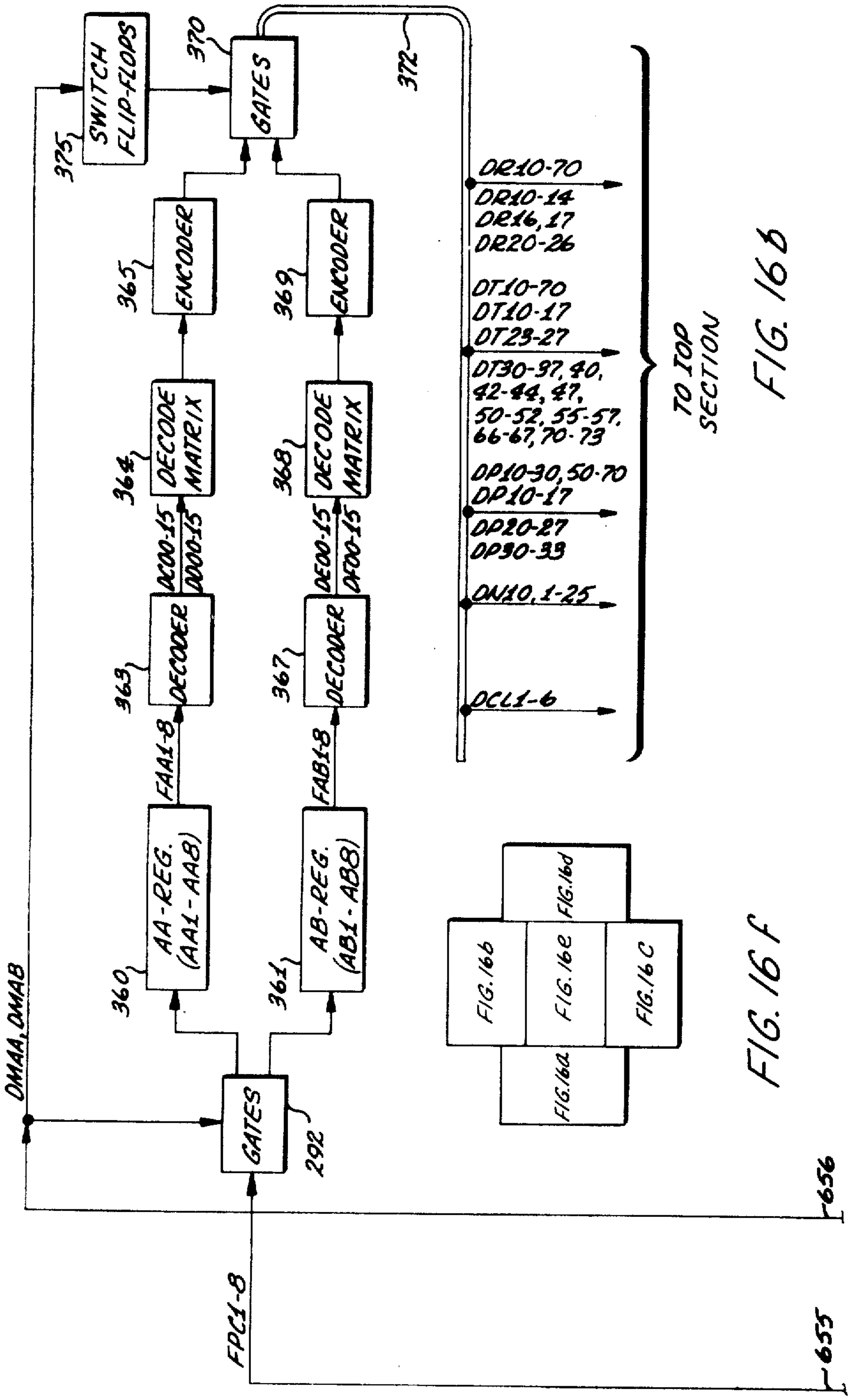

The microprogram storage unit or MIC section of the input/output controller comprises AA-register 360, AB-register 361, decoder 363, decoder matrix 364, encoder 365, decoder 367, decode matrix 368, encoder 369, gates 370, switch flip-flops 375 and gates 292, as illustrated in FIGURE 16*b*. Microprogarm storage unit 10 receives a microstep address or program count from PC-register 205 of the memory communications unit and, in response to each address, generates a predetermined combination of control signals which are transmitted to processing and control unit 12. As indicated above, processing and control unit 12 utilizes the control signals provided by the microprogram storage unit to control the execution of microsteps in the input/output controller. The microprogram storage unit stores a number of routines, each comprising a plurality of microsteps, and serves as a fixed program storage unit for the input/output controller. FIGURE 22 illustrates the contents of the microprogram storage unit registers. The details of the structure of the microprogram storage unit are provided in FIGURES 53–78, which are logical combination signal diagrams and in FIGURES 79 and 80, which are flip-flop input logical schematic diagrams of microprogram storage unit flip-flops employed in registers and switches.

Signals FPC1–FPC8 from PC-register 205 are applied to gates 292, in addition to either of signals DMAA or DMAB from switch logic 291 of the memory communications unit. Signal DMAA enables gates 292 to transmit an even eight-bit address to AA-register 360. Signal DMAB enables gates 292 to transmit an odd eight-bit address to AB-register 361. The input logical schematic diagrams of AA-register 360 and AB-register 361 are provided in FIGURE 79. The contents of registers 360 and 361 are diagrammatically illustrated in FIGURE 22.

An even address in AA-register 360 is applied to decoder 363 which generates output signals DC00–DC15 and DD00–DD15. The logical schematic diagrams of decoder 363 are provided in FIGURES 63–65. These output signals are applied to decode matrix 364 which is a 16×16 selection matrix producing 256 output signals which are applied to encoder 365. The logical schematic diagrams of decode matrix 364 are provided in FIGURES 53–63. Encoder 365, in response to the 256 output signals of decode matrix 364, generates a predetermined combination of 115 control signals corresponding to the address in AA-register 360. These control signals are applied to gates 370. The logical schematic diagrams of encoder 365 are provided in FIGURES 67–77.

The address in AB-register 361 is applied to decoder 367. Output signals DE00–DE15 and DF00–DF15 of decoder 367 are applied to decode matrix 368, the 256 output signals of decode matrix 368 being encoded to form a predetermined combination of 115 control signals in encoder 369. The logical schematic diagrams of decoder 367 are provided in FIGURES 65 and 66. The logical schematic diagrams of encoder 369 are provided in FIGURES 67–77. The output of encoder 369 is also applied to gates 370.

Switch flip-flops 375 are set to the 1-state by signal DMAA transmitted by switch logic 291 or reset to the 0-state by signal DMAB from the same source. When switch flip-flops 375 are set to the 1-state, gates 370 apply the output signals of encoder 369 to control signal bus 372. When switch flip-flops 375 are reset to the 0-state, gates 370 are enabled to apply the control signal output of encoder 365 to control signal bus 372. The logical schematic diagrams of switch flip-flops 375 are provided in FIGURE 80.

The microstep control signals generated in the microprogram storage unit and provided on microstep control signal bus 372 are of five types, class signals, transmit signals, process signals, receive signals and N-signals. The identification of the six class signals, the forty-nine transmit signals, the twenty-six process signals, the nineteen receive signals and the fifteen N-signals are as illustrated in FIGURE 16*b*.

The provision of duplicate decode-encode apparatus in the microprogram storage unit permits overlapping of the execution of one microstep in the input/output controller with generation of the control signals required to execute the next microstep. This arrangement permits higher speed operation of the input/output controller. In operation, when signal FPC0 is present, indicating an even microstep address, signal DMAA issues and the even microstep address in PC-register 205, as represented by signals FPC1–FPC8, is directed by gates 292 to AA-register 360. In response to the address in AA-register 360, decoder 363, decode matrix 364 and encoder 365 generate a predetermined combination of control signals for application to gates 370. Signal DMAA sets switch flip-flops 375 to the 1-state, the 1-output signals of switch flip-flops 375 causing gates 370 to apply the control signal output of encoder 369 to control signal bus 372.

The contents of the PC-register 205 in the memory communications unit is also applied to BA-register 207, the address being incremented by one and transferred back to PC-register 205. After this address updating, signal FPC0 issues, indicating that the microstep address is odd. In response to signal FPC0, switch logic 291 generates signal DMAB which is applied to gates 292 to gate the odd microstep address in PC-register 205 to AB-register 361. Signal DMAB simultaneously causes switch flip-flops 375 to be reset to the 0-state, the 0-outputs of switch flip-flops 375 causing gates 370 to apply the output of encoder 365 to control signal bus 372. During execution of the microstep corresponding to the even address in AA-register 360 under direction of the control signals on control line bus 372, decoder 367, decode matrix 368 and encoder 369 complete the generation of a new combination of control signals corresponding to the odd address in AB-register 361.

Thus, the provision of duplicate decode-encode apparatus of the microprogram storage unit insures that the control signals necessary for execution of the next microstep in the input/output controller are available at gates 370 prior to termination of execution of the current microstep. The input/output controller is therefore able to immediately initiate execution of the next microstep upon completion of the current microstep.

*Microstep execution and control signal generation.*— In operation, the microprogram storage unit receives in AA-register 360 an even microstep address transmitted from the memory communications unit while providing to the processing and control unit the control signals generated in response to the odd microstep address in AB-register 361. Upon completion of execution of the microstep corresponding to the odd address in AB-register 361, the next successive odd microstep address is received in AB-register 361 and decoded and encoded, while the control signals generated in response to the even microstep address in AA-register 360 are provided to the processing and control unit. Upon completion of execution of the microstep corresponding to the even address in AA-register 360, the next successive even address is received in AA-register 360, while the control signals generated in response to the odd microstep address in AB-register 361 are provided to the processing and control unit. Thus, the control signals necessary to effect execution of the next microstep of a routine in the input/output controller are generated during execution of the previous microstep of the routine and are available for use immediately upon completion of the previous microstep. This arrangement conserves processing time in the input/output controller.

Figure 23:
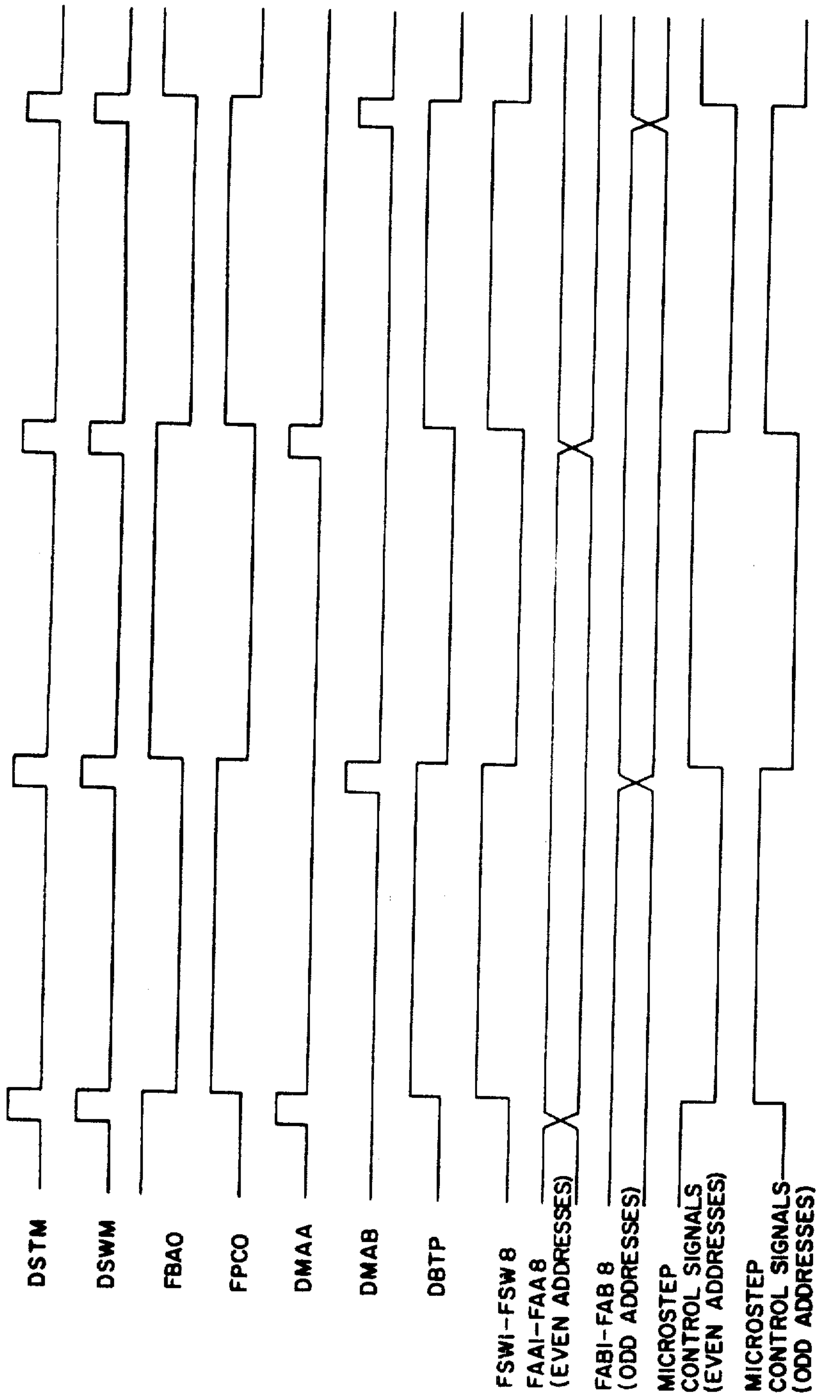
FIGURE 23 is a timing diagram illustrating the generation of control signals in the microprogram storage unit of Figure 16*b*.

FIGURE 23 is a timing diagram which illustrates the timing of operations in the microprogram storage unit during generation of microstep control signals for application to control signal bus 372. Referring to FIGURE 23, signal pulse DSTM is generated by timing sequence control 528 of the processing and control unit. Switch microstep signal DSWM is generated in response to signal DSTM. If the low-order flip-flop PC0 of PC-register 205 is reset to the 0-state and the low-order flip-flop BA0 of BA-register 207 is set to the 1-state, flip-flop PC0 is set to the 1-state to advance the program count in PC-register 205 while flip-flop BA0 is simultaneously reset to the 0-state.

Signal DMAA issues in response to signal DSWM when flip-flop PC0 is reset to the 0-state. Upon issuance of signal DMAA, switch flip-flops FSW0–FSW8 are set to the 1-state. Signal DMAA gates an even microstep address from PC-register 205 into AA-register 360. The odd microstep address which was previously stored to AB-register 361 remains unchanged. The microstep control signals generated by decoder 367 decode matrix 368 and encoder 369 in response to this odd microstep address in AB-register 361 are available at output gates 370 at this time. In response to the set state of flip-flops SW1–SW8, these microstep control signals generated in response to the odd address in AB-register 361 are gated to control signal bus 372 and are employed to control execution of a microstep in the input/output controller. Signal DBTP also issues at this time.

During the time elapsing between the first DSTM and the second DSTM pulses, as illustrated in FIGURE 23, the microstep defined by the microstep control signals on control signal bus 372 is performed by the input/output controller. During this same time period, the control signals corresponding to the even microstep address in AA-register 360 are generated in decoder 363, decode matrix 364 and encoder 365. These microstep control signals, corresponding to the even address in AA-register 360, are applied to gates 370, preparatory to execution of the next microstep. When signals DSTM and DSWM subsequently issue, signal DMAB issues to cause switch flip-flops SW1–SW8 to be reset to the 0-state. Signals $\overline{FSW1}$–$\overline{FSW8}$ cause the control signals generated in response to the even microstep address in AA-register 360 to be gated to control signal bus 372, initiating performance of the next microstep. Signal DMAB also causes the next odd microstep address to be transmitted from PC-register 361. Signal DBTP causes flip-flop PC0 of PC-register 205 to be reset to the 0-state. Simultaneously, flip-flop BA0 of BA-register 207 is set to the 1-state. The change of state of flip-flop BA0 causes the count in PC-register 205 to be incremented by one each time that signal DSTM issues.

During the time period elapsing between the second and third DSTM pulses, as illustrated in FIGURE 23, the microstep identified by the even address in AA-register 360 is executed while the control signals corresponding to the odd microstep address in AB-register 361 are generated and applied to gates 370. Upon termination of execution of the microstep, signals DSTM and DSWM again occur, causing signal DMAA to issue. Signal DMAA sets switch flip-flops SW1–SW8 to the 1-state and causes the next successive even microstep address to be transferred from PC-register 205 to AA-register 360. Signals FSW1–FSW8 switch the control signals generated in response to the odd address in AB-register 361 to control signal bus 372 to initate execution of the next microstep in the input/output controller. Flip-flops BA0 and PC0 change states and signal DBTP again issues.

During the time period between the third and fourth DSTM pulses, the microstep initiated by the control signals corresponding to the odd address in AB-register 361 is performed while the control signals corresponding to the even address in AA-register 360 are generated. Upon occurrence of the fourth DSTM pulse, signal DMAB issues to reset the switch flip-flops and cause a new odd address to be transferred to AB-register 361. The control signals corresponding to the even address in AA-register 360 are then gated to control signal bus 372 to cause execution of the corresponding microstep in the input/output controller.

The timing diagram of FIGURE 23 thus illustrates the operation of the microprogram storage unit in generating control signals for the next successive microstep of a routine while the previous microstep of the routine is being performed in the input/output controller. Upon termination of performance of a microstep, the control signals necessary to effect execution of the next microstep are available. This arrangement eliminates delay and increases the operational speed of the input/output controller.

Peripheral channel unit

Figure 16C:
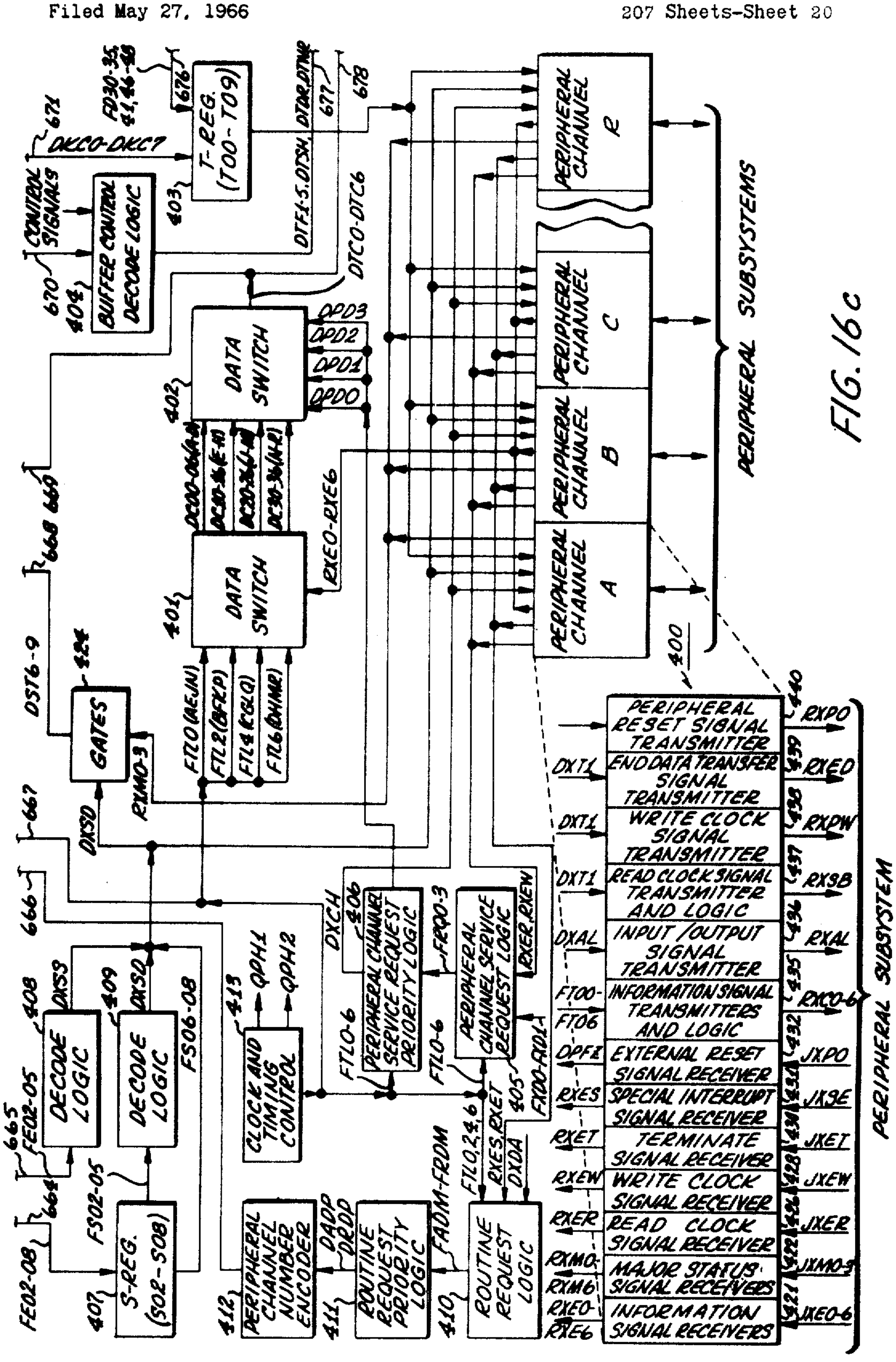
Figure 24:
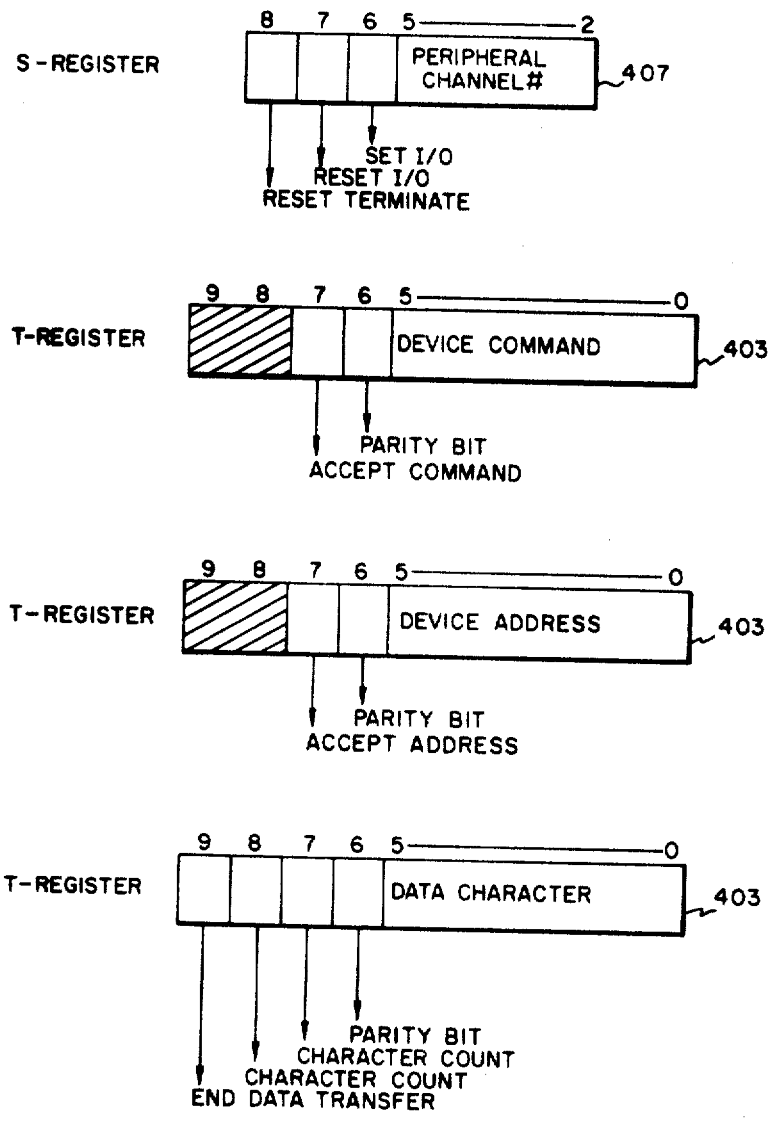
FIGURE 24 is a symbolic diagram illustrating the contents of the registers in the peripheral channel unit of FIGURE 16*c*.
Figure 25:
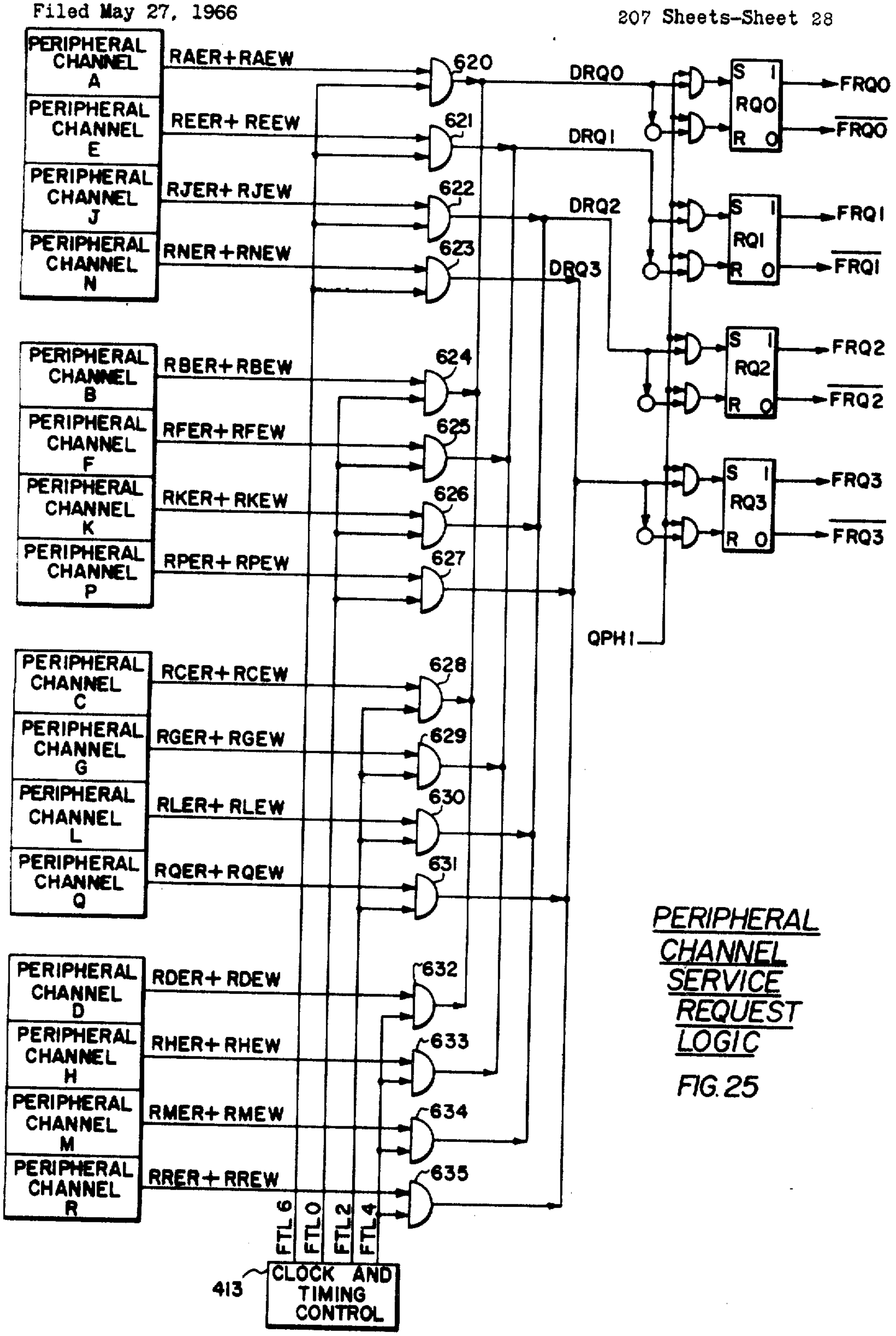
FIGURE 25 is a circuit diagram illustrating the peripheral channel service request logic in the peripheral channel unit of FIGURE 16*c*.
Figure 26:
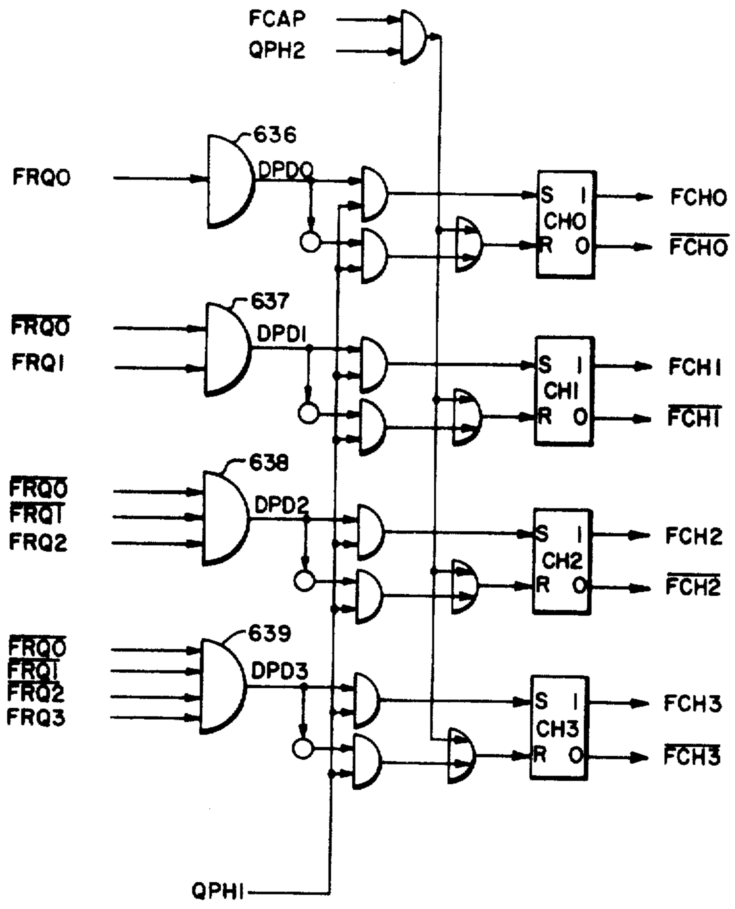
FIGURE 26 is a circuit diagram of the peripheral channel service request priority logic in the peripheral channel unit of FIGURE 16*c*.
Figure 27:
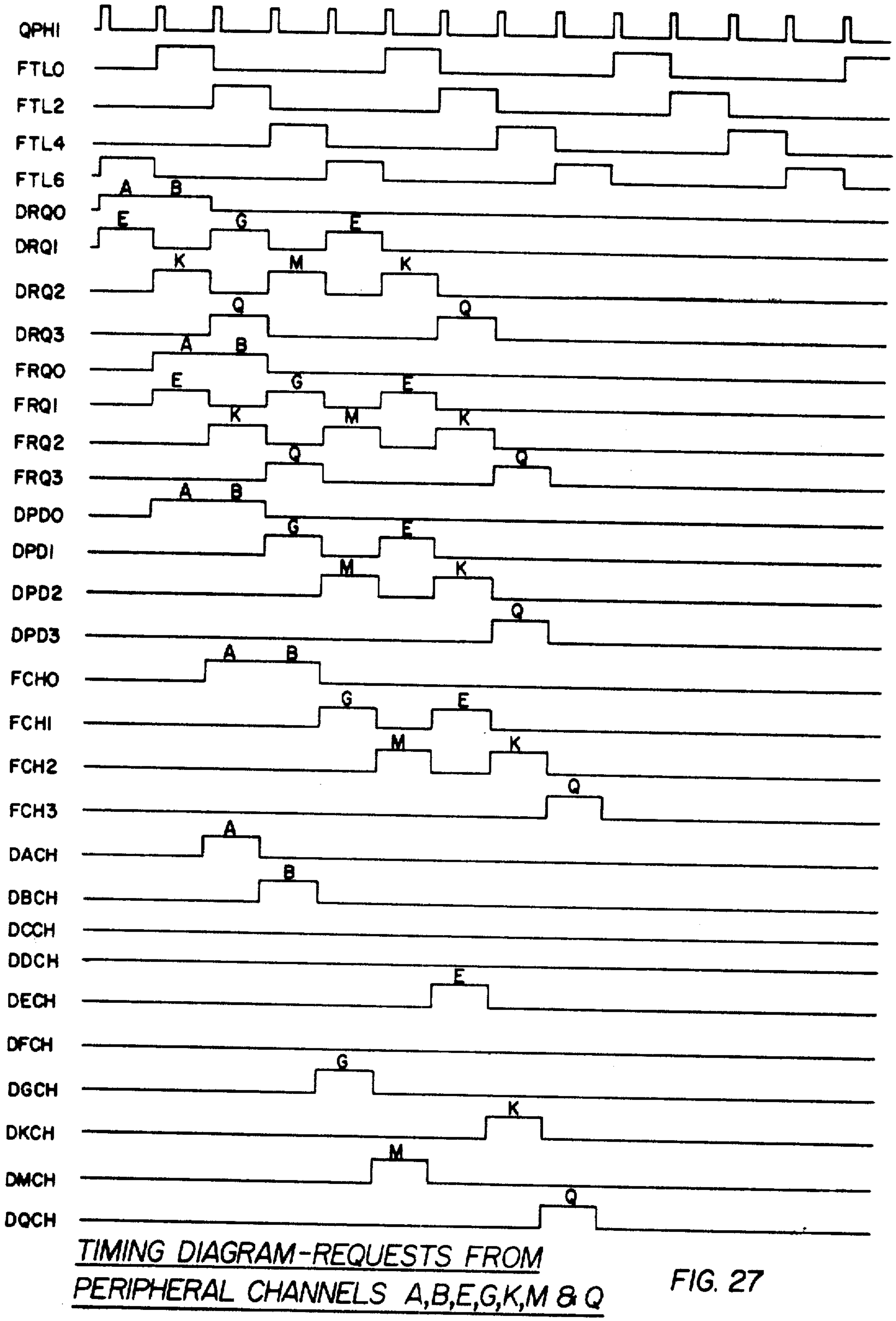
FIGURE 27 is a timing diagram illustrating the timing of signals which issue during operation of the peripheral channel service request logic of FIGURE 25 and the peripheral channel service request priority logic of FIGURE 26.
Figure 28:
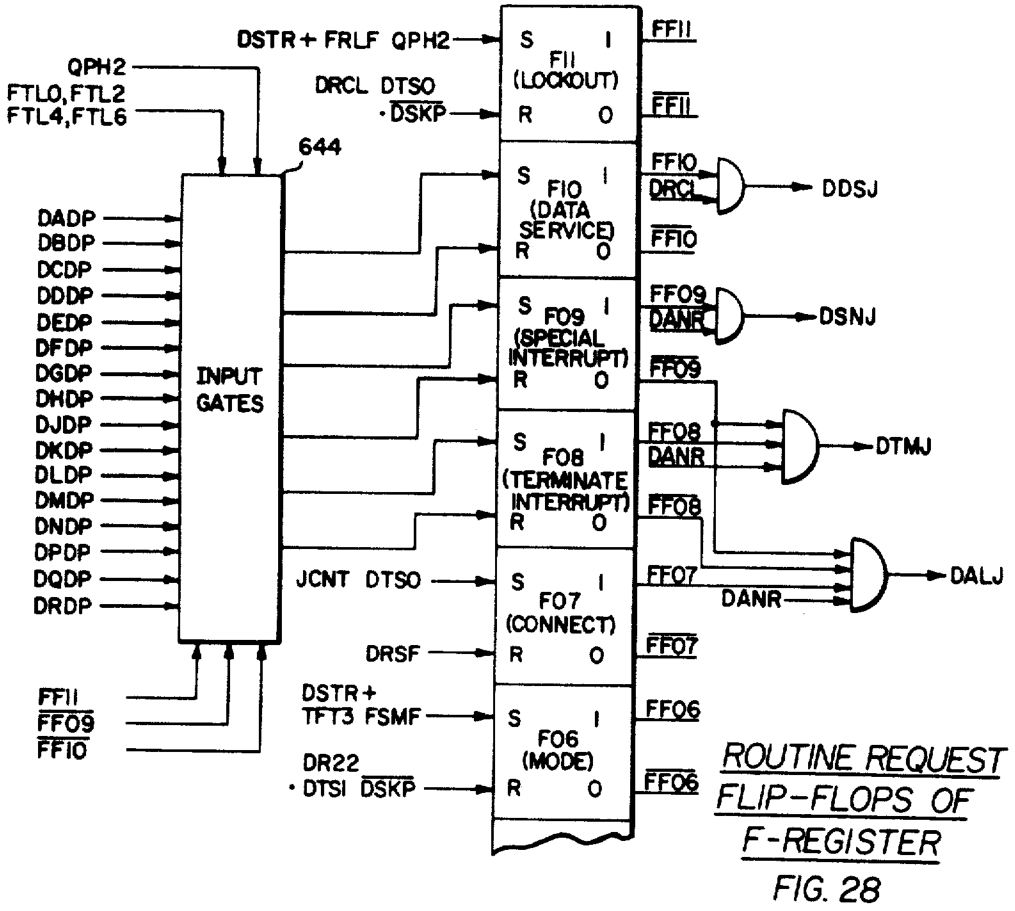
FIGURE 28 is a circuit diagram illustrating the routine request flip-flops of the F-register in the processing and control unit of FIGURE 16*e*.
Figure 29:
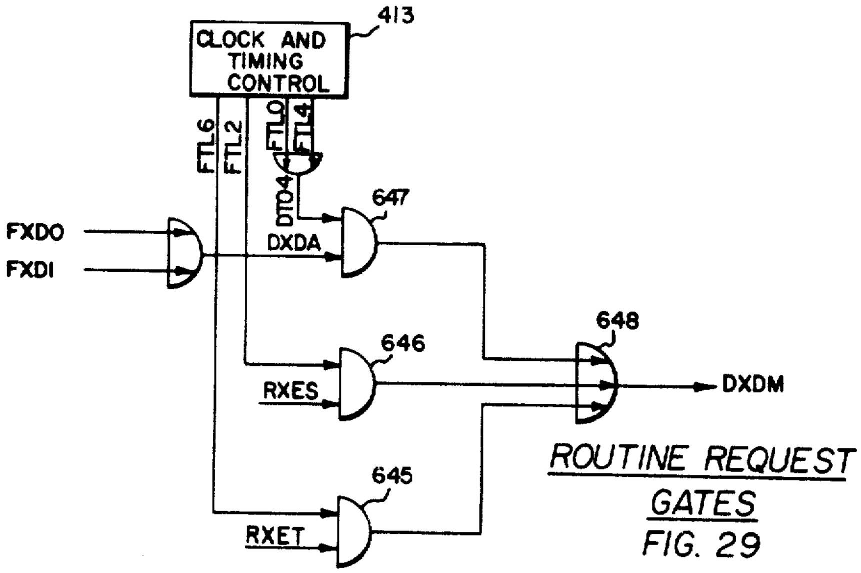
FIGURE 29 is a circuit diagram of the routine request gates in the peripheral channel unit of FIGURE 16*c*.
Figure 30:
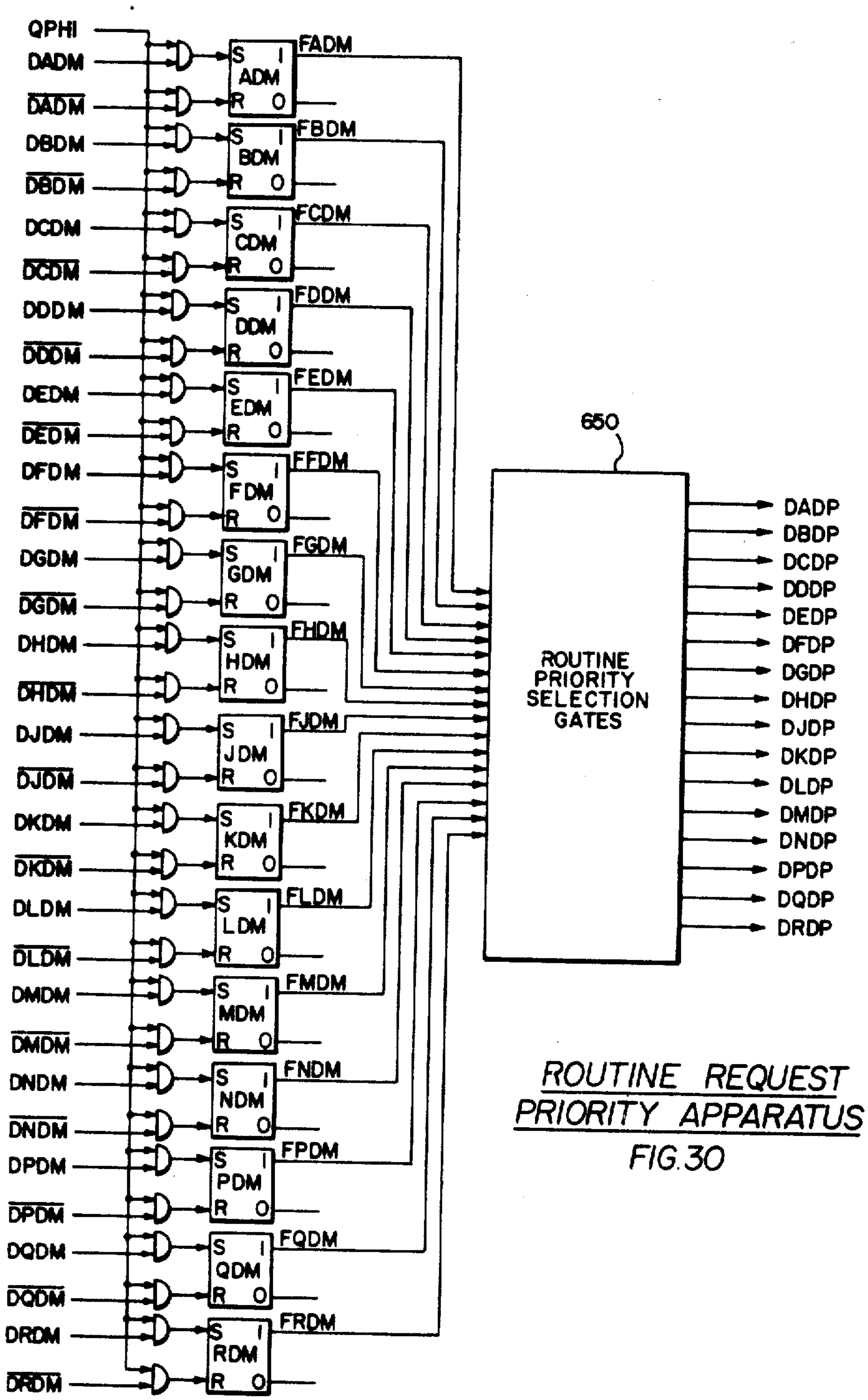
FIGURE 30 is a circuit diagram of the routine request priority apparatus in the peripheral channel unit of FIGURE 16*c*.
Figure 31:
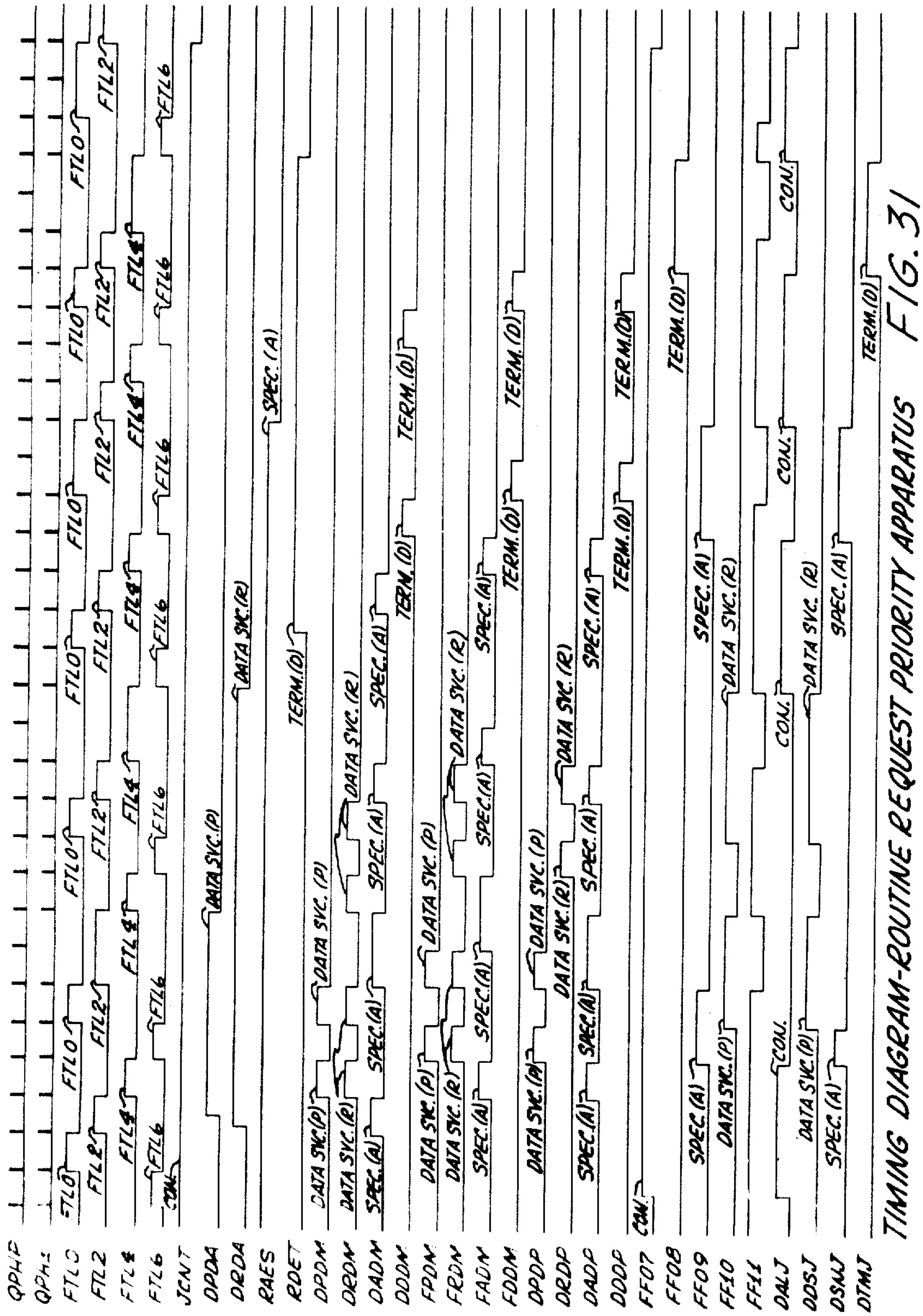
FIGURE 31 is a timing diagram illustrating the timing of signals which occur during routine request priority selection.

The peripheral channel unit or PUB section of the input/output controller comprises sixteen peripheral channels identified as peripheral channels A, B, C, D, E, F, G, H, J, K, L, M, N, P, Q and R. The transmitters, receivers and gates comprising one of these peripheral channels are illustrated at reference numeral 400 in FIGURE 16*c*. The peripheral channel unit also includes data switches 401 and 402, T-register 403, buffer control decode logic 404, peripheral channel service request logic 405, peripheral channel service request priority logic 406, S-register 407, decode logic 408, decode logic 409, routine request logic 410, routine request priority logic 411, peripheral channel number encoder 412 and clock and timing control 413, as shown in FIGURE 16*c*. The details of the structure of the peripheral channel unit are provided in FIGURE 24, which illustrates the contents of the peripheral channel unit registers; FIGURE 25, which illustrates peripheral channel service request logic 405; FIGURE 26, which illustrates peripheral channel service request priority logic 406; FIGURE 27, which is a timing diagram illustrating the operation of peripheral channel service request logic 405 and peripheral channel service request priority logic 406; FIGURE 28, which illustrates the route request flip-flops of the F-register; FIGURE 29, which illustrates the routine request gates of routine request logic 410; FIGURE 30, which illustrates the routine request logic 410 and routine request priority logic 411; FIGURE 31, which is a timing diagram illustrating the operation of the routine request priority apparatus; FIGURES 81–117, which are logical combination signal diagrams; and FIGURES 118–125, which are flip-flop input logical schematic diagrams of peripheral channel unit flip-flops employed in registers, counters and as control signal sources and also include one-shot input logical schematic diagrams.

Each of the sixteen peripheral channels A–R comprises a plurality of signal receivers and gates for receiving signals transmitted from the associated peripheral subsystem to the input/output controller. Each of the peripheral channels also includes a plurality of signal transmitters for transmitting signals from the input/output controller to the peripheral subsystem connected to the particular peripheral channel. These signals, providing communication between the input/output controller and the peripheral subsystems, are described in the section entitled "Peripheral Subsystems."

The transmitters and receivers of one of the peripheral channels and the input and output signals of this peripheral channel are illustrated at 400 in FIGURE 16*c*. The peripheral channel identified by reference numeral 400 may be any one of the sixteen peripheral channels and is identified as peripheral channel X, where X is one of the alphanumeric characters A–R. Referring to FIGURE 16*c*. data signal receivers 421 receive information signals JXE0–JXE6 from the peripheral subsystem connected to the peripheral channel and provide signals RXE0–RXE6 to data switch 401 of the peripheral channel unit. The logical schematic diagrams illustrating the structure of the data signal receivers of each of the sixteen peripheral channels are provided in FIGURES 93–100. The alphanumeric character X in the signal designations referred to in the description of the peripheral channel unit may be any one of the alphanumeric characters A–R, identifying one of the sixteen peripheral channels.

Major status signal receivers 422 receive major status signals JXM0–JXM3 from the peripheral subsystem and provide corresponding major status signals RXM0–RXM3 to gates 424. The logical schematic diagrams of the major status signal receivers of the sixteen peripheral channels are provided in FIGURES 101–104. Gates 424 also receive signal DXSD from decode logic 409 and provide signals DST6–DST9, representing major status of the peripheral subsystem, to K-register 405 of the processing and control unit. The logical schematic diagrams of gates 424 are provided in FIGURES 81 and 82. Read clock signal receiver 426 receives read clock signal JXER from the peripheral subsystem and provides a corresponding signal RXER to peripheral channel service request logic 405. The logical schematic diagrams of the read clock signal receivers of the sixteen peripheral channels are provided in FIGURE 105.

Write clock signal receiver 428 receives write clock signal JXEW from the peripheral subsystem and provides a corresponding signal RXEW to peripheral channel service request logic 405. The logical schematic diagrams of the write clock signal receivers of the sixteen peripheral channels are provided in FIGURE 108.

Terminate signal receiver 430 receives terminate signal JXET from the peripheral subsystem connected to peripheral channel 400 and provides a corresponding signal RXET to routine request logic 410. The logical schematic diagram of the terminate signal receivers of the sixteen peripheral channels are provided in FIGURE 107. Special interrupt signal receiver 431 receives signal JXSE from the peripheral subsystem and provides a corresponding signal RXES to routine request logic 410. The logical schematic diagrams of the special interrupt signal receivers of the sixteen peripheral channels are provided in FIGURE 106. External reset signal receiver 432 receives signal JXP0 from the peripheral subsystem and provides output signal DPFZ to a logic chain which provides information to K-register flip-flops K34 regarding the operability of the peripheral subsystem. Signal JXP0 also resets the signal receivers of the corresponding peripheral channel.

Information signal transmitters and logic 435 receive information signals FT00–FT06 from T-register 403 and provide information signals RXC0–RXC6 to the peripheral subsystem. The logical schematic diagrams of the information signal transmitters and logic of the peripheral channels are provided in FIGURES 109–112. Input/output signal transmitter 436 receives signal DXAL from a logical chain originating at S-register 407 and provides input/output signal RXAL to the peripheral subsystem connected to the peripheral channel. The logical schematic diagrams of the input/output signal transmitters of the sixteen peripheral channels are provided in FIGURE 113.

Read clock signal transmitter and logic 437 receives signal DXT1 from a logical chain originating at peripheral channel service request priority logical 406 and provides read clock signal RXSB to the peripheral subsystem. Similarly, write clock transmitter 438 and end data transfer signal transmitter signal 439 receive signal DXT1 from a logical chain originating at peripheral channel service request priority logic 406 to provide write clock signal RXPW and end data transfer signal RXED respectively to the peripheral subsystem. The logical schematic diagram of the read and write clock signal transmitters and the end data transfer signal transmitters of the sixteen peripheral channels are provided in FIGURES 113 and 114. Peripheral reset signal transmitter 440 receivers a binary 0 input upon actuation of a relay to provide peripheral reset signal RXP0 to be peripheral subsystem.

The signal transmitters illustrated for the peripheral channel identified by reference numeral 400 are duplicated in each of peripheral channels A–R. These signal transmitters 435–440 amplify the signals being transmitted to the corresponding memory and provide impedance matching with the cable employed to carry the signals to the peripheral subsystem. Signal receivers 421, 422, 426, 428, 430, 431 and 432 are also duplicated in each of peripheral channels A–R. These signal receivers provide impedance matching for the signal transmission lines carrying the signals from the peripheral channel to the receivers. These receivers also amplify the received signals and include flip-flop circuits providing temporary storage of the received signals.

Data switch 401 of the peripheral channel unit receives signals RXE0–RXE6 from the information signal receivers of the peripheral channels, in addition to timing signals FTL0, FTL2, FTL4 and FTL6 from clock and timing control 413, as illustrated in FIGURE 16*c*. Data switch 401 provides as its output internal data switch signals DC00–DC06, DC10–DC16, DC20–DC26 and DC30–DC36. The logical schematic diagrams illustrating the structure of data switch 401 are provided in FIGURES 85–87.

Data switch 402 receives the output signals of data switch 401, in addition to signals DPD0, DPD1, DPD2 and DPD3 from peripheral channel service request priority logic 406. Data switch 402 provides output signals DTC0–DTC5 which are transmitted to K-register 425 of the processing and control unit. Output signals DTC0–DTC6 are transmitted to TC-register 450 of the buffer storage unit. The logical schematic diagrams illustrating the structure of the data switch 402 are provided in FIGURE 87.

T-register 403 is a ten-bit register, comprising flip-flops T00–T09, which is employed to store, at various times during input/output operations, an information character, a peripheral device command or a peripheral device address, in addition to miscellaneous control information. T-register 403 is adapted to receive, by parallel transfer, output signals FD30–FD35, FD41 and FD46–FD48 from D-register 452 of the buffer storage unit, upon application of gating signal DRTF to the input gates which connect the appropriate D-register output terminals to the corresponding input terminals of the T00–T09 flip-flops. T-register 403 is also adapted to receive, by parallel transfer, output signals DKC0–DKC7 from gates 454 of the processing and control unit, upon application of clock signal QPH1 to the input gates which connect the appropriate output terminals of gates 454 to the corresponding input terminals of the T00–T07 flip-flops. The logical schematic diagrams of T-register 403 are provided in FIGURE 124. The contents of T-register 403 during different operations in the input/output controller are illustrated in FIGURE 24.

Buffer control decode logic 404 receives, among other signals, control signals from control signal bus 372 of the microprogram storage unit and output signals FK01–FK05 of K-register 425. Buffer control decode logic 404 generates buffer control signals DTF1–DTF5, DTSH, DTRD and DTWR which are transmitted to TF-register 455 of the buffer storage unit to control operations in the buffer storage unit. The logical schematic diagram illustrating the structure of buffer control decode logic 404 are provided in FIGURES 87 and 88.

Peripheral channel service request logic 405 receives read clock signals RXER and write clock signals RXEW from peripheral channels A–R. Read clock signal RXER indicates that an information character has been transmitted by the corresponding peripheral subsystem and is available to the input/output controller. Write clock signal RXEW indicates a request by the corresponding peripheral subsystem for an information character or for address or command information. Peripheral channel service request logic 405 also receives timing control signals FTL0–FTL6 from clock and timing control 314 and output signals FXD0 and FXD1 of the buffer state flip-flops. Signal FDX0 indicates that the even buffer register of the buffer storage unit corresponding to a particular channel is full during a read operation or empty during a write operation. Signal FXD1 indicates that the odd buffer register in the buffer storage unit associated with a particular peripheral channel is full during a read operation or empty during a write operation. In response to its inputs, peripheral channel service request logic 405 provides one or more of output signals FRQ0–FRQ3 to peripheral channel service request priority logic 406. Each of output signals FRQ0–FRQ3 represents a request from a group of four peripheral channels. The logical schematic diagrams illustrating the structure of peripheral channel service request logic 405 are provided in FIGURE 92 ("Group Priority Request Signals") and FIGURE 123 ("Priority Request Flip-Flops—First Level"). The logical schematic diagrams of the buffer state flip-flops AD0–RD0 and AD1–RD1 are provided in FIGURES 120 and 121.

Peripheral channel service request priority logic 406 receives output signals FRQ0–FRQ3 from peripheral channel service request logic 405, in addition to timing control signals FTL0–FTL6 from clock and timing control 413. Logic 406 generates output signals DPD0–DPD3 for application to data switch 402. During a read operation, signals DPD0–DPD3 close data switch 402 to transfer information signals from the selected peripheral channel to TC-register 450 of the buffer storage unit. Logic 406 also generates signals DXCH which are transmitted to a logical claim whch causes read clock, write clock or end data transfer signals to be transmitted to the peripheral channel whose service request is granted priority. The logical schematic diagrams illustrating the structure of peripheral channel service request priority logic 406 are provided in FIGURES 91 and 92 ("Priority Decision Group Signals"), FIGURE 123 ("Priority Request Flip-Flops—Second Level") and FIGURE 88 ("Two-Level Priority Access Signals—Peripheral Channels A–R"). A detailed description of the structure and operation of peripheral channel service request logic 405 and peripheral channel service request priority logic 406 is provided in the section entitled "Peripheral Channel Service Request Priority Apparatus."

Clock and timing control 413 of the peripheral channel unit provides clock signals QPH1 and QPH2 to the logic of the peripheral channel unit. The logical schematic diagrams illustrating that portion of clock and timing control 413 which generates clock signals QPH1 and QPH2 are provided in FIGURE 93. Clock and timing control 413 also includes a ring counter, identified as the TL-counter, comprising flip-flops TL0, TL2, TL4 and TL6. The TL-counter provides timing control signals FTL0, FTL2, FTL4 and FTL6 to various elements of the peripheral channel unit, for example data switch 401, peripheral channel service request logic 405, peripheral channel service request priority logic 406 and routine request logic 410. Clock and timing control 413 also provides timing control signals to F-register 252 in the processing and control unit. The logical schematic diagrams of the TL-counter portion of clock and timing control 413 are provided in FIGURE 125.

S-register 407 is a seven-bit register comprising flip-flops SO2–SO8. S-register 407 is employed to store a peripheral channel number in addition to miscellaneous control information. Information is transferred to S-register 407 from E-register 460 of the processing and control unit upon application of gating signals DSST and DSSU to the input gates connecting the appropriate E-register output terminals to corresponding input terminals of S-register 407. S-register 407 provides signals FSO2–FSO5 to decode logic 409 and also provides signals FSO6–FSO8 to logic associated with the peripheral channel transmitters and receivers. The logical schematic diagrams of S-register 407 are provided in FIGURES 123 and 124. The contents of S-register 407 are illustrated in FIGURE 24.

Decode logic 409 receives signals FSO2–FSO5, representing a peripheral channel number, from S-register 407 and decodes these signals to provide an output signal DXSD, identifying one of the peripheral channels A–R. Signal DXSD is applied to gates 424 and to logic associated with the input/output signal transmitter and the major status signal receivers of the corresponding periphtral channel. The logical schematic diagrams illustrating the structure of decode logic 409 are provided in FIGURE 84.

Decode logic 408 receives signals FEO2–FEO5, representing the number of a peripheral channel, from E-register 460 of the processing and control unit. Decode logic 408 provides an output signal DXSS, identifying one of the peripheral channels A–R, for application to logic associated with the terminate and special interrupt signal receivers of the peripheral channels. The logical schematic diagrams illustrating the structure of decode logic 408 are provided in FIGURE 84.

Routine request logic 410 receives terminate interrupt request signal RXET and special interrupt request signal RXES from the peripheral channels A–R, in addition to buffer state signal DXDA and timing control signals FTL0, FTL2, FTL4 and FTL6 from clock and timing control 413. Routine request logic 410 includes routine request flip-flops ADM–RDM which are set to the 1-state in response to a routine request from the corresponding channels. Routine request logic 410 provides output signals FADM–FRDM to routine request priority logic 411. The logical schematic diagrams illustrating the structure of routine request logic 410 are provided in FIGURE 89 ("Input Signals to Routine Request Flip-Flops") and FIGURE 122 ("Routine Request Flip-Flops—Peripheral Channels A–R"). The logical schematic diagrams illustrating the structure which generates buffer state signal DXDA are provided in FIGURE 89 ("Buffer State Signals—Peripheral Channels A–R").

Routine request priority logic 411 receives signals FADM–FRDM from routine request logic 410 and provides one of output signals DADP–DRDP. The output signal of routine request priority logic 411 represents the channel providing the highest priority routine request to routine request logic 410. The logical schematic diagrams illustrating the structure of routine request priority logic 411 are provided in FIGURE 90.

Peripheral channel number encoder 412 receives the output signal of routine request priority logic 411 and generates a code identifying the selected peripheral channel. This peripheral channel identification or number is represented by signals DPR2–DPR5 which are transmitted to F-register 252 of the processing and control unit. The structure of peripheral channel number encoder 412 is illustrated in FIGURE 116 by the logical schematic diagrams illustrating the generation of signals DPR2–DPR5. A description of the details of operation of routine request logic 410, routine request priority logic 411 and peripheral channel number encoder 412 is provided in the section entitled "Routine Request Priority Apparatus."

*Peripheral channel service request priority apparatus.*—During a data transfer operation in the input/output controller, data characters are transferred through the peripheral channels A–R between the buffer registers of the buffer storage unit and the peripheral subsystems connected to the peripheral channels. A peripheral channel may request transfer of a character during a read operation when the peripheral subsystem connected to the peripheral channel has a character ready for transfer to the buffer storage unit. A peripheral channel may also request transfer of a character during a write operation when the peripheral subsystem connected to the peripheral channel requires a character from the buffer storage unit. Such requests are called peripheral channel service requests. Since peripheral channel service requests may be made simultaneously by more than one peripheral channel, a priority arrangement is provided to grant one of the requests on the basis of relative priorities. The decisional logic for detecting peripheral channel service requests and supervising the granting of the requests in accordance with predetermined priorities is provided in the peripheral channel unit of the input/output controller. This decisional logic comprises peripheral channel service request logic 405 and peripheral channel service request priority logic 406, illustrated in FIGURE 116*c*.

FIGURE 25 illustrates in detail the peripheral channel service request logic 405. Referring to FIGURE 25, each of peripheral channels A–R issues a signal RXER, where X is the alphanumeric character identifying the peripheral channel, during a read operation when the peripheral subsystem connected to the peripheral channel has a character ready for transfer to the buffer storage unit. Similarly, each of peripheral channels A–R issues a signal RXEW, where X is the alphanumeric character identifying the peripheral channel, during a write operation when the peripheral subsystem connected to the peripheral channel requires transfer of the character from the buffer storage unit to the peripheral subsystem. Signals RXER and RXEW constitute peripheral channel service request signals. These peripheral channel service request signals from each of the peripheral channels are applied to corresponding AND-gates 620–635, as illustrated in FIGURE 25. Timing control signal FTL6 from clock and timing control 413 is applied to AND-gates 620–623. Timing control signal FTL0 from clock and timing control 413 is similarly applied to AND-gates 624–627. Timing control signals FTL2 and FTL4 from clock and timing control 413 are similarly applied to AND-gates 628–631 and 632–635 respectively, as illustrated in FIGURE 25. Timing control signals FTL6, FTL0, FTL2 and FTL4 are the output signals of a ring counter, termed the TL-counter, and occur consecutively, defining successive time periods.

Upon issuance of timing control signal FTL6, each of AND-gates 620–623 is enabled, if a peripheral channel service request signal is issued by the peripheral channel connected to that AND-gate. When timing control signal FTL0 is generated by clock and timing control 413, each of AND-gates 624–627 is enabled, if a peripheral channel service request signal is issued by the peripheral channel connected to that AND-gate. During the time periods defined by timing control signals FTL2 and FTL4, each of AND-gates 628–631 and 632–635 respectively is enabled upon issuance of a peripheral channel service request from the corresponding peripheral channel. When enabled, AND-gates 620, 624, 628 and 632 generate signal DRQ0. Each of AND-gates 621, 625, 629 and 633 generates, when enabled, signal DRQ1. When enabled, each of AND-gates 622, 626, 630 and 634 generate signal DRQ2. When enabled, each of AND-gates 623, 627, 631 and 635 generate signal DRQ3, as illustrated in FIGURE 25.

AND-gates 620–635 are also enabled by signal DXRT (not shown in FIGURE 25). Signal DXRT is generated by the processing and control unit during a command sequence (see FIGURE 7) when it is necessary to send a release pulse to the peripheral subsystem. This signal is also generated by the processing and control unit when a "reset terminate" command is present in the S-register, in order to permit transfer of status information from the peripheral subsystem to the processing and control unit. AND-gates 620–635 are inhibited by signal combination FXD0+FXD1 (not shown in FIGURE 25). During a write operation, the signal combination FXD0+FXD1 indicates that the buffer registers corresponding to the particular peripheral channel are empty; consequently, no data characters are available for transfer to the peripheral subsystem. During a read operation, the signal combination FXD0+FXD1 indicates that the buffer registers corresponding to the particular peripheral channel are full; consequently, a data character cannot be transferred from the peripheral subsystem to the buffer registers until information is transferred from one of the buffer registers to memory. The above-described relationship of signals DXRT, FXD0 and FXD1 to signals DRQ0, DRQ1, DRQ2 and DRQ3 are illustrated in the logical schematic diagrams for signals DRQ0–DRQ3, provided in FIGURE 92.

The states of flip-flops RQ0, RQ1, RQ2 and RQ3 are determined by signals DRQ0, DRQ1, DRQ2 and DRQ3 respectively. As illustrated in FIGURE 25, signal DRQ0 sets flip-flop RQ0 while signal $\overline{\text{DRQ0}}$ resets flip-flop RQ0, upon issuance of clock signal QPH1. The states of flip-flops RQ1–RQ3 are similarly determined by the states of signals DRQ1–DRQ3 respectively.

FIGURE 26 illustrates in detail peripheral channel service request priority logic 406. Referring to FIGURE 26, AND-gate 636 is enabled by the 1-output signal FRQ0 of the RQ0 flip-flop to generate signal DPD0. AND-gate 637 is enabled by 1-output signal FRQ1 of the RQ1 flip-flop, if the RQ0 flip-flop is reset to the 0-state, to generate signal DPD1. AND-gate 638 is enabled by the 1-output signal FRQ2 of the RQ2 flip-flop, if the RQ1 and RQ0 flip-flops are reset to the 0-state, to generate signal DPD2. AND-gate 639 is enabled by 1-output signal FRQ3 of the RQ3 flip-flop, if flip-flops RQ0, RQ1 and RQ2 are reset to the 1-state, to generate signal DPD3. Thus, AND-gates 636–639 establish priority between the peripheral channel service requests represented in flip-flops RQ0–RQ3, with the service request in flip-flop RQ0 having the highest priority and the service requests in flip-flops RQ1, RQ2 and RQ3 having successively lower priorities. Only one of signals DPD0–DPD3 issues, the signal which issues indicating the highest priority request represented in flip-flops RQ0–RQ3.

One of flip-flops CH0–CH3 is set to the 1-state upon issuance of clock signal QPH1, in response to issuance of the corresponding one of signals DPD0–DPD3, as shown in FIGURE 26. Flip-flops CH0–CH3 thus store the decision of the priority selection logic. The output signal of the one of flip-flops CH0–CH3 which is set to the 1-state in response to the priority decision is employed to generate signal DXCH, where X is an alphanumeric character identifying the peripheral channel whose service request is granted. The logical schematic diagrams illustrating the generation of signal DXCH are provided in FIGURE 88. Signal DXCH, in turn, causes signal DXT1 to issue. The logical schematic diagrams illustrating the generation of signal DXT1 are also provided in FIGURE 88. During a read operation, signal DXT1 causes read clock signal RXSB to be transmitted to the peripheral subsystem to indicate that the character provided by the peripheral subsystem through the information signal receivers of the peripheral channel has been stored in TC-register 450. The logical schematic diagrams illustrating the generation of read clock signal RXSB are provided in FIGURE 113. During a write operation, signal DXT1 is employed to generate write clock signal RXPW for transfer to the peripheral subsystem, to inform the peripheral subsystem that a character stored in T-register 403 is available to the peripheral subsystem through the information transmitters and logic of the peripheral channel. The logical schematic diagrams illustrating the generation of write clock signals RXPW are provided in FIGURE 114. Signal DXT1 is also employed to generate end data transfer signals RXED transmitted from each of the peripheral channels to the corresponding peripheral subsystem.

In operation, timing control signals FTL6, FTL0, FTL2 and FTL4 cause AND-gates 620–635 to successively scan four groups of four peripheral channels each, in order to detect peripheral channel service requests issued by peripheral channels within each group. Thus, during the time period defined by timing control signal FTL6, peripheral channel service requests from peripheral channels A, E, J and N are sensed to cause the appropriate ones of signals DRQ0, DRQ1, DRQ2 and DRQ3 to issue. Similarly, during the time period defined by timing control signal FTL0, peripheral channel service requests from peripheral channels B, F, K and P are sensed, causing the appropriate ones of signals DRQ0–DRQ3 to issue. During the time period defined by signal FTL2, peripheral channel service requests from peripheral channels C, G, L and Q are sensed to cause the appropriate ones of signals DRQ0–DRQ3 to issue. Likewise, during the time period defined by a timing signal FTL4, peripheral channel service requests from peripheral channels D, H, M and R are sensed, causing the appropriate ones of signals DRQ0–DRQ3 to issue.

The states of flip-flops RQ0–RQ3 represent the peripheral channel service request signals of the group of peripheral channels sensed during the preceding time period, since the ring counter generating signals FTL6, FTL0, FTL2 and FTL4 is advanced by clock signal QPH1. The one of signals DPD0–DPD3 issuing in response to the states of flip-flops RQ0–RQ3 represents the highest priority request issued by the peripheral channels of the group. Within each group of peripheral channels whose peripheral channel service requests are sensed during a given time period, the relative priorities, running from the highest priority to the lowest priority, are as follows: A, E, J, N; B, F, K, P; C, G, L, Q; and D, H, M, R. The priority decision represented by one of signals DPD0–DPD3 is stored in the corresponding one of flip-flops CH0–CH3, during the second time period following the time period in which the requests were sensed. Because of the storage of the priority decision in flip-flops CH0–CH3, flip-flops RQ0–RQ3 are feed for storage of the peripheral channel service requests issuing from the next group of peripheral channels scanned.

The following table illustrates the time periods during which the indicated signals issue in the peripheral channel service request logic 405 and the peripheral channel service request priority logic 406:

| Peripheral Channels | | | | |
|---|---|---|---|---|
| FTL6 | FTL0 | FTL2 | FTL4 | Signals Issuing |
| A | B | C | D | DRQ0 |
| E | F | G | H | DRQ1 |
| J | K | L | M | DRQ2 |
| N | P | Q | R | DRQ3 |
| D | A | B | C | FRQ0, DPD0 |
| H | E | F | G | FRQ1, DPD1 |
| M | J | K | L | FRQ2, DPD2 |
| R | N | P | Q | FRQ3, DPD3 |
| C | D | A | B | FCH0, DACH-DDCH |
| G | H | E | F | FCH1, DECH-DHCH |
| L | M | J | K | FCH2, DJCH-DMCH |
| Q | R | N | P | FCH3, DNCH-DRCH |

FIGURE 27 is a timing diagram illustrating the timing of the signals in logic 405 and 406 when peripheral channel service requests are received from peripheral channels A, B, E, G, K, M and Q. Referring to FIGURE 27, the TL-counter is advanced by clock pulses QPH1 to provide successive timing control signals FTL6, FTL0, FTL2 and FTL4 defining successive time periods. During the time period defined by signal FTL6, the peripheral channel service requests from peripheral channels A and E cause signals DRQ0 and DRQ1 respectively to issue. The alphanumeric character located adjacent a signal in FIGURE 27 identifies the peripheral channel whose service request causes the signal to issue. During the time period defined by timing signal FTL0, the peripheral channel service requests from peripheral channels B and K cause signals DRQ0 and DRQ2 to issue. During time period FTL0, flip-flops RQ0 and RQ1 are set to the 1-state in response to signals DRQ0 and DRQ1 respectively and clock signal QPH1. Signal DPD0 issues in response to signal FRQ0, signal DPD1 being inhibited by signal FRQ0. Issuance of signal DPD0 during time period TL0 indicates that, of the requests sensed during time period FTL6, the request from peripheral channel A is granted priority over the request from peripheral channel E.

During time period FTL2, signal DRQ1 issues in response to the peripheral channel service request from peripheral channel G. Signal DRQ3 also issues in response to the peripheral channel service request from peripheral channel Q. Flip-flops RQ0 and RQ2 are set to the 1-state during time period FTL2 in response to signals DRQ0 and DRQ2 and clock signal QPH1. Signal DPD0 issues during time period FTL2 to indicate that, of the requests sensed during time period FTL0, the request for peripheral channel B has been granted priority over the request for peripheral channel K. Flip-flop CH0 is set to the 1-state at this time to indicate the granting of priority to peripheral channel A, whose service request was sensed during time period FTL6. Signal DACH issues in response to signals FCH0 and FTL2.

During time period FTL4, signal DRQ2 issues in response to the peripheral channel service request from peripheral channel M. Flip-flops RQ1 and RQ3 are set in response to the peripheral channel service requests from peripheral channels G and Q, detected during the previous time period. Signal DPD1 issues to indicate that peripheral channel G has been granted priority over peripheral channel Q. During time period FTL4, flip-flop CH0 is set to the 1-state and signal DBCH issues to indicate the granting of priority to peripheral channel B, whose service request was sensed during time period FTL0.

During the next time period FTL6, signal DRQ1 issues in response to the peripheral channel service request from peripheral channel E, this request not yet having been granted. Flip-flop RY2 is set to the 1-state in response to the service request from peripheral channel M, sensed during the previous time period. Signal DPD2 issues to indicate the granting of priority to the peripheral channel M request. Flip-flop CH1 is set to the 1-state and signal DGCH issues during time period FTL6 to grant priority to the service request from peripheral channel G, sensed two time periods earlier.

During time period FTL0, signal DRQ2 issues in response to the peripheral channel service request from peripheral channel K which has not yet been serviced. Flip-flop RQ1 is set to the 1-state in response to the request for peripheral channel E, sensed during the previous time period. Signal DPD2 issues to indicate granting of the channel E request. Flip-flop CH2 is set to the 1-state and signal DMCH issues during time period TL0 to grant priority to the request from peripheral channel M, sensed two time periods earlier.

During time period FTL2, signal DRQ3 issues in response to the peripheral channel service request from peripheral channel Q which has not yet been granted. Flip-flop RQ2 is set to the 1-state in response to the request from peripheral channel K, sensed during the previous time period. Signal DPD2 issues to grant priority to the request from peripheral channel K. Flip-flop CH1 is set to the 1-state and signal DECH issues during time period FTL2 to grant priority to the request for peripheral channel E, sensed two time periods earlier.

During time period FTL4, flip-flop RQ3 is set to the 1-state in response to the service request from peripheral channel Q which was sensed during the previous time period. Signal DPD3 issues to grant priority to the peripheral channel Q request. Flip-flop CH2 is set to the 1-state at this time and signal DKCH issues to grant priority to the request from peripheral channel K, sensed two time periods earlier. During time period FTL6, flip-flop CH3 is set to the 1-state and signal DQCH issues to grant priority to the request from peripheral channel Q, sensed two time periods earlier.

The peripheral channel service request priority apparatus of the input/output controller thus scans successive groups of peripheral channels to detect service requests from these channels. The peripheral channel service requests of a group of peripheral channels are stored in a first set of flip-flops. A predetermined priority is established for the requests issuing from each group of peripheral channels and requests are granted in accordance with this predetermined priority. The decision as to priority between peripheral channel service requests issuing from the peripheral channels of a group is stored in a second set of flip-flops. The output signals of the second set of flip-flops, in conjunction with the timing signals, cause generation of a signal which is transmitted to the peripheral channel whose service request has been granted. After the decision as to priority is stored in the second set of flip-flops, the first set of flip-flops is employed to store the service requests from the next group of peripheral channels scanned by the apparatus.

*Routine request priority apparatus.*—The input/output controller performs four basic routines or sequences in discharging its function, viz. connect routines, data service routines, special interrupt routines and terminate interrupt routines. A connect routine in the input/output controller is initiated by connect signal JΔCS transmitted from a memory to the input/output controller. The information required by the input/output controller to perform a connect routine is contained in the primary and secondary mailbox words. A data service routine is performed by the input/output controller in the course of a data transfer between a peripheral subsystem and a memory or to handle a peripheral subsystem for non-data transfer commands. Data service routines are controlled by the action codes in secondary mailbox word #1. Terminate interrupt routines are initiated in the input/output controller by a terminate interrupt routine request from a peripheral subsystem and are employed to communicate information to control memory for use by a processor. During a terminate interrupt routine, the input/output controller stores information in secondary mailbox words and the terminate interrupt queue table and sets the appropriate cell of the memory interrupt register. Special interrupt routines are likewise performed in the input/output controller in response to a special interrupt routine request from a peripheral subsystem. During a special interrupt routine, information is stored in the special interrupt queue table and an appropriate cell of the memory interrupt register is set.

The performance of the above-described routines in the input/output controller is in accordance with the following priority.

Routine:
- Data service, first
- Special interrupt, second
- Terminate interrupt, third
- Connect, fourth A data service routine is permitted to interrupt any of the other three routines. However, a special interrupt routine, a terminate interrupt routine or a connect routine cannot interrupt a data service routine or each other.

Requests for a connect routine, a data service routine, a special interrupt routine or a terminate interrupt routine are stored in F-register 252 of the processing and control unit. Flip-flop F07 of F-register 252 is set to the 1-state to store a connect routine request in response to receipt of a connect signal JΔCS from the control memory connected to the input/output controller. A request for a data service routine is stored in flip-flop F10 of F-register 252, flip-flop F10 being set to the 1-state to store the request. Special interrupt and terminate interrupt routine requests are stored in flip-flops F09 and F08 respectively of F-register 252 by setting these flip-flops to the 1-state. Flip-flop F06 of F-register 252, termed the mode flip-flop, is set to the 1-state when the input/output controller is performing a special interrupt, a terminate interrupt or a connect routine. Flip-flop of F-register 252 is normally set to the 1-state, permiting routine requests to be entered in flip-flops F07–F10. Flip-flop F11 is reset to the 0-state at predetermined times during operation of the input/output controller when it is desirable to check the states of flip-flops F07–F10 to determine if a routine request is present. When flip-flop F11 is reset to the 0-state, entry of additional routine requests into flip-flops F07–F10 is inhibited. The input logical schematic diagrams for flip-flops F06–F11 of F-register 252 are provided in FIGURE 166. The input logical schematic diagrams for flip-flops F08–F10 indicate that the setting of flip-flop F08 to the 1-state is inhibited when either of flip-flops F09 or F10 are set to the 1-state. Similarly, the setting of flip-flop F09 to the 1-state is inhibited if flip-flop F10 is set to the 1-state. The input logical schematic diagrams for flip-flops F06, F07 and F11 are also shown in FIGURE 28. As illustrated in FIGURE 28, the trigger signals for flip-flops F08–F10 are provided by input gates 644.

With reference to FIGURE 28, logical combination signal DDSJ issues when flip-flop F10 is set to the 1-state, indicating a request for a data service routine. Logical combination signal DSNJ issues when flip-flop F09 is set to the 1-state and signal DANR is present. The logical schematic diagram for signal DANR is as follows:

$$\text{DRCL}\ \overline{\text{FF10}}\ \overline{\text{FF06}}=\text{DANR}$$

The above logical schematic diagram, in conjunction with FIGURE 28, indicates that signal DSNJ is inhibited if a data service routine request is stored in flip-flop F10 or if the input/output controller is performing a terminate interrupt or a connect routine. Thus, signal DDSJ may issue when a data service routine request is present in flip-flop F10 to permit a data service routine to interrupt a special interrup routine. However, signal DSNJ cannot issue to permit a special interrupt routine to interrupt a data service routine, or to interrupt connect or terminate interrupt routines.

Signal DTMJ issues when flip-flop F08 is set to the 1-state, if flip-flop F09 is reset to the 0-state and if signal DANR is present, to indicate a terminate interrupt routine request in flip-flop F08. Thus, if special interrupt and terminate interrupt routine requests are simultaneously stored in flip-flops F09 and F08 respectively, the special interrupt routine request in flip-flop F09 takes priority over the terminate interrupt routine request in flip-flop F08.

Signal DALJ issues when flip-flop F07 is set to the 1-state, if both flip-flops F08 and F09 are reset to the 0-state and if signal DANR is present, to indicate the storage of a connect routine request in flip-flop F07. Thus, if connect, terminate interrupt and special interrupt routine requests are simultaneously stored in flip-flops F07, F08 and F09 respectively, the special interrupt routine request takes priority over the terminate interrupt and connect routine requests and the terminate interrupt routine request takes priority over the connect routine request. Signal DANR indicates that the special interrupt, the terminate interrupt and the connect routines cannot interrupt each other, but the routines may be interrupted by a data service routine.

FIGURES 29 and 30 illustrate routine request logic 410 and routine request priority logic 411 of the peripheral channel unit which provide the logical combination signals representing data service, special interrupt and terminate interrupt routine requests, causing flip-flops F10, F09 and F08 respectively of F-register 252 to be set to the 1-state. With reference to FIGURE 29, signal RXET, representing a terminate interrupt routine request from a peripheral subsystem, is applied to the input of AND-gate 645. Signal RXES, representing a special interrupt routine request from a peripheral subsystem, is applied to the input of AND-gate 646. Signal DXDA issues when either flip-flop FXD0 or FXD1 is set to the 1-state to indicate, during a read operation, that the corresponding buffer register is full and a word must be transferred to memory or, during a write operation, that the corresponding buffer register is empty and a word must be transferred from memory to the buffer register. Signal DXDA, representing a data service routine request, is applied to the input of AND-gate 647. The alphanumeric character X in the above signal designations is one of the alphanumeric characters A–R, identifying one of the sixteen peripheral channels of the peripheral channel unit. The gating apparatus shown in FIGURE 29 is provided for each of the peripheral channels. The logical schematic diagrams illustrating the structure generating signals DADA–DRDA are provided in FIGURE 89. The logical schematic diagrams illustrating the structure generating signals DADM–DRDM are provided in FIGURES 89 and 90. The input logical schematic diagrams for flip-flops FAD0–FRD0 and FAD1–FRD1 are provided in FIGURES 120 and 121.

Clock and timing control 413 provides timing control signal FTL6 to AND-gate 645, timing control signal FTL2 to AND-gate 646 and timing control signals FTL0 and FTL4 to AND-gate 647, as illustrated in FIGURE 29. Timing signal FTL6 enables AND-gate 645 to apply terminate interrupt routine request signal RXET to OR-gate 648. Timing signal FTL2 enables AND-gate 646 to apply special interrupt routine request signal RXES to OR-gate 648. Similarly, either timing signal FTL0 or timing signal FTL4 enables AND-gate 647 to apply data service routine request signal DXDA to OR-gate 648. Timing signals FTL6, FTL0, FTL2 and FTL4 are the successive output signals of a ring counter, termed the TL-counter, included in clock and timing control 413 and occur in the sequence FTL0, FTL2, FTL4 and FTL6 to define successive time periods. Signals FTL0, FTL2, FTL4 and FTL6 enable AND-gate 647, AND-gate 646, AND-gate 647 and AND-gate 645 in that order. The input logical schematic diagrams for the TL-counter are provided in FIGURE 125.

Output signal DXDM of OR-gate 648 represents, during the time period defined by one of the timing signals, a particular routine request applied to the same AND-gate as the timing signal defining the time period. For example, if signal DXDM issues during the time period defined by timing signal FTL6, signal DXDM represents a terminate interrupt routine request from a peripheral subsystem. If signal DXDM issues during the time period defined by timing signal FTL2, signal DXDM represents a special interrupt routine request received from a peripheral subsystem. Similarly, if signal DXDM issues during either of the time periods defined by timing signals FTL0 and FTL4, receipt of a data service routine request from a buffer storage unit is indicated. The type of routine request received by the routine request logic of FIGURE 29 is therefore revealed by the time period during which signal DXDM issues, as illustrated in the following table:

| Timing control signal defining time period: | Significance of signal DXDM |
|---|---|
| FTL0 | Data service routine request. |
| FTL2 | Special interrupt routine request. |
| FTL4 | Data service routine request. |
| FTL6 | Terminate interrupt routine request. |

Because of the necessity that data service routine requests be granted promptly to prevent timing errors and loss of data, data service routine requests are sampled during alternate time periods.

FIGURE 30 illustrates the routine request flip-flops ADM–RDM and the routine priority selection gates 650. Each of routine request flip-flops ADM–RDM is associated with one of the sixteen peripheral channels and is set to the 1-state upon issuance of respective signal DXDM from the routine request gates of the corresponding peripheral channels, upon issuance of clock signal QPH1. Each of the routine request flip-flops is reset to the 0-state when the corresponding input signal DXDM is a binary 0 and clock signal QPH1 issues, as shown in FIGURE 30. The input logical schematic diagrams of routine request flip-flops ADM–RDM are provided in FIGURE 122.

The 1-output signals of routine request flip-flops ADM–RDM are applied to routine priority selection gates 650 to provide, during a given time period, a single output signal DXDP, termed the routine priority selection signal, corresponding to the highest priority routine request stored in flip-flops ADM–RDM. The logical schematic diagrams for routine priority selection gates 650 are provided in FIGURE 90. As evident from these logical schematic diagrams, routine priority selection gates 650 assign highest priority to a routine request stored in flip-flop ADM, with routine requests stored in flip-flops BDM–RDM being assigned successively lower priorities. The output signal DXDP issuing during a given time period is applied to input gates 644 to F-register flip-flops F08–F10, as shown in FIGURE 28.

In summary, the type of routine request represented by signal DXDM for a particular peripheral channel is dependent on the time period during which signal DXDM issues. Routine requests received through the routine request gates are stored in the routine request flip-flops ADM–RDM. A routine priority selection signal DXDP is generated by routine priority selection gates 650 in response to the states of routine request flip-flops ADM–RDM. The routine priority selection signal generated by gates 650 is applied to input gates 644 for flip-flops F08–F10 of F-register 252. The time period during which this routine priority selection signal issues from gates 650 determines which one of flip-flops F08–F10 will be set in response to the signal. Because of the one time period delay in routine request flip-flops ADM–RDM, the routine priority selection signal representing the highest priority routine request will arrive at the input logic to flip-flops F08–F10 one time period after detection of the request. Thus, if a routine priority selection signal DXDP issues during the time periods defined by either of timing signals FTL2 or FTL6, flip-flop F10 is set to the 1-state to indicate a data service routine request. If a routine priority selection signal DXDP issues during the time period defined by timing signal FTL0, flip-flop F08 will be set to the 1-state to indicate a terminate interrupt routine request. If routine prioriy selection signal DXDP issues during the time period defined by timing signal FTL4, flip-flop F09 is set to the 1-state to indicate a special interrupt routine request.

In operation, routine request gates, such as shown in FIGURE 29, scan for special interrupt and terminate interrupt routine requests from each peripheral channel and data service routine requests from the pair of buffer registers associated with that peripheral channel. During a given time period, defined by the TL-counter, all sixteen peripheral channels and pairs of buffer registers are scanned for the same type of routine requests. Requests of a given type are stored in routine request flip-flops, ADM–RDM, the 1-ouput signals of which are applied to routine priority selection gates 650. The output signal DXDP of the routine priority selection gates represents the highest priority routine request of a given type present during a time period and this signal is employed to set the flip-flop of the F-register corresponding to that type of request, one time period after the request was sensed. During the next time period, the routine request gates are employed to detect another type of routine request. Thus, the same apparatus is employed to scan and assign priority to a plurality of different types of routine requests in the input/output controller.

Lockout flip-flop F11 of F-register 252 is periodically reset to the0-state. At this time, if one or more of flip-flop F07–F10 are set to the 1-state, the highest priority routine request entered in flip-flops F07–F10 causes the input/output controller to enter that routine.

FIGURE 31 is a timing diagram illustrating the timing of signals in the routine request priorty apparatus of the input/output controller. For purposes of the timing diagram, it is assumed that data service routine requests for peripheral channels P and R, a special interrupt rountine request from peripheral channel A, a terminate interrupt routine request from peripheral channel B and a connect routine request are received. Referring to FIGURE 31, the TL-counter is advanced by clock pulses QPH1 to provide successive timing control signals FTL6, FTL0, FTL2 and FTL4 which define successive time periods. During the first time period defined by signal FTL6, the connect routine request, represented by signal JCNT, and the special interrupt routine request from peripheral channel A, represented by signal RAES, are present. The connect routine request causes flip-flop F07 of the F-register to be set to the 1-state and signal DALJ to issue. The special interrupt routine request does not cause flip-flop F09 to be set during time period FTL6 since special interrupt routine request are not sampled until time period FTL2. The contents of the F-register flip-flops F07–F10 are not checked by the input/output controller until reset lockout, i.e. when flip-flop F11 is reset to the 0-state. Thus, the input/output controller does not enter a connect routine at this time.

During the subsequent time period defined by signal FTL2, signals DPDA and DRDA issue, indicating data service routine requests for peripheral channels P and R respectively. Since special interrupt routine requests are sampled during the time period defined by signal FTL2, signal DADM issues at this time to indicate a special interrupt routine request from peripheral channel A.

During time period FTL4, data service routine requests are sampled and signals DPDM and DRDM issue in response to the data service routine requests for peripheral channels P and R. Flip-flop ADM is set at this time to store the special interrupt routine request from peripheral channel A and signal DADP issues. Signal DADP causes flip-flop F09 to be set to the 1-state during next time period FTL6. During time period FTL6, flip-flops FPDM and FRDM are set to the 1-state to store the data service routine requests for peripheral channels P and R. Since the data service routine request for peripheral channel P has priority over the data service routine request for peripheral channel R, signal DPDP issues and causes flip-flop F10 of the F-register to set to the 1-state during time period FTL0. Since a data service routine request stored in flip-flop F10 has higher priority than a special interrupt routine request stored in flip-flop F09, flip-flop F09 is reset to the 0-state.

At the end of time period FTL0, flip-flop F11 of the F-register is reset to the 0-state, permitting the routine requests stored in the F-register to be sampled. The time at which reset lockout occurs is independent of the TL-counter and is controlled by conditions in the input/output controller. Since a data service routine is stored in flip-flop F10, the input/output controller enters a data service routine. Clock signal QPH1 is inhibited, holding the TL-counter at FTL2 for an additional time period. During this additional time period, data is transferred between the buffer storage unit and the processing and control unit. During performance of the data service routine by the input/output controller, the routine request priority apparatus continues to sample routine requests, in anticipation of the next reset lockout which will occur upon completion of the data service routine by the input/output controller.

In the subsequent time periods, the data service routine request for peripheral channel R causes flip-flop F10 of the F-register to be set to the 1-state. When flip-flop F11 is again reset to the 0-state, as illustrated in FIGURE 31, signal DDSJ again causes the input/output controller to perform a data service routine. The advance of the TL-counter is again inhibited for one time period to permit data transfer between the buffer storage unit and the processing and control unit.

During performance of the second data service routine by the input/output controller, the routine request priority apparatus continues sampling routine requests. During the fourth time period FTL0, shown in FIGURE 31, the terminate interrupt routine request from peripheral channel D, represented by signal RDET, appears. Since the special interrupt routine request from peripheral channel A, which has not yet been granted, has priority over the terminate interrupt routine request from peripheral channel D and the connect routine request, flip-flop F09 of the F-register is set to the 1-state. When flip-flop F11 is reset to the 0-state, the input/output controller thus enters a special interrupt routine. The advance of the TL-counter is again inhibited for one time period to permit transfer of the peripheral channel address from the processing and control unit to the peripheral channel unit.

Subsequently, flip-flop F08 is set to the 1-state in response to the terminate interrupt routine request from peripheral channel D. At the next reset lockout, the input/output controller enters a terminate interrupt routine, since a terminate interrupt routine request takes precedence over a connect routine request. The advance of the TL-counter is inhibited for one time period to permit transfer of a peripheral channel address to the peripheral channel unit. At the end of the terminate interrupt routine, reset lockout occurs and the connect routine request in the F-register causes the input/output controller to enter the connect routine. The advance of the TL-counter is inhibited for one time period to permit transfer of primary mailbox word information from the processing and control unit to the peripheral channel unit.

Buffer storage unit

Figure 16D:
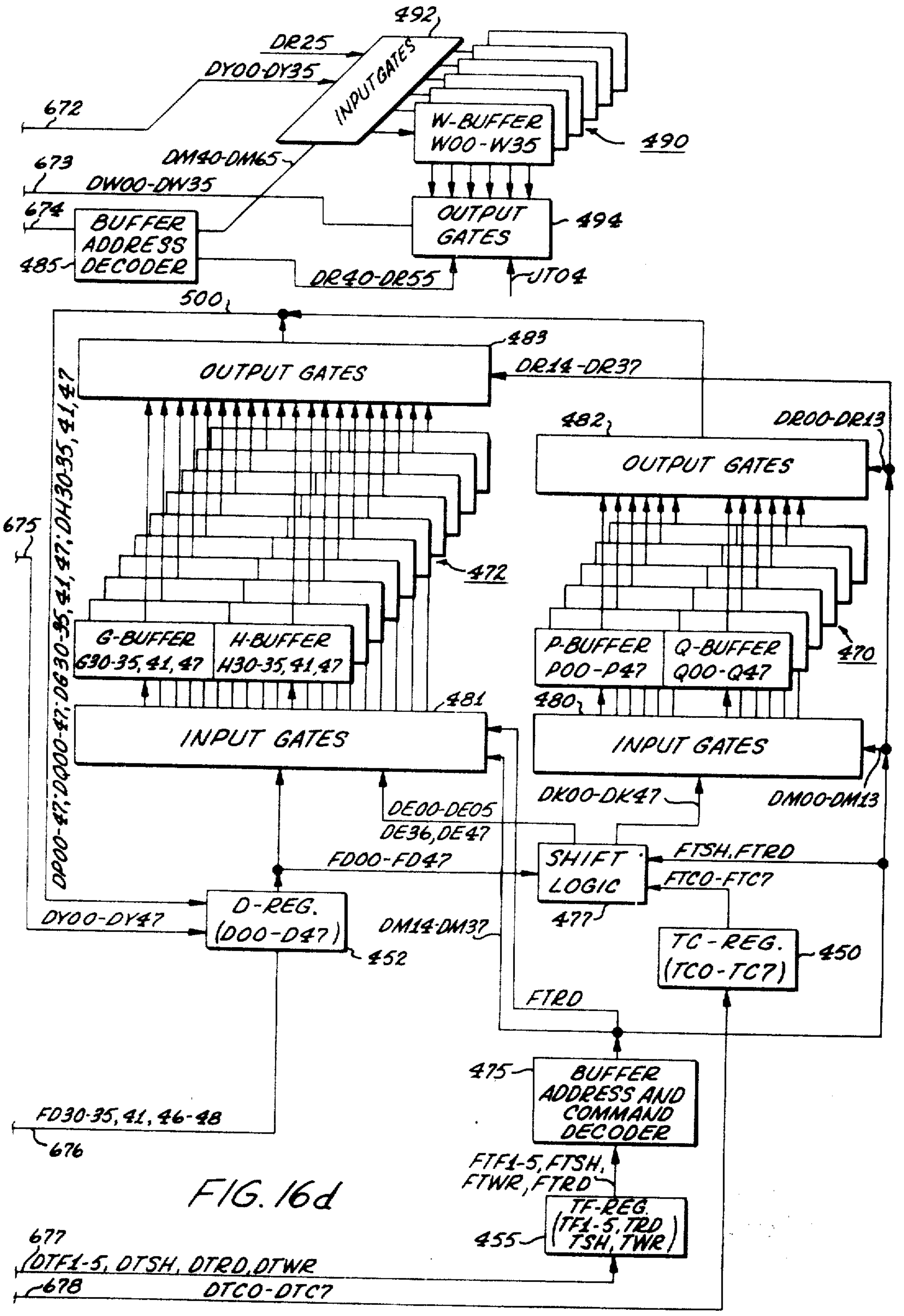

The buffer storage unit or BUF section of the input/output controller comprises sixteen pairs of buffer registers for temporarily storing information being transferred between the peripheral subsystems and one or more memories. The buffer storage unit also comprises D-register 452, TC-register 450, TF-register 455, buffer address and command decoder 475, shift logic 477, input gates 480 and 481, output gates 482 and 483, buffer address decoder 485, six W-buffer registers 490, input gates 492 and output gates 494, as illustrated in FIGURE 16*d*. The details of the structure of the buffer storage unit are provided in FIGURES 32*a* and 32*b*, which illustrates the contents of the buffer storage unit registers; FIGURE 33, which illustrates the shift apparatus of the buffer storage unit; FIGURES 126–134, which are logical combination signal diagrams; FIGURES 134 and 135, which are flip-flop input logical schematic diagrams of buffer storage unit flip-flops employed in registers and as control signal sources; FIGURE 136, which are one-shot input logical schematic diagrams; and FIGURES 137–142, which are logic charts illustrating register input logical schematic diagrams.

Six of the pairs of buffer registers, identified by reference numeral 470, each provide temporary storage for two data words. Ten of the pairs of buffer registers, identified by reference numeral 472, each provide temporary storage for two data characters. Each of the pairs of buffer registers 470 includes a P-buffer register comprising flip-flops P00–P47 and a Q-buffer register comprising flip-flops Q00–Q47. Each of the P- and Q-buffer registers stores a data word in bit positions 0–35, parity information in bit positions 36–41, a count field in bit positions 42–46 and an end data bit in bit position 47. Each of the six pairs of buffer registers 470 is associated with a corresponding one of peripheral channels A–F.

A logic chart illustrating the set input signals to each of the P-buffer registers and the Q-buffer registers is provided in FIGURE 137. FIGURE 137 illustrates the input data signals and the input gating signals which cause each flip-flop of the six P-buffer registers and the six Q-buffer registers to be set to the 1-state. For example, referring to FIGURE 137, flip-flop Q22 of the Q-buffer register associated with peripheral channel A is set to the 1-state when input data signal DK22 and input gating signal DM01 are binary 1's. This relationship may be expressed by the following logical schematic diagram:

$$\mathrm{DK22\ DM01=FQ22}$$

Similarly, flip-flop P39 of the P-buffer register associated with peripheral channel E is set to the 1-state when input data signal DK39 and input gating signal DM10 are both binary 1's. The logical schematic diagram illustrating the structure for implementing this relationship is as follows:

$$\mathrm{DK39\ DM10=FP39}$$

The chart of FIGURE 137 constitutes a logical schematic diagram which illustrates the logical structure providing set input signals to the P-buffer register and the Q-buffer register associated with each of the peripheral channels A–F.

Each flip-flop of the P-buffer registers and the Q-buffer registers associated with peripheral channels A–F is reset to the 0-state if the data signal input is a binary 0 at the time the appropriate input gating signal issues. For example, flip-flop P04 of the P-buffer register associated with peripheral channel C is reset to the 0-state if input data signal DK04 is a binary 0 while input gating signal DM04 is a binary 1. The logical schematic diagram illustrating the structure necessary to implement this relationship can be derived from FIGURE 137 as follows:

$$\overline{\mathrm{DK04}}\ \mathrm{DM04}=\overline{\mathrm{FP04}}$$

Figure 32A:
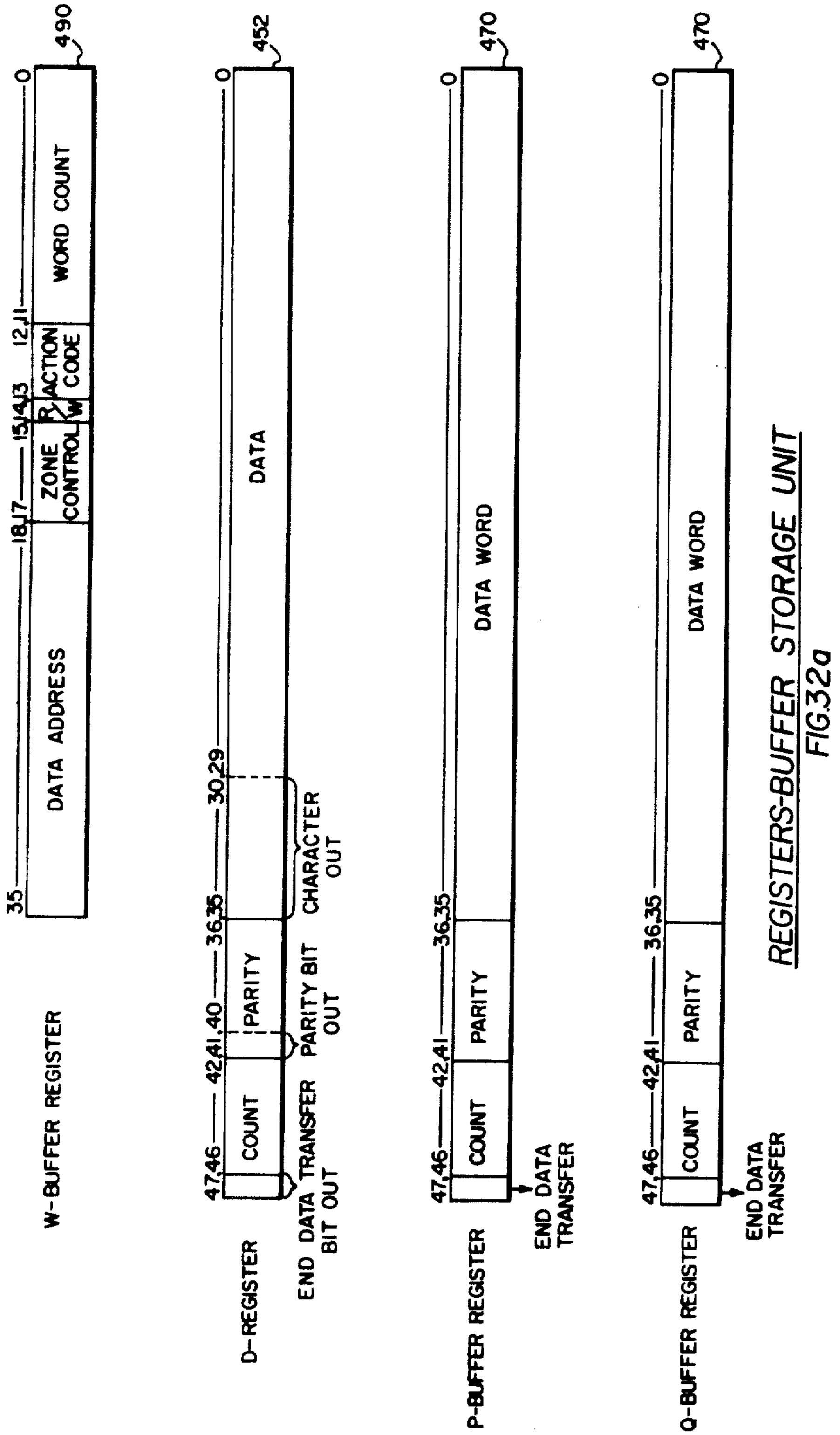
FIGURES 32*a* and 32*b* are a symbolic diagram illustrating the contents of the registers in the buffer storage unit of FIGURE 16*d*.
Figure 33A:
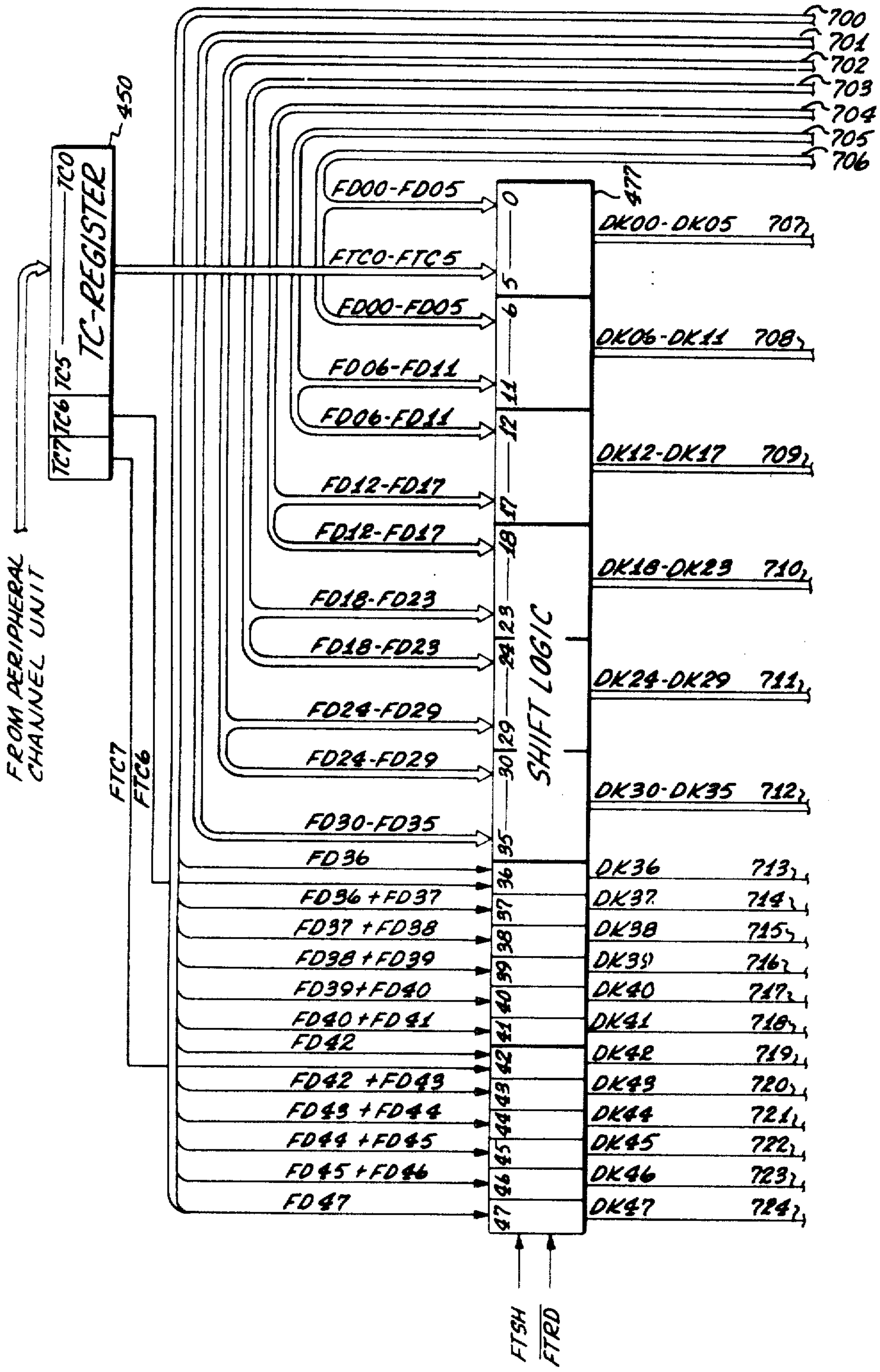
FIGURES 33*a*, 33*b*, and 33*c* are a block diagram illustrating the shift apparatus in the buffer storage unit of FIGURE 16*d*.
Figure 33B:
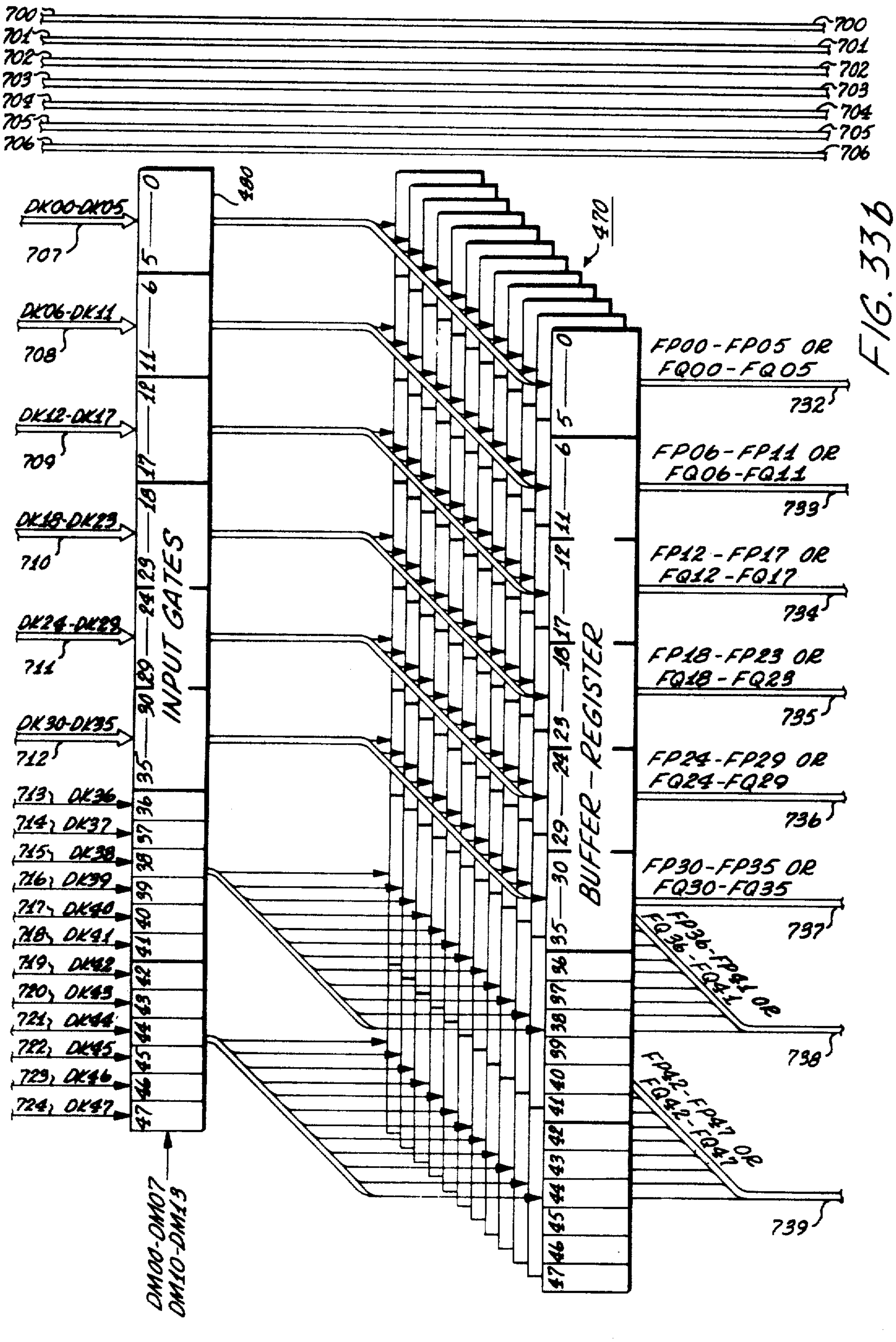
Figure 33C:
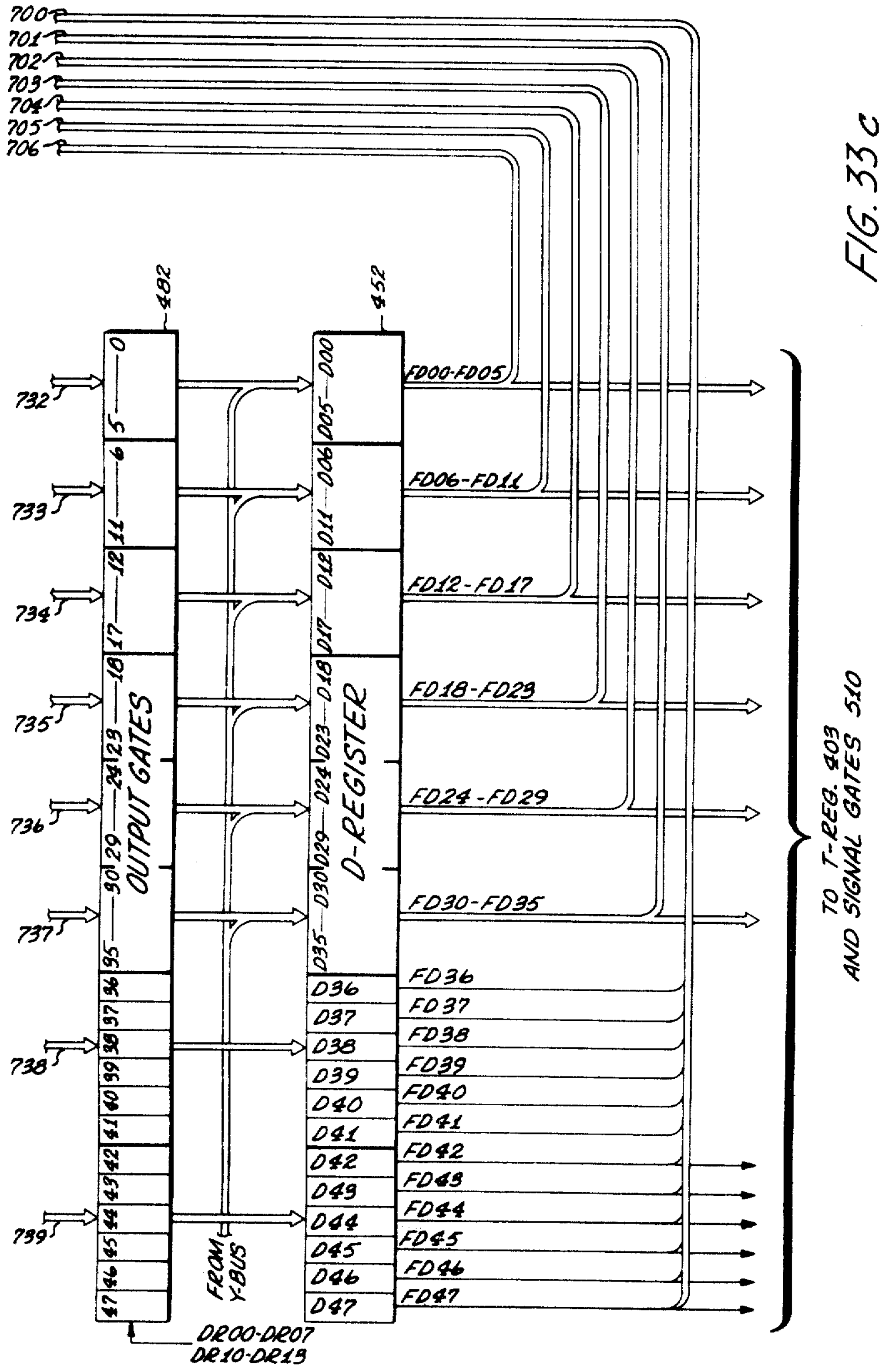

The contents of each of the P- and Q-buffer registers 470 are illustrated in FIGURE 32*a*.

Each of the pairs of buffer registers 472 includes a G-buffer register comprising flip-flops G30–G35, G41 and G47 and an H-buffer register comprising flip-flops H30–H35, H41 and H47. Each of the G- and H-buffer registers stores a data character in bit positions 30–35, a parity bit for the data character in bit position 41 and an end data transfer bit in bit position 47. Each of the ten pairs of buffer registers 472 is associated with a corresponding one of peripheral channels G–R.

A logic chart illustrating the set input signals to each of the G-buffer registers and the H-buffer registers is provided in FIGURE 138. FIGURE 138 illustrates the input data signals and the input gating signals which cause each flip-flop of the ten G-buffer registers and the ten H-buffer registers to be set to the 1-state. For example, referring to FIGURE 138, flip-flop G35 of the G-buffer register associated with peripheral channel J is set to the 1-state when input data signal DL05 and input gating signal DM20 are both binary 1's. The logical schematic diagram illustrating the structure necessary to implement this relationship is as follows:

DL05 DM20=FG35

Thus, the chart of FIGURE 138 constitutes a logical schematic diagram which illustrates the logical structure providing set input signals to the G- and H-buffer registers associated with each of the ten peripheral channels G–R. Each flip-flop of the G- and H-buffer registers associated with peripheral channels G–R is reset to the 0-state if the data signal input is a binary 0 at the time the appropriate input gating signal issues. For example, flip-flop H47 of the H-buffer register associated with peripheral channel M is reset to the 0-state if input data signal DL07 is a binary 0 while input gating signal DM27 is a binary 1. The logical schematic diagram illustrating the structure necessary to implement this relationship is as follows:

$\overline{DL07}$ DM27=$\overline{FH47}$

The contents of each of the G- and H-buffer registers 472 are illustrated in FIGURE 32.

Input gates 480 provide input signals to a selected buffer register of the six pairs of buffer registers 470. Similarly, input gates 481 provide input signals to a selected buffer register of the ten pairs of buffer registers 472. Input gates 480 receive information signals from D-register 452, shift logic 477 and TC-register 450. Input gates 481 receive information signals from D-register 452 and TC-register 450. Input gates 480 and 481 also receive address and command information from buffer address and command decoder 475. The logical schematic diagrams of input gates 480 and 481 are provided in FIGURES 130 (Character Buffer Input Data Signals), 137 and 138 respectively.

Output gates 482 receive the output signals of all of the flip-flops of the six pairs of buffer registers 470. Output gates 483 similarly receive the output signals of all of the flip-flops of the ten pairs of buffer registers 472. Output gates 482 and 483 also receive address and command signals from buffer address and command decoder 475. In response to the address and command signals received from buffer address and command decoder 475, output gates 482 and 483 apply output signals to buffer bus 500 representing the contents of one buffer register of the six pairs of buffer registers 470 or the ten pairs of buffer registers 472.

D-register 452 is a forty-eight bit register comprising flip-flops D00–D47. D-register 452 is employed to store information transmitted from Y-bus 505 of the processing and control unit, in addition to information transferred from buffer registers 470 or 472. The contents of D-register 452 may be transferred to one of the buffer registers, to T-register 403 of the peripheral channel unit or to signal gates 510 of the processing and control unit. The logical schematic diagrams of D-register 452 and the input gating structure to D-register 452 are provided in FIGURES 140, 141 and 142. FIGURE 140 is a logic chart illustrating data input signals to the D-register flip-flops from buffer registers 470, and corresponding input gating signals which will cause each of the flip-flops of D-register 452 to be set to the 1-state. For example, flip-flop D28 of D-register 452 is set to the 1-state when flip-flop P28 of the P-buffer register associated with peripheral channel B is set to the 1-state and signal DR02 issues. Flip-flop D28 of D-register 452 is also set to the 1-state when flip-flop P28 or flip-flop Q28 of any other P- or Q-buffer register is set to the 1-state and the corresponding gating signal issues. Thus, the set input logical schematic diagram for flip-flop D28 of D-register 452 may be derived from FIGURE 140 as follows:

FP28(A)DR00+FQ28(A)DR01+FP28(B)DR02
+FQ28(B)DR03+FP28(C)DR04+FQ28(C)DR05
+FP28(D)DR06+FQ28(D)DR07+FP28(E)DR10
+FQ28(E)DR11+FP28(F)DR12
+FQ28(F)DR13=FD28

FIGURE 140 illustrates only the set input signals to the D-register flip-flops. All flip-flops of D-register 452 are reset by signal DRRS.

FIGURE 141 illustrates the input data signals from the G-and H-buffer registers and the corresponding input gating signals which will cause each of flip-flops D30–D35, D41 and D47 of D-register 452 to be set to the 1-state. For example, in addition to the signal combinations illustrated in FIGURE 140 which will cause flip-flop D31 to be set to the 1-state, flip-flop D31 will also be set to the 1-state if flip-flop H31 of the H-buffer register associated with peripheral channel H is set to the 1-state and gating signal DR17 issues. The input logical schematic diagrams for flip-flops D30–D35, D41 and D47 of D-register 452 are similar to the above input logical schematic diagram for flip-flop D28. For example:

FG32(G)DR14+FH32(G)DR15+FG32(H)DR16
+FH32(H)DR17+FG32(J)DR20+FH32(J)DR21
+FG32(K)DR22+FH32(K)DR23+FG32(L)DR24
+FH32(L)DR25+FG32(M)DR26+FH32(M)DR27
+FG32(N)DR30+FH32(N)DR31+FG32(P)DR32
+FH32(P)DR33+FG32(Q)DR34+FH32(Q)DR35
+FG32(R)DR36+FH32(R)DR37=FD32

FIGURE 142 illustrates the input signals from Y-bus 505 and the corresponding input gating signals which cause the respective flip-flops of D-register 452 to be set to the 1-state. The combination of FIGURES 140, 141 and 142 thus illustrates the entire set input logical schematic diagram for each flip-flop of D-register 452. For example, the input logical schematic diagram for flip-flop D30 of D-register 452 is derived from FIGURES 140, 141 and 142 as follows:

FP30(A)DR00+FQ30(A)DR01+FP30(B)DR02
+FQ30(B)DR03+FP30(C)DR04+FQ30(C)DR05
+FP30(D)DR06+FQ30(D)DR07+FP30(E)DR10
+FQ30(E)DR11+FP30(F)DR12+FQ30(F)DR13
+FG30(G)DR14+FH30(G)DR15+FG30(H)DR16
+FH30(H)DR17+FG30(J)DR20+FH30(J)DR21
+FG30(K)DR22+FH30(K)DR23+FG30(L)DR24
+FH30(L)DR25+FG30(M)DR26+FH30(M)DR27
+FG30(N)DR30+FH30(N)DR31+FG30(P)DR32
+FH30(P)DR33+FG30(Q)DR34+FH30(Q)DR35
+FG30(R)DR36+FH30(R)DR37
+DY30DWR0=FD30

In addition to the terms of set input logical schematic diagrams for flip-flop D46, shown in FIGURES 140 and 142, the following signal combinations set flip-flop D46 to the 1-state:

FTF3FTF4DRD0+FTF5DRD0=FD46

As noted above, all of the D-register flip-flops are reset to the 0-state by signal DRRS. The contents of D-register 452 are illustrated in FIGURE 32*a*.

Figure 32B:
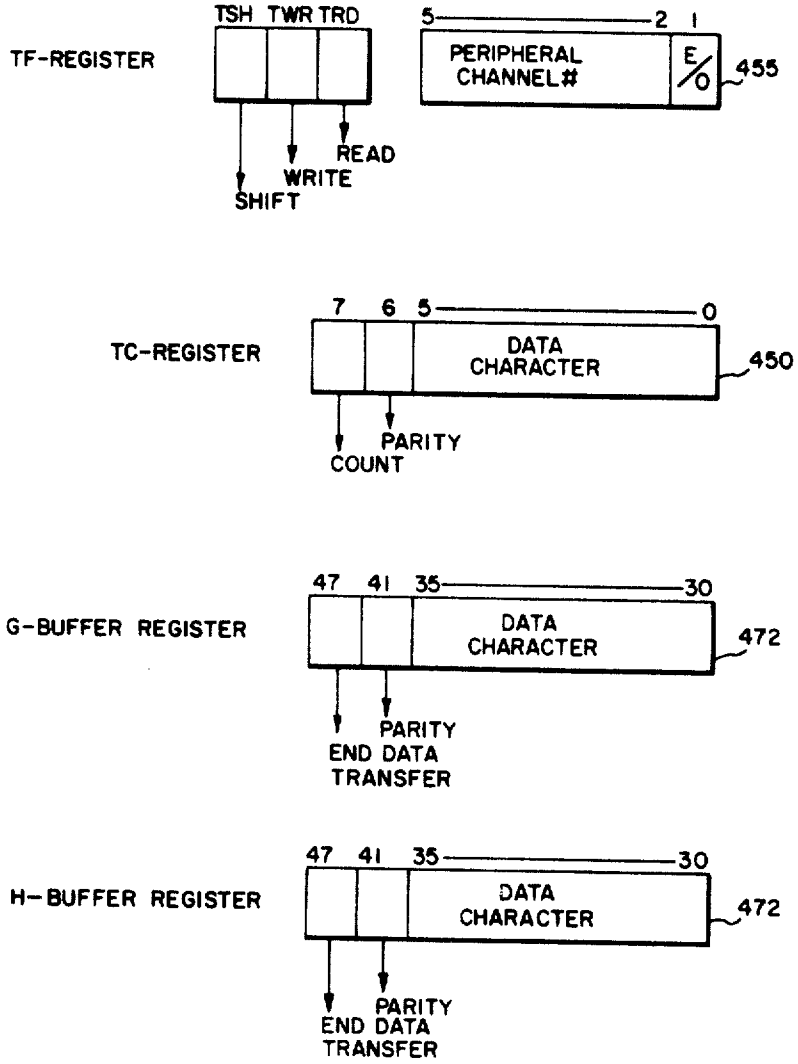

TF-register 455 is an eight-bit register comprising flip-flops TF1–TF5, TRD, TSH and TWR. TF-register 455 is employed to store the peripheral channel number and read, write and shift command information to control the operation of the buffer registers 470 and 472, input gates 480 and 481, output gates 482 and 483 and shift logic 477. TF-register 455 receives signals DTF1–DTF5, DTSH, DTRD and DTWR from buffer control decode logic 404 of the peripheral channel unit. TF-register 455 provides output signals FTF1–FTF5, FTSH, FTWR and FTRD to buffer address and command decoder 475. The input logical schematic diagrams of TF-register 455 are provided in FIGURE 135. The contents of TF-register 455 are illustrated in FIGURE 32*b*.

Buffer address and command decoder 475 receives signals FTF1–FTF5, FTRD, FTSH and FTWR from TF-register 455 and provides gating signals DM00–DM13 to input gates 480, gating signals DM14–DM37 to input gates 481, gating signals DR00–DR13 to output gates 482, gating signals DR14–DR37 to output gates 483 and signal FTRD to input gates 481. Buffer address and command decoder 475 also provides signals FTRD and FTSH to shift logic 477. The logical schematic diagrams illustrating the structure of buffer address and command decoder 475 are provided in FIGURES 126, 127, 128 and 129.

TC-register 450 is an eight-bit register comprising flip-flops TC0–TC7. TC-register 450 is employed to store the six bits of a data character in bit positions 0–5, the parity bit in bit position 6 and a count bit in bit position 7. TC-register 450 receives signals DTC0–DTC7 from data switch 402 of the peripheral channel unit and provides signals FTC0–FTC7 to shift logic 477. The input logical schematic diagrams of TC-register 450 are provided in FIGURES 134 and 135. The contents of the TC-register 450 are provided in FIGURE 32.

Shift logic 477 receives signals FD00–FD47 from D-register 452, signals FTC0–FTC7 from TC-register 450 and signals FTSH and FTRD from buffer address and command decoder 475. Shift logic 477 provides output signals DK00–DK47 to input gates 480 and output signals DE00–DE05, DE36 and DE47 to input gates 481. During transfer of information to one of buffer registers 470 from a peripheral subsystem, shift logic 477 shifts the contents of the buffer register through one character position, while simultaneously merging the new character transferred from the peripheral subsystem. During transfer of information from one of buffer registers 470 to a peripheral subsystem, shift logic 477 shifts the contents of the buffer register through one character position to prepare the next character for transfer to the peripheral subsystem. Shift logic 477 also provides a transfer path for transfer of characters between one of buffer registers 472 and a peripheral subsystem. The logical schematic diagrams illustrating the structure of shift logic 477 are provided in FIGURES 127–129, 133 and 134 showing the development of signals DK00–DK47 and DE00–DE47.

Each of the W-buffer registers 490 is associated with a corresponding one of peripheral channels A–F and provides temporary storage of the primary mailbox word associated with that peripheral channel. Each W-buffer register comprises flip-flops W00–W35. FIGURE 139 illustrates the input data signals and the input gating signals which cause each flip-flop of the six W-buffer registers to be set to the 1-state. For example, referring to FIGURE 139, flip-flop W19 of the W-buffer register associated with peripheral channel B is set to the 1-state when input signal JY19 and input gating signal DM51 are both binary 1's. The logical schematic diagram illustrating the structure necessary to implement this relationship is as follows:

$$JY19\ DM51 = FW19$$

The chart of FIGURE 139 therefore constitutes a logical schematic diagram which illustrates the logical structure which develops the set input signals to each of the flip-flops of W-buffer registers 490. Each flip-flop of the W-buffer registers is reset to the 0-state if the data signal input is a binary 0. For example, flip-flop W01 of the W-buffer register associated with peripheral channel A is reset to the 0-state if input data signal JY01 is a binary 1 while input gating signal DM40 is a binary 1. The logical schematic diagram illustrating the structure necessary to implement this relationship is as follows:

$$\overline{JY01}\ DM40 = \overline{FW01}$$

The contents of each of the W-buffer registers 490 are illustrated in FIGURE 32*a*.

Input gates 492 to W-buffer registers 490 receive information signals DY00–DY35 from Y-bus 505 of the processing and control unit and input gating signals DM40–DM65 from buffer address decoder 485, in addition to control signal DR25 from control signal bus 372 of the microprogram storage unit. Input gates 492 transmit the primary mailbox word represented by signals DY00–DY35 to the W-buffer register addressed by input gating signals DM40–DM65. The logical schematic diagrams of input gates 492 are provided in FIGURE 139.

Output gates 494 receive the output signals from each of the W-buffer registers 490, in addition to control signal JT04 from control signal bus 372 of the microprogram storage unit and signals DR40–DR55 from buffer address decoder 485. Output gates 494 provide output signals DW00–DW35 to W-bus 520 of the processing and control unit, signals DW00–DW35 representing the output signals of the W-buffer register addressed by output gating signals DR40–DR55. The logical schematic diagrams of output gates 494 are provided in FIGURES 145–148 illustrating inputs to W-bus 520 from W-buffer registers 490.

Buffer address decoder 485 receives signals FK02–FK05 from K-register 425 of the processing and control unit. Buffer address decoder 485 provides output signals DM40–DM65 and DR40–DR55 which are applied to input gates 492 and output gates 494 respectively. The logical schematic diagrams illustrating the structure of buffer address decoder 485 are provided in FIGURES 131, 132 and 143.

*Shift/merge apparatus.*—FIGURE 33 illustrates in detail the apparatus for shifting and merging information in the word buffer registers 470 of the buffer storage unit. Referring to FIGURE 33, each of the twelve buffer registers 470, identified in FIGURE 16*d* as the P- and Q-buffer registers, stores a six character word in bit positions 0–35, each of the characters comprising six binary digits. In addition, each of the buffer registers 470 includes six binary digit storage locations, identified as bit positions 364–1, for storage of a parity bit for each of the six characters stored in bit positions 0–35 of the buffer register. Each buffer register also includes five binary digit storage positions, identified as bit positions 42–46 for storage of count information. A binary digit storage position, identified as bit position 47, is also provided in each one of buffer registers 470 to store end data transfer information.

Buffer registers 470 store information being transferred between a memory and the six peripheral subsystems connected to peripheral channels A–F of the peripheral channel unit. Each of buffer registers 470 receives information through input gates 480. For each transfer of information into one of buffer registers 470, gating signals DM00–DM07 and DM10–DM13 identify the buffer register to which information is to be transferred through input gates 480. Gating signals DM00–DM07 and DM10–DM13 are generated by buffer address and command decoder 475 of the buffer storage unit. Input gates 480 receive data signals DK00–DK47, or the logically inverse form of these signals, from shift logic 477, as illustrated in FIGURE 33. The input logical schematic diagrams for buffer registers 470, illustrating the structure of input gates 480, are provided in FIGURE 137.

Shift logic 477, in response to signals FTSH and $\overline{FTRD}$ provided by buffer address and command decoder 475 of the buffer storage unit, causes a shift of one character position to occur between input and output. Bit positions 0–5 of shift logic 477 receives output signals FTC0–FTC5 respectively of TC-register 450, in addition to output signals FD00–FD05 respectively of D-register 452, as illustrated in FIGURE 33. Bit positions 6–11 of shift logic 477 receive output signals FD06–FD11 and FD00–FD05 of D-register 452. Bit positions 12–17 of shift logic 477 receive output signals FD12–FD17 and FD06–FD11 of D-register 452. Bit positions 18–23, 24–29 and 30–35 similarly receive the output signals of the corresponding flip-flops of D-register 452 as well as the outputs of the flip-flops storing the next lower-order character in D-register 452.

Bit position 36 of shift logic 477 receives output signal FT06 of TC-register 450, in addition to the output signal of flip-flop D36 of D-register 452, as shown in FIGURE 31. Bit position 37 of shift logic 477 receives output signal FD36 of flip-flop D36 of D-register 452, as well as output signal FD37 of flip-flop D37. Similarly, each of bit positions 38–41 of shift logic 477 receives the output signal of the corresponding flip-flop of D-register 452 as well as the output signal of the D-register flip-flop in the next lower-order bit position. Bit position 42 of shift logic 477 receives output signal FTC7 of TC-register 450 as well as output signal FD42 of D-register flip-flop D42. Each of bit positions 43–46 receives the output signal of the corresponding D-register flip-flop as well as the output signal of the next lower-order D-register flip-flop. Bit position 47 of shift logic 477 receives as its input the output signal of D-register flip-flop D47. The logical schematic diagrams illustrating the structure of shift logic 477 are provided in FIGURES 127–129, 133 and 134.

The output signals of each of buffer registers 470 are applied to output gates 482, along with gating signals DR00–DR07 and DR10–DR13. These gating signals are provided by buffer address and command decoder 475 of the buffer storage unit. The latter gating signals gate the output of a given buffer register to D-register 452.

D-register 452 receives the output signals of buffer registers 470 through output gates 482, as illustrated in FIGURE 33. D-register 452 may also receive information from memory on Y-bus 505 of the processing and control unit. The input logical schematic diagrams of D-register 452 are provided in FIGURE 140. The contents of D-register 452 may be transferred to shift logic 477, to T-register 403 of the peripheral channel unit or to signal gates 510 of the processing and control unit. The contents of the D-register flip-flops are transferred to the corresponding bit positions of shift logic 477, in the event data is transferred from memory through D-register 452 to buffer registers 470. During transfer of information characters from a peripheral subsystem to buffer registers 470 or from buffer registers 470 to a peripheral subsystem, the contents of D-register flip-flops D00–D29 are applied to bit positions 6–35 respectively of shift logic 477. Parity information in D-register flip-flops D36–D40 is applied to bit positions 37–41 respectively of shift logic 477. Similarly, count information in D-register flip-flops D42–D45 is applied to bit positions 43–46 respectively of shift logic 477.

During a read operation in which information is transferred from a peripheral subsystem through a peripheral channel to a corresponding one of buffer registers 470 for subsequent transfer to memory, the first character from the peripheral subsystem is transferred by the peripheral channel unit to TC-register 450. Flip-flop TC7 of TC-register 450 is always set to the 1-state. The six bit character in TC-register flip-flops TC0–TC5 is then transferred to bit positions 0–5 of shift logic 477 while the parity bit stored in flip-flop TC6 is transferred to bit position 36 of shift logic 477. The 1-output signal of flip-flop TC7, representing a count bit, is applied to bit position 42 of shift logic 477. The information character, parity bit and count bit are transferred through shift logic 477 and input gates 480 to the corresponding bit positions in one of buffer registers 470.

Upon receipt of the second information character from the peripheral subsystem in TC-register 450, the first information character and its corresponding parity and count bits are read from the buffer register through output gates 482 into flip-flops D00–D05, D36 and D42 of D-register 452. The first information character in D-register flip-flops D00–D05 is then applied to bit positions 6–11 of shift logic 477 while the parity and count bits in flip-flops D36 and D42 are applied to bit positions 37 and 43 respectively of shift logic 477. Simultaneously, the second information character in TC-register flip-flops TC0–TC5 is applied to bit positions 0–5 of shift logic 477 while the parity and count bits in flip-flops TC6 and TC7 are applied to bit positions 36 and 42 respectively of shift logic 477. In this manner, the second data character and its corresponding parity and count bits are merged with the first data character and its corresponding parity and count bits, simultaneous with the shift of the first data character through one character position and its parity and count bits through one bit position. The first and second information characters, parity bits and count bits are then stored in the appropriate buffer register.

Upon receipt of each successive information character from the peripheral channel unit in TC-register 450, the contents of the buffer register are transferred to D-register 452 and subsequently applied to shift logic 477 along with the contents of TC-register 450, each of the information characters in D-register 452 being shifted through one character position and each of the parity bits and count bits in D-register 452 being shifted through one bit position and shift logic 477. After five characters and their corresponding parity and count bits have been stored in the appropriate buffer register, flip-flop 46 of the buffer register is set to the 1-state. Upon receipt of the sixth character in TC-register 450 and the subsequent transfer of the contents of the buffer register to D-register 452 for shifting and merging with the sixth information character, flip-flop D46 is set to the 1-state. In response to signal FD46, one of the flip-flops FXD0 or FXD1 associated with the buffer register is set to the 1-state to indicate that the buffer register is full, causing a request for a data service routine to be transmitted to the routine request logic 410 in the peripheral channel unit. Upon receipt of additional characters from the peripheral subsystem, these characters are transferred to the second buffer register of the pair of buffer registers associated with that peripheral channel. The first buffer register of the pair is emptied by transfer of the data contents to memory, preparatory to receiving additional data characters from the peripheral subsystem after the second buffer register of the pair is full.

During a write operation in which information is transferred from memory to a buffer register and then to a peripheral subsystem through a peripheral channel, an information word is initially transferred from memory to D-register flip-flops D00–D35 on Y-bus 505. The information word is transferred from D-register 452 through shift logic 477 and input gates 480 to the corresponding flip-flops of the appropriate buffer register. Upon granting of a peripheral channel service request from the peripheral channel to which characters are to be transferred, the information word in the buffer register is transferred to D-register 452. The information character in D-register flip-flops D30–D35 is transferred to T-register 403 of the peripheral channel unit for transfer to the peripheral subsystem. The five characters in D-register flip-flops D00–D29 are transferred to bit positions 6–35 of shift logic 477. At this time, the 1-output signal of TC-register flip-flop TC7 is applied to bit position 42 of shift logic 477. This information is transferred through input gates 480 to the buffer register. After this transfer, the five remaining characters of the information word are in bit positions 6–35 of the buffer register and bit position 42 of the buffer register contains a binary 1, to indicate that one character of the information word has been transferred to a peripheral subsystem.

Upon granting of additional peripheral channel service requests from the peripheral channel, additional characters are transferred to T-register 403. As each character is transferred to T-register 403, the remaining characters are shifted through one character position and the count bit is shifted through one bit position in shift logic 477. After transfer of five characters, bit position 46 of the buffer register contains a binary 1. Upon transfer of the sixth character of the word through D-register 452 to T-register 403, flip-flop D46 is set to the 1-state by the count bit in bit position 46 of the buffer register. Signal FD46 causes either the FXD0 or FXD1 flip-flop associated with the buffer register to be set to the 1-state, indicating that the buffer register is empty. This causes a data service routine request to be transmitted to routine request logic 410 of peripheral channel unit. As additional characters are required by the peripheral subsystem, they are transmitted from the second buffer register of the pair of buffer registers associated with the peripheral channel, this buffer register having previously been loaded with an information word from memory. Another word is then transferred to the first buffer register, preparatory to the transfer of additional data characters to the peripheral subsystem after the second buffer register is emptied.

Processing and control unit

Figure 16E:
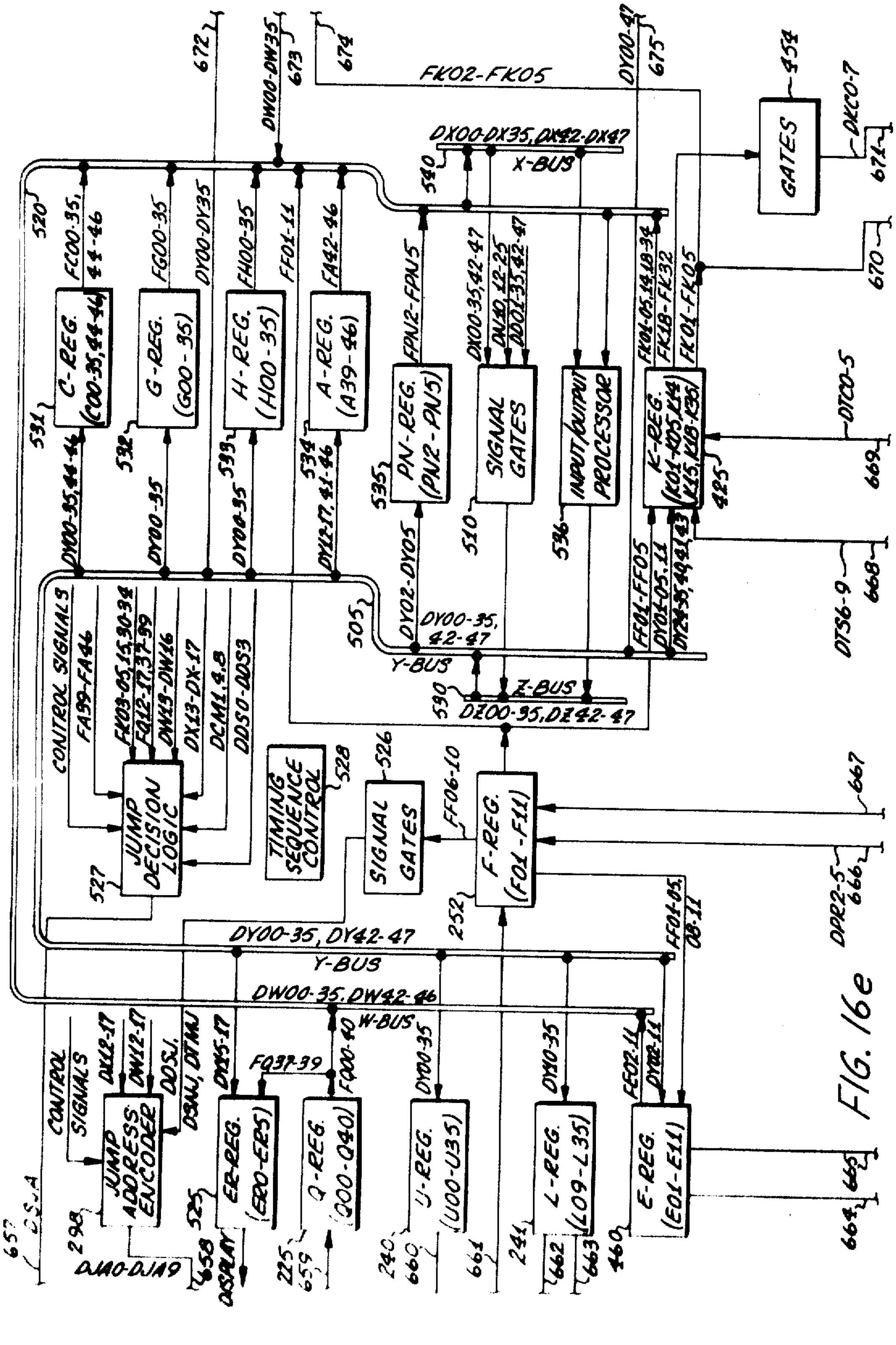
Figure 17:
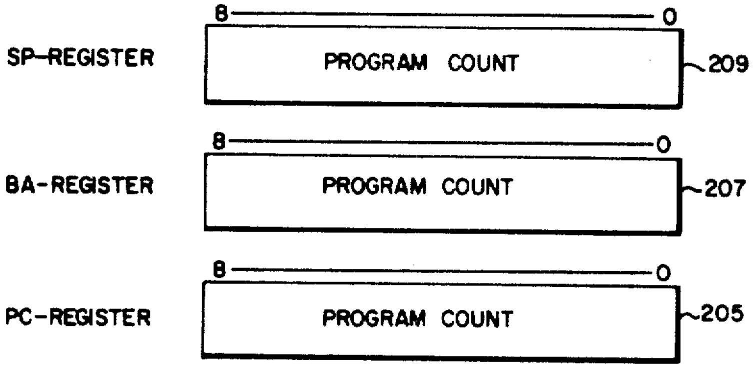
FIGURE 17 is a symbolic diagram illustrating the contents of the registers in the memory communications unit of FIGURE 16*a*.
Figure 34A:
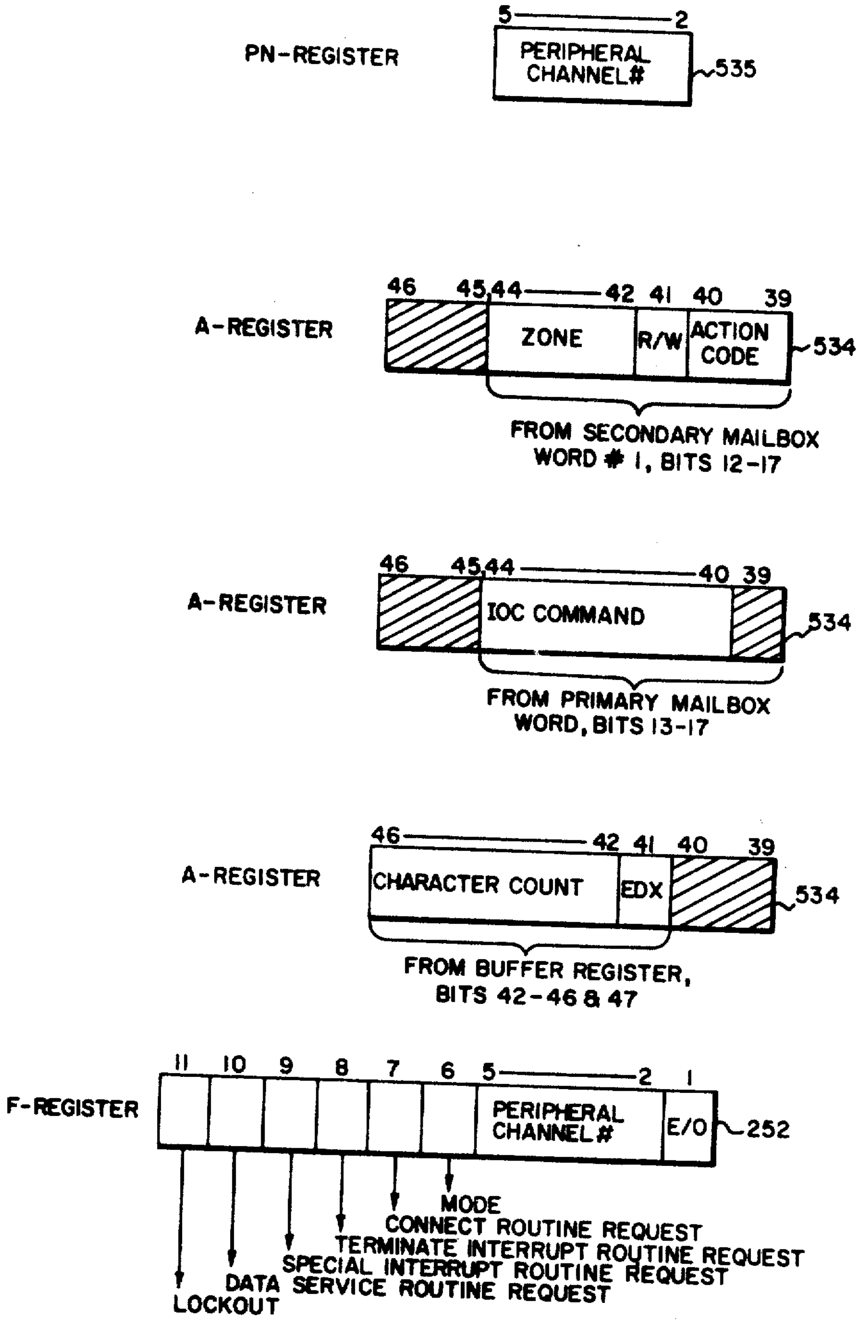
FIGURES 34*a*, 34*b*, 34*c*, and 34*d* are a symbolic diagram illustrating the contents of the registers in the processing and control unit of FIGURE 16*e*.
Figure 34B:
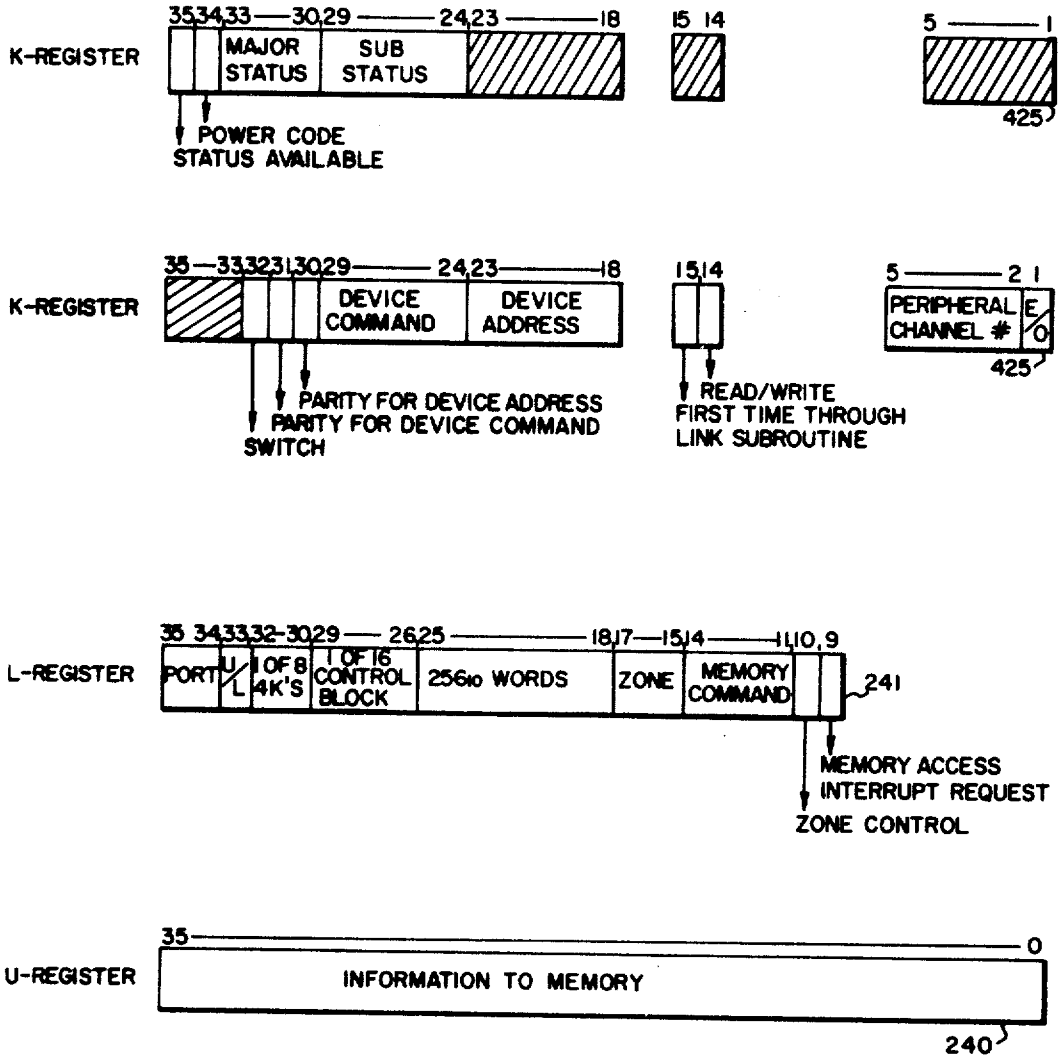
Figure 34C:
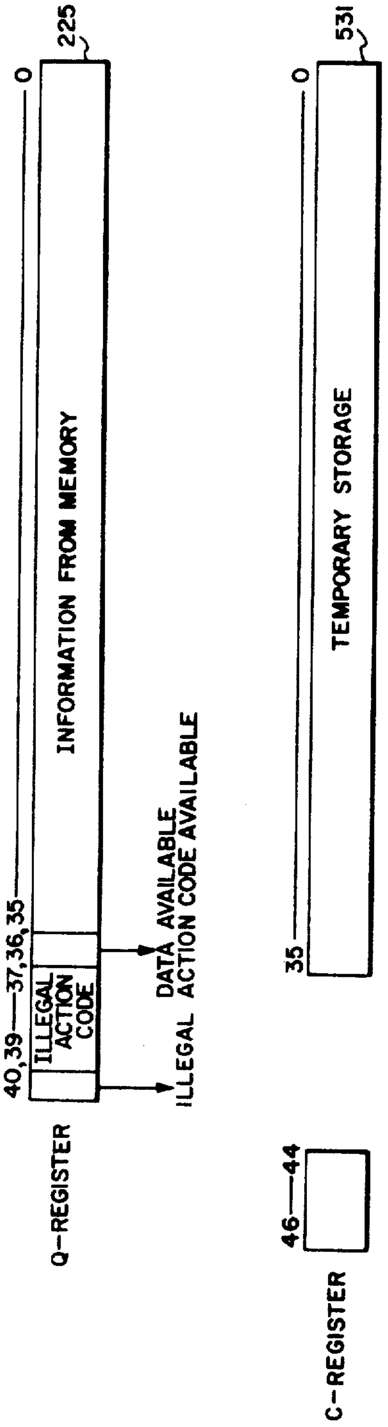
Figure 34D:
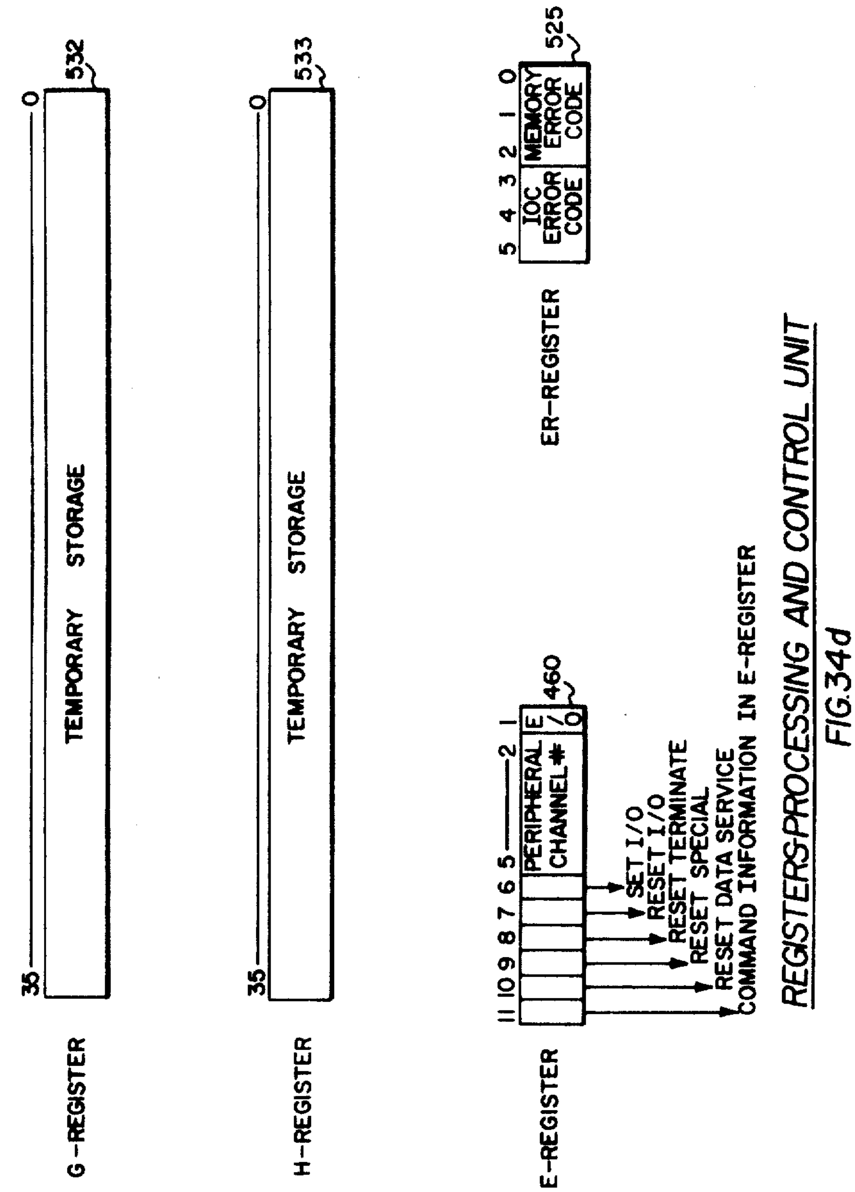
Figure 35:
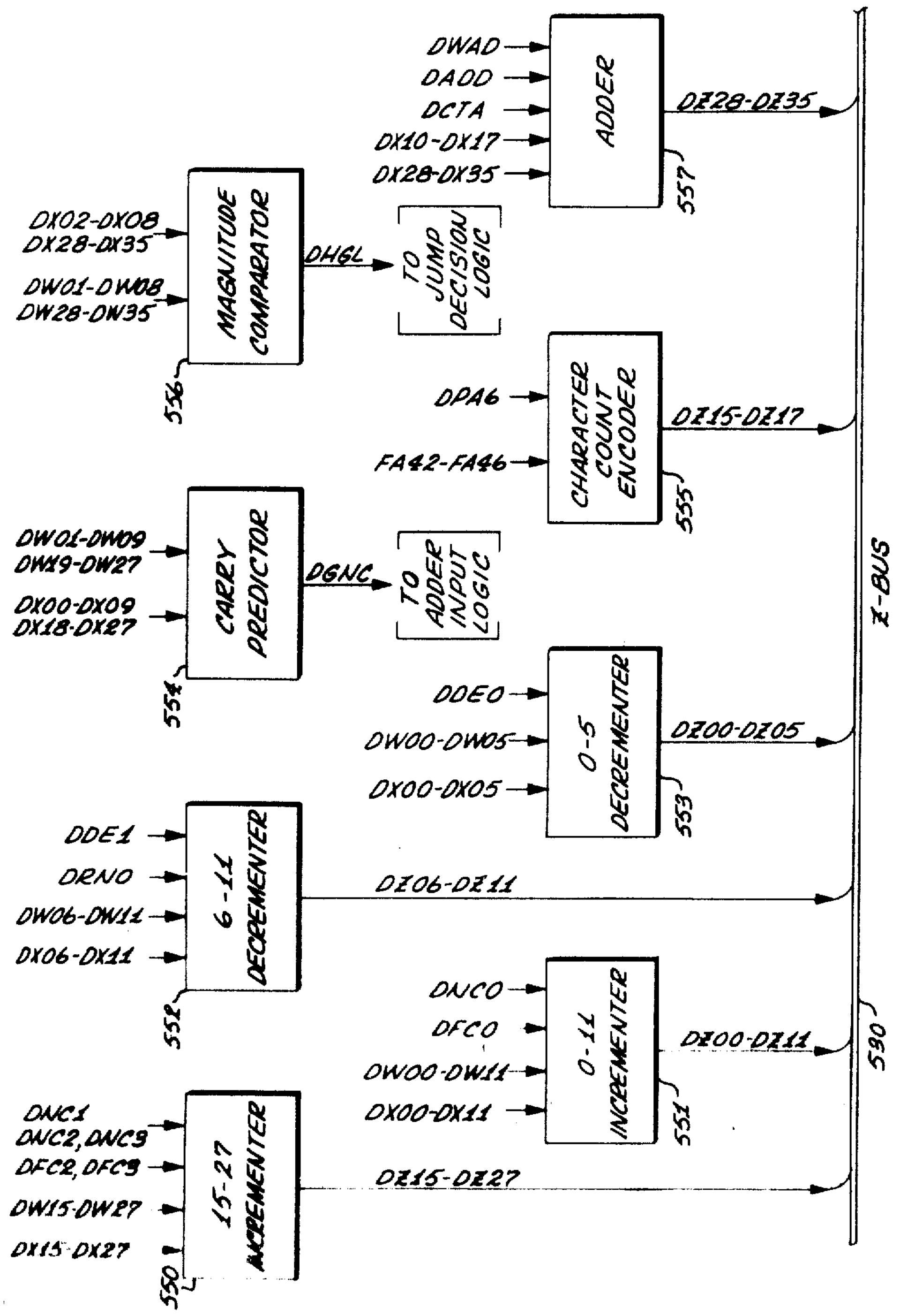
FIGURE 35 is a block diagram of the input/output processor of the processing and control unit of FIGURE 16*e*.
Figure 37:
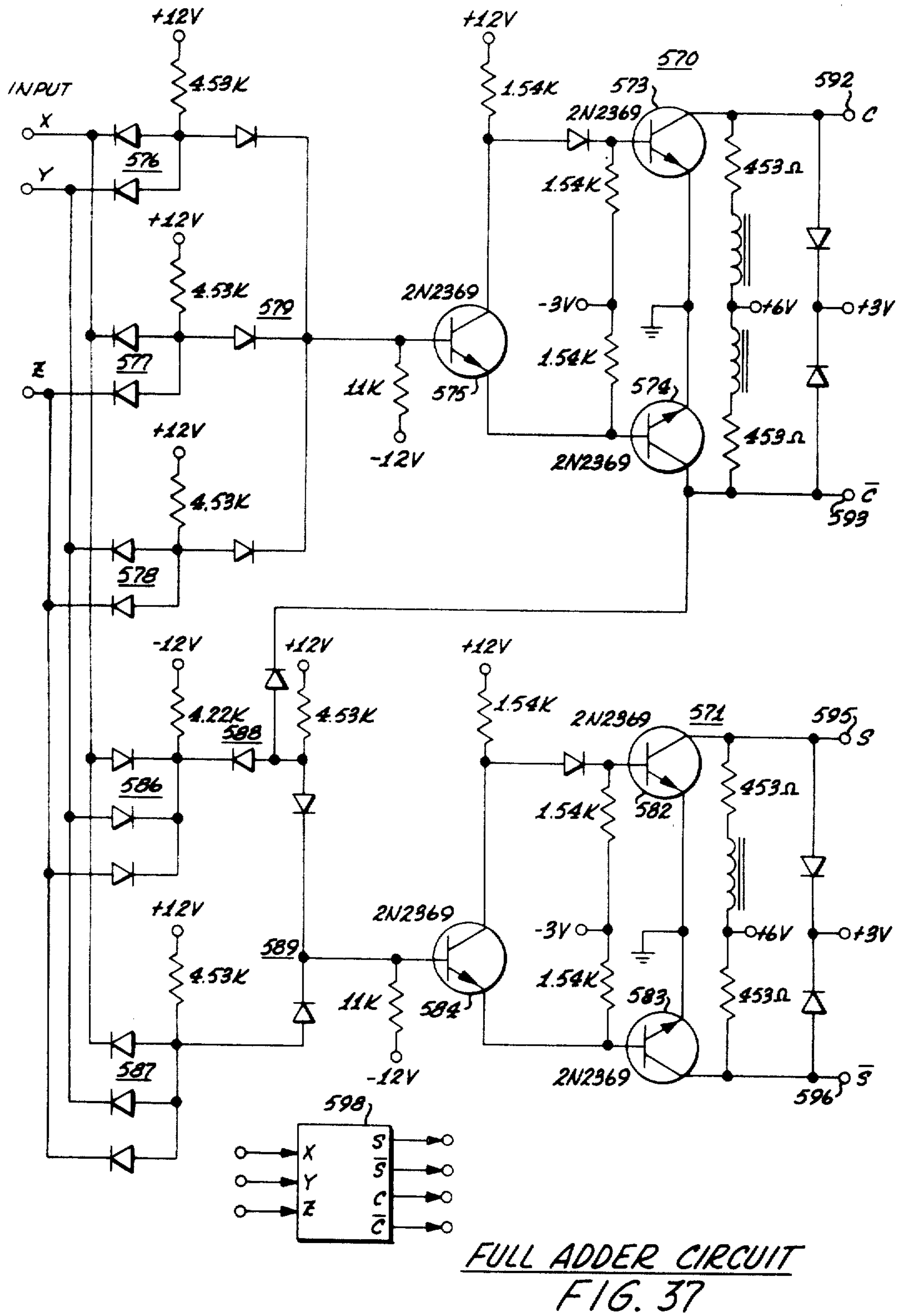
FIGURE 37 is a circuit diagram of a full adder circuit employed in the adder of FIGURE 36.

The processing and control unit or IOP section of the input/output controller comprises Q-register 225, U-register 240, L-register 241, F-register 252, jump address encoder 298, K-register 425, gates 454, E-register 460, Y-bus 505, signal gates 510, W-bus 520, ER-register 525, signal gates 526, jump decision logic 527, timing sequence control 528, Z-bus 530, C-register 531, G-register 532, H-register 533, A-register 534, PN-register 535, input/output processor 536 and X-bus 540, as illustrated in FIGURE 16*e*. The details of the structure of the processing and control unit are provided in FIGURE 34, which illustrates the contents of the processing and control unit registers; FIGURE 35, which illustrates the input/output processor 536; FIGURE 36, which illustrates the adder of input/output processor 536; FIGURE 37, which illustrates a full adder circuit; FIGURES 143–162, which are logical combination signal diagrams; FIGURES 163–178, which are flip-flop input logical schematic diagrams of the processing and control unit flip-flops employed in registers and as control signal sources; and FIGURE 179, which illustrates one-shot input logical schematic diagrams. The processing and control unit coordinates and controls operations in the input/output controller in addition to providing apparatus and signal paths for operating upon and transferring information between the memory communications unit and the buffer storage unit in the course of data transfers between a memory and a peripheral subsystem.

Jump address encoder 298 receives inputs from control signal bus 372 of the microprogram storage unit, signal gates 526, X-bus 540 and W-bus 520. Jump address encoder 298 provides a jump address represented by signals DJA0–DJA9 to JA-bus 290 of the memory communications unit for transfer to PC-register 205 and to BA-register 207 when certain conditions occur in the input/output controller. The logical schematic diagrams illustrating the structure of jump address encoder 298 are provided in FIGURE 143 (Jump Address (JA) Bus Input Signals), the portions of FIGURE 154 illustrating the generation of signals DCM1, DCM4 and DCM8 and the portions of FIGURE 155 illustrating the generation of signals DDS0–DDS3.

ER-register 525 is a six-bit register comprising flip-flops ER0–ER5. ER-register 525 receives signals FQ37–FQ39, representing the memory error code, from Q-register 225 and signals DY15–DY17, representing the IOC error code, from Y-bus 505. The input logical schematic diagrams of ER-register 525 are provided in FIGURES 165 and 166. The contents of ER-register 525 are illustrated in FIGURE 34.

Q-register 225 is a forty-one bit register comprising flip-flops Q00–Q40. Q-register 225 serves as the input register of the input/output controller, receiving signals JM00–JM35, JM37–JM39, DQRE and DSQR from the memory communications unit. Q-register 225 provides output signals to W-bus 520 and ER-register 525. The input logical schematic diagrams of Q-register 225 are provided in FIGURES 173–175. The contents of Q-register 225 are illustrated in FIGURE 34*c*.

U-register 240 is a thirty-six bit register comprising flip-flops U00–U35. U-register 240 serves as the output register of the input/output controller. U-register receives, by parallel transfer, signals DY00–DY35 from Y-bus 505 and provides output signals FU00–FU35 to logic gates 234 of the memory communications unit. Logic gates 234, in turn, provide inputs to the information signal transmitters of each of the four memory ports. The input logical schematic diagrams of U-register 240 are provided in FIGURES 175–177. The contents of U-register 240 are illustrated in FIGURE 34*b*.

L-register 241 of the processing and control unit is a twenty-seven bit register comprising flip-flops L09–L35. L-register 241 serves as the address and command register of the input/output controller. Flip-flop L09 of L-register 241, when set to the 1-state, provides memory access interrupt request signal FL09 to the memory access interrupt request signal transmitter and logic of one of the memory ports. Flip-flop L09 is always set to the 1-state when L-register 241 is loaded with information. Flip-flop L10, when set to the 1-state, provides signal FL10 to logic gates 234 of the memory communications unit to indicate that a character is being transferred and zone control is required. Flip-flops L11–L14 of L-register 241 store the memory command and provide signals representing this command to the memory command signal transmitters of each of the four memory ports. Flip-flops L15–L17 store the zone control information which is applied, along with signal FL10, to logic gates 228 which channel the zone control information to the zone control signal transmitters of one of the memory ports. Flip-flops L18–L35 store a memory address. The output signals of flip-flops L18–L25 and L30–L35 are applied to the address signal transmitters of each memory port while the output signals of flip-flops L26–L29 are applied to logic gates 256 of the memory communications unit. The input logical schematic diagrams of L-register 241 are provided in FIGURES 172 and 173. The contents of L-register 241 are illustrated in FIGURE 34*b*.

E-register 460 is an eleven bit register comprising flip-flops E01–E11. E-register 460 provides temporary storage for command information transmitted by the processing and control unit to the peripheral channel unit of the input/output controller. E-register 460 receives inputs from Y-bus 505 and F-register 252. The output signals of E-register 460 are transmitted to W-bus 520 and to S-register 407 and decode logic 408 of the peripheral channel unit. Flip-flop E01 identifies which register of a pair of buffer registers of the buffer storage unit is to be employed while flip-flops E02–E05 store the number of the peripheral channel to be employed during an operation. Flip-flop E06, when set to the 1-state, provides the "set I/O" command to the peripheral channel unit. Flip-flop E07, when set to the 1-state, provides the "reset I/O" command to the peripheral channel unit. Flip-flop E08, when set to the 1-state, provides the command "reset terminate" to the peripheral channel unit. Flip-flop E09, when set to the 1-state, provides the command "reset special interrupt" to the peripheral channel unit. Flip-flop E10, when set to the 1-state, provides the command "reset data service" to the peripheral channel unit. Flip-flop E11 is set to the 1-state to indicate that command information is present in the E-register. The input logical schematic diagrams of E-register 460 are provided in FIGURE 165. The contents of E-register 460 are illustrated in FIGURE 34*d*.

F-register 252 is an eleven bit register comprising flip-flops F01–F11. F-register 252 is the central control register of the input/output controller, coordinating the initiation and execution of microstep routines in the input/output controller. F-register 252 receives inputs from the connect signal receivers of the memory ports, clock and timing control 413 of the peripheral channel unit and peripheral channel number encoder 412 of the peripheral channel unit, as illustrated in FIGURE 16. F-register 252 provides output signals to signal gates 526, E-register 460 and W-bus 520 and K-register 425.

Flip-flops F02–F05 identify the peripheral channel and its associated pair of buffer registers which are to be involved in an operation. Flip-flop F01 identifies the register of the pair of buffer registers which is to be employed. Flip-flop F06 is set to the 1-state if any one of flip-flops F07–F09 is set to the 1-state. Flip-flop F07 is set to the 1-state in response to a connect signal from the control memory, indicating a request for a connect routine. Flip-flop F08 is set to the 1-state in response to a terminate interrupt routine request from one of the peripheral channels. Flip-flop F09 is set to the 1-state in response to a special interrupt routine request from one of the peripheral channels. Flip-flop F10 is set to the 1-state in response to a data service routine request from the buffer registers associated with one of the peripheral channels. The state of flip-flop F11 determines when routine requests can be entered in F-register 252 and when the routine requests in F-register 252 will be sampled. The input logical schematic diagrams of F-register 252 are provided in FIGURE 166. The contents of F-register 252 are illustrated in FIGURE 34*a*.

Signal gates 526 receive signals FF06–FF10 from F-register 252 and provide signals DDSJ, DSNJ and DTMJ to jump address encoder 298. The logical schematic diagrams of signal gates 526 are provided in FIGURES 155, 160 and 161 which illustrate the logic generating the signals.

Jump decision logic 527 of the processing and control unit receives control signals from control signal bus 372 of the microprogram storage unit, signals FA39–FA46 from A-register 534, signals FK03–FK05, FK15 and FK30–FK34 from K-register 425, signals FQ12–FQ17 and FQ37–FQ39 from Q-register 225, signals DW13–DW16 from W-bus 520, signals DX13–DX17 from X-bus 540, and miscellaneous logical combination signals DCM1, DCM4, DCM8 and DDS0–DDS3. Jump decision logic 527 generates signal DSJA for transmission to BA-register 207 and PC-register 205 of the memory communications unit upon the occurrence of certain conditions in the input/output controller. The input logical schematic diagrams for jump decision logic 527 are provided in FIGURES 143 and 144.

Timing sequence control 528 produces the timing signals and pulses necessary for the functioning of the processing and control unit and the input/output controller. FIGURE 144 illustrates the logical schematic diagrams for the timing control signals provided by timing sequence control 528. C-register 531 is a thirty-nine bit register comprising flip-flops C00–C35 and C44–C46. C-register 531 is a general purpose working register which handles the primary and secondary mailbox words, by means of which the program communicates with and controls the input/output controller. C-register 531 receives signals DY00–DY35 and DY44–DY46 from Y-bus 505 and provides output signals FC00–FC35 and FC44–FC46 to W-bus 520. The input logical schematic diagrams of C-register 531 are provided in FIGURES 163–165. The contents of C-register 531 are illustrated in FIGURE 34*c*.

G-register 532 is a thirty-six bit register comprising flip-flops G00–G35. G-register 532 is a general purpose working register for handling the primary and secondary mailbox words in the processing and control unit. G-register 532 receives input signals DY00–DY35 from Y-bus 505 and provides output signals FG00–FG35 to W-bus 520. The input logical schematic diagrams for G-register 532 are provided in FIGURES 166–168. The contents of G-register 532 are illustrated in FIGURE 34. H-register 533 is a thirty-six bit register comprising flip-flops H00–H35. H-register 533 is also a general purpose working register employed to handle primary and secondary mailbox words in the processing and control unit. H-register 533 receives input signals DY00–DY35 from Y-bus 505 and provides output signals FH00–FH35 to W-bus 520. The input logical schematic diagrams for H-register 533 are provided in FIGURES 168 and 169. The contents of H-register 533 are illustrated in FIGURE 34*d*.

A-register 534 is an eight bit register comprising flip-flops A39–A46. A-register 534 stores control information during certain operations in the input/output controller. FIGURE 34*a* illustrates the possible contents of A-register 534 during three different operations in the input/output controller. A-register 534 receives input signals DY12–DY17 and DY41–DY46 from Y-bus 505 and provides output signals FA42–FA46 to W-bus 520 and FA39–FA46 to jump decision logic 527. The input logical schematic diagrams for A-register 534 are provided in FIGURE 163. The contents of A-register 534 during different operations in the input/output controller are illustrated in FIGURE 34*e*.

PN-register 535 is a four bit register comprising flip-flops PN2–PN5. PN-register 535 is employed to store the peripheral channel number during certain operations in the input/output controller. PN-register 535 receives input signals DY02–DY05 from Y-bus 505 and provides output signals FPN2–FPN5 to W-bus 520. The input logical schematic diagrams for PN-register 535 are provided in FIGURE 173. The contents of PN-register 535 are illustrated in FIGURE 34*a*.

Signal gates 510 receive signals DX00–DX35 and DX42–DX47 from X-bus 540, signals DD01–DD35 and DD42–DD47, representing the contents of D-register 452 of the buffer storage unit, and N-control signals DN10 and DN12–DN25 from control signal bus 372 of the microprogram storage unit. Signal gates 510 provide signals DZ00–DZ35 and DZ42–DZ47 to Z-bus 530 of the processing and control unit. The logical schematic diagrams illustrating the structure of signal gates 510 are provided in FIGURES 151–153.

Input/output processor 536 of the processing and control unit comprises an adder, a 15–27 incrementer, a carry predictor, a magnitude comparator, a 0–5 decrementer, a 6–11 decrementer, a 0–11 incrementer and a character count encoder. The structure of these components of input/output processor 536 is illustrated in FIGURES 35–37 and described in the section entitled "Input/Output Processor." Input/output processor 536 receives inputs from X-bus 540 and W-bus 520 and provides output signals to Z-bus 530.

K-register 425 is a twenty-five bit register comprising flip-flops K01–K05, K14, K15 and K18–K35. K-register 425 is a special purpose register. Flip-ffop K01 specifies whether the even or the odd buffer register of the buffer storage unit associated with a particular channel is to be employed. Flip-flops K02–K05 store the number or address of the peripheral channel currently being serviced. K14 is the read/write bit and is a binary 1 for a write operation in the peripheral subsystem and a binary 0 for a read operation. Flip-flop K15 is set to the 1-state during certain operations in the input-output controller to indicate the necessity of a data transfer after execution of a particular subroutine. Flip-flops K18–K23 are employed to store the device address if the peripheral subsystem is a multidevice subsystem. Flip-flops K24–K29 store the device command to be sent to a peripheral subsystem, and may also be employed to store a code indicating the substatus of a peripheral subsystem. Flip-flops K30 and K31 contain parity for the device address and the device command during initiation of an input/output operation. Flip-flop K32 is employed as a switch to count transfers during initiation of an input/output operation. Flip-flops K30–K33 may also be employed to store a code indicating major status of a peripheral subsystem. Flip-flop K34 is set to the 1-state to indicate that power has been applied to the addressed peripheral subsystem. Flip-flop K35 is set to the 1-state to indicate that a code identifying the status of a peripheral subsystem has been stored in K-register 425.

K-register 425 receives signals FF01–FF05 from F-register 252, signals DY01–DY05, DY11, DY24–DY35, DY40, DY41 and DY43 from Y-bus 505 and signals DST6–DST9 from gates 424 of the peripheral channel unit. K-register 425 also receives signals DTC0–DTC5 from data switch 402 of the peripheral channel unit. K-register 425 provides output signals to W-bus 520, gates 454, buffer address decoder 485 of the buffer storage unit and buffer control decode logic 404 of the peripheral channel unit. The input logical schematic diagrams for K-register 425 are provided in FIGURES 170–172. The contents of K-register 425 during different operations in the input/output controller are illustrated in FIGURE 34*b*.

Gates 454 of the processing and control unit receive signals FK18–FK32 from K-register 425 and provide signals DKC0–DKC7 to T-register 403 of the peripheral channel unit. The logical schematic diagrams illustrating the structure of gates 454 are provided in those portions of FIGURES 156 and 157 showing the generation of signals DKC0–DKC7.

W-bus 520 comprises forty-two lines carrying information signals DW00–DW35 and DW42–DW46. W-bus 520 serves as a common output bus for most of the registers of the processing and control unit and for the W-buffer registers 490 of the buffer storage unit. The input logical schematic diagrams for W-bus 520 are provided in FIGURES 145–148. In the logical schematic diagrams, the alpha-numeric character in parenthesis adjacent a W-buffer register signal designation indicates the peripheral channel with which the respective W-buffer register is associated.

X-bus 540 comprises 42 lines carrying information signals DX00–DX35 and DX42–DX47. X-bus 540 receives inputs from W-bus 520 and from control signal bus 372 of the microprogram storage unit. X-bus 540 provides output signals to signal gates 510 and to input/output processor 546 of the processing and control unit. The input logical schematic diagram for X-bus 540 are provided in FIGURES 148–150.

Y-bus 505 comprises 42 lines carrying information signals DY00–DY35 and DY42–DY47. Y-bus 505 receives input signals from Z-bus 530 and distributes signals to most of the registers of the processing and control unit. The input logical schematic diagrams for Y-bus 505 are provided in FIGURES 150 and 151.

Z-bus 530 comprises 42 lines carrying information signals DZ00–DZ35 and DZ42–DZ57. Z-bus 530 receives all of the output signals of input/output processor 536 of the processing and control unit, in addition to the output signals of signal gates 510. Information on Z-bus 530 is transmitted to Y-bus 505. The input logical schematic diagram for Z-bus 530 are provided in FIGURES 151–153.

*Input/output processor.*—FIGURE 35 illustrates the details of the input/output processor 536 of the processing and control unit. The input/output processor comprises 15–27 incrementer 550, 0–11 incrementer 551, 6–11 decrementer 552, 0–5 decrementer 553, carry predictor 554, character count encoder 555, magnitude comparator 556 and adder 557. The 15–27 incrementer 550 serves to increment certain information fields by one. The 15–27 incrementer 550 actually comprises three separate incrementers, viz. a 15–17 incrementer, an 18–21 incrementer and a 22–27 incrementer. Incrementer 550 receives signals DX15–DX27 from X-bus 540, signals DW15–DW27 from W-bus 520 ad logical combination signals DFC2, DFC3 and DNC1–DNC3. The 15–17 portion of incrementer 550 is employed to increment the zone control field of secondary mailbox word #1. The 18–21 portion of incrementer 550 is employed to increment the count field of the interrupt queue counter word. The 22–27 portion of incrementer 550 is employed in conjunction with the 18–21 portion of incrementer 550 to increment the address field of secondary mailbox word #1 and secondary mailbox word #2. Incrementer 550 is also used with adder 557 to increment these address fields. Output signals DZ15–DZ27 of incrementer 550 are applied to Z-bus 530. The logical schematic diagrams of incrementer 550 are provided in those portions of FIGURES 152 and 153 illustrating the generation of signals DZ15–DZ27.

The 0–11 incrementer 551 is also employed to increment certain information during operations in the input/output controller. The 0–11 incrementer 551 receives signals DX00–DX11 from X-bus 540, signals DW00–DW11 from W-bus 520 and logical combination signals DFC0 and DNC0. Incrementer 551 serves to increment the word count of secondary mailbox word #1. Output signals DZ00–DZ11 of incrementer 551 are applied to Z-bus 530. The logical schematic diagrams of incrementer 551 are provided in those portions of FIGURES 151 and 152 illustrating the generation of signals DZ00–DZ11.

The 6–11 decrementer 552 is employed to decrement certain information fields by one during operations in the input/output controller. Decrementer 552 receives signals DX06–DX11 from X-bus 540, signals DW06–DW11 from W-bus 520 and logical combination signals DRN0 and DDE1. Decrementer 552 serves to decrement the word count in secondary mailbox word #1 during operations in the input/output controller. Output signals DZ06–DZ11 of decrementer 552 are applied to Z-bus 530. The logical schematic diagrams of decrementer 552 are provided in those portions of FIGURES 151 and 152 illustrating the generation of signals DZ06–DZ11.

The 0–5 decrementer 553 is similarly employed to decrease the record count in the primary mailbox word by one during certain operations of the input/output controller. The 0–5 decrementer 553 receives signals DX00–DX05 from X-bus 540, signals DW00–DW05 from W-bus 520 and logical combination signal DDE0. Output signals DZ00–DZ05 of decrementer 553 are applied to Z-bus 530. The logical schematic diagrams of decrementer 553 are provided in those portions of FIGURE 151 illustrating the generation of signals DZ00–DZ05.

Carry predictor 554 is employed during address checking in the input/output controller to predict the occurrence or non-occurrence of a carry. Carry predictor 554 is employed to obtain the final data address in secondary mailbox word #1 to determine if it exceeds the IOC register capacity of eighteen binary digits. Carry predictor 554 is employed to save processing time in the input/output controller by obviating the delay required to sense a carry from the highest-order bit position of adder 557. Carry predictor 554 receives inputs DX00–DX09 and DX18–DX27 from X-bus 540 in addition to signals DW01–DW09 and DW19–DW27 from W-bus 520. Output signal DGNC of carry predictor 554 is transmitted to the input logic of adder 557. The logical schematic diagrams illustrating the structure of carry predictor 554 are provided in FIGURES 154–156 which show the logical chain which generates signal DGNC.

Character count encoder 555 receives signals FA42–FA46 from A-register 534 in addition to logical combination signal DPA6 and provides signals DZ15–DZ17 to Z-bus 530. Output signals DZ15–DZ17 of character count encoder 555 form the zone control field of secondary mailbox word #1. The logical schematic diagrams of encoder 555 are provided by those portions of FIGURE 152 illustrating the generation of signals DZ15–DZ17.

Magnitude comparator 556 is employed to compare the memory address to the upper and lower address limits contained in secondary mailbox word #2. Magnitude comparator 556 receives signals DW01–DW08 and DW28–DW35 from W-bus 520 in addition to signals DX02–DX08 and DX28–DX35 from X-bus 540. Output signal DHGL of magnitude comparator 556 is transmitted to jump decision logic 527 of the processing and control unit. The logical schematic diagrams illustrating the structure of comparator 556 are provided in FIGURES 156 and 157 which show the logical chain which generates signal DHGL.

Adder 557 is employed, in conjunction with 15–27 inrementer 550 to increment an address. Adder 557 is also employed, in conjunction with carry predictor 554, to determine if an address lies within the permissible range. Adder 557 receives signals DX10–DX17 and DX28–DX35 from X-bus 540, and logical combination signals DCTA, DADD and DWAD. Output signals DZ28–DZ35 of adder 557 are applied to Z-bus 530. The details of adder 557 are illustrated in FIGURE 36.

With reference to FIGURE 36, adder 557 comprises a single rank of majority logic adders and associated logic. The rank of majority logic adders, comprising full adder circuits SM0–SM7, serves to add the quantity represented by signals DX10–DX17 to the quantity represented by signals DX28–DX35. Adder 557 is also employed to add the carry input signal DCTA to the quantity represented by signals DX28–DX35.

Each of full adder circuits SM0–SM7 has three inputs, termed the X-, Y- and Z-inputs. The X-inputs to adder circuits SM0–SM7 are identified as DO10–DO17 respectively, derived from AND-gates 560. The inputs to AND-gates 560 are signals DX10–DX17 from X-bus 540 and gating signal DWAD which gates signals DX10–DX17 to the X-inputs of full adder circuits SM0–SM7.

The Y-inputs to adder circuits SM0–SM7 are signals DX28–DX35 respectively from X-bus 540. The sum (S) output signals of adder circuits SM0–SM7 are identified as MSM0–MSM7 respectively, while the carry (C) output signals are identified as CSM0–CSM6 and MAC7 respectively. The Z-inputs to adder circuits SM1–SM7 are the carries, if any, generated in the respective next lower-order adder circuits. The Z-input to adder circuit SM0 is carry signal DCTA.

In operation, the quantity represented by signals DX10–DX17 is added, on a bit by bit basis, to the quantity represented by signals DX28–DX35. Carries are transmitted from the adder circuit SM0 progressively forward to adder circuit SM7. Adder 557 may also be employed to add a carry represented by signal DCTA to the quantity represented by signals DX28–DX35. In this event, gates 560 are disabled by signal $\overline{\text{DWAD}}$. The sum output of adder circuits SM0–SM7 is gated to Z-bus 530 through gates 562 which are enabled by gating signal DADD.

The details of each of adder circuits SM0–SM7 of FIGURE 36 are illustrated in FIGURE 37. The full adder circuit, illustrated in FIGURE 37, is employed in the processing and control unit to perform binary arithmetic operations. The full adder circuit includes a carry circuit 570, a sum circuit 571 and various logic circuits providing inputs to the carry and sum circuits.

Carry circuit 570 comprises output transistors 573 and 574 and phase-inverting transistor 575. Transistors 573 and 574 provide the complementary output signals C and $\overline{C}$ respectively, while phase-inverting transistor 575 provides complementary drive signals for transistors 573 and 574. The input signals to carry circuit 570 are provided by three 2-input AND-gates 576, 577 and 578 and a 3-input OR-gate 579. The input signals to AND-gates 576, 577 and 578 are XY, XZ and YZ respectively. The three inputs to OR-gate 579 are the output signals of AND-gates 576, 577 and 578.

Sum circuit 571 comprises output transistors 582 and 583 and phase-inverting transistor 584. Transistors 582 and 583 provide the complementary output signals S and $\overline{S}$ respectively while phase-inverting transistor 584 provides complementary drive signals for transistors 582 and 583. The input signals to sum circuit 571 are provided by a 3-input OR-gate 586, a 3-input AND-gate 587, a 2-input AND-gate 588 and a 2-input OR-gate 589. The input signals to OR-gate 586 and AND-gate 587 are XYZ. The inputs to AND-gate 588 are $\overline{C}$ and the output signal of OR-gate 586. The inputs to OR-gate 589 are the output signals of AND-gates 587 and 588.

In operation, with each of input signals X, Y and Z representing binary 0's, transistor 575 is conductive in the linear region of its characteristics. Transistor 575 biases transistor 573 to saturation and biases transistor 574 to a non-conductive state. The output signal C at terminal 592 is therefore in the order of +0.2 volt while the signal $\overline{C}$ at output terminal 593 is in the order of +3.8 volts. A similar condition exists in sum circuit 571 with the output signals S and $\overline{S}$ at terminals 595 and 596 being +0.2 volt and +3.8 volts respectively.

Assuming one of the inputs X, Y and Z to be a binary 1 and the remainder of the inputs to be binary 0's, none of the AND-gates 576, 577 or 578 is enabled and carry circuit 570 remains in the same condition as when inputs X, Y and Z were all binary 0's. Considering sum circuit 571, OR-gate 586 is enabled by the binary 1 input signal and the output signal of OR-gate 586 in conjunction with the signal $\overline{C}$ enables AND-gate 588. The output of AND-gate 588 biases transistor 584 to saturation which in turn biases transistor 582 to a state of non-conduction and transistor 583 to saturation. The resulting output signal S at terminal 595 is in the order of +3.8 volts while the resulting output signal $\overline{S}$ at terminal 596 is in the order of +0.2 volt. Thus, with one of the inputs X, Y and Z a binary 1, the outputs S and $\overline{C}$ represent binary 1's and outputs $\overline{S}$ and C represent binary 0's.

Assuming that two of the three inputs X, Y and Z are binary 1's, one of the AND-gates 576, 577 or 578 is enabled. The resulting output signal from OR-gate 579 drives transistor 575 into saturation which in turn biases transistor 573 to a state of non-conduction and transistor 574 to saturation. The resulting output signals C and $\overline{C}$ at terminals 592 and 593 are +3.8 volts and +0.2 volt respectively.

Considering sum circuit 571, AND-gate 588 is disabled since the signal C at terminal 593 is +0.2 volt. Transistor 584 is accordingly biased to conduction in the linear region of its characteristics, driving transistor 582 to saturation and transistor 583 to a state of non-conduction. The resulting output signals S and $\overline{S}$ at terminals 595 and 596 are +0.2 volt and +3.8 volts respectively. Thus, with two of the input signals X, Y and Z being binary 1's, output signals C and $\overline{S}$ represent binary 1's while output signals $\overline{C}$ and S represent binary 0's.

With all three of the inputs X, Y and Z being binary 1's, carry circuit 570 remains in the same state with output signal C representing a binary 1 and output signal $\overline{C}$ representing a binary 0. The three binary 1 input signals enable AND-gate 587 to drive transistor 584 to saturation. Transistor 584 in turn changes the state of transistors 582 and 583, driving transistor 582 to a state of non-conduction and transistor 583 to saturation. The resulting output signal S and $\overline{S}$ at terminals 595 and 596 are +3.8 volts and +0.2 volt respectively. Thus, with all three of the input signals X, Y and Z being binary 1's, output signals S and C represent binary 1's while output signals $\overline{S}$ and $\overline{C}$ represent binary 0's.

Although the circuit has been described with the number of binary 1's represented by input signals X, Y and Z progressing from 0–3, the operation of the circuit is not limited to this sequence since the binary 1's represented by input signals X, Y and Z can change from a given combination to any other combination. The relationship between the input signals X, Y and Z and the state of output signals C, $\overline{C}$, S and $\overline{S}$ is indicated in the following table:

| X | Y | Z | S | $\overline{S}$ | C | $\overline{C}$ |
|---|---|---|---|---|---|---|
| 0 | 0 | 0 | 0 | 1 | 0 | 1 |
| 0 | 0 | 1 | 1 | 0 | 0 | 1 |
| 0 | 1 | 0 | 1 | 0 | 0 | 1 |
| 1 | 0 | 0 | 1 | 0 | 0 | 1 |
| 0 | 1 | 1 | 0 | 1 | 1 | 0 |
| 1 | 0 | 1 | 0 | 1 | 1 | 0 |
| 1 | 1 | 0 | 0 | 1 | 1 | 0 |
| 1 | 1 | 1 | 1 | 0 | 1 | 0 |

The symbol 598, shown in FIGURE 37, is employed to represent the full adder circuit. This symbol is used in FIGURE 36. The three input lines on the left side of the symbol represent the three input signals X, Y and Z. The four lines extending from the right side of the symbol represent the output symbols S, $\overline{S}$, C and $\overline{C}$.

INPUT/OUTPUT CONTROLLER—OPERATION

All functions of the input/output controller are accomplished during performance of various routines by the input/output controller. The major routines performed by the input/output controller are the connect routine, the data service routine, the terminate interrupt routine, the special interrupt routine and the initiation interrupt routine. The input/output controller also performs a link subroutine, a counter parity interrupt sequence and an error subroutine to accomplish its function of providing communications and information transfer between the peripheral subsystems and a memory of the data processing system.

Figure 180:
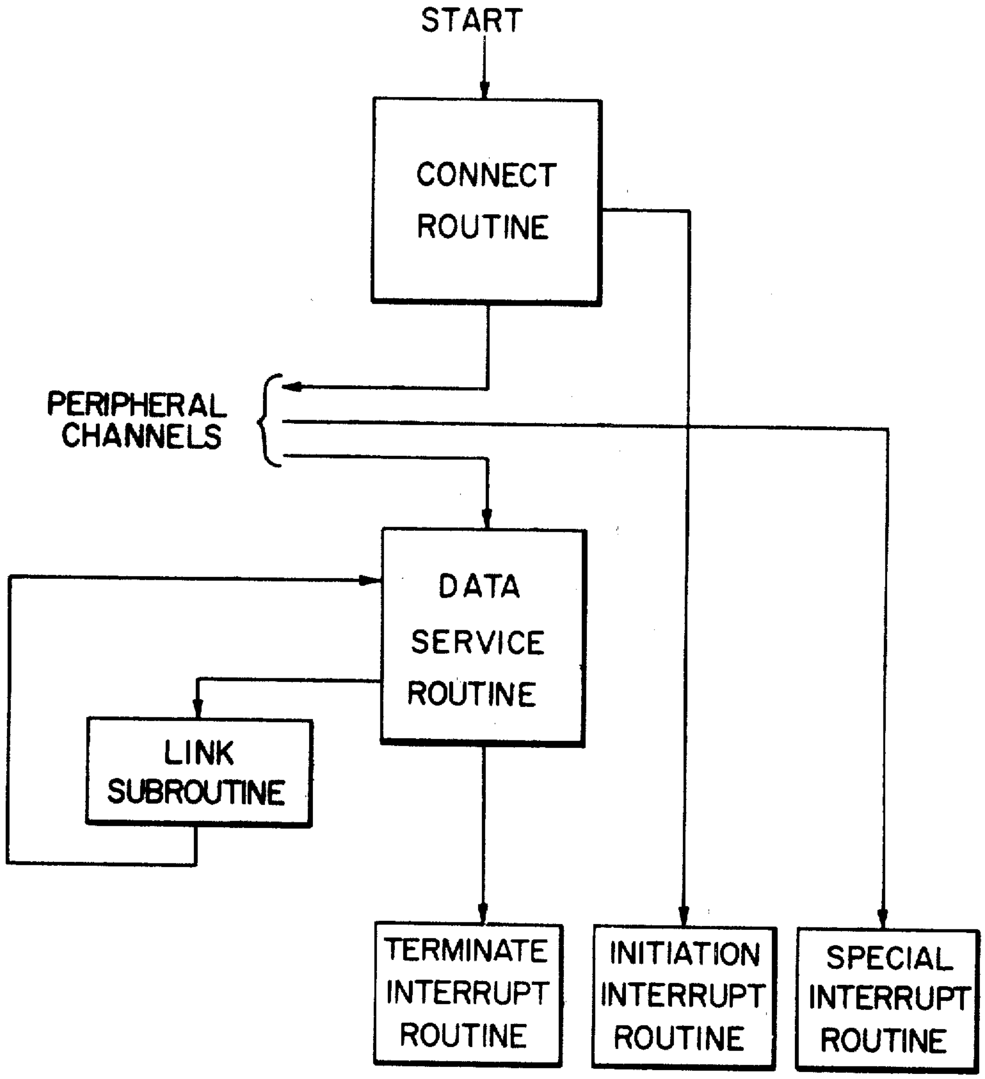
FIGURE 180 is a flow diagram illustrating the major routines employed by the input/output controller in performing its functions.

FIGURE 180 is a flow chart illustrating the routines performed by the input/output controller and the sequence of performance of these routines. With reference to FIGURE 180, initiation of any operation in a peripheral subsystem requires performance of the connect routine by the input/output controller. During the connect routine, the input/output controller transmits command and address information from memory to a particular peripheral subsystem. The input/output controller also performs certain tasks to determine if the operation called for by the command information can be completed by the peripheral subsystem or to determine if the connect routine can be completed. The results of these tests may require the input/output controller to transfer to the initiation interrupt routine. If such a transfer is taken, information concerning the particular peripheral subsystem is transmitted to memory, an appropriate interrupt cell in memory is set and peripheral subsystem operation is stopped.

The connect routine may be periodically interrupted by the data service routine if data service routine requests are present in the input/output controller. The link subroutine may also be performed by the input/output controller in conjunction with the connect routine. Upon completion of the connect routine, a release pulse is transmitted to the appropriate peripheral channel to release the associated peripheral subsystem to perform the operations required by the command information.

In response to the command information and the release pulse, a peripheral subsystem, when it is ready, may transmit a data service routine request to the input/output controller to cause the input/output controller to enter a data service routine. during the data service routine, information transfers between the input/output controller and memory may occur. The data service routine cannot be interrupted by other routines. Upon completion of performance of the data service routine, the input/output controller may enter either the terminate interrupt routine or the link subroutine. If the data service routine is to be continued, the input/output controller performs the link subroutine to obtain information from memory necessary to the continuation of the data service routine. Otherwise, the input/output controller next performs the terminate interrupt routine.

During the terminate interrupt routine, the input/output controller performs housekeeping functions, in addition to transferring information concerning the particular peripheral subsystem to memory. The input/output controller also sets the appropriate interrupt cell in memory during the terminate interrupt routine. The terminate interrupt routine enables a peripheral subsystem operation initiated in the connect routine to be stopped. Other routines for stopping a peripheral subsystem operation are the initiation interrupt routine and the special interrupt routine.

The special interrupt routine is entered in response to action taken by a peripheral subsystem. During the special interrupt routine, as in the initiation interrupt and terminate interrupt routines, information concerning a particular peripheral subsystem is transmitted to memory and the appropriate interrupt cell in memory is set.

Various portions of the input/output controller are shared by the sixteen peripheral subsystems. Therefore, although the flow chart of FIGURE 180 illustrates the sequence of routines performed by the input/output controller with regard to a single peripheral subsystem, the actual sequence of routines performed by the input/output controller is a function of the command information transmitted to the peripheral subsystems and does not follow an established pattern. For example, a data service routine performed by the input/output controller for one peripheral subsystem may follow a special interrupt routine performed by the input/output controller for another peripheral subsystem. This data service routine may then be followed by a connect routine for yet another peripheral subsystem. Thus, although the sequence of routines for a given peripheral subsystem is as illustrated in FIGURE 180, the actual sequence of routines performed by the input/output controller in servicing the sixteen peripheral subsystems is controlled by the routine requests stored in the F-register and is random. The details of each of the routines illustrated in FIGURE 180 are provided in FIGURES 181–188.

Idle loop

Figure 181:
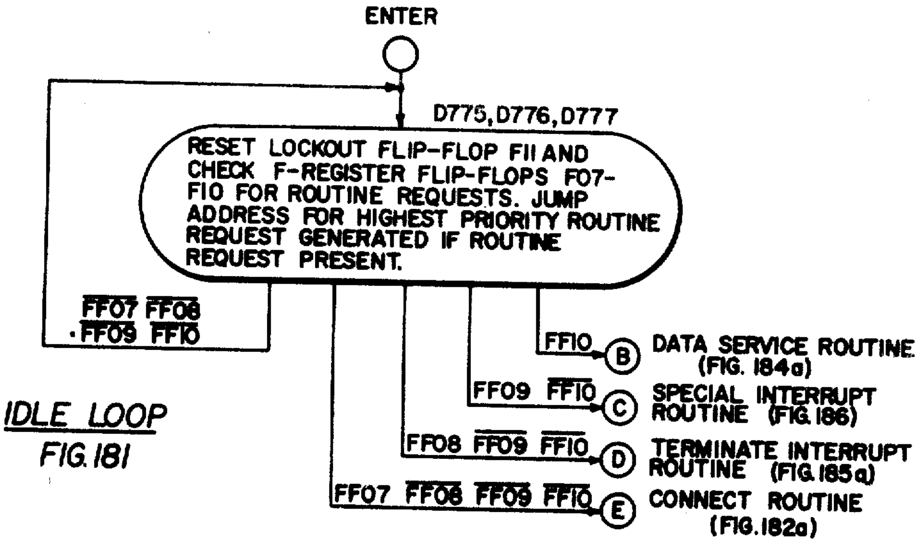
FIGURE 181 is a flow diagram illustrating the idle loop of the input/output controller.

FIGURE 181 illustrates the operation performed by the input/output controller when it is not performing any of its normal routines. During the idle loop illustrated in FIGURE 181, the input/output controller repetitively performs reset lockouts, i.e. resets flip-flop F11 to the 0-state, to check for routine requests stored in the F-register. If no routine request is present, the input/output controller repeats the reset lockout until a routine request is detected. At that time, the addresss of the first microstep in the routine corresponding to the highest priority routine request in the F-register is generated and transmitted to the program counter or PC-register of the memory communications unit. As illustrated in FIGURE 181, the input/output controller may go to the data service routine, the special interrupt routine, the terminate interrupt routine or the connect routine from the idle loop.

Connect routine

Figure 182A:
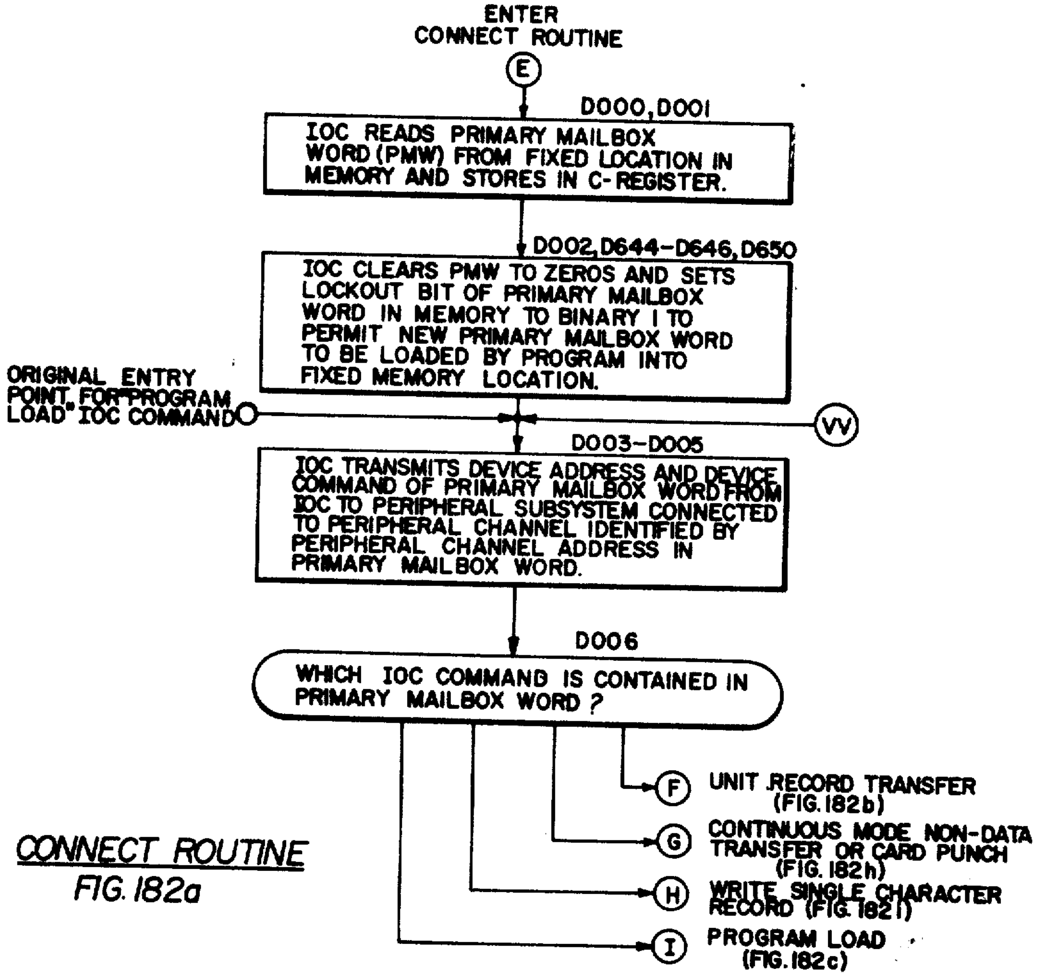
FIGURES 182*a*–182*i* comprise a flow diagram illustrating the operations performed by the input/output controller during the connect routine.

FIGURES 182a–182i illustrate the operations which occur during performance of the connect routine by the input/output controller. With reference to FIGURE 182a, at the start of the connect routine the input/output controller reads the primary mailbox word from its fixed location in memory and transmits address and command information to the peripheral subsystem connected to the peripheral channel identified by the address field of the primary mailbox word. The portion or subroutine of the connect routine performed by the input/output controller is dependent on the IOC command of the primary mailbox word.

Figure 182B:
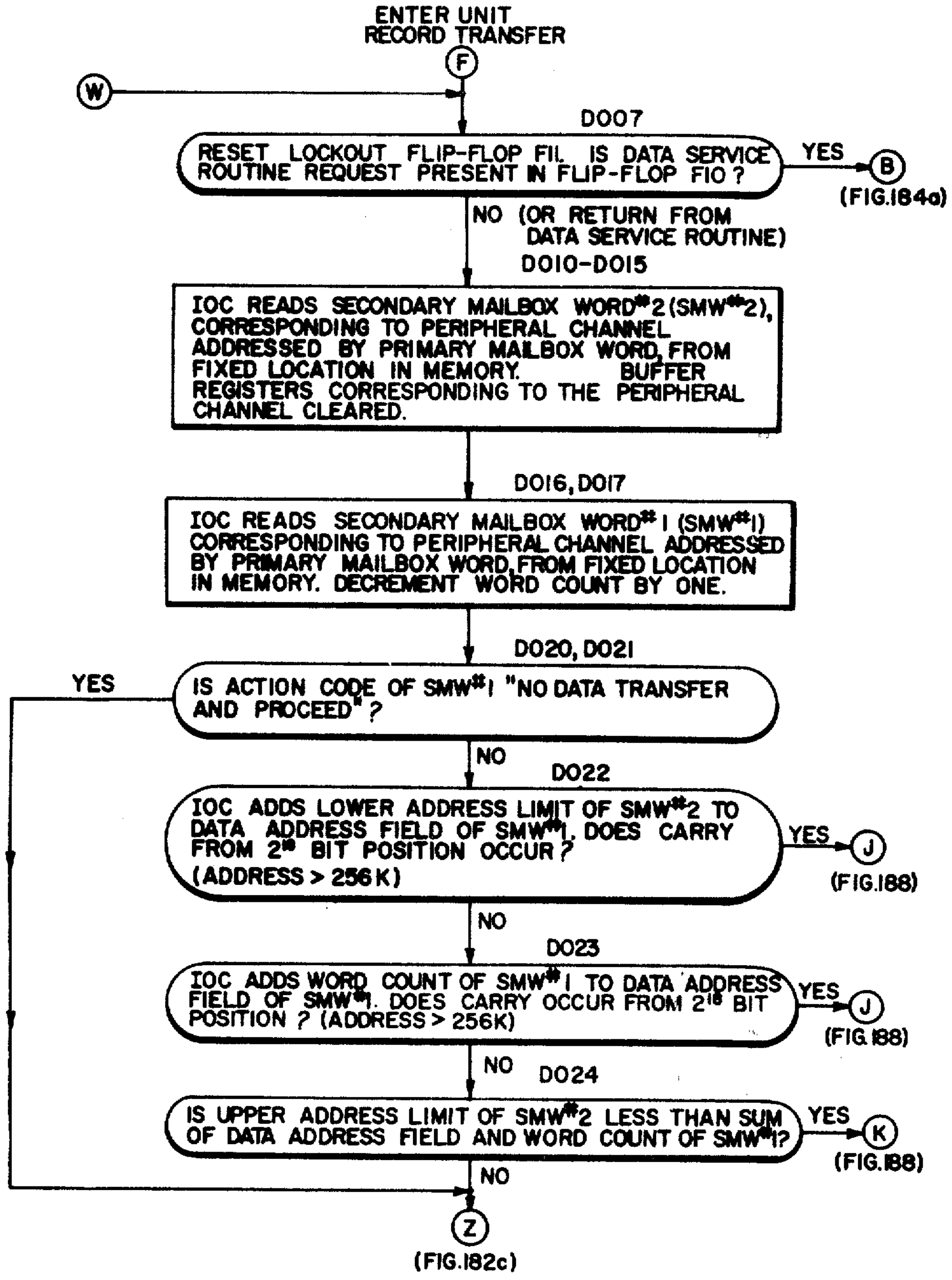

Assuming that the IOC command is "unit record transfer," the input/output controller first performs a reset lockout, to determine if a data service routine request is stored in flip-flop F10, as illustrated in FIGURE 182b. If a data service routine request is present in flip-flop F10, the input/output controller discontinues performance of the connect routine and performs the data service routine. Upon completion of the data service routine, the input/output controller returns to the point of departure in the connect routine.

Figure 182C:
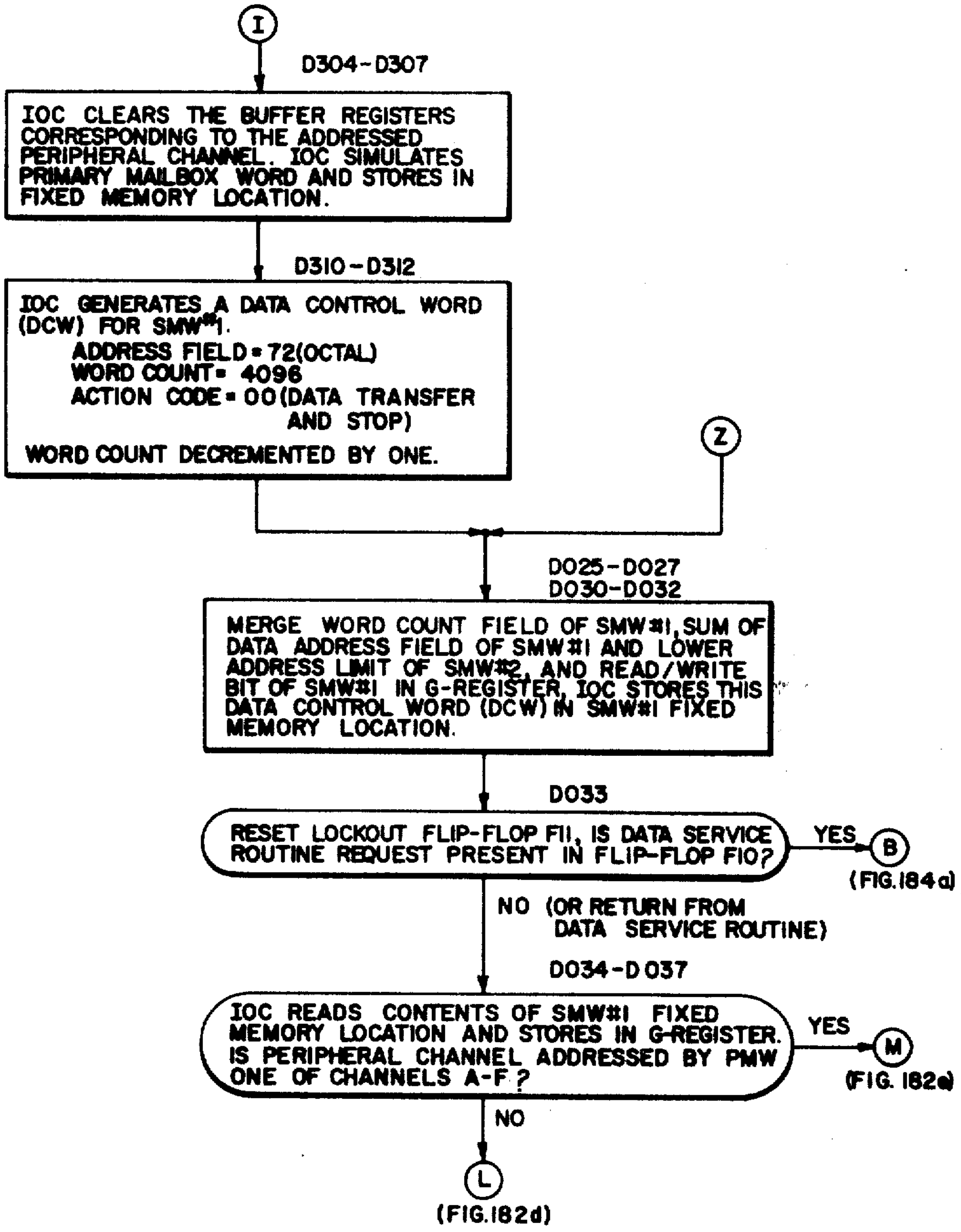

After the reset lockout and performance of the data service routine, if required, the input/output controller reads secondary mailbox words #1 and #2 from memory to perform a number of tests. If the action code of secondary mailbox word #1 is "no data transfer and proceed," the input/output controller performs the operations illustrated in FIGURE 182c. If another action code is present, the input/output controller determines if any address in the range of addresses to be employed by the data control word of secondary mailbox word #1 exceeds the memory capacity of 262,144 words. If so, the input/output controller enters the error subroutine of FIGURE 188. If not, the input/output controller then determines if the highest memory address to be employed by the data control word is within the limits established by secondary mailbox word #2. If the prescribed limit is exceeded, the input/output controller enters the error subroutine of FIGURE 188; otherwise, the input/output controller performs a reset lockout and then performs a test to determine whether the peripheral channel addressed by the primary mailbox word is associated with word buffer registers or character buffer registers, as illustrated in FIGURE 182c.

Figure 182D:
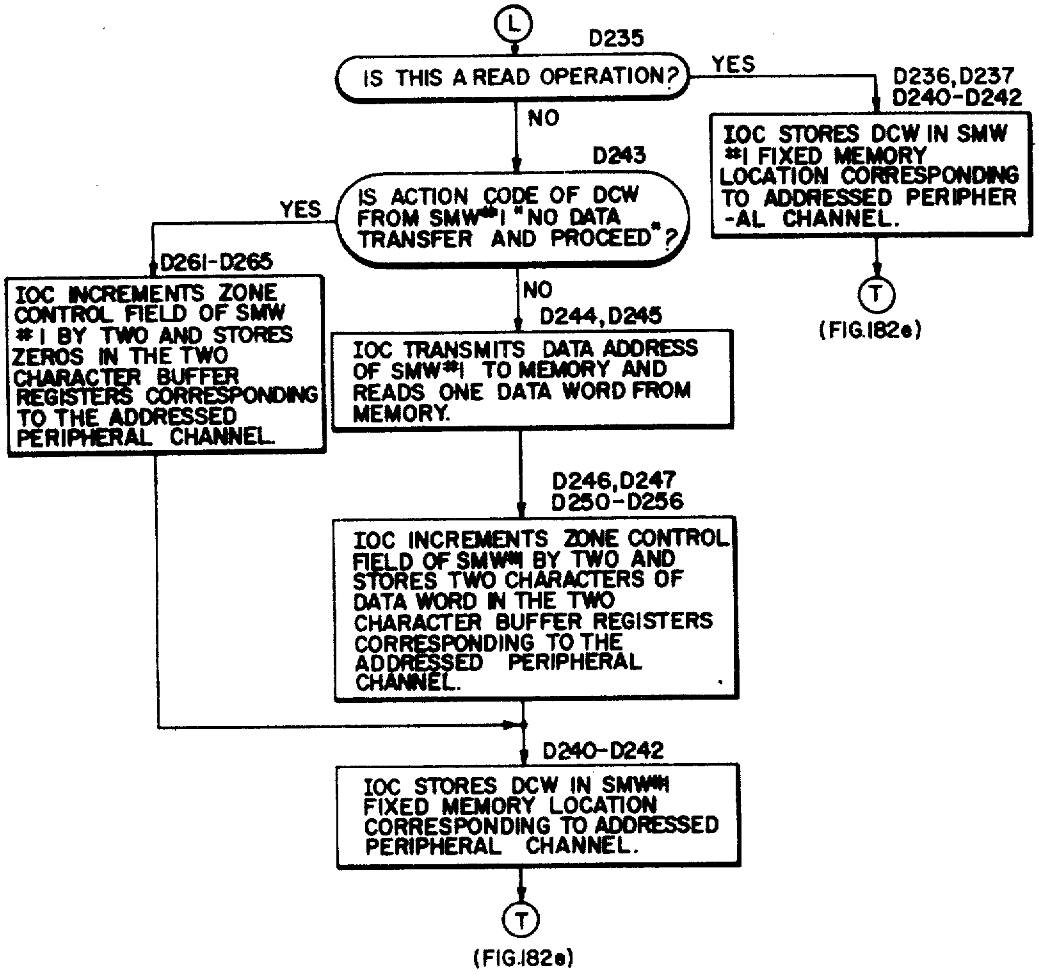
Figure 182E:
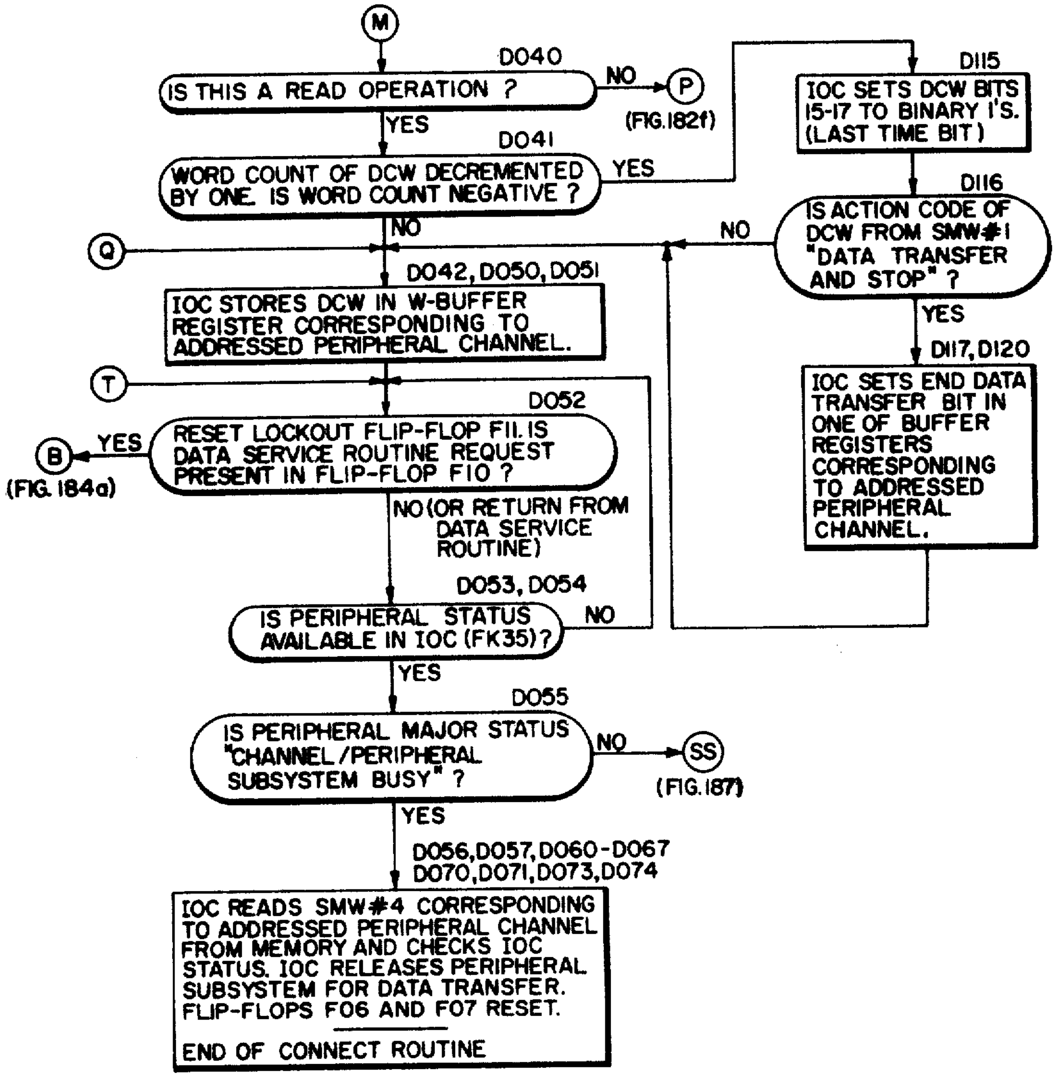

If the addressed peripheral channel is one of peripheral channels A–F employing word buffer registers in the buffer storage unit, and if the read/write bit of the secondary mailbox word #1 calls for a read operation, i.e. transfer of information from a peripheral subsystem to a memory, the input/output controller decrements the word count of secondary mailbox word #1 by one, as shown in FIGURE 182e. If the decremented word count is negative and if the action code of secondary mailbox word #1 is "data transfer and stop," the input/output controller sets the last time bit in the zone control field of secondary mailbox word #1 and the end data transfer bit in one of the word buffer registers associated with the peripheral channel. If the decremented word count is negative but the action code is not "data transfer and stop," only the last time bit in secondary mailbox word #1 is set to indicate that the data control word is not to be used again to control data transfer. If the decremented word count is positive, the data control word is stored in the W-buffer register corresponding to the addressed peripheral channel. After the actions indicated for the above three contingencies have been taken, the input/ouput controller performs a reset lockout and then checks the major status of the peripheral subsystem. If the major status is "channel/peripheral subsystem busy," the peripheral subsystem is released for data transfer and the connect routine is terminated. If the peripheral major status is not "character/peripheral subsystem busy," the input/output controller enters the initiation interrupt routine of FIGURE 187.

Figure 182F:
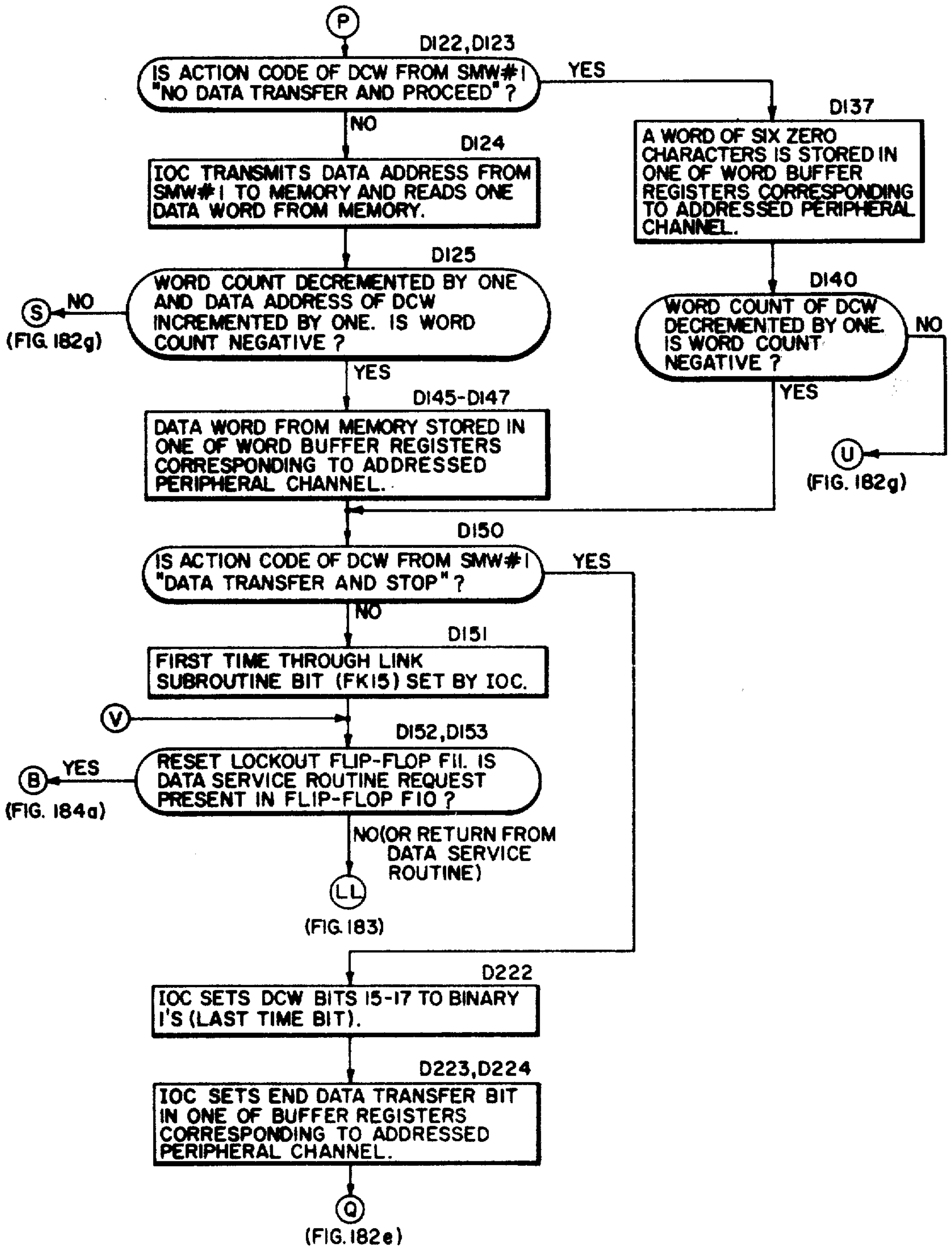
Figure 182G:
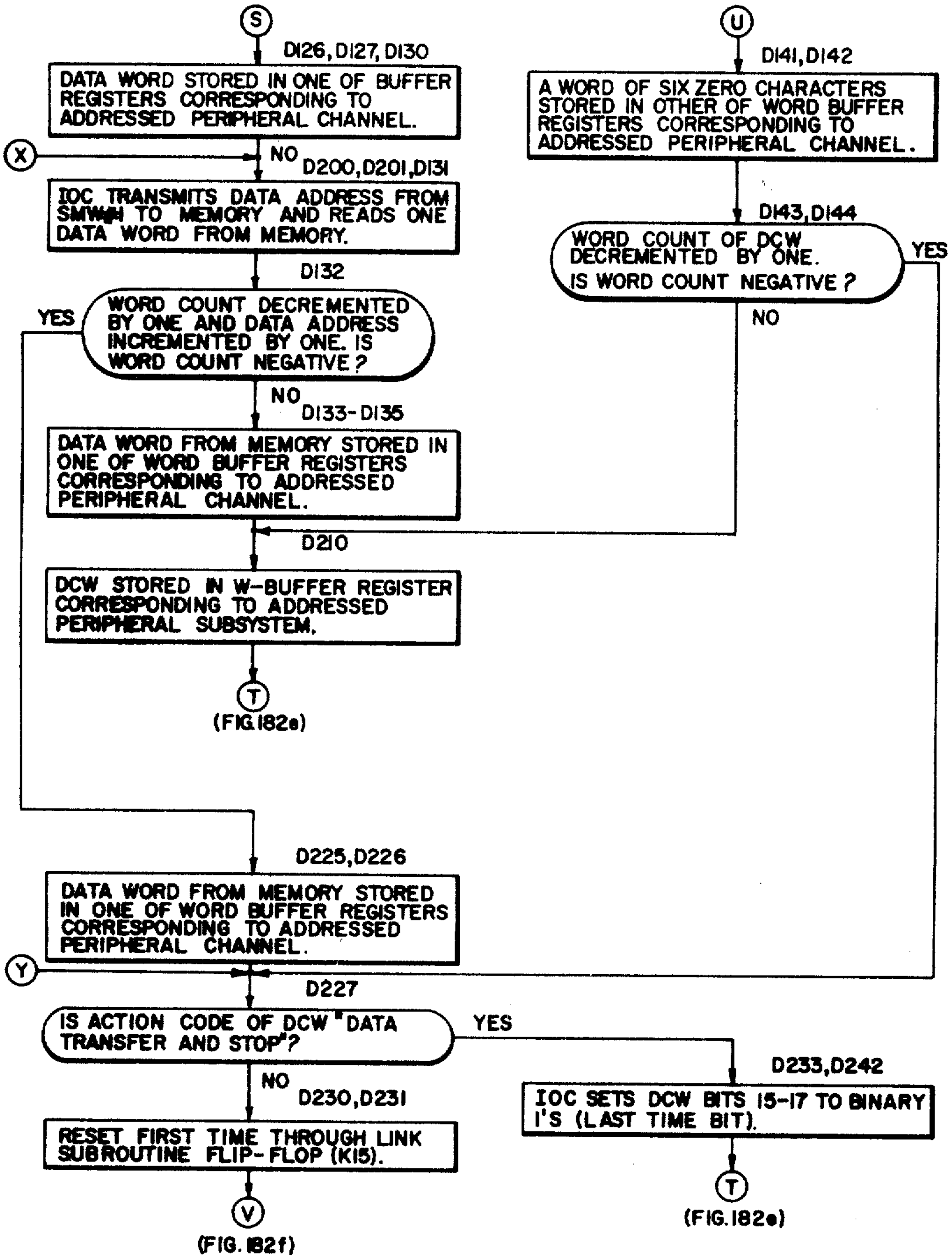

If the peripheral channel addressed by the primary mailbox word is one of peripheral A–F and if the read/write bit of secondary mailbox word #1 calls for a write operation, i.e. a transfer of information from a memory to a peripheral subsystem, the operations illustrated in FIGURES 182f and 182g occurs. If the action code of secondary mailbox word #1 is "no data transfer and proceed," the input/output controller stores one or two words of six zeros each in the pair of buffer registers corresponding to the addressed peripheral channel, depending upon the word count of secondary mailbox word #1. If the action code is not "no data transfer and proceed," the input/output controller transfers one or two information words, depending upon the word count of secondary mailbox word #1, from a memory to the pair of buffer registers corresponding to the addressed peripheral channel.

After this transfer of one or two information words or words of zeros to the appropriate pair of buffer registers, the word count of secondary mailbox word #1 is again checked. If this word count is positive in each case, the data control word is stored in the appropriate W-buffer register, reset lockout is performed and the peripheral subsystem is released for data transfer, if major status is "character/peripheral subsystem busy." If major status is not "character/peripheral subsystem busy," the input/output controller enters the initiation interrupt routine of FIGURE 187. If the word count is negative, the action code of secondary mailbox word #1 is again checked. If this action code is "data transfer and stop," the last time bit is set in the zone control field of secondary mailbox word #1 and the above-described reset lockout and major status checks occurs. If the action code is not "data transfer and stop," the input/output controller enters the link subroutine of FIGURE 183 to obtain another data control word.

If the peripheral channel addressed by the primary mailbox word is one of perpiheral channels G–R having associated with it a pair of character buffer registers, the operations illustrated in FIGURE 182d occur. If secondary mailbox word #1 calls for a read operation, the data control word is stored in memory, reset lockout occurs and the major status of the peripheral is checked. If the major status is "character/peripheral subsystem busy," the peripheral subsystem is released for data transfer and the connect routine ends. If another major status code is presented by the peripheral subsystem, the input/output controller enters the initiation interrupt routine of FIGURE 187.

In the event that secondary mailbox word #1 calls for a write operation involving one of peripheral channels G–R, either a pair of information characters or a pair of zero characters are stored in the pair of character buffer registers corresponding to the addressed peripheral channel, depending upon the action code of secondary mailbox word #1. The data control word is then stored in memory, reset lockout is performed and peripheral major status is checked, as described above, to complete the connect routine for a "unit record transfer" IOC command.

Figure 182H:
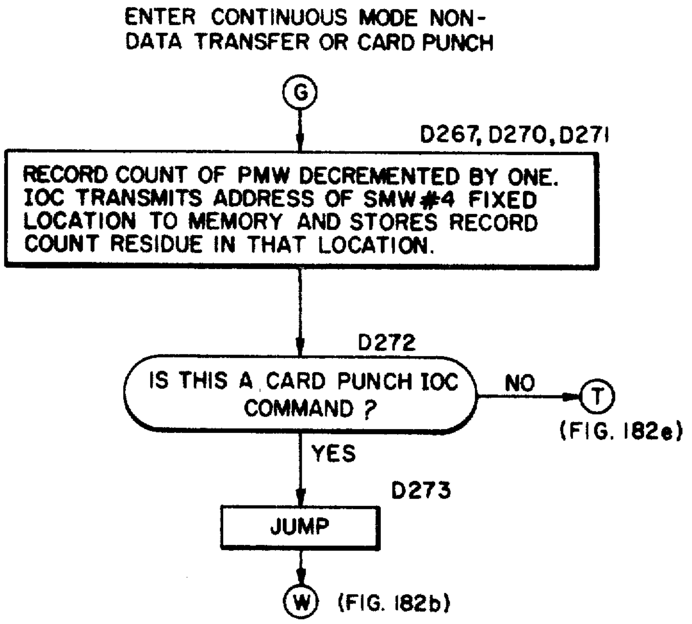

If the IOC command of the primary mailbox word is either "continuous mode non-data transfer" or "card punch," the decremented record count of the primary mailbox word is stored in secondary mailbox word #4, as indicated in FIGURE 182h. If the IOC command is "continuous mode non-data transfer," the input/output controller performs a reset lockout and checks peripheral status, entering either the initiation interrupt routine or releasing the peripheral subsystem and ending the connect routine. If the IOC command is "card punch," the input/output controller performs the same operations as for the "unit record transfer" IOC command.

Figure 182I:
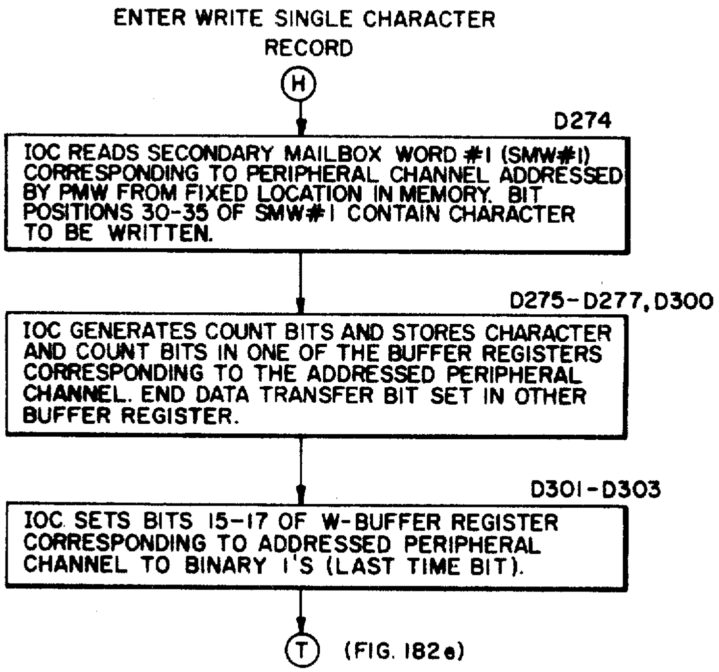

If the IOC command is "write single character record," the input/output controller transfers the character to be written from memory to a buffer register corresponding to the addressed peripheral channel, as shown in FIGURE 182*i*. The end data transfer bit is also set in that buffer register and the last time bit is set in the zone control field of secondary mailbox word #1. The input-output controller then performs a reset lockout and checks peripheral status, to either end of the connect routine or enter the initiation interrupt routine.

If the IOC command is "program load," the input/output controller generates its own data control word, as illustrated in FIGURE 182*c*, and transfers from a peripheral subsystem to memory sufficient information to enable the system to commence processing of information. During execution of this IOC command, the input/output controller performs many of the operations described for the "unit record transfer" IOC command.

Link subroutine

Figure 183:
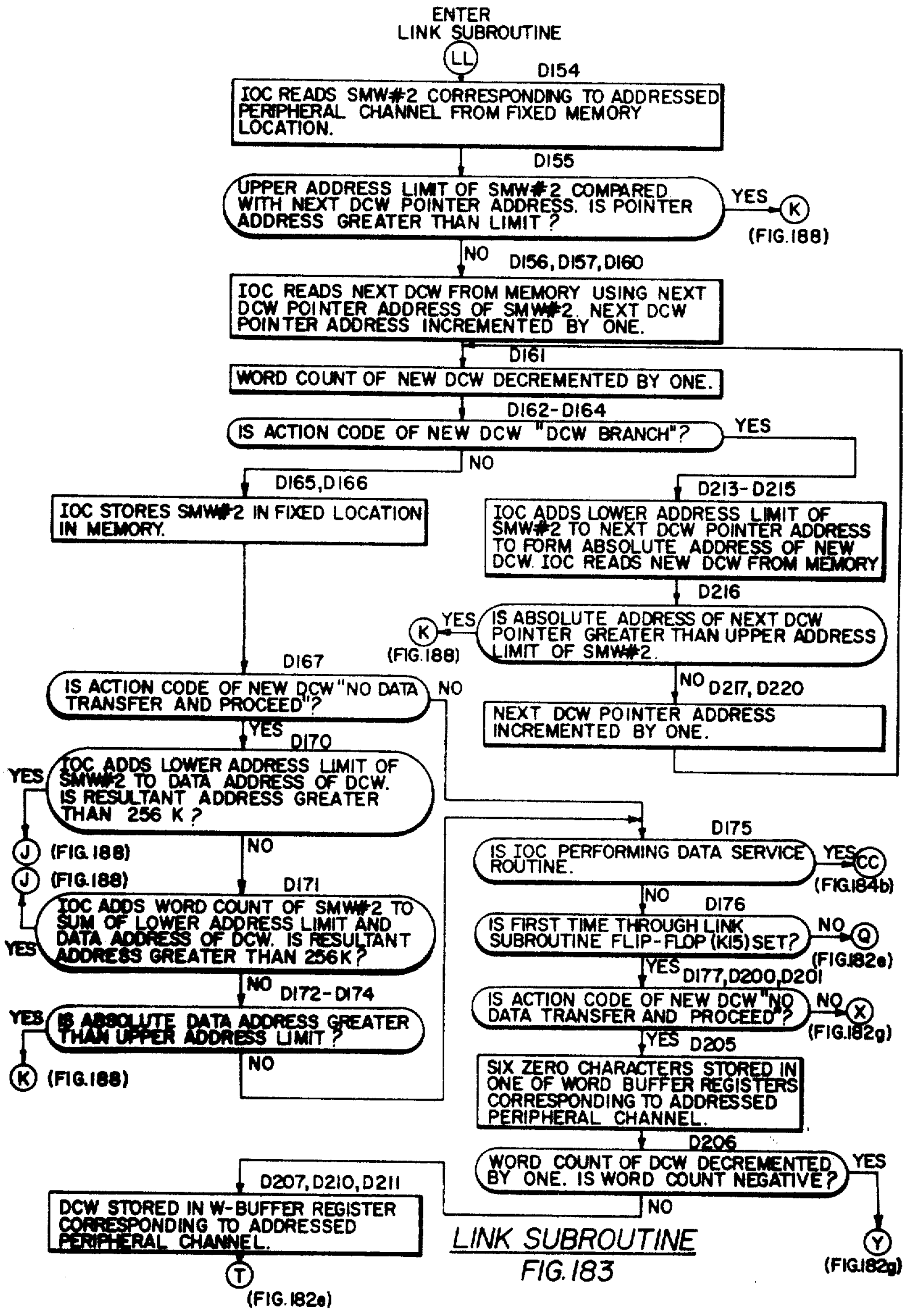
FIGURE 183 is a flow diagram illustrating the operations performed by the input/output controller during the link subroutine.

During the link subroutine, illustrated in FIGURE 183, the input/output controller obtains a new data control word for controlling information transfer between memory and a peripheral subsystem. Referring to FIGURE 183, the input/output controller employs the next DCW pointer field of secondary mailbox word #2 to obtain a new data control word from memory. If the action code of the new DCW is "DCW branch" the input/output controller employs the next DCW pointer field of the new data control word to obtain another data control word. This process continues until the action code of the last data control word obtained by the input/output controller is not "DCW branch." At this time, the input/output controller stores secondary mailbox word #2 in memory and performs tests on the data address field of the data control word if the action code is "no data transfer and proceed." If the data address is greater than memory capacity or outside the established limits, the input/output controller performs the error subroutine of FIGURE 188. Various tests are subsequently performed to determine the point in the data service routine or the connect routine to which the input/output controller will return upon completion of the link subroutine.

Data service routine

Figure 184A:
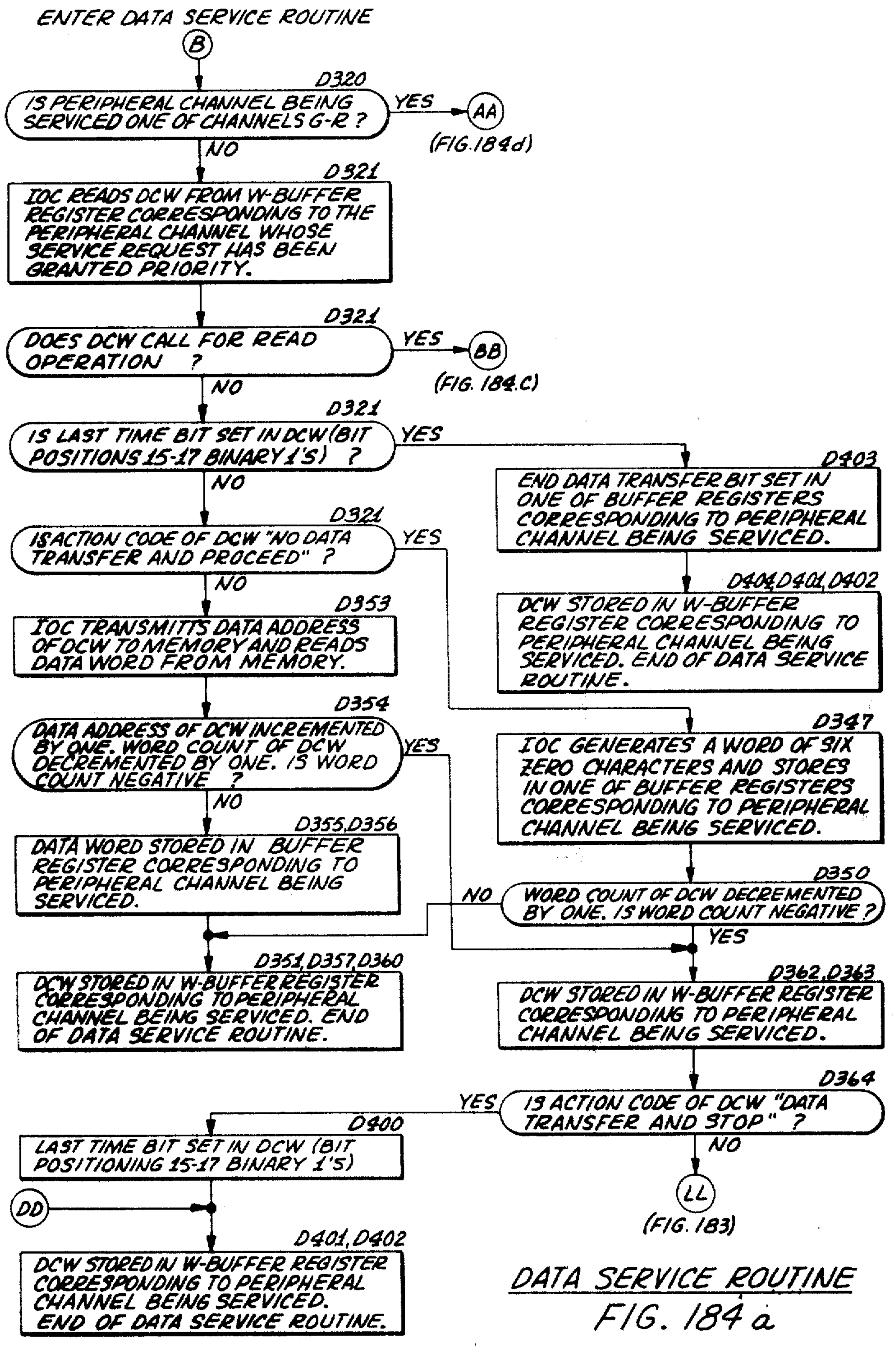

FIGURES 184*a*–184*e* illustrate the operations which occur during the data service routine. During a write operation involving one of peripheral channels A–F, as shown in FIGURE 184*a*, if the last time bit has been set in the zone control field of the data control word during a previous operation, the end data transfer bit is set in the buffer register, the data control word is stored and the data service routine is terminated. If the last time bit has not been set, either a data word from memory or a word of zeros is stored in one of the buffer registers corresponding to the particular channel, depending upon whether or not the action code of the data control word is "no data transfer and proceed." The word count of the data control word is decremented by one. If the word count becomes negative and the action code of the data control word does not call for termination of a data transfer, the input/output controller performs the link subroutine to obtain a new data control word to control transfer of information from memory to the peripheral subsystem during a subsequent data service routine. If the count becomes negative and the action code of the data control word calls for termination of data transfer to the peripheral subsystem, the last time bit is set in the zone control field of the data control word. If the word count of the data control word after incrementation remains positive, the last time bit is not set and the data control word is stored for use during a subsequent data service routine involving the same peripheral channel.

Figure 184D:
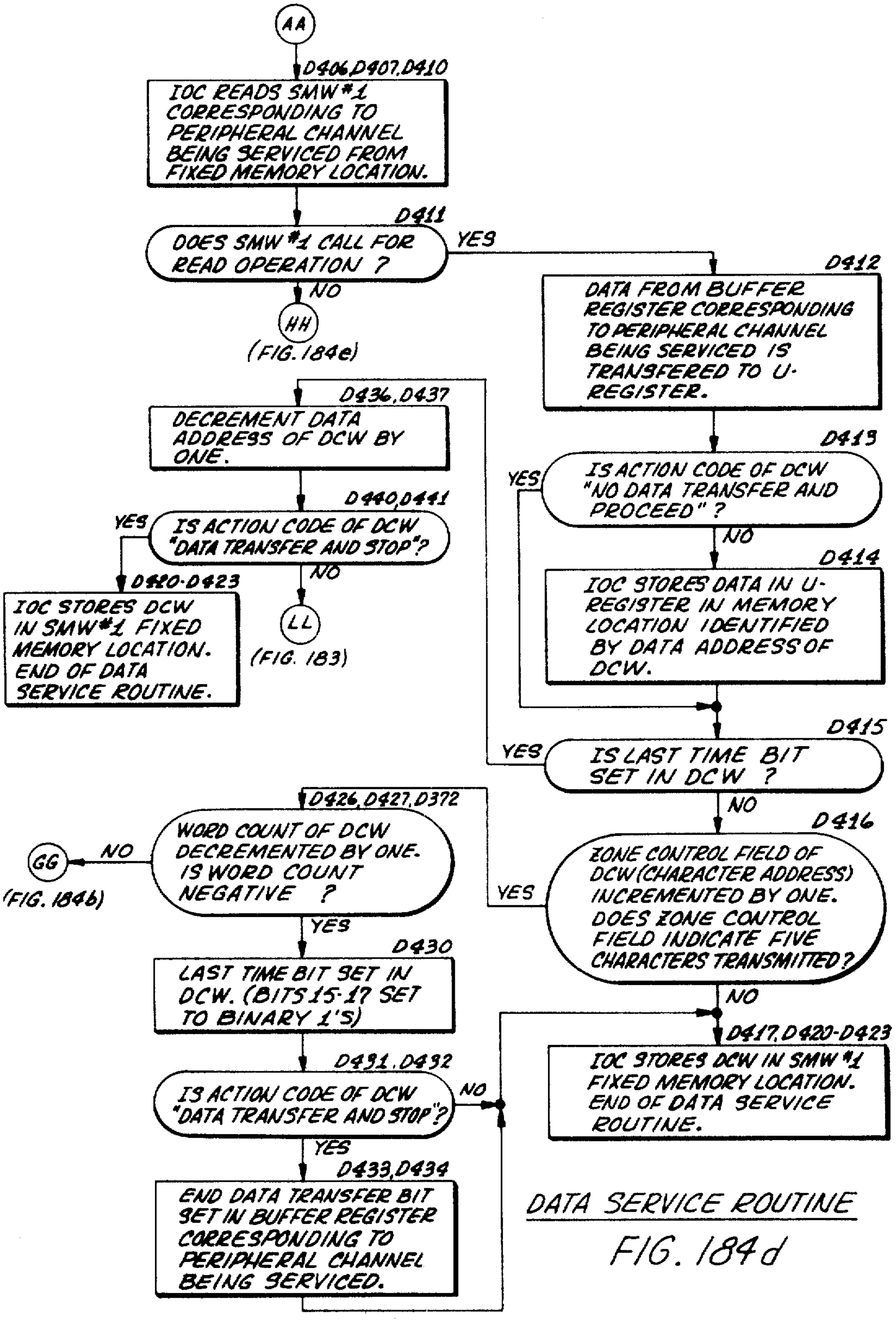
Figure 184E:
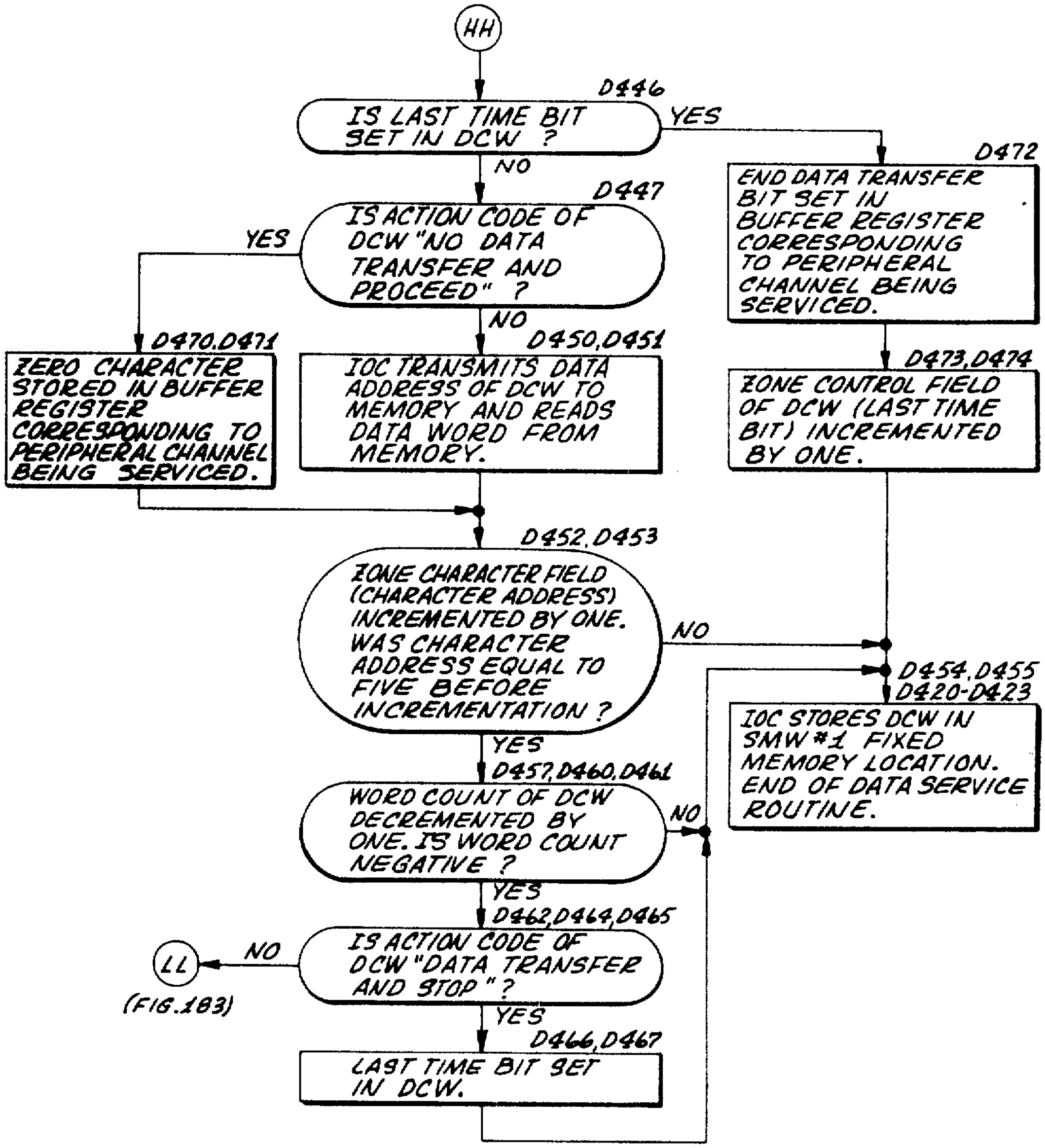

If the peripheral channel being serviced is one of peripheral channels A–F and if the data control word calls for a read operation, the operations illustrated in FIGURE 184*e* occur. Either a data word from a buffer register corresponding to the particular channel is transferred to memory or the buffer register is cleared, depending upon whether or not the action code of the data control word is "no data transfer and proceed." If the last time bit was set during the previous data service routine, the inupt/output controller either performs the link subroutine to obtain a new data control word or terminates the data service routine, depending upon whether or not the action code of the data control word is "data transfer and stop." If the last time bit is not set and the decremented word count of the data control word is negative, the lase time bit is set. The end data transfer bit is also set in the appropriate buffer register if the action code of the data control word is "data transfer and stop." If the word count remains positive after incrementation, the data control word is stored for use during subsequent servicing of the peripheral channel.

During a write operation involving one of peripheral channels G–R, the end data transfer bit of the appropriate buffer register is set and the data control word is stored, if the last time bit in the zone control field of the data control word was set during a previous data service routine, as illustrated in FIGURE 184*e*. If the last time bit is not set in the data control word, either a data character from memory or a character of zeros is transmitted to the appropriate buffer register. If five characters have not yet been transmitted to the peripheral channel, the data control word is stored for use during a subsequent data service routine. If five characters have been transmitted to the peripheral channel and if the decremented word count of the data control word is negative, the input/output controller next performs the link subroutine to obtain a new data control word, assuming the action code of the present data control word is not "data transfer and stop." If the latter action code is contained in the data control word, the last time bit is set in the zone control field.

During a read operation involving one of peripheral channels G–R, the transmission of a character from the appropriate buffer register to the memory location addressed by the data control word is determined by whether or not the action code of the data control word is "no data transfer and proceed," as shown in FIGURE 184*d*. If the last time bit was set during a previous data service routine and if the data control word does not call for termination of data transfer with the peripheral subsystem, the input/output controller performs the link subroutine to obtain a new data control word for use during subsequent servicing of the peripheral channel. If the last time bit is set and if the action code of the data control word calls for termination of the data transfer, the data control word is stored and the data service routine is terminated. If the last time bit is not set in the data control word, the number of characters transmitted from the peripheral subsystem to memory is checked. If five characters have not yet been transmitted, the data control word is stored for use during subsequent data service routine. If five characters have been transmitted, the word count of the data control word is decremented. If the decremented word count is negative, the last time bit is set and, if the action code of the data control word calls for termination of the data transfer, the end data transfer bit is set in the appropriate buffer register. If the decremented word count is not negative, the data control word is stored for use during subsequent servicing of the peripheral channel.

Terminate interrupt routine

Figure 185A:
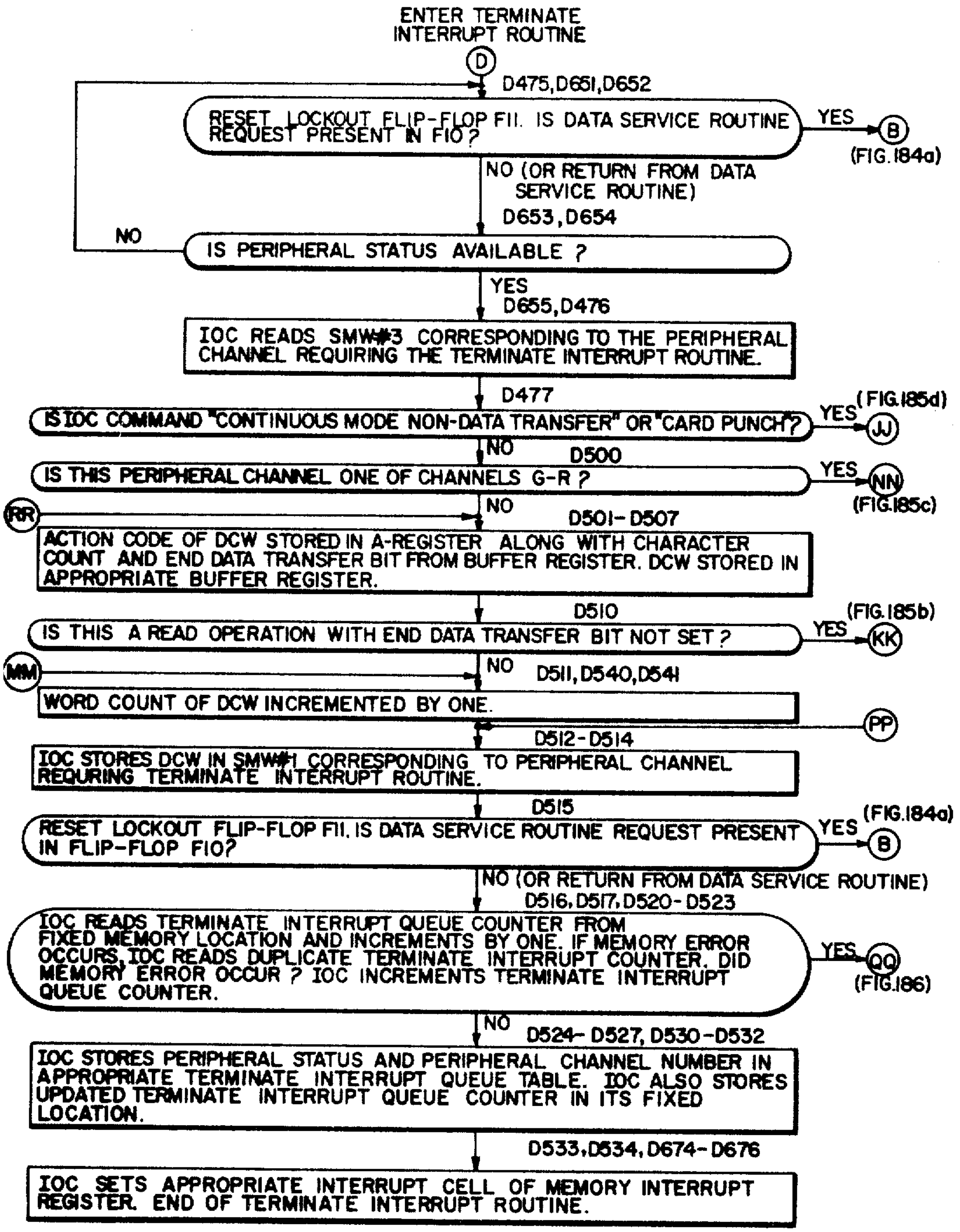
FIGURES 185*a*–185*d* comprise a flow diagram illustrating the operations performed by the input/output controller during the terminate interrupt routine.

The operations which occur during the terminate interrupt routine are illustrated in FIGURES 185*a*–185*d*. Referring to FIGURE 185*a*, upon initiation of the terminate interrupt routine, reset lockout occurs to permit the input/out controller to service a higher priority data service routine request which may be present in the F-register. The input/output controller obtains secondary mailbox word #3, which is a duplicate of the primary mailbox word, from memory to determine the IOC command involving the addressed peripheral channel performed by the input/output controller prior to the terminate interrupt routine request from the channel.

If the IOC command is "continuous mode non-data transfer" or "card punch," the operations shown in FIGURE 184*d* occur. The input/output controller checks the major status of the peripheral subsystem, as reflected in secondary mailbox word #4. If the major status, as reflected in secondary mailbox word #4, is neither "channel/peripheral subsystem ready" or "intermediate condition," the input/output controller stores peripheral status and the peripheral channel number in the appropriate word of the terminate interrupt queue table and sets the appropriate interrupt cell of the memory interrupt register to end the teminate interrupt routine. If errors are detected on reading the terminate interrupt queue counter or its duplicate, the input/output controller performs the counter parity interrupt sequence of FIGURE 186.

If either of the above-mentioned major status conditions exist, the input/output controller decrements and checks the record count of the primary mailbox word. If this record count is negative, the input/output controller insures that the data control word address field is correct and then stores the data control word, transfers status and peripheral channel information to the appropriate word of the terminate interrupt queue table and sets the appropriate interrupt cell of the memory interrupt register to end the terminate interrupt routine. If the record count of the primary mailbox word is not negative, the input/output controller returns to the connect routine to continue execution of the IOC command. In this event, the IOC does not store information in the terminate interrupt queue table or set an interrupt cell at the memory interrupt register until the record count of the primary mailbox word becomes negative.

Figure 185B:
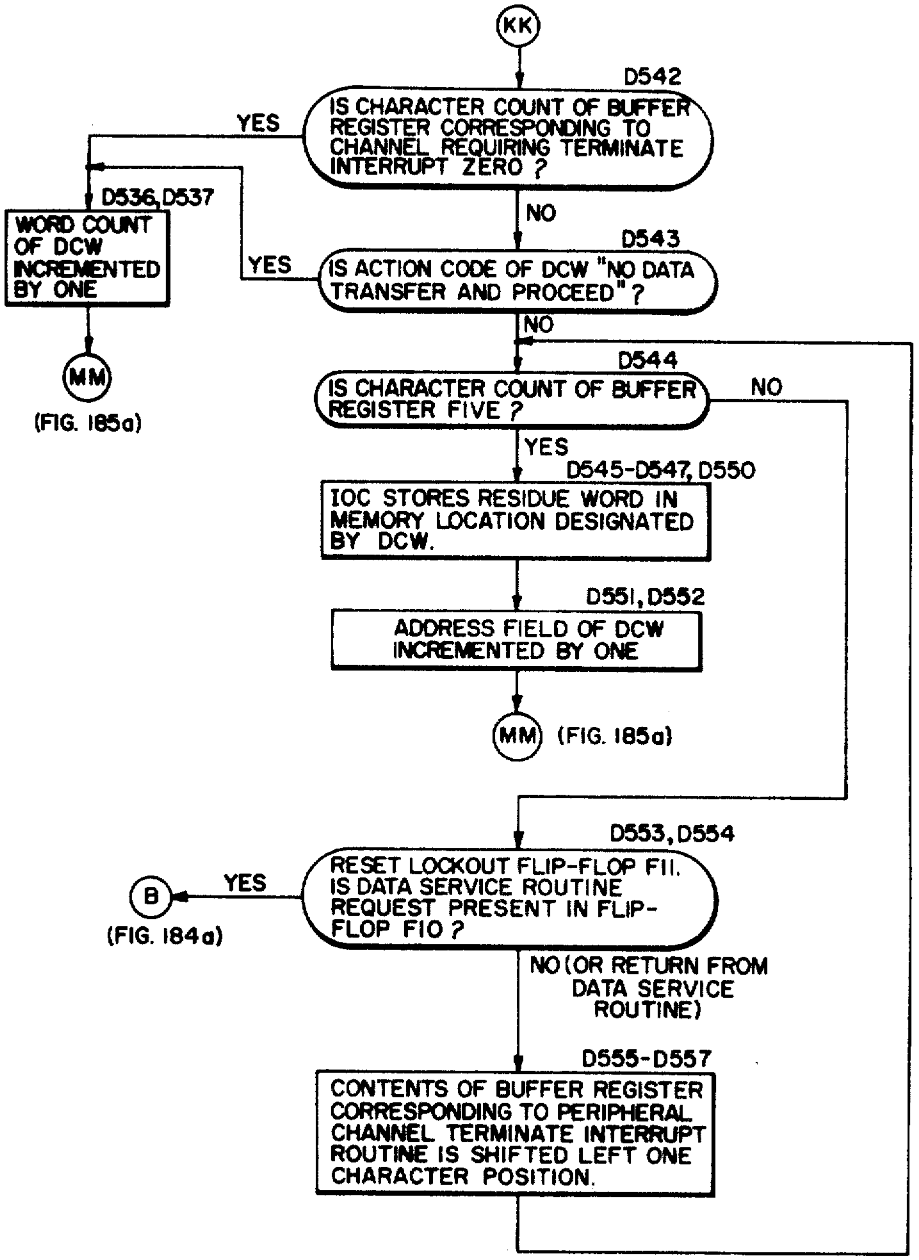
Figure 185C:
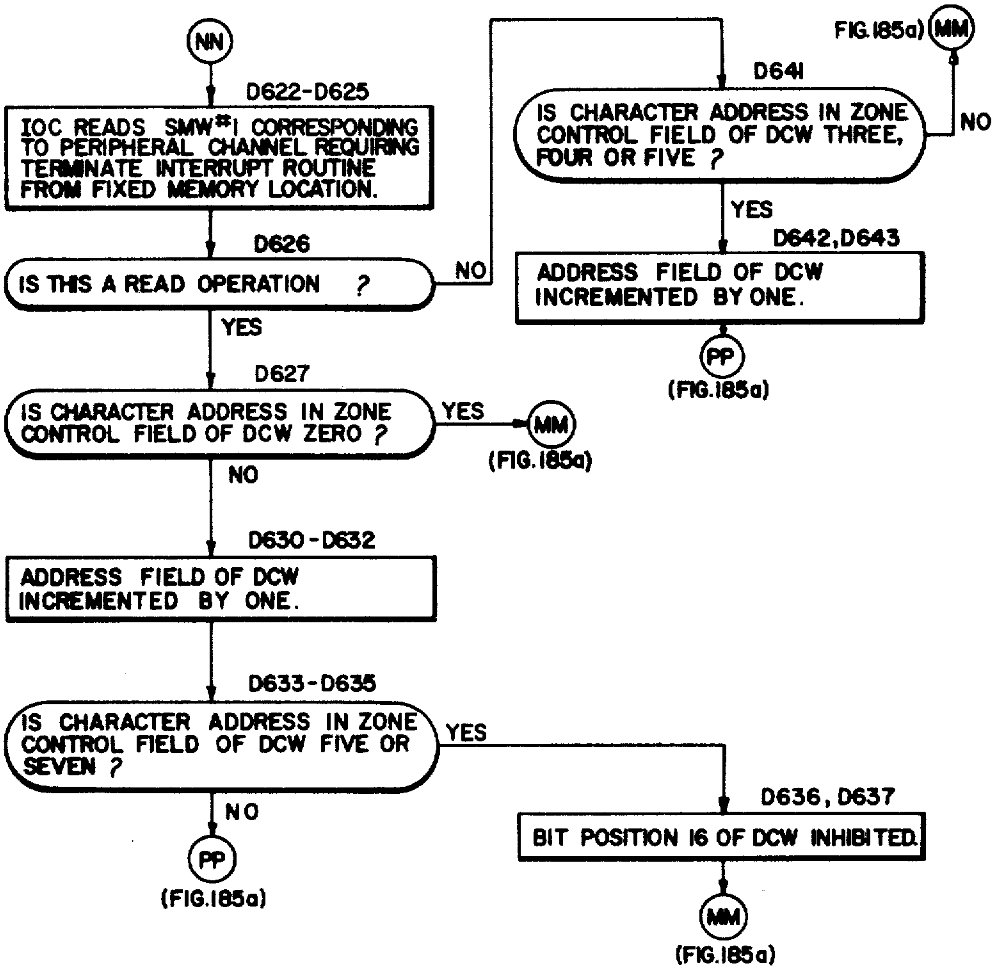
Figure 185D:
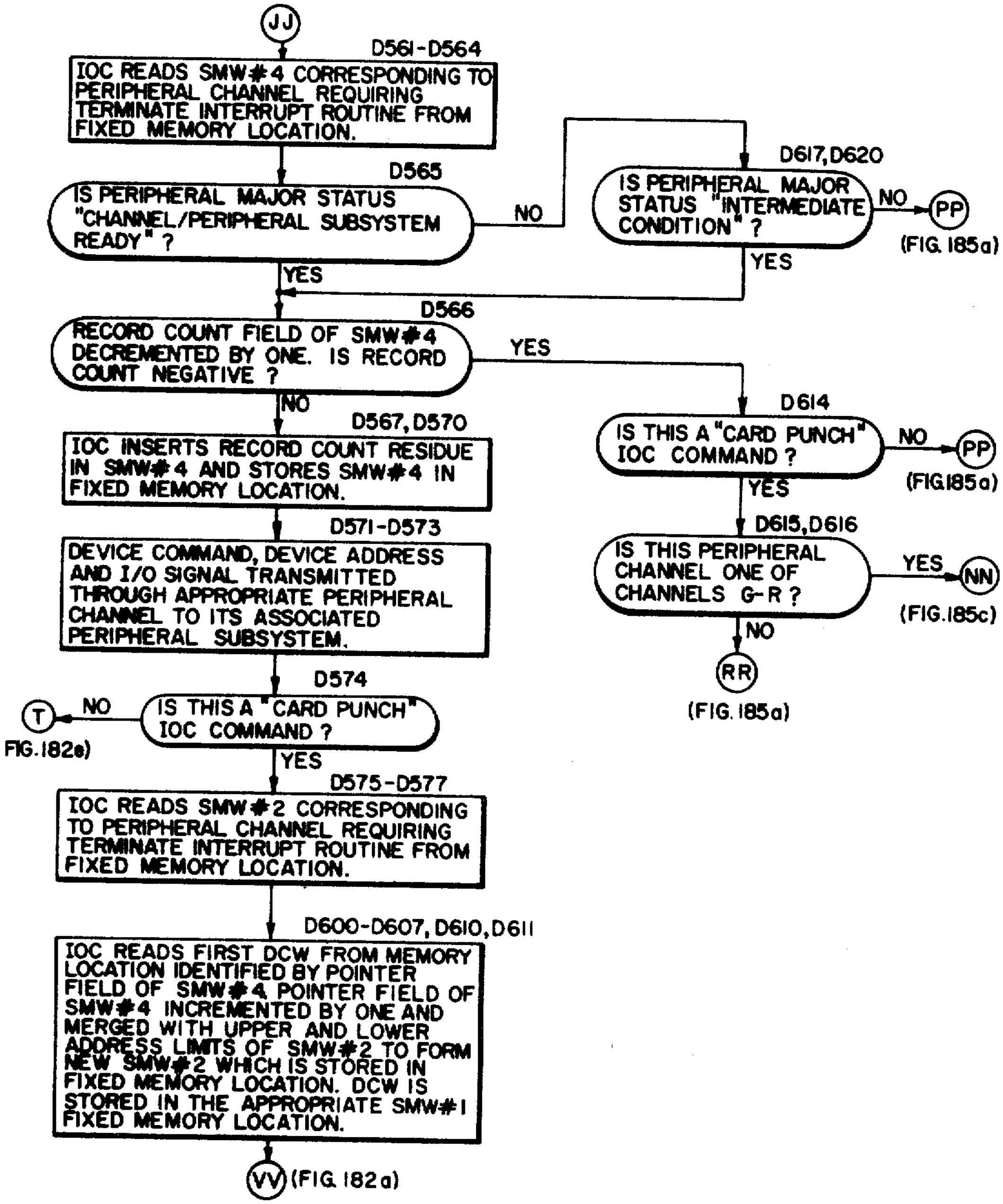

If the IOC command is not "continuous mode non-data transfer" or "card punch" the course of the terminate interrupt routine depends upon whether the peripheral channel addressed by the primary mailbox word is one of peripheral channels A–F or one of peripheral channels G–R. If the addressed peripheral channel is one of peripheral channels A–F, the input/output controller determines if left justification of the contents of the appropriate buffer register is necessary, as shown in FIGURE 185*a* and 185*b*. After left justifying the characters in the buffer register, if necessary, the input/output controller corrects the word count of the data control word, stores the data control word, transfers status and peripheral channel number information to the appropriate word of the terminate interrupt queue table and sets an interrupt cell of the memory interrupt register. If the peripheral channel is one of peripheral channels G–R, the input/output controller modifies the data control word so that the data control word reflects the correct word count and data address, as shown in FIGURE 185*c*. After such modification, the data control word is stored, peripheral status and peripheral channel number information are transmitted to the appropriate word of the terminate interrupt queue table and an interrupt cell of the memory interrupt register is set.

Special interrupt routine

Figure 186:
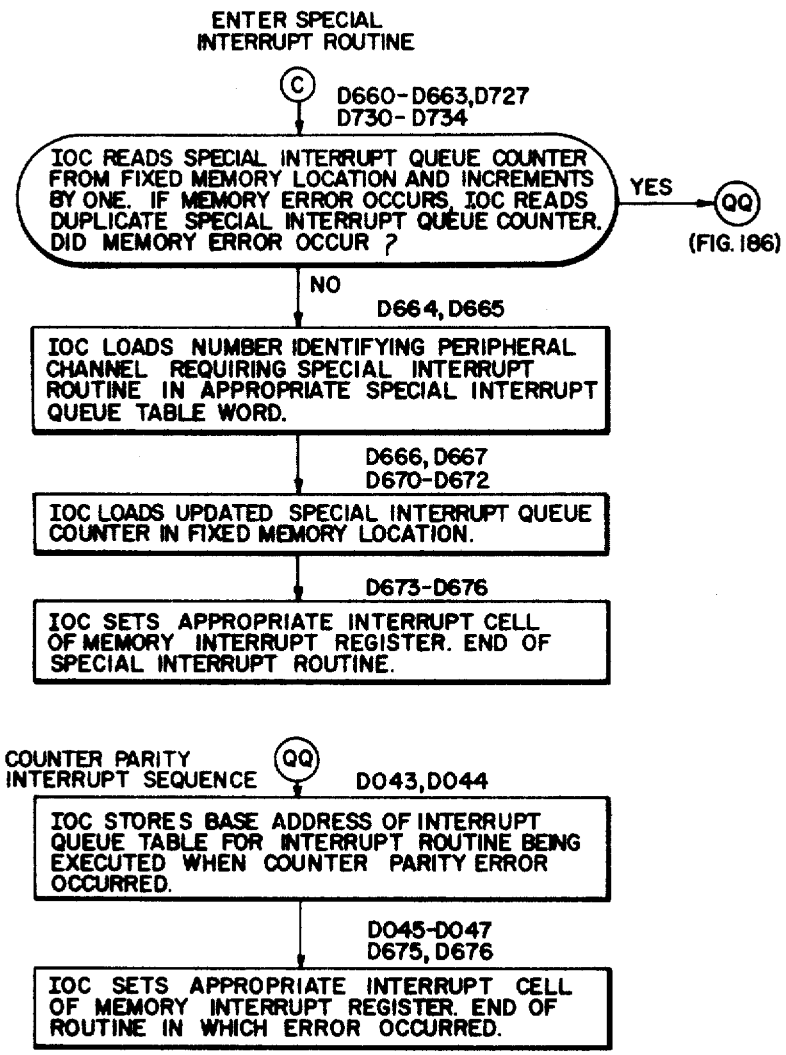
FIGURE 186 is a flow diagram illustrating the operations performed by the input/output controller during the special interrupt routine and during the counter parity interrupt sequence.

The operations which occur during the special interrupt routine are illustrated in FIGURE 186. Upon entering the special interrupt routine, the input/output controller transfers the number of the peripheral channel requiring the special interrupt routine to the appropriate word of the special interrupt queue table and sets an interrupt cell of the memory interrupt register. If memory errors occur when the input/output controller reads the special interrupt queue counter and also its duplicate, the input/output controller performs the counter parity interrupt sequence illustrated in FIGURE 186. The sequence may also be performed upon detection of memory errors when reading the interrupt queue counters during a terminate interrupt or an initiation interrupt routine. During the counter parity interrupt sequence, the input/output controller transmits to memory information concerning the routine being executed when the memory errors occurred and then sets an appropriate cell in the memory interrupt register. This ends the routine which the input/output controller was performing when the errors occurred.

Initiation interrupt routine

Figure 187:
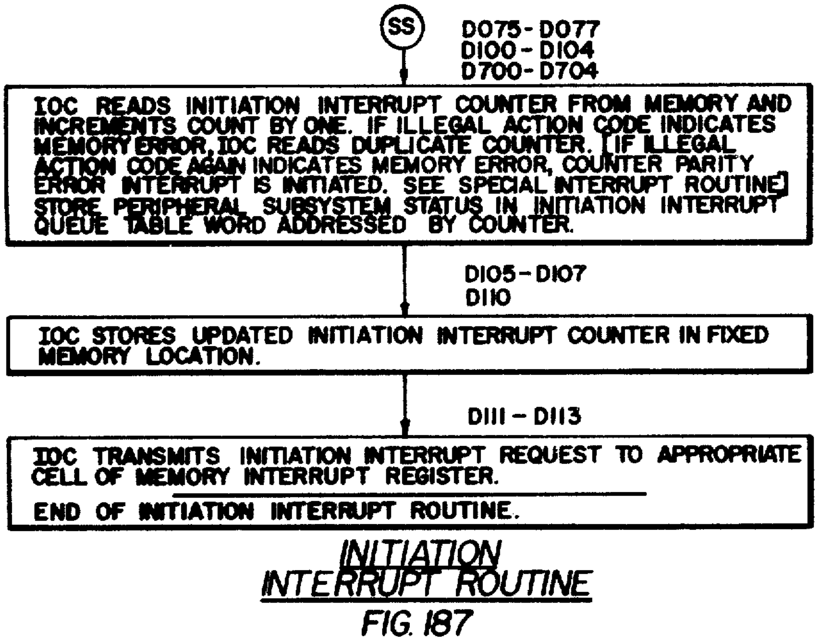
FIGURE 187 is a flow diagram illustrating the operations performed by the input/output controller during the initiation interrupt routine.

FIGURE 187 illustrates the operations which occur during the initiation interrupt routine. The input/output controller stores in the appropriate initiation interrupt queue table word information concerning peripheral subsystem status. The appropriate cell of the memory interrupt register is also set by the input/output controller to request a program interrupt. The initiation interrupt routine ends at this point. If memory errors occur when the initiation interrupt quene counter and its duplicate are read from memory by the input/output controller, the input/output controller then enters the counter parity interrupt sequence, shown in FIGURE 186.

Error subroutine

Figure 188:
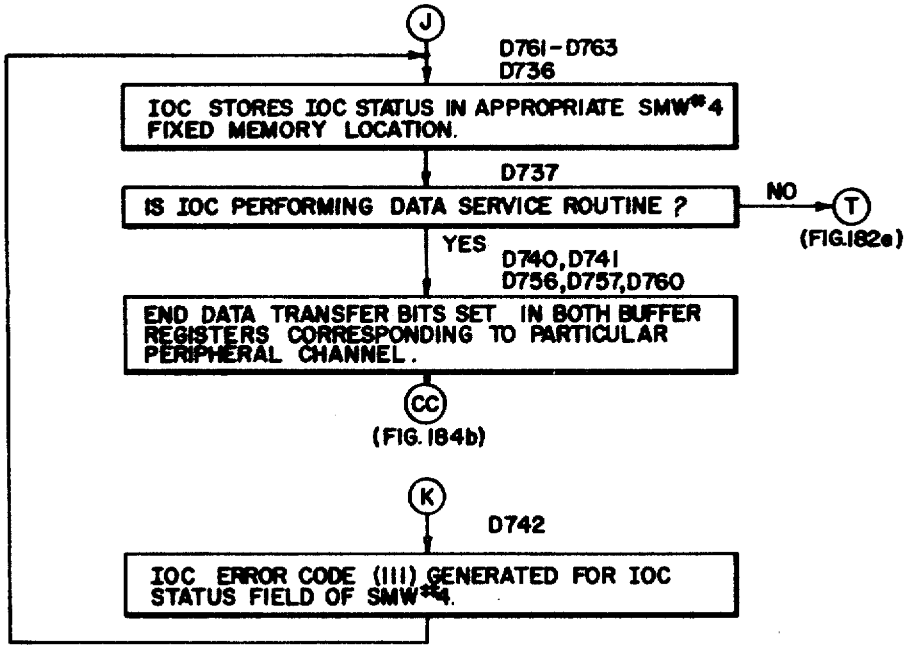
FIGURE 188 is a flow diagram illustrating the operations performed by the input/output controller during the error subroutine.

If the absolute data address contained in the data control word of secondary mailbox #1 is greater than the memory capacity or outside the address limits established by secondary mailbox #2, the input/output controller performs the error subroutine illustrated in FIGURE 188. During this error subroutine, status information is stored in secondary mailbox #4. If the input/output controller was performing a connect routine prior to entering the error subroutine, the input/output controller returns to the connect routine. If the input/output controller was performing a link subroutine before entering the error subroutine, the end data transfer bits in the buffer registers corresponding to the appropriate peripheral channel are set and the input/output controller returns to the data service routine.

Accordingly, there has been described herein digital computer apparatus embodying the instant invention. While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In a computer system, the combination comprising: a data storage unit comprising a plurality of buffer registers for storing information, a data register, first transfer means for transferring information from a selected one of said buffer registers of said data storage unit to said data register, and second transfer means for directly transferring information from said data register to the selected one of said buffer registers of said data storage unit, said second transfer means including shift means for subjecting the information being transferred from said data register to the selected buffer register to a predetermined shift.

2. In a computer system, the combination comprising: a data storage unit comprising a plurality of addressable buffer registers for temporarily storing information, address means for providing an address of one of said addressable buffer registers, a data register, gating means for subjecting information applied thereto to a predetermined shift, and transfer means responsive to the address provided by said address means for transferring the contents of the addressed buffer register to said data register and from said data register through said gating means back to the addressed buffer register.

3. In a computer system, the combination comprising: a data storage unit comprising a plurality of addressable registers, each of said addressable registers comprising a plurality of storage positions for storing information items, each of said storage positions storing one information item, a data register, gating means for shifting information applied thereto through one storage position, and means for transferring the contents of a selected one of said addressable registers to said data register and from said data register directly through said gating means back to the selected one of said addressable registers.

4. In a computer system, the combination comprising: a data storage unit comprising a plurality of storage locations, each of said storage locations comprising a plurality of storage positions for storing a corresponding plurality of characters of a data word, each of said characters comprising a plurality of binary digits, a register, first transfer means for transferring the contents of a selected one of the storage locations of said data storage unit to said register, and second transfer means for directly transferring the contents of said register to the selected one of the storage locations of said data storage unit, said second transfer means including gating means for shifting the contents of said register through one storage position relative to the original position of said contents in the selected storage location.

5. In a computer system, the combination comprising: a data storage unit comprising a plurality of addressable registers, a data register, control means for generating a control signal at predetermined times, first transfer means for transferring the contents of a selected one of the addressable registers of said data storage unit to said data register, and second transfer means for directly transferring the contents of said data register to the selected one of the addressable registers of said data storage unit, said second transfer means including shift means responsive to a control signal generated by said control means for subjecting the information being transferred from said data register to the selected addressable register to a predetermined shift.

6. In a computer system, the combination comprising: a data storage unit comprising a plurality of addressable buffer registers for storing information, a data register, control means for generating a control signal at predetermined times, ouput gating means for transferring the contents of a selected one of the addressable buffer registers of said data storage unit to said data register, and input gating means for transferring the contents of said data register to the selected one of the addressable buffer registers, said input gating means including shift means responsive to a control signal generated by said control means for subjecting the contents of the selected addressable buffer register to a predetermined shift.

7. In a computer system, the combination comprising: a data storage unit comprising a plurality of storage location for storing information, a register, means for transferring the contents of a selected one of the storage locations of said data storage unit to said register, data source means, and gating means for transferring information to a selected storage location of said data storage unit, means for transmitting the contents of said register to said gating means, and shift means included in said gating means, for subjecting the information transmitted from said register to a predetermined shift while simultaneously receiving a quantity of information from said data source means.

8. In a computer system, the combination comprising: a data storage unit comprising a plurality of storage locations, each of said storage locations comprising a plurality of storage positions for storing a corresponding plurality of information items, a register, output gating means for transferring the contents of a selected one of the storage locations of said data storage unit to said register, data source means for supplying an information item, and input gating means for transferring information directly from said register to the selected storage location of said data storage unit, said input gating means including shift means for shifting the information transmitted from said register through one storage position and for receiving an information itsem from said data source means for transfer to the selected storage location simultaneous with the shifted information from said register, the information item from said data source means being transferred to the storage position of the selected storage location vacated due to the shift performed by said shift means.

9. In a computer system, the combination comprising: a data storage unit comprising a plurality of storage locations, each of said storage locations comprising a plurality of storage positions for storing a corresponding plurality of characters of a data word, a first register, output gating means for transferring the contents of a selected one of the storage locations of said data storage unit to a first register, a second register for storing a data character, shift means for receiving the contents of said first register and for shifting the contents of said first register through one character position in a direction from the lowest-order character position to the highest-order character position, means for transferring an information character from said second register to said shift means in the character position vacated by the shift performed by said shift means, and input gating means for transferring the output of said shift means to the selected storage location of said data storage unit.

10. In a computer system, the combination comprising: a data storage unit comprising a plurality of buffer registers for temporarily storing information, a data register, first control means for initiating a read operation for transferring the contents of a selected buffer register of said data storage unit to said data register, gating means for subjecting information applied thereto to a predetermined shift, second control means for initiating a write operation to transfer contents of said data register directly through said gating means to a selected buffer register of said data storage unit.

11. In a computer system, the combination comprising: a data storage unit comprising a plurality of storage locations, each of said storage locations comprising a plurality of storage positions for storing a corresponding plurality of information items, a register, data source means for supplying an information item, first control means for initiating a read operation to transfer the contents of a selected storage location of said data storage unit to said register, gating means for shifting information applied thereto from said register through one storage position and for receiving an information item from said data source means in the storage position vacated due to the shift performed by said gating means, second control means for initiating a write operation to transfer the information in said register through said gating means to the selected storage location, said second control means including means for causing transfer of an information item from said data source means to said gating means simultaneous with the transfer of information from said register to said gating means, whereby the information in said register is shifted and merged with the information item from said data source means during the write operation.

12. In a computer system, the combination comprising: a data storage unit comprising a plurality of storage locations, each of said storage locations comprising a plurality of storage positions for storing a corresponding plurality of information items, a register, data source means for supplying an information item, address means for supplying an address of a selected one of the storage locations of said data storage unit, first control means responsive to the address supplied by said address means for initiating a read operation to transfer the contents of the addressed storage location to said register, gating means for shifting through one storage position the information transmitted to said gating means from said register and for receiving an information item from said data source means in the storage position vacated due to the shift performed by said gating means, second control means responsive to the address supplied by said address means for initiating a write operation to transfer the information in said register through said gating means to the addressed storage location, said second control means including means for causing transfer of an information item from said data source to said gating means simultaneous with the transfer of information from said register to said gating means, whereby the information from said register is shifted and merged with the information item from said data source and stored in the addressed storage location during the write operation.

References Cited

UNITED STATES PATENTS

| | | | |
|---|---|---|---|
| 3,061,192 | 10/1962 | Terzian ------------ | 235—157 |
| 3,270,324 | 8/1966 | Meade et al. ------ | 340—172.5 |
| 3,274,556 | 10/1966 | Paul et al. -------- | 340—172.5 |

PAUL J. HENON, Primary Examiner

R. RICKERT, Assistant Examiner